United States Patent [19]
Miller et al.
[11] 4,089,059
[45] May 9, 1978

[54] PROGRAMMABLE CALCULATOR EMPLOYING A READ-WRITE MEMORY HAVING A MOVABLE BOUNDARY BETWEEN PROGRAM AND DATA STORAGE SECTIONS THEREOF

[75] Inventors: Bradley W. Miller; Franklin T. Hickenlooper; David C. Uhlrich; Marl D. Godfrey; Douglas M. Clifford; Rex L. James; Robert E. Watson; John C. Keith; Alan C. Mortensen, all of Loveland, Colo.

[73] Assignee: Hewlett-Packard Company, Palo Alto, Calif.

[21] Appl. No.: 597,957

[22] Filed: Jul. 21, 1975

[51] Int. Cl.[2] .................................................. G06F 9/06
[52] U.S. Cl. ...................................... 364/706; 364/200
[58] Field of Search ............................... 235/152, 156; 340/172.5

[56] References Cited

U.S. PATENT DOCUMENTS

| | | | |
|---|---|---|---|
| 3,461,434 | 8/1969 | Barton et al. | 340/172.5 |
| 3,548,384 | 12/1970 | Barton et al. | 340/172.5 |
| 3,588,841 | 6/1971 | Ragen | 340/172.5 |
| 3,596,257 | 7/1971 | Patel | 340/172.5 |
| 3,878,513 | 4/1975 | Werner | 340/172.5 |
| 3,904,862 | 9/1975 | Cochrun et al. | 235/156 |

*Primary Examiner*—David H. Malzahn
*Attorney, Agent, or Firm*—William E. Hein

[57] ABSTRACT

An adaptable programmable calculator employs modular read-write and read-only memories separately expandable to provide additional program and data storage functions within the calculator oriented toward the environment of the user, an LSI NMOS central processing unit, and an LSI NMOS peripheral interface adaptor capable of bidirectionally transferring information between the read-write memory and central processing unit and a number of input/output units. The modular read-write memory includes a movable boundary between a program storage section thereof and a data storage section thereof to permit the user to adjust the size of those sections of the read-write memory in accordance with his present problem solving requirements. The input/output units include a keyboard input unit with a plurality of alphanumeric keys, a magnetic tape cassette reading and recording unit capable of bidirectionally transferring programs and data between a magnetic tape and the calculator, a seven-segment gas discharge display for displaying data entered into the calculator, the results of computations, and selected alphanumeric messages, and a 16-column alphanumeric thermal printer for printing results of computations, program listings, messages generated by the user and the calculator itself, and error conditions encountered during use of the calculator. All of these input/output units are included within the calculator itself. Many other external input/output units may be employed with the calculator. The calculator may be operated manually by the user from the keyboard input unit or automatically through a program stored within the read-write memory to perform calculations and to provide an output indication of the results thereof. The calculator employs reverse polish notation (RPN) language including an operational stack of registers for efficiently evaluating algebraic expressions. The language is arranged on a modified key per function basis, incorporating some of the features of higher level languages such as loops. The language also includes sophisticated editing features that enhance the usefulness of the calculator.

6 Claims, 226 Drawing Figures

BASIC ROM OVERVIEW

I/O ROM FORMAT

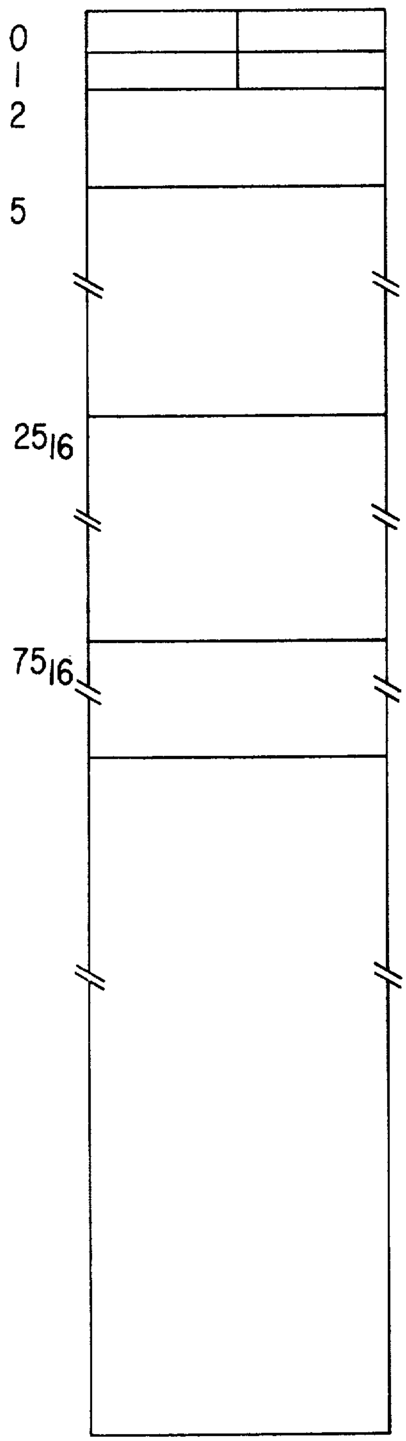

PRIMARY ROM SELECT CODE } IN UPPER
SECONDARY ROM SELECT CODE } FOUR BITS.

JUMP INSTRUCTION FOR INITIALIZATION DURING POWER ON SEQUENCE.

SIXTEEN 16-BIT ADDRESS TO COMMAND EXECUTION ROUTINES FOR ENTRY INTO ROM. FIRST ADDRESS IS TO ALPHA ROUTINE, NEXT TO A, B, C, ETC.

SIXTEEN 5-CHARACTER BLOCKS OF ASCII USED IN USING THE PROGRAM. THE ORDER IS THE SAME AS THE JUMP ADDRESSES. THE FIRST CHARACTER IN EACH BLOCK MUST HAVE ITS M, S, B, SET.

I/O ROM ERROR ASCII. THE MSB OF THE FIRST CHARACTER OF EACH MESSAGE MUST BE SET TO SEPERATE MESSAGES.

REST OF ROM FREE FOR CODE.

FIG 7

MEMORY ALLOCATION MAP

CALCULATOR MEMORY IS DIVIDED INTO BOTH R/W AND ROM. THE R/W IS SPLIT BETWEEN BASE PAGE (SYSTEM) R/W AND EXPANDABLE USER R/W. ROM IS DIVIDED BETWEEN SYSTEM ROM AND I/O ROM. BELOW IS A GENERAL MAP SHOWING ALL THE MEMORY SPACE. ALL ADDRESSES ARE HEXADECIMAL.

*n=2 FOR 512 OPTION; n=4 FOR 1024 OPTION; n=8 FOR 2048 OPTION

USER READ-WRITE MEMORY ALLOCATION

USER MEMORY ($100_{16}$ → 2FF OR 4FF OR 8FF DEPENDING UPON THE OPT) IS SHOWN BELOW AS TO ITS USE AND ALLOCATION. ADDRESSES DEPEND UPON OPTION SO "n" IS USED TO INDICATE THEM. (FOR 512, n=2; 1024, n=4; 2048, n=8) USER MEMORY ALWAYS BEGINS AT $100_{16}$. ALL ADDRESSES ARE HEXADECIMAL.

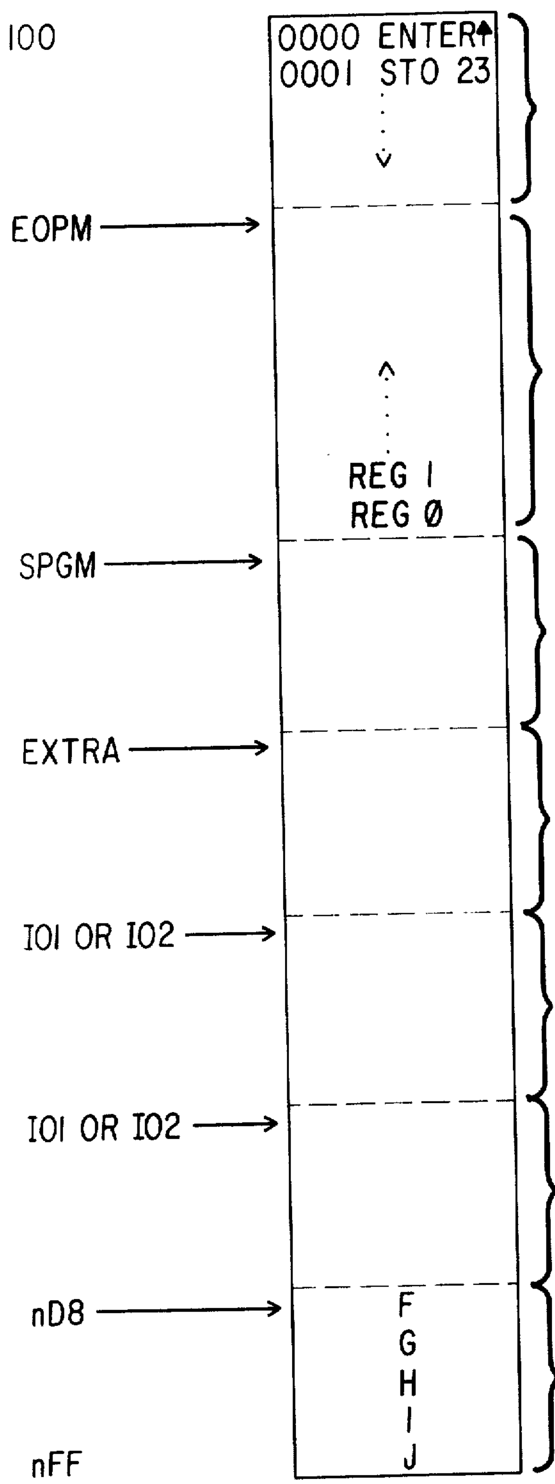

USER PROGRAM MEMORY. WILL ALWAYS BE A MULTIPLE OF 8, CAN NEVER BE LESS THAN 8. MAX SIZE DEPENDS UPON HIS I/O SETUP, HIS STORAGE REGISTES, MEMORY OPTION, ETC.

OPTIONAL USER NUMERIC STORAGE REGISTERS. REGISTERS BEGIN WITH Ø AT THE LARGEST ADDRESS AND WORK "BACK". EACH REGISTER IS 8 BYTES LONG, MUST BEGIN AT A MULTIPLE OF 8, AND THE EXPONENT IS ALWAYS THE LOWEST ADDRESS OF THE 8 BYTES. (SEE DESCRIPTIONS OF DATA FORMATS FOR MORE INFORMATION)

OPTIONAL BINARY PROGRAM AREA. ITS START IS INDICATED BY "SPGM" ON BASE PAGE. SIZE MUST BE A MULTIPLE OF 8.

OPTIONAL R/W ALLOCATION FOR THE KATAKANA ROM SLOT (WHICH WILL USE POINTER "EXTRA" EXPLAINED ON BASE PAGE). MUST BE A MULTIPLE OF 8.

OPTIONAL R/W ALLOCATION FOR I/O. THE I/O ROM WITH THE LARGEST STARTING ADDRESS WILL USE THIS AREA. SIZE OF ALLOCATION WILL BE A MULTIPLE OF 8.

OPTIONAL R/W ALLOCATION FOR I/O. THE I/O ROM WITH THE SMALLEST STARTING ADDRESS WILL USE THIS AREA. SIZE OF ALLOCATION WILL BE A MULTIPLE OF 8.

USE REGISTERS F-J. F BEGINS AT nD8 AND THE REST FOLLOW AT 8 BYTES EACH. G=nEØ H=nE8 I=nFØ J=nF8

FIG 10

RAM CHIP SELECT TIMING

PAPER OUT CIRCUIT

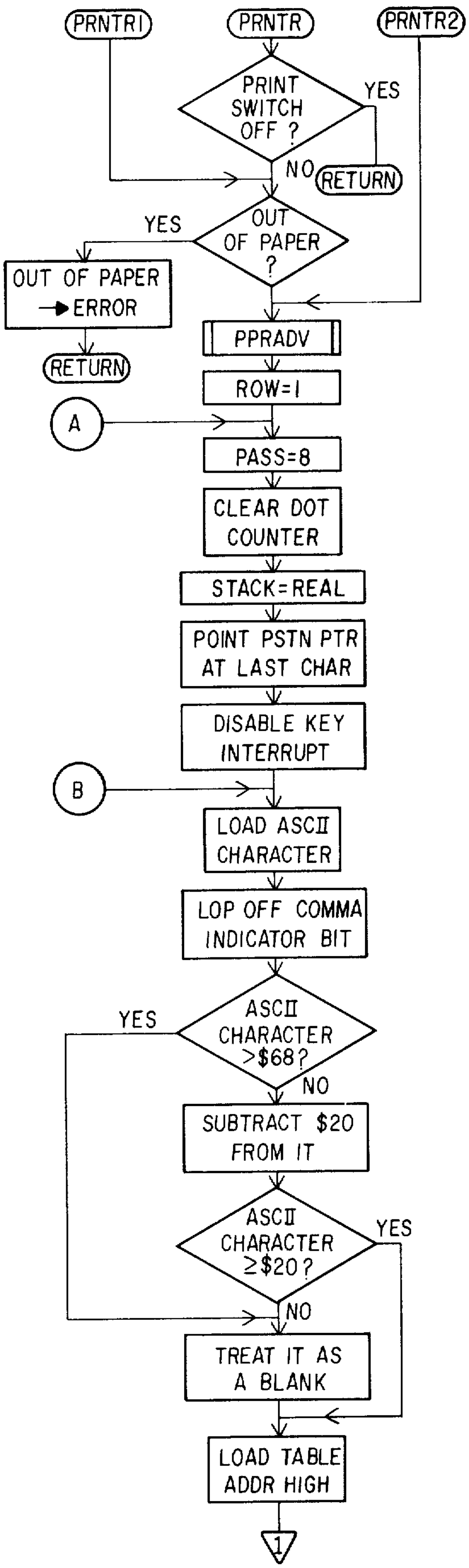
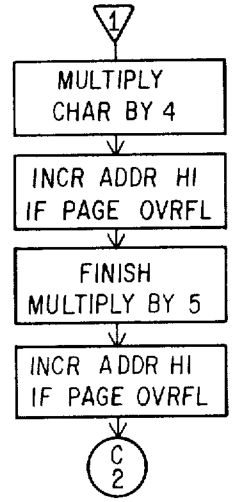
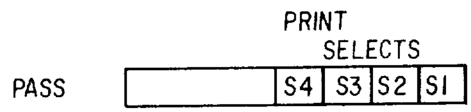
DOT COUNTER COUNTS THE NUMBER OF DOTS TO BE BURNED/PASS.
DOT MATRICES ARE STORED BY COLUMN:
| | ROW 7 | 6 5 4 3 2 1 |
|---|---|---|
| $5ECØ | | COLUMN 5 |
| | | 4 |
| SPACE | | 3 |
| | | 2 |
| | | 1 |
| — | | 5 |
| | | 4 |
| ⇄ | | 3 |
| | | 2 |
| | | 1 |
| — | | ⋮ |
ADDRESS OF DOT COLUMNS FOR PARTICULAR ASCII CHARACTER = $5ECØ + [(ASCII−$20)*5].
IF DURING THE CALCULATION OF $CØ+(ASCII−$20)*5, THE RESULT CROSSES A PAGE BOUNDARY, THE TABLE ADDRESS HIGH MUST BE INCREMENTED.
FIG 66A PAPER ADVANCE MECHANISM IS OFF ON ENTRY TO THIS SUBROUTINE.
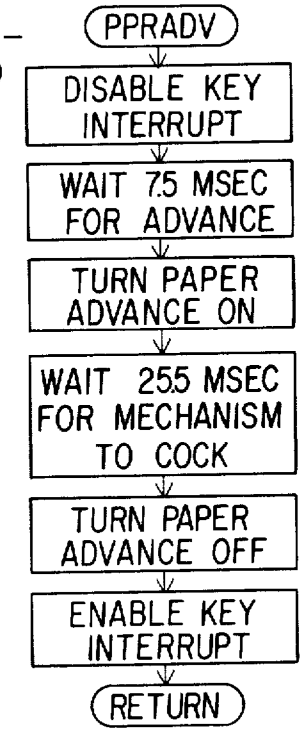
FIG 66F
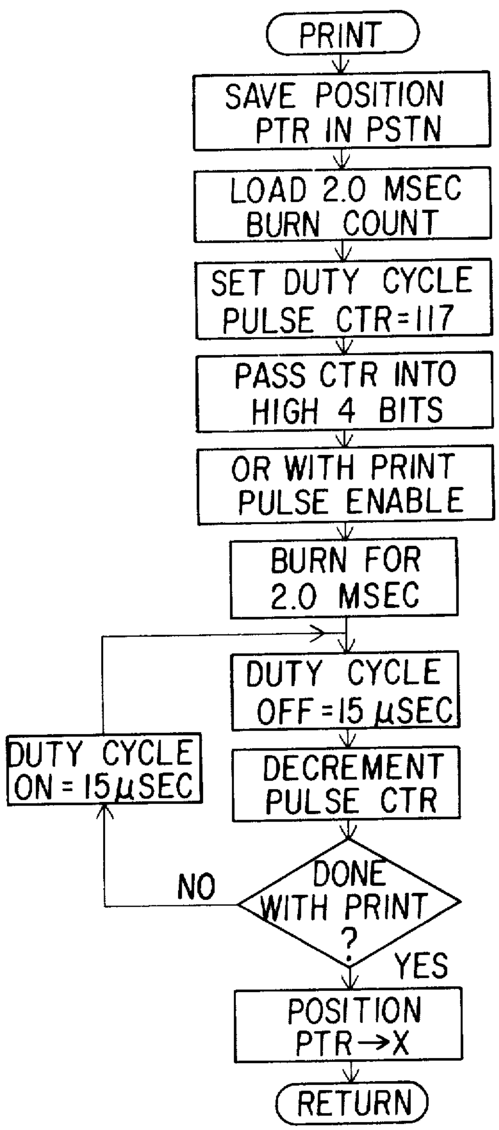
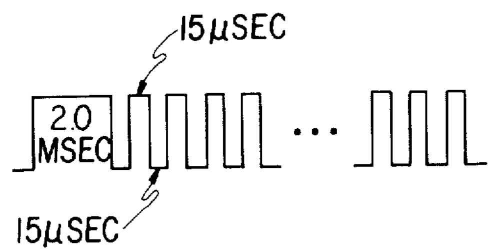
TOTAL PRINT PULSE = 5.5μSEC
117 PULSES ARE NEEDED TO GET 3.5 MSEC
[5.5-2.0=3.5MSEC]
FIG 66G LABEL INSTRUCTION IS DONE ON TWO LINES SO THAT IT IS EASILY DISTINGUISHABLE FROM THE OTHER INSTRUCTIONS.

THIS ROUTINE TAKES TWO'S COMPLEMENT EXPONENT IN ACCA, CONVERTS IT TO BCD, AND STORES THE RESULT IN XPNT.

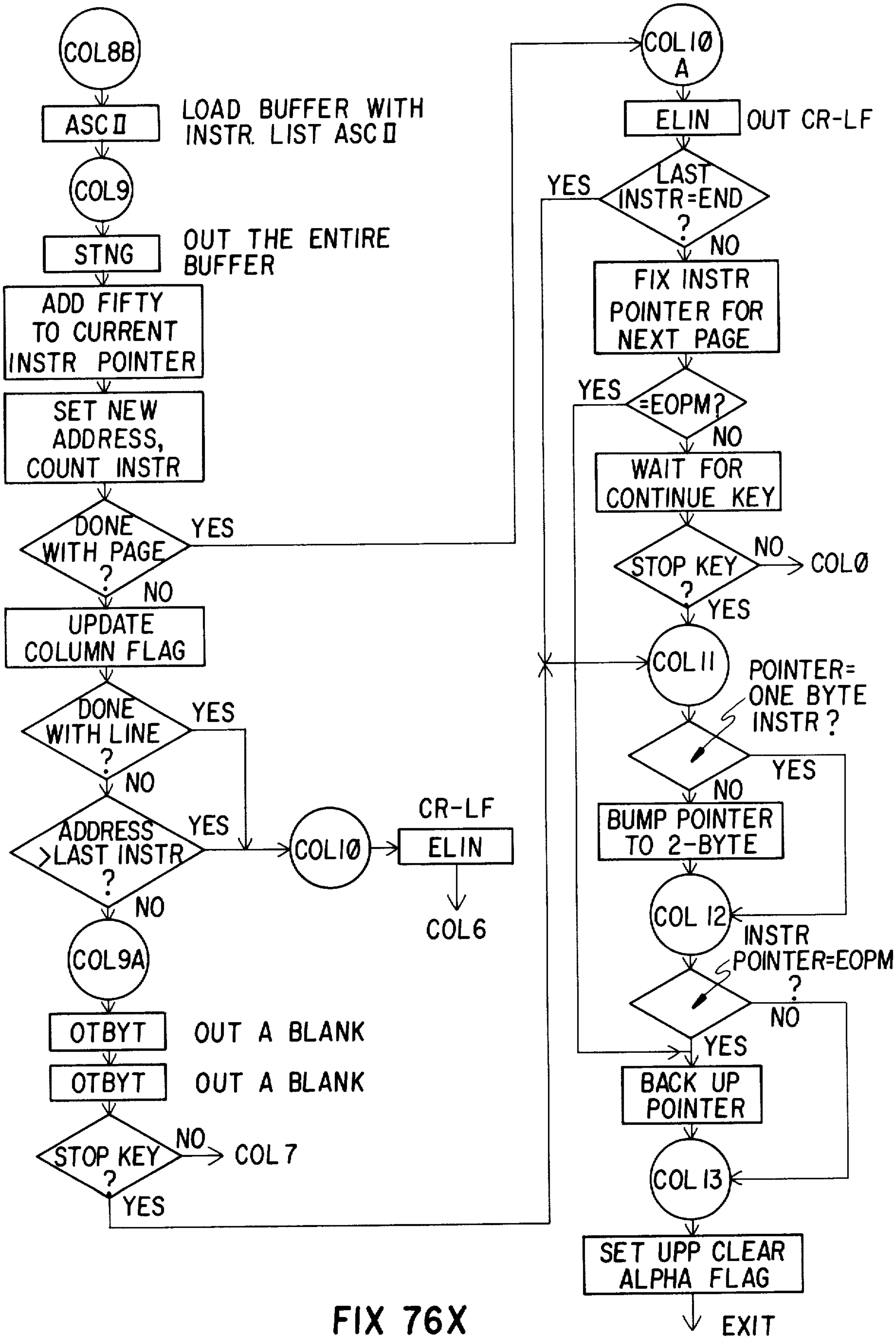
FIX 76X

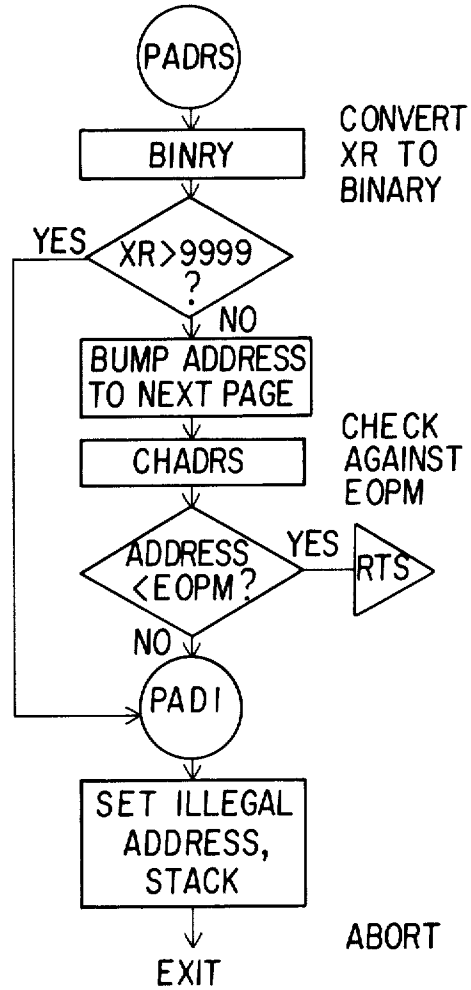
FIG 76Z
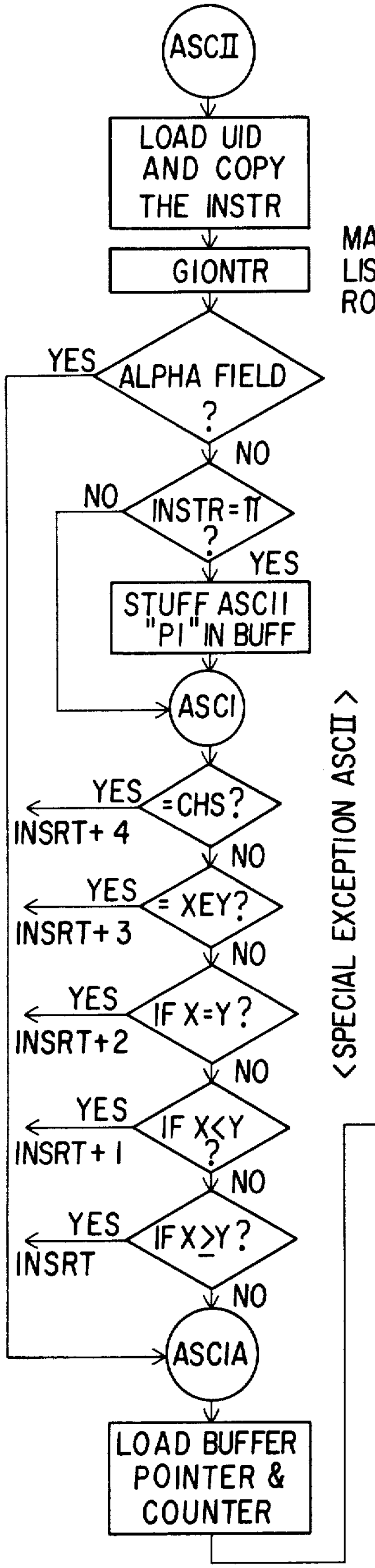
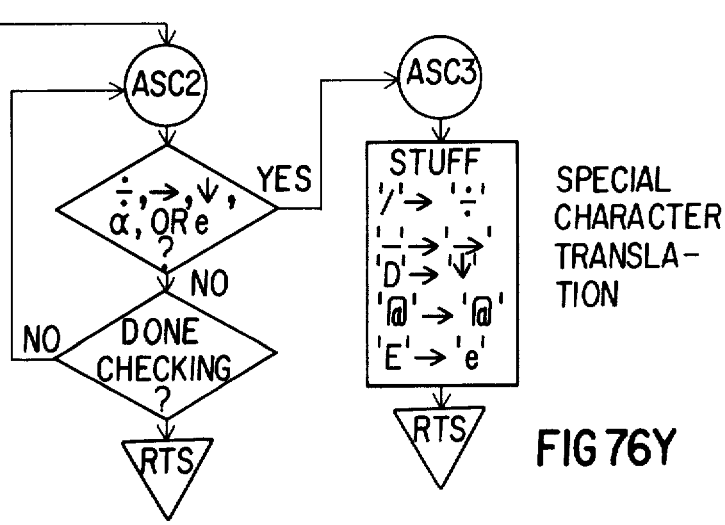
FIG 76Y

PROGRAMMABLE CALCULATOR EMPLOYING A READ-WRITE MEMORY HAVING A MOVABLE BOUNDARY BETWEEN PROGRAM AND DATA STORAGE SECTIONS THEREOF

TABLE OF CONTENTS

Title of Section

Background of the Invention
Summary of the Invention
Description of the Drawings
Description of the Preferred Embodiment
  General Description
  System Clock
  Central Processing Unit
  Read-Only Memory
  Read-Write Memory
  Peripheral Interface Adaptor
  Input Buffer
  Keyboard
  Display
  Printer
  Peripheral Input/Output
  Magnetic Tape Cassette Unit
  Power Supplies
  Calculator Firmware
  Detailed Listing of Routines and Subroutines of Instructions
  Calculator Operation
    General Description
    Keyboard Operations
    Printer Control
    Programming
    Tape Operations
    Error Messages
    Plotter Plug-In I/O ROM
    Plug-In General I/O ROM

BACKGROUND OF THE INVENTION

This invention relates generally to calculators and improvements therein and more particularly to programmable calculators that may be controlled both manually from the keyboard input unit and automatically by a stored program loaded into the calculator from the keyboard input unit or an external magnetic record member.

Computational problems may be solved manually, with the aid of a calculator (a dedicated computational keyboard-driven machine that may be either programmable or nonprogrammable) or a general purpose computer. Manual solution of computational problems is often very slow, so slow in many cases as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these calculators is also typically relatively simple in structure, thereby again requiring many keyboard operations to solve more general arithmetic problems.

Many programmable calculators constructed according to the prior art have employed step oriented memories and have handled memory transfer of conditional or unconditional transfer statements through the use of absolute step references. This technique leaves the user with sole responsibility for statement address modification in the event a transfer statement is edited, thus increasing the user's workload, as well as the chances for introduction of errors, during program editing operations. In addition, these prior art calculators rarely include language features useful in performing iterative looping functions encountered in programming complex problems.

These earlier step oriented calculators produced printed program listings that were very difficult to read because information syntactically representing a single statement was generated by several separate key actuations and then listed in a similar fashion with the information associated with each key being listed on a separate line.

Conventional programmable calculators are limited as to the complexity of the problems they are able to solve because of memory capacity limitations. Magnetic tape storage has been employed in some calculators to store program segments and data for use during execution of a program, thereby effectively increasing the size of the calculater read-write memory. These magnetic tape storage systems have been of limited usefulness, however, because of the relatively long access times involved.

Conventional programmable calculators in the low cost range have presented a communication problem for the user in that they typically have not employed output printers with fully formatted alphanumeric printing capabilities. It would be advantageous in calculators of this type to provide a low cost thermal printer, for example, that may be called upon by the user to print a variety of characters and numeric data according to a format designated by the user.

Conventional programmable calculators have been arranged to respond to power turn on by entering a standby mode, after which the user may enter a program from the keyboard or from a magnetic tape cassette, for example, for execution by the calculator. This arrangement is disadvantageous in that it requires of the user a considerable degree of knowledge regarding operation of the calculator. It would be advantageous to provide a programmable calculator that automatically responds to application of operating power by loading a program from an external magnetic record member into the calculator memory and by subsequently automatically initiating execution of that program.

SUMMARY OF THE INVENTION

The principal object of this invention is to provide an improved programmable calculator that has more capability and flexibility than conventional programmable calculators, that is smaller, less expensive, and more efficient in evaluating elementary mathematical functions than are conventional computer systems, and that is much easier for the untrained user to operate than either conventional programmable calculators or computer systems.

Another object of this invention is to provide a programmable calculator that employs a magnetic tape cassette unit for storing a program and in which the user may select an auto start mode of operation for automatically initializing the calculator, loading into calculator memory a program from the magnetic tape cassette unit, and executing that program, all in response to application of operating power by the user.

Another object of this invention is to provide a programmable calculator that automatically adjusts addresses designated in absolute branch statements in accordance with any program editing performed by the user.

Another object of this invention is to provide a programmable calculator that may be coupled to an X-Y plotter and in which the user may employ keys on the calculator to move the plotter pen to a desired point for obtaining a readout from the calculator of the coordinates of that point.

Another object of this invention is to provide a programmable calculator in which the user may employ a single general input/output read-only memory to couple a variety of peripheral input/output units to the calculator.

Another object of this invention is to provide a programmable calculator in which syntax and execution errors are directly communicated to the user, thereby eliminating the need for an error look up table.

Another object of this invention is to provide a programmable calculator employing a user read-write memory having a movable boundary between a program storage section thereof and a data storage section thereof and in which the location of that boundary may be defined by the user.

Another object of this invention is to provide a programmable calculator employing a user read-write memory including a program storage section and a separate data storage section and in which the user is prevented from writing program information into the data storage section and vice versa.

Another object of this invention is to provide a programmable calculator in which the user may assign one of two meanings to every key of an entire block of keys of a keyboard input unit by actuating a single switch.

Another object of this invention is to provide a programmable calculator including an output printer and in which the user may obtain formatted output from the printer without the use of a format statement.

Another object of this invention is to provide a programmable calculator employing reverse polish notation language in which certain combinations of key actuations are associated with a single internal instruction.

Another object of this invention is to provide a programmable calculator in which the user may designate an absolute step location in memory or a label number to be used by the calculator as a memory destination location in association with a transfer statement.

Another object of this invention is to provide a programmable calculator in which the user may select a normal print mode of operation to enable printing during program entry but to suppress printing during manual execution.

Another object of this invention is to provide a programmable calculator in which the user may call for a bit-by-bit comparison between information transferred between the calculator memory and a magnetic record member.

Another object of this invention is to provide a programmable calculator employing a magnetic tape cassette unit and in which old files on a magnetic tape are automatically erased when new files are being marked.

Another object of this invention is to provide a programmable calculator employing a magnetic tape cassette unit in which the current tape position is stored in memory to enable high speed accessing of tape files.

Another object of this invention is to provide a programmable calculator in which programs stored in a memory unit may be listed on an output printer unit in more than one column to facilitate more efficient use of printer paper.

Another object of this invention is to provide a programmable calculator in which the user may write a program involving plug-in read-only memory commands without a plug-in read-only memory present, may later plug a read-only memory into the calculator, and may then obtain a listing of that program including the previously chosen commands associated with that plug-in read-only memory.

Another object of this invention is to provide a programmable calculator employing a dual track magnetic tape cassette unit and in which the specification of all files on a magnetic tape includes a track designation.

Another object of this invention is to provide a programmable calculator employing a thermal dot matrix output printer and in which dots are selectively printed to reduce the power requirements of the printer.

Another object of this invention is to provide a programmable calculator in which the user is given a continuous indication of the amount of available program storage during a program entering mode of operation.

These objects are accomplished in accordance with the preferred embodiment of this invention by employing a keyboard input unit, a magnetic tape cassette reading and recording unit, a gas discharge output display unit, a 16-character thermal printer unit, a peripheral interface adaptor (PIA), a memory unit, and a central processing unit (CPU) to provide an adaptable programmable calculator having manual operating, automatic operating, program entering, magnetic tape reading, magnetic tape recording, and numeric display and alphanumeric print modes.

The keyboard input unit includes a group of numeric data keys for entering data into the calculator, a group of data manipulation keys, a group of function keys for selecting various mathematical functions and operators, a group of memory control keys for controlling the program and data storage areas of the calculator memory, another group of control keys for controlling the operation of the magnetic tape cassette reading and recording unit, and a group of user-definable keys. Many of these groups of keys are useful in both the manual and programmable operating modes. In addition, each of the keys of the user-definable group assumes a secondary meaning during program entry to automatically provide functions that are unnecessary when executing commands manually from the keyboard.

The magnetic tape cassette reading and recording unit includes a reading and recording head, a drive mechanism for driving a magnetic tape past the reading and recording head, and reading and recording drive circuits coupled to the reading and recording head for bidirectionally transferring information between the magnetic tape and the calculator as determined by keyboard commands or commands which are part of a stored program.

The memory unit includes a modular random-access read-write memory having a dedicated system area and a separate user area for storing program statements and/or data. The user portion of the read-write memory may be expanded without increasing the overall dimensions of the calculator by the addition of a read-write memory module. Additional read-write memory made available to the user is automatically accommodated by the calculator, and the user is automatically informed of the number of available program storage locations and when the storage capacity of the read-write memory has been exceeded.

The memory unit also includes a modular read-only memory in which routines and subroutines of assembly language instructions for performing the various functions of the calculator are stored. The routines and subroutines stored in the read-only memory may be expanded to provide routines required to interface various peripheral input/output units to the calculator and to provide some additional functions oriented toward the specific needs of the user. This is accomplished by simply plugging additional read-only memory modules (ROMs) into either or both of two receptacles provided in the rear panel of the calculator housing. Added read-only memory modules are automatically accommodated by the calculator and are accessed by the calculator through a series of select codes.

Plug-in ROMs include, for example, a plotter ROM, a typewriter control ROM, a general input/output ROM, a binary-coded-decimal input/output ROM, and an ASCII bus interface ROM. Additional read-only memory modules may be added to a printed circuit board inside the calculator to allow printing characters of foreign languages on both the 16-character thermal printer unit and on an output typewriter that has the desired foreign language character set.

The gas discharge output display unit features 16-character seven segment numeric output with a minus sign, a decimal point, and the capability of displaying commas in selected locations within displayed data.

The 16-character thermal printer unit can print out messages to the user such as error conditions, listings of the user's program and any other message selected by the user that may be formed from the character set available in the calculator. Some alphanumeric data formatting can also be accomplished in the printed output of a single line of information.

The peripheral interface adaptor (PIA) may comprise, for example, a Motorola MC6820 PIA. The PIA operates in conjunction with the central processing unit of the calculator and is capable of dual 8-bit parallel input/output with associated flag, control, handshake, and interrupt hardware that enables the calculator central processing unit to communicate with the above-mentioned internal input/output units that include the keyboard, printer, display, and magnetic tape cassette units. The PIA also has the capability of enabling the calculator to communicate with a plurality of external or peripheral input/output units such as paper tape readers and punches, X-Y plotters, typewriters, and various types of measurement and data gathering instrumentation. This external input/output capability is available to the user through either or both of two input/output connectors located on the rear panel of the calculator that connect the external input/output unit to the PIA through some input/output interface circuitry.

The central processing unit (CPU) may comprise, for example, a Motorola MC6800 8-bit parallel processor with a 1-megahertz clock rate and 65K addressability. This processor includes two 8-bit accumulators, a 16-bit index register, a 16-bit stack pointer, and a 6-bit condition code register.

In the run mode of operation, the calculator is controlled by keycodes received sequentially from the keyboard input unit resulting from key actuations by the user. These keycodes are examined within the calculator immediately upon receipt from the keyboard input unit and are checked for proper syntactical meaning as required by the calculator language. An internal instruction code is generated by the calculator from these keycodes to represent the keyboard instruction desired by the user. This instruction code is then used as a pointer to the address of the routine stored in the read-only memory that is responsible for the execution of the selected instruction.

In the program mode of operation the internal instruction codes generated by the calculator during program entry are stored in the program storage area of the user read-write memory at an address specified by the current value of a user program pointer. These stored instructions constitute a program that may be automatically executed upon request by the user. During program entry, the output printer may be commanded, by means of a keyboad switch, to provide a printed listing of the keyboard commands selected by the user together with the corresponding program address at which the associated internal instruction code is stored. Since several key actuations may result in generation by the calculator of a single internal instruction code and since the calculator executes only these internal instruction codes, a complex stored program can be executed by the calculator very efficiently and in a short period of time.

An autostart mode of operation may be switchably selected by the user to automatically enter into the calculator and execute a program stored on a magnetic tape. This feature allows the use of the calculator by persons unfamiliar with the details of its operation and provides a means for restoring the calculator to working condition in the event a power failure occurs at a time when the calculator is unattended by the user or is attended by an unskilled user.

DESCRIPTION OF THE DRAWINGS

FIG. 7 is a simplified block diagram showing the typical format of I/O ROMs 1 and 2 of FIG. 5.

FIG. 10 is a detailed memory map of the user read-write memory of FIGS. 4, 5, and 8.

FIGS. 66A–G are a flow chart of the printer driver routine stored in ROM 3 of FIG. 6.

DESCRIPTION OF THE PREFERRED EMBODIMENT

GENERAL DESCRIPTION

Figure 1:
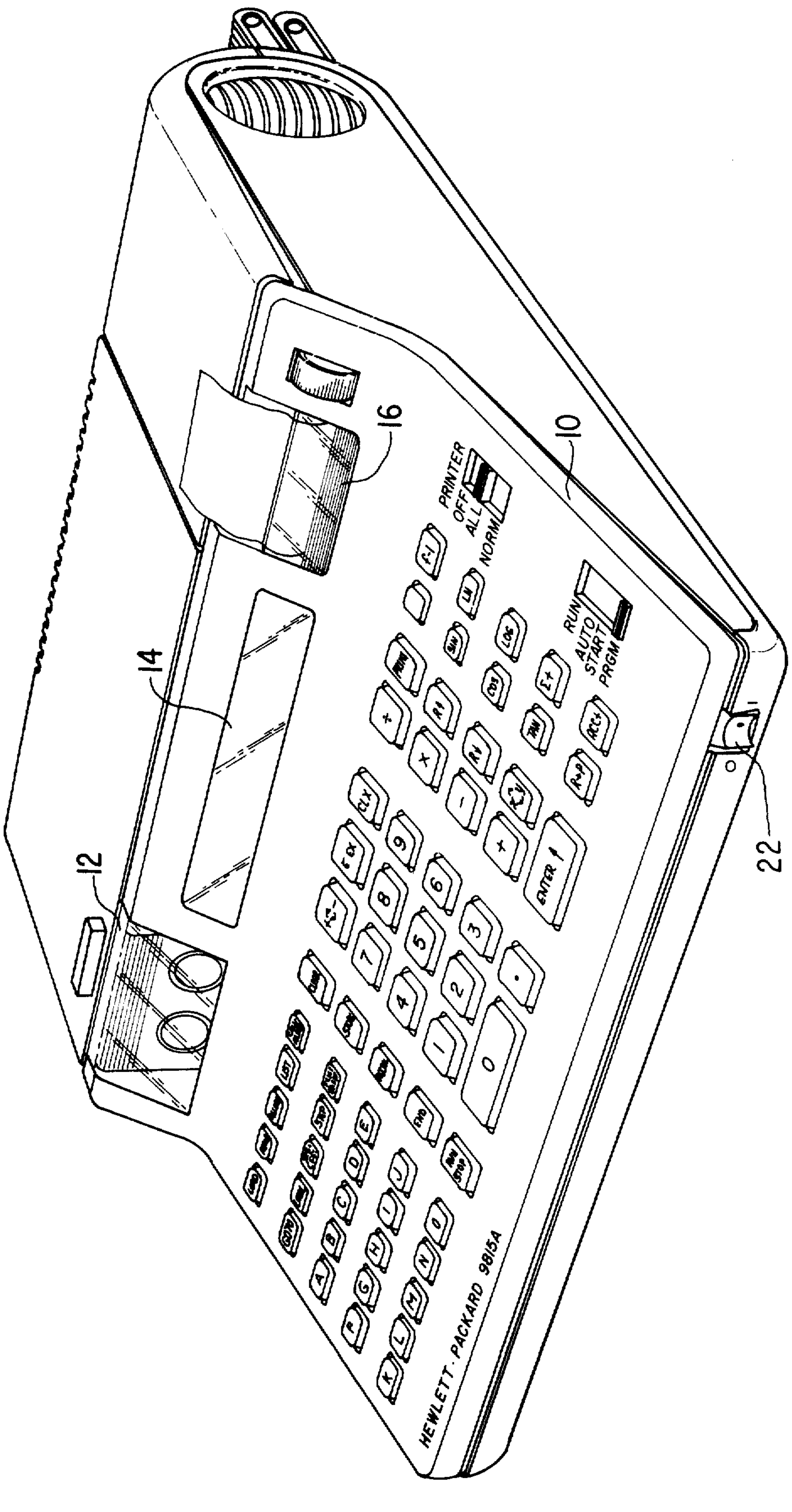
FIG. 1 is a front perspective view of a programmable calculator according to the preferred embodiment of this invention.

Referring to FIG. 1, there is shown a programmable calculator including both a keyboard 10 for entering information into the calculator and for controlling the operation of the calculator and a magnetic tape cassette reading and recording unit 12 for recording information stored within the calculator onto one or more external tape cartridges and for loading information stored on these magnetic tape cartridges back into the calculator. The calculator also includes a seven-segment gas discharge display for displaying data entered into the calculator, the results of computations, and selected alphanumeric messages. The calculator further includes a 16-column alphanumeric thermal printer 16 for printing computation results, program listings, messages generated by the calculator system and the user, and error conditions encountered during use of the calculator. All of these input/output (I/O) units are included within the calculator itself.

Figure 2:
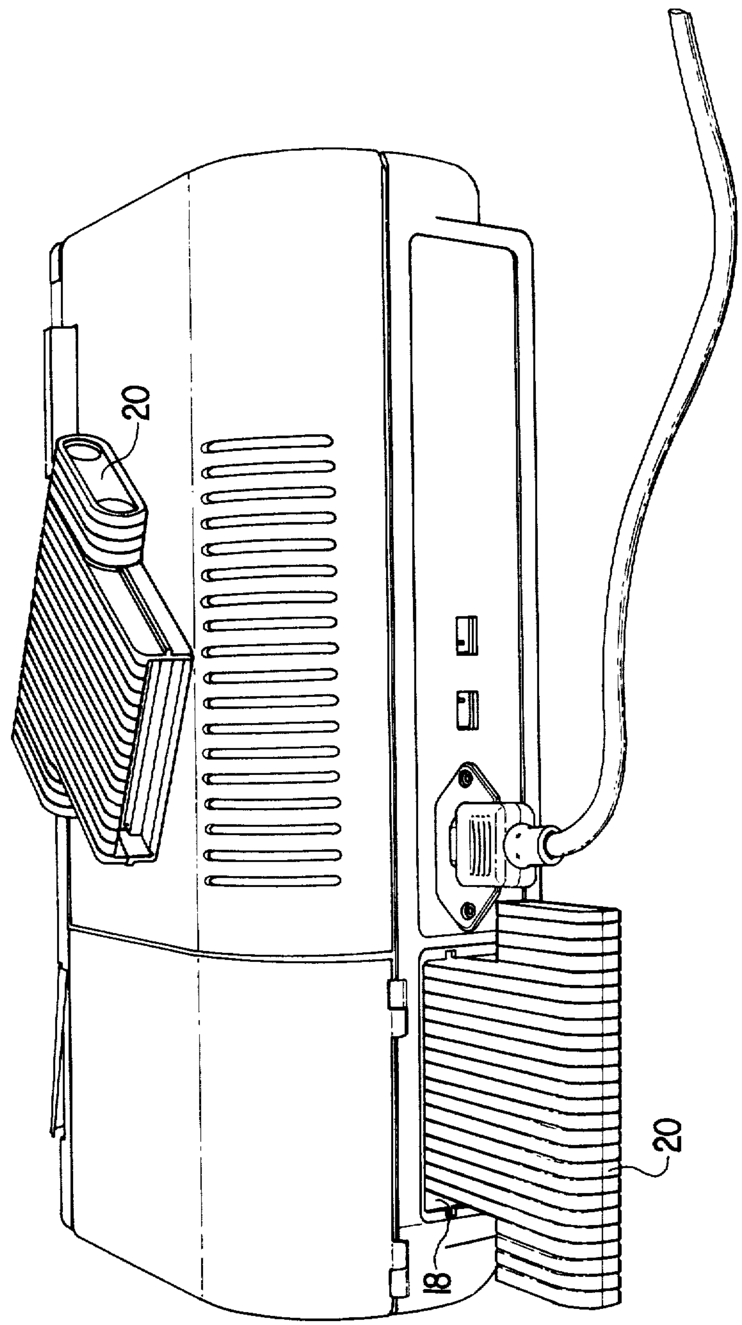
FIG. 2 i a rear perspective view of the programmable calculator of FIG. 1.

As shown in FIG. 2, the calculator includes two input/output (I/O) receptacles 18 for accepting I/O interface connectors 20 each of which includes a read-only memory (ROM) module. These interface connectors serve to couple the calculator to various selected peripheral I/O units such as X-Y plotters, typewriters, photoreaders, paper tape punches, digitizers, BCD-compatible data gathering instruments such as digital voltmeters, frequency synthesizers, and network analyzers, and a universal interface bus for interfacing to most bus-compatible instrumentation.

Figure 4A:
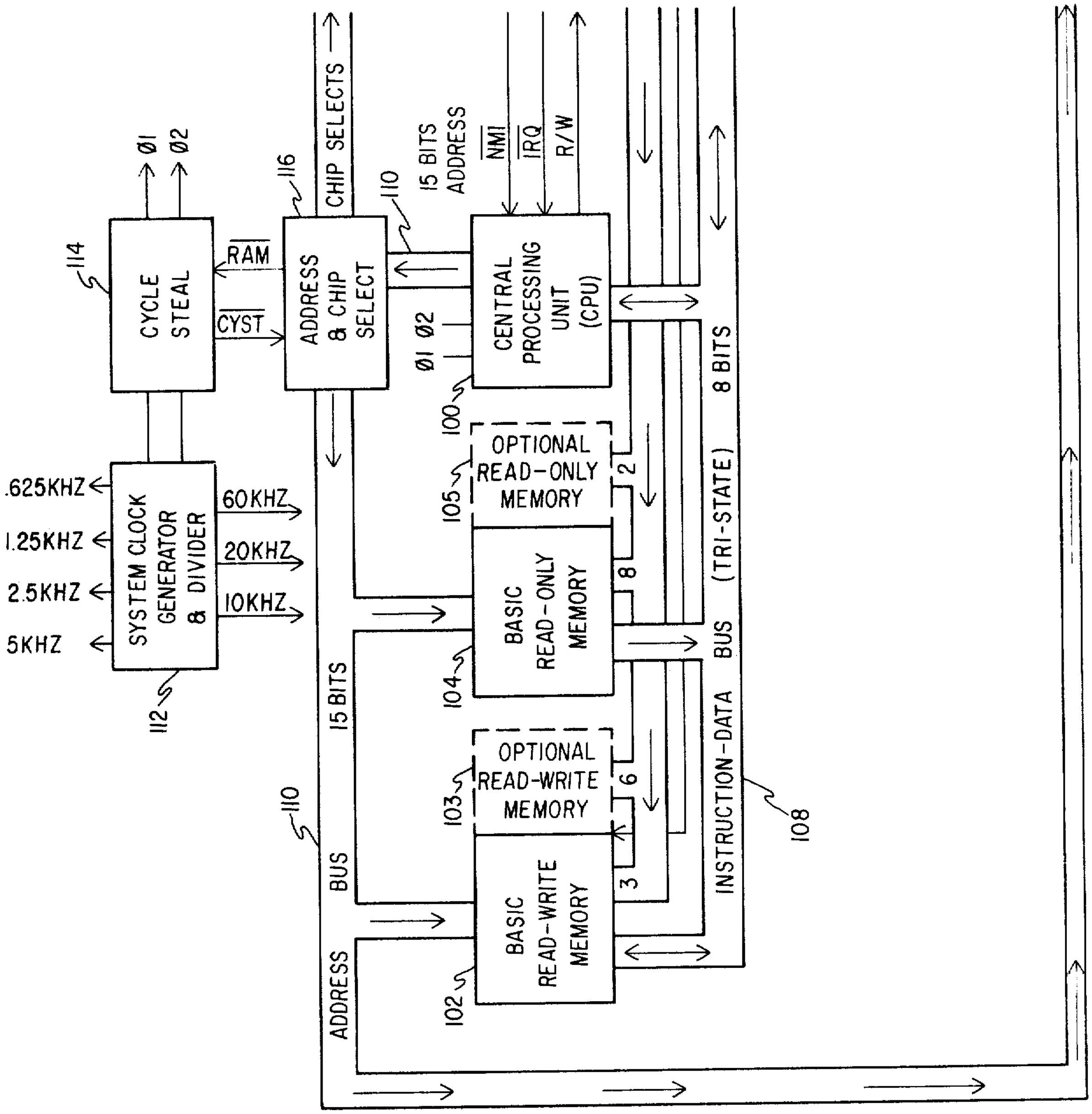
FIG. 4 is a simplified block diagram of the hardware associated with the calculator of FIG. 1.
Figure 4B:
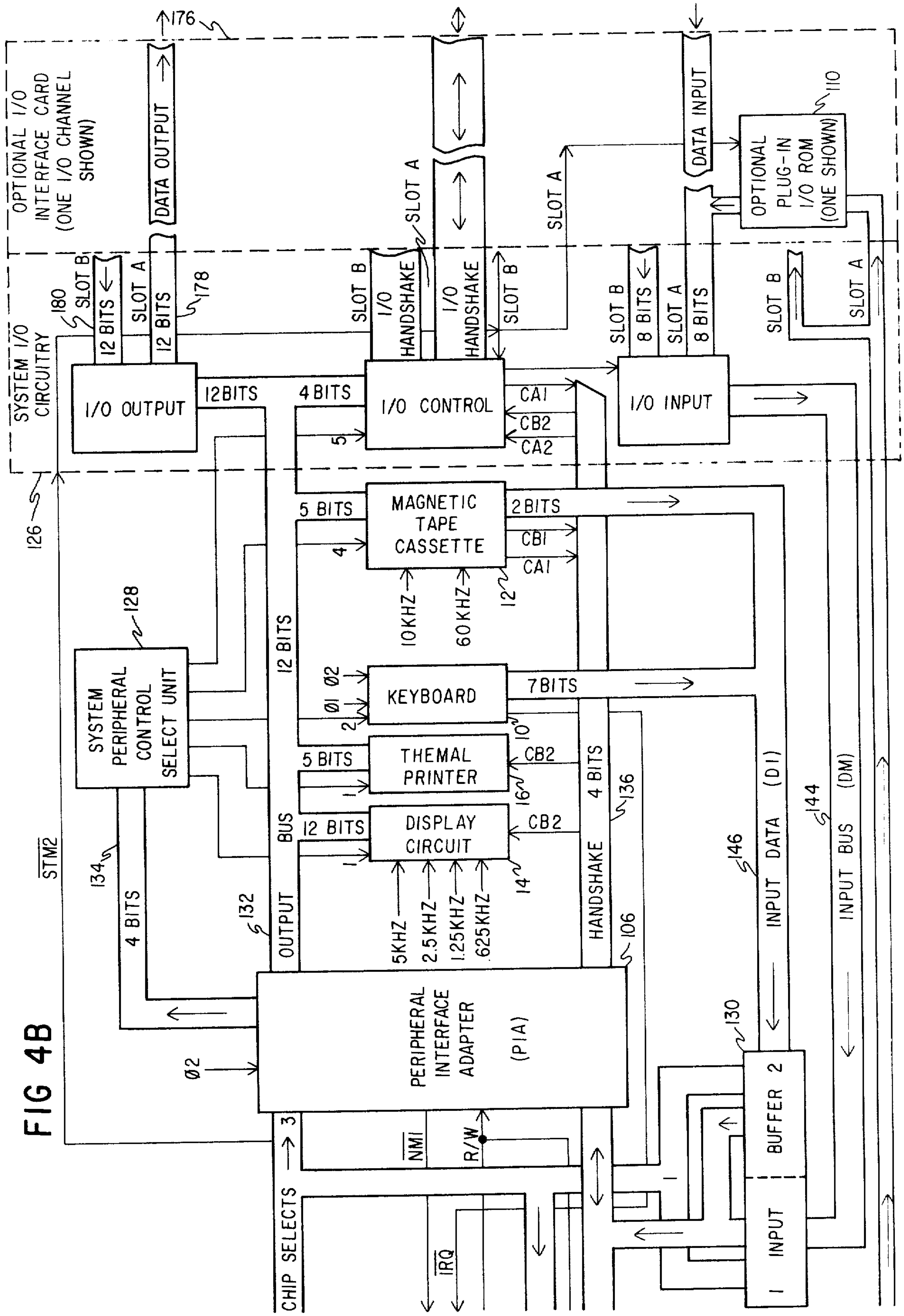

The overall operation of the calculator hardware may be understood with reference to the block diagram of FIG. 4. The hardware includes a central processing unit (CPU) 100, basic read-write memory 102, optional read-write memory 103, basic read-only memory 104, optional read-only memory 105, and optional plug-in I/O ROM 110. Support hardware for CPU 100 and the above-listed memories includes a clock generator and divider 112, cycle steal circuitry 114, and address and chip select circuitry 116. Also included are a display circuit 118, a thermal printer 120, a keyboard 122, a magnetic tape cassette unit 124, system I/O circuitry 126, a peripheral interface adaptor (PIA) 106, a system peripheral control select unit 128, and input buffer circuitry 130.

CPU 100 may comprise, for example, a Motorola MC6800 microprocessor. The CPU interfaces with basic read-write memory 102, optional read-write memory 103, basic read-only memory 104, optional read-only memory 105, and PIA 106 via an 8-bit bidirectional tri-state instruction-data bus 108. CPU 100 is capable of directly addressing 64K of memory via a 16-bit address bus. However, since the calculator employs only 32K of addressable memory, a 15-bit address bus 110 is provided. A first interrupt port $\overline{IRQ}$ on CPU 100 is used by the keyboard 122, and a second interrupt port $\overline{NMI}$ is employed by the magnetic tape cassette unit 124 via the PIA 106. Two clock phases and instruction-data synchronization on bus 108 are required by CPU 100 for dynamic operation.

The basic ROM 104 and optional ROM 105 comprise the firmware necessary for providing data and instructions to CPU 100. These ROMs are 16,384 bits deep, organized 2048 × 8. The coincidence of two signals is necessary to initiate a ROM access. First, the address bus 110 is decoded to provide a ROM chip select signal, and then a start memory signal synchronized with a phased clock signal $\Phi_2$ is provided to synchronize a group of tri-state buffers inside the ROMs to allow accessed information to be gated onto the instruction-data bus 108. One or two optional plug-in I/O ROMs 110 may be plugged into the calculator to provide additional firmware for driving peripheral I/O units. These plug-in I/O ROMs are accessed by the calculator through a buffered input port that also multiplexes data from peripheral I/O units onto the instruction-data bus 108.

The basic read-write memory 102 and optional read-write memory 103 comprise static NMOS random access memories (RAMs) organized 256 ×4. The basic calculator read-write memory 102 includes a 256 × 8 base page portion employed by the calculator system and a 512 × 8 user portion available for program and data storage. The base page portion or system read-write memory is employed by the calculator firmware as a scratchpad memory. Optional read-write memory 103 may be added to the calculator to increase the size of the user portion of the basic read-write memory 102 by 1536 program steps.

Data is transferred between the CPU 100 and the various I/O units during CPU read and write cycles at designated memory locations. In order to take advantage of the fastest instruction addressing mode of CPU 100, four locations within the base page portion of basic read-write memory 102 are used to transfer data to and from PIA 106. Two other locations on the base page are employed to input data via input buffer 130 from the various internal and peripheral I/O units to the CPU instruction-data bus 108. PIA 106 outputs twelve bits of data on a bus 132 and four control bits on a bus 134. The PIA also provides four handshake lines on a bus 136 over which a system handshake between the CPU 100 and the various I/O units is accomplished.

Figure 13:
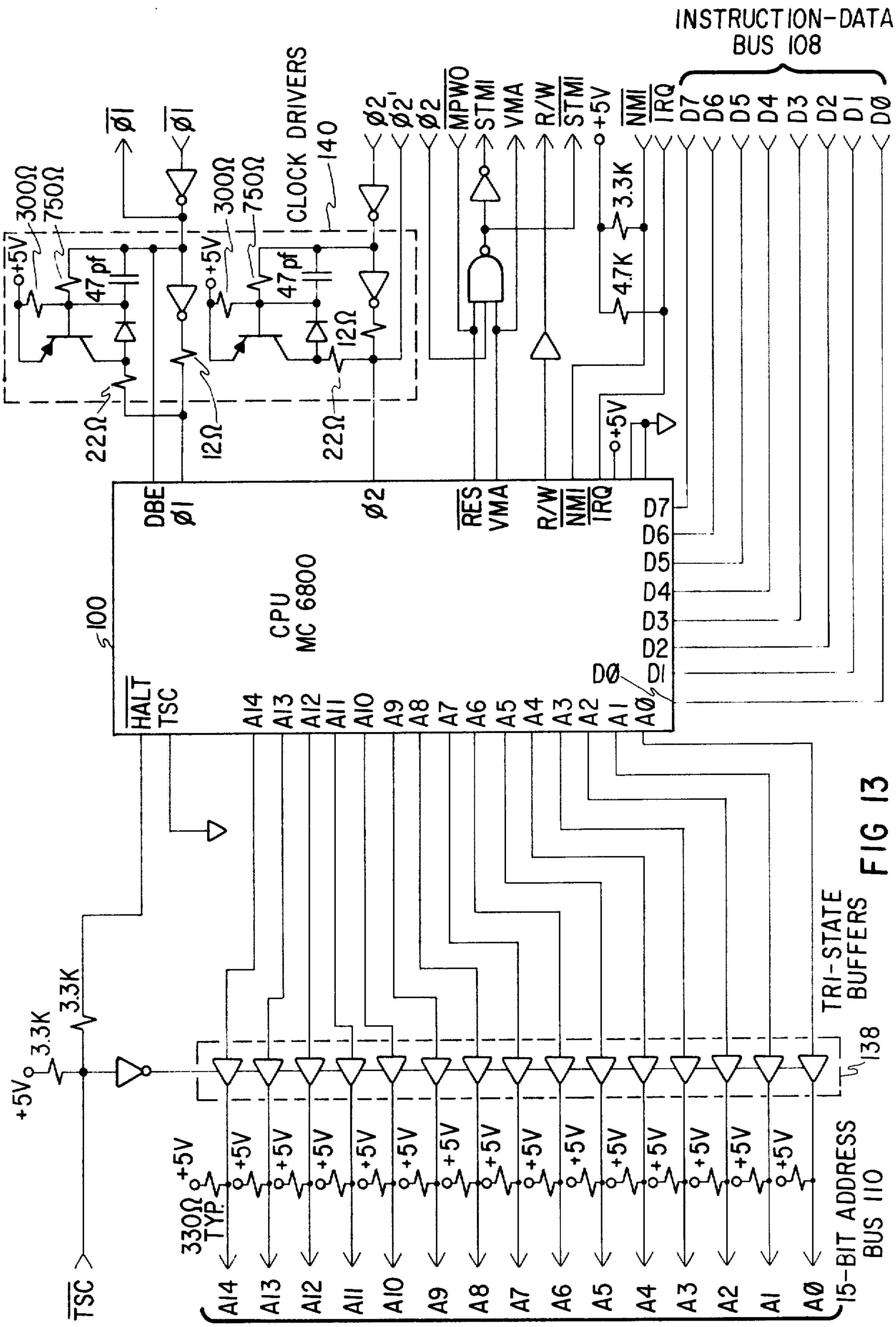
FIG. 13 is a detailed schematic diagram of the central processing unit (CPU) of FIG. 4.

Various signals referenced in the following detailed descriptions of the individual hardware blocks of FIG. 4 may be understood by examination of the corresponding Boolean logic definitions set forth in Table 1 below.

required by CPU 100. A start memory signal, $\overline{STM1}$, is generated as shown in FIG. 13 using one of the phased clock signals $\Phi_2$, a signal VMA from CPU 100, and a system reset/restart (master power on) line $\overline{MPWO}$. For test purposes, a $\overline{HALT}$ line provided by CPU 100 along with signals associated with the tri-state buffers 138 are made available as a line $\overline{TSC}$. The interrupt lines $\overline{NMI}$ and $\overline{IRQ}$ available at CPU 100 are provided with external pull up resistors for improved noise immunity.

Table 1

| LINE | | BOOLEAN EQUIVALENT EXPRESSION | |
|---|---|---|---|
| RPIA | = | $\overline{A14} \cdot \overline{A13} \cdot \overline{A12} \cdot \overline{A11}$ | |
| RRAM | = | $\overline{A14} \cdot \overline{A13} \cdot \overline{A12} \cdot A11$ | |
| ADHL | = | $RPIA \cdot \overline{A10} \cdot \overline{A9} \cdot \overline{A8}$ | |
| $\overline{PIA}$ | = | $ADHL \cdot \overline{A7} \cdot \overline{A6} \cdot \overline{A5} \cdot \overline{A4} \cdot \overline{A3} \cdot \overline{A2}$ | |
| $\overline{IND}$ | = | $ADHL \cdot \overline{A7} \cdot \overline{A6} \cdot \overline{A5} \cdot \overline{A4} \cdot \overline{A3} \cdot A2 \cdot \overline{A1}$ | |
| CSTNOT | = | $\overline{PIA} + \overline{IND}$ | |
| $\overline{STM1}$ | = | $\overline{VMA \cdot \Phi_2 \cdot \overline{MPWO}}$ | |
| $\overline{STM2}$ | = | $\overline{STM1 \cdot \overline{A14} \cdot (A13+A12)}$ | |
| $\overline{R8}$ | = | $\overline{STM1} \cdot RRAM \cdot\cdot \overline{A10} \cdot \overline{A9} \cdot \overline{A8}$ | CLEARED BY $\overline{CYST}$ WRITE + $\Phi_1$ |
| $\overline{R7}$ | = | $\overline{STM1} \cdot RPIA \cdot A10 \cdot A9 \cdot A8$ | " |
| $\overline{R6}$ | = | $\overline{STM1} \cdot RPIA \cdot A10 \cdot A9 \cdot \overline{A8}$ | " |
| $\overline{R5}$ | = | $\overline{STM1} \cdot RPIA \cdot A10 \cdot \overline{A9} \cdot A8$ | " |
| $\overline{R4}$ | = | $\overline{STM1} \cdot RPIA \cdot A10 \cdot \overline{A9} \cdot \overline{A8}$ | " |
| $\overline{R3}$ | = | $\overline{STM1} \cdot RPIA \cdot \overline{A10} \cdot A9 \cdot A8$ | " |
| $\overline{R2}$ | = | $\overline{STM1}$ RPIA $\overline{A10}$ A9 $\overline{A8}$ | " |
| $\overline{R1}$ | = | $\overline{STM1} \cdot RPIA \cdot \overline{A10} \cdot \overline{A9} \cdot A8$ | " |
| $\overline{BPC}$ | = | $\overline{STM1} \cdot RPIA \cdot \overline{A10} \cdot \overline{A9} \cdot \overline{A8}$ | " |
| $\overline{R0}$ | = | $\overline{BPC} \cdot CSTNOT$ | " |
| $\overline{RAM}$ | = | $(\overline{R8} + \overline{STM1} \cdot RPIA) \cdot CSTNOT$ | " |
| $\overline{IN}$ | = | $\overline{IND} \cdot \overline{BPC} + \overline{STM2}$ | " |

SYSTEM CLOCK

Figure 11A:
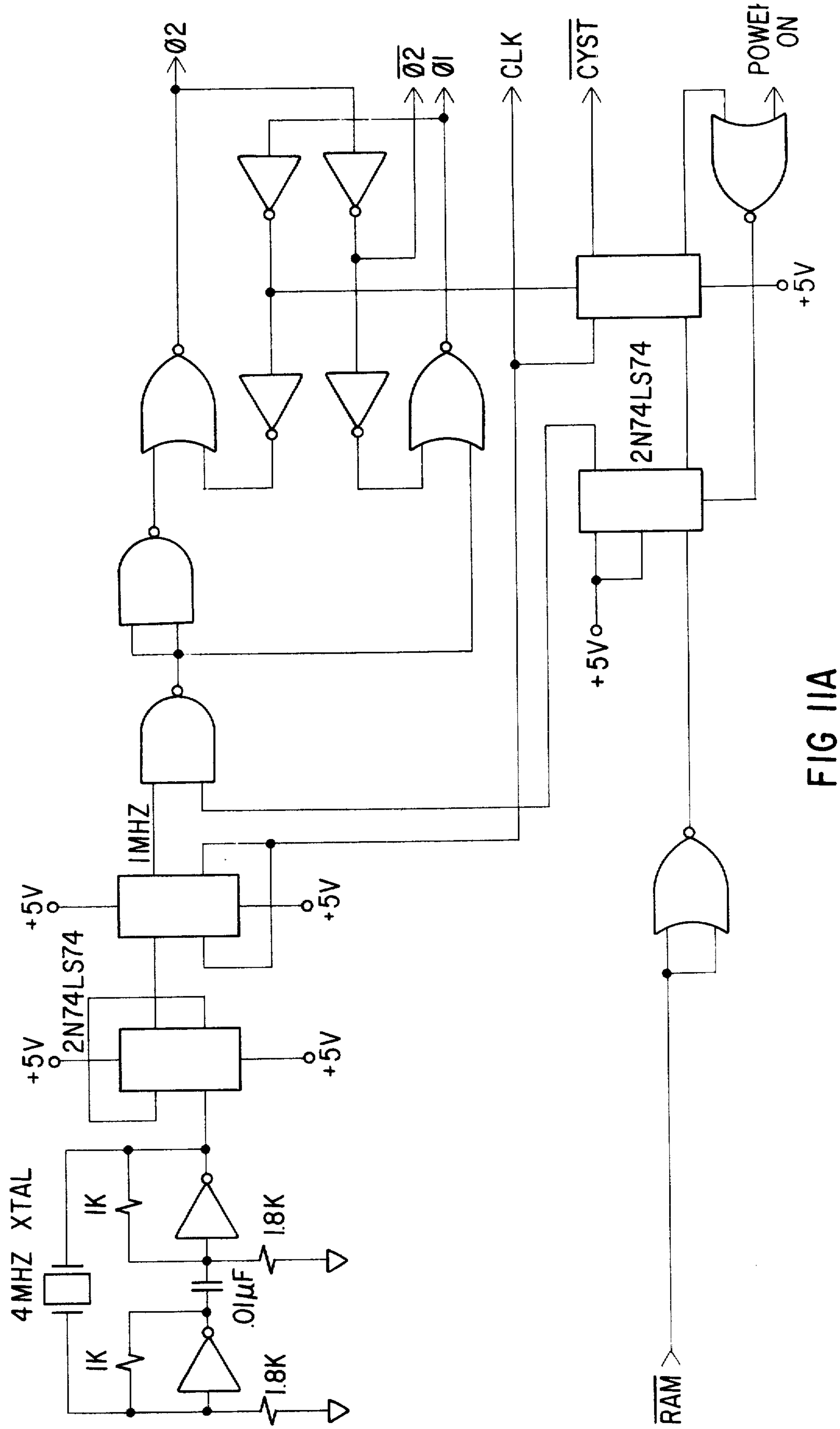
FIGS. 11A–B are a detailed schematic diagram of the system clock generator and divider and cycle steal blocks of FIG. 4.
Figure 11B:
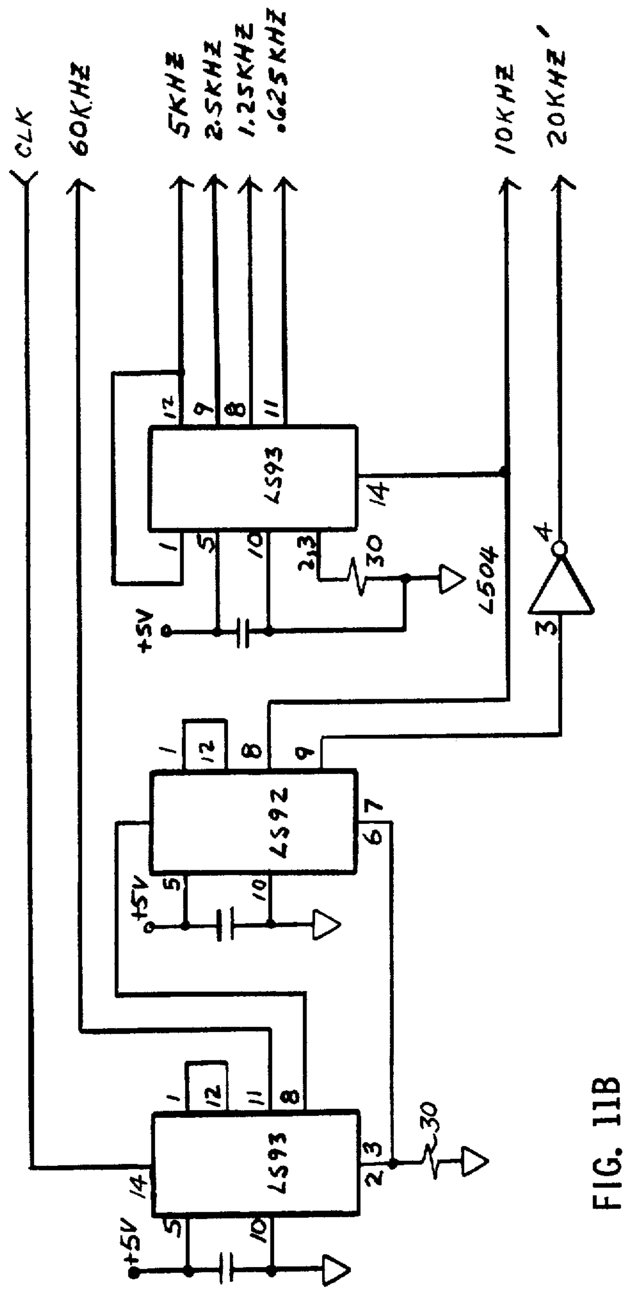

Operation of the system clock generator and divider 112 and cycle steal circuitry 114 of FIG. 4 may be understood with reference to the detailed schematic diagram of these circuits shown in FIGS. 11A–B. The basic clock oscillator shown in FIG. 11A employs positive feedback and is constructed using linearly biased TTL circuitry. A 4-megahertz crystal filters all but the fundamental frequency to generate a 4-megahertz clock signal that is divided by four to produce the 1-megahertz system clock signal. This 1-megahertz system clock signal is then separated into two non-overlapping phases of equal period. These phased clock signals are designated $\Phi_1$ and $\Phi_2$, and their relative timing is illustrated in the waveform diagram of FIG. 12. Also illustrated in FIG. 12 and accomplished by way of the circuitry of FIG. 11A is a cycle steal feature employed during read-write memory access because the memory access time is greater than the 500-nanosecond period of clock signal $\Phi_2$. The 1-megahertz system clock signal is divided as shown in FIG. 11B to provide signals required for clocking and synchronizing the various internal I/O units.

CENTRAL PROCESSING UNIT

Operation of CPU 100 and its associated circuitry shown in FIG. 4 may be understood with reference to the detailed schematic diagram of FIG. 13. The 8-bit instruction-data bus 108 is unbuffered and is connected, as shown in FIG. 4, to read-write memories 102 and 103, read-only memories 104 and 105, PIA 106, and a tri-state input buffer 130. Fifteen of the sixteen available address lines provided by CPU 100 are buffered by a group of tri-state, non-inverting buffers 138 to form the address bus 110 connected as shown in FIG. 4.

The two phased clock signals $\Phi_1$ and $\Phi_2$ are received by a pair of clock drivers 140 that in turn provide clock signals having voltage levels and rise and fall times as A read-write line R/W also available at CPU 100 is buffered and connected to the PIA 106 and basic and optional read-write memories 102 and 103.

READ-ONLY MEMORY

Figure 16:
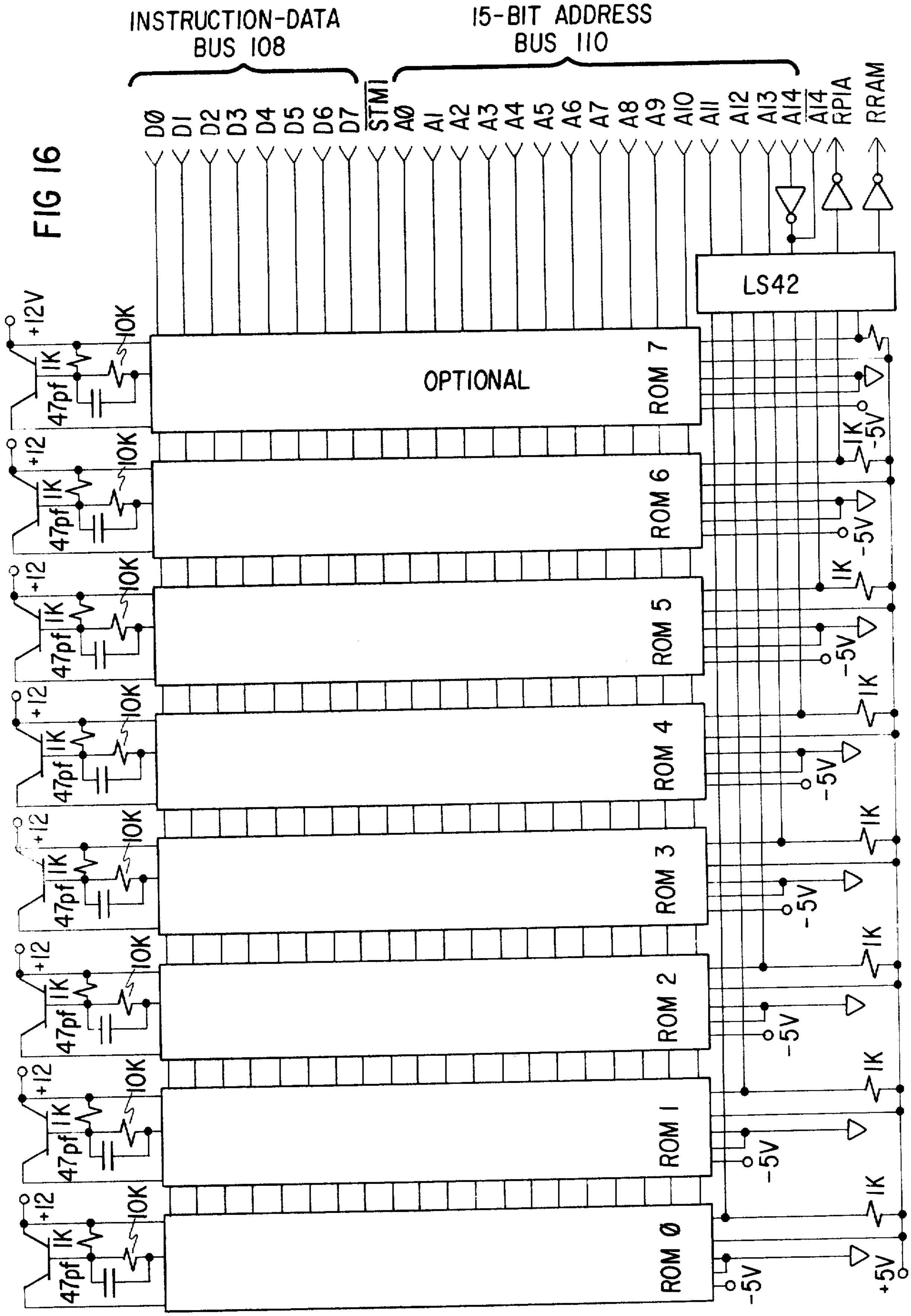
FIG. 16 is a detailed schematic diagram of the basic read-only memory and optional read-only memory of FIG. 4.

Operation of the basic read-only memory 104 and optional read-only memory 105 of FIG. 4 may be understood with reference to the detailed schematic diagram of FIG. 16. ROMs 0–6 comprise basic read-only memory 104 and ROM 7 comprises optional read-only memory 105. ROMs 0–7 are accessed by decoding the address bus 110 to generate a ROM chip select signal. The chip select signal is buffered by the particular ROM accessed and is used to turn on a power pulse transistor that applies +12 volts to that ROM. When one of the ROMs 0-7 has been chip selected and a start memory signal $\overline{STM1}$ occurs, the information stored in the addressed cell is gated onto the instruction-data bus 108. ROMs 0–7, as opposed to other portions of calculator memory, may be selected only when bit A14 of address bus 110 is high.

Figure 17:
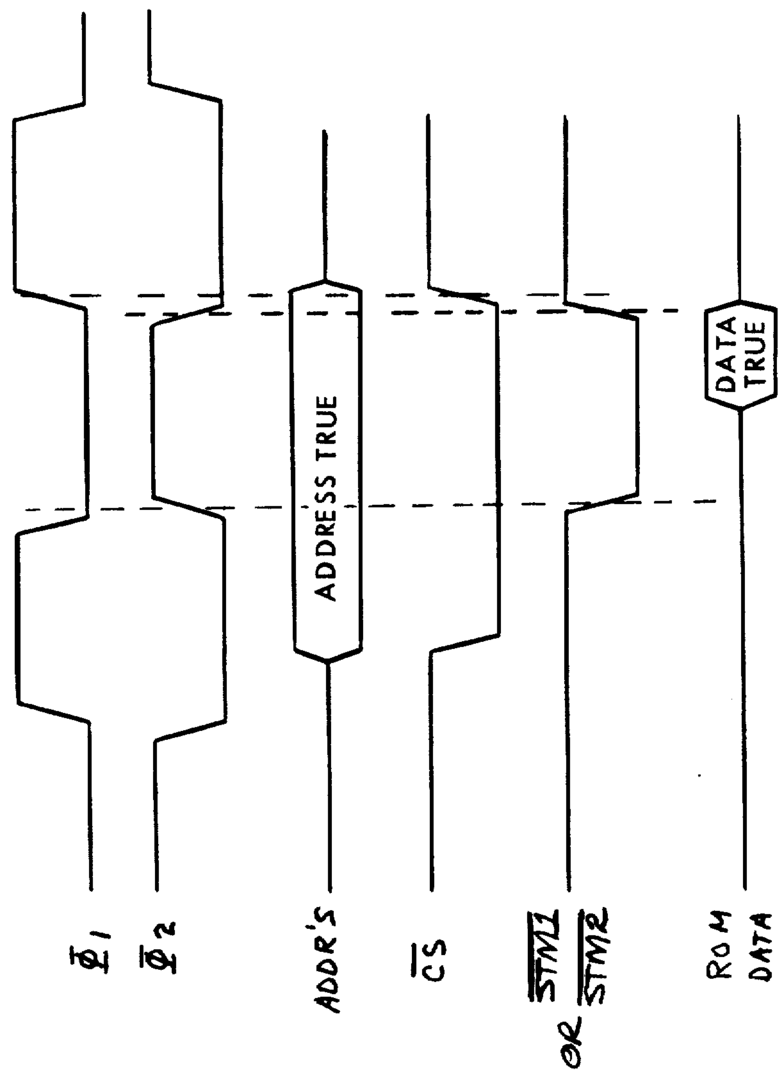
FIG. 17 is a timing diagram illustrating waveforms associated with the basic and optional read-only memories of FIGS. 4 and 16.

The timing relationship of selected signals associated with the various read-only memories employed in the calculator is illustrated in the waveform diagram of FIG. 17.

READ-WRITE MEMORY

Figure 18:
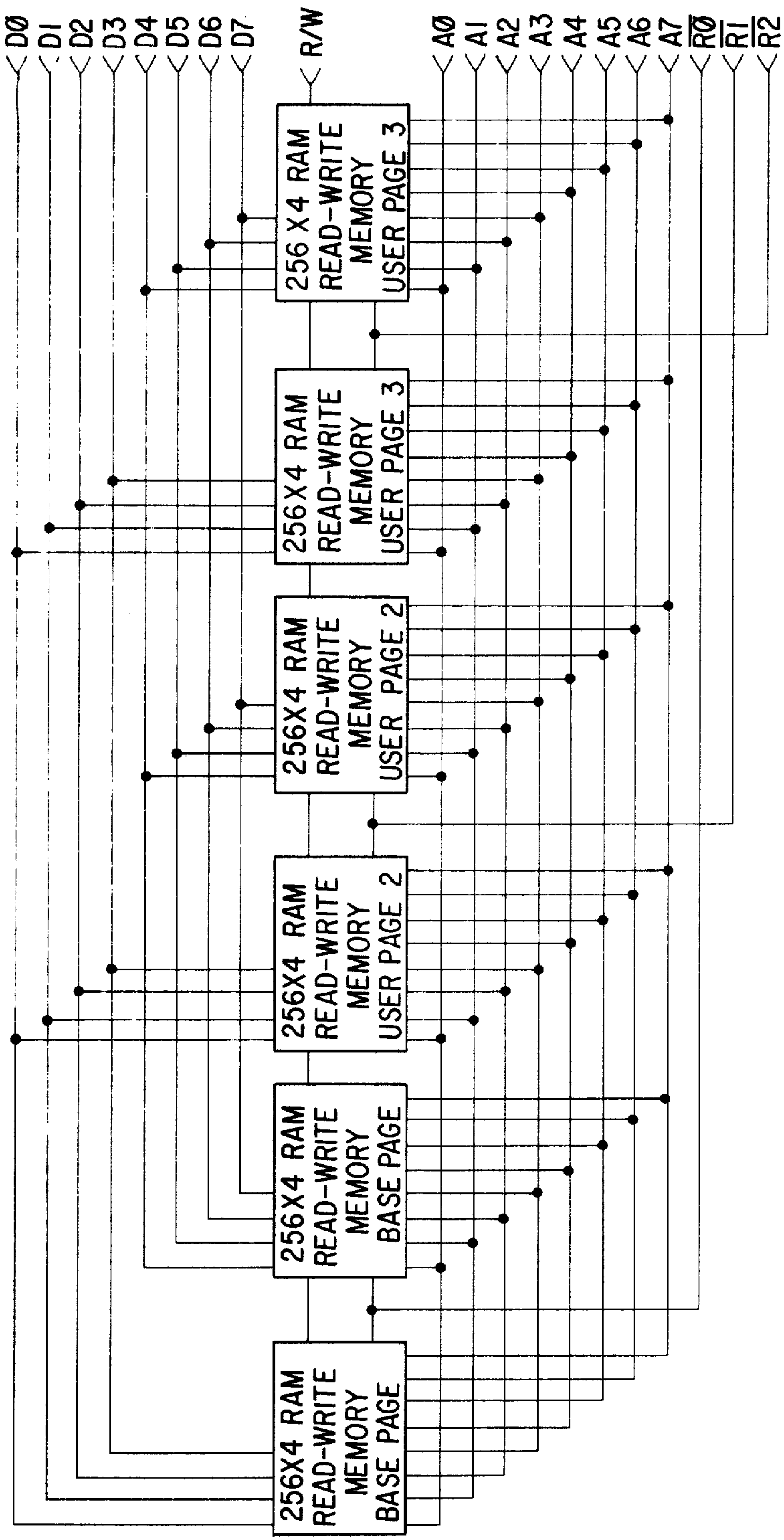
FIG. 18 is a detailed schematic diagram of the basic read-write memory of FIG. 4.
Figure 19:
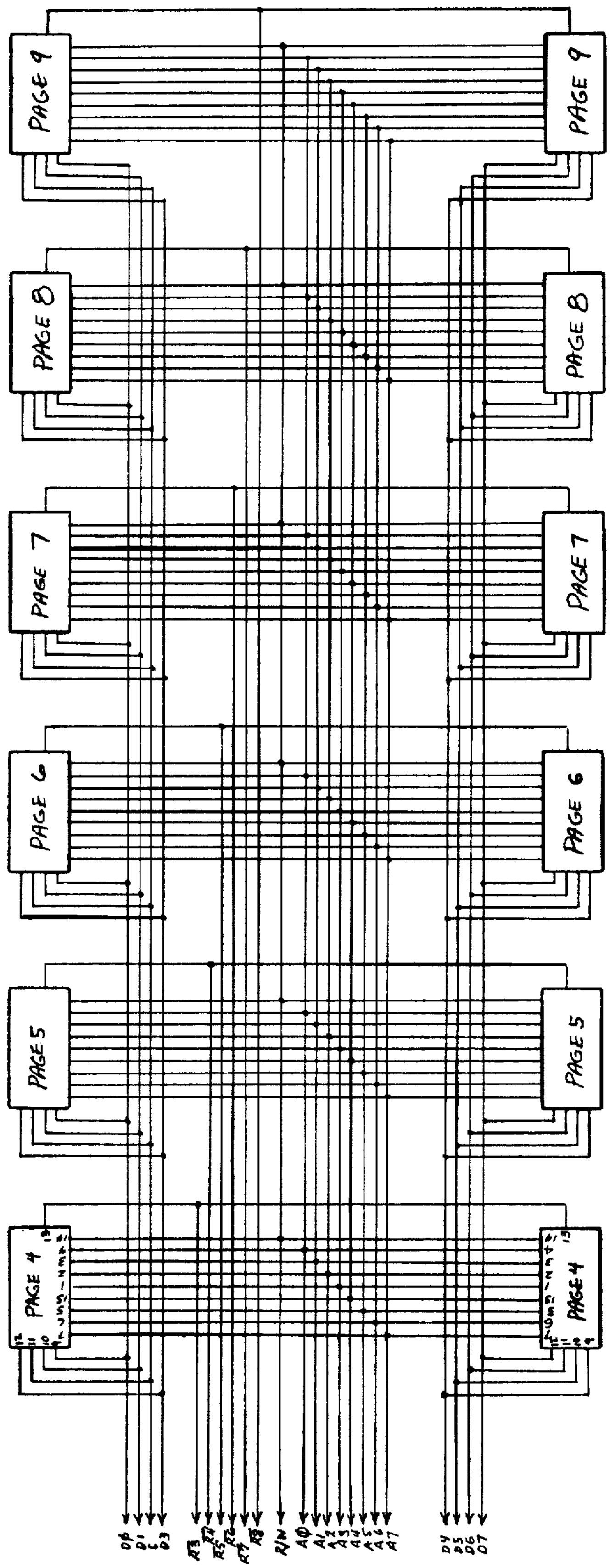
FIG. 19 is a detailed schematic diagram of the optional read-write memory of FIG. 4.

Operation of the basic read-write memory 102 and optional read-write memory 103 of FIG. 4 may be understood with reference to the detailed schematic diagrams of FIGS. 18 and 19. All read-write memory in the calculator comprises static NMOS 256 × 4 RAM chips. Six of these chips are connected as shown in FIG. 18 to form the basic read-write memory 102, and twelve of the chips are connected as shown in FIG. 19 to form the optional read-write memory 103. Basic read-write memory 102 is divided into a 256 × 8 base page or system portion employed as a scratch pad memory and a 512 × 8 user portion. The twelve 256 × 4 RAM chips connected according to FIG. 19 to form optional read-write memory 103 brings the total user read-write memory to 2048 × 8 words. The calculator employs part of the user read-write memory as system storage registers and as an I/O temporary scratch pad.

Figure 12:
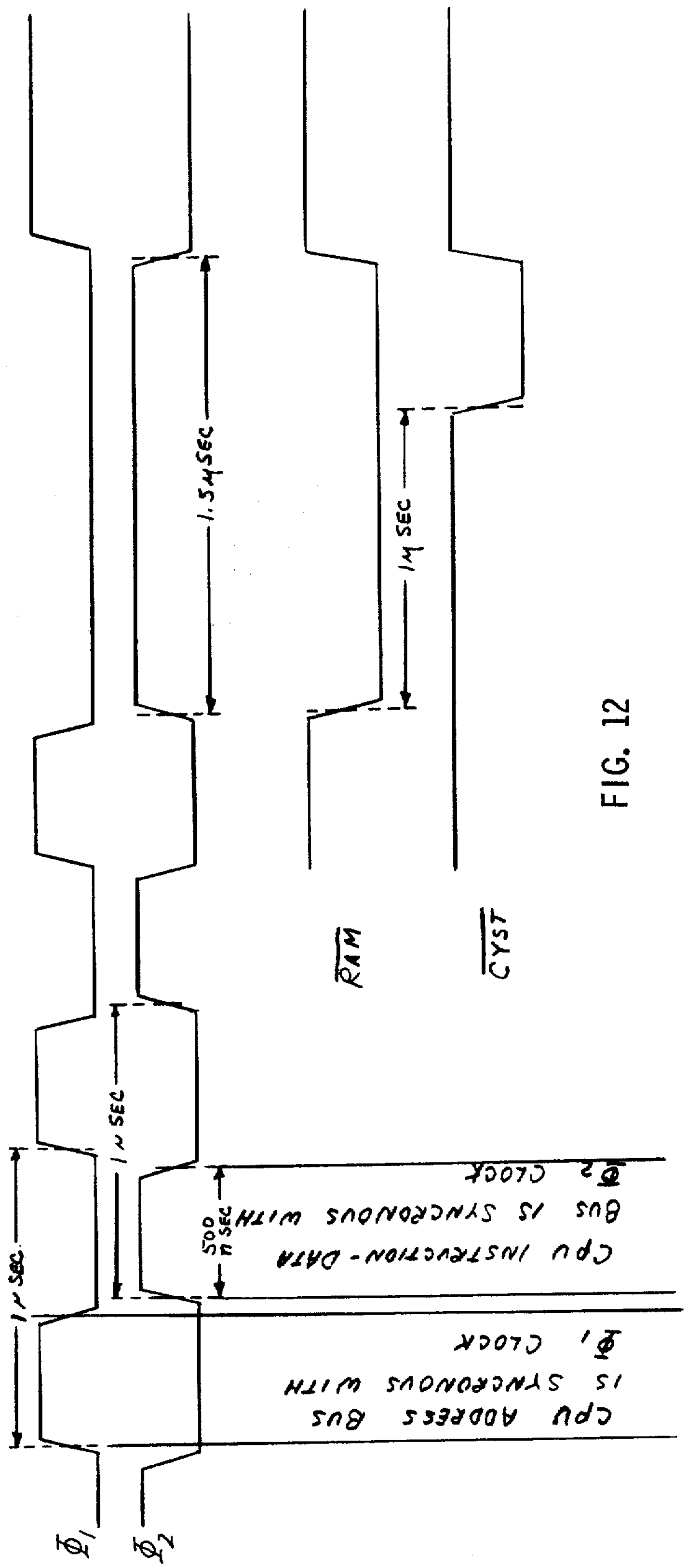
FIG. 12 is a timing diagram illustrating waveforms associated with the system clock generator and divider circuitry of FIGS. 4 and 11A-B.
Figure 14:
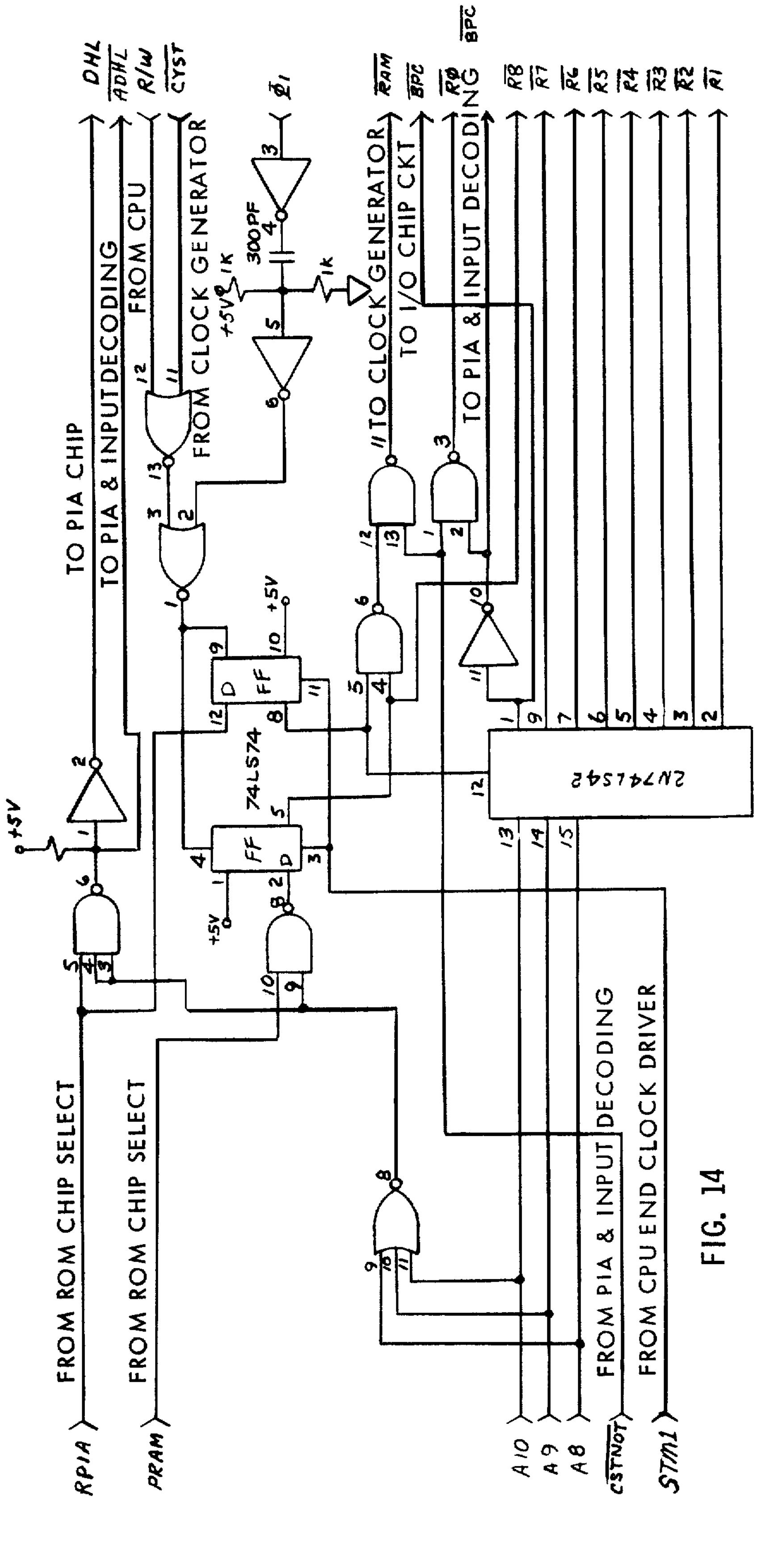
FIG. 14 is a detailed schematic diagram of a portion of the address and chip select block of FIG. 4.

The read-write cycle steal timing is shown in FIG. 12, and the RAM chip select circuitry is shown in FIG. 14. A base page chip select line $\overline{R0}$ is pulled low during access of read-write memory addresses 6–255, inclusive. Line $\overline{R0}$ and a cycle steal initiator line $\overline{RAM}$ are inhibited during a PIA access or an input buffer port access by a line $\overline{CSTNOT}$. A line $\overline{R8}$ is decoded separately from the remaining RAM chip select lines $\overline{R1}$–$\overline{R7}$ because address bit A11 is high during access of the corresponding RAM chip but is low during access of all other RAM chips. As seen in FIG. 14, the status of line $\overline{R8}$ is dependent on a signal RRAM from the ROM chip select circuitry. All RAM chip selects are synchronous with phased clock signal $\Phi_2$ through start memory signal STM1 and all initiate a cycle steal, as shown in FIG. 12, bgy pulling the line $\overline{RAM}$ low.

Figure 15:
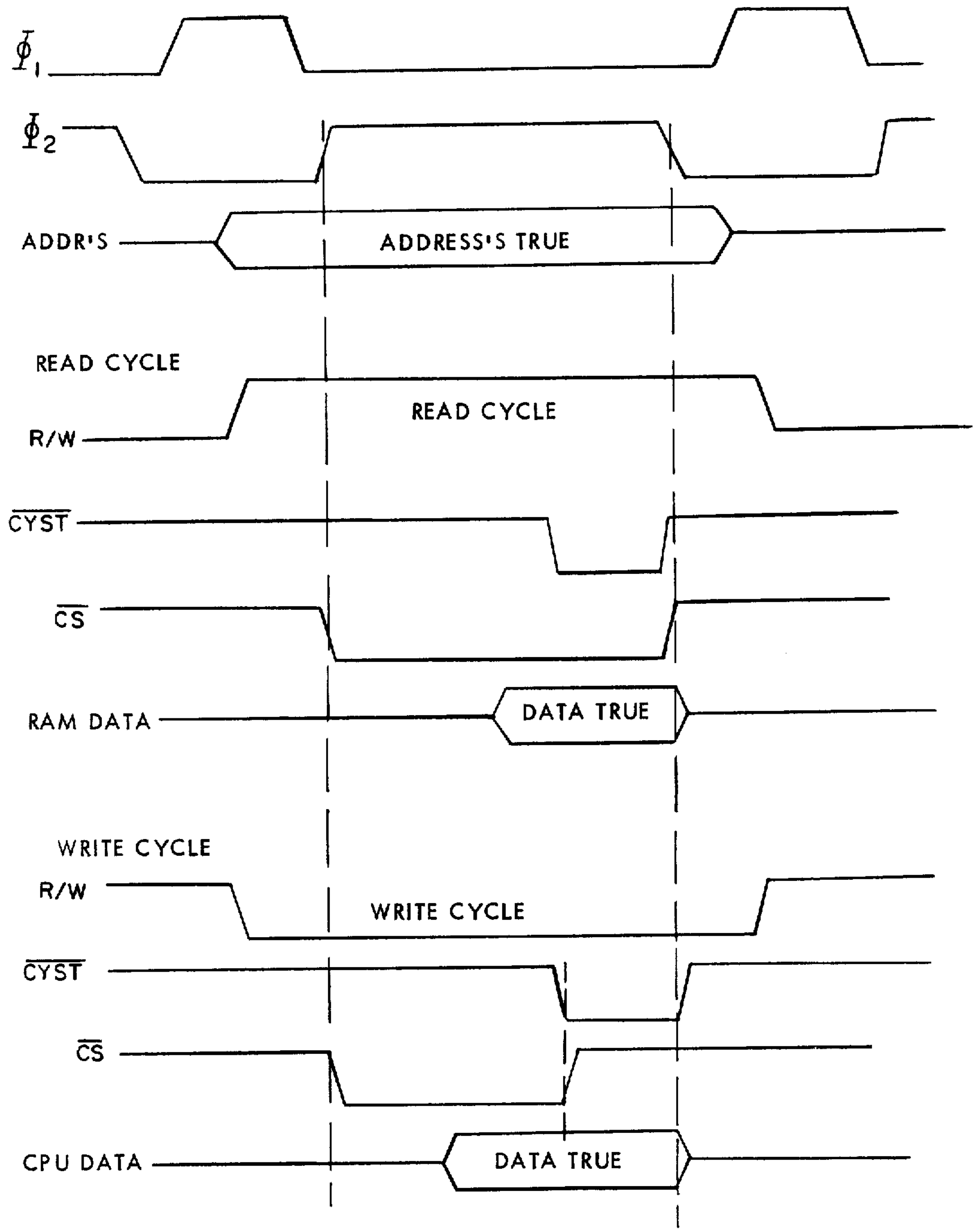
FIG. 15 is a timing diagram illustrating waveforms associated with address and chip select circuitry of FIGS. 4 and 14.

The timing relationship of selected signals associated with RAM chip select cycles is illustrated in the waveform diagram of FIG. 15. During a write cycle, a chip select signal $\overline{CS}$ is removed 500 nanoseconds before the falling edge of phased clock signal $\Phi_2$ to insure data hold time for the RAM chips.

Referring again to FIG. 14, a line ADHL, synchronous with the address bus 110, is employed as a chip select line to the PIA 106. Like line R8, line ADHL is also dependent on line A11 of address bus 110. Decoding of line ADHL and a line BPC differs only in that BPC is synchronous with phased clock signal $\Phi_2$ while ADHL is dependent only on the state of the address bus 110, as shown in Table 1 above.

PERIPHERAL INTERFACE ADAPTOR

Figure 20:
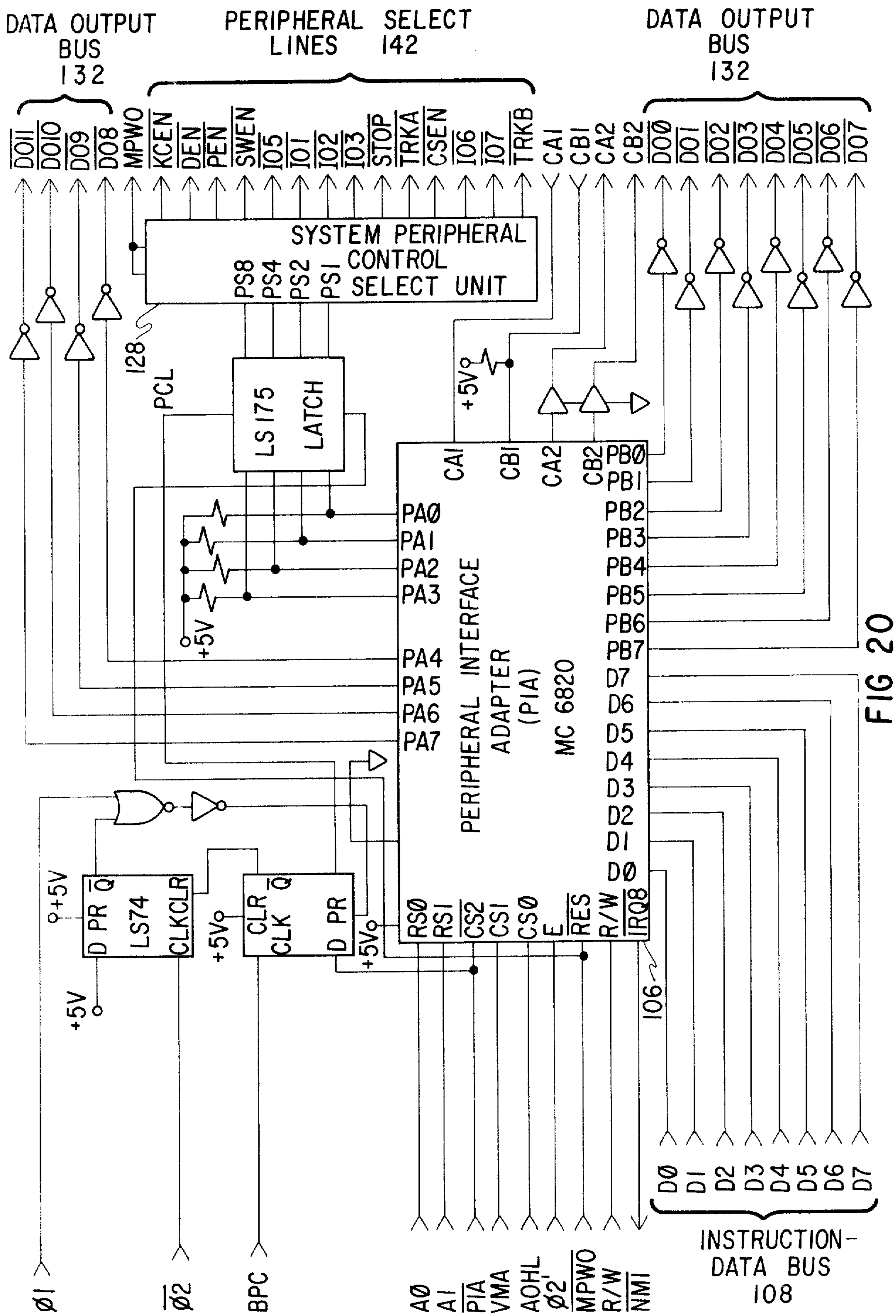
FIG. 20 is a detailed schematic diagram of the peripheral interface adaptor (PIA) and system peripheral control select unit of FIG. 4 together with some associated buffer and timing circuitry.

Operation of peripheral interface adaptor (PIA) 106 of FIG. 4 may be understood with reference to the detailed schematic diagram of FIG. 20. PIA 106 may comprise, for example, a Motorola MC6820 peripheral interface adaptor and is employed to output I/O control information and data and to handshake with the various internal I/O units as well as any peripheral I/O units that may be connected to the calculator. Although the two 8-bit peripheral data buses internal to PIA 106 are bidirectional, the only input to CPU 100 during a PIA read cycle is handshake information stored in the control registers of PIA 106. When the calculator is turned on, PIA 106 is reset by the master power on line $\overline{MPWO}$. The calculator firmware programs the peripheral data buses PA0–PA7 and PB0–PB7 as outputs, and all subsequent PIA read or write cycles to addresses 0-3 of the base page portion of basic read-write memory 102 are made to the A data, A control, B data, and B control registers, respectively, of PIA 106.

All eight bits of the B data register and the four most significant bits of the A data register form a 12-bit peripheral data output bus 132 comprising lines DO0–DO11. The four least significant bits of the A data register are decoded into fourteen peripheral select lines 142 by the system peripheral control select unit 128. Because of propagation delays and bit skewing through PIA 106, these four bits are latched 1 microsecond after each PIA access to prevent false peripheral select line transitions.

Figure 21:
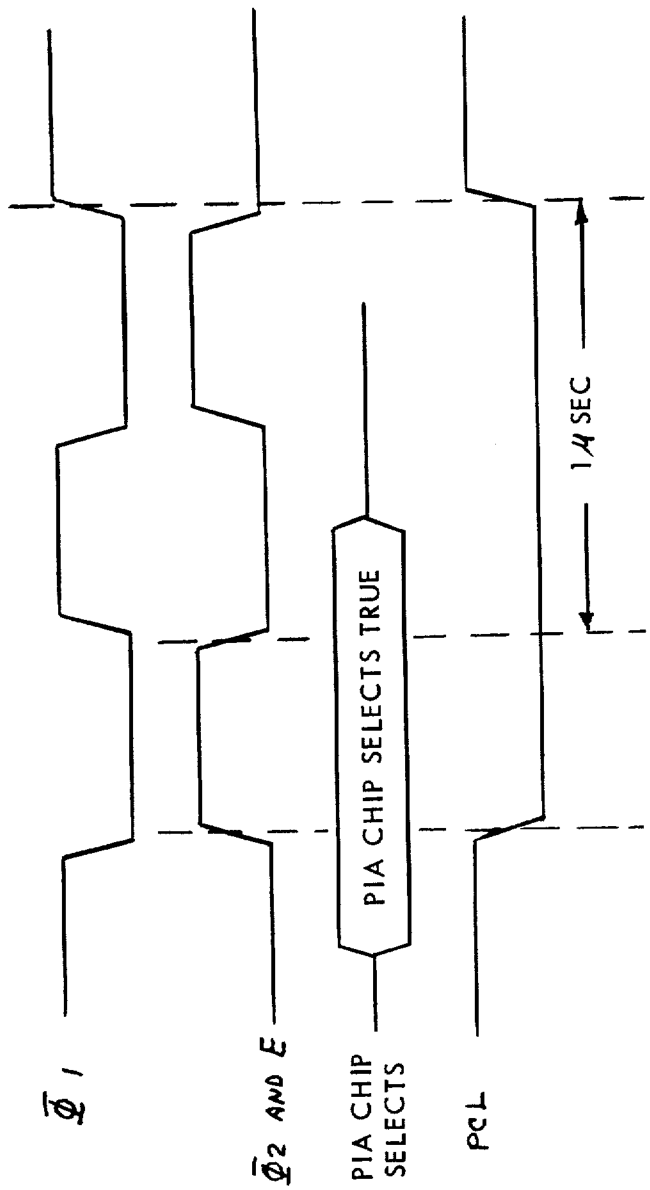
FIG. 21 is a timing diagram illustrating selected waveforms associated with the system peripheral control select unit of FIGS. 4 and 20.
Figure 22:
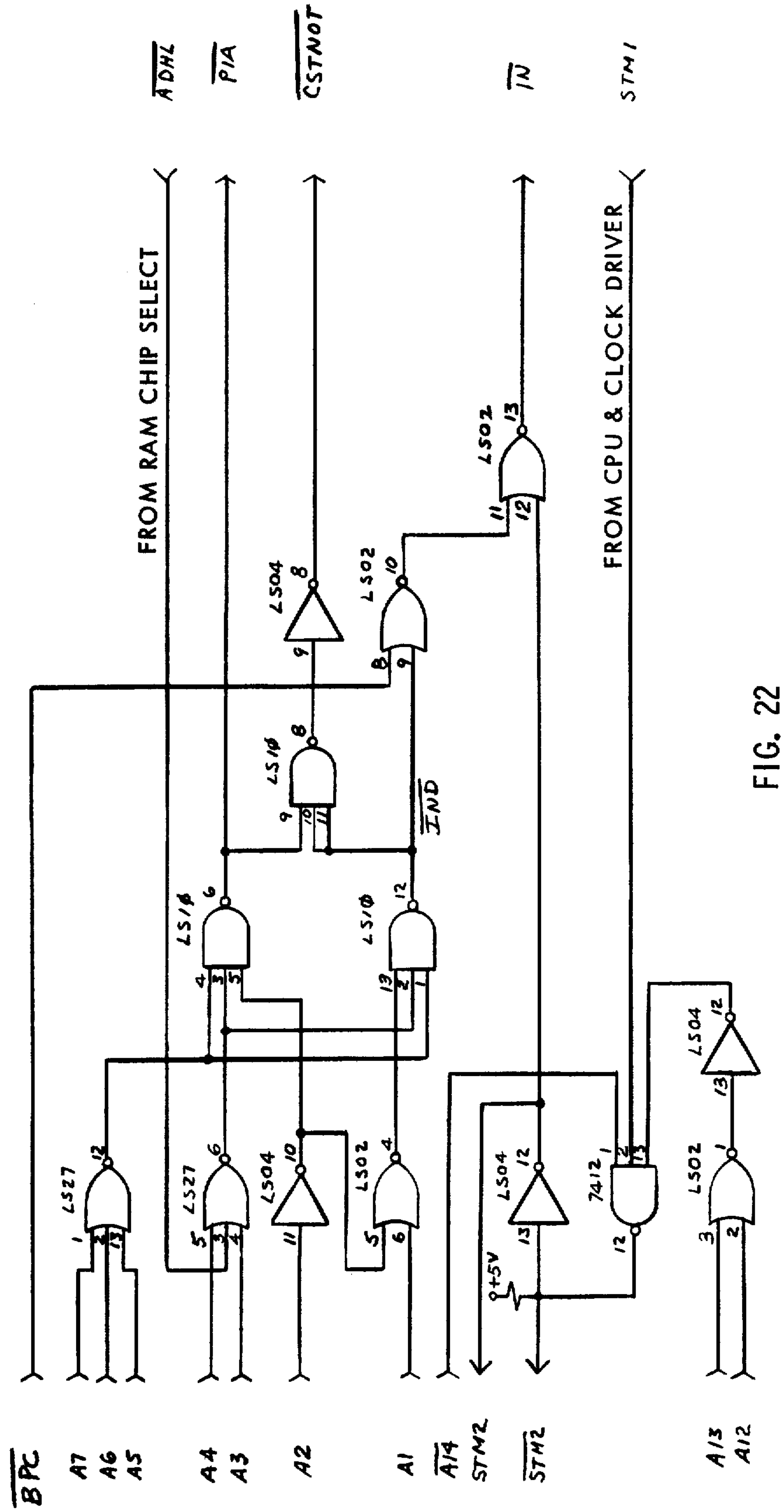
FIG. 22 is a detailed schematic diagram of a portion of the address and chip select block of FIG. 4 relating to the peripheral interface adaptor and input buffer of FIG. 4.

The timing relationship of selected signals associated with the hardware of FIG. 20 is shown in the waveform diagram of FIG. 21. All CPU data transfers to the PIA 106 are referenced to the trailing edge of the phased clock signal $\Phi_2$ that also serves as an enable line for PIA 106. The chip select lines for the PIA 106 are decoded synchronously with address bus 110 and the VMA line from the CPU 100 to provide chip select set-up time for PIA 106, as shown in FIGS. 14 and 22. The handshake functions of PIA 106 are accomplished through the A and B control registers and the four handshake lines CA1, CA2, CB1, and CB2 associated with the PIA. Lines CA1 and CB1 are input handshake lines used by the peripheral I/O and magnetic tape cassette units. Line CB1 activates the output line $\overline{IRQB}$ of the PIA 106 that is connected to the $\overline{NMI}$ interrupt request port of CPU 100. This arrangement allows the CPU to quickly respond to an end-of-tape handshake associated with magnetic tape cassette unit 124. Lines CA2 and CB2 are programmed through the calculator firmwave to be output lines. Line CA2 is employed exclusively as a control line in connection with peripheral I/O units, and line CB2 is employed as a system data strobe line. Line CB2 clocks data to printer 16, controls a comma in display 14, and clocks data to any peripheral I/O units that may be connected to the calculator.

A line $\overline{CSTNOT}$, encoded as shown in FIG. 22, is the logical OR of a PIA chip select signal $\overline{PIA}$ and an input buffer chip select signal. Line $\overline{CSTNOT}$ inhibits line $\overline{RAM}$ from cycle stealing the clock signals during a PIA access or an input buffer across and is asynchronous with phased clock signal $\Phi_2$, being derived directly from address bus 110.

INPUT BUFFER

Figure 23:
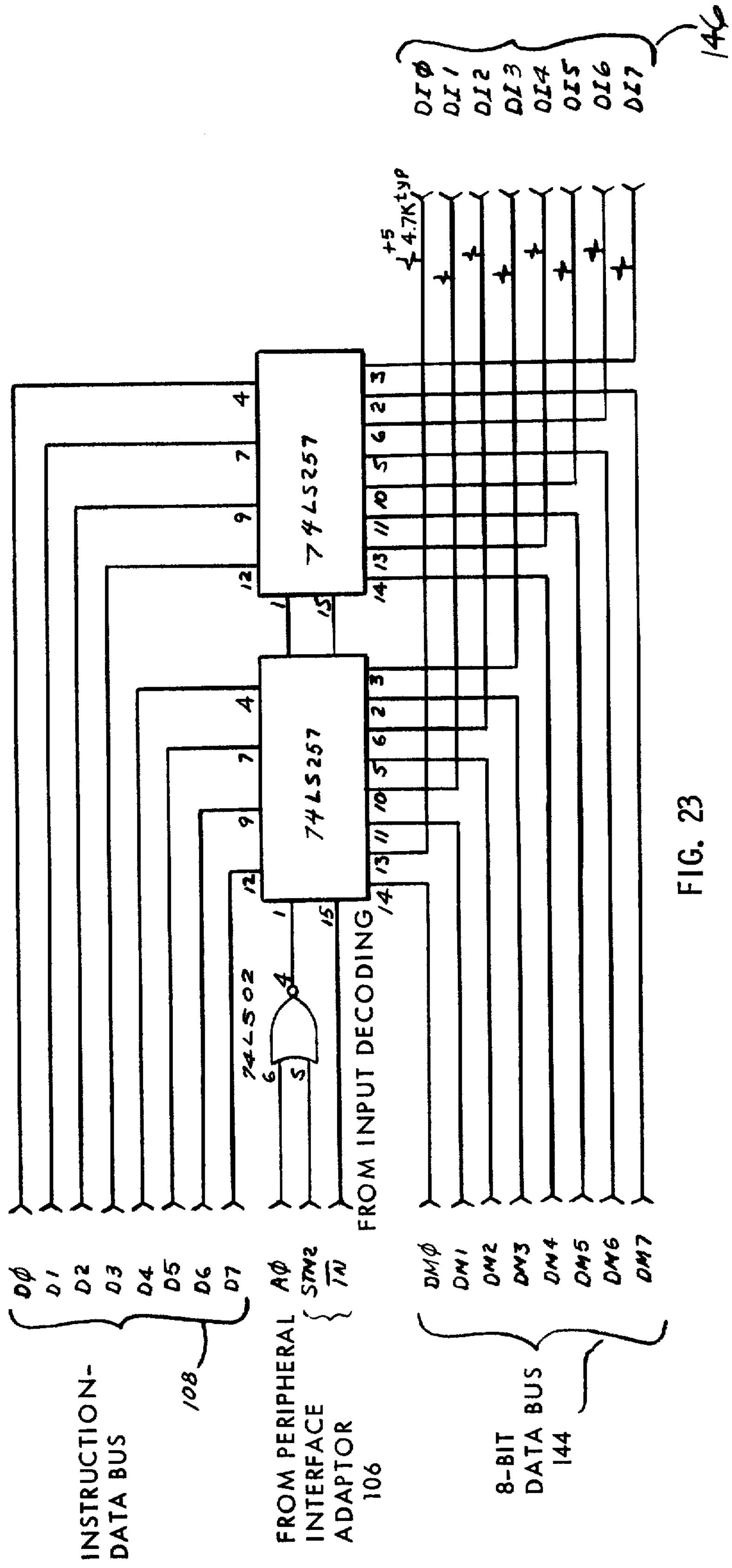
FIG. 23 is a detailed schematic diagram of the input buffer of FIG. 4.

Operation of the input buffer 130 of FIG. 4 may be understood with reference to the detailed schematic diagram of FIG. 23. Instructions and data from the optional plug-in I/O ROMs 110 and data from the I/O inputs of system I/O circuitry 126 are multiplexed onto a tri-state 8-bit data bus 144 comprising lines DM0–DM7. Data from the various internal I/0 units of the calculator is multiplexed onto an 8-bit open collector bus 146 comprising lines DI0–DI7. The DM bus 144 and the DI bus 146 are in turn multiplexed onto the cpu instruction-data bus 108. The DM bus 144 is accessed by either an optional plug-in I/O ROM access or an I/O data read at base page address 5 of basic read-write memory 102. The decoding for an optional plug-in I/O ROM access select signal $\overline{STM2}$ is illustrated in FIG. 22. Line $\overline{STM2}$ generates the necessary tri-state control signals for the optional plug-in I/O ROMs 110 and the I/0 inputs within system I/0 circuitry 126. The DI bus 146 is accessed as a peripheral data read cycle at read-write memory base page address 5. A signal $\overline{IN}$, encoded as shown in FIG. 22, enables either the DM bus 144 or the DI bus 146 to become active on the CPU instruction-data bus 108.

KEYBOARD

Figure 27:
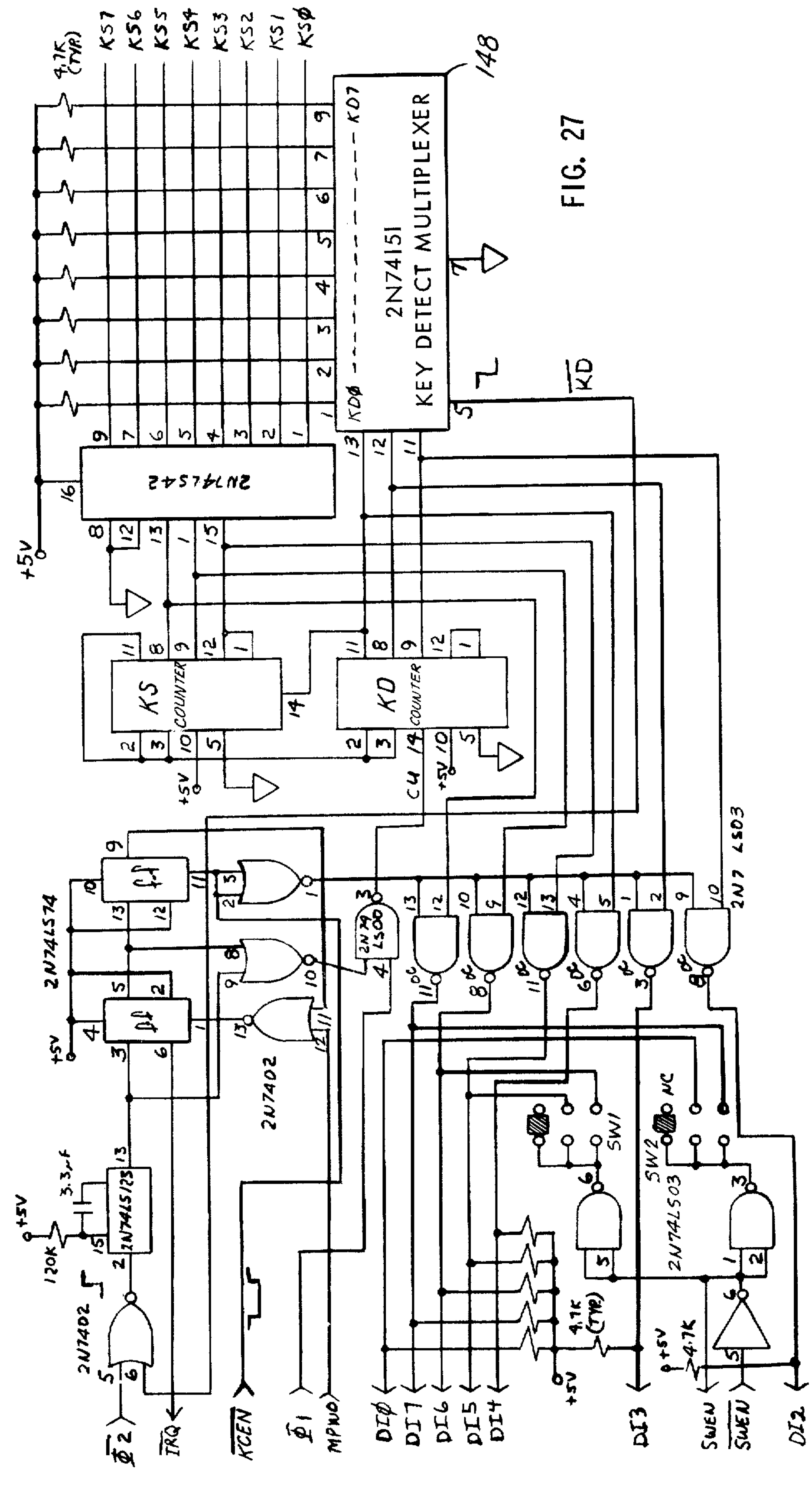
FIG. 27 is a detailed schematic diagram of the keyboard circuitry of FIG. 4.
Figure 28:
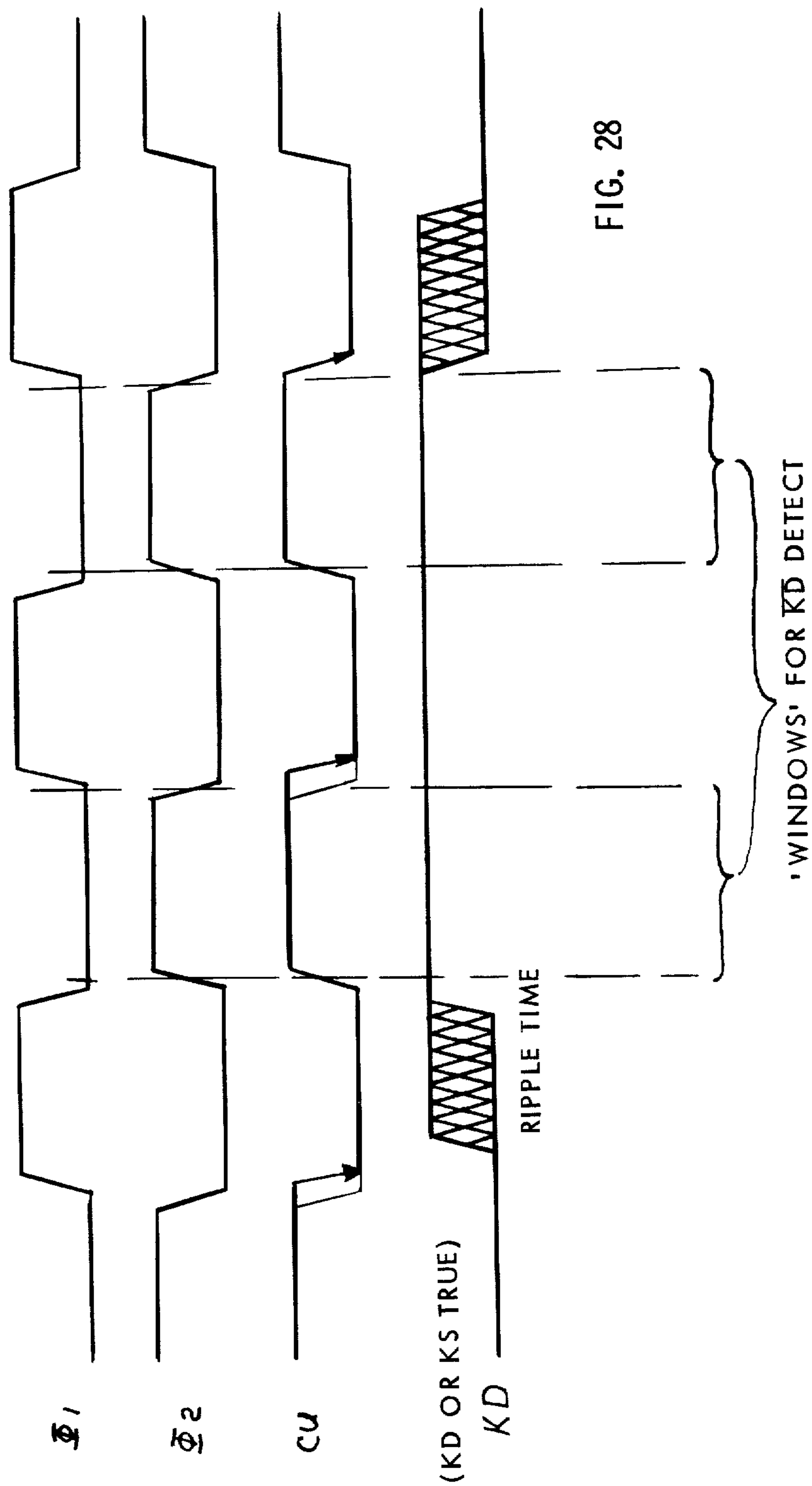
FIG. 28 is a timing diagram illustrating selected waveforms associated with the keyboard circuitry of FIGS. 4 and 27.

Operation of the keyboard 10 shown in FIG. 4 may be understood with reference to the detailed schematic diagram of FIG. 27. The master power on signal MPWO initializes the keyboard scan circuitry, and the phased clock signal $\Phi_1$ counts up a key scan counter KS and a key detect counter KD. The outputs of the KS counter are decoded into eight lines labelled KS0–KS7 that are connected to a keyboard switch matrix. The outputs of the KD counter are connected to a key detect multiplexer 148 whose eight input lines KD0–KD7 are received from the keyboard switch matrix. The keyboard circuitry continuously scans the keyboard switch matrix until a switch closure is detected on a $\overline{KD}$ line, as illustrated in the waveform diagram of FIG. 28. The $\overline{KD}$ line gates the phased clock signal $\Phi_2$ to a one-shot debouncer that in turn triggers a flip-flop to inhibit the CU line and requests an interrupt of the CPU 100 via line $\overline{IRQ}$. When the interrupt has been granted by the calculator firmware, a line $\overline{KCEN}$ enables the state of the KS and KD counters to be read to CPU 100 on lines DI2-DI7 of bus 146. The state of the KS and KD counters generates an octal keycode in accordance with FIG. 29 to identify the key that has been actuated. Lines DI5, DI6, and DI7 form an octal word having DI5 as its least significant bit and DI7 as its most significant bit. This octal word corresponds to the most significant digit of the octal keycode of the key that has been actuated. Similarly, lines DI2, DI3, and DI4 form an octal word having DI2 as its least significant bit and DI4 as its most significant bit. This octal word corresponds to the least significant digit of the octal keycode of the key that has been actuated. Calculator firmware acknowledges receipt of a key code by removing signal $\overline{KCEN}$. The keyboard scan is restored only if the calculator firmware has accepted the key code and if the one-shot debouncer has indicated that the key switch is open. The calculator firmware periodically updates the status of the two toggle switches located on the far right-hand side of keyboard 10. A line $\overline{SWEN}$ enables the state of these toggle switches to be read to CPU 100 on lines DI7, DI6, DI5, and DI0 of bus 146.

DISPLAY

Figure 24:
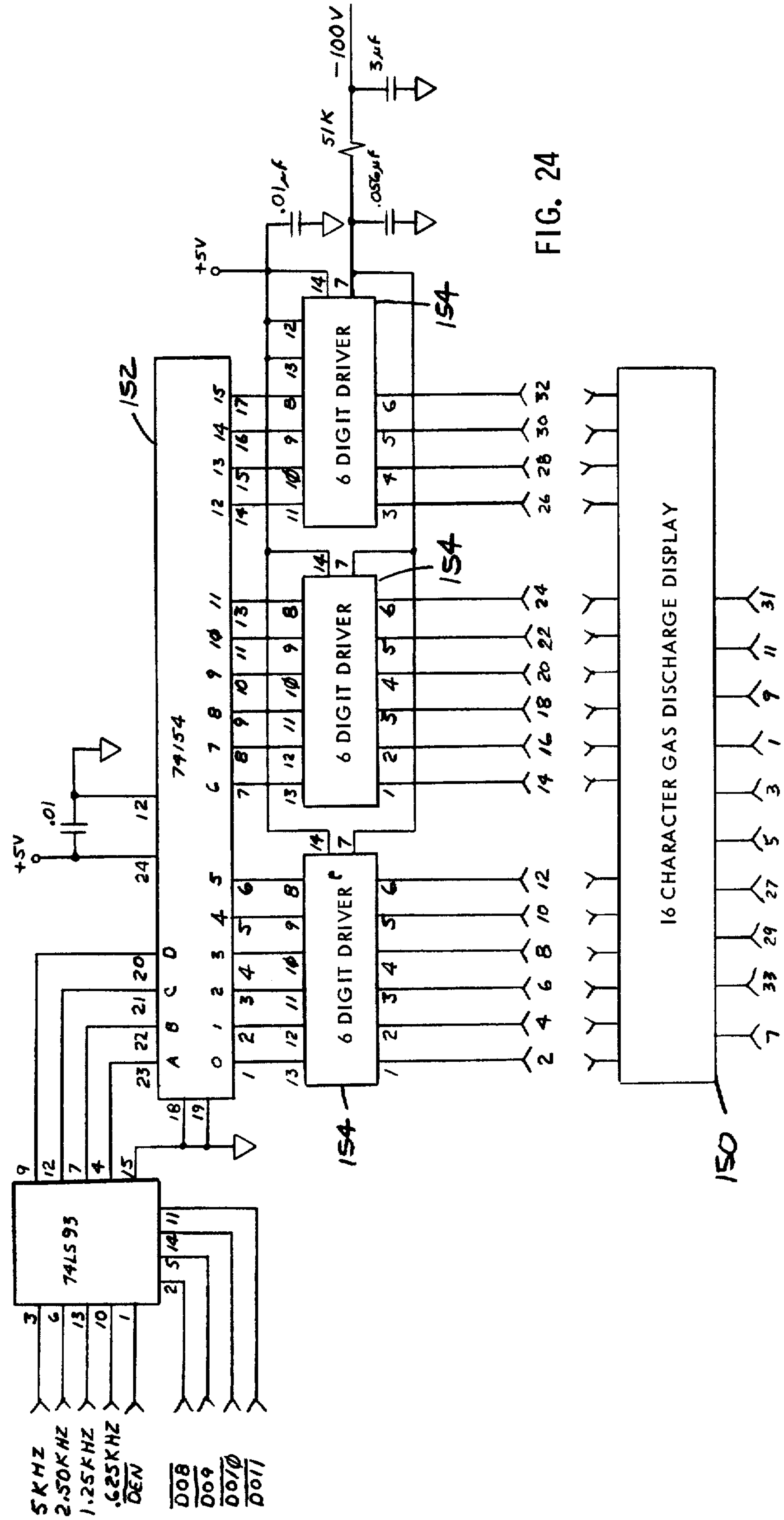
FIG. 24 is a detailed schematic diagram of a portion of the display circuit of FIG. 4.
Figure 25:
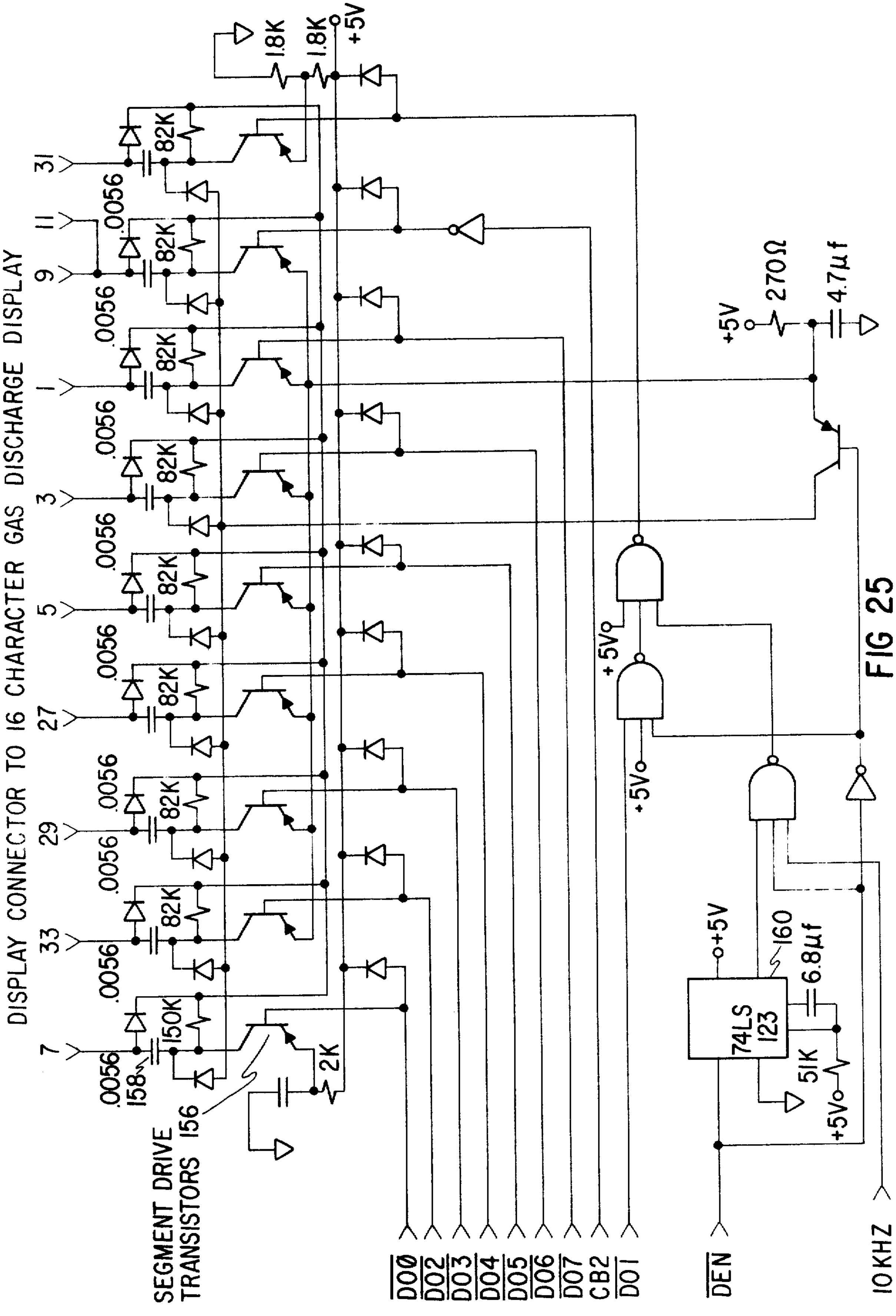
FIG. 25 is a detailed schematic diagram of another portion of the display circuit of FIG. 4.

Operation of the display circuit 14 of FIG. 4 may be understood with reference to the detailed schematic diagrams of FIGS. 24 and 25. A display readout 150 comprises a 16-digit high voltage gas discharge display unit. Each of the characters is formed by selectively energizing seven bar segments, a decimal point, and a comma. By enabling each of the sixteen character positions and simultaneously energizing the appropriate bar segments, a desired character is displayed. A strobing technique is employed to enable only one character position at a time. However, because of the high scan speed involved, all energized character positions appear to glow at the same time.

When the display circuitry is enabled, a line $\overline{DEN}$ allows character position information carried on lines DO8–DO11 to be applied to a decoder 152. The calculator firmware permutes these inputs in a binary fashion, thereby enabling one of three digit drivers 154 at a time. The output of digit drivers 154, normally at −45 volts, is pulled to ground when enabled.

Lines DO0–DO7 and CB2, all shown in FIG. 25, supply segment information. Initially, a bank of segment drive transistors 156 is turned on, thus allowing a bank of segment capacitors 158 to charge to −55 volts with respect to the off character positions. This voltage is insufficient to cause ionization within readout 150, and so no visible glow appears. When one of the segment drive transistors 156 is turned off, the corresponding segment capacitor 158 immediately applies −200 volts to the associated segment. Since cathode segments for all character positions are connected together, this negative voltage is present on the corresponding segment of each character position. Ionization and resultant glow discharge will only occur between segments at −200 volts and anodes at ground. Although all like cathode segments are at −200 volts, no discharge occurs at those anoes held to −45 volts.

A calculator busy signal comprising minus signs at each character position of display 14 occurs when the calculator is performing extensive calculations or program operations. During this time, line $\overline{DEN}$ is at logical one, and the character scan is applied to decoder 152 by square wave signals of 5, 2.5, 1.25, and 0.625 kilohertz, as shown in FIG. 24. All character segments except the minus sign are disabled by holding the segment capacitors 158 to −100 volts, and a 10-kilohertz square wave signal simultaneously drives the minus sign segment. Thus, minus signs appear across the entire display. A multivibrator 160 shown in FIG. 25 inhibits the busy signal if the calculator is busy for less than 140 milliseconds.

PRINTER

Figure 26A:
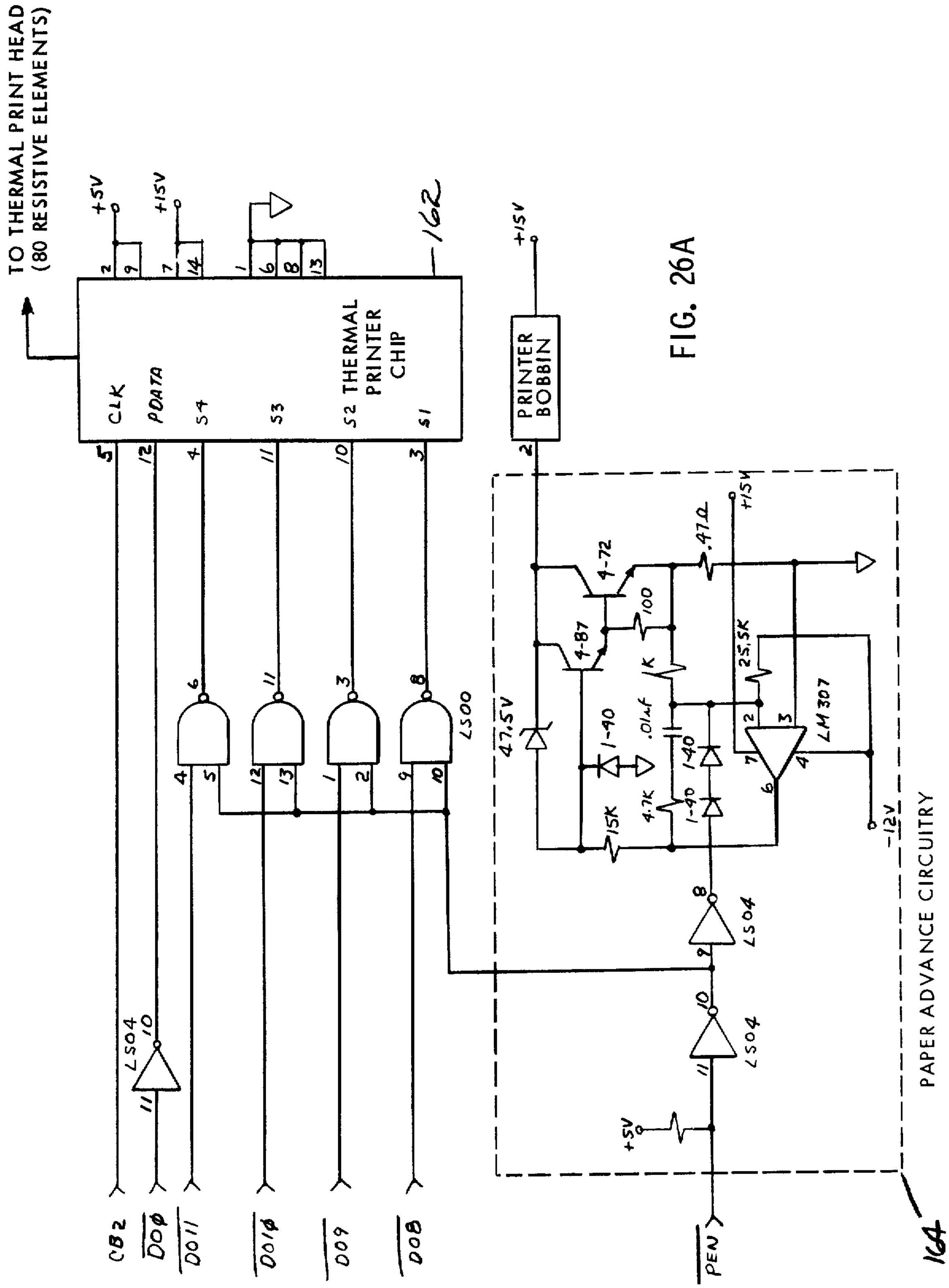
FIGS. 26A–B are detailed schematic diagrams of driver circuitry and paper sense circuitry, respectively, employed in the thermal printer of FIG. 4.
Figure 26B:
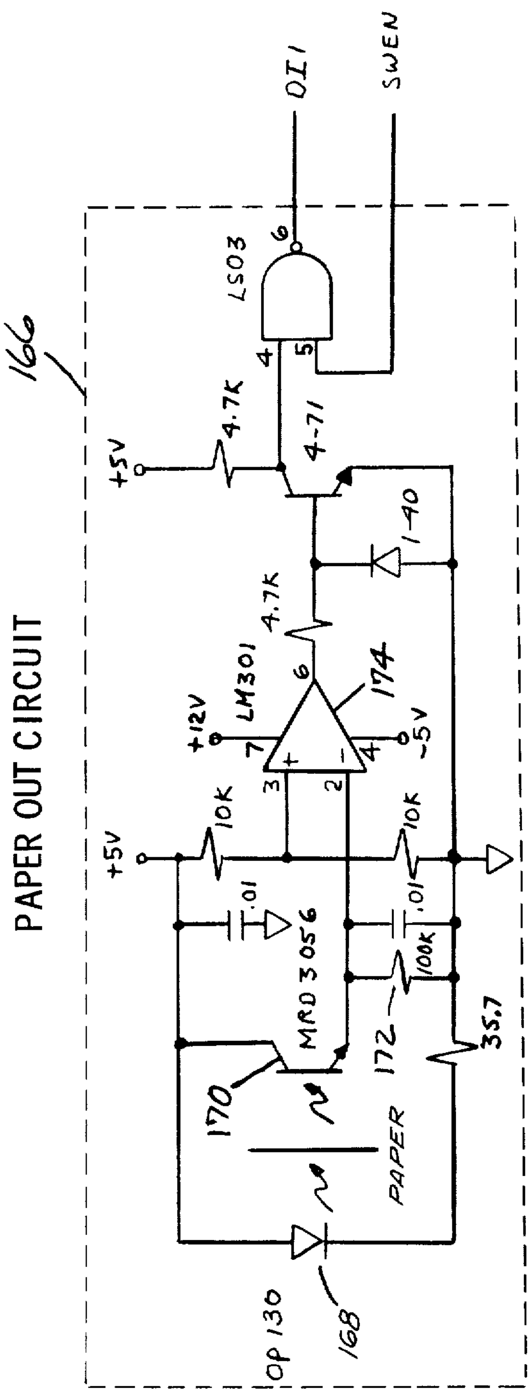

Operation of the thermal printer 16 of FIG. 4 may be understood with reference to the detailed schematic diagram of FIGS. 26A–B. Printer 16 comprises a printer chip 162 that includes eighty thermal print elements, a paper advance circuit 164, and a paper out circuit 166. Printed characters are formed within a 5 × 7 dot matrix. The eighty thermal print elements on printer chip 162 are arranged in a horizontal line. A line of printed characters is built up by printing all the dots on each of the seven matrix rows in sequence by incrementally advancing the paper past the horizontal line of thermal print elements. The thermal print elements are arranged in four groups of twenty elements each, each of the groups being controlled by one of the select lines S1–S4 shown in FIG. 26A. A 20-bit shift register within printer chip 162 is loaded via a PDATA line and a CLK line. Each bit of the shift register then controls one of the print elements.

The paper advance circuit 164 comprises a Darlington switch controlled by a $\overline{PEN}$ line. This switch draws current through a printer bobbin that in turn cocks and fires the advance mechanism of the printer.

The paper out circuit 166 shown in FIG. 26B comprises a light emitting diode 168, a photo transistor 170, and some detection circuitry. When paper is present in the printer, light from diode 168 is reflected to photo transistor 170 that produces current flow in resistor 172. This current is detected by an operational amplifier 174. Information regarding the presence of a paper supply is available to CPU 100 on a line D11 when a switch enable line SWEN is high.

PERIPHERAL INPUT/OUTPUT

Operation of the system I/O circuitry 126 and an optional I/O interface card 176 of FIG. 4 may be understood with reference to the detailed schematic diagrams of FIGS. 50–53. System I/O circuitry 126 includes channel select latch circuitry, handshake circuitry, and input bus enable circuitry, all of which circuitry is shown in detail in FIG. 50.

Figure 50:
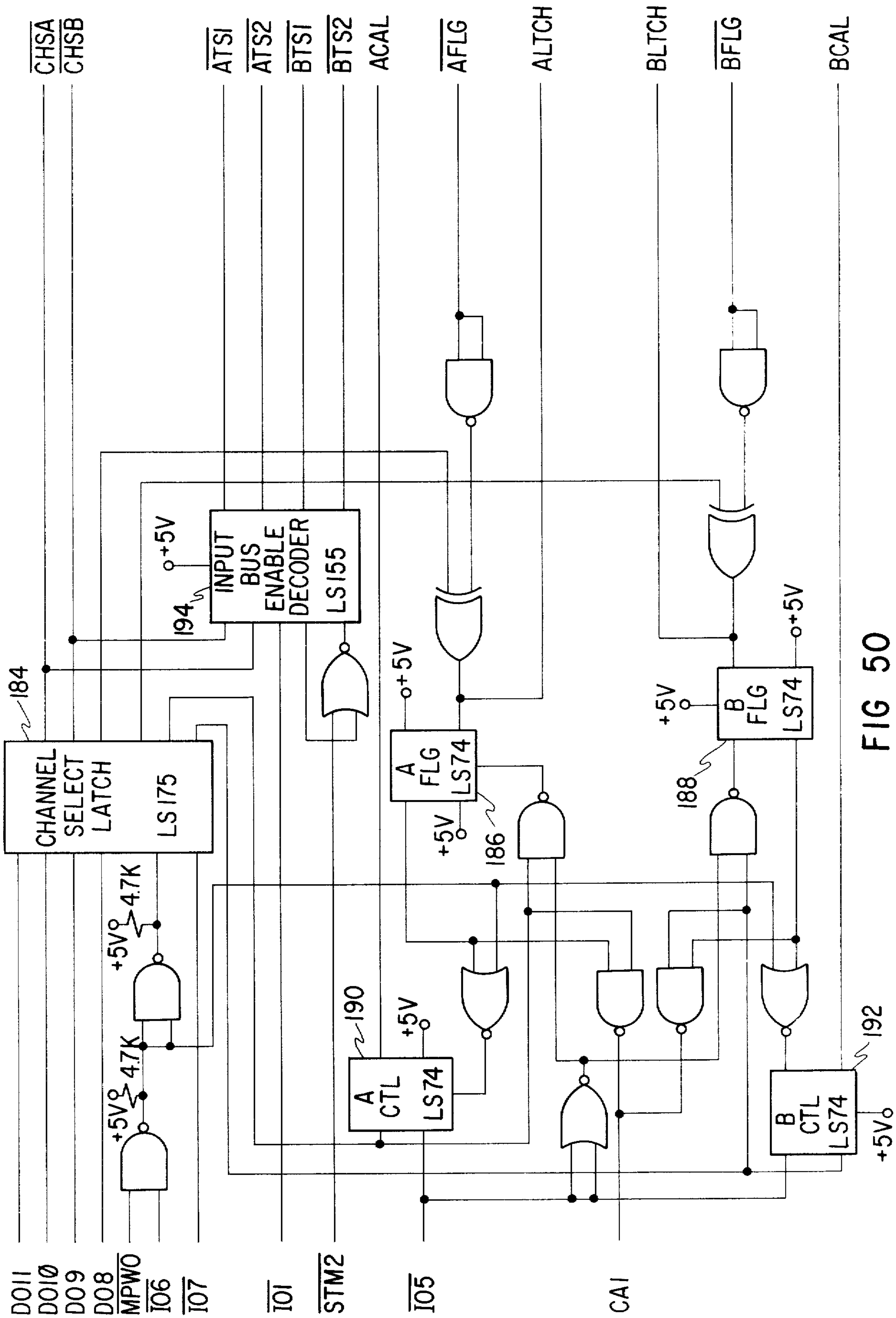
FIG. 50 is a detailed schematic diagram of some I/O control and handshake circuitry forming part of the I/O control block of FIG. 4.
Figure 51:
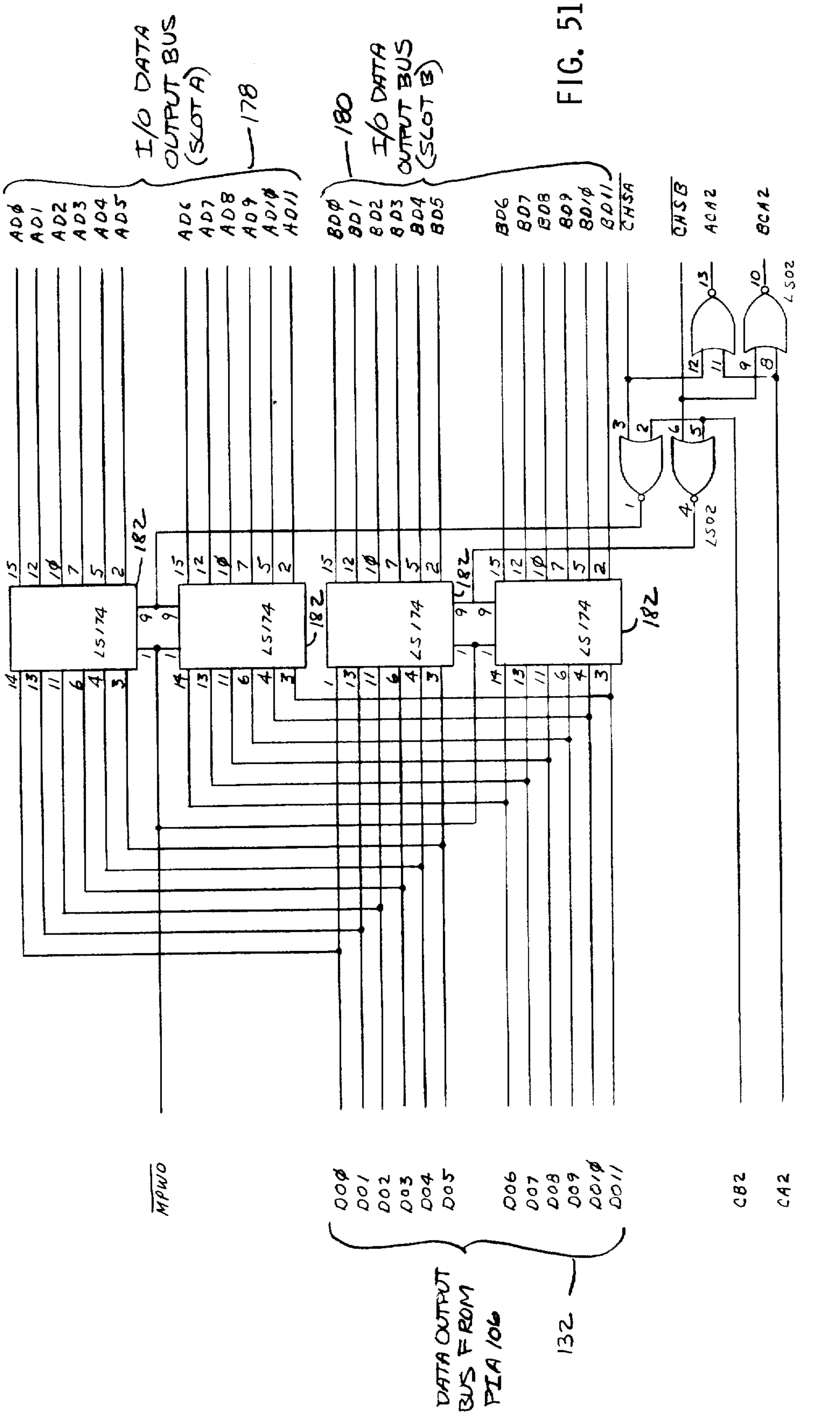
FIG. 51 is a detailed schematic diagram of some I/O data output latches forming part of the I/O output block of FIG. 4.

I/O receptacles 18 shown in FIG. 2 allow connection of two peripheral I/O units to the calculator. These two receptacles are variously referred to in the following detailed description as slot A or channel A and slot B or channel B. As shown in FIG. 51, I/O channels A and B output data on an I/O data output bus 178 and an I/O data output bus 180, respectively. These buses each comprise twelve bits of latched data, represented as lines AD0–AD11and BD0–BD11, respectively. Data is latched by a line CB2 applied through some logic circuitry to a group of data latches 182. When power to the calculator is turned on, these latches are cleared, and a channel select latch 184 is reset by the master power on line $\overline{MPWO}$, as shown in FIG. 50. Referring again to FIG. 50, the channel select latch 184, a channel A flag sense flip-flop 186, and a channel B flag flip-flop 188 are set by a line $\overline{IO7}$ through the calculator firmware. After selection of the proper channel, either a channel A control flip-flop 190 or a channel B control flip-flop 192 is set by a line $\overline{IO5}$. The selected peripheral I/O unit responds on either an $\overline{AFLG}$ or a $\overline{BFLG}$ line. This response sets the appropriate one of flag sense flip-flops 186 and 188, clears the previously set one of control flip-flops 190 and 192, and drives a line CA1 that is interrogated by the calculator firmware.

Figure 52:
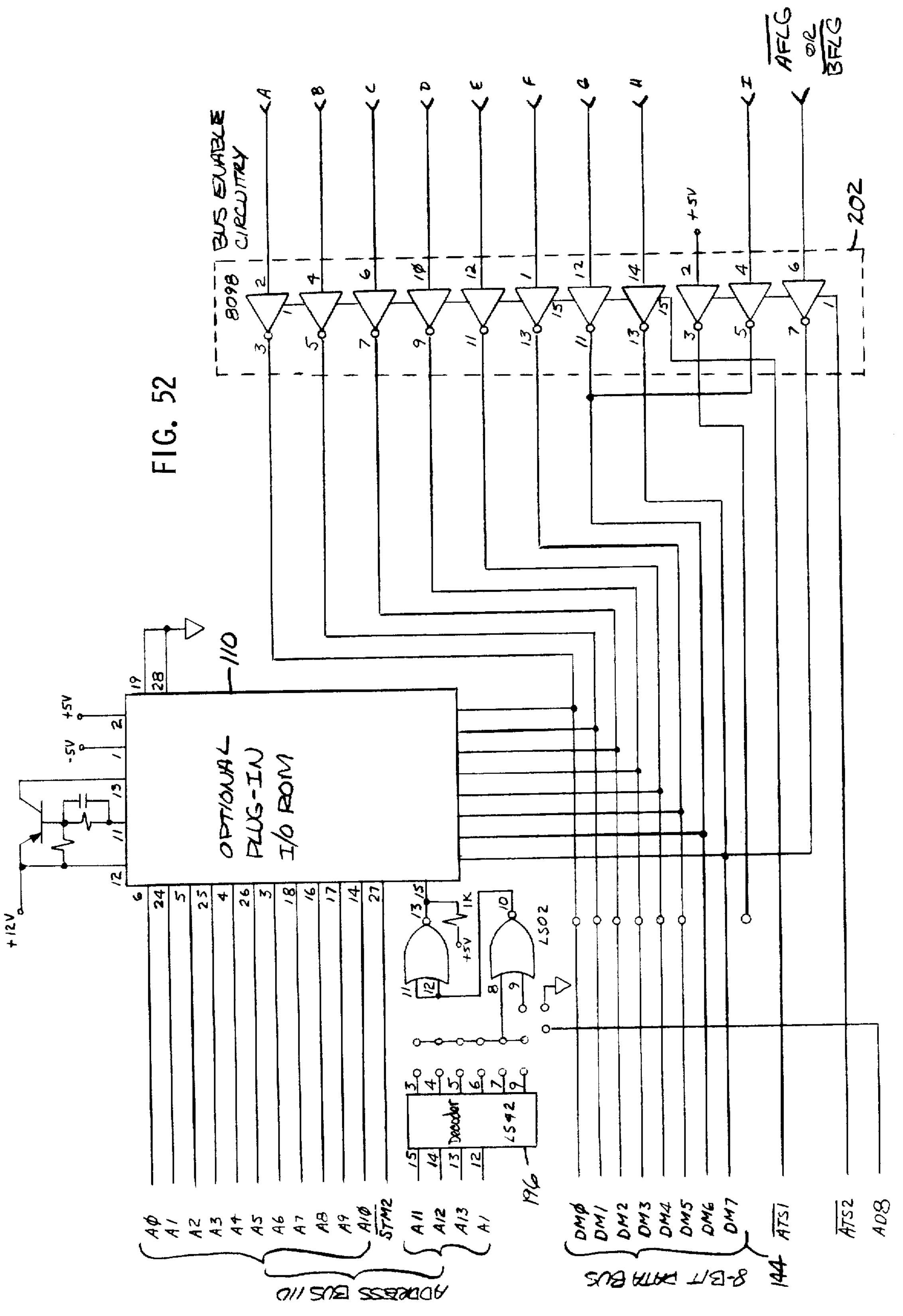
FIG. 52 is a detailed schematic diagram of the optional plug-in I/O ROM of FIG. 4 together with some input buffers associated with the I/O input block of FIG. 4.

Referring now to FIG. 52, there is illustrated a portion of the I/O interface card 176 of FIG. 4. This circuitry is shown for one of the two peripheral I/O channels and is merely duplicated for the other channel. The 8-bit data bus 144 is controlled by a pair of lines $\overline{ATS1}$ and $\overline{ATS2}$ that are generated by an input bus enable decoder 194 of FIG. 50. Channel select latch 184 of FIG. 50 may be cleared with a line IO6 or by setting a null select code in the latch through line IO7. FIG. 52 also illustrates the plug-in I/O ROM 110 that stores routines and subroutines of instructions necessary for interfacing the calculator to the associated peripheral I/O unit. The plug-in I/O ROM associated with the selected I/O channel is enabled through a decoder 196 when the proper address is placed on selected lines of the 15-bit address bus 110.

Figure 53:
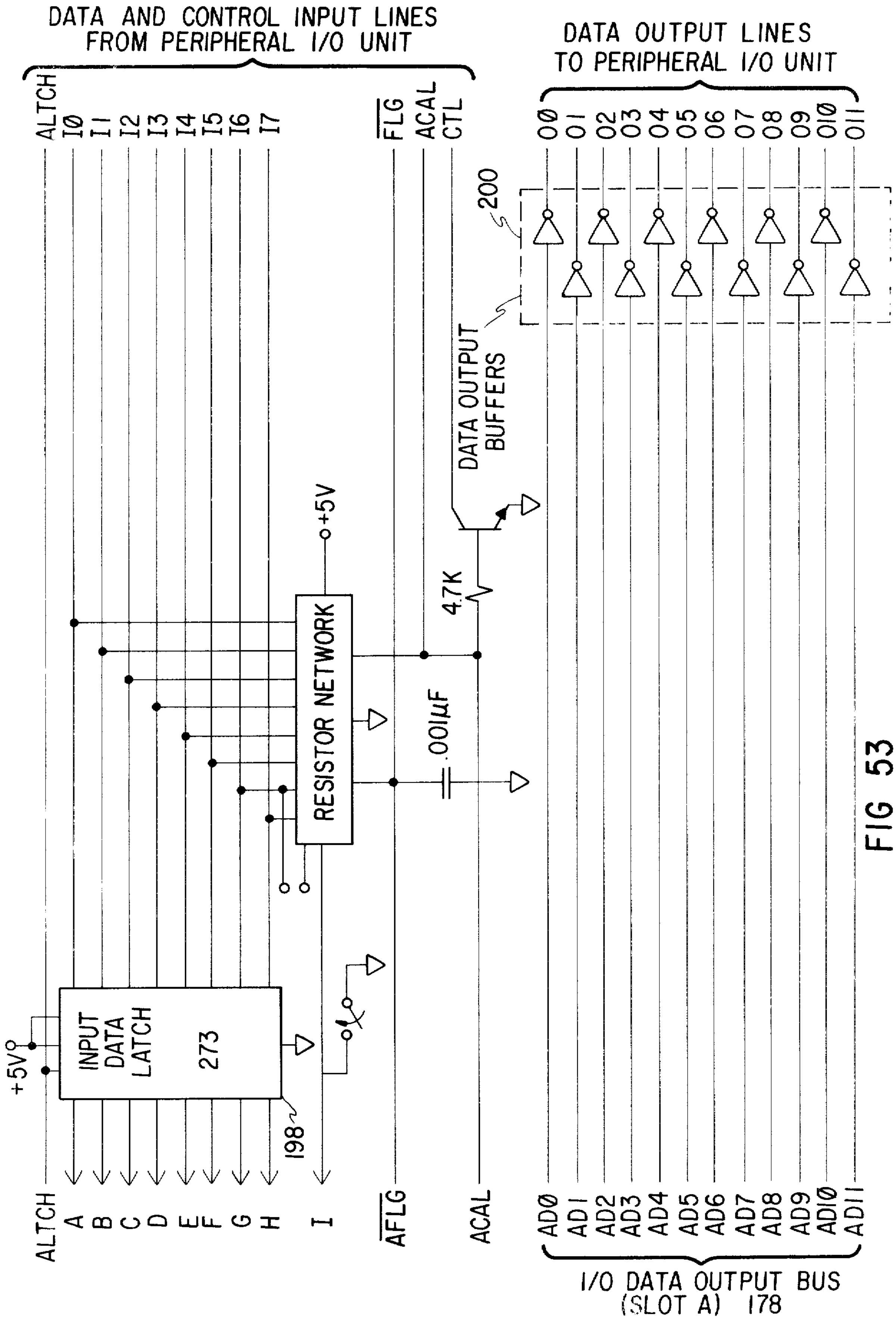
FIG. 53 is a detailed schematic diagram of an I/O data input latch and some output buffers forming part of the I/O input and I/O output blocks of FIG. 4.

Referring now to FIG. 53, there is shown another portion of the I/O interface card 176 of FIG. 4. FIG. 53 includes an input data latch 198 that receives data directly from the attached peripheral I/O unit. Also included is a bank of data output buffers 200 for buffering data received on bus 178 before it is transmitted to the attached peripheral I/O unit. The circuitry of FIG. 53 is shown in connection with I/O channel A. This circuitry is merely duplicated for I/O channel B. Input data from latch 198 and a flag line carrying status information regarding the attached peripheral I/O unit are enabled onto bus 144 through a bus enable circuit 202 that is controlled by lines $\overline{ATS1}$ and $\overline{ATS2}$. This is done to prevent multiple data sources on bus 144 at the same time. Data output line $\overline{AD8}$ of bus 178 performs a special function in the event two peripheral I/O units employing identical plug-in I/O ROMs are connected to the calculator at the same time. Jumpered as shown in FIG. 53, this bit serves to disable one of the ROMs to prevent simultaneous access to both ROMs.

MAGNETIC TAPE CASSETTE UNIT

Figure 30:
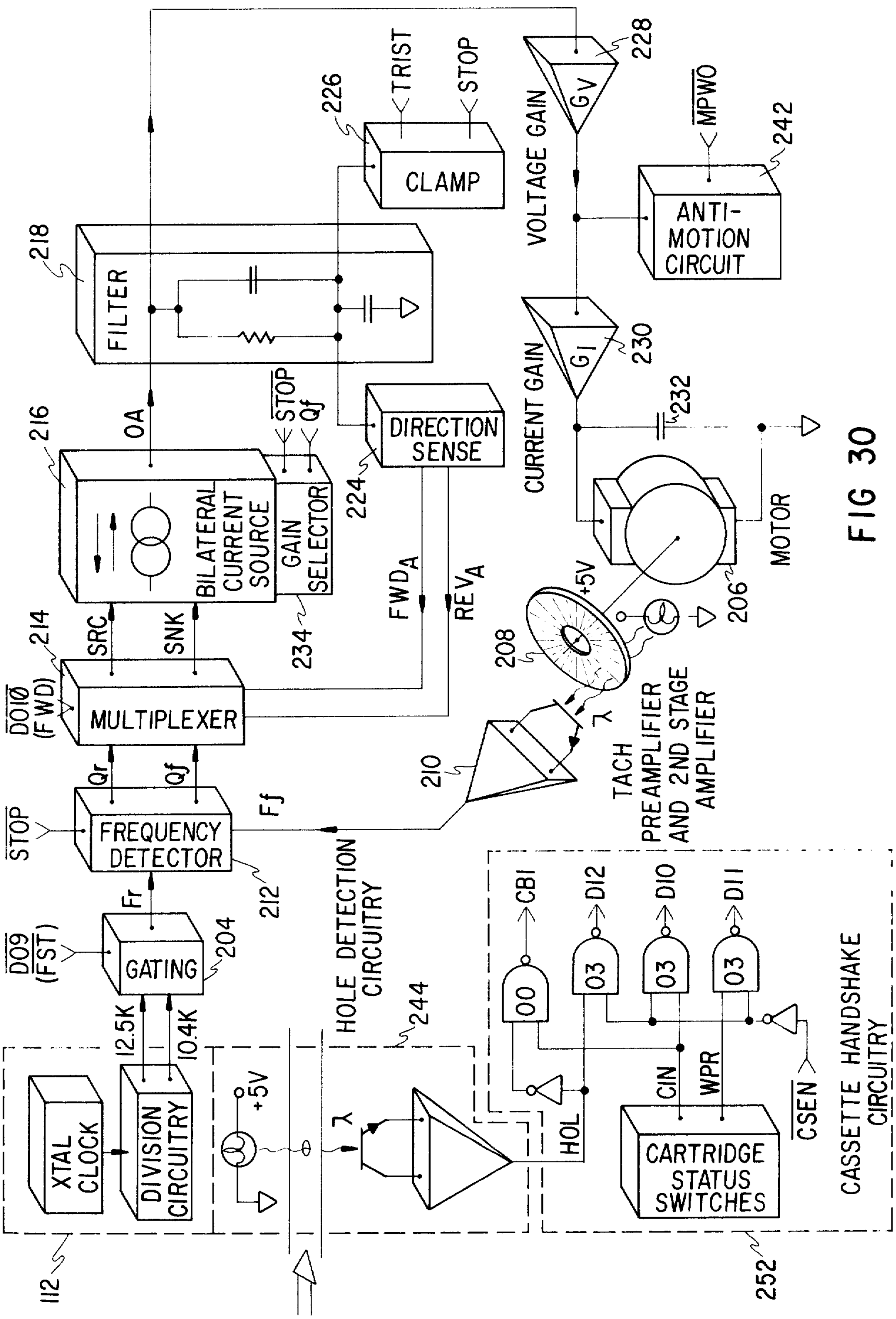
FIG. 30 is a block diagram of a portion of the circuitry associated with the magnetic tape cassette unit of FIG. 4.
Figure 31:
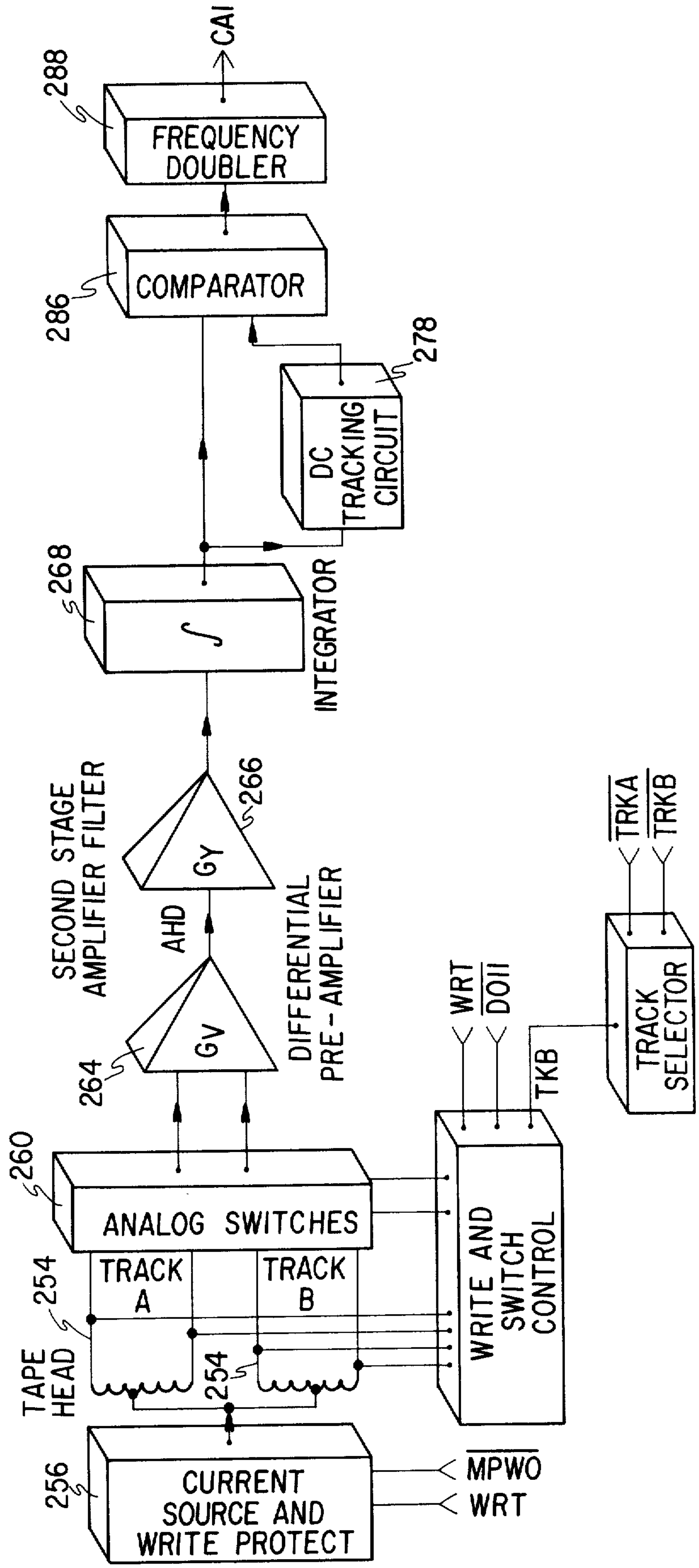
FIG. 31 is a block diagram of another portion of the circuitry associated with the magnetic tape cassette unit of FIG. 4.
Figure 32:
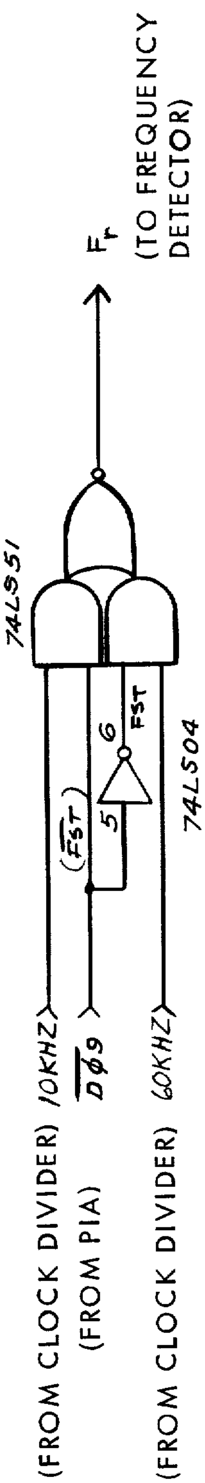
FIG. 32 is a detailed schematic diagram of the gating circuitry of FIG. 30.
Figure 33:
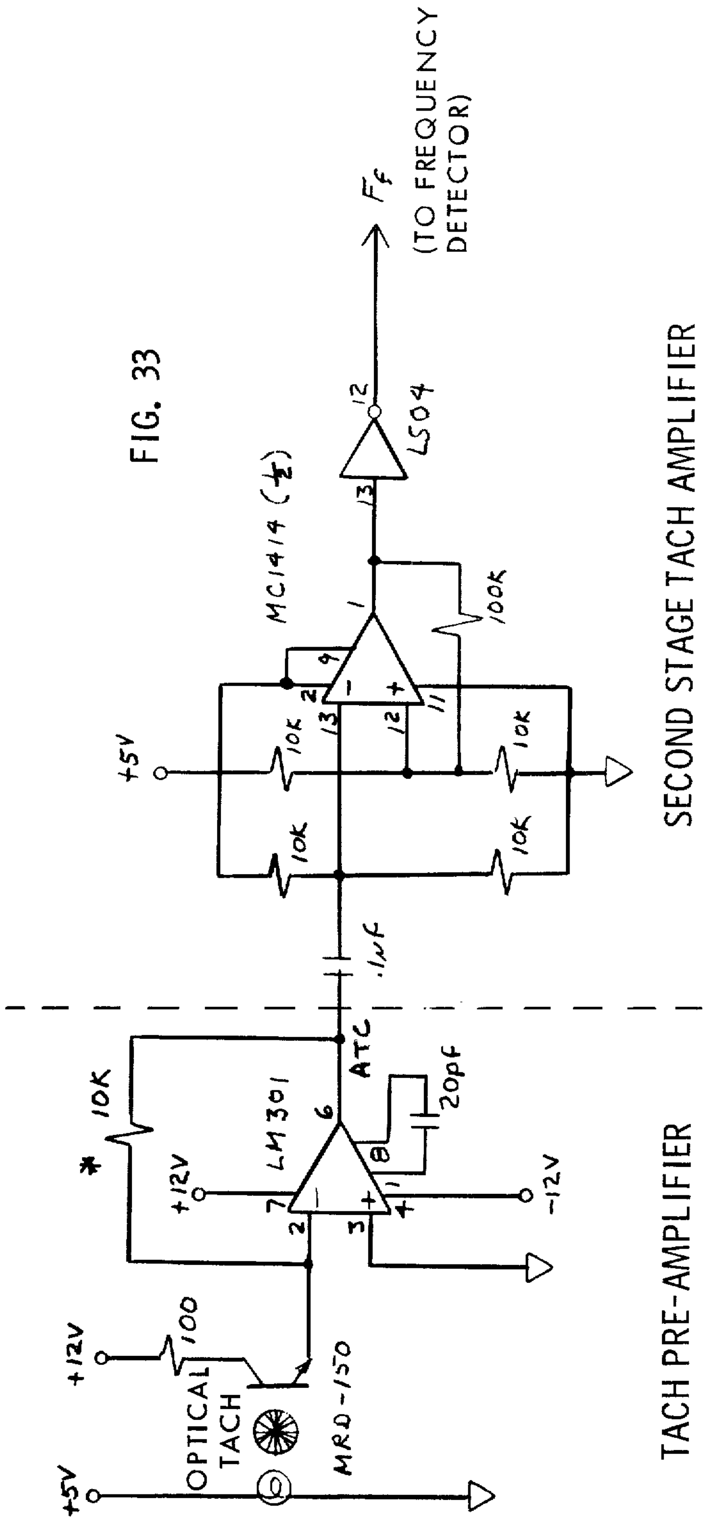
FIG. 33 is a detailed schematic diagram of the tach preamplifier and second stage tach amplifier of FIG. 30.

Operation of the magnetic tape cassette unit 12 of FIG. 4 may be understood with reference to the detailed block diagrams of FIGS. 30 and 31 and the detailed schematic diagrams of FIGS. 32–49.

Referring to FIG. 30, there is shown a detailed block diagram of a motor speed control system employed in the magnetic tape cassette unit 12. This system is configured as a frequency locked electronic servo loop whose output signal is locked to a reference input signal. The motor speed control system employs calculator system clock generator and divider 112, described hereinabove, to generate, through a gating circuit 204, shown in detail in FIG. 32, two reference frequency signals $F_r$ and $F_f$. $F_r$ is associated with a signal FST, and $F_f$ is associated with a signal $\overline{FST}$. $F_r$ is a 62.5-kilohertz signal that provides a magnetic tape search speed of approximately 60 inches/second. Data transfer is accomplished at 10 inches/second using $F_f$, a 10.4-kilohertz signal. The appropriate reference frequency is gated into the servo loop as $F_r$ under control of CPU 100 via line $\overline{DO9}$ of the data output bus 132.

A servo motor 206 is provided for driving a tape capstan. Capstan motion is translated into frequency feedback information $F_f$ by means of a 1000-line optical tachometer 208 coupled to the motor shaft. The circuitry associated with optical tachometer 208 includes a tach preamplifier and second stage amplifier 210, shown in detail in FIG. 33. The tach preamplifier comprises a photo transistor driving a current-to-voltage converter. An amplified analog signal ATC is AC coupled into a voltage comparator to provide a TTL signal $F_f$. Positive feedback is employed to insure that $F_f$ is a clean waveform.

Figure 34:
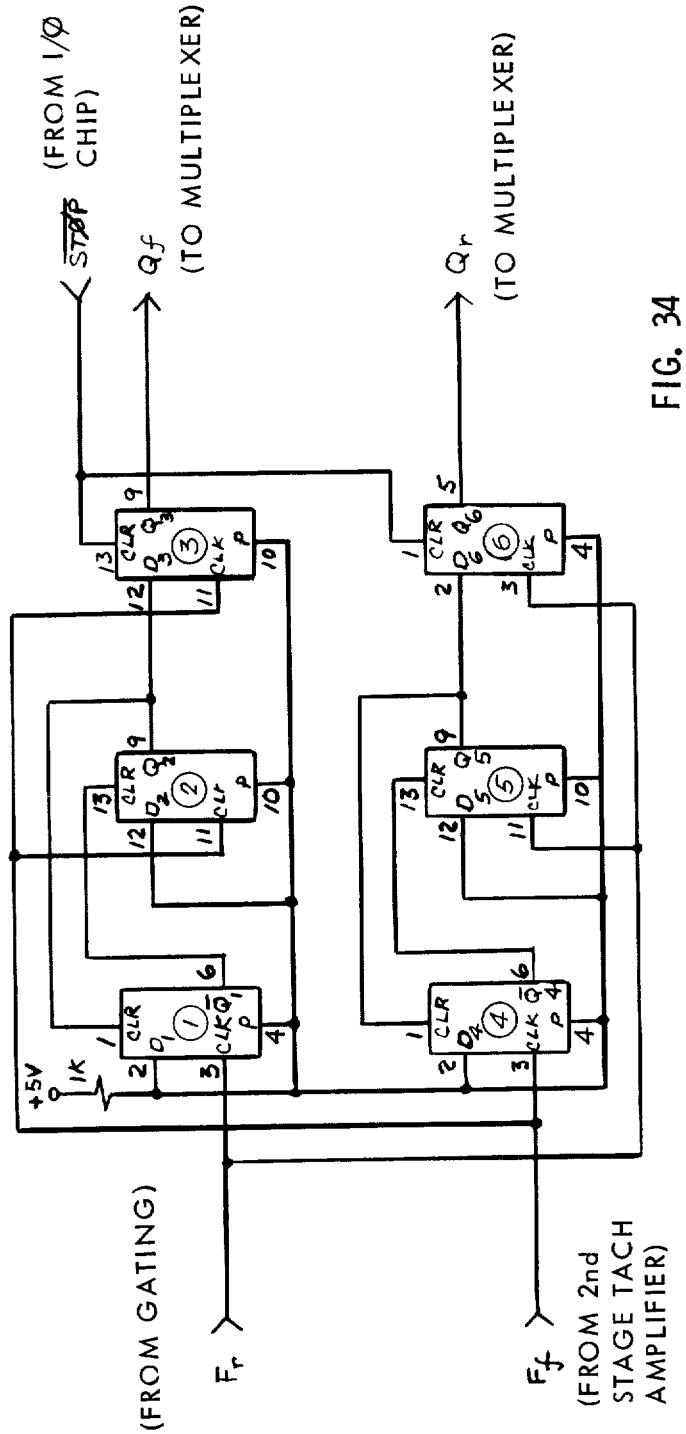
FIG. 34 is a detailed diagram of the frequency detector of FIG. 30.

The reference signal $F_r$ and the feedback signal $F_f$ are applied to a frequency detector 212, shown in detail in FIG. 34. Frequency detector 212 dynamically compares $F_r$ and $F_f$ to produce two TTL error correction bits $Q_r$ and $Q_f$. Frequency coincidence or mismatch is determined on the basis of the rising edges of $F_r$ and $F_f$. If two rising edges of $F_r$ are detected without an intervening rising edge of $F_f$, then $F_r < F_f$ and an appropriate error condition is set. Similarly, if multiple rising edges of $F_f$ occur without an intervening rising edge of $F_r$, then $F_r > F_f$ and another error condition is set. Thus, frequency coincidence is determined for alternating rising edges of $F_r$ and $F_f$. Frequency detector outputs are created and sustained solely on the basis of frequency data, independent of phase information. A summary of the possible combinations of logic states of $Q_r$ and $Q_f$ together with interpretive information is shown in Table 2 below. In this table logic levels are positive true, a logical zero being ≦ 0.4 volts and a logical one being ≧ 2.4 volts.

Table 2

| $Q_r$ | $Q_f$ | INTERPRETATION |
|---|---|---|
| 0 | 0 | $F_r = F_f$. More information is required to determine frequency mismatch. |
| 1 | 0 | $F_r > F_f$ |
| 0 | 1 | $F_r < F_f$ |
| 1 | 1 | Don't care condition. |

Bidirectional tape motion is employed in magnetic tape cassette unit 12. Tape direction is specified by a line $\overline{DO10}$ of data output bus 132. A signal $\overline{DO10}$ indicates forward tape motion and its complement indicates reverse tape motion. Line $\overline{DO10}$ mulitplexes $Q_r$ and $Q_f$ onto selected ones of a number of control lines associated with a multiplexer 214, shown in detail in FIG. 35. A line $\overline{FWD}$ couples $Q_r$ to a source control input line SRC and $Q_f$ to a sink control input line SNK. A line REV gates $Q_r$ and $Q_f$ to the SNK and SRC lines, respectively. Lines SRC and SNK are control inputs to a bilateral current source 216, shown in detail in FIG. 36. Bilateral current source 216 responds to the condition of line SRC being a logical one and line SNK being a logical zero by sourcing current on a line OA into a filter 218. This condition forces a transistor 220 and a transistor 222 of FIG. 36 to cutoff. For the condition wherein lines SRC and SNK are both at logical zero, no corrective action is indicated because frequency coincidence exists. For this condition, line OA forces the output of bilateral current source 216 into a tri-state mode, and a line TRIST is set to a logical one. The tri-state mode also applies for the condition wherein lines SRC and SNK are both at logical one.

Figure 38:
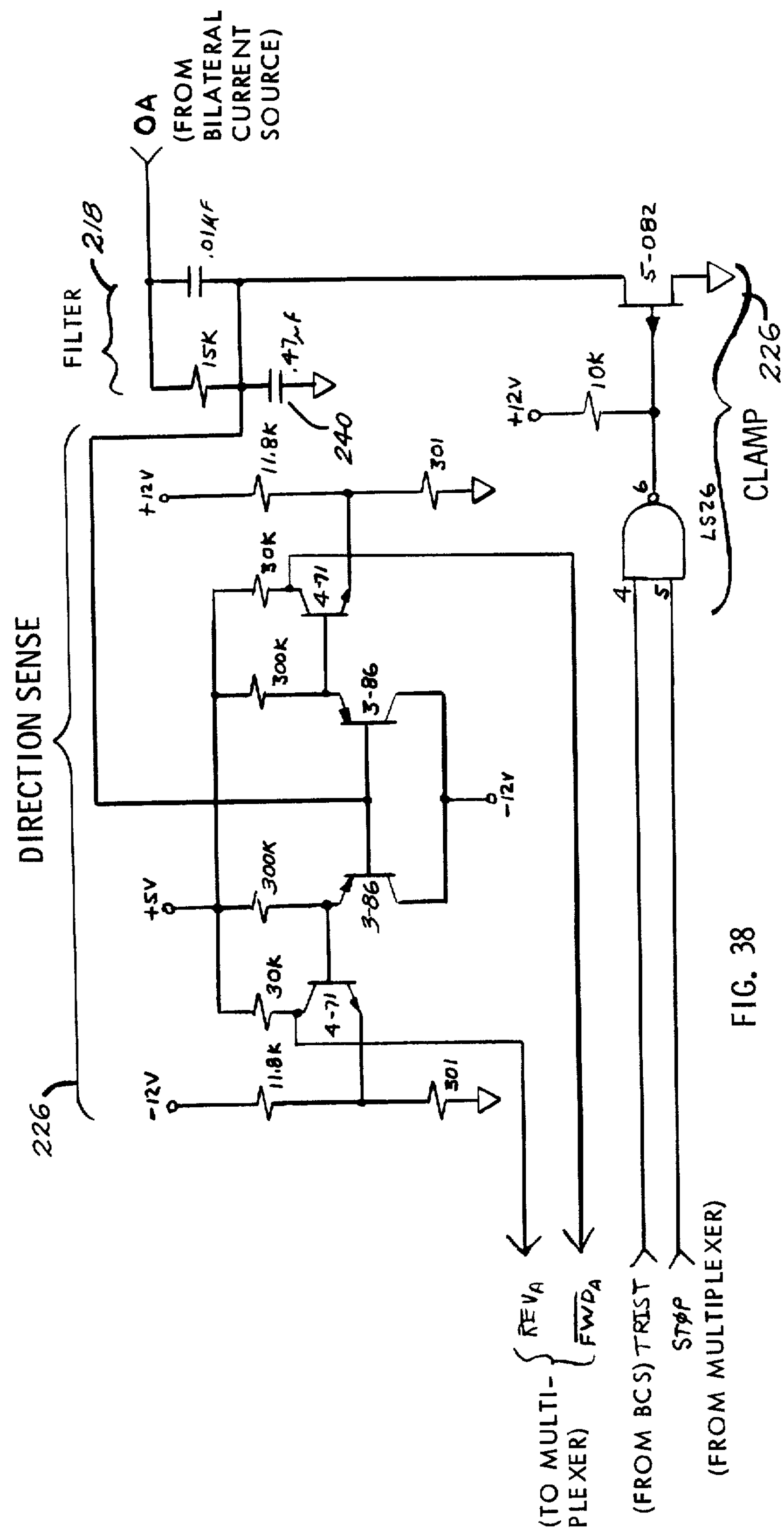
FIG. 38 is a detailed schematic diagram of the filter, direction sense, and clamp circuits of FIG. 30.

A basic function of filter 218, shown in the detailed schematic diagram of FIG. 38 along with a direction sense circuit 224 and a clamp circuit 226, is to remove noise and high frequency components from the error current signals on line OA. It is also important in determining the stability and dynamic performance of the servo loop. The bilateral current source 216 pumps charge on and off the capacitors within filter 218, thereby creating a dynamic voltage signal that is applied to direction sense circuit 224. This signal completes a digital-to-analog conversion from frequency detector 212.

Figure 39:
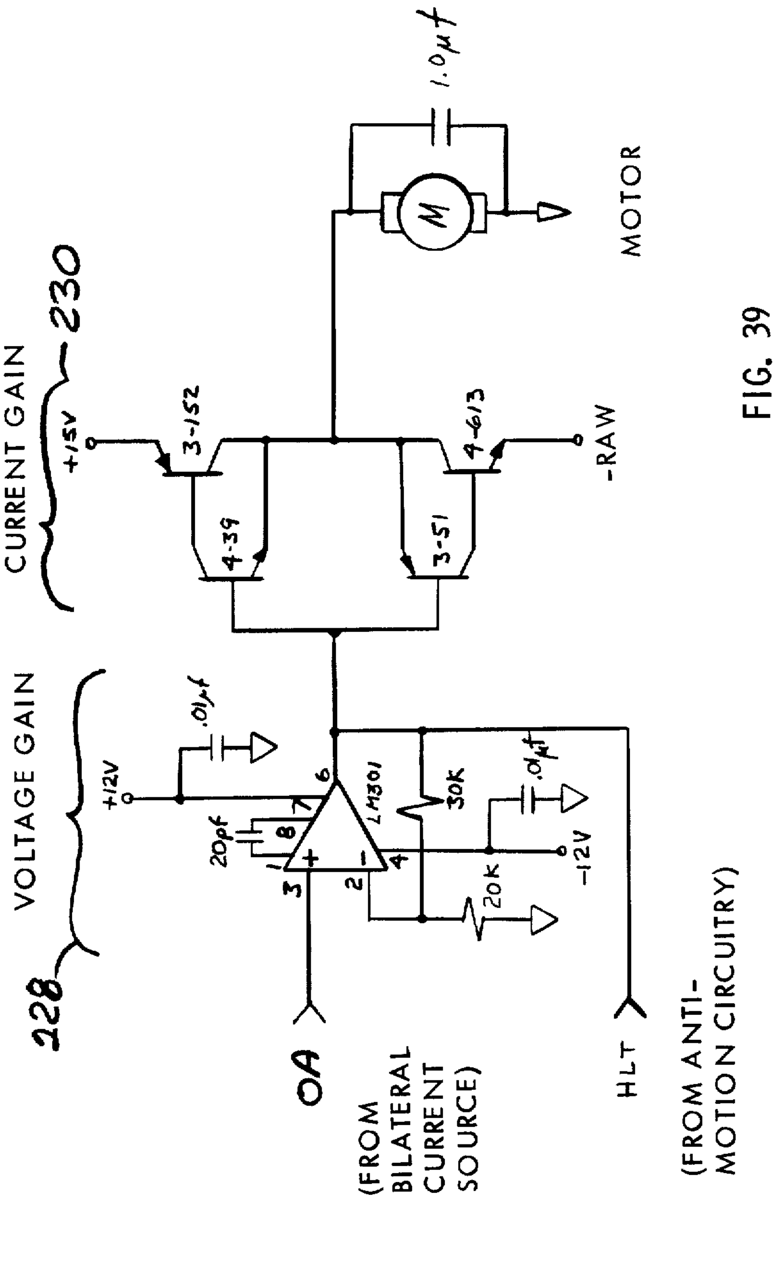
FIG. 39 is a detailed schematic diagram of the voltage gain and current gain circuits of FIG. 30.
Figure 40:
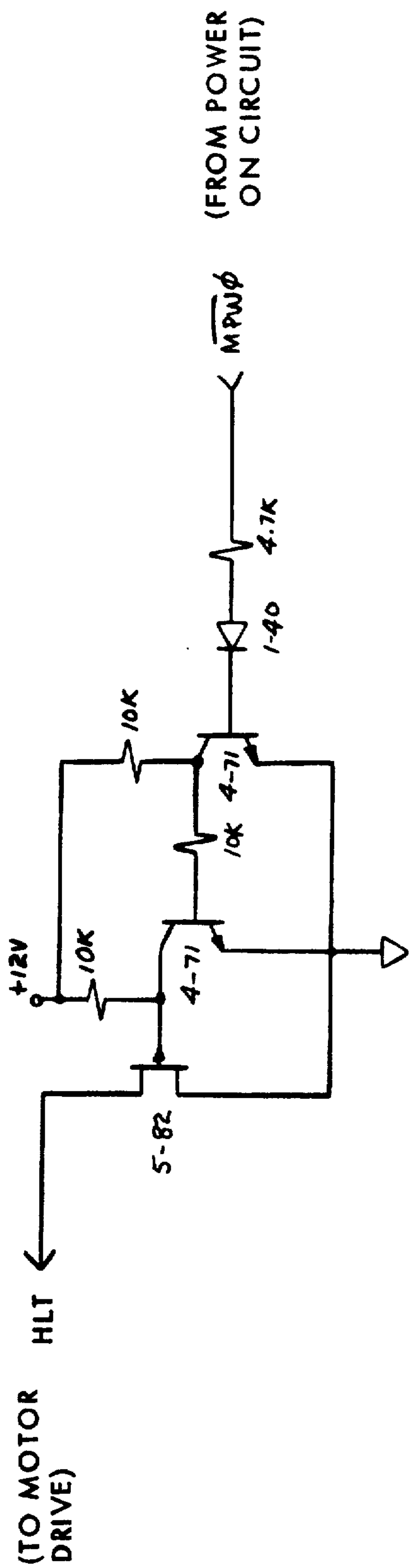
FIG. 40 is a detailed schematic diagram of the antimation circuit of FIG. 30.
Figure 41:
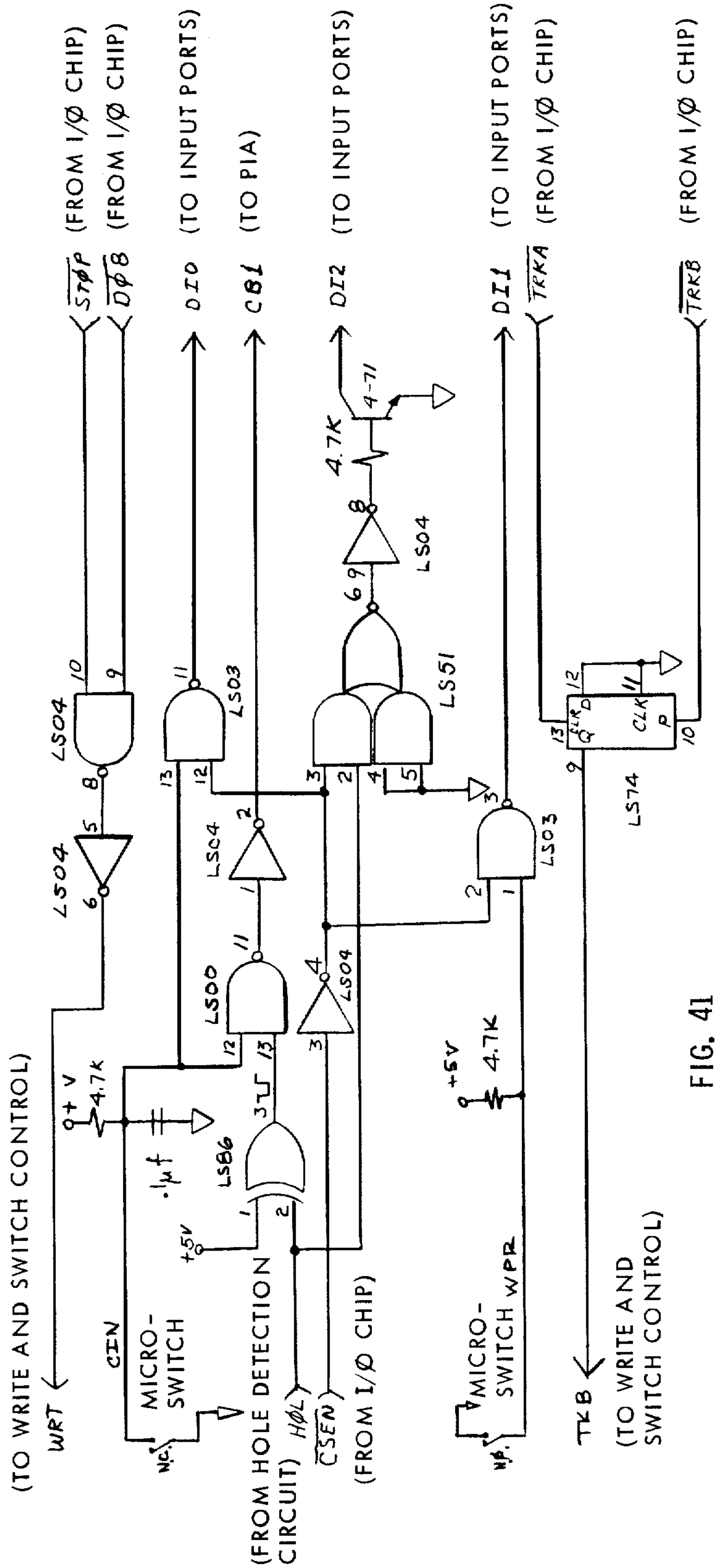
FIG. 41 is a detailed schematic diagram of the magnetic tape cassette handshake circuitry of FIG. 30 and the track selector circuitry of FIG. 31.
Figure 42:
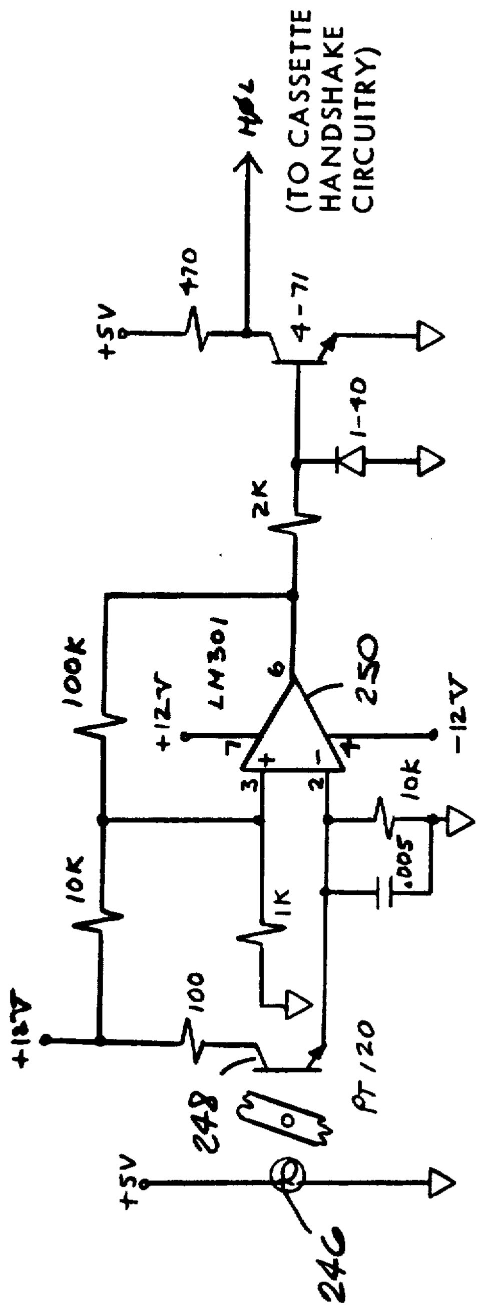
FIG. 42 is a detailed schematic diagram of the hole detector of FIG. 30.
Figure 43:
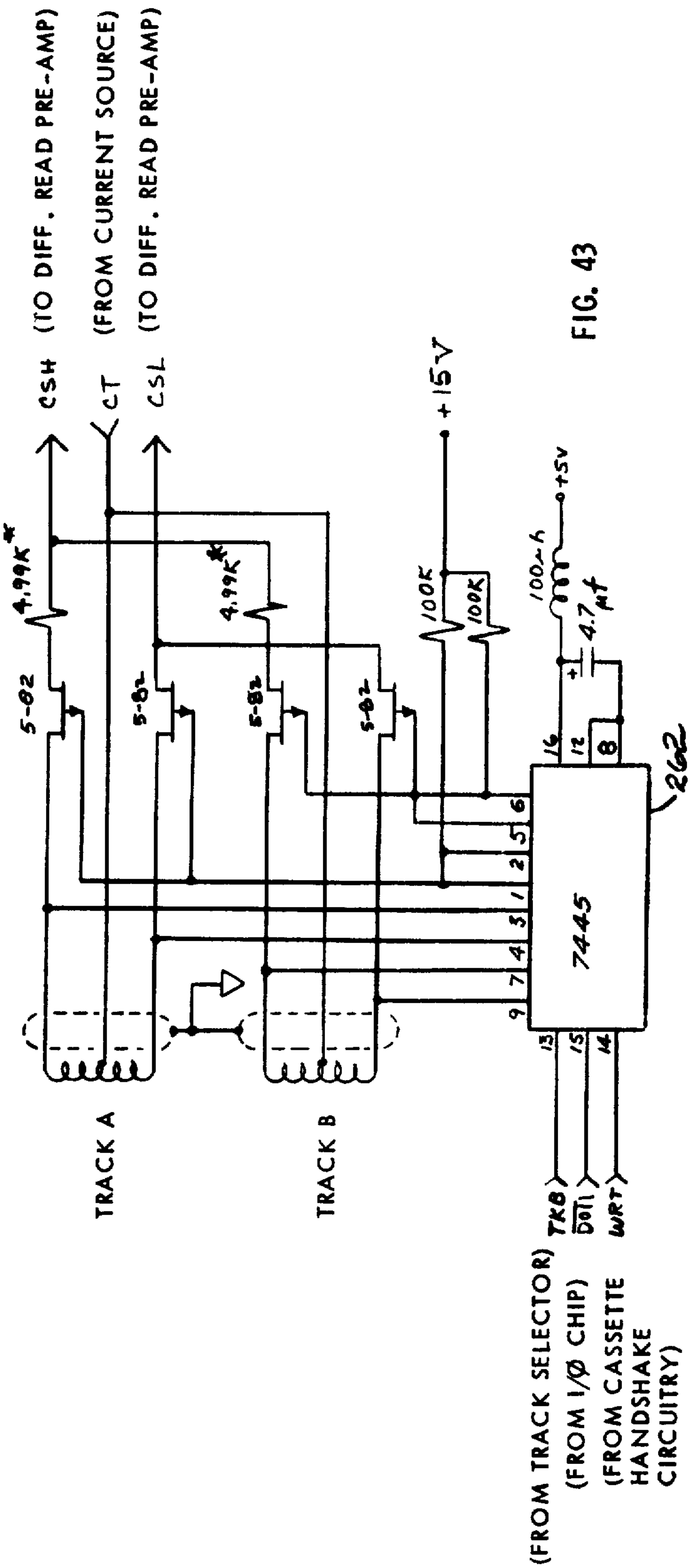
FIG. 43 is a detailed schematic diagram of the write and switch control circuitry and the analog switches of FIG. 31.

The analog control signal on line OA is amplified and buffered by an operational amplifier comprising a voltage gain circuit 228, shown in detail in FIG. 39. Voltage gain circuit 228 drives a class B current gain circuit 230 is drive servo motor 206. Servo motor 206 may be characterized as a fractional horsepower DC permanent magnet motor. A 1-microfarad capacitor 232 is mounted across the motor terminals to restrict high frequency brush noise to the grounded motor housing.

Operation of the motor speed control system may be divided into an acceleration mode, a servo lock or steady state mode, and a deceleration mode.

During the acceleration mode, the servo loop is closed but is not locked to the reference frequency signal. In order to avoid excessive stress on the tape, servo motor, power supplies, and other components of the magnetic tape cassette unit, the gain of the servo loop is reduced. Loop gain is directly proportional to the value of the current on line OA from bilateral current source 216. The magnitude of this current is determined by a gain selector 234, shown in detail in the schematic diagram of FIG. 37. The state of a D flip-flop 236 switches a transistor 238 from cutoff to saturation. If transistor 238 is saturated, a high gain condition exists, and the current from bilateral current source 216 is at a maximum. On the other hand, if transistor 238 is at cutoff, a low gain condition exists, and the current from bilateral current source 216 is reduced. Before the acceleration mode is entered, a signal from PIA 106 on a $\overline{\text{STOP}}$ line selects the low gain condition.

When the servo loop has locked to the reference frequency signal, the acceleration mode has been completed. At this point it is desirable to increase the bandwidth of the servo loop by increasing its gain. The high gain condition is restored by pulling a line $Q_f$ high, signifying that $F_f > F_r$. The high gain condition remains until the deceleration mode is initiated.

Figure 35:
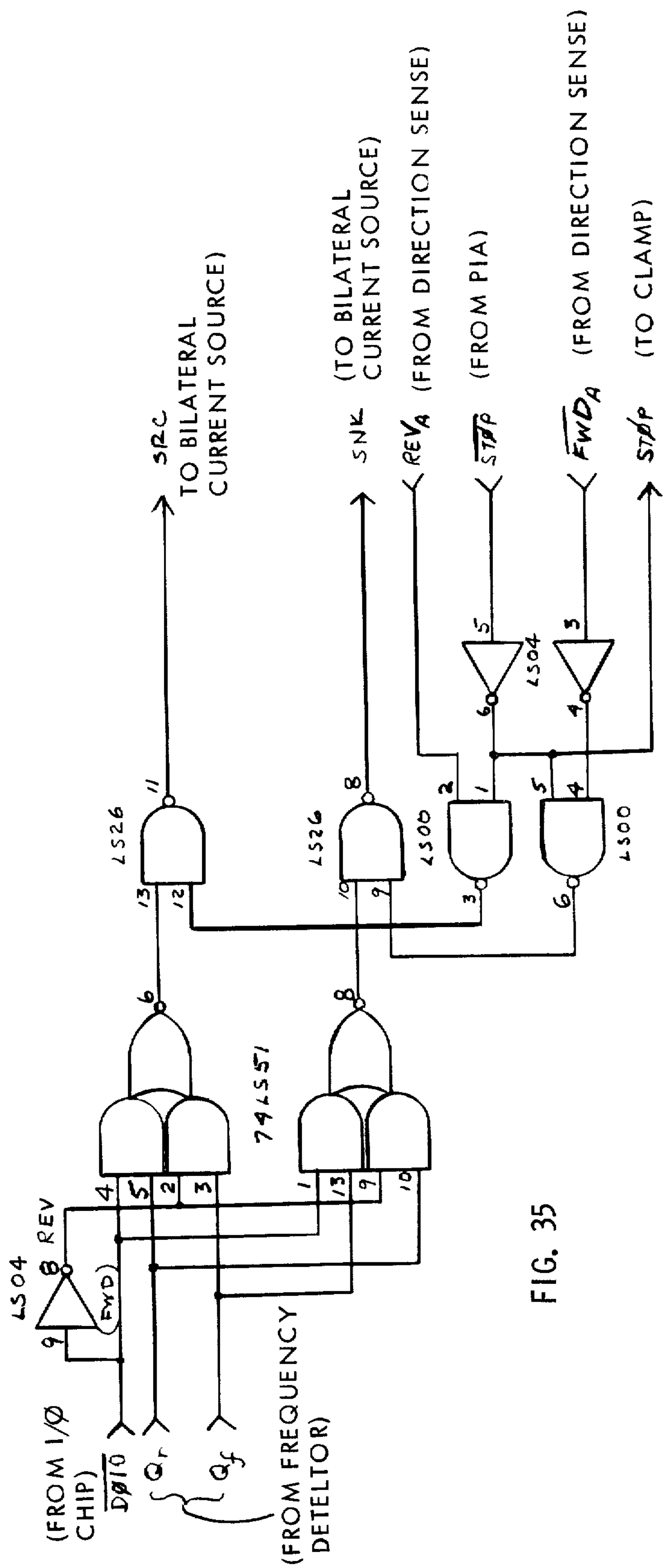
FIG. 35 is a detailed schematic diagram of the multiplexer of FIG. 30.
Figure 36:
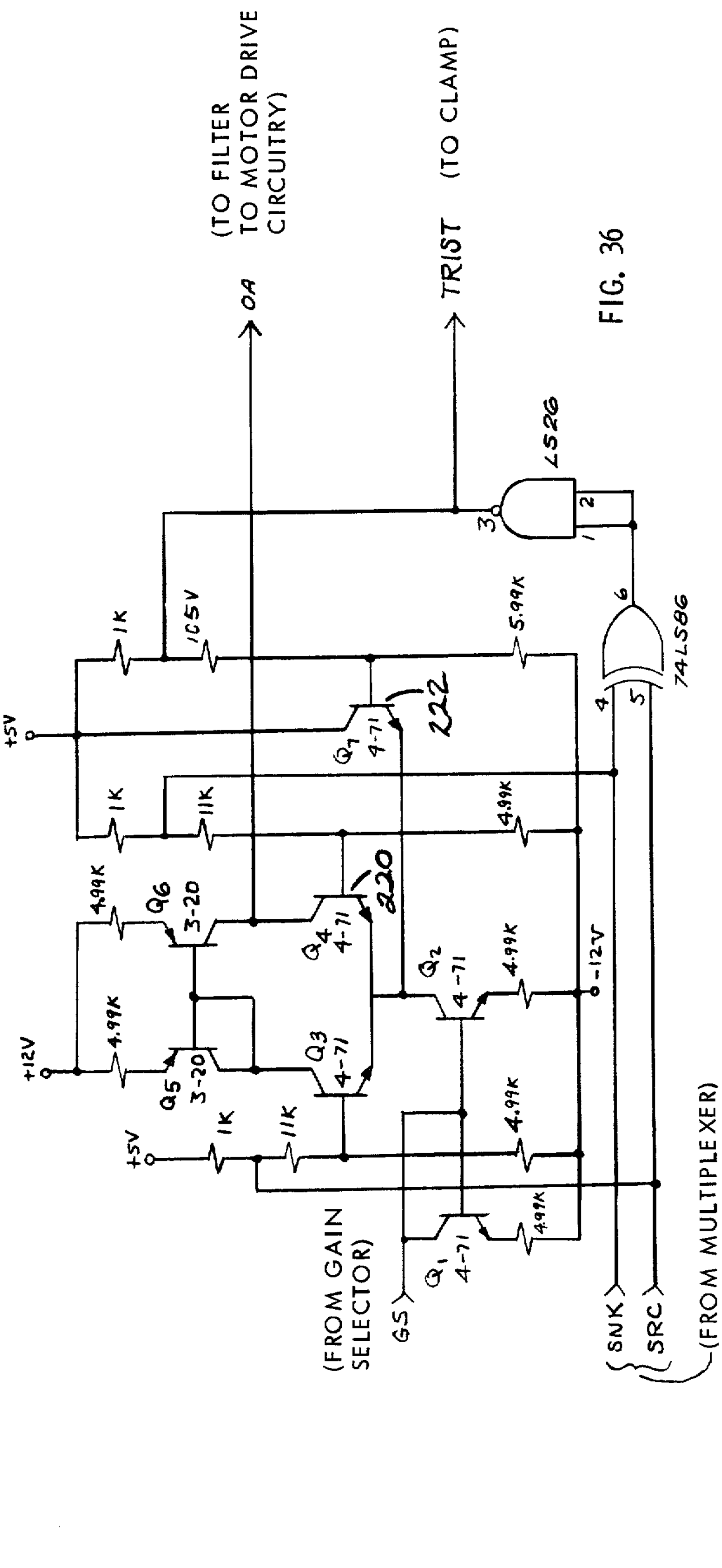
FIG. 36 is a detailed schematic diagram of the bilateral current source of FIG. 30.
Figure 37:
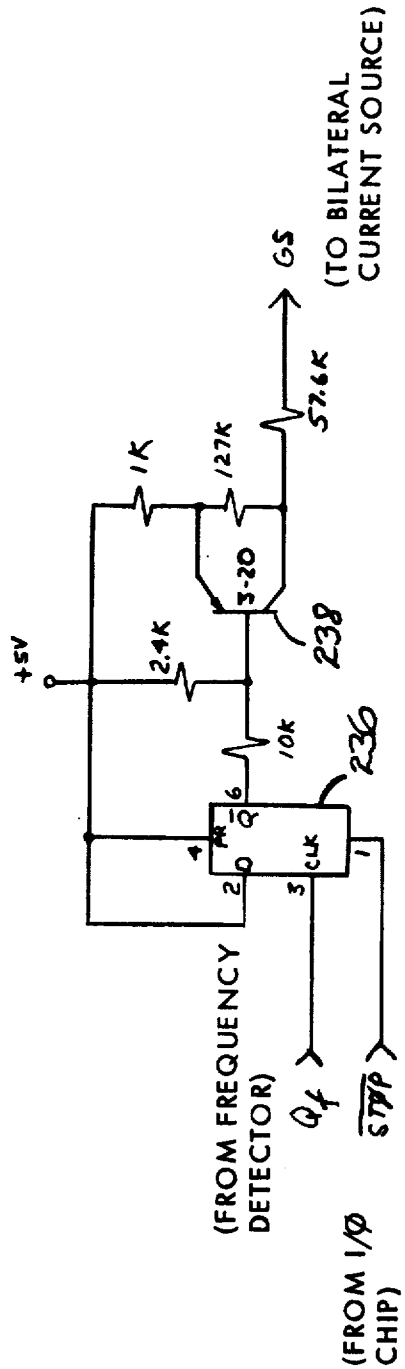
FIG. 37 is a detailed schematic diagram of the gain selector of FIG. 30.

During the deceleration mode the low gain condition is again selected by pulling the $\overline{\text{STOP}}$ line low. For controlled deceleration, a capacitor 240 in FIG. 38 is sensed to determine whether it is charged positively or negatively and is then linearly discharged or charged via bilateral current source 216 toward ground. Direction sense circuit 226 provides a 2-bit low power TTL-compatible output $\overline{\text{FWD}}_A$ and $\text{REV}_A$. If the voltage on capacitor 240 is greater than +0.3 volts, $\overline{\text{FWD}}_A = 0$ and $\text{REV}_A = 0$. If the capacitor voltage is less than −0.3 volts, $\overline{\text{FWD}}_A = 1$ and $\text{REV}_A = 1$. If the capacitor voltage lies within these limits, then $\overline{\text{FWD}}_A = 1$ and $\text{REV}_A = 0$. Pulling the line $\overline{\text{STOP}}$ to logical zero forces both $Q_r$ and $Q_f$ to logical zero, as shown in FIG. 34. This condition also gates the $\overline{\text{FWD}}_A$ and $\text{REV}_A$ lines into mulitplexer 214 to control the SRC and SNK lines, as shown in FIG. 35. Thus, the bilateral current source 216 is enabled to either charge or discharge capacitor 240 of FIG. 38 toward ground. When the capacitor voltage is reduced to lie within the range of +0.3 volts to −0.3 volts so that $\overline{\text{FWD}}_A = 1$ and $\text{REV}_A = 0$ the TRIST line is pulled high, and capacitor 240 is clamped to ground until the STOP line is pulled low to enter the acceleration mode. Regardless of the load presented to motor 206 by a particular tape cartridge at any time during the steady state mode, the stopping distance remains nearly constant. This results from the fact that a heavy load requires a higher voltage at the motor for servo lock. In addition, a heavier load means that the motor will stall at a higher voltage level. Hence, tape movement will halt in an approximately constant distance independent of load and voltage levels.

An antimotion circuit 242 prevents servo motor 206 from moving during the power turn-on and turn-off cycles of the calculator. This circuit is shown in the detailed schematic diagram of FIG. 40. Motion is inhibited as long as line $\overline{\text{MPWO}}$ is held to logical zero.

General tape position information exists as a punched hole configuration in the magnetic tape. These holes are detected by means of a hole detection circuit 244, shown in detail in the schematic diagram of FIG. 42, basically comprising an incandescent light source 246 and a photo transistor 248. Photo transistor 248 drives a passive low pass filter, the voltage at which is related to a fixed threshold at the differential inputs of an operational amplifier 250. The operational amplifier 250 is configured as a comparator with positive feedback. Some logic circuitry following operational amplifier 250 generates a TTL-compatible logic signal HOL. The line HOL, a cartridge status line CIN, and a write prevent line WPR are inverted and presented on lines D12, D10, and D11, respectively, of data input bus 146. These signals are issued in response to a signal $\overline{\text{CSEN}}$, by cassette handshake circuitry 252, shown in detail in the schematic diagram of FIG. 41. If a tape cartridge is ejected from magnetic tape cassette unit 12, line CIN is pulled low. If a hole is detected in the magnetic tape, line HOL is pulled high. In the event either of these conditions exists, a signal is issued on an interrupt line CB1.

Referring now to FIG. 31, there is shown a detailed block diagram of read-write circuitry associated with the magnetic tape cassette unit 12. A dual track, dual center tapped magnetic head 254 is employed for information transfer. A current source and write protect circuit 256, shown in detail in the schematic diagram of FIG. 44, drives magnetic head 254. A transistor 258 serves as the current source. Writing occurs when one of the head lines is switched from an open condition to a low condition. Current, as set by current source 256, is then allowed to flow from the center tap to the selected head line, thus setting up a flux field in the head gap. At some later point in time, the second head line associated with the selected track is switched from an open condition to a low condition. At the same time, the previously switched head line returns to an open condition. Current now flows from the center tap to the head line that is being held low. The flux field at the head gap is reversed, and the magnetic tape is saturated in the opposite polarity. A flux reversal is said to have been written on the tape. Information is written on the tape by alternately producing low and open conditions on the head lines associated with a selected track.

Figure 44:
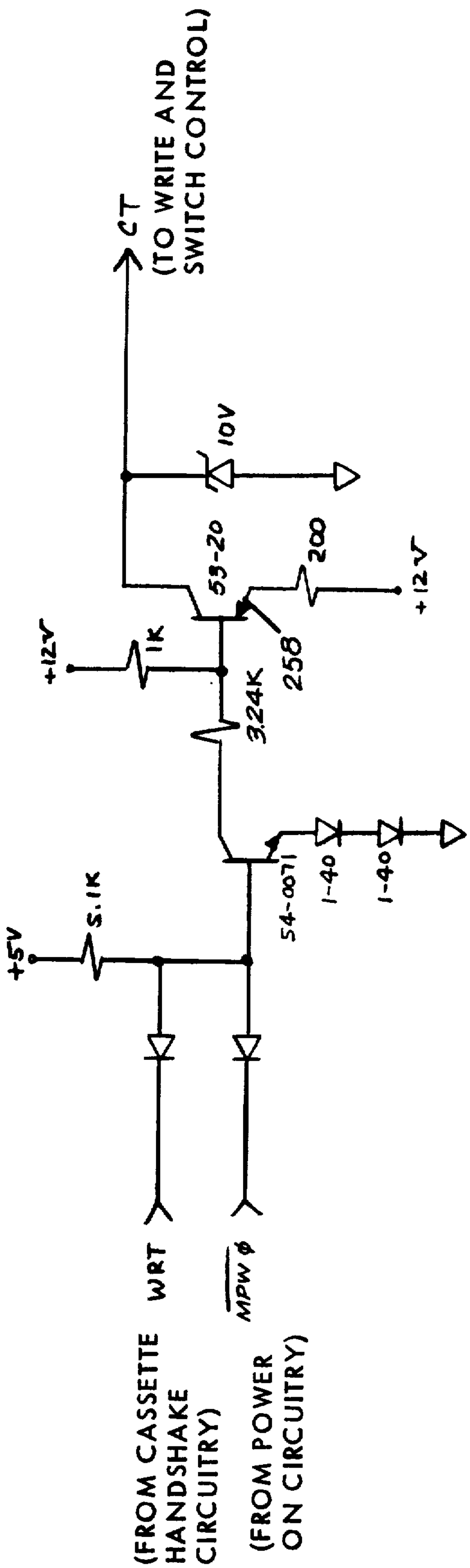
FIG. 44 is a detailed schematic diagram of the current source and write protect circuitry of FIG. 31.
Figure 45:
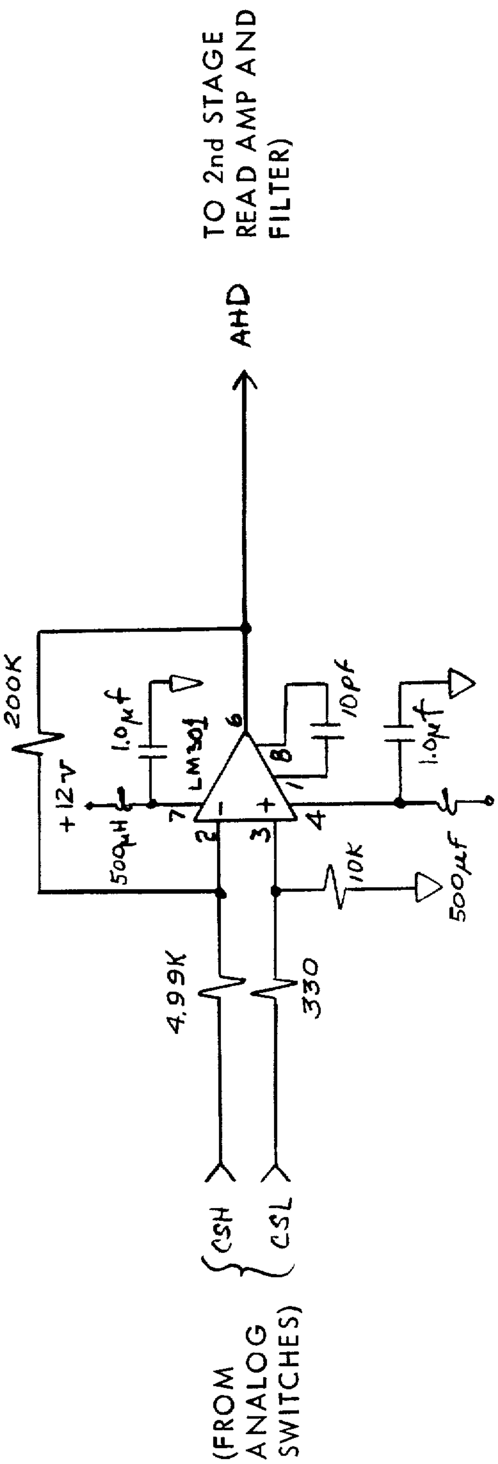
FIG. 45 is a detailed schematic diagram of the differential preamplifier of FIG. 31.
Figure 46:
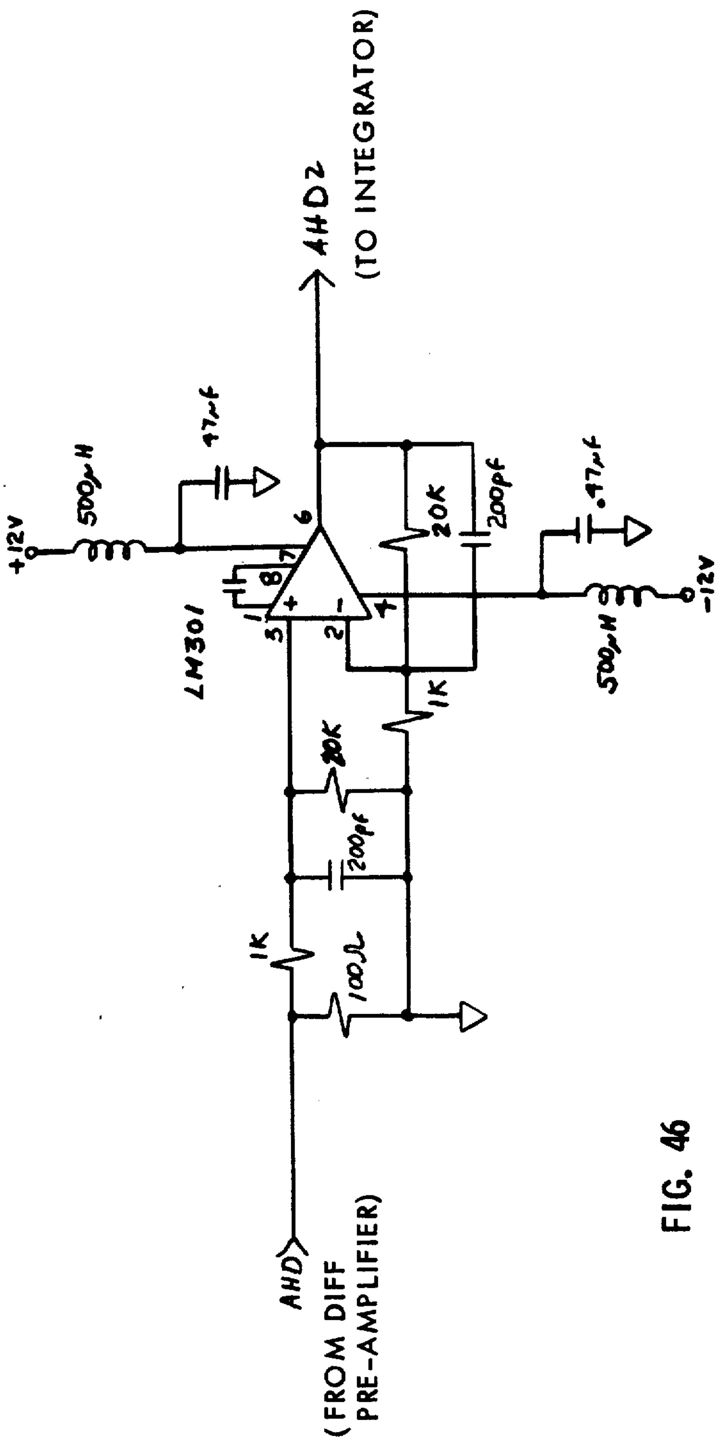
FIG. 46 is a detailed schematic diagram of the second stage amplifier/filter of FIG. 31.

A group of analog switches 260 performs the function of switching the magnetic head lines. These switches and associated logic circuitry are shown in detail in the schematic diagram of FIG. 43. A binary-to-decimal decoder 262 with high voltage open collector outputs is arranged to decode an incoming data stream on line DO11 of data output bus 132. Decoder 262 also decodes a track select line TKB and a write line WRT. Current source 256 is turned off when power turn-on or turn-off occurs in the calculator or when line WRT is pulled low, as shown in FIG. 44.

A read operation uses the full track width of the magnetic head 254 for maximum signal strength. The center tap of the head is not used. Analog switches 260 gate the magnetic head signals of the selected track to the inverting and non-inverting inputs of a differential preamplifier 264, shown in detail in the schematic diagram of FIG. 45. As in write operations, the binary-to-decimal decoder 262 of FIG. 43 controls the analog switching. Preamplifier 264 is configured differentially to maximize common mode rejection. The gain of this preamplifier is adjusted to compensate for differences in individual head characteristics. Flux reversals previously written on the moving tape produce current reversals in the magnetic head. These current reversals appear as positive and negative voltage pulses on an output line AHD of differential preamplifier 264. The nominal signal level on line AHD is 136 millivolts peak to peak.

A second stage amplifier/filter 266 applies an additional voltage gain factor of twenty to read signal. Circuit details of second stage amplifier/filter 266 are shown in the schematic diagram of FIG. 46. A low impedance input is provided for better noise immunity. Amplifier/filter 266 is configured to provide equal gain for the signal on line AHD and for signals appearing at an inverting input to improve the common mode rejection. A single pole filter at approximately 40 kilohertz provides high frequency attenuation. The signal on an output line AHD2 of amplifier/filter 266 is nominally 2.6 volts peak to peak.

Figure 47:
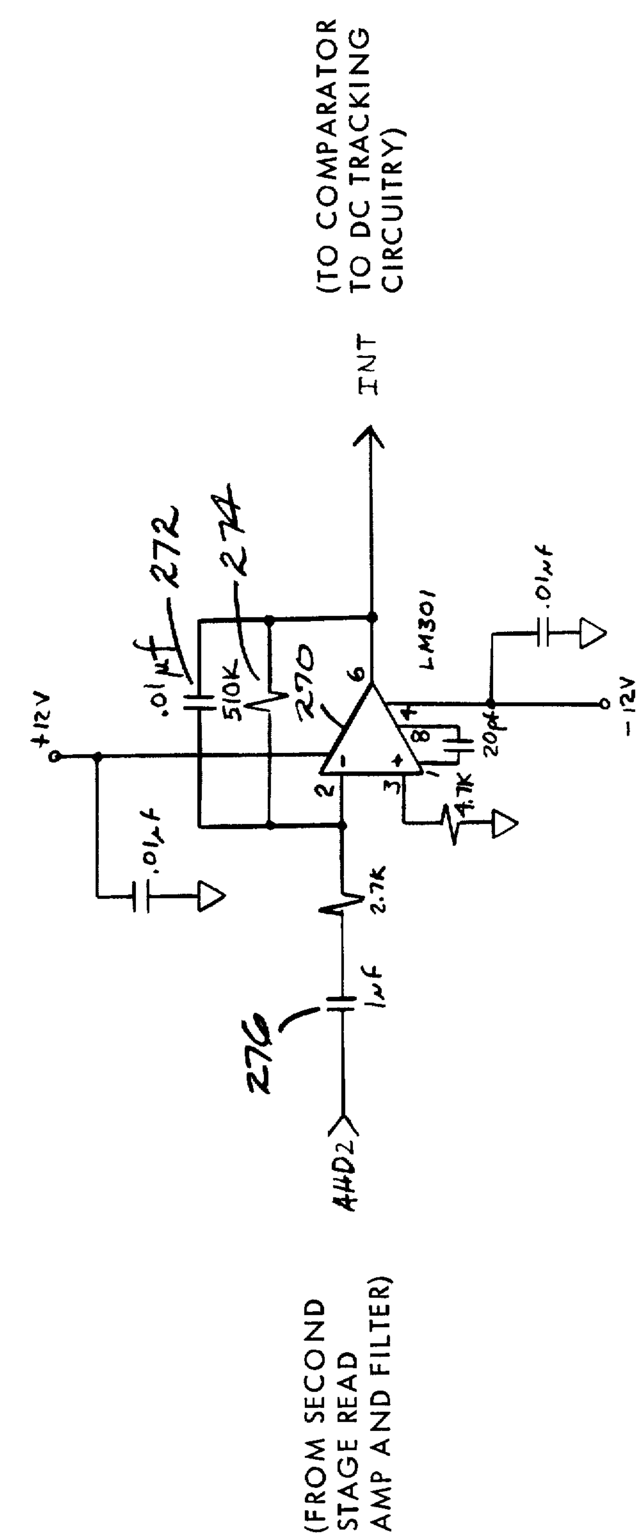
FIG. 47 is a detailed schematic diagram of the integrator of FIG. 31.
Figure 48:
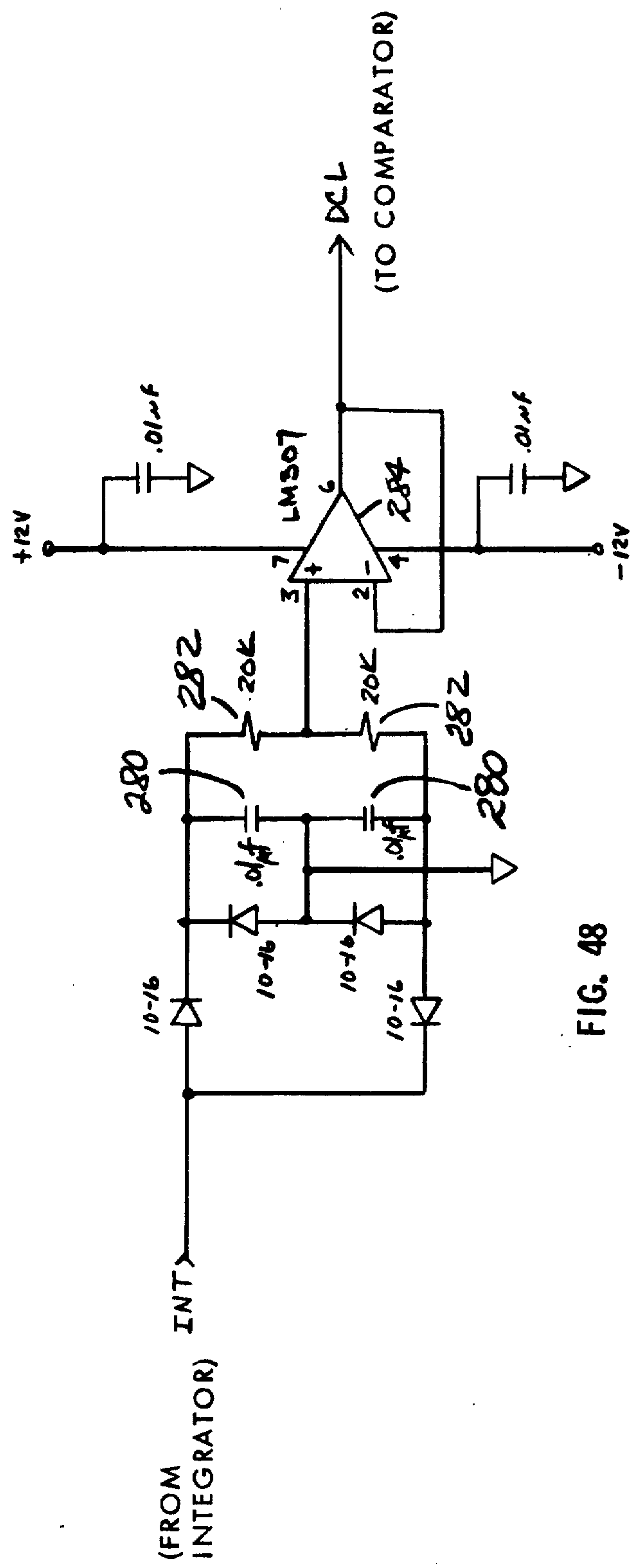
FIG. 48 is a detailed schematic diagram of the DC tracking circuit of FIG. 31.

The output of second stage amplifier/filter 266 is connected to an integrator 268, shown in detail in the schematic diagram of FIG. 47. The inverting input of an operational amplifier 270 is at virtual ground. Thus, the voltage on an integrating capacitor 272 relative to ground is dynamically adjusted to be proportional to the area of the signal on input line AHD2. A resistor 274 provides a feedback path for DC biasing purposes. A capacitor 276 blocks the DC offset of previous amplifier stages and allows only unity DC gain for integrator 268. This arrangement serves to attenuate low frequency noise. Integraror 268 also attenuates high frequency noise because of the fact that integrators inherently respond to signal area. As the magnetic tape accelerates or decelerates, the level of the signal at the magnetic head, as well as its frequency, increases or decreases. Hence, the area of the voltage pulses remains relatively constant, and the integrator can track speed variations with small peak to peak variations from the nominal level of the output signal on a line INT.

Because the integrator is sensitive to input signal area, changes in area produce dynamic variations in the DC component of the signal on line INT. This condition is compounded by the loss introduced by biasing resistor 274. To alleviate this problem, the signal on line INT is sampled both above and below ground level and a CD tracking circuit 278, shown in detail in the schematic diagram of FIG. 48. Germanium diodes are employed because of their low voltage turn-on characteristics and so that the sampling signal is in phase with the signal on input line INT. A pair of capacitors 280 retains the sampled voltage levels. Two resistors 282 are employed as summing inputs for an operational amplifier 284 configured as a voltage follower. These resistors are also required for charging and discharging capacitors 280 to enable sampling of subsequent voltage peaks.

Figure 49:
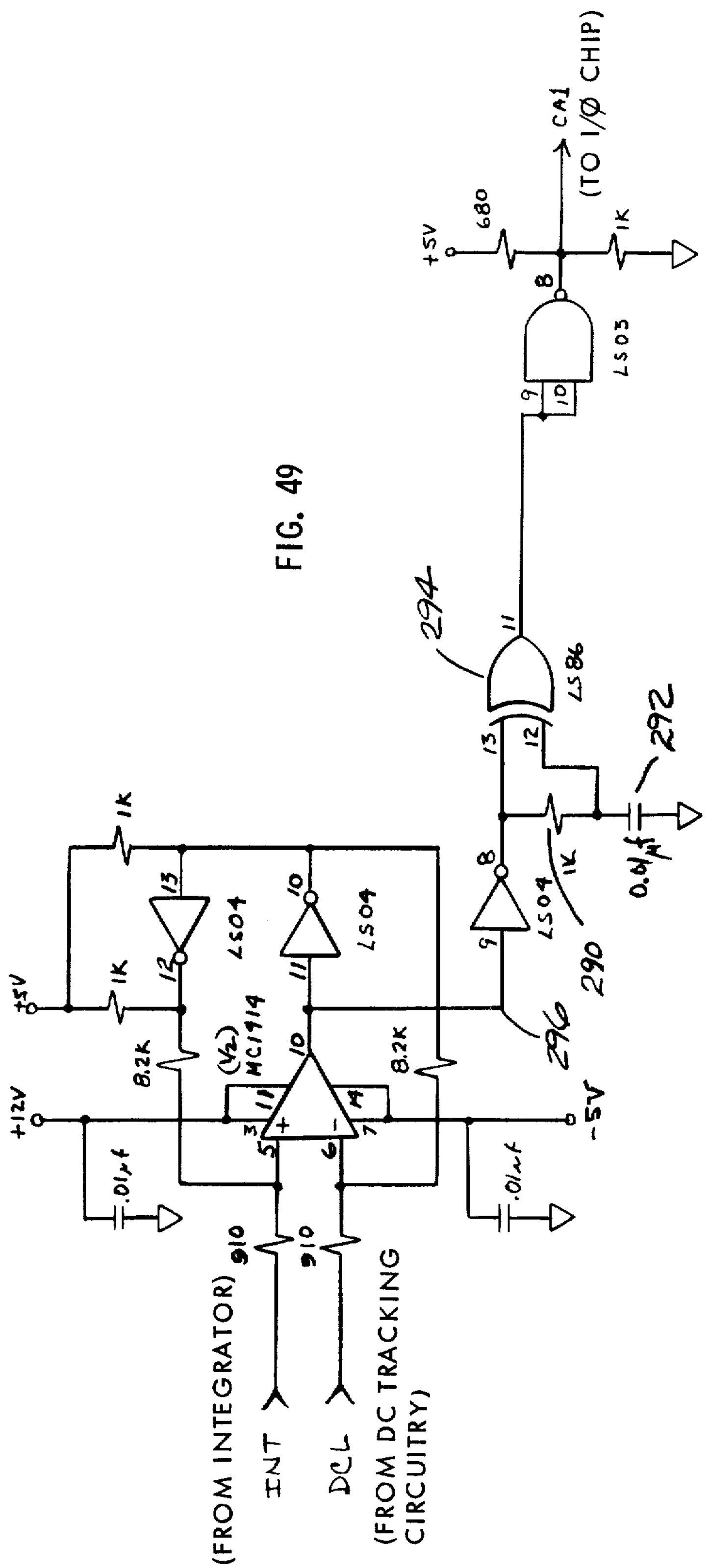
FIG. 49 is a detailed schematic diagram of the comparator and frequency doubler of FIG. 31.

A comparator 286, shown in detail in the schematic diagram of FIG. 49, receives line INT from integrator 268 and a line DCL from DC tracking circuit 278. Since the signal on line DCL should track the DC component of the signal on line INT, comparator 286 functions basically as a relative zero crossing switch with a TTL-compatible output. To create some effective hysteresis for noise immunity, positive feedback is provided through inverters to each of the inputs of comparator 286. Voltage division is employed to determine the amount of voltage hysteresis.

A frequency doubler 288 in FIG. 31 is also included in the circuitry of FIG. 49. A resistor 290 and a capacitor 292 provide a slight time dealy at one of the inputs to an exclusive OR gate 294. The other input is not delayed. Thus, each rising or falling edge of the signal on a comparator output line results in a pulse at the output of exclusive OR gate 294. The rising edge of each of these pulses is coincident with an edge of the output signal of the comparator. The rising edge becomes a falling edge at line CA1 that is fed to PIA 106.

POWER SUPPLIES

Figure 54:
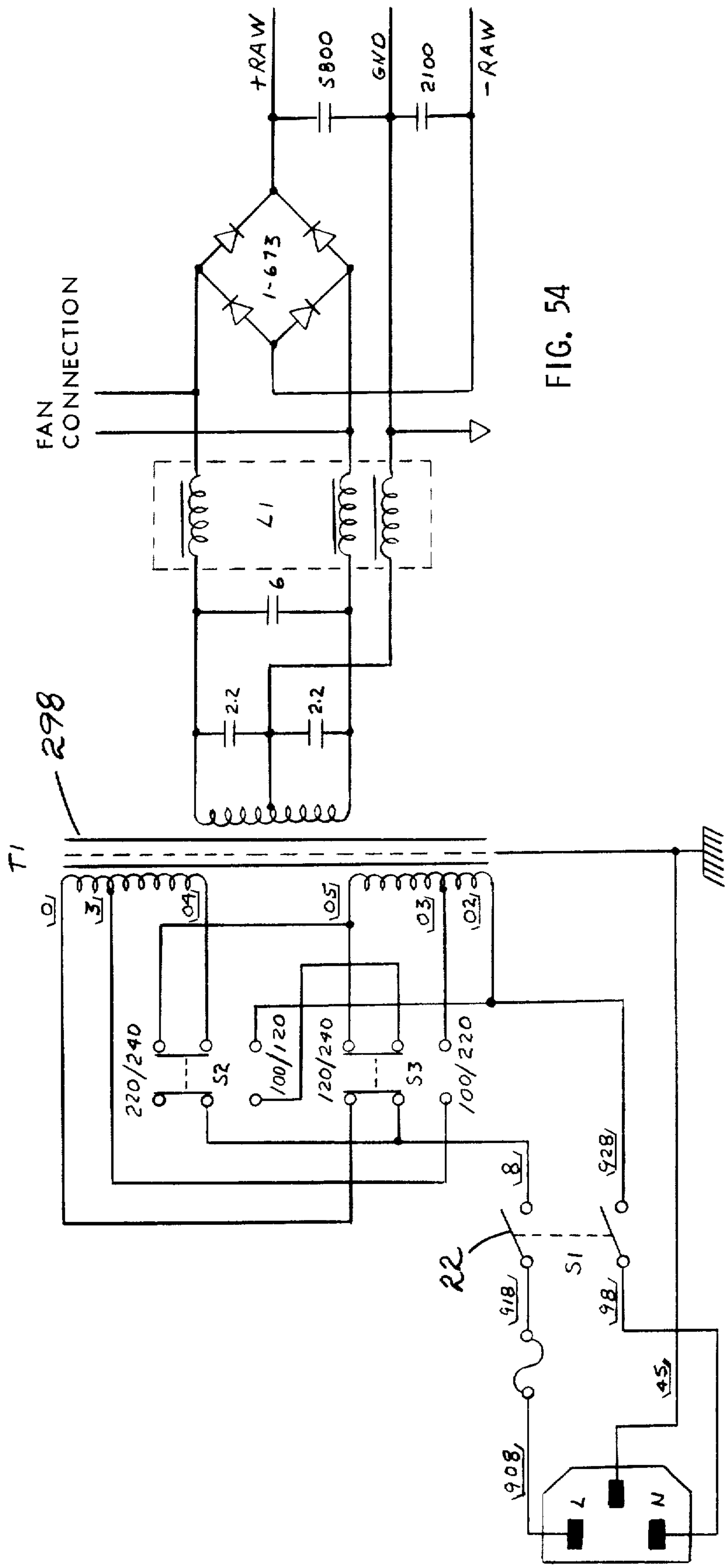
FIG. 54 is a detailed schematic diagram of the raw power supply employed in the calculator of FIG. 1.

Operation of the power supplies that power the calculator hardware may be understood with reference to the detailed schematic diagrams of FIGS. 54–59. When a power switch 22 of FIGS. 1 and 54 is placed in the "on" position, AC line voltage is supplied to the primary of a transformer 298 through a pair of switches on the primary side of transformer 298. These switches are arranged to accept any one of four AC line voltages. These may be 100, 120, 220 or 240 volts. Secondary filtering is employed to reduce interference on the AC line. A full wave bridge rectifier is employed to provide both positive and negative raw voltages of approximately 25 volts on a pair of lines +RAW and −RAW.

Figure 55:
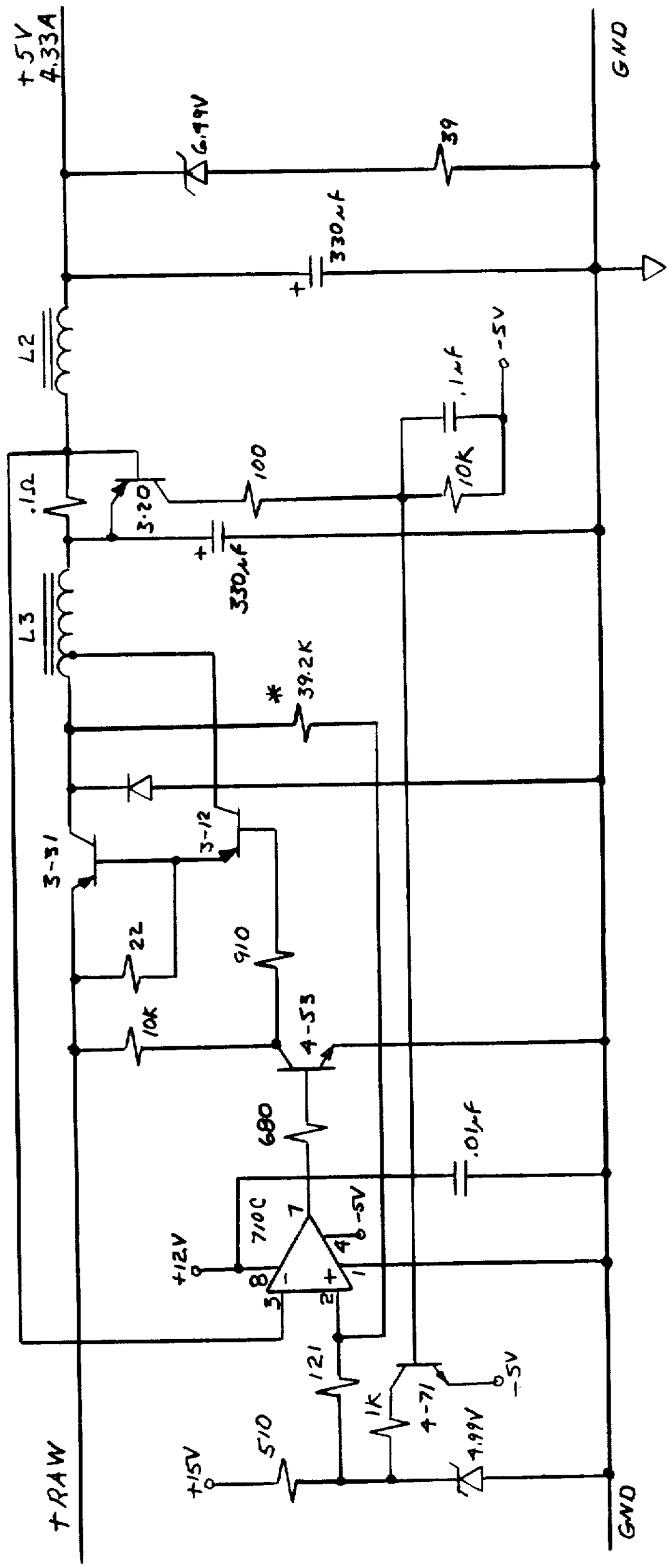
FIG. 55 is a detailed schematic diagram of the +5 volt switching regulator power supply employed in the calculator of FIG. 1.

Referring now to FIG. 55, there is shown a detailed schematic diagram of a switching regulator for deriving +5 volts from line −RAW.

Figure 56:
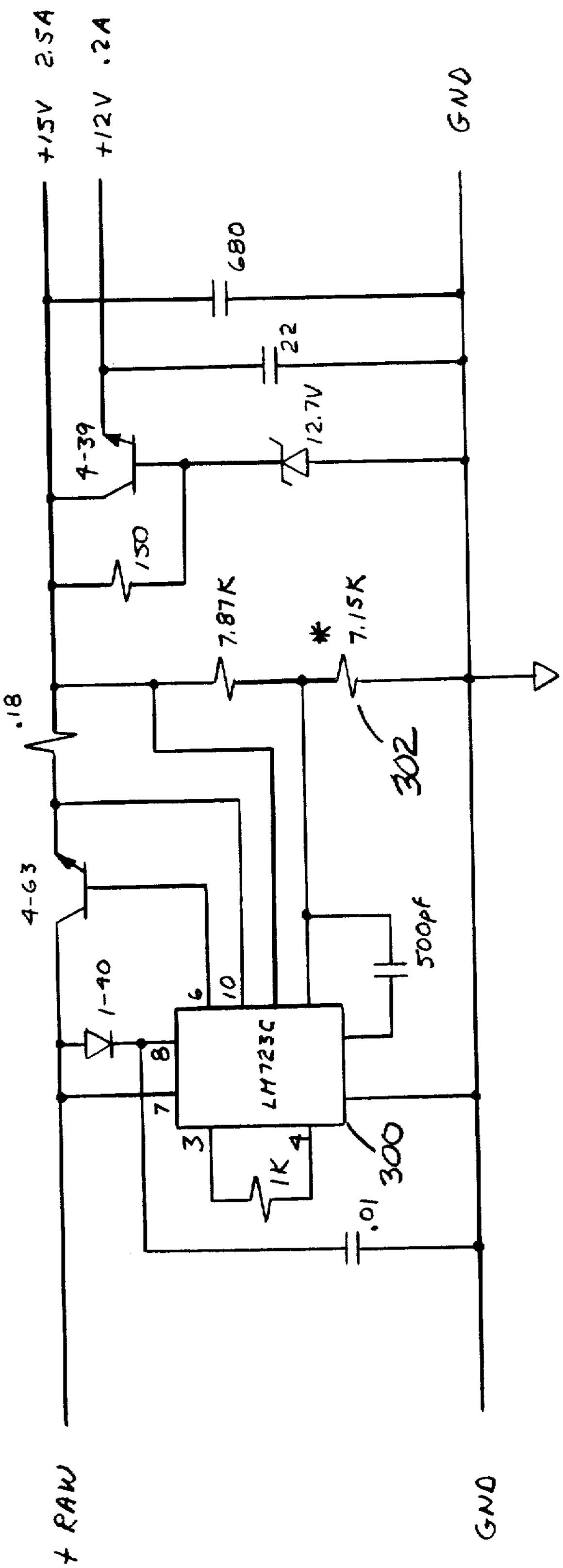
FIG. 56 is a detailed schematic diagram of the +12 and +15 volt power supplies employed in the calculator of FIG. 1.

Referring now to FIG. 56, there is shown a detailed schematic diagram of circuitry for supplying regulated voltages of +12 and +15 volts from line +RAW. The +15 volt supply employs a series pass regulator 300 that includes a current limit circuit. A resistor 302 may be adjusted to set the output voltage between 14.7 volts and 15.9 volts.

Figure 57:
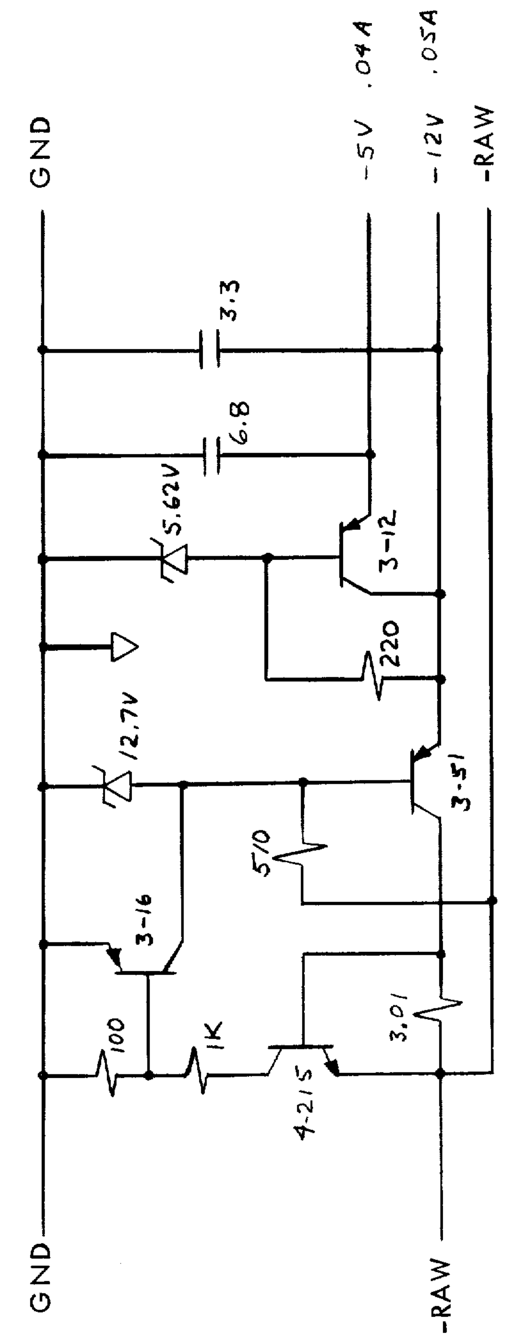
FIG. 57 is a detailed schematic diagram of the −5 and −12 volt power supplies employed in the calculator of FIG. 1.

Referring now to FIG. 57, there is shown a detailed schematic diagram for supplying −5 and −12 volts from line −RAW. This circuitry employs series pass regulators.

Figure 58:
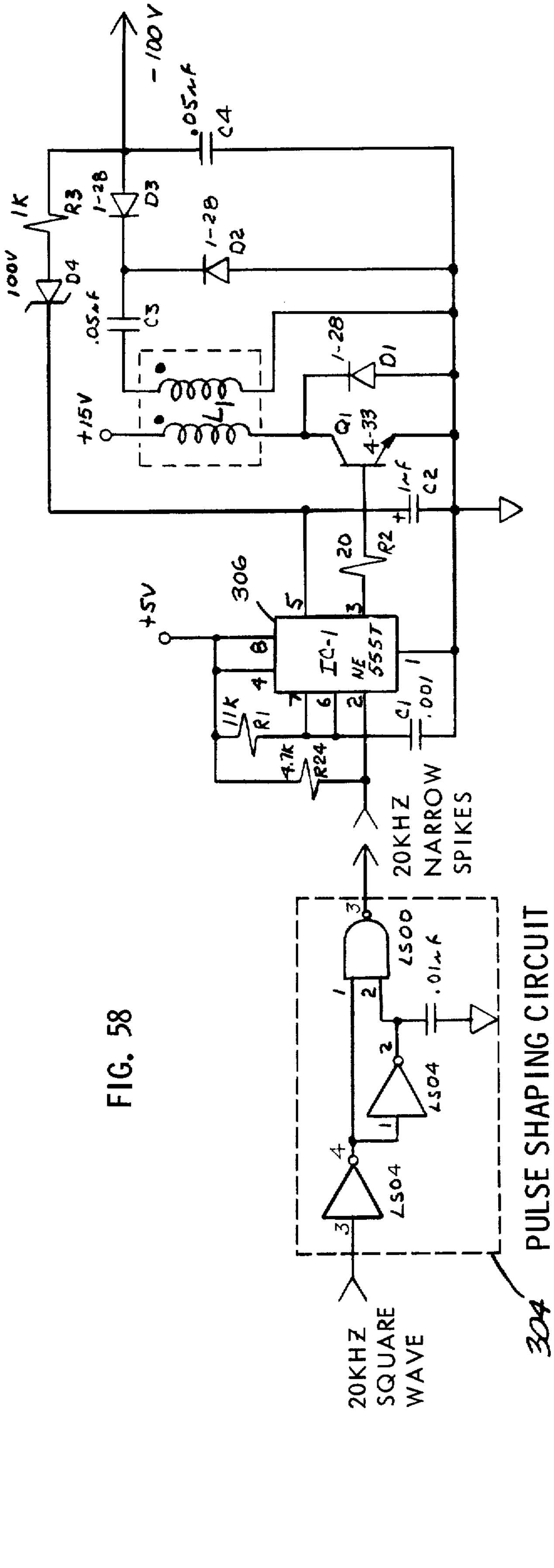
FIG. 58 is a detailed schematic of the −100 volt power supply employed in the calculator of FIG. 1.

Referring now to FIG. 58, there is shown a detailed schematic diagram of a −100 volt power supply and an associated pulse shaping circuit 304. Pulse shaping circuit 304 receives a 20-kilohertz square wave from system clock generator and divider 112 and produces a 20-kilohertz train of narrow pulses for use by the −100 volt power supply. The −100 volt supply is controlled by a timer 306. The negative pulses from pulse shaping circuit 304 are applied at pin 2 of timer 306. These pulses trigger the timer, resulting in charging a capacitor C1 through a resistor R1. At the same time, pin 3 is pulled high and turns on a transistor Q1. Timer 306 remains on until the voltage at pins 7 and 6 reaches the internal level or the feedback voltage on pin 5. At that point in time, the output at pin 3 is turned off, and pins 6 and 7 are clamped to ground, thus discharging the capacitor C1. These conditions remain until the next negative pulse appears at pin 2.

When transistor Q1 is turned on, 15 volts is applied across coil L1. Because of a 4:1 turns ratio on coil L1, the voltage applied to a capacitor C3 is 60 volts.

Timer 306 switches before the core of coil L1 saturates, thus generating a high flyback voltage across coil L1. As the voltage at the collector of transistor Q1 increases, the voltage at capacitor C3 decreases until a diode D3 becomes forward biased. This clamps the ringing voltage and dumps the energy into a capacitor C4. A diode D1 is employed to clamp the output voltage of transistor Q1 so that the negative ringing does not destroy the transistor. When the output voltage appearing across a capacitor C4 reaches −100 volts, a diode D4 begins to conduct. This begins to pull pin 5 of timer 306 lower than the internal reference. As the voltage on pin 5 decreases, the on time of timer 306 also decreases. This reduces the energy stored in the coil L1 and results in stabilizing the output voltage near −100 volts. A resistor R3 is employed to limit the charging current to a feedback capacitor C2.

Figure 59:
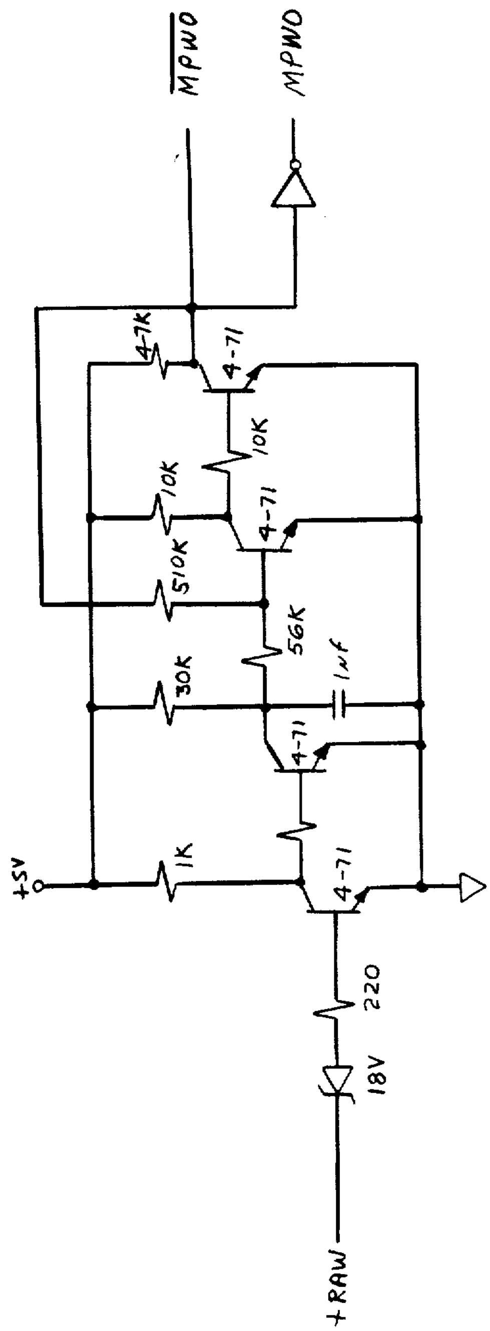
FIG. 59 is a detailed schematic diagram of a power on and power off detection circuit employed in the calculator of FIG. 1.
Figure 60:
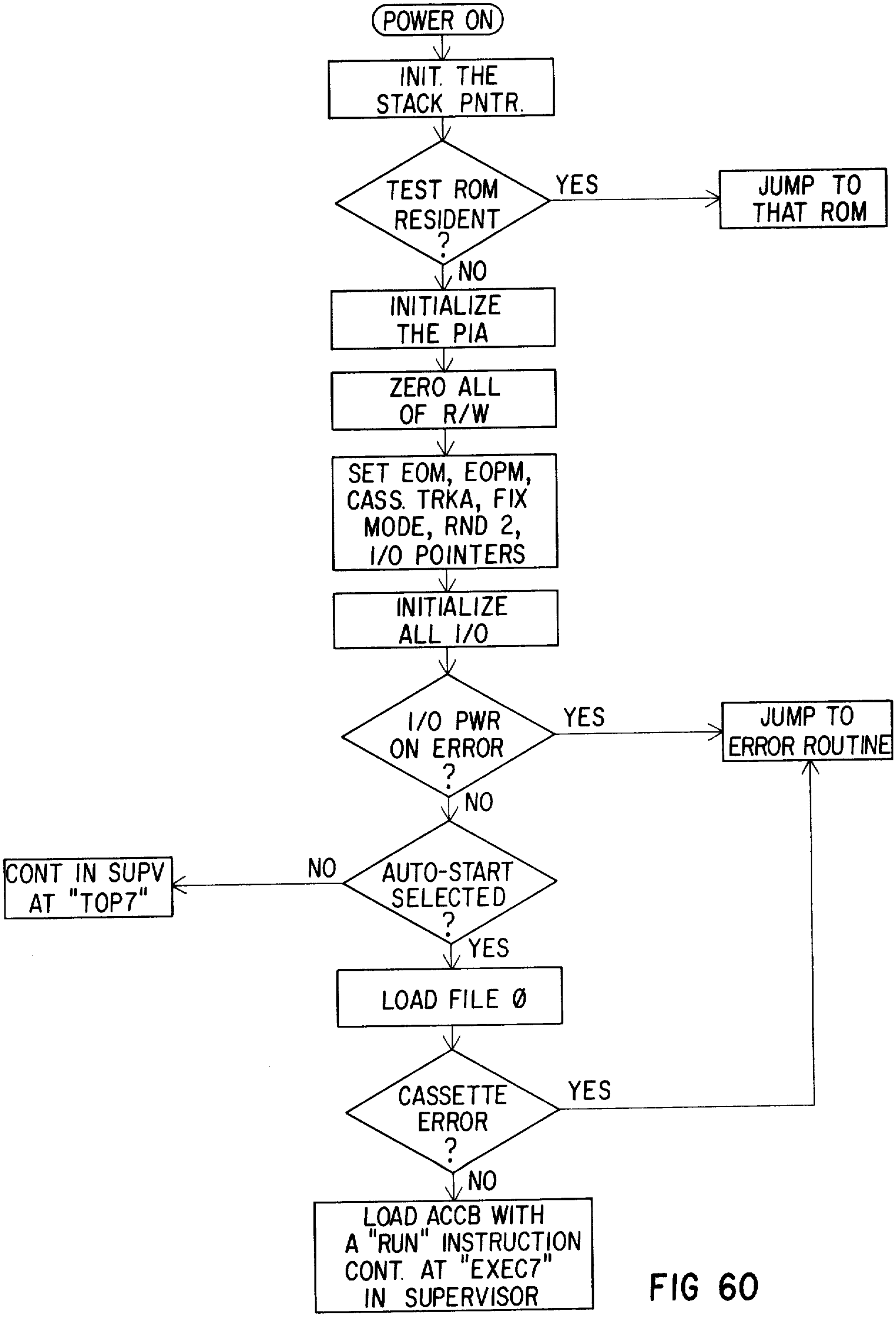
FIG. 60 is a flow chart of a power on routine comprising one of the supervisor routines of FIG. 5.
Figure 61A:
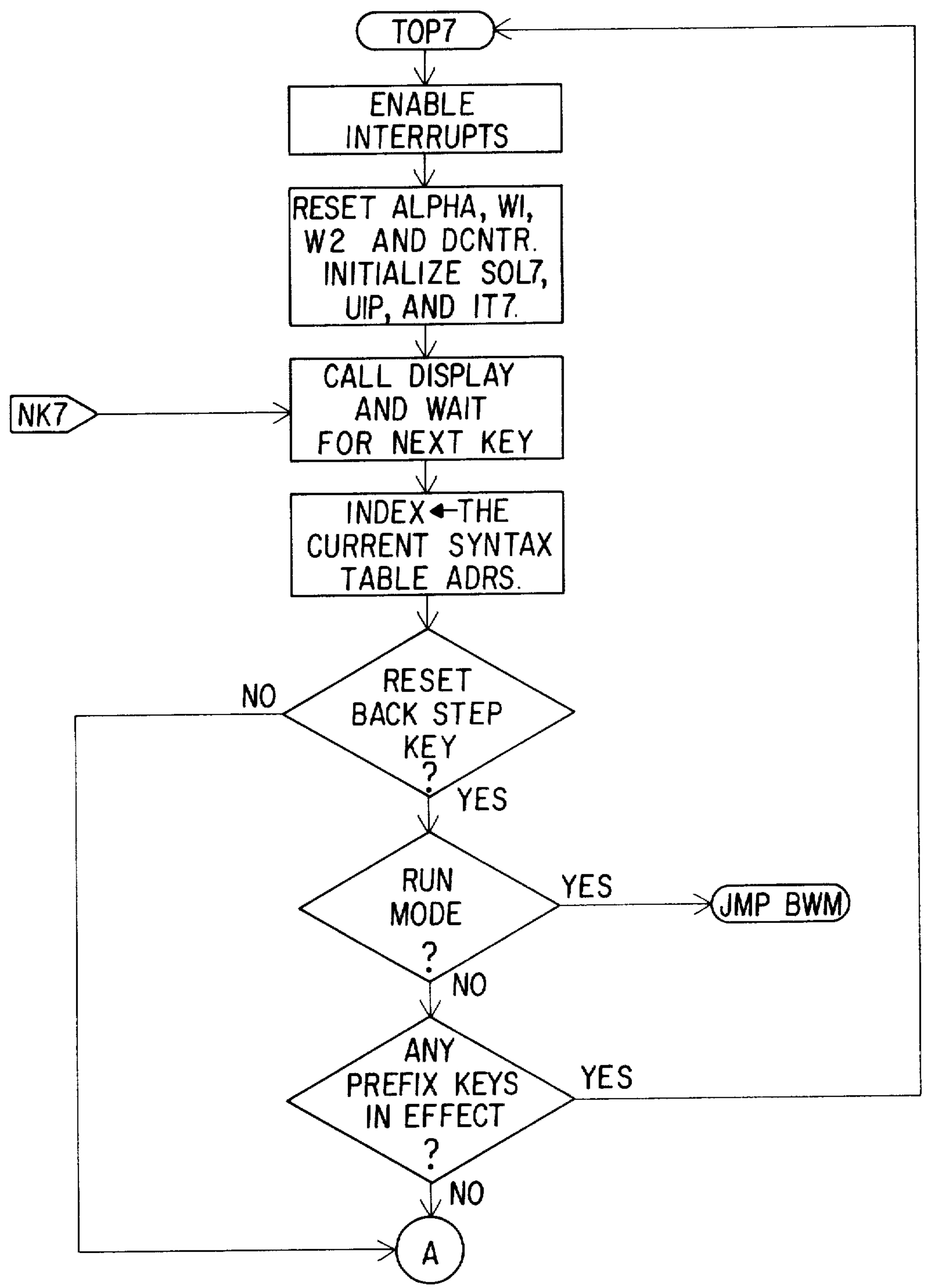
FIGS. 61A-E are a flow chart of a supervisor control routine comprising one of the supervisor routines of FIG. 5.
Figure 61B:
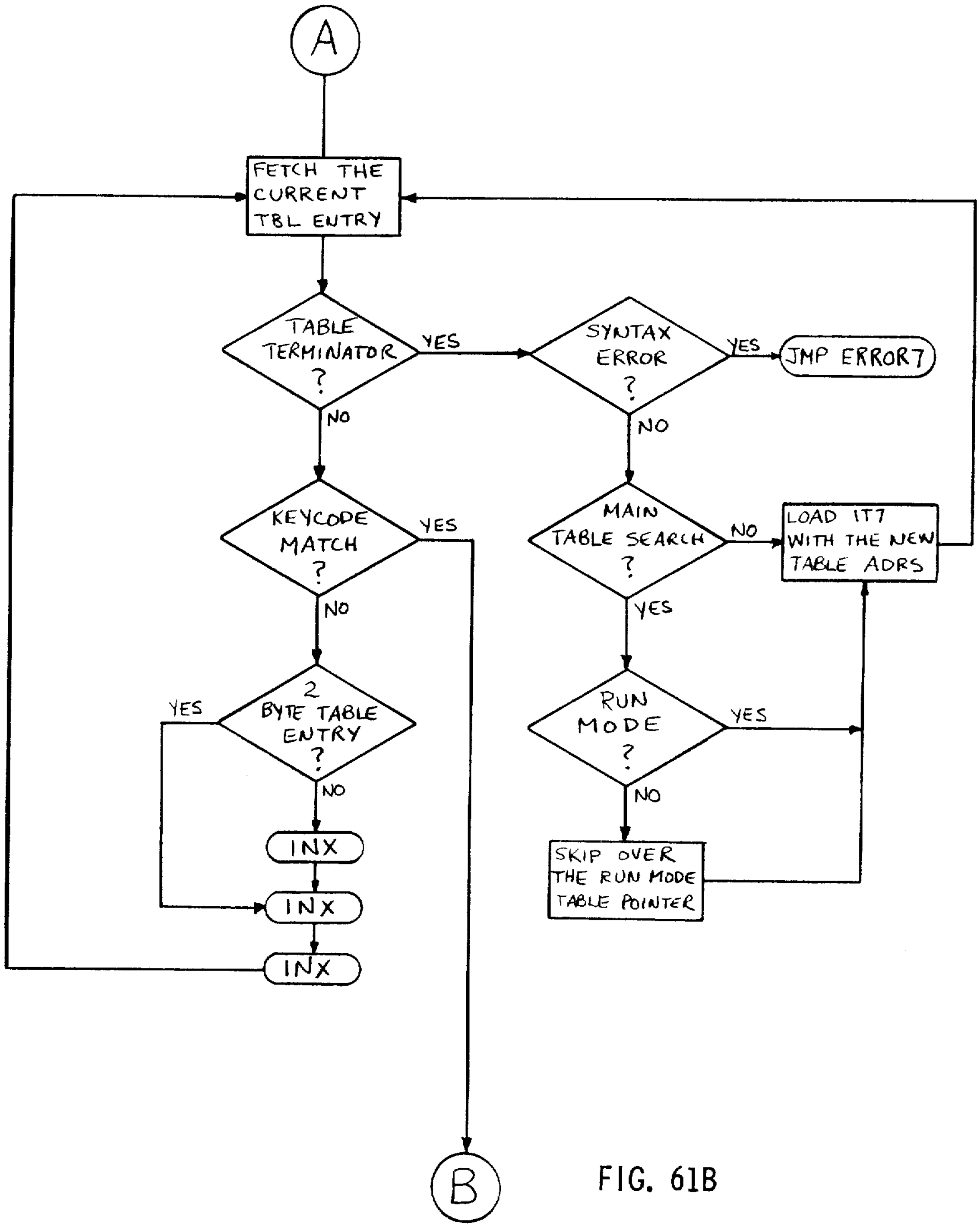
Figure 61C:
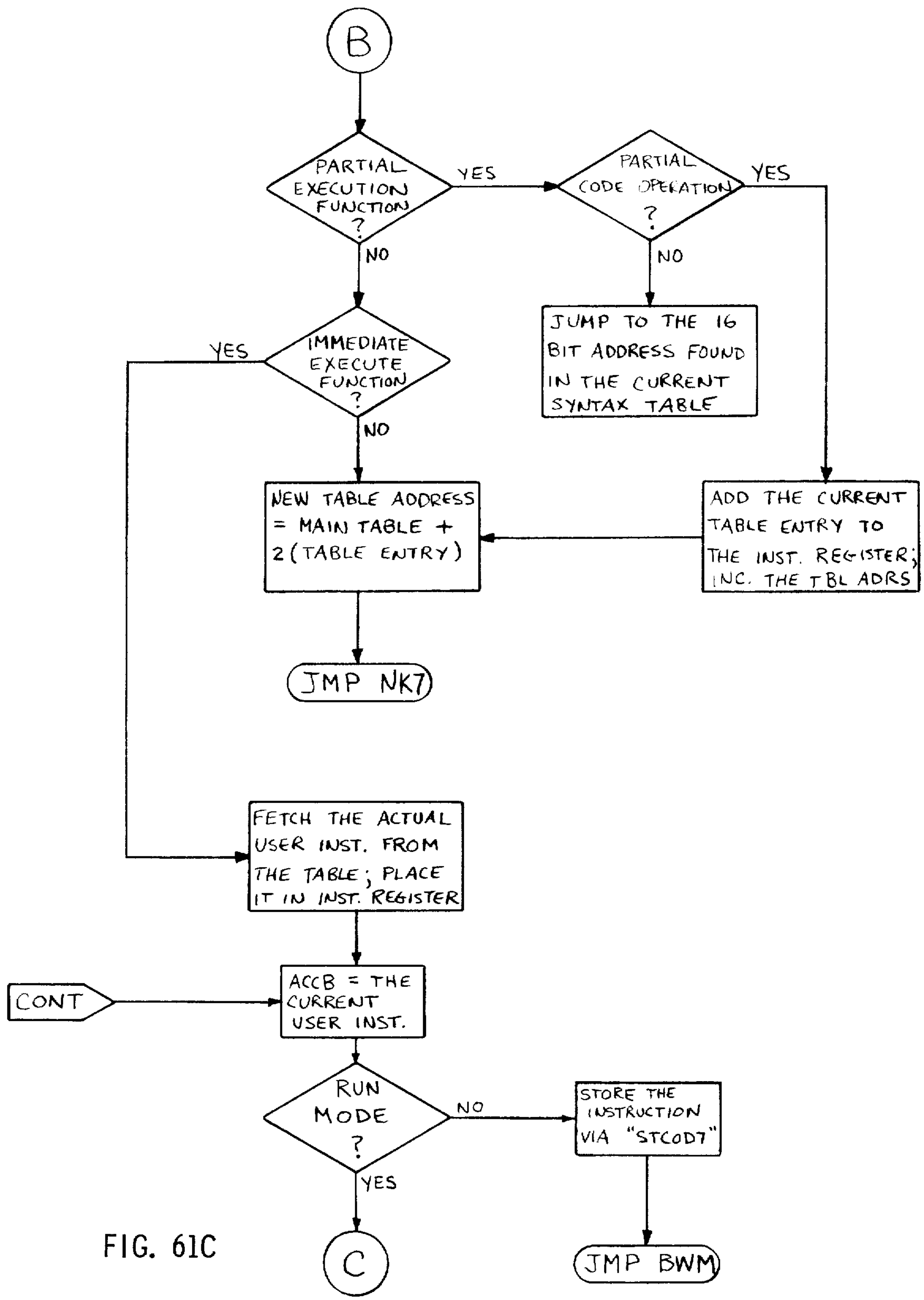
Figure 61D:
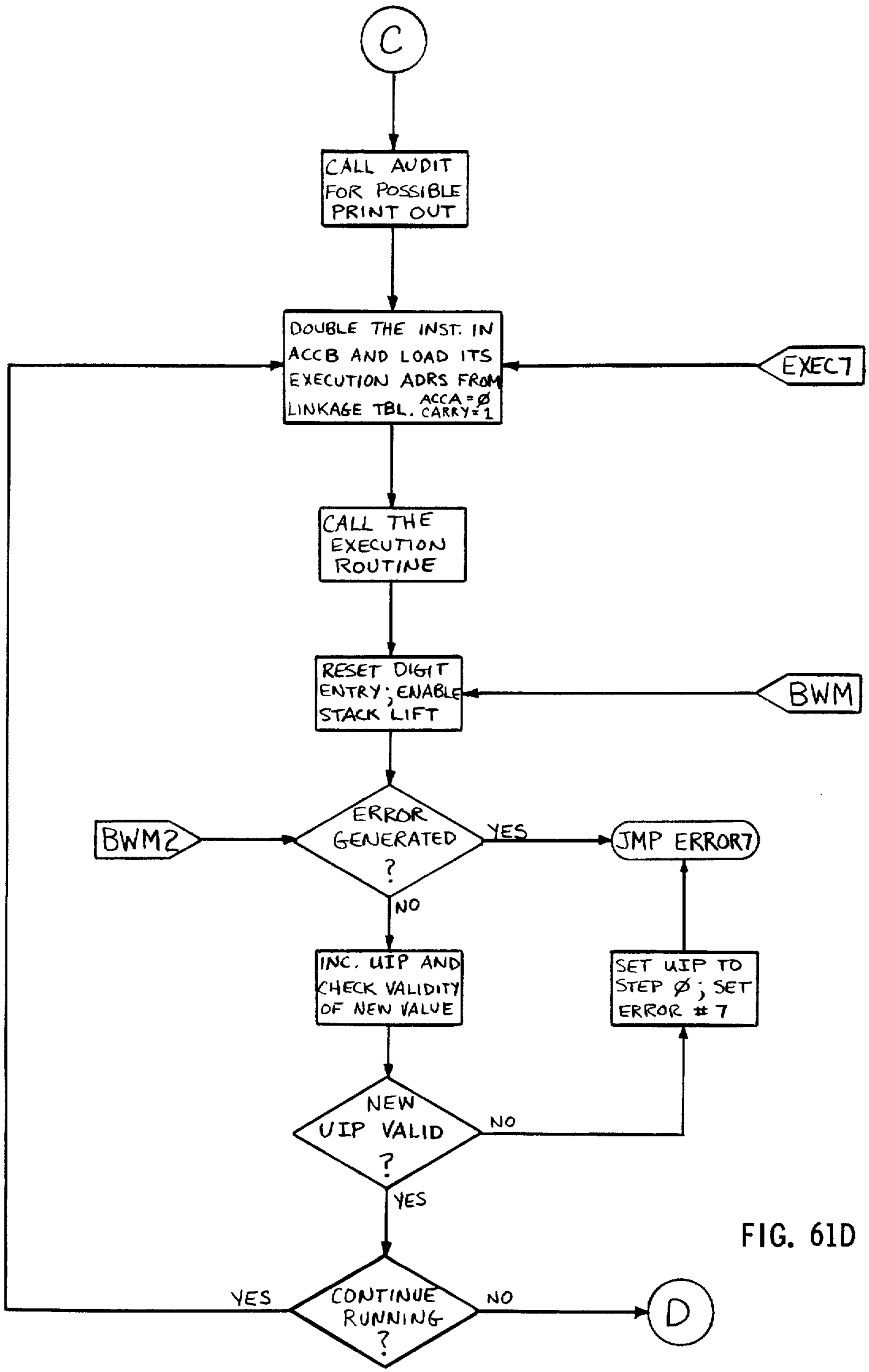
Figure 61E:
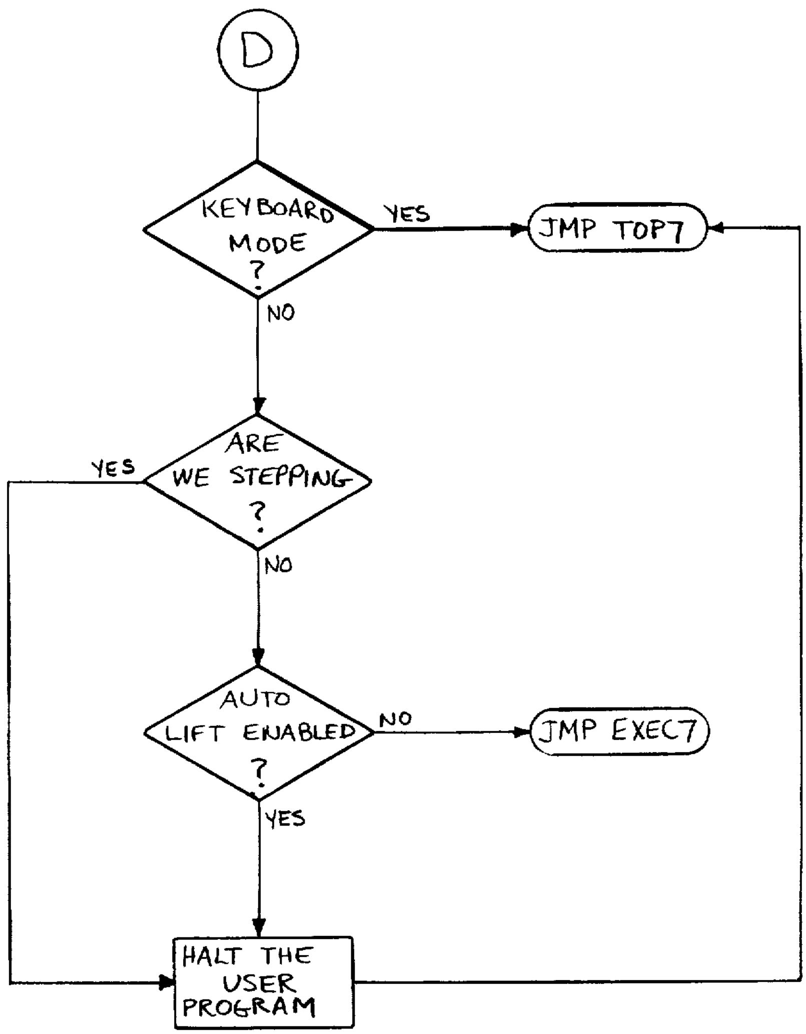
Figure 62:
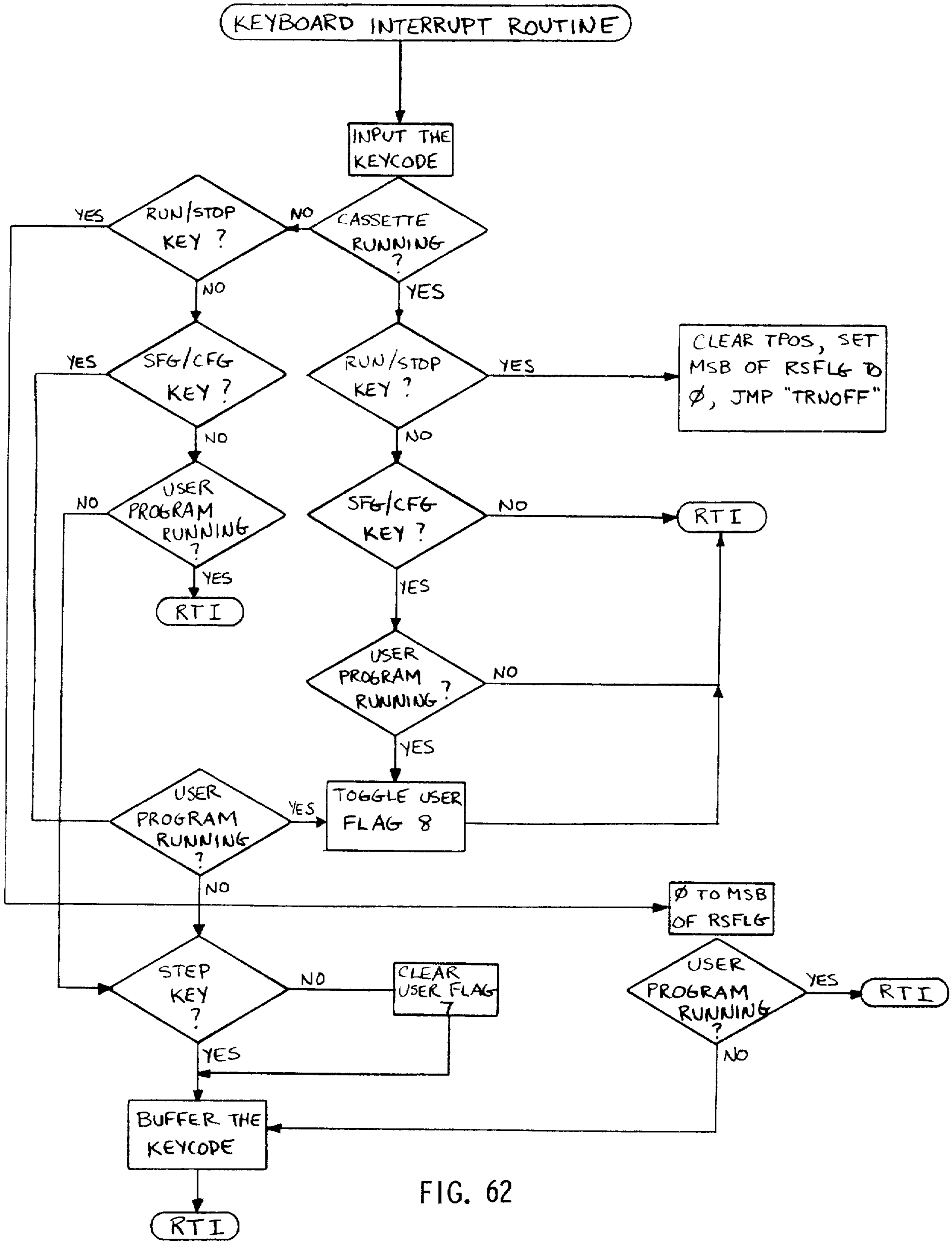
FIG. 62 is a flow chart of a keyboard interrupt routine comprising one of the supervisor routines of FIG. 5.
Figure 63:
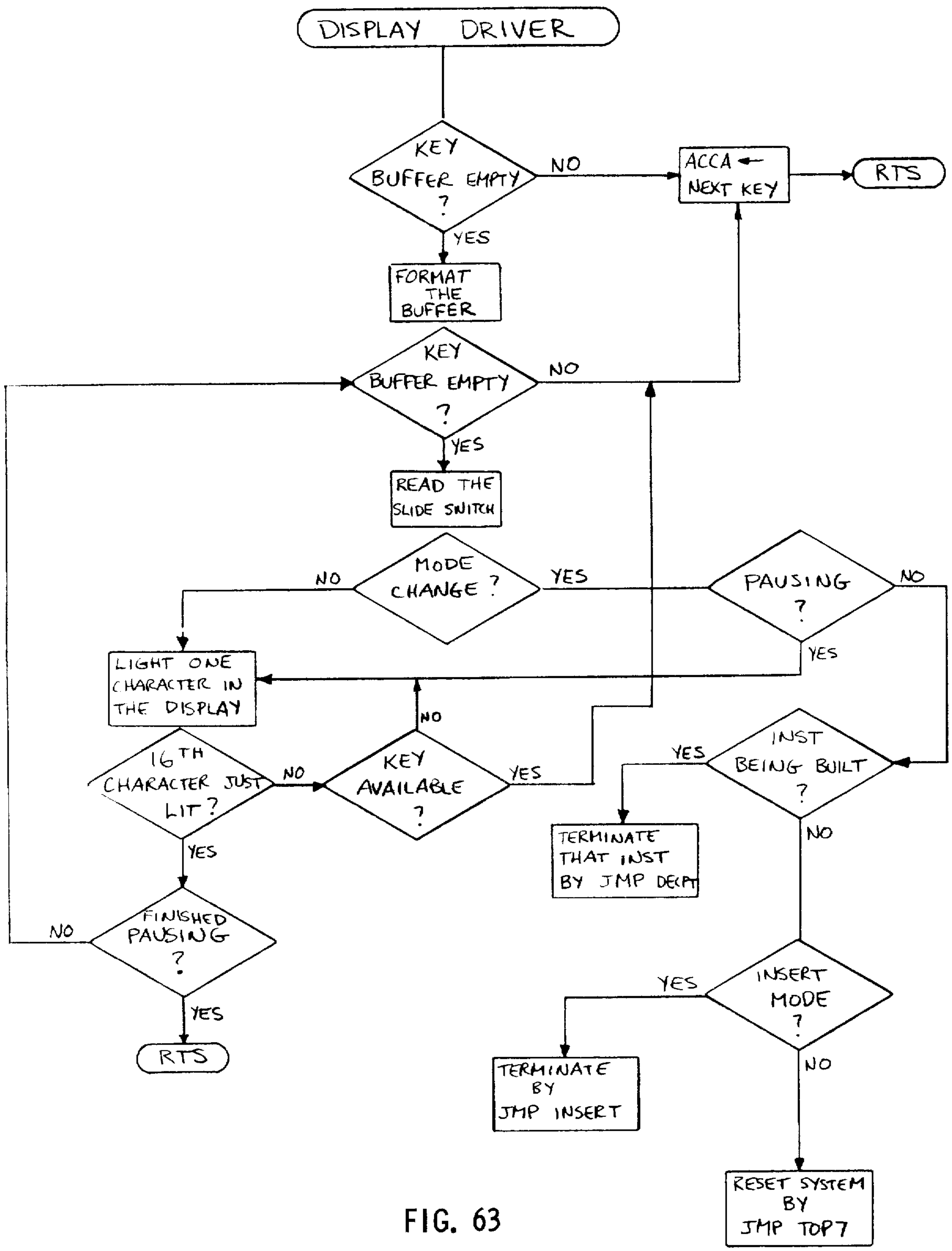
FIG. 63 is a flow chart of a display driver routine comprising one of the supervisor routines of FIG. 5.
Figure 64:
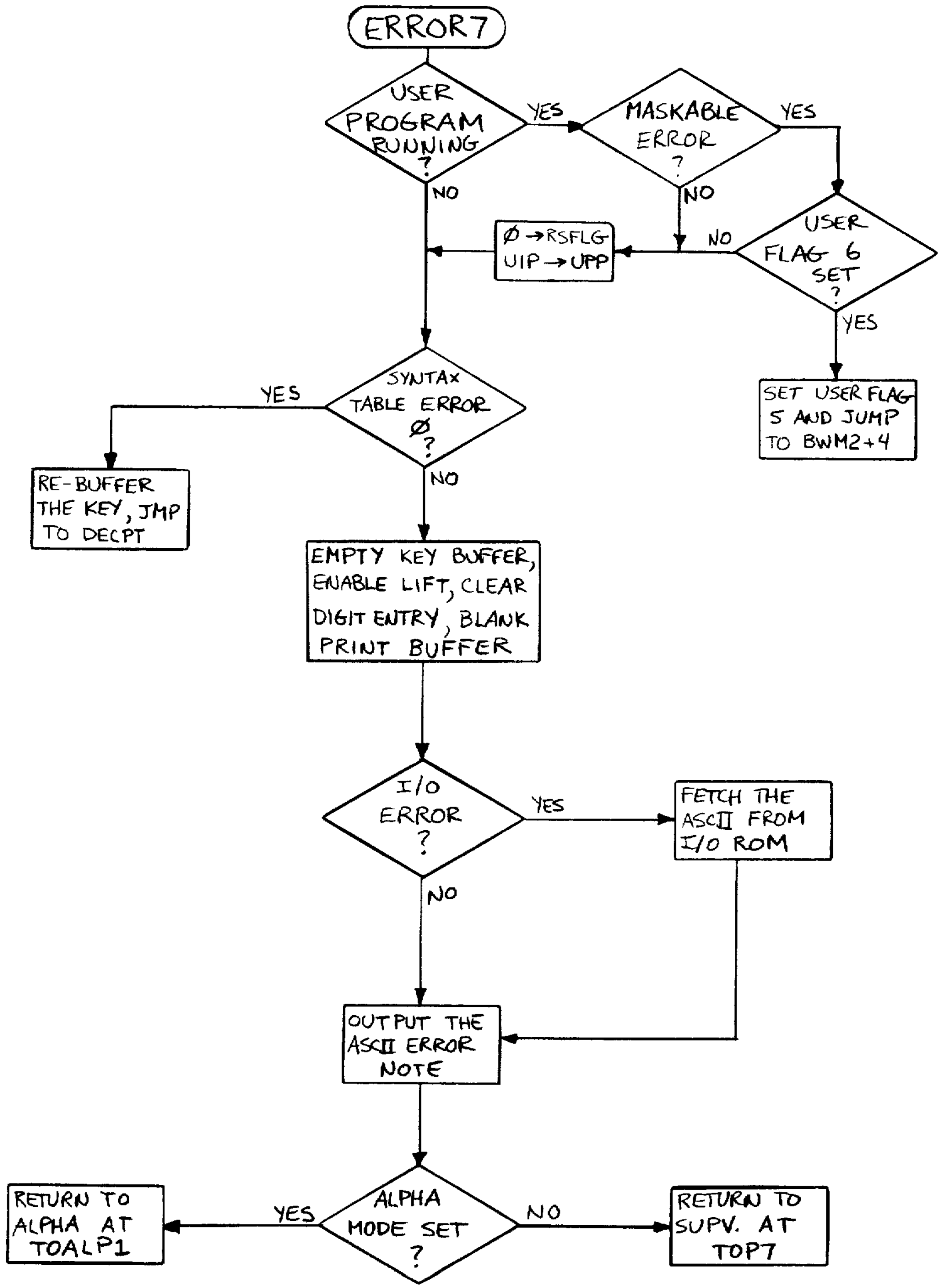
FIG. 64 is a flow chart of the error routine of FIG. 5.
Figure 65A:
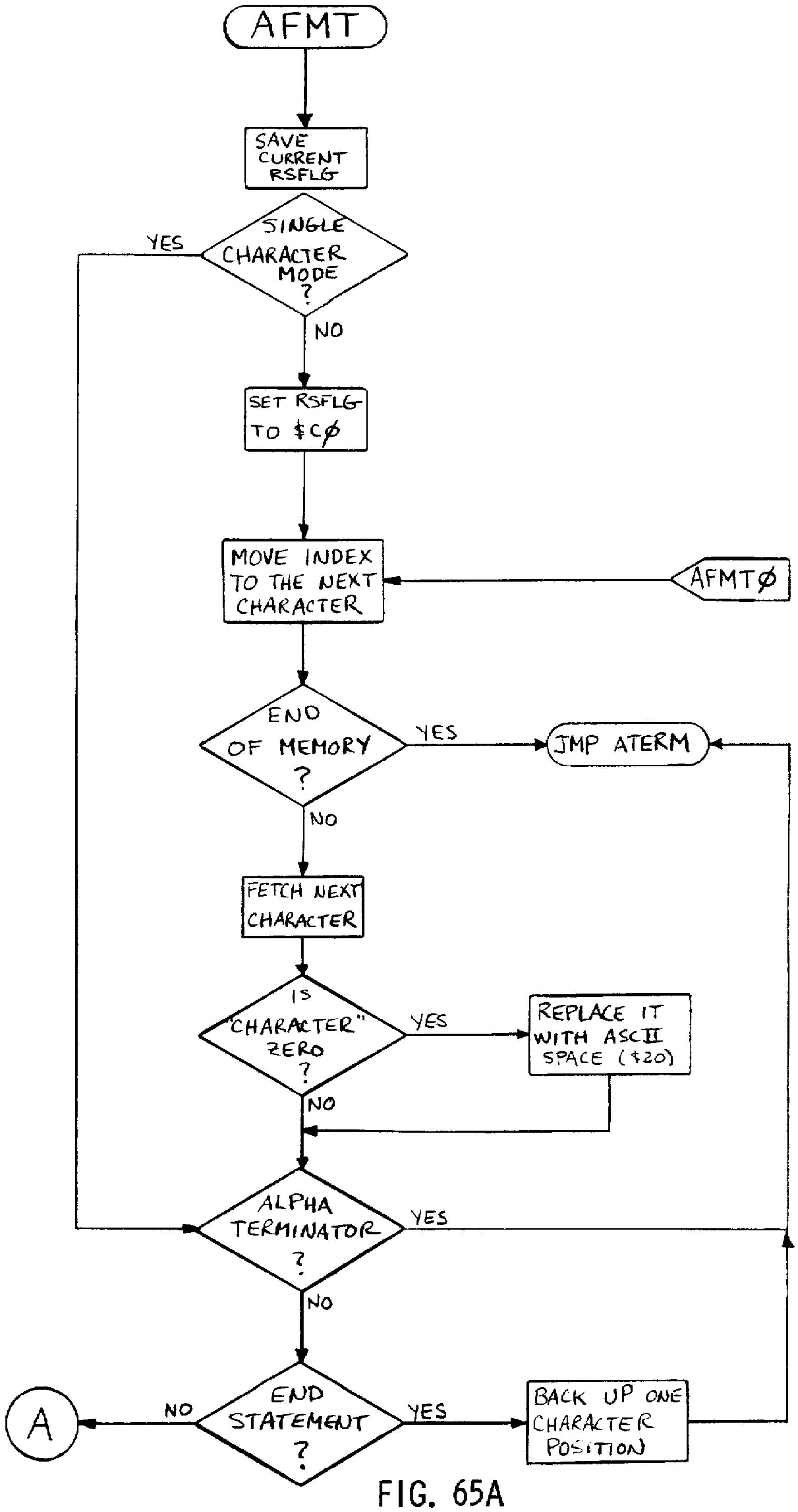
FIGS. 65A–L are a flow chart of the alpha routine of FIG. 5.
Figure 65B:
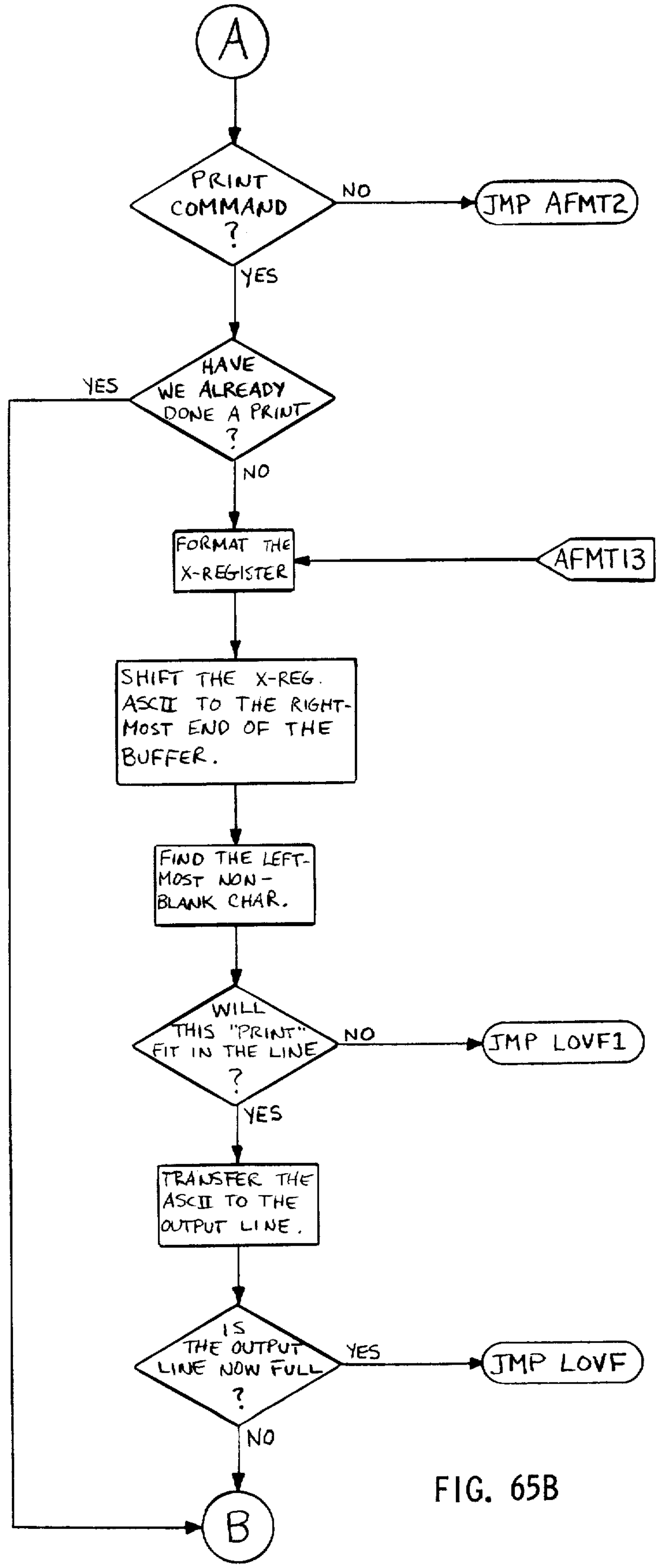
Figure 65C:
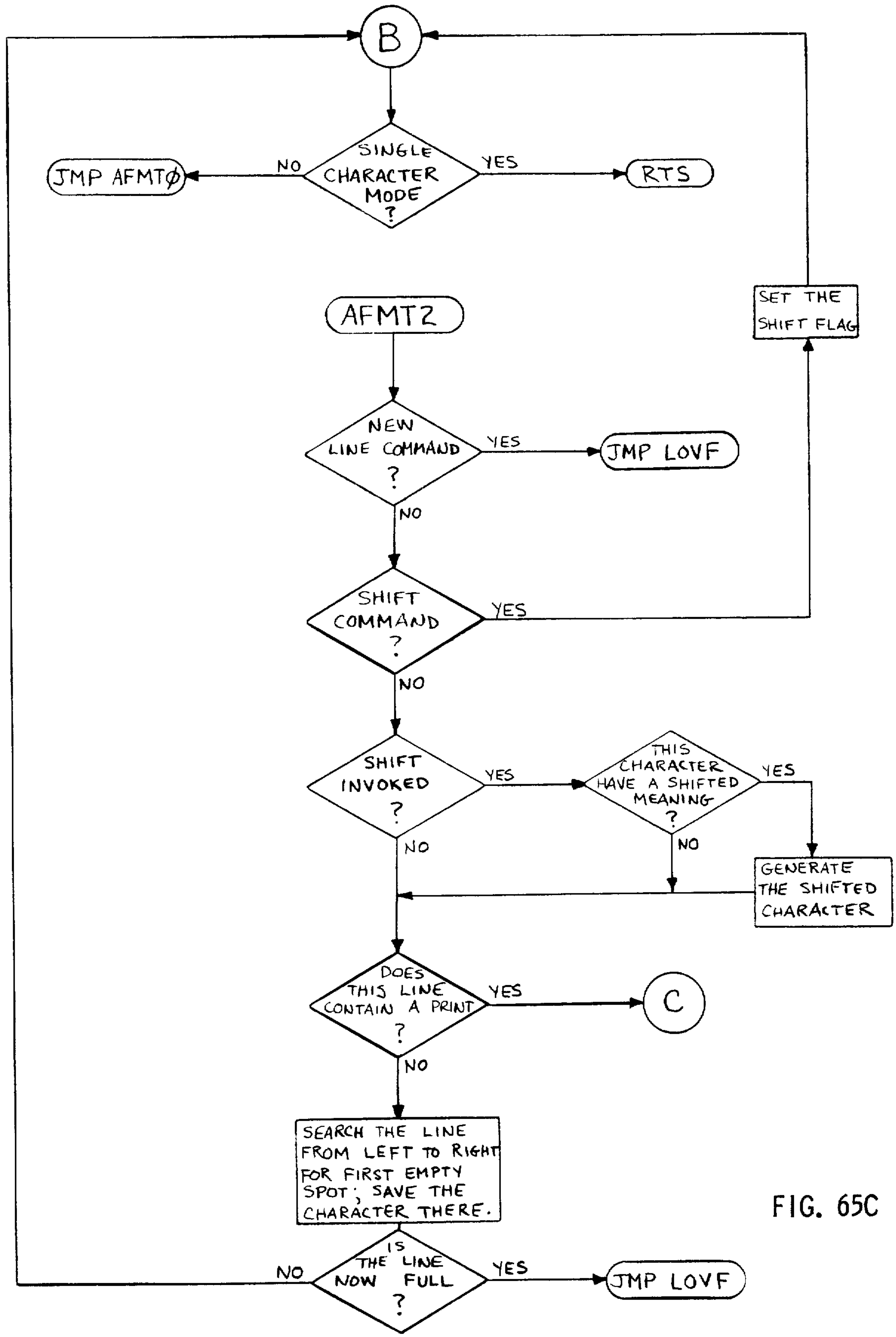
Figure 65:
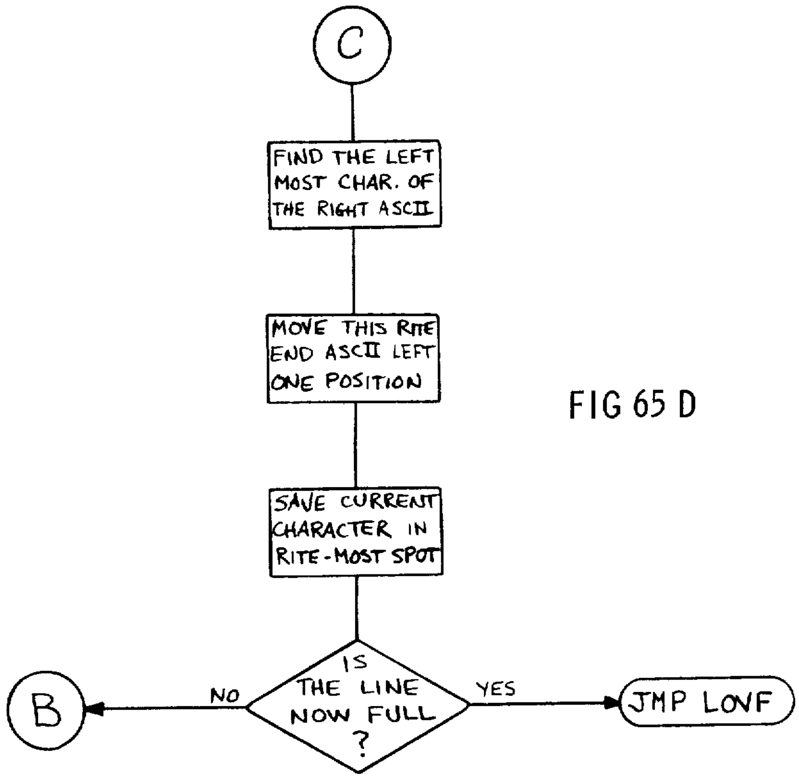
Figure 65E:
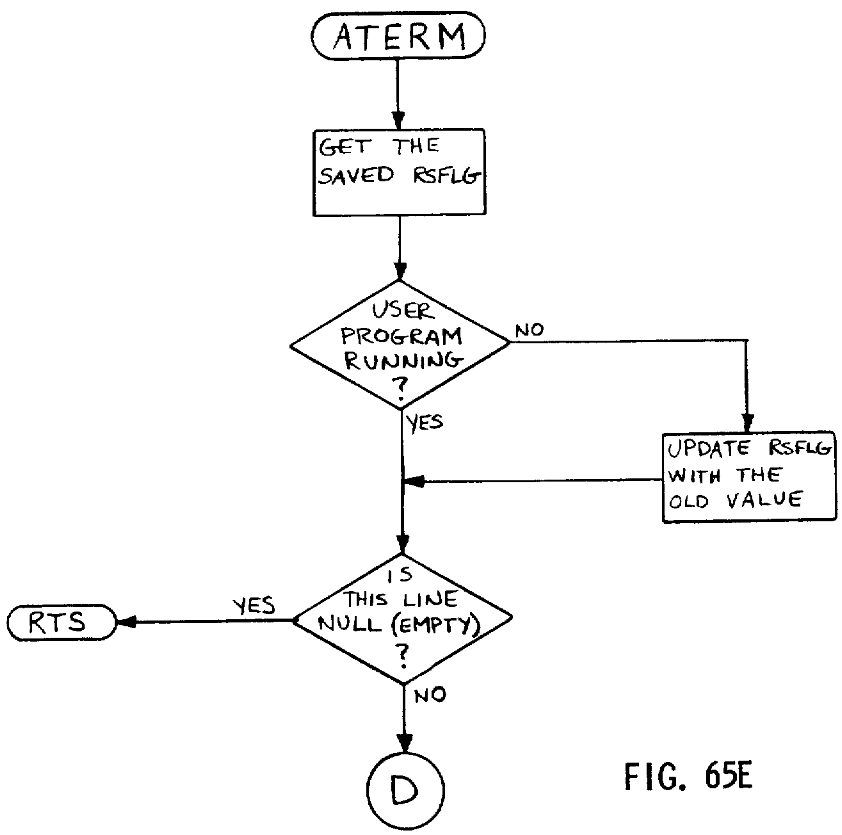
Figure 65F:
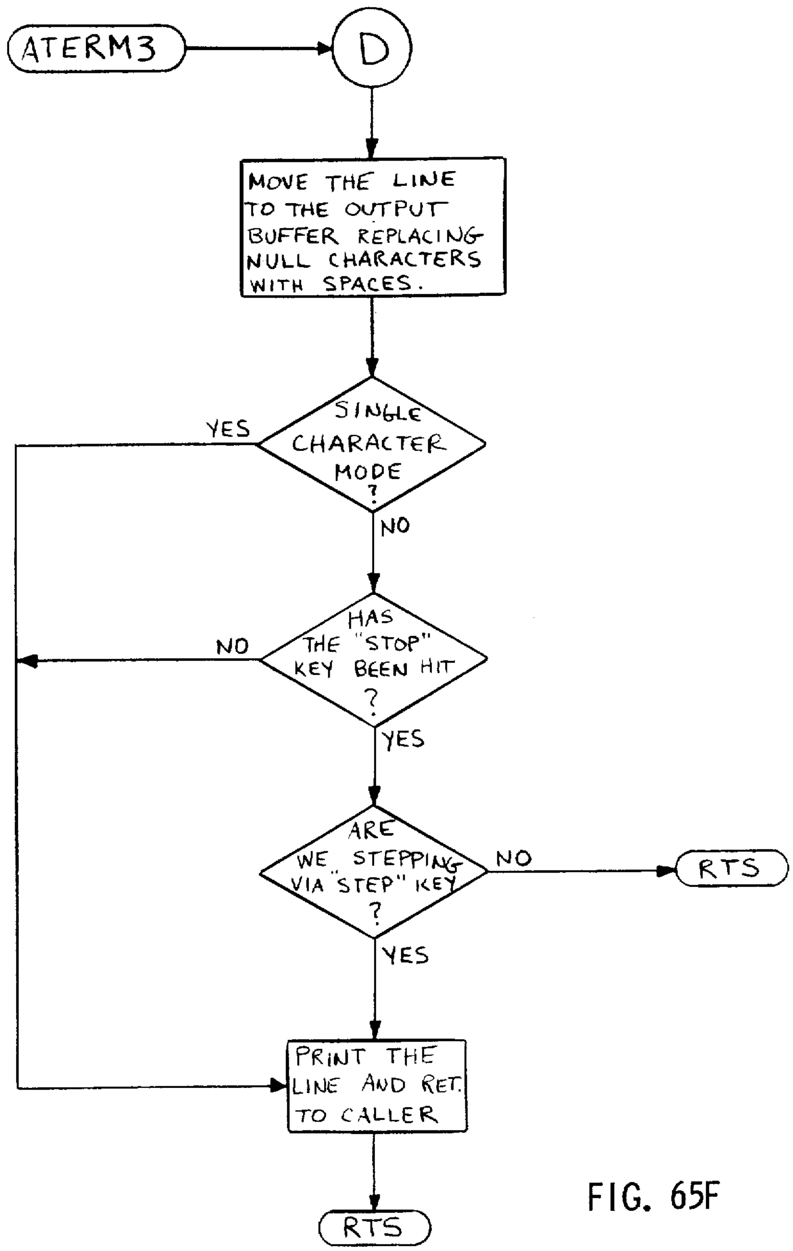
Figure 65G:
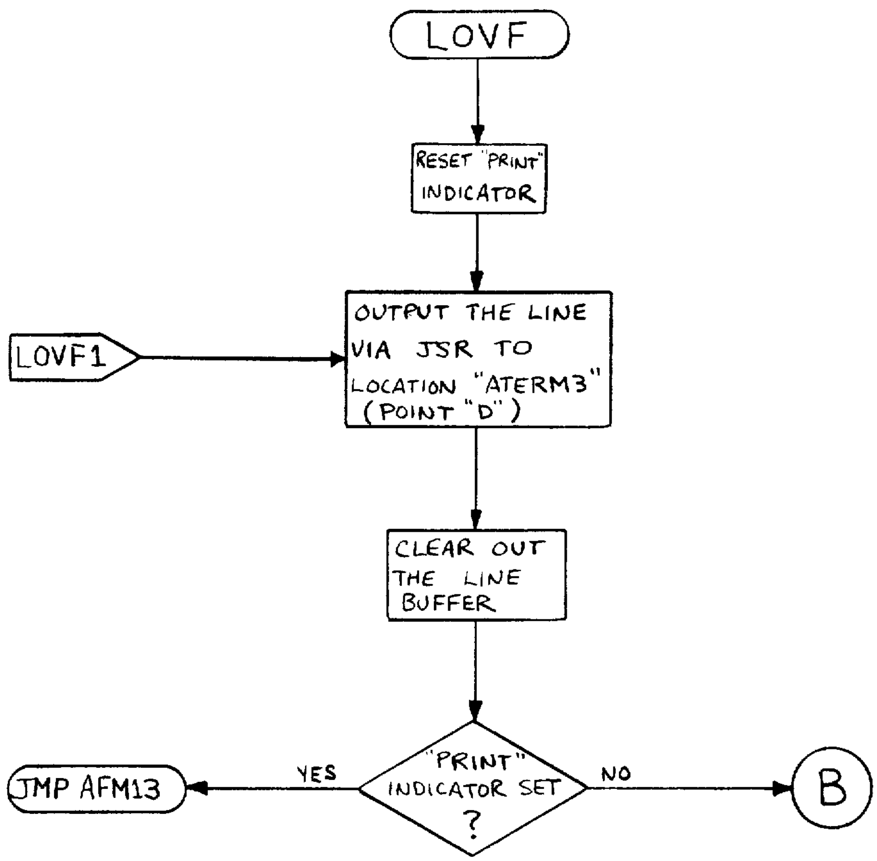
Figure 65H:
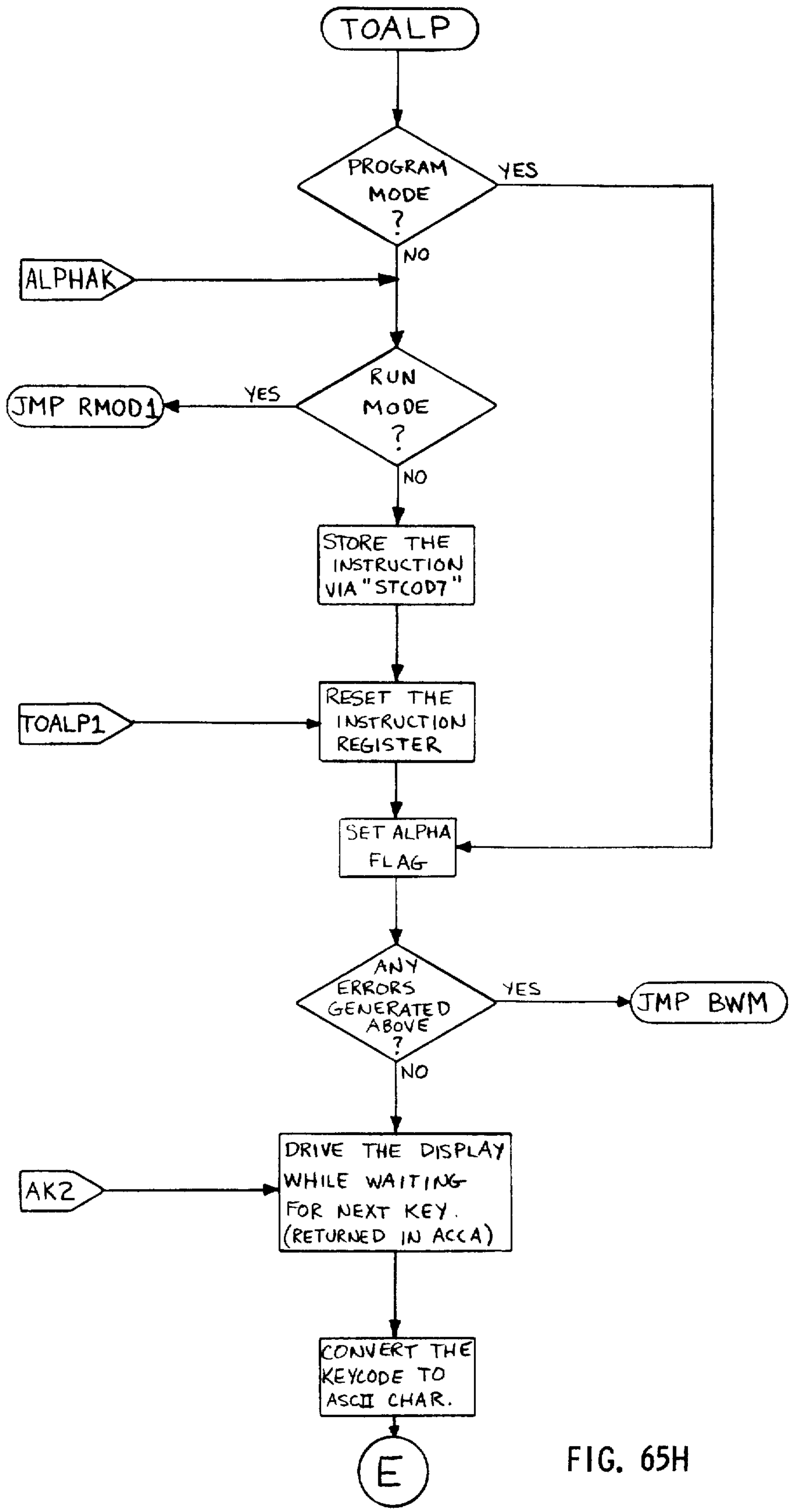
Figure 65:
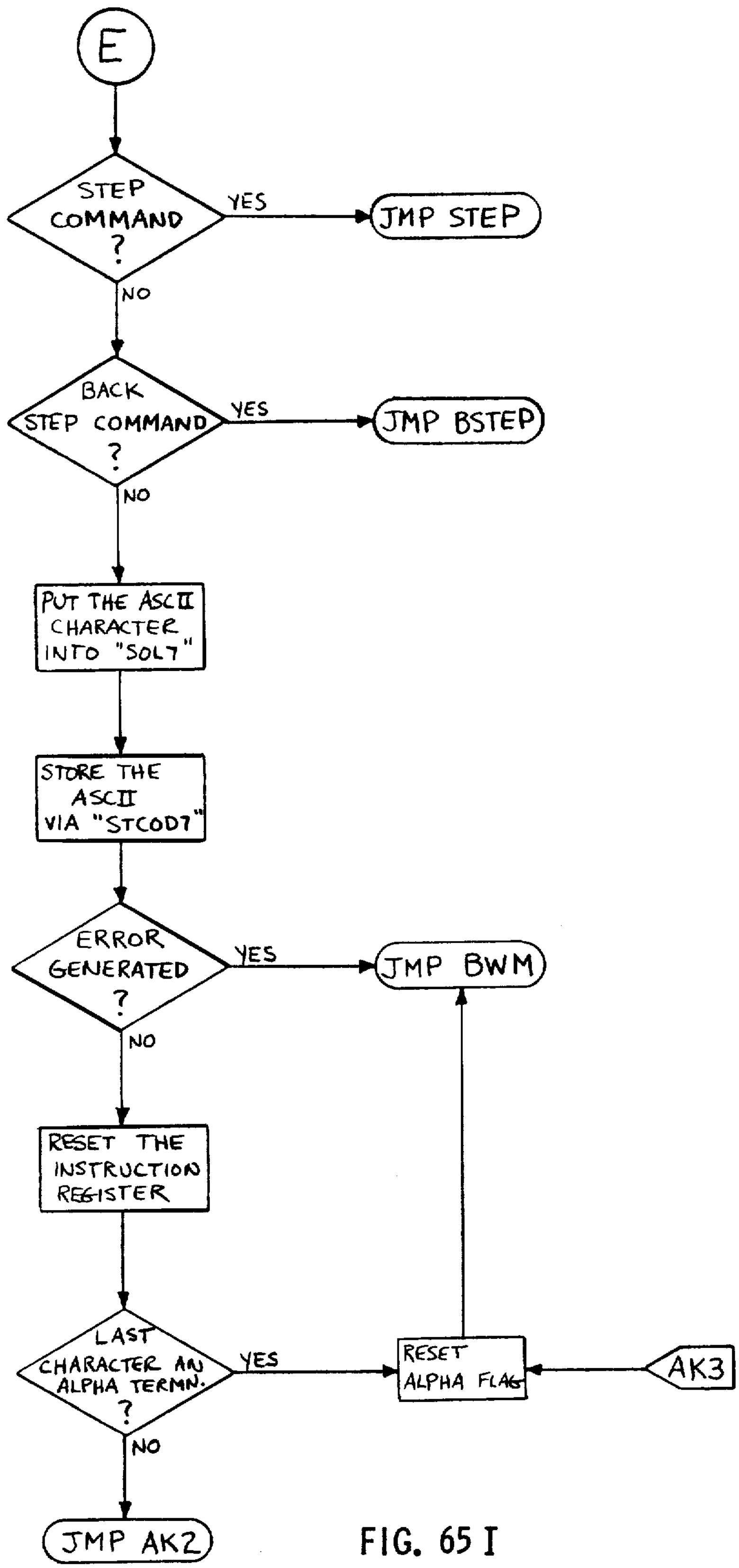
Figure 65J:
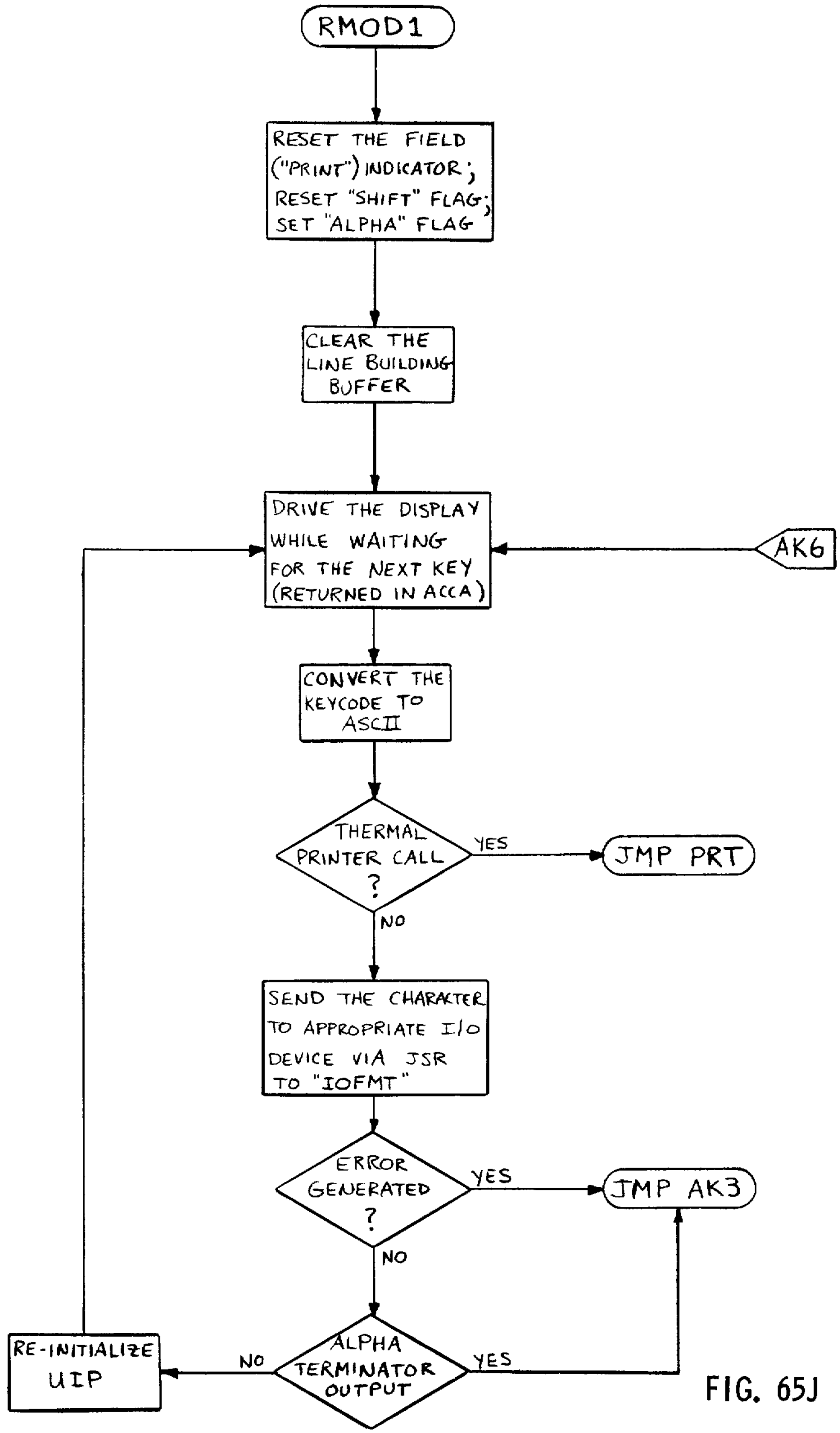
Figure 65K:
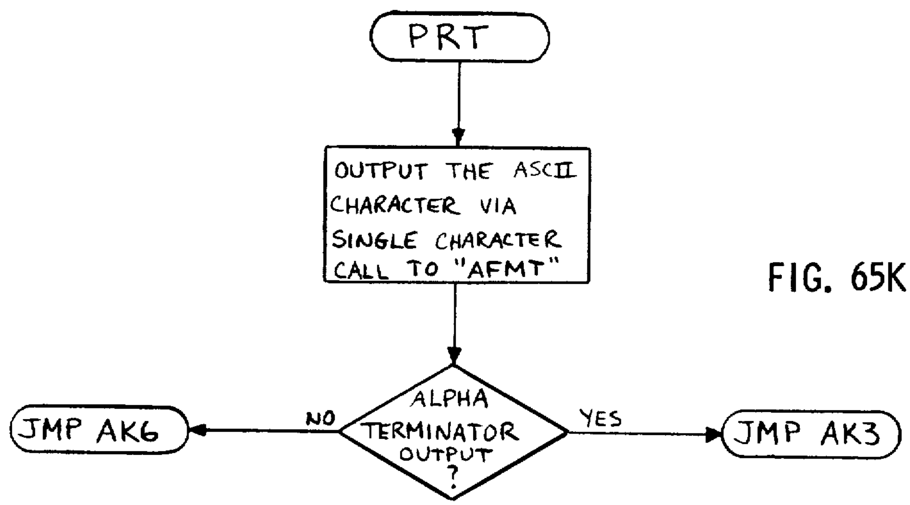
Figure 65L:
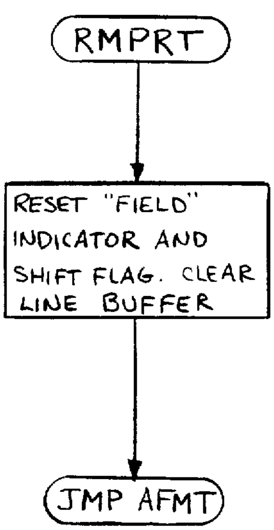
Figure 66B:
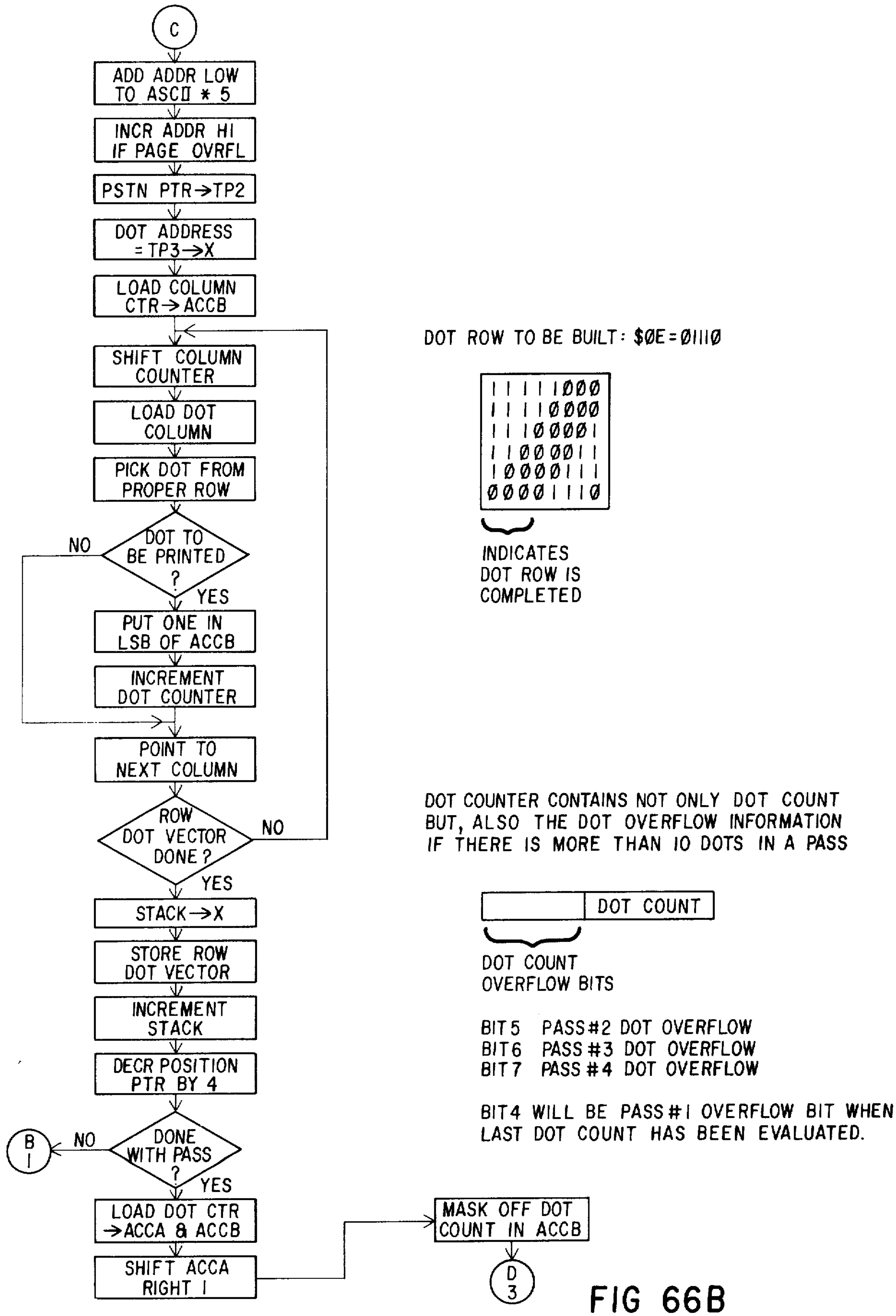
Figure 66C:
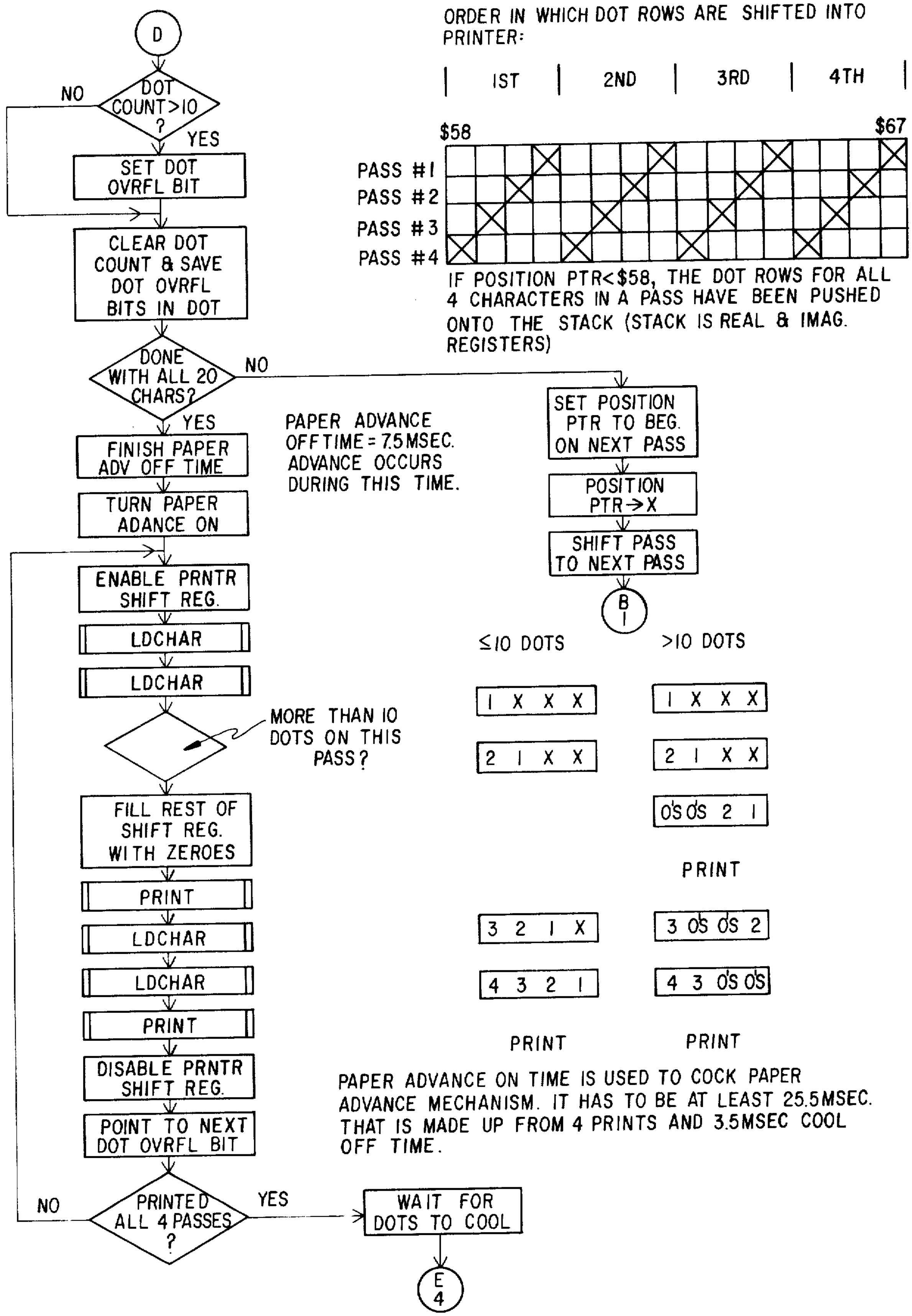
Figure 66D:
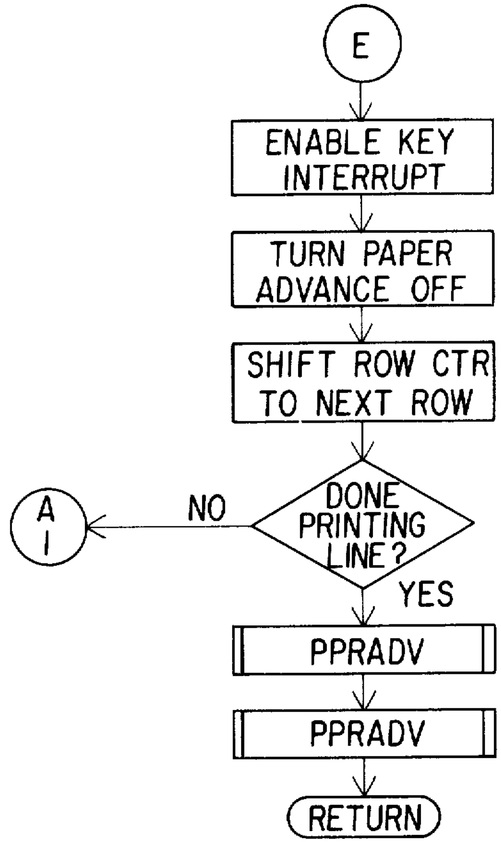
Figure 66E:
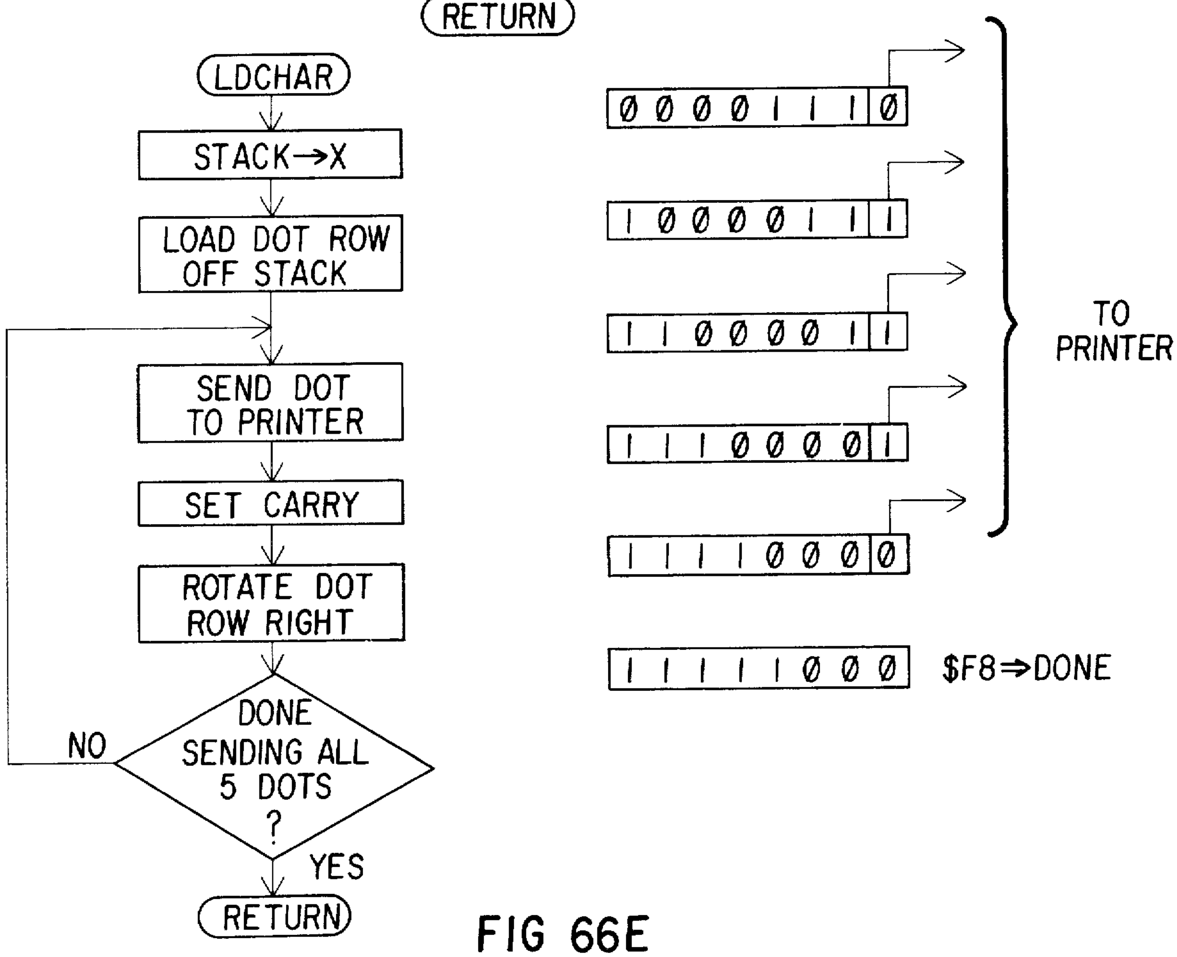
Figure 67A:
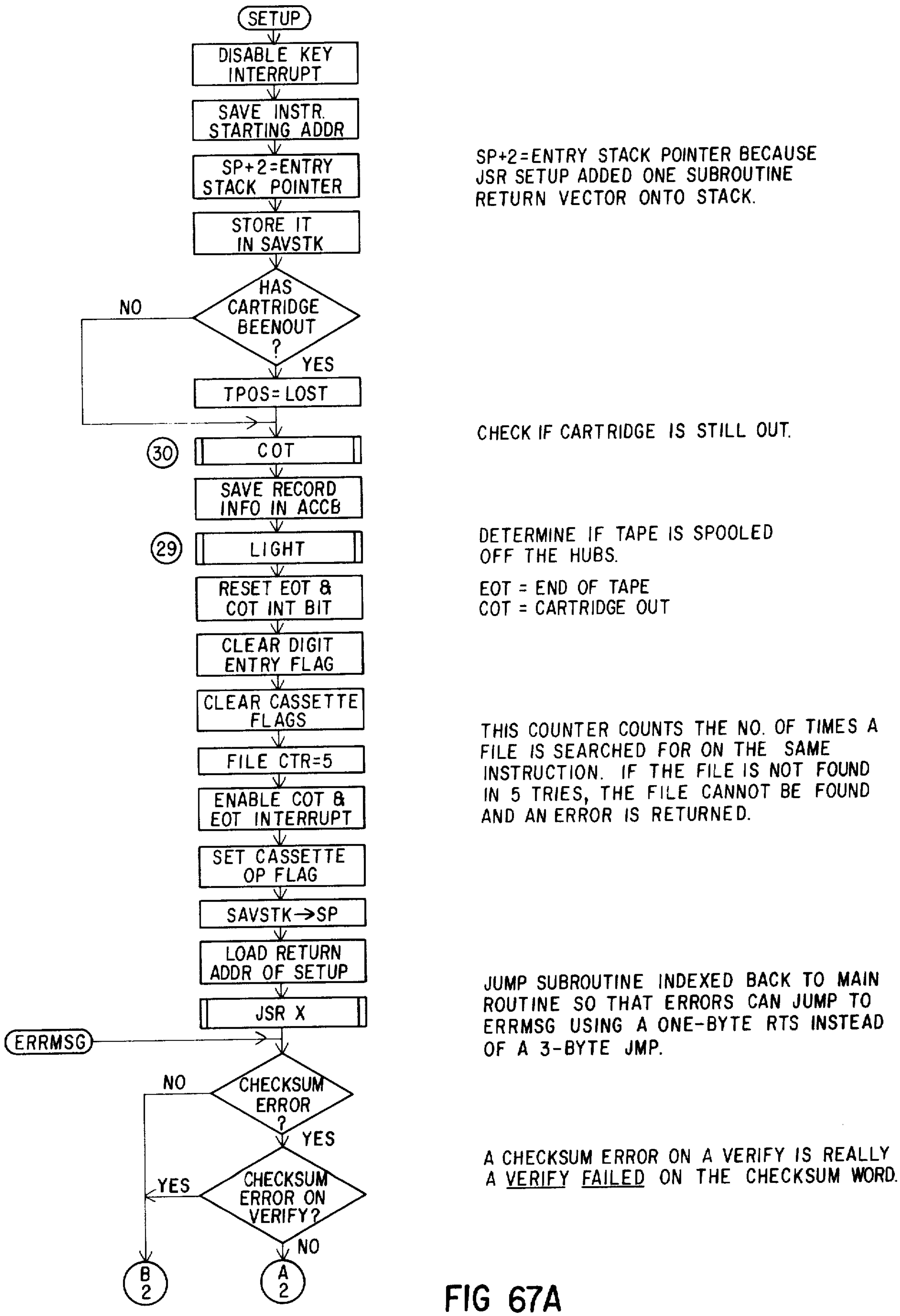
FIGS. 67A–Z are a flow chart of a portion of the cassette driver routines stored in ROM 3 of FIG. 6.
Figure 67B:
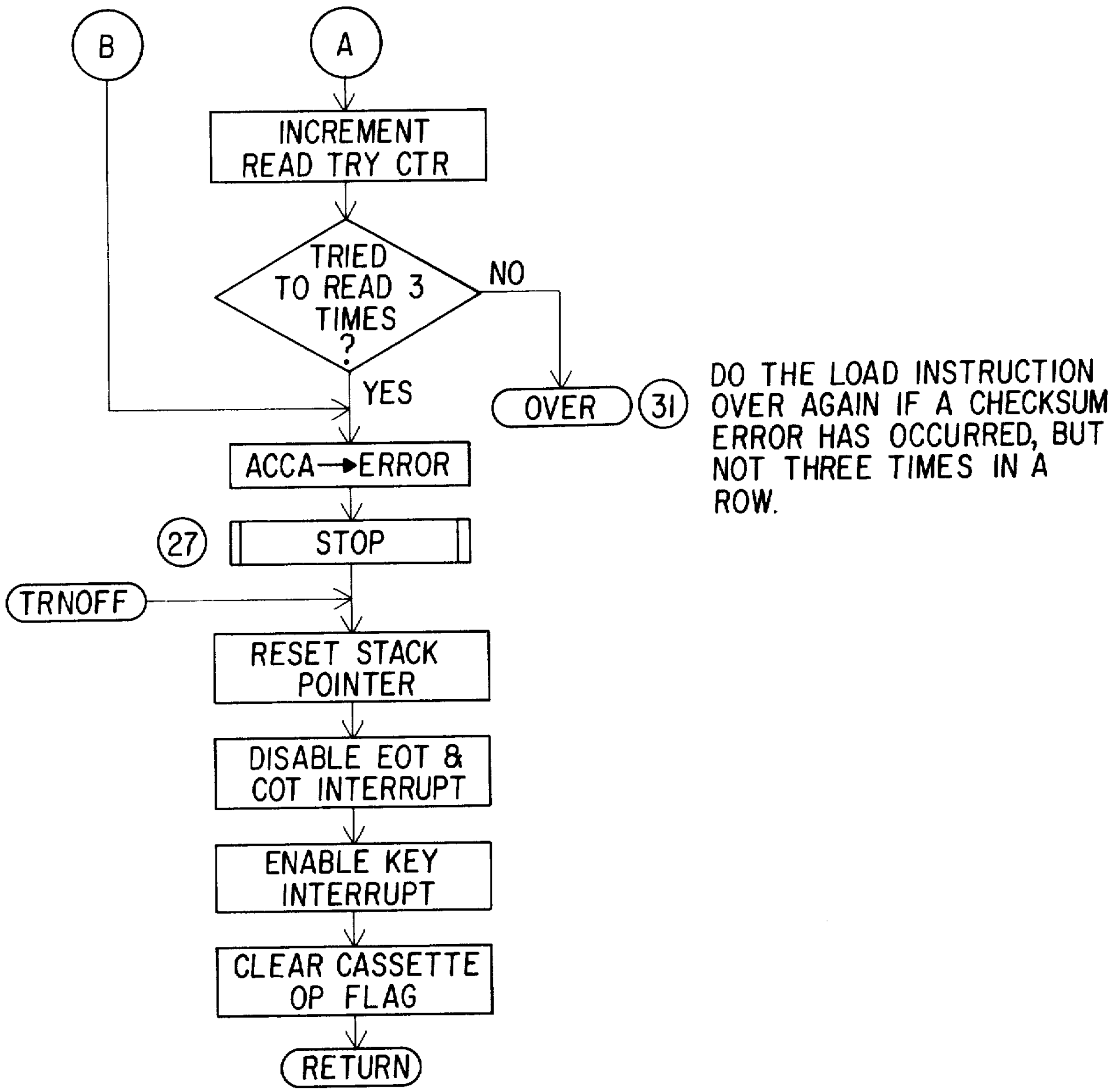
Figure 67C:
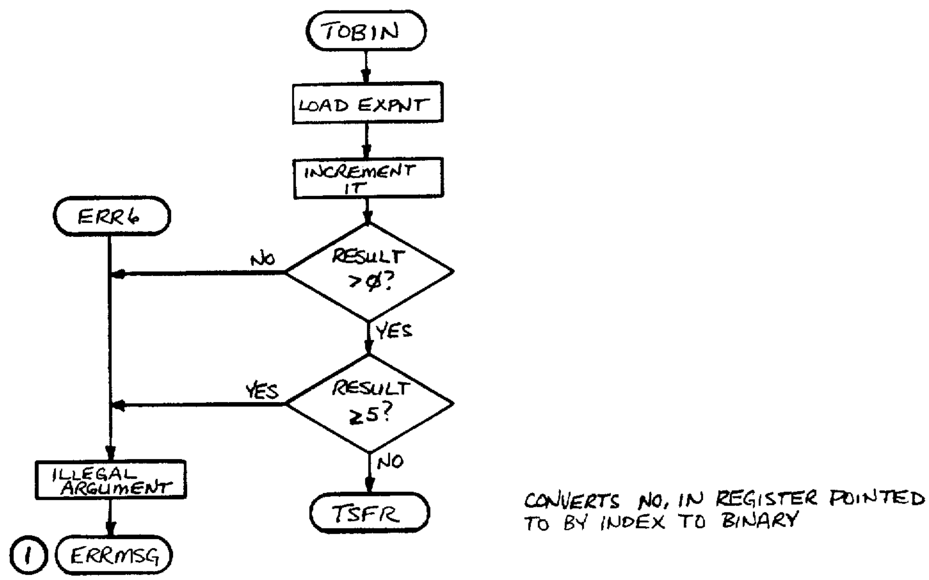
Figure 67D:
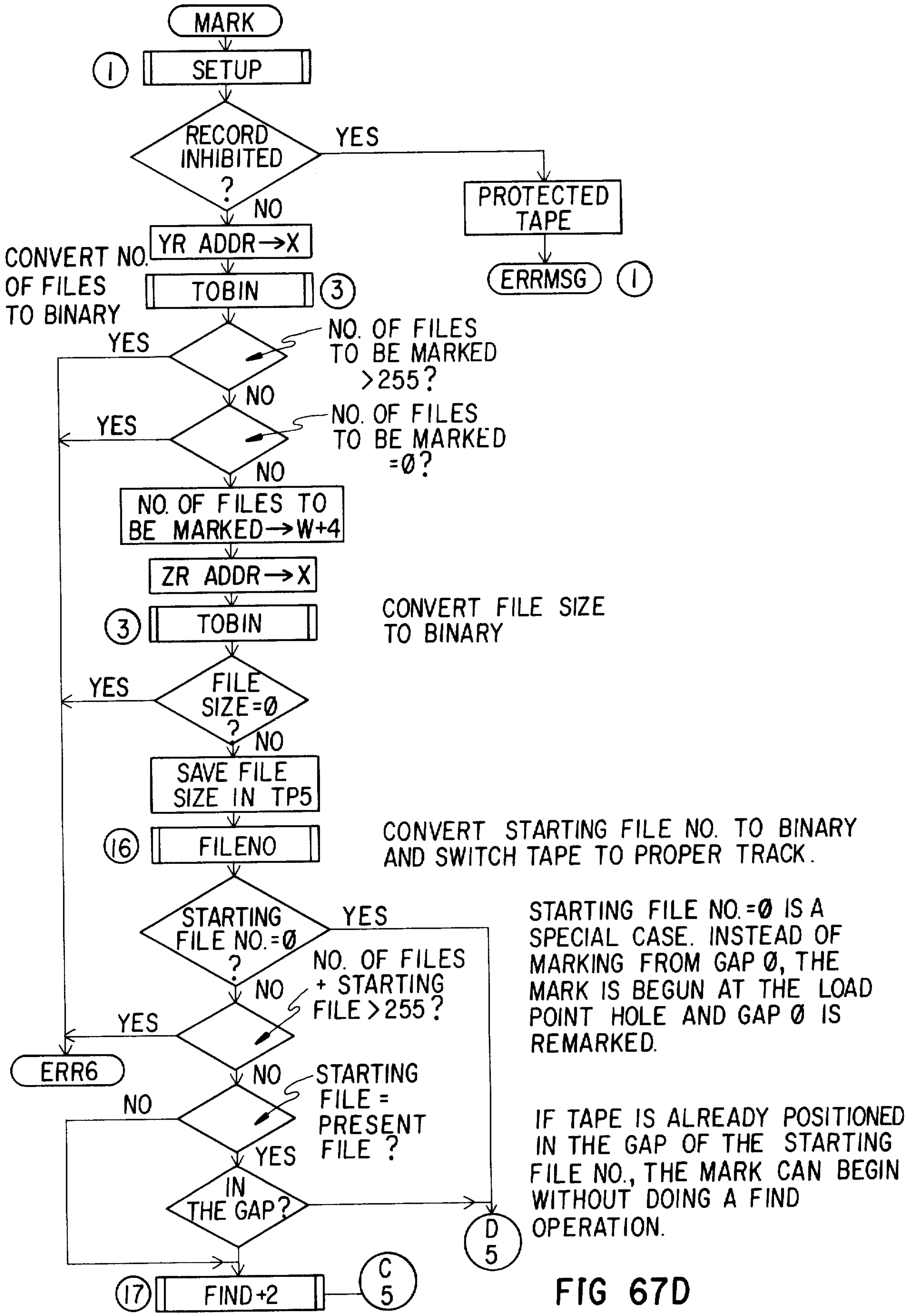
Figure 67E:
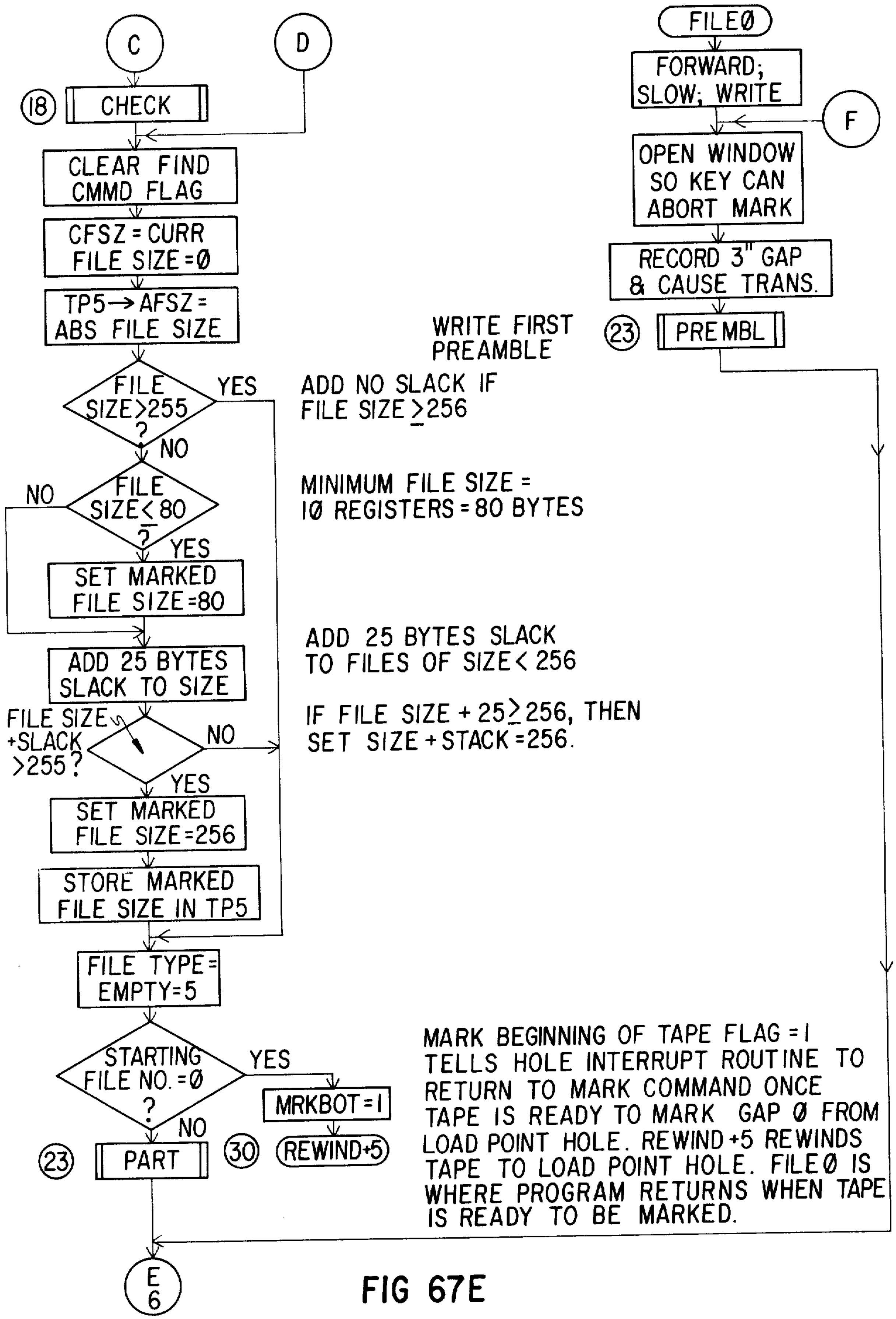
Figure 67F:
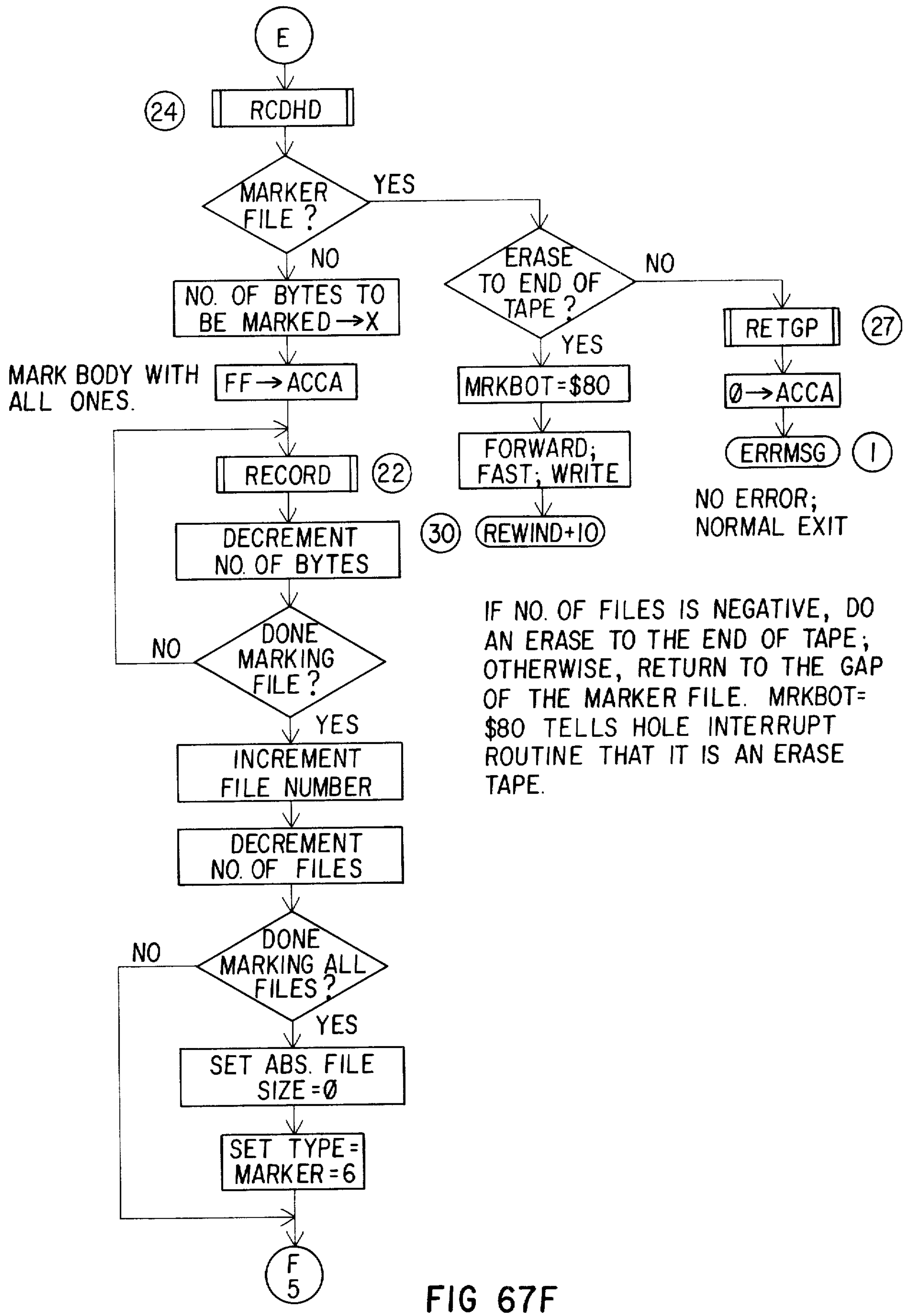
Figure 67G:
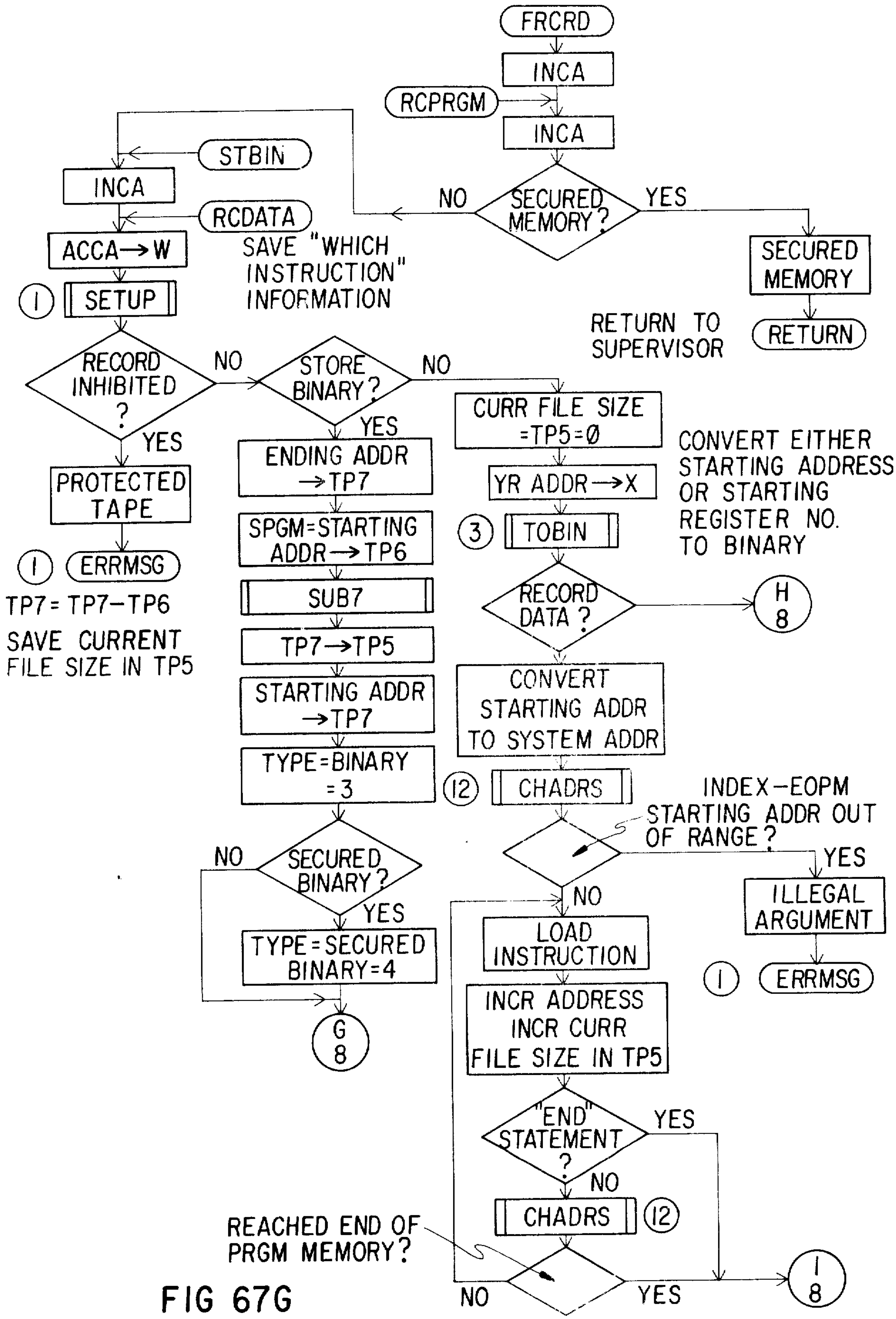
Figure 67H:
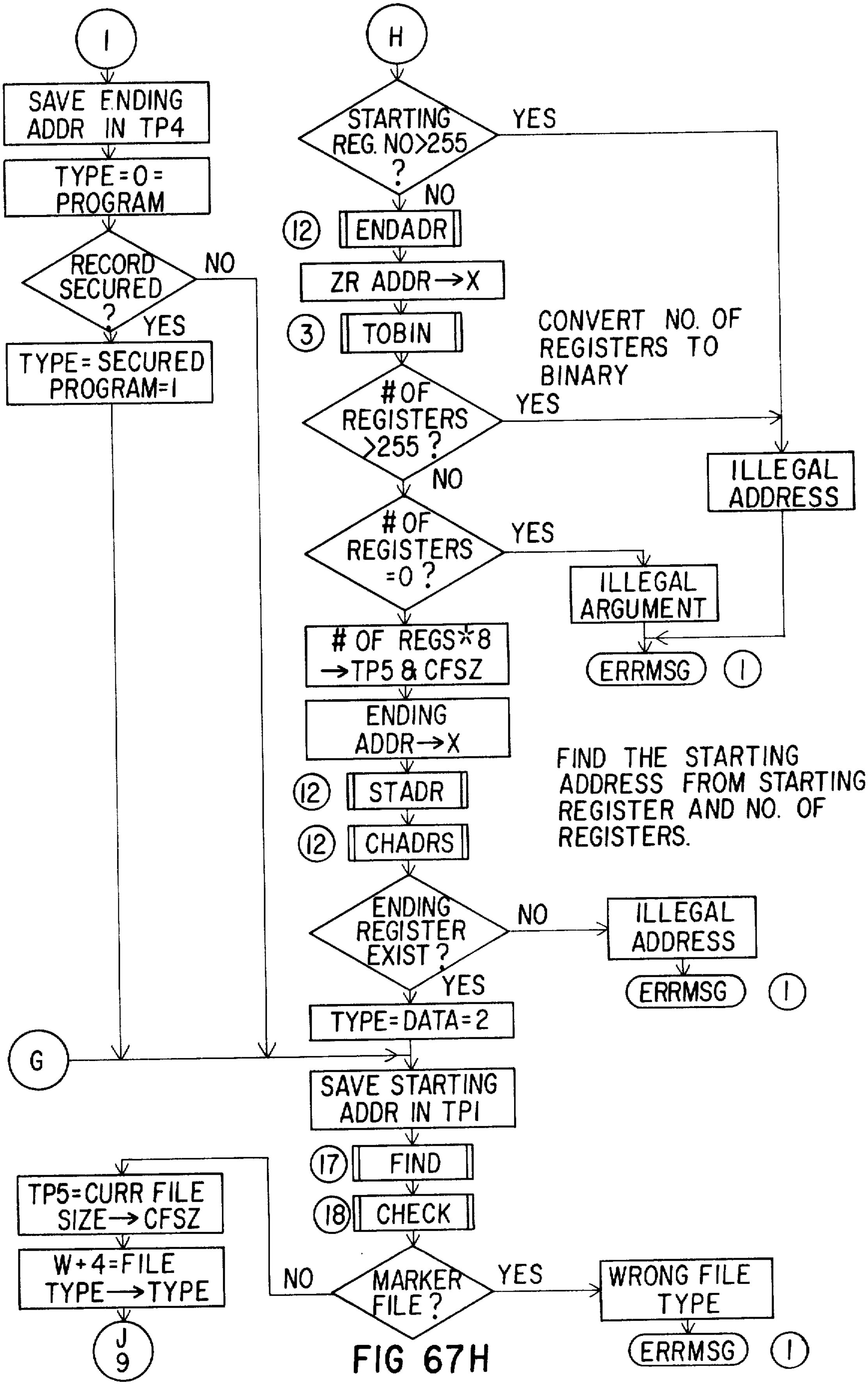
Figure 67:
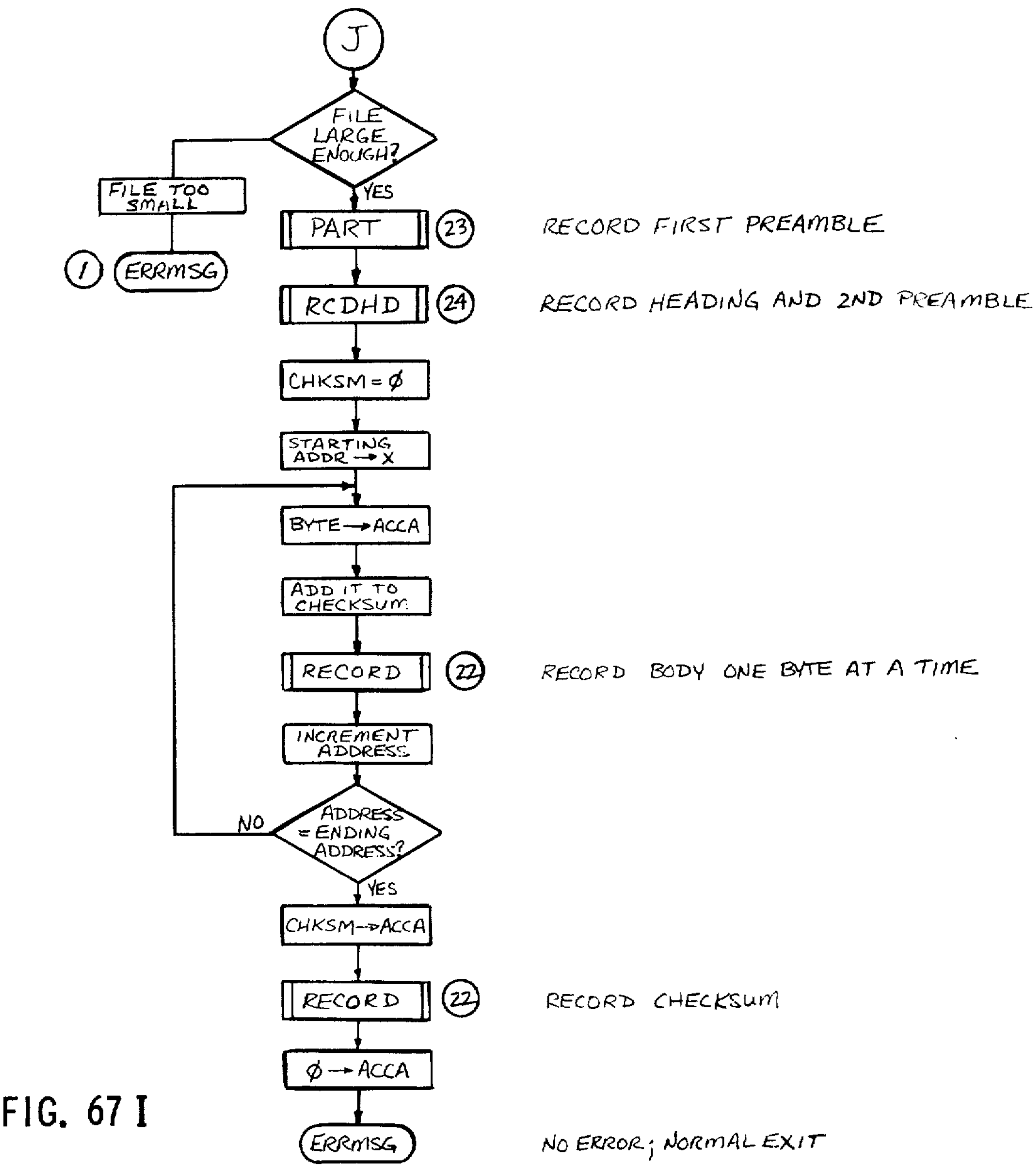
Figure 67J:
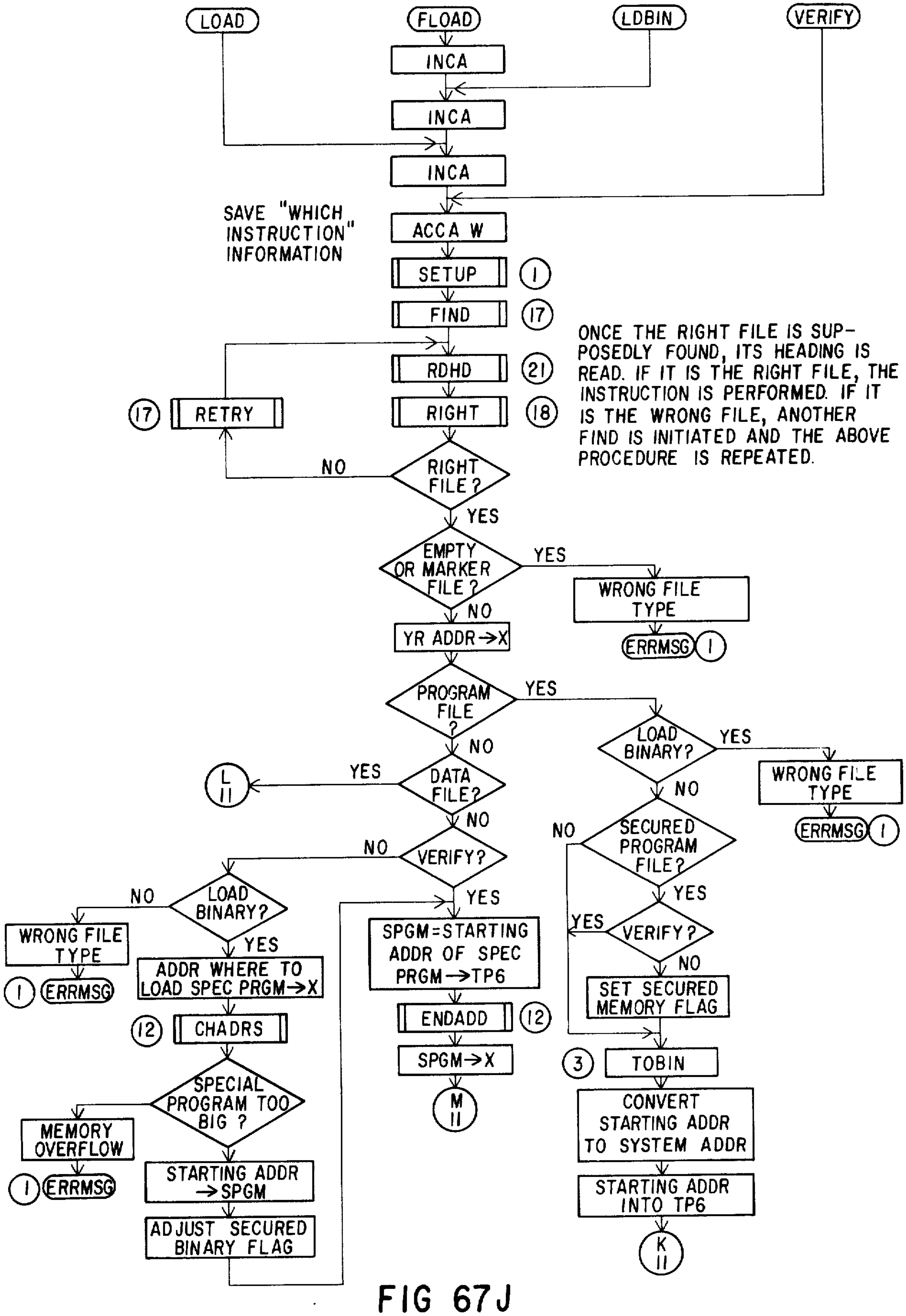
Figure 67K:
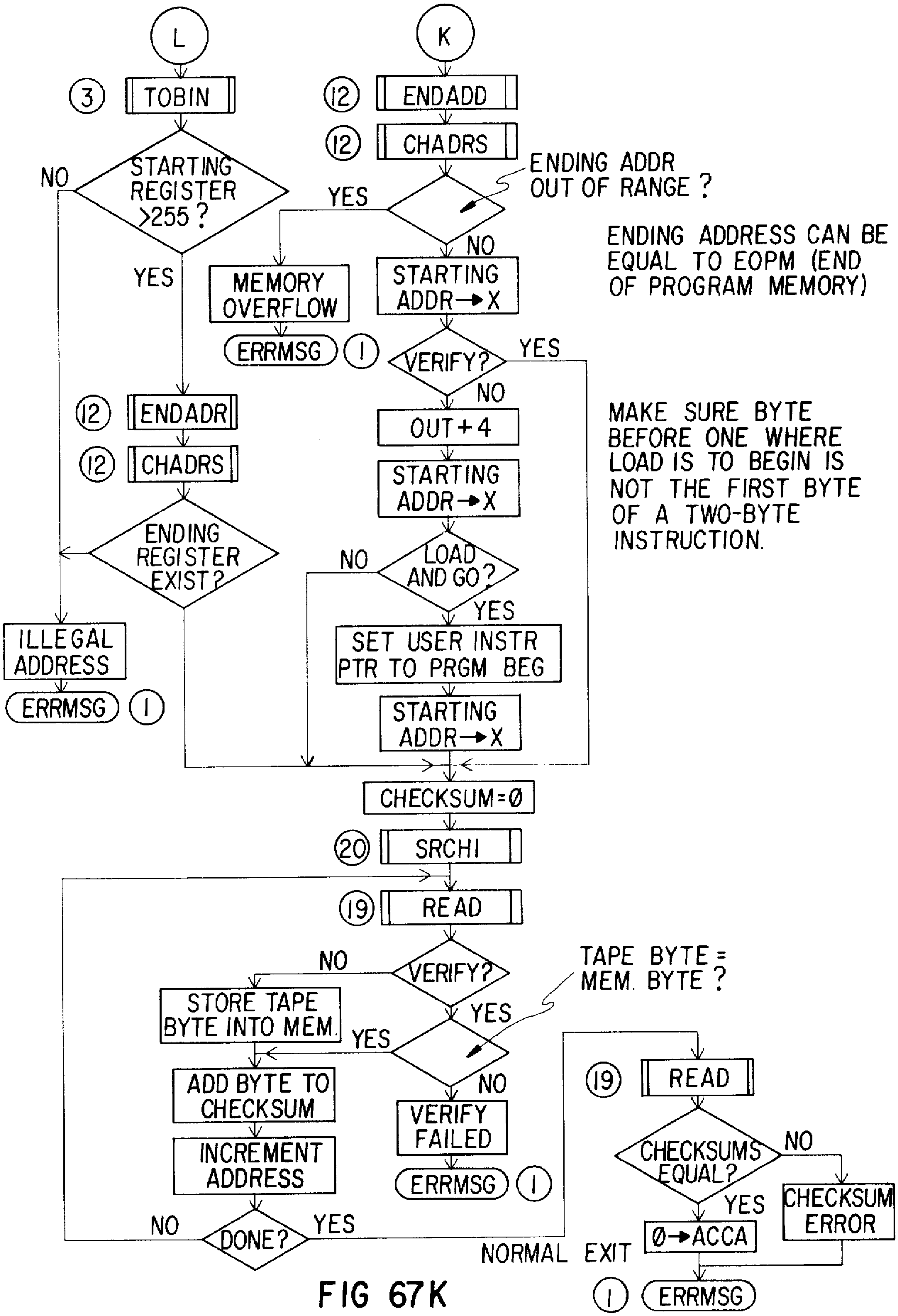
Figure 67L:
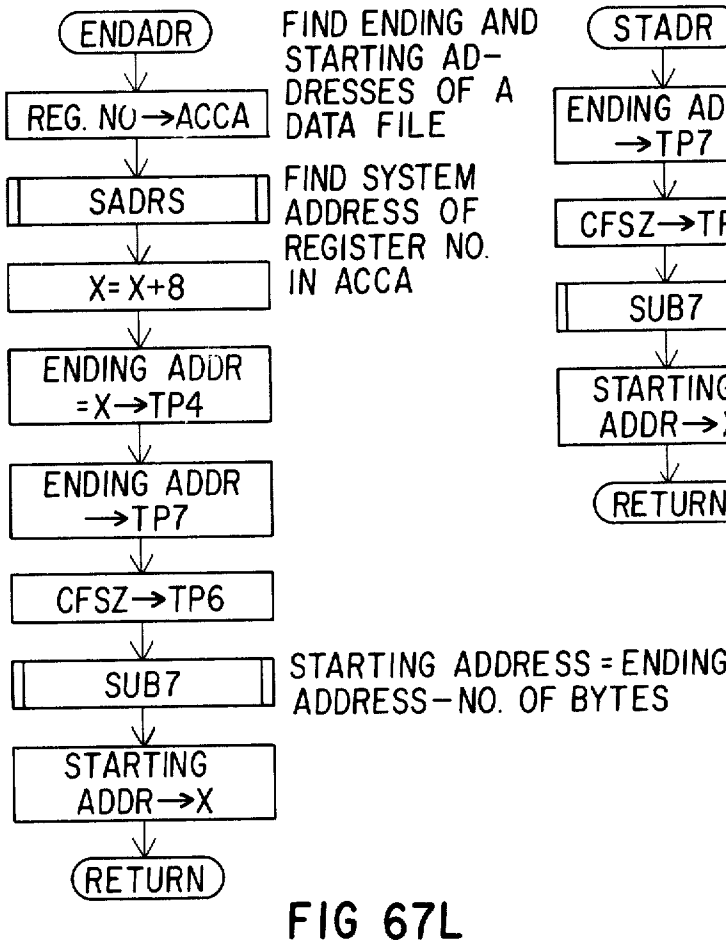
Figure 67M:
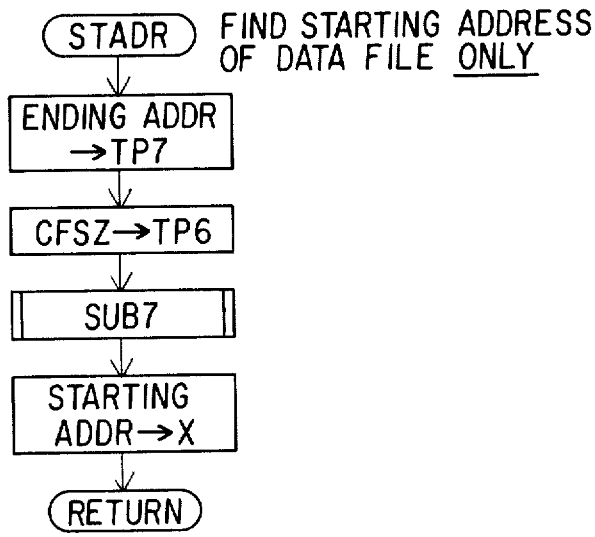
Figure 67N:
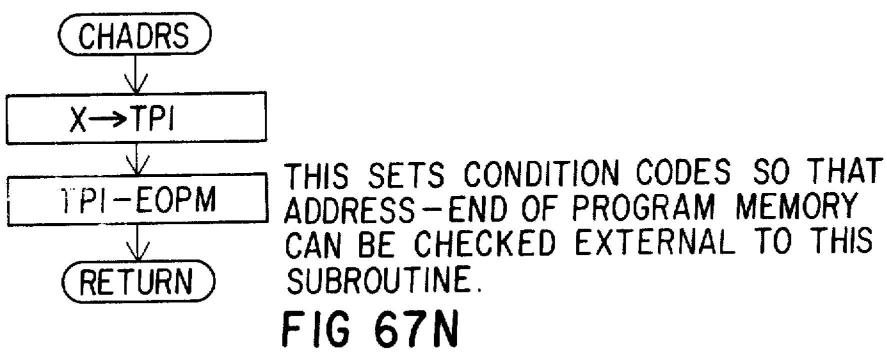
Figure 67O:
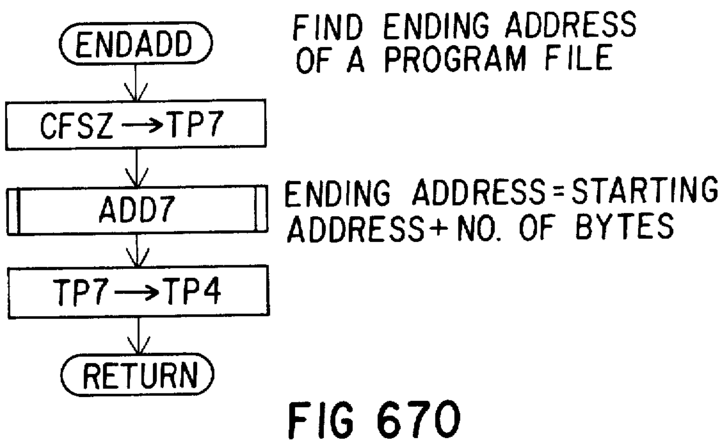
Figure 67P:
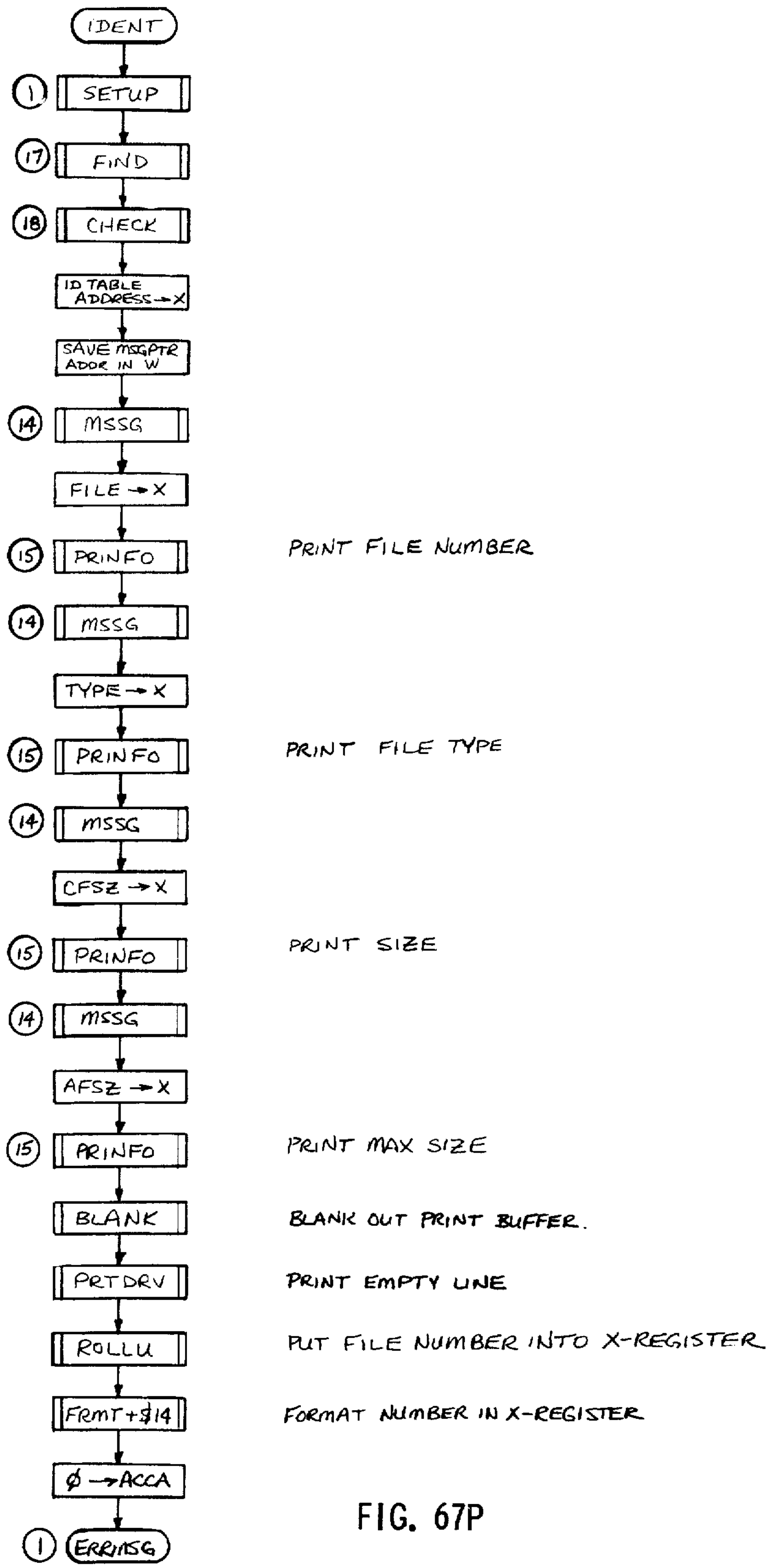
Figure 67Q:
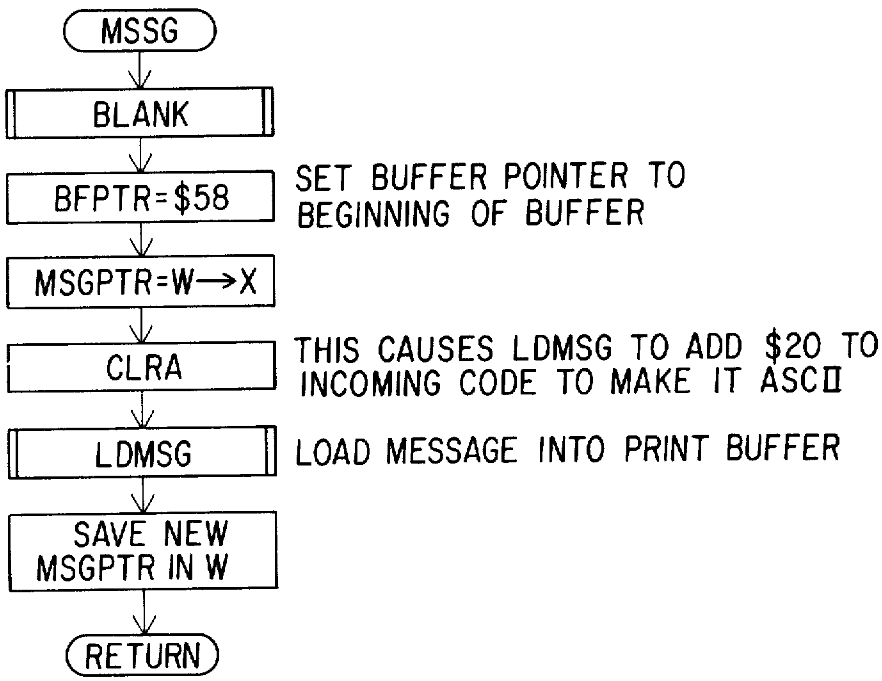
Figure 67R:
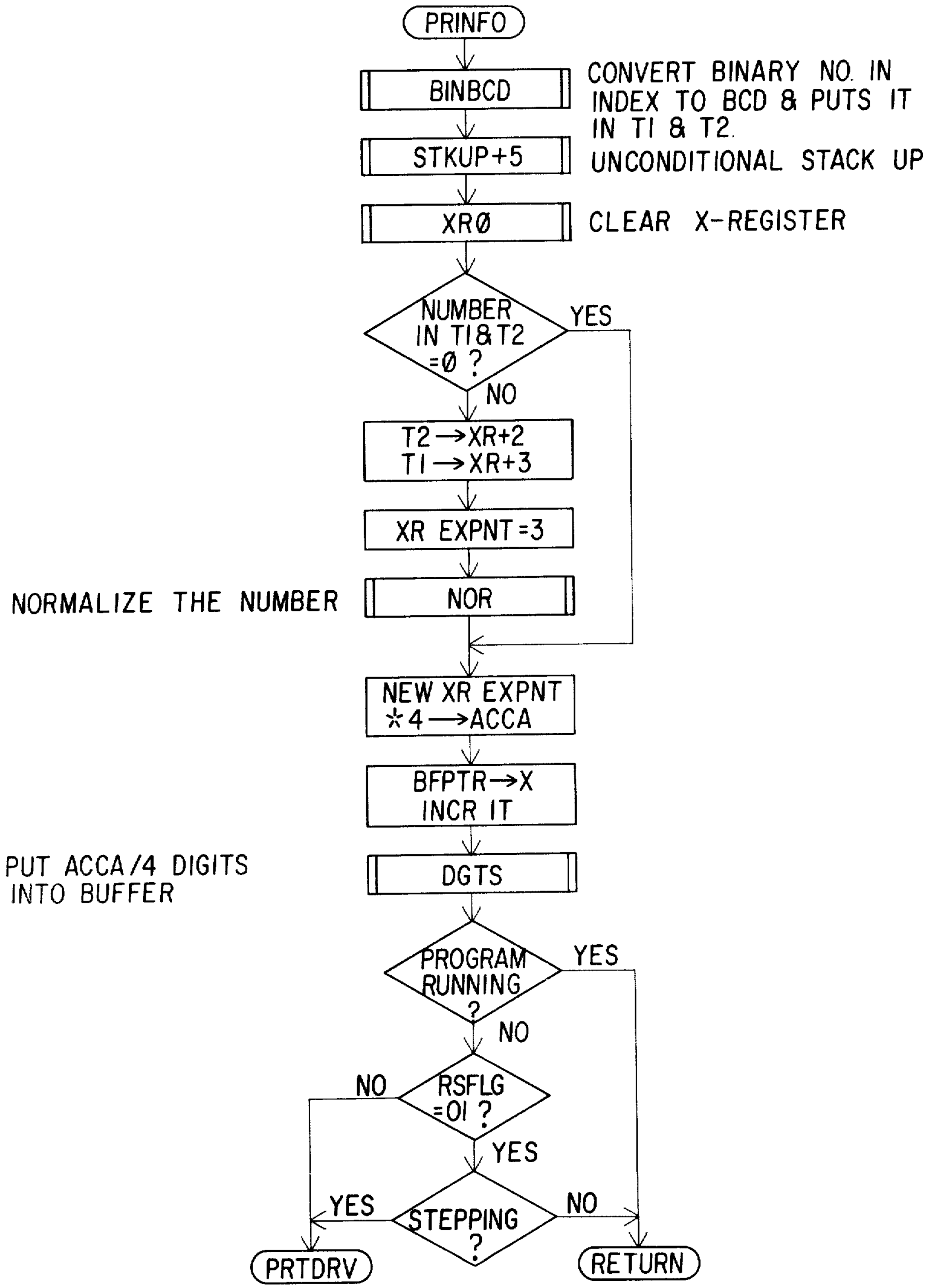
Figure 67S:
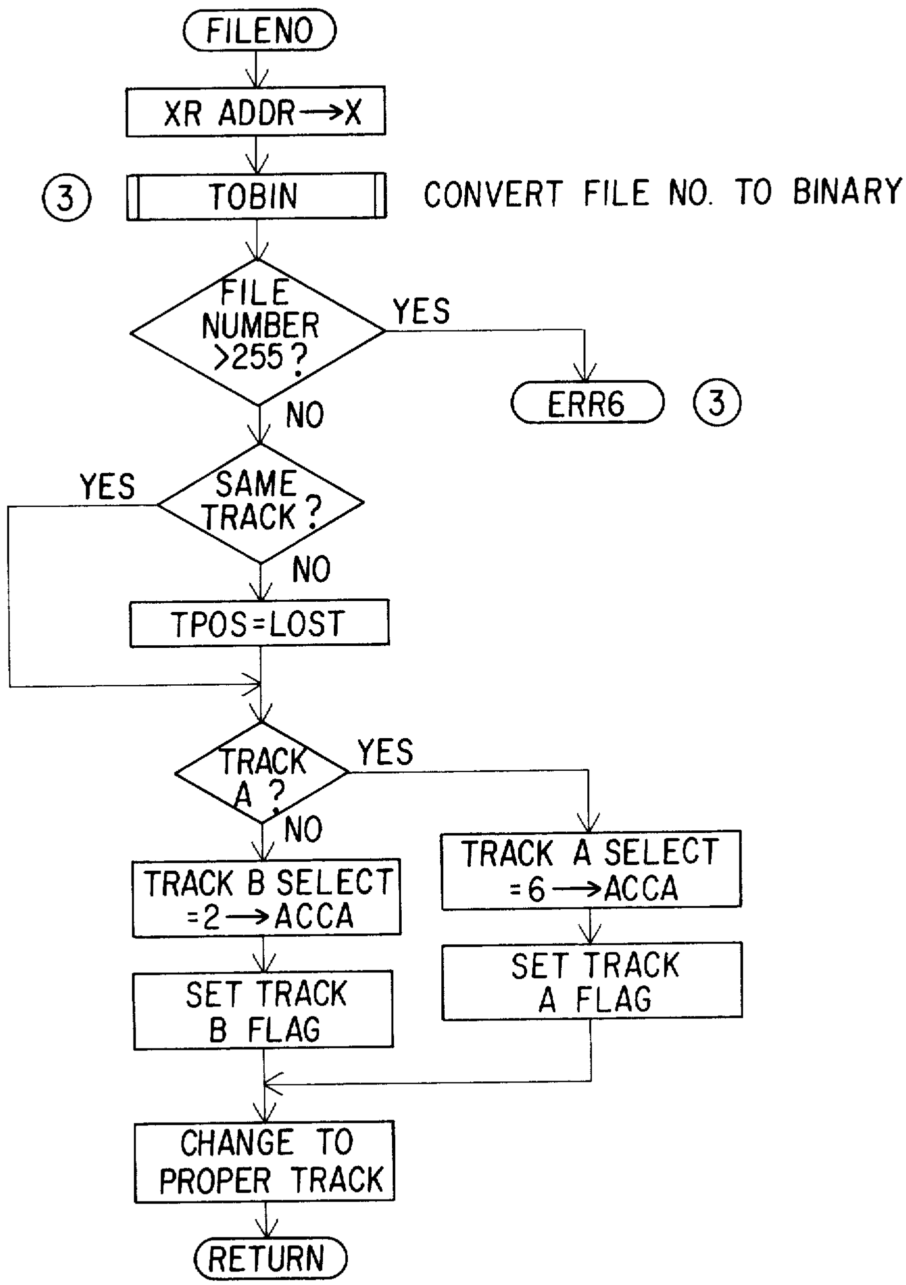
Figure 67T:
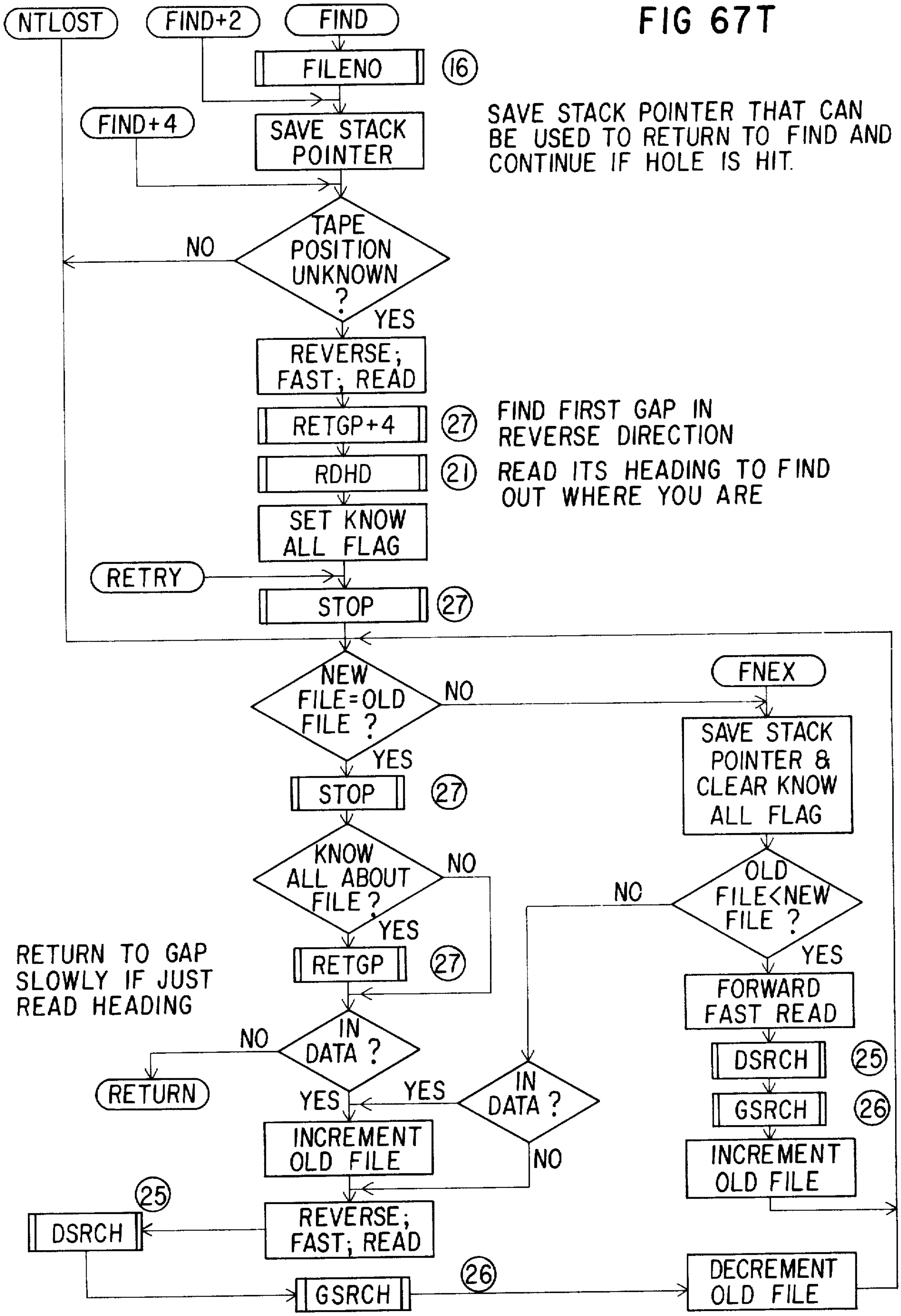
Figure 67X:
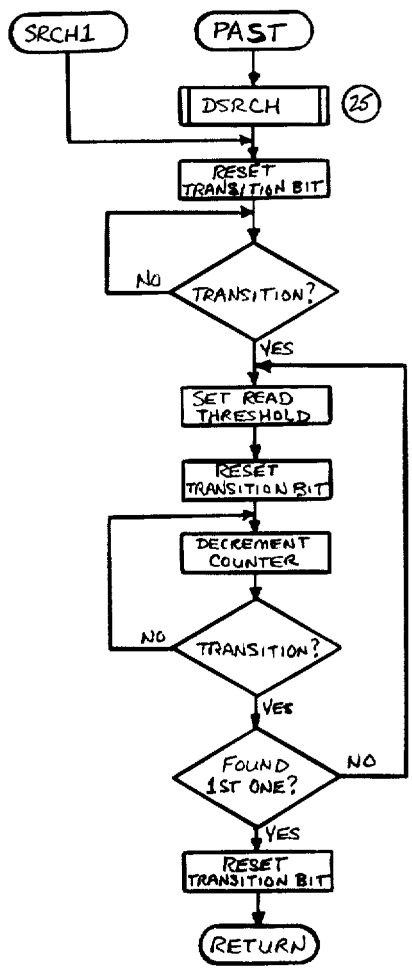
Figure 67Y:
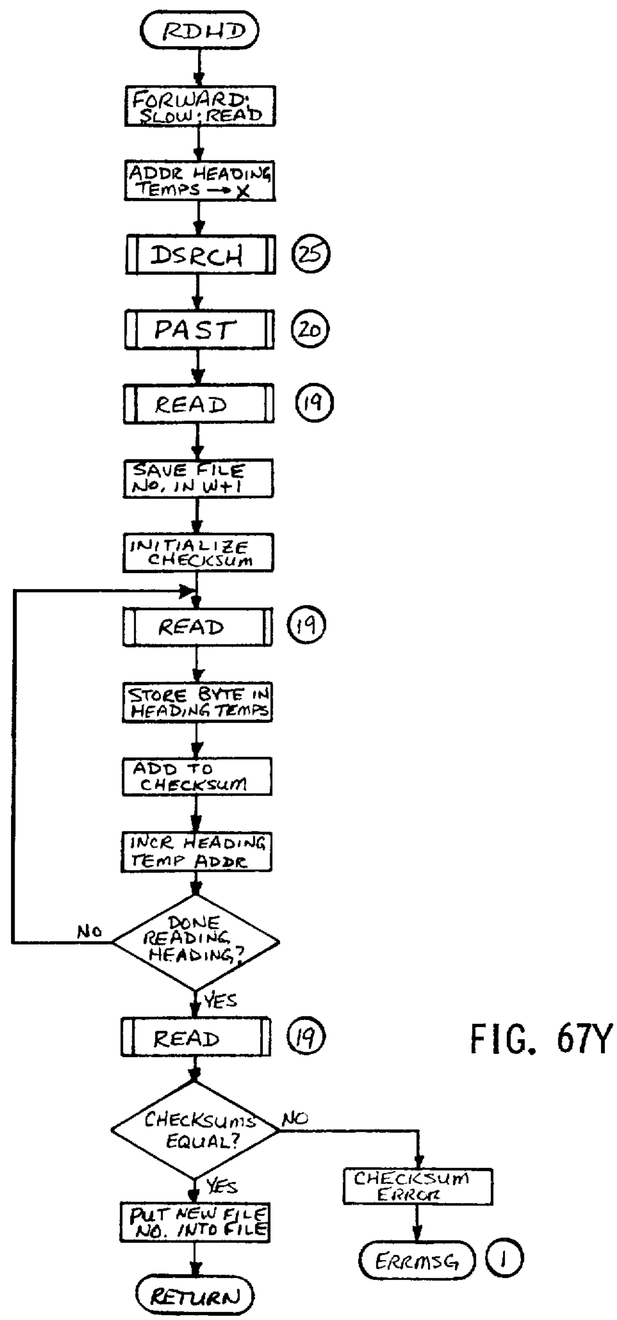
Figure 67Z:
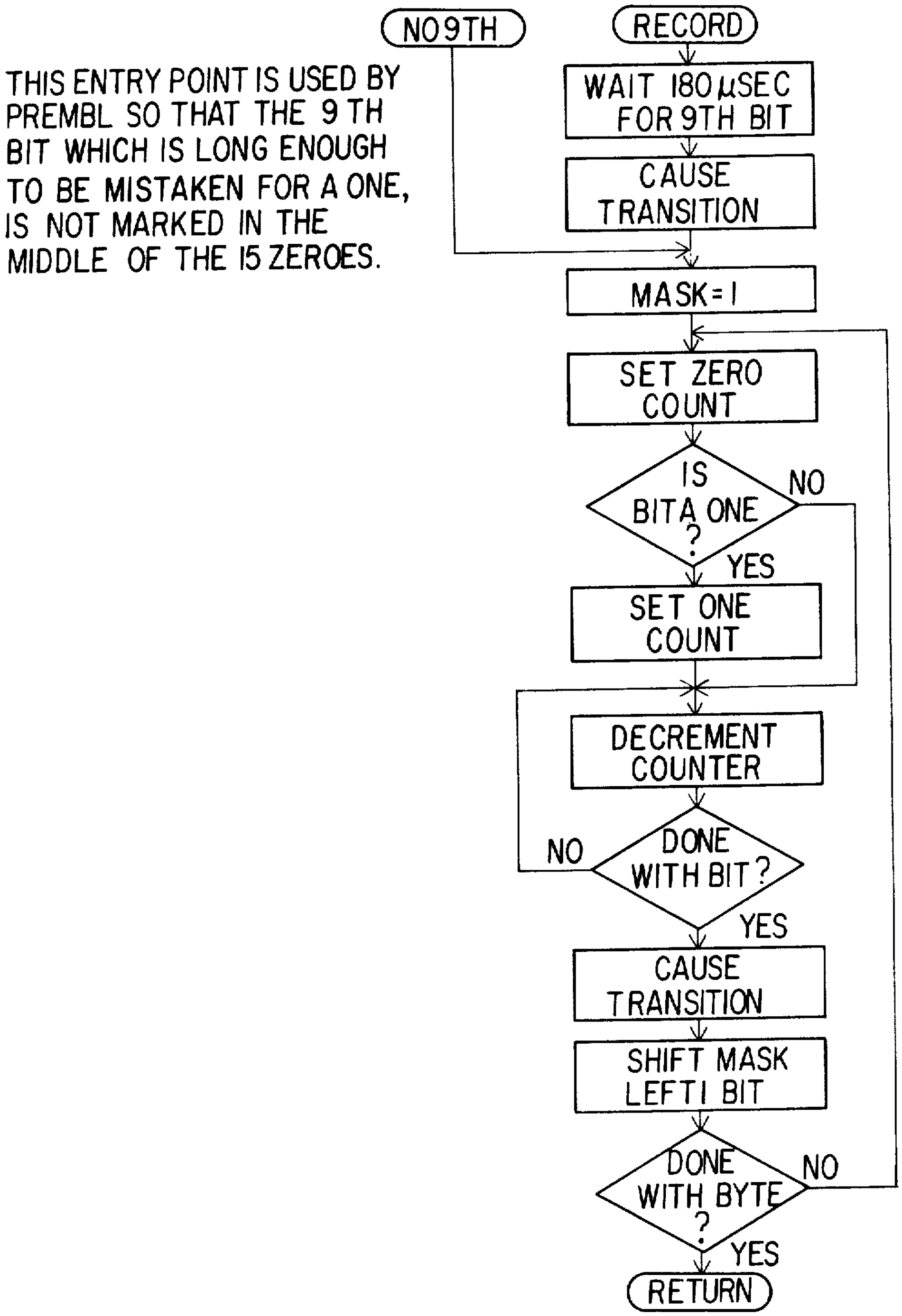
Figure 68A:
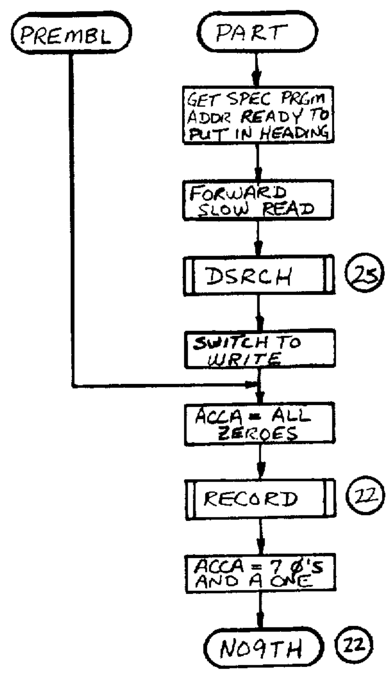
FIGS. 68A–J are a flow chart of another portion of the cassette driver routines stored in ROM 3 of FIG. 6.
Figure 68B:
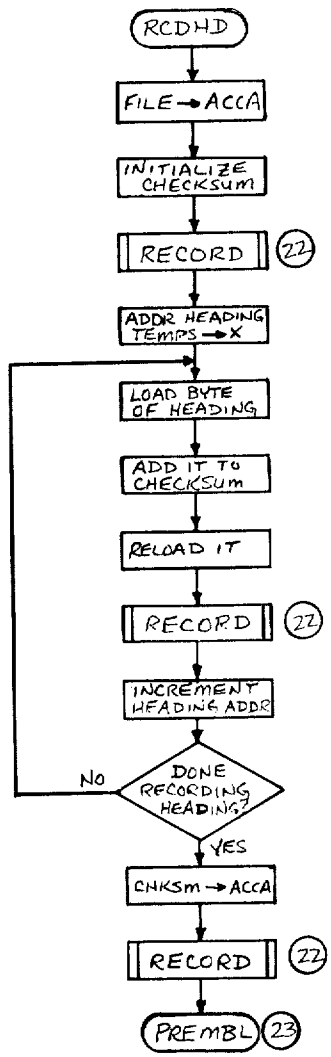
Figure 68C:
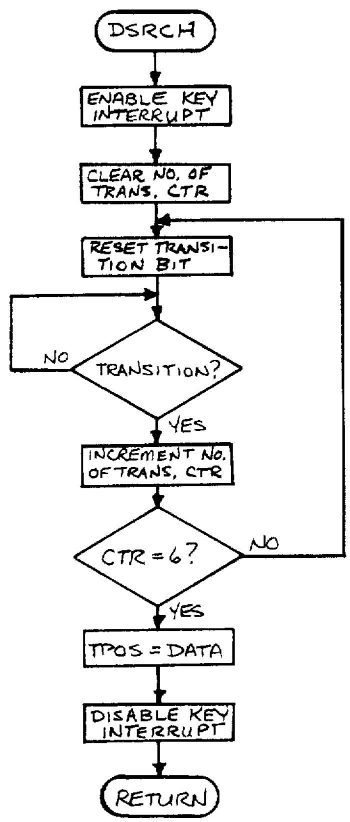
Figure 68D:
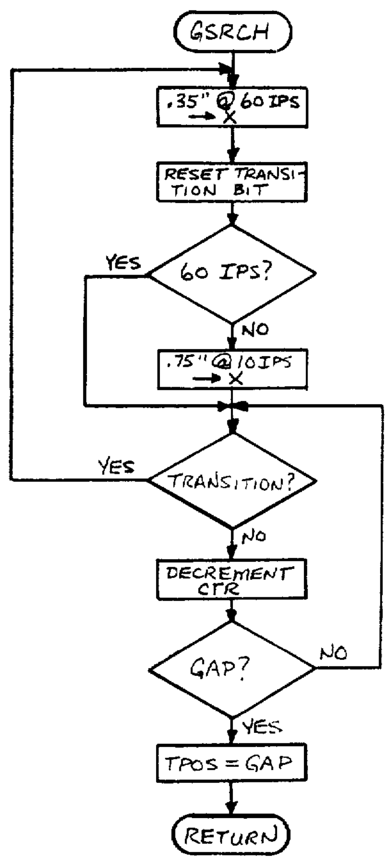
Figure 68E:
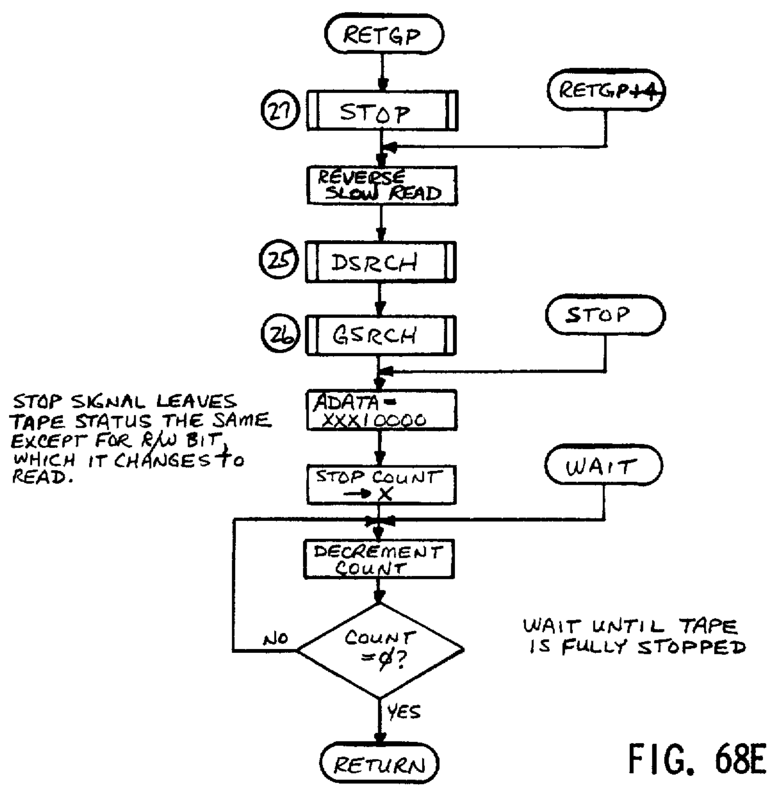
Figure 68F:
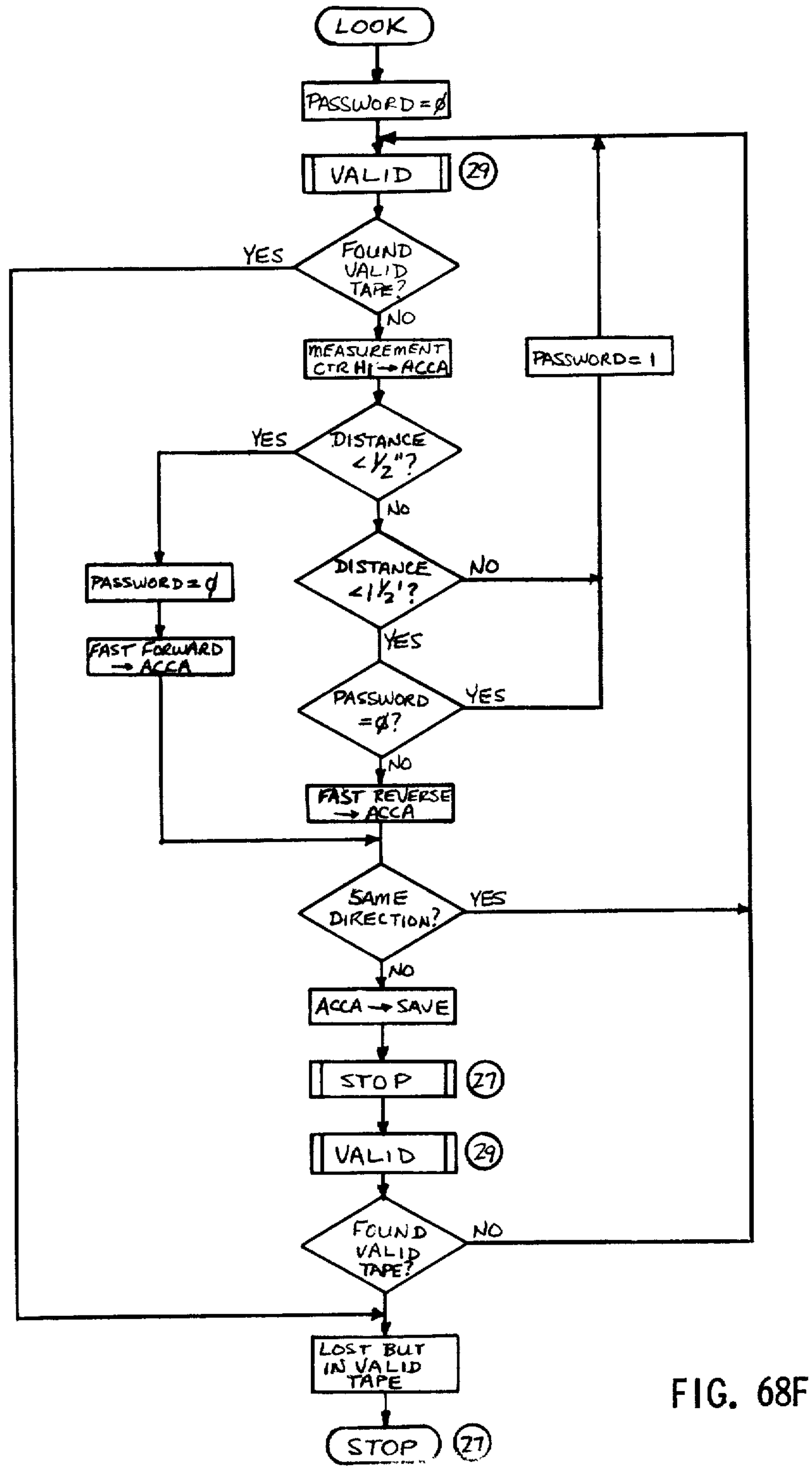
Figure 68G:
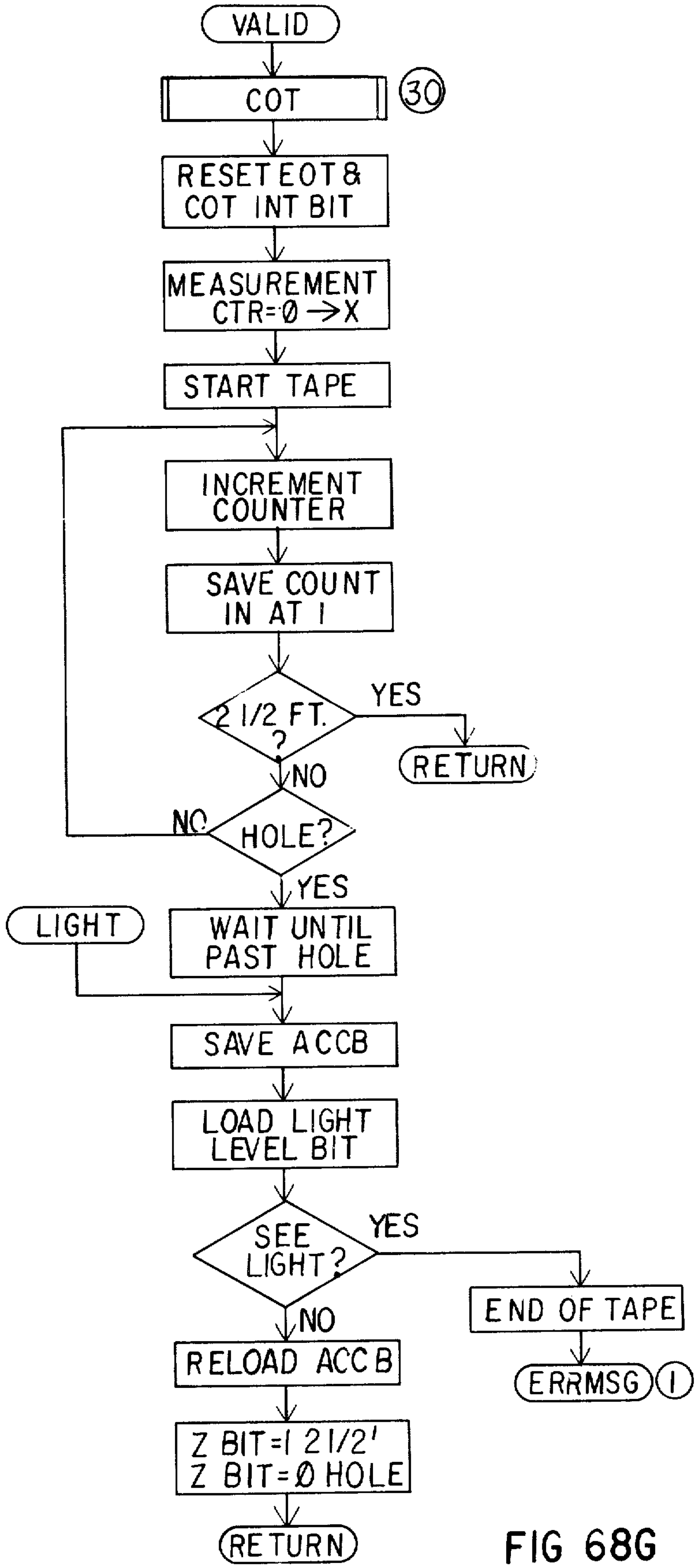
Figure 68H:
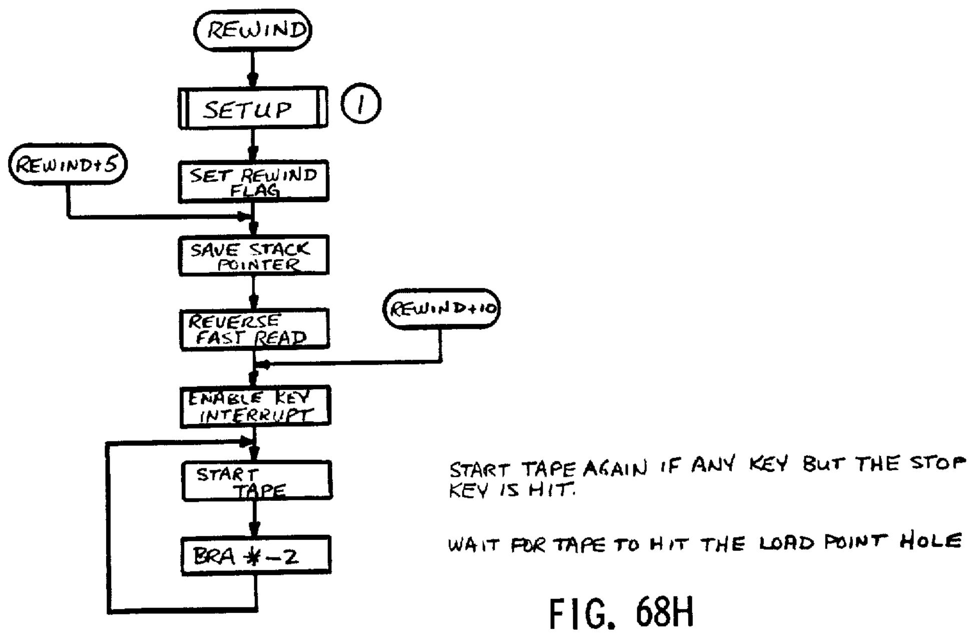
Figure 68:
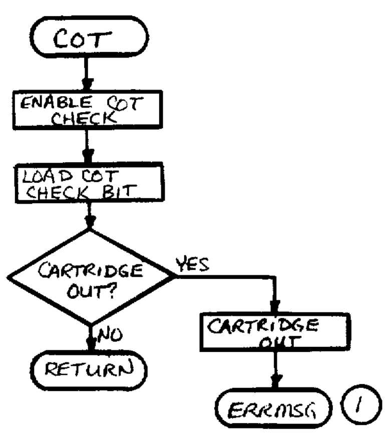
Figure 68J:
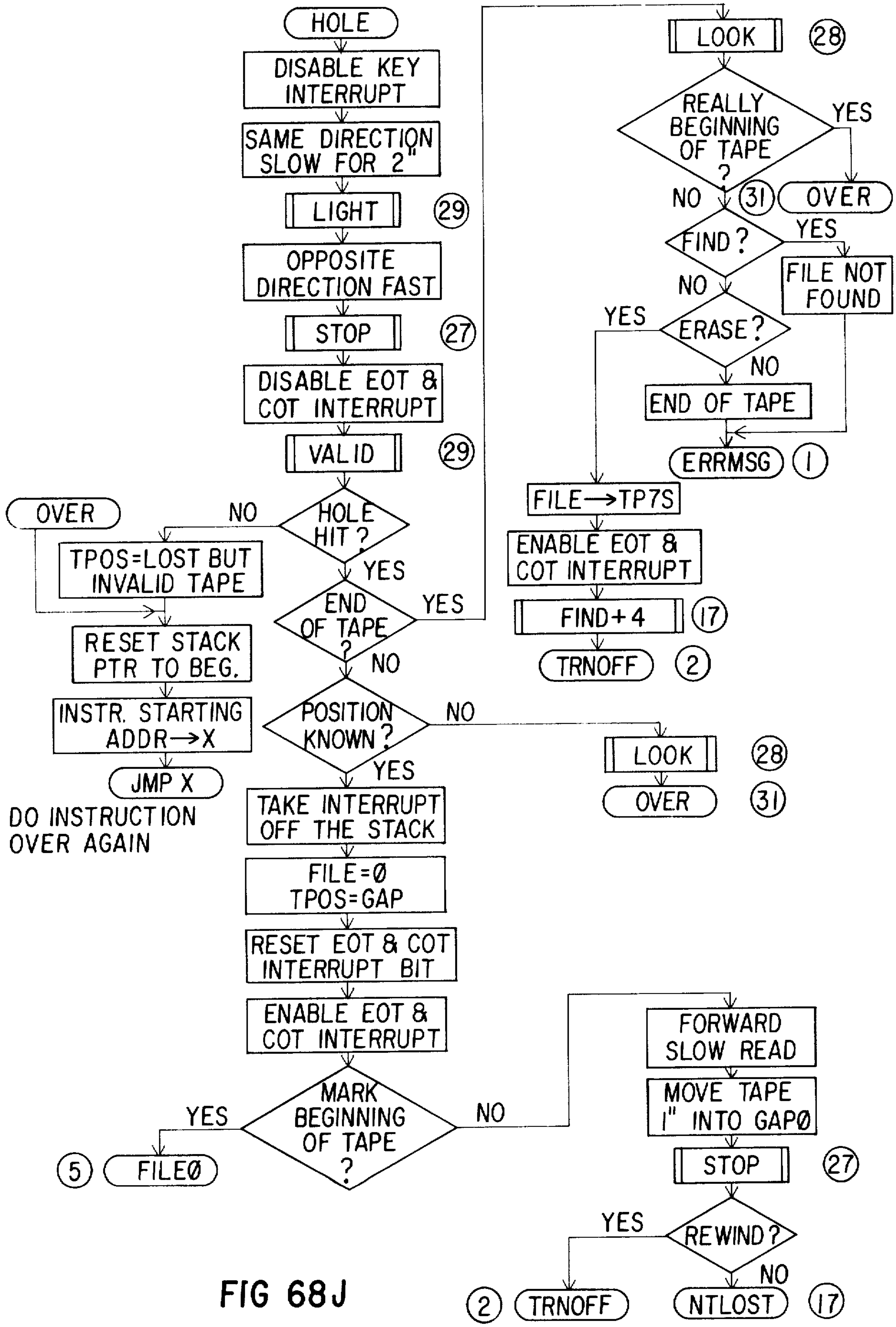

Referring now to FIG. 59, there is shown a power on detection circuit employed to sense whether operating power has been applied to the calculator by interrogating the line +RAW. A pulse is generated on the line MPWO by an RC time constant after the +5 volt power supply reaches its operating voltage. When operating power to the calculator is turned off, the line +RAW is the first of the power supply lines to die. This condition is detected, and another pulse on line $\overline{MPWO}$ is generated. The line $\overline{MPWO}$ is used by various portions of the calculators hardware for initialization purposes.

CALCULATOR FIRMWARE

Operation of the calculator firmware may be understood with reference to FIGS. 5–10, the calculator firmware listing of routines and subroutines stored within the calculator read-only memory, and the flow charts of these routines and subroutines illustrated in FIGS. 60–77F.

Figure 5:
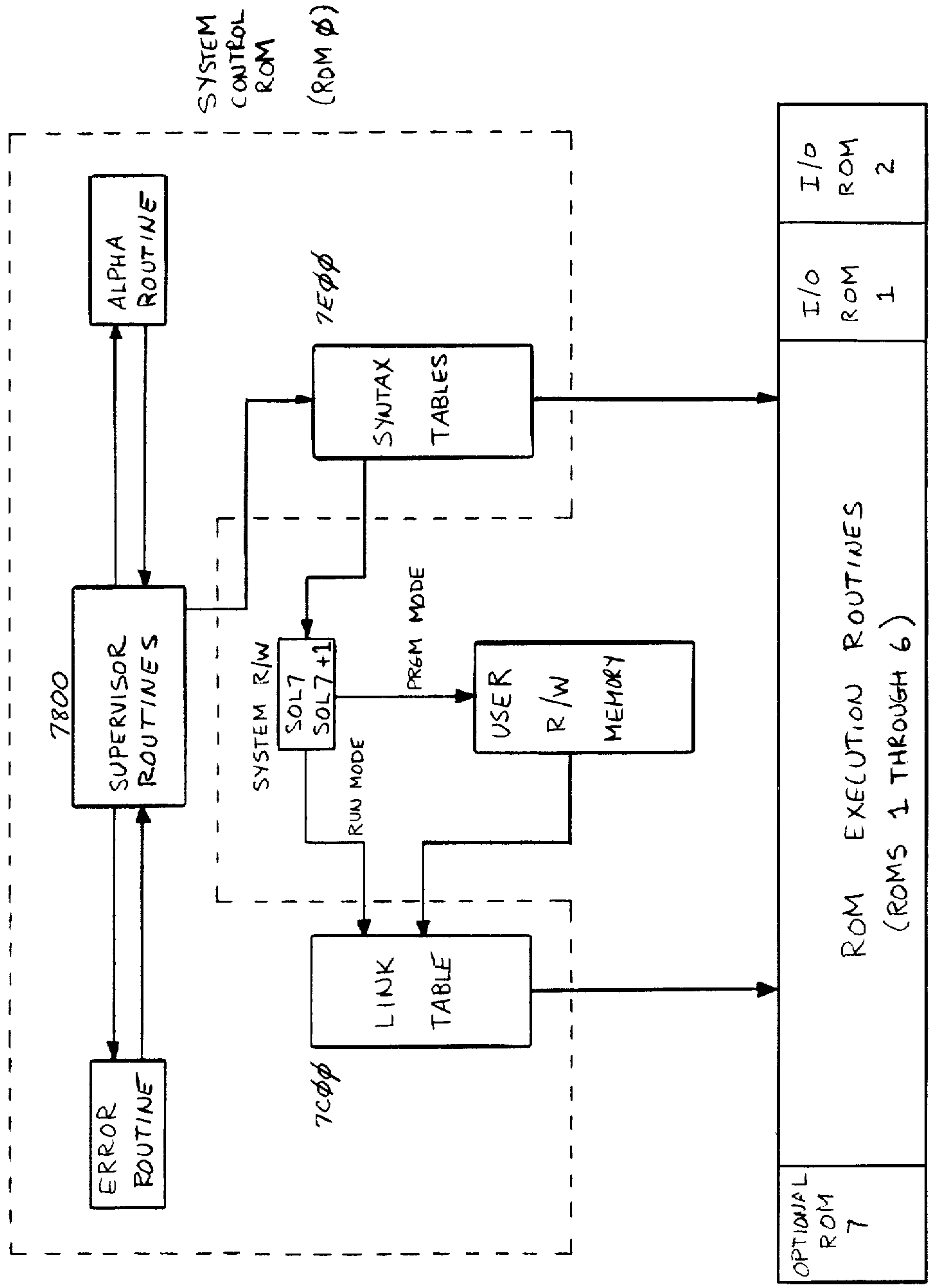
FIG. 5 is a simplified block diagram of the firmware associated with the calculator of FIG. 1.

Referring to FIG. 5, there is shown a simplified block diagram of the calculator firmware. Included are ROMs 0-6 comprising basic read-only memory 104 of FIG. 4, ROM 7 comprising the optional read-only memory 105 of FIG. 4, and the two I/O ROMs comprising the optional plug-in I/O ROMs 110 of FIG. 4.

Figure 6:
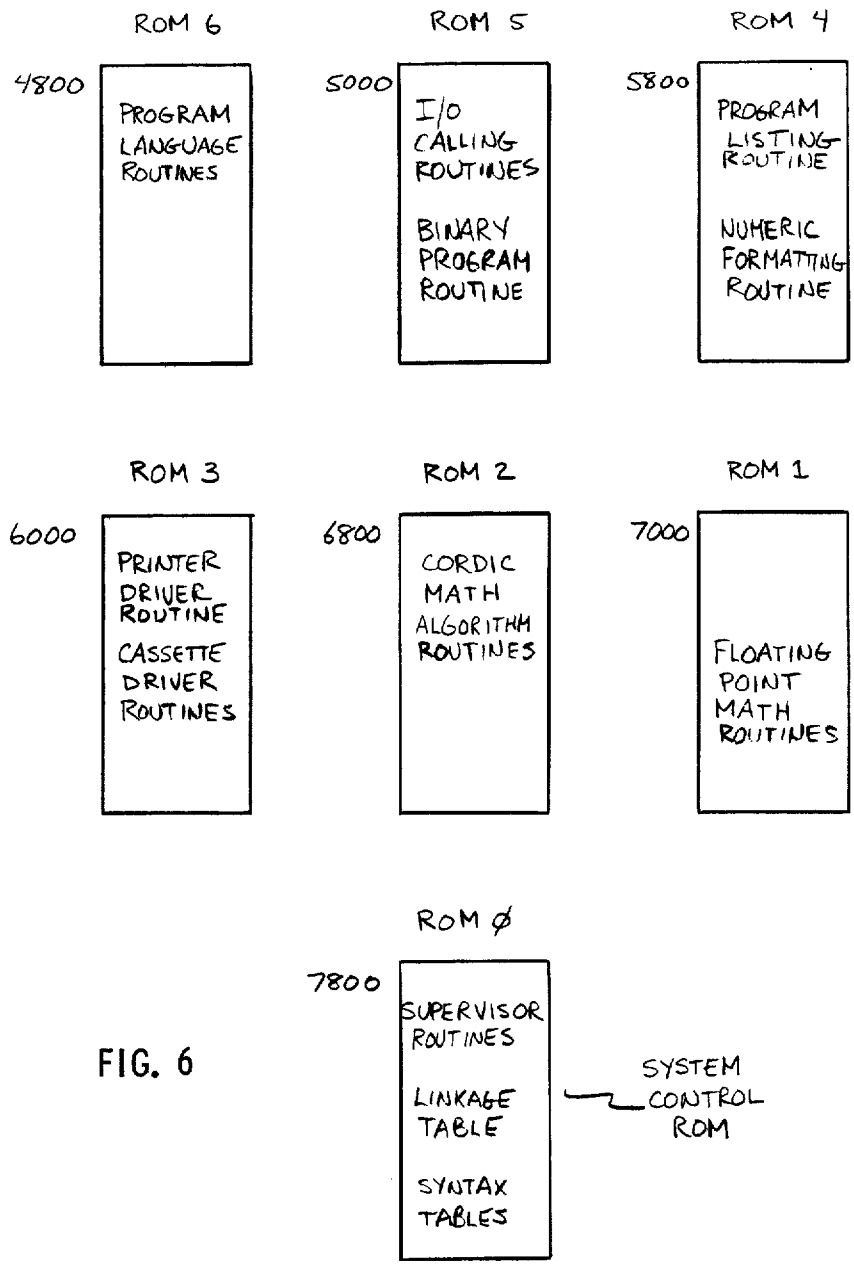
FIG. 6 is a simplified block diagram showing the ROMs 1–6 and the system control ROM of FIG. 5.

ROM 0, also referred to as the system control ROM, contains a group of supervisor routines, a linkage table, and syntax tables, as shown in FIG. 6. ROMs 1–6 contain various ROM execution routines also shown in FIG. 6. ROM 7 is available for storing routines and subroutines of additional instructions to expand the capability of the calculator. Optional plug-in I/O ROMs 1 and2 of FIG. 5 contain routines and subroutines of instructions for interfacing various peripheral I/O units to the calculator.

A detailed listing of the routines and subroutines of instructions stored in ROMs 0 and 3–6, together with a listing of the routines and subroutines that may be stored in two typical plug-in I/O ROMs, is provided hereinafter. In addition, detailed flow charts of these routines and subroutines are variously shown in FIGS. 60–77F. No listing of the floating point math routines stored in ROM 1 or the cordic math alogorithm routines stored in ROM 2 is provided since these routines are well known and may be readily implemented by those persons skilled in the art of computer logic.

Referring now to FIG. 7, there is shown a memory allocation diagram of the optional plug-in I/O ROMs illustrating their format by hexadecimal addresses.

Figure 8:
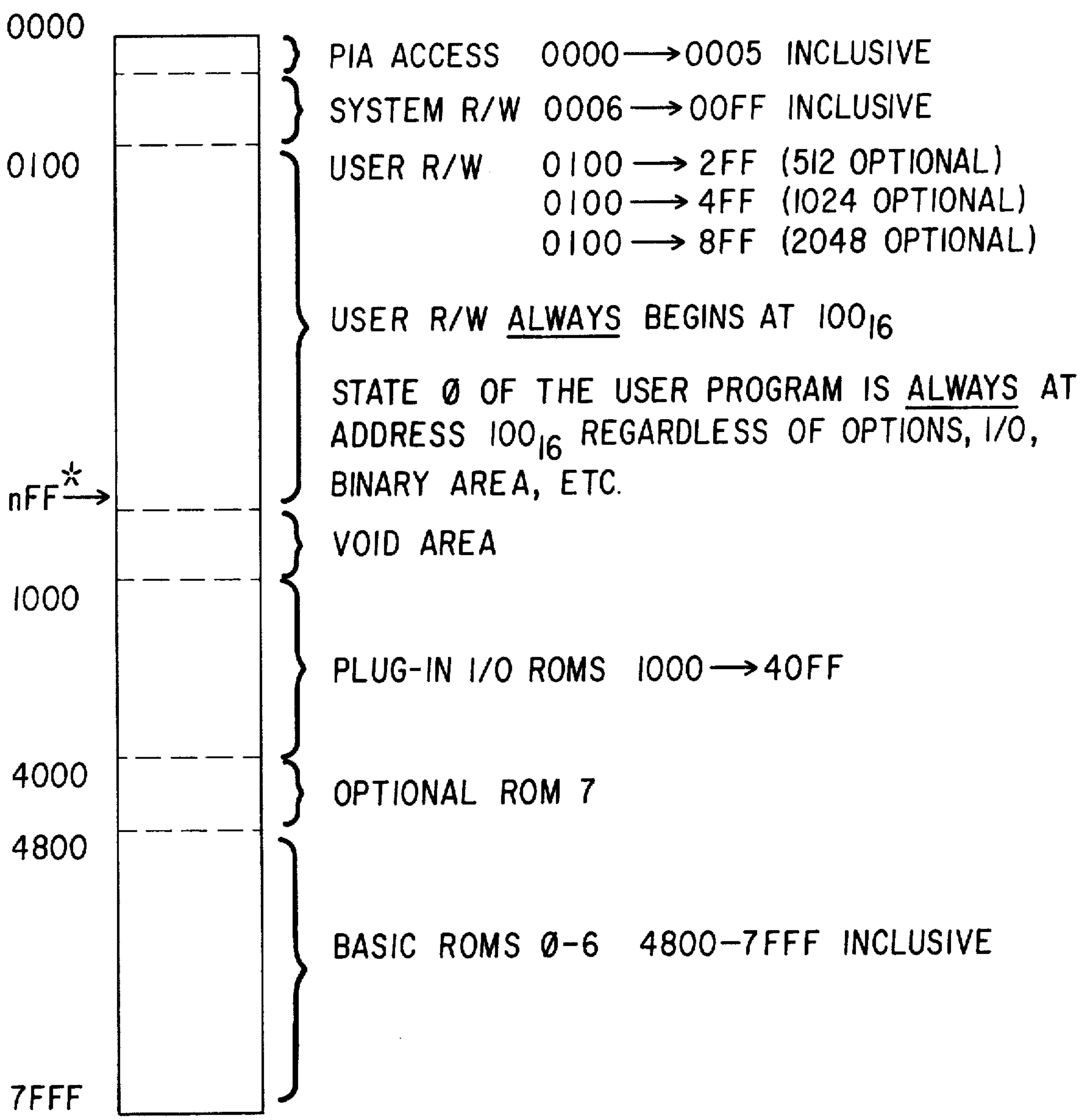
FIG. 8 is an overall memory map showing system and user read-write (R/W) memory, basic and optional ROM, and plug-in U/O ROM of FIGS. 4 and 5.

Referring now to FIG. 8, there is shown a map illustrating the allocation, by hexadecimal addresses of the entire calculator memory.

Figure 9:
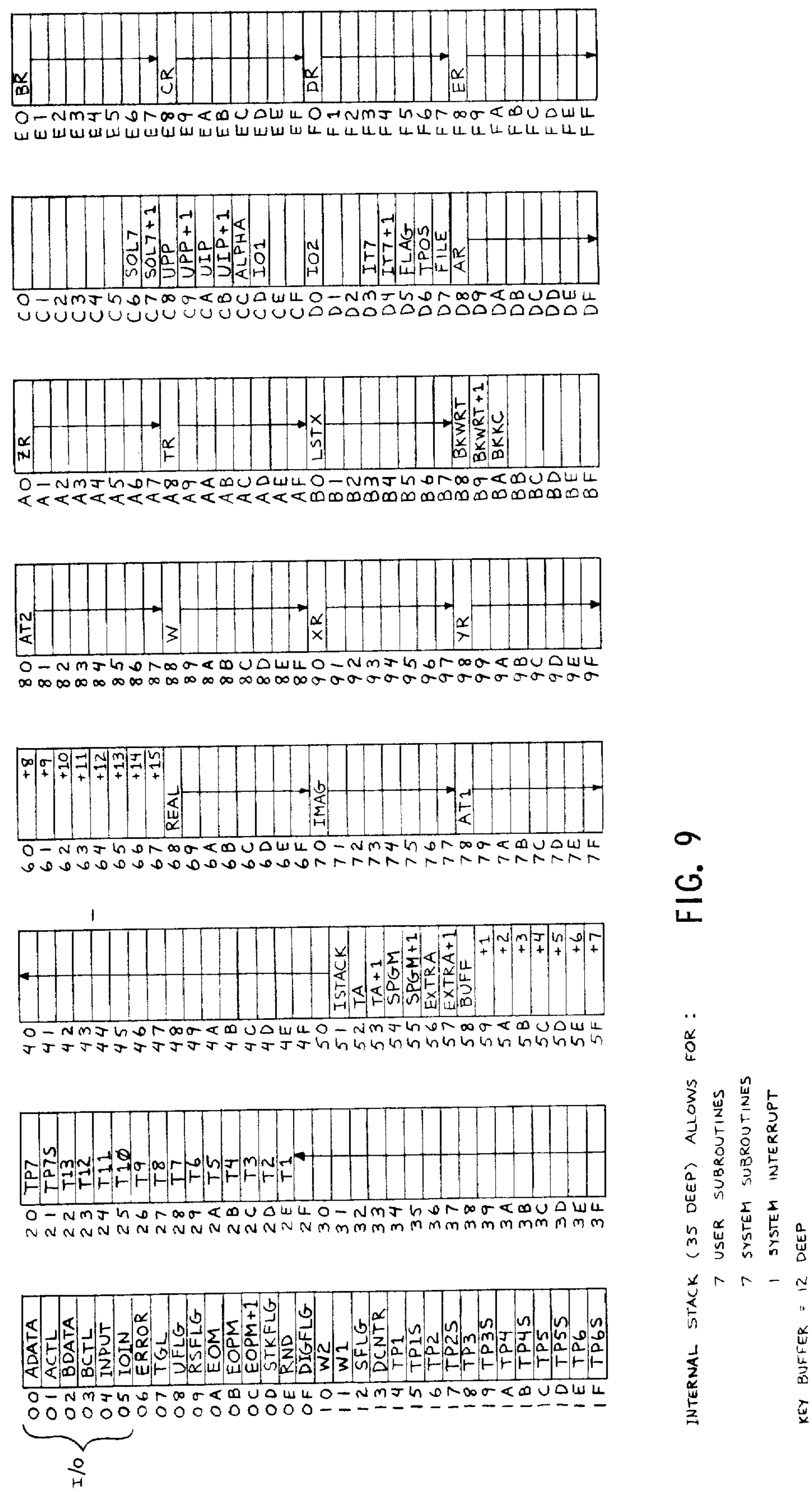
FIG. 9 is a detailed memory map of the system read-write memory of FIGS. 4, 5, and 8.

Referring now to FIG. 9, there is shown a detailed memory map of the base page or system read-write portion of the basic read-write memory 102 of FIG. 4. This base page is employed for storing several words of information used by the calculator firmware. It includes a status storage area used by the calculator firmware, a subroutine vector stack for storing return addresses associated with user subroutines, a temporary read-write or scratch pad memory, a buffer register used by the calculator and printer, a user operational stack including X, Y, Z, and T registers, a keycode buffer register, five user data storage registers A–E, pointers associated with the plug-in I/O ROMs, and various other pointers used by the calculator firmware.

Referring now to FIG. 10, there is shown a detailed memory map of the user portion of basic read-write memory 104 of FIG. 4. This map illustrates a pointer EOPM separating a program storage portion of user read-write memory from a data storage portion. This boundary pointer EOPM may be moved within the user read-write memory at the discretion of the user by execution of an instruction from the keyboard or under program control, as described in detail hereinafter. This arrangement results in more efficient use of the calculator read-write memory by allowing the user to quickly and easily adjust the respective sizes of the program and data storage portions thereof to suit his present needs.

DETAILED LISTING OF ROUTINES AND SUBROUTINES OF INSTRUCTIONS

A complete assembly language listing of all of the routines and subroutines of instructions employed by the calculator is given below. The listing includes all routines and subroutines stored in ROMs 0 and 3–6 of the basic read-only memory 104 of FIG. 4 as well as all the routines and subroutines stored in a general purpose plug-in I/O ROM and a plotter plug-in I/O ROM. Each page within the listing is numbered at the upper left-hand corner, and its page number within the specification as a whole is indicated at the bottom of the page. Each line of each page is separately numbered in the first column from the left-hand side of the page. This numbering arrangement facilitates reference to different portions of the listing. Descriptive headings are also provided throughout the listing to identify routines, subroutines, groups of constants, linkage tables, optional plug-in I/O ROM routines and subroutines, etc. Each instructiom of each routine or subroutine and each constant stored in the ROMs of the basic read-only memory or the optional plug-in I/O ROMs is represented in hexadecimal form by two, four or six characters in the third and fourth columns from the left-hand side of the page. Each of these instructions may be understood in detail by referring to published literature associated with the Motorola MC6800 microprocessor. The hexadecimal address of the ROM location in which each such instruction or constant is stored is given in the second column from the left-hand side of the page. By comparing the hexadecimal address given in the listing for a particular instruction to the addresses associated with the various ROMs shown in FIG. 6, it can be seen in which of the ROMs 0–6 that instruction resides.

Mnemonic labels serving as symbolic addresses or names are given in the fifth column from the left-hand side of the page. A mnemonic code for each of the instructions is given in the sixth column from the left-hand side of the page. In the case of those instructions involving a reference to one of the two accumulators within CPU 100, either the letter A or the letter B appears in the seventh column from the left-hand side of the page to designate the appropriate accumulator. Operands that may be either labels or literals associated with each of the instructions are located in the eighth column from the left-hand side of the page. Explanatory comments are given in the remaining portion of each page.

In addition, symbol tables are included following various sections of the listing to relate various mnemonic labels to their hexadecimal values.

```
                           OPT    LIST,MEM
                           NAM    POSUP
                           OPT    LIST,MEM,NG
7FFE                       ORG    $7FFE
                   *
                   *
                   *****POWER-ON AND SUPERVISOR*****
                   *
                   *
                   *THIS ROUTINE IS THE POWER-ON SEQUENCE AND
                   *THE SUPERVISOR FOR CJ.
                   *
7FFE 7800                  FDB    $7800     POWER FAIL/RESTART VECTOR
7800                       ORG    $7800     POWER ON BEGINS HERE
7800 8E 0051               LDS    #ISTACK    INITIALIZE STACK POINTER
7803 B6 1002               LDA A  $1002     GET POSSIBLE TEST ROM
7806 81 39                 CMP A  #$39      IS IT THERE ?
7808 26 03                 BNE    NOTEST    BRANCH IF NOT
780A 7E 1025               JMP    $1025     ELSE LET IT HAVE CONTROL
780D 86 FF       NOTEST    LDA A  #$FF      ACCA = ALL ONES
780F 97 00                 STA A  ADATA     AIO IS NOW ALL OUTPUTS
7811 97 02                 STA A  BDATA     BIO IS NOW ALL OUTPUTS
7813 86 3C                 LDA A  #$3C      PREPARE TO SELECT DATA REGISTERS
7815 97 01                 STA A  ACTL      SELECT ADATA
7817 97 03                 STA A  BCTL      SELECT BDATA
7819 CE 0000               LDX    #0        CLEAR THE INDEX
781C DF 20       MORE      STX    TP7       SAVE ON BASE PAGE
781E 7C 0020               INC    TP7       INC THE PAGE ADRS
7821 DE 20                 LDX    TP7       RESTORE NEW INDEX
7823 86 49                 LDA A  #@111     GET MEMORY CHECK WORD
7825 A7 00                 STA A  X         STORE IN "SUPPOSED" MEMORY
7827 A1 00                 CMP A  X         WAS MEMORY OUT THERE ?
7829 27 F1                 BEQ    MORE      BRANCH IF YES
782B D6 20                 LDA B  TP7       ELSE ACCB=PAGE ADRS OF EMPTY PAGE
782D 6F 00       ERASE     CLR    X         ERASE ALL OF R/W
782F 09                    DEX
7830 8C 0005               CPX    #5        FINISHED YET ?
7833 26 F8                 BNE    ERASE
7835 D7 0A                 STA B  EOM       SAVE END OF MEMORY ADRS
7837 5A                    DEC B            BACK UP ONE PAGE
7838 D7 0B                 STA B  EOPM      AND END OF PRGM MEMORY
783A C6 D8                 LDA B  #$D8      GET ADRS ON PAGE
783C D7 0C                 STA B  EOPM+1    INITIALIZE ALPHA REG.
783E DE 0B                 LDX    EOPM      GET CURRENT END POINTER
7840 DF C0                 STX    IO1       INITIALIZE I/O 1
7842 DF D0                 STX    IO2       INITIALIZE I/O 2
7844 7C 00C8               INC    UPP       GENERATE PAGE ADRS
7847 86 06                 LDA A  #6        LOAD TRACK A SEL. CODE
7849 BD 7A26               JSR    RDTGL1+3   SET CASSETTE TRACK A
784C C6 10                 LDA B  #$10      GET "FIXED MODE" BIT
784E D7 07                 STA B  TGL       SET TOGGLE WORD
7850 C6 02                 LDA B  #2        LOAD DISPLAY ROUND NUMBER
7852 D7 0E                 STA B  RND       SAVE IN ROUND WORD
7854 96 20       IOPOLL    LDA A  TP7       GET MSB'S OF POLLING ADDRESS
7856 8B 08                 ADD A  #8        BUMP BY ONE ROM
```

```
7858 97 20          STA A  TP7        RESTORE IT
785A 81 48          CMP A  #$48       FINISHED YET ?
785C 27 0C          BEQ    NOIO2      BRANCH IF YES
785E DF 20          LDX    TP7        ELSE LOAD CURRENT ROM ADRS
7860 E6 02          LDA B  2,X        GET THIRD ROM WORD
7862 C1 7E          CMP B  #$7E       IS IT A JMP STATEMENT ?
7864 26 EE          BNE    IOPOLL     CONTINUE POLLING IF NOT
7866 AD 02          JSR    2,X        ELSE OFFER INITIALIZATION
7868 20 EA          BRA    IOPOLL     CONTINUE POLLING
786A DE 08   NOIO2  LDX    EOPM       GET MODIFIED EOPM
786C DF 54          STX    SPGM       SAVE IN SPECIAL PRGM PNTR
786E D6 0C          LDA B  EOPM+1     GET END PNTR
7870 96 0B          LDA A  EOPM
7872 C0 50          SUB B  #80        INITIALIZE 10 REGISTERS
7874 D7 0C          STA B  EOPM+1     RESTORE PNTR
7876 82 00          SBC A  #0
7878 97 0B          STA A  EOPM
787A 96 06          LDA A  ERROR      POWER-ON I/O ERROR ?
787C 26 38          BNE    IOERR      BRANCH IF YES
787E 86 0C          LDA A  #$C        LOAD TOGGLE S.C.
7880 97 00          STA A  ADATA      SEND TOGGLE SELECT CODE
7882 96 04          LDA A  INPUT      GET TOGGLE CONDITIONS
7884 7F 0000        CLR    ADATA      DISABLE THE I/O TRANSFER
7887 44             LSR A             SHIFT AUTO-START BIT TO CARRY
7888 25 3F          BCS    TOP7       BRANCH IF NO AUTO START
788A BD 5D75        JSR    BLANK      BLANK PRINT BUFFER
788D CE 0058        LDX    #BUFF      ELSE GET BUFFER ADRS
7890 DF 16          STX    TP2        SAVE FOR "LOAD MESSAGE"
7892 CE 78BE        LDX    #MSG1      GET "AUTO START" MESSAGE ADRS
7895 BD 57BD        JSR    LDMSG      DO MESSAGE TO BUFFER
7898 BD 6046        JSR    PRTDRV+25    PRINT AUTO START
789B FE 7D4C        LDX    $7D4C      GET THE "LOAD & GO" ADDRESS
789E 4F             CLR A             INITIALIZE ACCA
789F AD 00          JSR    X          CALL THE CASSETTE
78A1 96 06          LDA A  ERROR      ERROR GENERATED ?
78A3 27 14          BEQ    AUTOOK     BRANCH IF NOT
78A5 BD 5D75        JSR    BLANK      BLANK THE BUFFER
78A8 CE 0058        LDX    #BUFF      GET BUFFER ADRS
78AB DF 16          STX    TP2        SAVE FOR "LOAD MESSAGE"
78AD CE 54D8        LDX    #EMSG+$D8    GET "FAILED" MESSAGE ADRS
78B0 BD 57BD        JSR    LDMSG      DO MESSAGE TO BUFFER
78B3 BD 6046        JSR    PRTDRV+25    PRINT FAILED
78B6 7E 7840 IOERR  JMP    ERROR7     OUTPUT THE SPECIFIC CASSETTE ERROR
78B9 C6 80   AUTOOK LDA B  #$80       ACCB="RUN" INSTRUCTION
78BB 7E 796B        JMP    EXEC7      RUN !!!!!
78BE 41      MSG1   FCC    /AUTO START/
78C8 80             FCB    $80
             *
             *
             ****THE SUPERVISOR FOLLOWS. IT IS THE
             ****CONTROL SECTION FOR THE ENTIRE MACHINE
             *
             *
78C9 0E      TOP7   CLI               ENABLE INTERRUPTS
78CA 4F             CLR A
78CB 97 CC          STA A  ALPHA      RESET ALPHA MODE
78CD 97 C6          STA A  SOL7       CLEAR SINGLE OP LOCATION
78CF 97 11          STA A  W1         CLEAR BCD ACC.
78D1 97 10          STA A  W2         CLEAR BCD ACC.
78D3 97 13          STA A  DCNTR      CLEAR PLABR DIGIT COUNTER
78D5 86 80          LDA A  #@200      BIT 7=1
78D7 97 C7          STA A  SOL7+1     INIT SECOND BYTE
78D9 CE 00C6        LDX    #SOL7      GET SINGLE OP LOC ADDRESS
78DC DF CA          STX    UIP        PLACE IT IN THE INST CNTR
78DE CE 7E00        LDX    #MT        GET MAIN TABLE ADDRESS
78E1 DF D3          STX    IT7        SAVE IN INDEX TEMP
78E3 BD 7A64 NK7    JSR    SDISP1     GO TO DISPLAY DRIVER
             *
             * IF A KEY WAS AVAILABLE, ITS CODE IS RETURNED
             *IN THE A ACCUMULATOR
             *
78E6 DE D3          LDX    IT7        GET CURRENT SEARCH TABLE ADRS
78E8 81 0C          CMP A  #@14       BACK STEP KEY ?
78EA 26 0C          BNE    TSRCH7     BRANCH IF NOT AND SEARCH
78EC D6 07          LDA B  TGL        ELSE CHECK MODE
```

```
78EE 2B 03              BMI     TSRCH6    BRANCH IF PRGM MODE
78F0 7E 797B            JMP     BWM       ELSE DO "OOPS"
78F3 8C 7E00  TSRCH6    CPX     #MT       ANY PREFIX KEYS HIT ?
78F6 26 01              BNE     TOP7      BRANCH IF YES AND FORGET THEM
78F8 E6 00    TSRCH7    LDA B   X         PUT TBL ENTRY INTO ACCB
78FA C1 3D              CMP B   #TERMN7    TBL TERMINATOR?
78FC 27 0E              BEQ     TEND7     GO TO "TERMINATOR FOUND"
78FE C4 3F              AND B   #@77      MASK OFF 2 MSB'S
7900 11                 CBA               MATCH FOUND?
7901 27 30              BEQ     MEND7     YES: GO TO "MATCH FOUND"
7903 6D 00              TST     X         NO: CONTINUE
7905 2A 01              BPL     TWOB7     1 BYTE FOLLOWS
7907 08                 INX               INC INDEX
7908 08       TWOB7     INX
7909 08                 INX
790A 20 EC              BRA     TSRCH7    CONTINUE SEARCHING
              *
              * "TBL TERMINATOR FOUND" IS HANDLED HERE
              *
790C 08       TEND7     INX
790D E6 00              LDA B   X         ERROR OR "OR" CONDITION ?
790F 2B 1B              BMI     ERR7      ERROR! GO TO ERROR HANDLER
7911 DF 14              STX     TP1       SAVE TABLE ADDRESS
7913 DE D3              LDX     IT7       GET TABLE STARTING ADRS
7915 8C 7E00            CPX     #MT       MAIN TABLE?
7918 26 0A              BNE     FIX       NO, CONTINUE
791A D6 07              LDA B   TGL       ELSE CHECK MODE
791C 2A 06              BPL     FIX       CONTINUE IF RUN MODE
791E DE 14              LDX     TP1       ELSE RE-LOAD INDEX
7920 08                 INX               INCREMENT OVER THE RUN MODE
7921 08                 INX               "OR" CONDITION
7922 20 02              BRA     FIX+2     GET THE NEW TBL ADRS
7924 DE 14    FIX       LDX     TP1       RESTORE TBL ADRS
7926 EE 00              LDX     X         GET THE NEW TBL ADRS
7928 DF D3              STX     IT7       SAVE IN INDEX TEMP
792A 20 CC              BRA     TSRCH7    CONTINUE SEARCHING
792C C4 7F    ERR7      AND B   #$7F      MASK OFF THE "N" BIT
792E D7 06              STA B   ERROR     SAVE IN ERROR WORD
7930 7E 7B40  EJSR7     JMP     ERROR7    GO TO ERROR OUTPUT ROUTINE
              *
              *
              *
7933 A6 00    MEND7     LDA A   X
7935 08                 INX
7936 4D                 TST A             TEST TBL ENTRY
7937 2B 1E              BMI     PARTI7    BIT 7=1
7939 48                 ASL A             GET BIT 6 (7=0)
793A 2B 0C              BMI     IMEX7     GO TO IMMEDIATE EXECUTE
793C 86 3F    L7        LDA A   #@77      GET ADRS HI
793E E6 00              LDA B   X         GET TBL ENTRY
7940 58                 ASL B             DOUBLE IT
7941 49                 ROL A             SHIFT C INTO MSW
7942 97 D3              STA A   IT7       RESTORE MSW
7944 D7 D4              STA B   IT7+1     RESTORE LSW
7946 20 9B              BRA     NK7       GO GET NEW KEY
7948 E6 00    IMEX7     LDA B   X         GET THE INST CODE
794A D7 C6              STA B   SOL7      STORE IN SINGLE OP LOC
794C D6 C6    CONT      LDA B   SOL7      ACCB=THE INSTRUCTION
794E 96 07              LDA A   TGL       PROGRAM MODE?
7950 2A 16              BPL     EXEC6     NO: GO EXECUTE
7952 BD 4ECB            JSR     STCOD7    ELSE STORE INSTRUCTION
7955 20 24              BRA     BWM       WRAP IT UP !
7957 48       PARTI7    ASL A             BIT 6=?
7958 2B 05              BMI     PARCD7    YES; PARTIAL CODE OPERATION
795A EE 00              LDX     X         FOR PARTIAL EXECUTION
795C 4F                 CLR A
795D 6E 00              JMP     X         DO "PARTIAL EXECUTION"
795F D6 C6    PARCD7    LDA B   SOL7      GET SINGLE OP WORD
7961 EB 00              ADD B   X         ADD THE PARTIAL CODE
7963 D7 C6              STA B   SOL7      RESTORE IT
7965 08                 INX
7966 20 D4              BRA     L7        GO FORM NEW TBL ADRS
7968 BD 5C31  EXEC6     JSR     AUDIT     AUDIT TRAIL ?
796B 86 BE    EXEC7     LDA A   #@276     GET PAGE OFFSET AND C
796D 58                 ASL B             DOUBLE ACCB
```

```
796E D7 15              STA B   TP1S      STORE IN LS WORD
7970 49                 ROL A             SHIFT IN C
7971 97 14              STA A   TP1       RESTORE MS WORD
7973 DE 14              LDX     TP1       GET TBL ADRS
7975 EE 00              LDX     X         GET ROUTINE ADRS
7977 86 00              LDA A   #0        CLEAR ACCA (BUT NOT C)
7979 AD 00              JSR     X         GO EXECUTE IT!
797B 7F 000F BWM        CLR     DIGFLG    CLEAR DIGIT ENTRY FLG
797E C6 80              LDA B   #@200     MSB=1
7980 D7 0D              STA B   STKFLG    ENABLE STACK LIFT
7982 D6 06     BWM2     LDA B   ERROR     GET ERROR WORD
7984 26 AA              BNE     EJSR7     YES; PRINT ERROR
7986 DE CA              LDX     UIP       GET USER INST. POINTER
7988 08                 INX               POINT TO NEXT INSTRUCTION
7989 DF CA              STX     UIP       SAVE THE UPDATE
798B E6 00              LDA B   X         GET THE NEXT USER INSTRUCTION
798D 96 CB              LDA A   UIP+1     CHECK VALIDITY OF NEW POINTER
798F 90 0C              SUB A   EOPM+1    BY DOING (UIP)-(EOPM)
7991 96 CA              LDA A   UIP
7993 92 0B              SBC A   EOPM
7995 2A 15              BPL     MAW       ERROR IF INVALID ADRS
7997 96 09              LDA A   RSFLG     SHOULD WE STOP ?
7999 2B D0              BMI     EXEC7     BRANCH IF NOT
799B 48                 ASL A             GET "ARE DOING" BIT
799C 2A 0B              BPL     TT7       RETURN TO TOP IF STOPPED
799E 96 12              LDA A   SFLG      ELSE GET STEP FLAG
79A0 26 04              BNE     SS        BRANCH IF STEPPING
79A2 96 0D              LDA A   STKFLG    ELSE CHECK STACK FLAG
79A4 27 C5              BEQ     EXEC7     CONTINUE IF LIFT DISABLED
79A6 BD 4800 SS         JSR     RSEX      ELSE STOP THE PROGRAM
79A9 7E 78C9 TT7        JMP     TOP7      GO BACK TO THE KEYBOARD
79AC C6 07     MAW      LDA B   #7        LOAD ERROR
79AE D7 06              STA B   ERROR     SAVE IN ERROR LOC.
79B0 CE 0100            LDX     #256      GET USER STATE 0
79B3 DF CA              STX     UIP       RESET INST PNTR
79B5 20 CD              BRA     BWM2+2    PRINT THE ERROR
               *
               *
               *
     4800      RSEX     EQU     $4800
     4EC8      STCOD7   EQU     $4EC8
     5C31      AUDIT    EQU     $5C31
                        NAM     RDKEY2
                        OPT     LIST,MEM
               *
               *
               *    RDKEY1 IS THE INTERRUPT SERVICE ROUTINE
               *    TO PROCESS A KEYBOARD INTERRUPT.
               *    THE KEYCODE FOR THE KEY WHICH
               *    IS DOWN WILL BE STORED IN THE BUFFER
               *    AREA AT LOCATION (BKWRT+1)+BKKC, IF THE
               *    BUFFER IS NOT FULL.
               *    IF THIS ROUTINE IS ENTERED AT
               *    RDTGL1 THEN THE CURRENT CONDITION OF
               *    THE TOGGLE SWITCHES IS READ.
               *    IF THERE IS NO CHANGE DETECTED BETWEEN
               *    (TGL) AND THE CURRENT SETTINGS THE B-REG
               *    IS CLEARED. IF THERE IS A DIFFERENCE THEN THE
               *    B-REG REFLECTS WHAT BITS CHANGED AND THE
               *    NEW SETTINGS ARE STORED IN TGL.
               *
               *    BRAD MILLER    3/4/74
               *
               *
79B7 96 00     RDKEY1   LDA A   ADATA     GET CURRENT I/O SELECT
79B9 8A 1F              ORA A   #$1F      SELECT THE KEYBOARD (SAVE CASS. BIT)
79BB 97 00              STA A   ADATA     OUTPUT IT
79BD 96 04              LDA A   INPUT     INPUT THE KEYCODE
79BF 43                 COM A             INVERT THE BITS
79C0 44                 LSR A             MOVE THEM TO LSB'S
79C1 44                 LSR A
79C2 D6 00              LDA B   ADATA     GET I/O SELECT
79C4 C4 F0              AND B   #$F0      MASK OFF THE KEYBOARD
79C6 D7 00              STA B   ADATA     DISABLE THE KEYBOARD
79C8 D6 05              LDA B   FLAG      CASSETTE RUNNING ?
79CA C5 02              BIT B   #2        TEST BIT 1
```

```
79CC 27 19              BEQ     NOPE2      BRANCH IF NOT
79CE 81 25              CMP A   #@45       R/S KEY ?
79D0 26 0C              BNE     YES3       BRANCH IF NOT
79D2 7F 00D6            CLR     TPOS       ELSE RESET TAPE POSITION POINTER
79D5 78 0009            ASL     RSFLG      ZERO TO MSB OF
79D8 74 0009            LSR     RSFLG      RUN/STOP FLAG
79DB 7E 61BE            JMP     TRNOFF     TURN OFF CASSETTE
79DE 81 0A     YES3     CMP A   #@12       SET FLAG KEY ?
79E0 26 12              BNE     YES1-1     RETURN IF NOT
79E2 D6 09              LDA B   RSFLG      PROGRAM RUNNING ?
79E4 2B 1E              BMI     YES2+3     BRANCH IF YES
79E6 3B                 RTI                ELSE RETURN
79E7 D6 09     NOPE2    LDA B   RSFLG      GET THE RUN/STOP FLAG
79E9 81 25              CMP A   #@45       RUN/STOP KEY ?
79EB 27 08              BEQ     YES1       YES; GO PROCESS
79ED 81 0A              CMP A   #@12       SET FLAG KEY ?
79EF 27 10              BEQ     YES2       YES; GO PROCESS
79F1 58                 ASL B              PROGRAM RUNNING ?
79F2 2A 17              BPL     NOPE       BRANCH IF NOT
79F4 3B                 RTI                ELSE IGNORE THE KEY
79F5 58        YES1     ASL B              ZERO TO MSB
79F6 54                 LSR B              OF RUN/STOP FLAG
79F7 D7 09              STA B   RSFLG      RESTORE NEW FLAG
79F9 C5 C0              BIT B   #$C0       SHOULD WE BUFFER THE KEY ?
79FB 27 18              BEQ     NOPE1      BRANCH IF YES AND BUFFER
79FD 7F 0012            CLR     SFLG       RESET STEP FLAG
7A00 3B                 RTI                ELSE RETURN
7A01 5D        YES2     TST B              CHECK RUN/STOP FLAG
7A02 2A 07              BPL     NOPE       CONTINUE IF B7=0
7A04 86 80              LDA A   #$80       PRESET ACCA
7A06 98 08              EOR A   UFLG       TOGGLE FLAG 8
7A08 97 08              STA A   UFLG       RESTORE THE FLAGS
7A0A 3B                 RTI                RETURN FROM THE INTERRUPT
7A0B 81 0B     NOPE     CMP A   #@13       STEP KEY ?
7A0D 27 06              BEQ     NOPE1      BRANCH IF YES
7A0F C6 BF              LDA B   #$BF       PRESET ACCB
7A11 D4 08              AND B   UFLG       CLEAR ENTRY FLAG
7A13 D7 08              STA B   UFLG       RESTORE FLAGS
7A15 D6 B9     NOPE1    LDA B   BKWRT+1     LOAD WRITE POINTER
7A17 C1 0C              CMP B   #12        IS BUFFER FULL ?
7A19 27 07              BEQ     RDKEY3     YES, IGNORE KEY AND RETURN
7A1B DE B8              LDX     BKWRT      NO,LOAD WRITE POINTER
7A1D A7 BA              STA A   BKKC,X     STORE KEYCODE IN NEXT LOCATION
7A1F 5C                 INC B              INCREMENT WRITE POINTER FOR NEXT KEY
7A20 D7 B9              STA B   BKWRT+1     STORE UPDATED WRITE POINTER
7A22 3B        RDKEY3   RTI                RETURN FROM INTERRUPT
               *
               * TOGGLE SWITCHES ARE READ HERE
               *
7A23 0F        RDTGL1   SEI                DISABLE INTERRUPTS
7A24 86 0C              LDA A   #$C        LOAD TOGGLE SELECT CODE
7A26 97 00              STA A   ADATA      OUTPUT THE SELECT CODE
7A28 96 04              LDA A   INPUT      INPUT THE TOGGLE CONDITIONS
7A2A 43                 COM A              INVERT THE BITS
7A2B 7F 0000            CLR     ADATA      DISABLE THE I/O TRANSFER
7A2E 0E                 CLI                RE-ENABLE INTERRUPTS
7A2F D6 07              LDA B   TGL        LOAD OLD CONDITIONS
7A31 C4 1F              AND B   #$1F       MASK OFF TRIG AND FORMAT
7A33 84 E0              AND A   #$E0       MASK OFF AUTO-START AND FORMAT
7A35 1B        RDT      ABA                COMBINE NEW WORD
7A36 D6 07              LDA B   TGL        GET OLD CONDITIONS
7A38 97 07              STA A   TGL        STORE THE NEW CONDITIONS
7A3A 17                 TBA                SAVE OLD CONDITIONS
7A3B D8 07              EOR B   TGL        ACCB=CHANGED BITS
7A3D 39                 RTS                RETURN
     61BE      TRNOFF   EQU     $61BE
               *
               *ROUTINE TO SET DEGREES, RADIANS, GRADS
               *
7A3E 49        RADS     ROL A
7A3F 49        GRADS    ROL A
7A40 D6 07     DEGS     LDA B   TGL        GET OLD SETTING
7A42 C4 FC              AND B   #$FC       MASK OFF OLD MODE
7A44 20 EF              BRA     RDT        INVOKE NEW SETTING
               *
7A46 49        FIXED    ROL A
```

```
7A47 49        SCI3   ROL A
7A48 49        SCI    ROL A
7A49 49               ROL A
7A4A 49               ROL A
7A4B 06 07            LDA B   TGL       GET OLD DISPLAY MODE
7A4D C4 E3            AND B   #$E3      MASK OFF OLD SETTING
7A4F 1B               ABA               INVOKE NEW SETTING
7A50 97 07            STA A   TGL       SAVE THE UPDATE
7A52 DE CA            LDX     UIP       GET THE INSTRUCTION POINTER
7A54 08               INX               MOVE AHEAD ONE
7A55 DF CA            STX     UIP       SAVE THE UPDATE
7A57 A6 00            LDA A   X         GET THE ROUND SETTING
7A59 81 09            CMP A   #9        LARGER THAN 9 ?
7A5B 22 02            BHI     RD7       IGNORE IT; RAM/INSTRUCTION FAILURE
7A5D 97 0E            STA A   RND       SAVE IT
7A5F 39        RD7    RTS               RETURN
7C5C                  ORG     $7C5C
7C5C 7A40             FDB     DEGS
7C7C                  ORG     $7C7C
7C7C 7A3F             FDB     GRADS
7C7E 7A3E             FDB     RADS
7D76                  ORG     $7D76
7D76 7A46             FDB     FIXED
7D78 7A48             FDB     SCI
7D7A 7A47             FDB     SCI3
7FF8                  ORG     $7FF8
7FF8 7987             FDB     RDKEY1
                      NAM     DISPLAY
                      OPT     LIST,MEM
7A60                  ORG     $7A60
               *
               *THIS IS THE ROUTINE THAT WILL DRIVE THE
               *DISPLAY WHILE WAITING FOR THE NEXT KEY.
               *IT WILL CHECK FOR A KEY AFTER EACH CHARACTER
               *DISPLAYED AND WILL READ THE TOGGLE SWITCHES
               *AFTER EACH COMPLETE PASS (16 CHAR.) THRU THE
               *DISPLAY. IF THE SWITCHES HAVE CHANGED, A MODE
               *CHANGE WILL RESULT IN TERMINATION OF THE
               *PREVIOUS CODE BEING BUILT (IF POSSIBLE) AND
               *A FORMAT CHANGE WILL RESULT IN A RE-FORMATTING
               *OF THE DISPLAY BUFFER.
               *
               *BRAD MILLER  MAY 7, 1974
               *
               *
7A60 86 40     PAUSE  LDA A   #$40      GET PAUSE FACTOR
7A62 20 02            BRA     SDISP1+2   GO SAVE IT
7A64 86 01     SDISP1 LDA A   #1        ODD # DISABLES PAUSE
7A66 97 1A            STA A   TP4       SAVE PAUSE FACTOR
7A68 D6 B9            LDA B   BKWRT+1    IS A KEY AVAILABLE ?
7A6A 26 07            BNE     SDISP3    BRANCH IF YES
7A6C BD 4E09   SDISPC JSR     FRMT1     INITIALIZE DISPLAY BUFFER
7A6F D6 B9     SDISP0 LDA B   BKWRT+1    KEY BUFFER EMPTY ?
7A71 27 12            BEQ     SDISP2    BRANCH IF YES
7A73 0F        SDISP3 SEI               DISABLE INTERRUPTS
7A74 7A 00B9          DEC     BKWRT+1    DECREMENT KEY POINTER
7A77 96 BA            LDA A   BKKC      LOAD THE CURRENT KEYCODE
7A79 CE FFF5          LDX     #-11      PRESET LOOP COUNTER
7A7C E6 C6     SDISP4 LDA B   BKKC+12,X   LOAD THE NEXT KEYCODE
7A7E E7 C5            STA B   BKKC+11,X   RESTORE IT IN NEW LOCATION
7A80 08               INX               IS LOOP COMPLETED?
7A81 26 F9            BNE     SDISP4    NO; KEEP DROPPING BUFFER
7A83 0E               CLI               YES; RE-ENABLE INTERRUPTS
7A84 39        PAUSE1 RTS               RETURN
7A85 BD 7A23   SDISP2 JSR     RDTGL1    READ THE TOGGLE SWITCHES
7A88 2A 1E            BPL     SDISP7    BRANCH IF NO MODE CHANGE
7A8A D6 1A            LDA B   TP4       PAUSING OR DISPLAYING ?
7A8C 54               LSR B
7A8D 24 19            BCC     SDISP7    IGNORE THE CHANGE IF PAUSING
7A8F D6 C6            LDA B   SOL7      GET INST BEING BUILT
7A91 C1 BE            CMP B   #@276     2 BYTE INST ?
7A93 22 0C            BHI     SDISP6    BRANCH IF YES
7A95 31               INS               WIPE OUT THE
7A96 31               INS               OLD RETURN VECTOR
7A97 96 52            LDA A   TA        INSERT MODE SET ?
```

```
7A99 27 03           BEQ     SDISP6-3   BRANCH IF NOT
7A9B 7E 4F4B         JMP     INSERT     ELSE TERMN. INSERT
7A9E 7E 7BC9         JMP     TOP7       RESET THE SYSTEM
7AA1 97 07    SDISP6 STA A   TGL        RESTORE OLD CONDITIONS
7AA3 31              INS                WIPE OUT THE RETURN
7AA4 31              INS                VECTOR AND TERMINATE
7AA5 7E 4A22         JMP     DECPT      THE PREVIOUS OPERATION
7AA8 86 0E    SDISP7 LDA A   #$E        LOAD DISPLAY S.C.
7AAA CE 0058         LDX     #BUFF      INDEX=BUFFER ADDRESS
7AAD DF 16           STX     TP2        SAVE BUFFER ADDRESS
7AAF DE 16    SDISP8 LDX     TP2        GET LATEST BUFFER ADDRESS
7AB1 E6 00           LDA B   X          FETCH THE ASCII CHARACTER
7AB3 D7 18           STA B   TP4S       SAVE IT FOR COMMA CHECK
7AB5 C4 7F           AND B   #$7F       MASK OFF COMMA INDICATOR(MSB)
7AB7 C0 2D           SUB B   #$2D       REMOVE ASCII OFFSET
7AB9 24 02           BCC     SDISP9     CONTINUE IF "LEGAL" CODE
7ABB C6 02           LDA B   #2         ELSE LOAD "BLANK" BY DEFAULT
7ABD 08       SDISP9 INX                INC BUFFER POINTER
7ABE DF 16           STX     TP2        SAVE UPDATED VALUE
7AC0 CE 7B13         LDX     #DSPTBL    SET INDEX TO CHAR DECODE TBL
7AC3 DF 18           STX     TP3        SAVE IN TEMP
7AC5 DB 19           ADD B   TP3S       ADD CHAR OFFSET TO TBL ADRS
7AC7 D7 19           STA B   TP3S       RESTORE NEW ADDRESS
7AC9 DE 18           LDX     TP3        RESTORE THE INDEX
7ACB C6 FF           LDA B   #$FF       ACCB="BLANK"
7ACD D7 02           STA B   BDATA      TURN OFF THE SEGMENTS
7ACF C6 3C           LDA B   #$3C       PRESET ACCB
7AD1 D7 03           STA B   BCTL       TURN OFF THE COMMA
7AD3 97 00           STA A   ADATA      OUTPUT S.C. AND CHAR PNTR
7AD5 C6 04           LDA B   #4         LOAD "SEGMENT ON" WAIT COUNTER
7AD7 5A       SDISPF DEC B              DECREMENT IT
7AD8 26 FD           BNE     SDISPF     CONTINUE THE LOOP
7ADA E6 00           LDA B   X          GET THE NEW SEGMENT INFO
7ADC D7 02           STA B   BDATA      OUTPUT SEGMENT INFORMATION
7ADE D6 18           LDA B   TP4S       GET THE ORIGINAL CHARACTER
7AE0 2A 04           BPL     SDISPD     BRANCH IF NO COMMA
7AE2 C6 34           LDA B   #$34       ELSE LOAD COMMA CODE (CB2)
7AE4 D7 03           STA B   BCTL       LIGHT THE COMMA
7AE6 8B 10    SDISPD ADD A   #$10       INC. THE CHARACTER POINTER
7AE8 24 16           BCC     SDISPA     CHECK FOR A NEW KEY
7AEA C6 16           LDA B   #22        LOAD LAST DIGIT WAIT
7AEC BD 4BA0         JSR     WAIT       GO WAIT
7AEF 53              COM B              ACCB="BLANK"
7AF0 D7 02           STA B   BDATA      TURN OFF CHARACTER 15
7AF2 5F              CLR B
7AF3 D7 00           STA B   ADATA      DISABLE DISPLAY
7AF5 7A 001A         DEC     TP4        PAUSE=PAUSE-2
7AF8 7A 001A         DEC     TP4
7AFB 27 87           BEQ     PAUSE1     RETURN IF ZERO
7AFD 7E 7A6F         JMP     SDISP0     ELSE CONTINUE DRIVING
7B00 C6 09    SDISPA LDA B   #9         LOAD DIGIT "ON" TIME
7B02 BD 4BA0         JSR     WAIT       GO WAIT
7B05 D6 B9           LDA B   BKWRT+1    KEY BUFFER EMPTY ?
7B07 27 A6           BEQ     SDISP8     BRANCH IF YES
7B09 7F 0000         CLR     ADATA      ELSE DISABLE DISPLAY
7B0C C6 3C           LDA B   #$3C       PRESET ACCB
7B0E D7 03           STA B   BCTL       TURN OFF THE COMMA
7B10 7E 7A73         JMP     SDISP3     GET NEW KEY AND RETURN
              *
              **********CHARACTER DECODE TABLE**********
              *
              *ALL ENTRIES MUST BE ON THE SAME PAGE !
              *
              *A "0" ENABLES A GIVEN SEGMENT
              *
              *CODING IS A,B,C,D,E,F,G,DEC. PT. IN BITS 7 THRU 0
              *
7B13 FD       DSPTBL FCB     @375       -
7B14 FE              FCB     @376       .
7B15 FF              FCB     @377       BLANK
7B16 03              FCB     @3         0
7B17 9F              FCB     @237       1
7B18 25              FCB     @45        2
7B19 0D              FCB     @15        3
7B1A 99              FCB     @231       4
7B1B 49              FCB     @111       5
7B1C 41              FCB     @101       6
```

```
7B1D 1F          FCB    @37       7
7B1E 01          FCB    @1        8
7B1F 09          FCB    @11       9
7B20 31          FCB    @61       P
7B21 63          FCB    @143      C
7B22 FD          FCB    @375      -
7B23 11          FCB    @21       A
7B24 FD          FCB    @375      -
7B25 E3          FCB    @343      L
7B26 01          FCB    @1        B
7B27 E3          FCB    @343      L
7B28 FD          FCB    @375      -
7B29 73          FCB    @163      R
7B2A 21          FCB    @41       E
7B2B 43          FCB    @103      G
7B2C FD          FCB    @375      -
7B2D 11          FCB    @21       A
7B2E E3          FCB    @343      L
7B2F 31          FCB    @61       P
7B30 91          FCB    @221      H
7B31 11          FCB    @21       A
7B32 F1          FCB    @361      INSERT CHARACTER
7B33 00          FCB    0         ALL SEGMENTS AND DP
7B34 61          FCB    @141      E
7B35 71          FCB    @161      F
7B36 87          FCB    @207      J
7B37 83          FCB    @203      U
7B38 C1          FCB    @301      B
7B39 85          FCB    @205      D
4BA0             ORG    $4BA0
            *
            *WAIT LOOP IN ANOTHER ROM FOR POWER CONSIDERATIONS
            *
4BA0 5A     WAIT   DEC B
4BA1 26 FD         BNE    WAIT
4BA3 39            RTS
            *
            *
     4F4B   INSERT EQU    $4F4B
     4E09   FRMT1  EQU    $4E09
     4A22   DECPT  EQU    $4A22
7D52               ORG    $7D52
7D52 7A60          FDB    PAUSE
7D68               ORG    $7D68
7D68 7A84          FDB    PAUSE1
7C00               ORG    $7C00
7C00 7A84          FDB    PAUSE1
7D74               ORG    $7D74
7D74 7A84          FDB    PAUSE1
                   NAM    ERROR
                   OPT    LIST,MEM,NG
7B40               ORG    $7B40
     5300   ROMID  EQU    $5300
     51A7   TOALP1 EQU    $51A7
            *
            *THIS IS THE ERROR OUTPUT ROUTINE. IT ACCEPTS
            *AN ERROR NUMBER IN THE BASE PAGE LOCATION "ERROR"
            *AND OUTPUTS THE ASSOCIATED ALPHA MESSAGE TO
            *THE THERMAL PRINTER (REGARDLESS OF "PAPER OUT" BIT)
            *
            *ALL MAINFRAME ERROR NUMBERS ARE POSITIVE AND
            *SIMPLY SPECIFY THE NUMBER IN THE LIST OF MESSAGES.
            *FOR EXAMPLE: 1 MEANS THE FIRST ENTRY, 2 MEANS THE SECOND AN
            *SO ON. THE MSB OF THE FIRST CHARACTER OF EACH ENTRY
            *IS SET TO INDICATE ITS START.
            *
            *ALL I/O DEVICE ERROR NUMBERS ARE NEGATIVE AND THE
            *ROM ID NUMBER IS CONTAINED IN BITS B6 THRU B4.
            *BITS B3 THRU B0 CONTAIN THE TABLE OFFSET AS DESCRIBED
            *ABOVE FOR MAINFRAME ERRORS. NOTICE THAT
            *I/O ROMS ARE RESTRICTED TO NO MORE THAN
            *15 ERROR MESSAGES.
            *
            *MAINFRAME ERRORS 1 THRU 5 ARE MASKABLE IN A
            *RUNNING PROGRAM. IF USER FLAG 6 IS SET WHEN
            *THEY OCCUR, FLAG 5 WILL BE SET AND THE PROGRAM
```

```
                        *WILL CONTINUE RUNNING.
                        *
                        *ERROR ZERO IS A SPECIAL ERROR GENERATED BY THE
                        *SYNTAX TABLES WHICH IS USED TO TERMINATE NUMERIC
                        *ADDRESSES UPON RECEIPT OF A NON-NUMERIC KEY.
                        *
                        *WRITTEN BY BRAD MILLER
                        *
7B40 D6 09      ERROR7  LDA B   RSFLG       GET RUN/STOP FLAG
7B42 58                 ASL B               RUNNING?
7B43 2A 26              BPL     CNT         BRANCH IF NOT
7B45 D6 06              LDA B   ERROR       GET ERROR NUMBER
7B47 C1 05              CMP B   #5          MASKABLE ERROR ?
7B49 23 08              BLS     MSKABL      BRANCH IF YES
7B4B C1 0E              CMP B   #14         MASKABLE ERROR ?
7B4D 27 04              BEQ     MSKABL      BRANCH IF YES
7B4F C1 10              CMP B   #16         MASKABLE ERROR ?
7B51 26 11              BNE     CNTT        BRANCH IF NOT
7B53 C6 20      MSKABL  LDA B   #$20        LOAD FLAG 6 BIT
7B55 D5 08              BIT B   UFLG        FLAG 6 SET ?
7B57 27 0B              BEQ     CNTT        BRANCH IF NOT
7B59 54                 LSR B               ELSE PRESET ACCB
7B5A DA 08              ORA B   UFLG        SET USER FLAG 5
7B5C D7 08              STA B   UFLG        RESTORE FLAGS
7B5E 7F 0006            CLR     ERROR       CLEAR OUT THE ERROR
7B61 7E 7986            JMP     RWM2+4      CONTINUE RUNNING PRGM
7B64 7F 0009    CNTT    CLR     RSFLG       STOP RUNNING
7B67 DE CA              LDX     UIP         GET CURRENT PRGM ADRS
7B69 DF C8              STX     UPP         SAVE IN PRGM PNTR
7B6B D6 06      CNT     LDA B   ERROR       GET ERROR NUMBER
7B6D 26 1A              BNE     EOUT        BRANCH IF NOT ERROR 0
7B6F 0F                 SEI                 DISABLE KEY INTERRUPT
7B70 CE 000B            LDX     #11         PRESET LOOP COUNTER
7B73 E6 B9      KB1     LDA B   BKKC-1,X     GET "BOTTOM" KEY
7B75 E7 BA              STA B   BKKC,X      MOVE IT DOWN
7B77 09                 DEX                 DECREMENT POINTER/COUNTER
7B78 26 F9              BNE     KB1         CONT IF NOT FINISHED
7B7A 97 BA              STA A   BKKC        PUT THE OLD KEY BACK ON TOP
7B7C D6 B9              LDA B   BKWRT+1      GET THE WRITE INDICATOR
7B7E C1 0C              CMP B   #12         BUFFER FULL ?
7B80 2C 03              BGE     CB          BRANCH IF YES
7B82 5C                 INC B               ELSE REGISTER THIS ENTRY
7B83 D7 B9              STA B   BKWRT+1      SAVE THE NEW INDICATOR
7B85 0E         CB      CLI                 RE-ENABLE THE INTERRUPT SYSTEM
7B86 7E 4A22            JMP     DECPT       TERMINATE THE PREVIOUS INSTRUCTION
7B89 4F         EOUT    CLR A               PRESET ACCA
7B8A 97 B9              STA A   BKWRT+1      EMPTY KEY BUFFER
7B8C 97 0F              STA A   DIGFLG      TERM. DIGIT ENTRY
7B8E 43                 COM A
7B8F 97 0D              STA A   STKFLG      ENABLE STACK LIFT
7B91 BD 5D75            JSR     BLANK       BLANK THE BUFFER
7B94 CE 0058            LDX     #BUFF       PRESET POINTER FOR
7B97 DF 16              STX     TP2         THE LOAD MESSAGE ROUTINE
7B99 CE 53FF            LDX     #EMSG-1      GET ERROR MESSAGE TABLE POINTER
7B9C 96 06              LDA A   ERROR       GET THE ERROR
7B9E 2A 0F              BPL     MAINF       BRANCH IF MAINFRAME ERROR
7BA0 84 70              AND A   #$70        ELSE MASK OFF I/O ID NUMBER
7BA2 BD 5300            JSR     ROMID       GENERATE ROM ADDRESS
7BA5 C6 74              LDA B   #$74        GET ERROR TABLE OFFSET
7BA7 D7 25              STA B   T10         SAVE IN ROM ID TEMP (LSB'S)
7BA9 DE 24              LDX     T11         INDEX=ERROR TABLE ADRS-1
7BAB 96 06              LDA A   ERROR       ACCA=ERROR
7BAD 84 0F              AND A   #$F         ACCA=TABLE OFFSET NUMBER
7BAF 08         MAINF   INX                 BUMP THE TABLE SEARCH ADDRESS
7BB0 E6 00              LDA B   X           GET CURRENT ENTRY
7BB2 2A FB              BPL     MAINF       CONTINUE LOOKING IF POSITIVE
7BB4 4A                 DEC A               ELSE DEC. OFFSET NUMBER
7BB5 26 F8              BNE     MAINF       CONTINUE IF ITS NOT THE ONE
7BB7 97 06              STA A   ERROR       CLEAR ERROR WORD
7BB9 4A                 DEC A               MAKE ACCA NON-ZERO FOR LDMSG
7BBA BD 57BD            JSR     LDMSG       ERROR NOTE TO BUFFER
7BBD BD 6046            JSR     PRTDRV+25     PRINT THE ERROR
7BC0 96 CC              LDA A   ALPHA       ALPHA MODE ?
7BC2 26 03              BNE     TA1         BRANCH IF YES
7BC4 7E 78C9            JMP     TOP7        ELSE RETURN TO TOP
7BC7 7E 51A7    TA1     JMP     TOALP1      DO "TO ALPHA"
```

```
5400                ORG    $5400
5400 CF    EMSG     FCB    $CF
5401 56             FCC    /VERFLOW/
5408 D3             FCB    $D3
5409 51             FCC    /QRT OF NEG #/
5415 C4             FCB    $C4
5416 49             FCC    /IVISION BY ZERO/
5425 CC             FCB    $CC
5426 4F             FCC    /OG OF # <=0/
5431 CE             FCB    $CE
5432 4F             FCC    .O I/O DEVICE.
543E C9             FCB    $C9
543F 4C             FCC    /LLEGAL ARGUMENT/
544E CD             FCB    $CD
544F 45             FCC    /EMORY OVERFLOW/
545D CC             FCB    $CC
545E 41             FCC    /ABEL NOT FOUND/
546C C7             FCB    $C7
546D 4F             FCC    /OSUB OVERFLOW/
547A CD             FCB    $CD
547B 49             FCC    /ISSING GOSUB/
5487 CB             FCB    $CB
5488 45             FCC    /EY NOT DEFINED/
5496 C9             FCB    $C9
5497 4D             FCC    /MPROPER SYNTAX/
54A5 CD             FCB    $CD
54A6 49             FCC    /ISSING FOR STMT/
54B5 C3             FCB    $C3
54B6 48             FCC    /HECKSUM ERROR/
54C3 C6             FCB    $C6
54C4 49             FCC    /ILE TOO SMALL/
54D1 D6             FCB    $D6
54D2 45             FCC    /ERIFY FAILED/
54DE D7             FCB    $D7
54DF 52             FCC    /RONG FILE TYPE/
54ED C6             FCB    $C6
54EE 49             FCC    /ILE NOT FOUND/
54FB C5             FCB    $C5
54FC 4E             FCC    /ND OF TAPE/
5506 C3             FCB    $C3
5507 41             FCC    /ARTRIDGE OUT/
5513 D0             FCB    $D0
5514 52             FCC    /ROTECTED TAPE/
5521 D3             FCB    $D3
5522 45             FCC    /ECURED MEMORY/
552F CF             FCB    $CF
5530 55             FCC    /UT OF PAPER/
553B C9             FCB    $C9
553C 4C             FCC    /LLEGAL ADDRESS/
554A 80             FCB    $80
                    END
```

SYMBOL TABLE

| | | | | | | | | | | | |
|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | PEAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 009A | SOL7 | 00C6 | UPP | 00C8 |
| UIP | 00CA | ALPHA | 00CC | IO1 | 00CD | IO2 | 0000 | IT7 | 0003 | FLAG | 00D5 |
| TPOS | 00D6 | FILE | 00D7 | AR | 00D8 | BR | 00E0 | CR | 00E8 | DR | 00F0 |
| ER | 00F8 | SDBB | 008A | MT | 7E00 | TERMN7 | 003D | IMED | 0040 | PARCD | 00C0 |
| PAREX | 0080 | NTBL | 0000 | DOTS | 5EC0 | PRTDPV | 602D | FRMT | 5CA8 | BLANK | 5D75 |
| LOMSG | 57BD | ROLLD | 55B2 | ROLLU | 57F1 | PSD | 55DA | TXL | 55E9 | STKUP | 55EF |
| MAD | 749B | CMP | 74AA | NOR | 74D6 | TXW | 7424 | TXXR | 743B | EXXR | 7452 |
| ARSR | 753B | OVUNF | 75B6 | OVERF | 75DD | XR0 | 740A | XRNINE | 75C8 | UNDRF | 75F1 |
| IMULT | 7689 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |

```
RECIP   73E6  TXRX    73F3  CONST   6800  FPDBRC  6998  TAN     68A9  ATN     69C3
DSZERO  6A46  NTLN    6A58  EXPN    6AC9  SIN     6B94  COS     6B9A  ASIN    6BF2
ACOS    6BF7  PH1     6C5D  PH2     6C8D  PH3     6D34  PH4     6D00  LSFT8   6E47
SQRT    6E65  MAD8    6F2C  CMP8    53E4  IOUPX   6F52  LOG10   6FA7  YUPX    6FE9
RTOP    7328  PTOR    7386  NOTEST  780D  MORE    781C  ERASE   782D  IOPOLL  7854
NOIO2   786A  IOERR   78B6  AUTOOK  78B9  MSG1    78BE  TOP7    78C9  NK7     78E3
TSRCH6  78F3  TSRCH7  78F8  TWOB7   7908  TFND7   790C  FIX     7924  ERR7    792C
EJSR7   7930  MFND7   7933  L7      793C  IMEX7   7948  CONT    794C  PARTI7  7957
PARCD7  795F  EXEC6   7968  EXEC7   796B  BWM     797B  BWM2    7992  SS      79A6
TT7     79A9  MAW     79AC  RSEX    4800  STCOD7  4EC8  AUDIT   5C31  RDKEY1  79B7
YES3    79DE  NOPE2   79E7  YES1    79F5  YES2    7A01  NOPE    7A08  NOPE1   7A15
RDKEY3  7A22  RDTGL1  7A23  RDT     7A35  TRNOFF  61BE  RADS    7A3E  GRADS   7A3F
DEGS    7A40  FIXED   7A46  SCI3    7A47  SCI     7A48  RD7     7A5F  PAUSE   7A60
SDISP1  7A64  SDISPC  7A6C  SDISP0  7A6F  SDISP3  7A73  SDISP4  7A7C  PAUSE1  7A84
SDISP2  7A85  SDISP6  7AA1  SDISP7  7AA8  SDISP8  7AAF  SDISP9  7ABD  SDISPF  7AD7
SDISPD  7AE6  SDISPA  7B00  DSPTBL  7B13  WAIT    4BA0  INSERT  4F4B  FRMT1   4E09
DECPT   4A22  ROMID   5300  TOALP1  51A7  ERROR7  7B40  MSKABL  7B53  CNTT    7B64
CNT     7B68  KB1     7B73  CB      7B85  EOUT    7B89  MAINF   7BAF  TA1     7BC7
EMSG    5400

TOTAL ERRORS   4


****ERROR 201
 157   NAM CJTBLS
****ERROR 213
 177 EQU11 EQU ST11-MT
****ERROR 213
 184 EQU12 EQU ST12-MT
****ERROR 213
 187 EQU13 EQU ST13-MT
****ERROR 213
 191 EQU14 EQU ST14-MT
****ERROR 213
 203 EQU22 EQU ST22-MT
****ERROR 213
 260 EQU1 EQU ST1-MT
****ERROR 213
 264 EQU2 EQU ST2-MT
****ERROR 213
 265 EQU16 EQU TT2-MT
****ERROR 213
 268 EQU3 EQU ST3-MT
****ERROR 213
 271 EQU4 EQU ST4-MT
****ERROR 213
 287 EQU5 EQU ST5-MT
****ERROR 213
 288 EQU20 EQU ST20-MT
****ERROR 213
 309 EQU7 EQU ST7-MT
****ERROR 213
 310 EQU15 EQU TT1-MT
****ERROR 213
 372 EQU6 EQU ST6-MT
****ERROR 213
 438 EQU21 EQU ST21-MT
****ERROR 213
 544 EQU17 EQU TT3-MT
****ERROR 213
 553 EQU18 EQU TT4-MT
****ERROR 201
 669   NAM PLABR
****ERROR 201
 856   NAM UDF
****ERROR 201
 932   NAM DTBL
00154                       OPT    LIST,MEM
00157                       NAM    CJTBLS
00158                       OPT    LIST,DB16,MEM
00159 7BCA                  ORG    $7BCA
00160                 *
00161                 *FOLLOWING ARE THE KEY SYNTAX TABLES FOR CJ.
00162                 *THESE TABLES, ALONG WITH THE SUPERVISOR SEARCH
```

```
                    *ROUTINE, DEFINE THE KEY SEQUENCES RECEIVED FROM
                    *THE KEYBOARD. THERE ARE FOUR POSSIBLE ACTIONS THAT
                    *CAN BE TAKEN UPON FINDING A MATCH WITH THE
                    *CURRENT KEYCODE: 1) IMMEDIATE EXECUTION OF A FUNCTION
                    *2) RESET TO A NEW TABLE FOR FURTHER SEARCHING
                    *3) JUMP TO A GIVEN ADDRESS AND EXECUTE SOME
                    *INTERMEDIATE CODE 4) ADD A "BUILDING" CODE TO THE
                    *INSTRUCTION REGISTER AND RESET TO A NEW SEARCH TABLE.
                    *
                    *
                    *WRITTEN BY BRAD MILLER
                    *
7BCA D0             PRGM1   FCB     @20+PARCD    GOSUB
7BCB E0                     FCB     @340
     0168           EQU11   EQU     ST11-MT
7BCC B4                     FCB     EQU11/2
7BCD 51                     FCB     @21+IMED     RETURN
7BCE B3                     FCB     @263
7BCF 52                     FCB     @22+IMED     PAUSE
7BD0 A9                     FCB     @251
7BD1 13                     FCB     @23+NTBL     FOR
     0170           EQU12   EQU     ST12-MT
7BD2 B8                     FCB     EQU12/2
7BD3 14                     FCB     @24+NTBL     NEXT
     0178           EQU13   EQU     ST13-MT
7BD4 BC                     FCB     EQU13/2
7BD5 D8                     FCB     @30+PARCD    IF
7BD6 48                     FCB     @110
     00AC           EQU14   EQU     ST14-MT
7BD7 56                     FCB     EQU14/2
7BD8 5C                     FCB     @34+IMED     NOP
7BD9 00                     FCB     @0
7BDA 62                     FCB     @42+IMED     LINE FEED
7BDB 3D                     FCB     @75
7BDC 61                     FCB     @41+IMED     LOAD AND RUN
7BDD A6                     FCB     @246
7BDE A4                     FCB     @44+PAREX    INSERT
7BDF 4F4B                   FDB     $4F4B
7BE1 A3                     FCB     @43+PAREX    DELETE
7BE2 4F60                   FDB     $4F60
     00A0           EQU22   EQU     ST22-MT
7BE4 20                     FCB     @40+NTBL     MEMORY DELETE
7BE5 50                     FCB     EQU22/2
7BE6 3D                     FCB     TERMN7
7BE7 7EAC                   FDB     ST14
                    *
                    *
                    *THE MAIN TABLE BEGINS HERE
                    *
                    *
7E00                        ORG     MT
7E00 66                     FCB     @46+IMED     0
7E01 01                     FCB     @1
7E02 5E                     FCB     @36+IMED     1
7E03 02                     FCB     @2
7E04 5F                     FCB     @37+IMED     2
7E05 03                     FCB     @3
7E06 77                     FCB     @67+IMED     3
7E07 04                     FCB     @4
7E08 56                     FCB     @26+IMED     4
7E09 05                     FCB     @5
7E0A 57                     FCB     @27+IMED     5
7E0B 06                     FCB     @6
7E0C 76                     FCB     @66+IMED     6
7E0D 07                     FCB     @7
7E0E 4E                     FCB     @16+IMED     7
7E0F 08                     FCB     @10
7E10 4F                     FCB     @17+IMED     8
7E11 09                     FCB     @11
7E12 75                     FCB     @65+IMED     9
7E13 0A                     FCB     @12
7E14 67                     FCB     @47+IMED     .
7E15 0B                     FCB     @13
7E16 46                     FCB     @6+IMED      CHS
7E17 12                     FCB     @22
7E18 47                     FCB     @7+IMED      EEX
```

```
00239 7E19 11          FCB   @21
00240 7E1A 74          FCB   @64+IMED    CLX
00241 7E1B 13          FCB   @23
00242 7E1C 7F          FCB   @77+IMED    +
00243 7E1D 0C          FCB   @14
00244 7E1E 6F          FCB   @57+IMED    -
00245 7E1F 0D          FCB   @15
00246 7E20 6E          FCB   @56+IMED    X
00247 7E21 0E          FCB   @16
00248 7E22 73          FCB   @63+IMED    /
00249 7E23 0F          FCB   @17
00250 7E24 72          FCB   @62+IMED    PRINT
00251 7E25 B2          FCB   @262
00252 7E26 7C          FCB   @74+IMED    XEY
00253 7E27 15          FCB   @25
00254 7E28 6D          FCB   @55+IMED    ROLL DOWN
00255 7E29 16          FCB   @26
00256 7E2A 6C          FCB   @54+IMED    ROLL UP
00257 7E2B 24          FCB   @44
00258 7E2C D5          FCB   @25+PARCD    RCL
00259 7E2D D2          FCB   @322
00260      00BC  EQU1  EQU   ST1-MT
00261 7E2E 5E          FCB   EQU1/2
00262 7E2F CD          FCB   @15+PARCD    STO
00263 7E30 C8          FCB   @310
00264      00C4  EQU2  EQU   ST2-MT
00265      01B0  EQU16 EQU   TT2-MT
00266 7E31 D8          FCB   EQU16/2
00267 7E32 30          FCB   @60+NTBL    F-1
00268      00CA  EQU3  EQU   ST3-MT
00269 7E33 65          FCB   EQU3/2
00270 7E34 31          FCB   @61+NTBL    SHIFT
00271      00E2  EQU4  EQU   ST4-MT
00272 7E35 71          FCB   EQU4/2
00273 7E36 45          FCB   @5+IMED    CLEAR
00274 7E37 14          FCB   @24
00275 7E38 6A          FCB   @52+IMED    SIN
00276 7E39 19          FCB   @31
00277 7E3A 6B          FCB   @53+IMED    COS
00278 7E3B 1A          FCB   @32
00279 7E3C 7A          FCB   @72+IMED    TAN
00280 7E3D 1B          FCB   @33
00281 7E3E 68          FCB   @50+IMED    LN
00282 7E3F 1F          FCB   @37
00283 7E40 69          FCB   @51+IMED    LOG
00284 7E41 20          FCB   @40
00285 7E42 79          FCB   @71+IMED    ACC +
00286 7E43 2B          FCB   @53
00287      011C  EQU5  EQU   ST5-MT
00288      00A6  EQU20 EQU   ST20-MT
00289 7E44 78          FCB   @70+IMED    SIGMA+
00290 7E45 27          FCB   @47
00291 7E46 7B          FCB   @73+IMED    P TO R
00292 7E47 2A          FCB   @52
00293 7E48 65          FCB   @45+IMED    R/S
00294 7E49 B0          FCB   @260
00295 7E4A 7E          FCB   @76+IMED    ENTER
00296 7E4B 10          FCB   @20
00297 7E4C 41          FCB   @1+IMED    REWIND
00298 7E4D A8          FCB   @250
00299 7E4E 40          FCB   @0+IMED    LD PRGM
00300 7E4F B9          FCB   @271
00301 7E50 83          FCB   @3+PAREX    LIST
00302 7E51 59D4        FDB   $59D4
00303 7E53 42          FCB   @2+IMED    RECORD PROGRAM
00304 7E54 B5          FCB   @265
00305 7E55 5D          FCB   @35+IMED    END
00306 7E56 B1          FCB   @261
00307 7E57 C8          FCB   @10+PARCD    GOTO
00308 7E58 F0          FCB   @360
00309      0160  EQU7  EQU   ST7-MT
00310      0180  EQU15 EQU   TT1-MT
00311 7E59 B0          FCB   EQU7/2
00312 7E5A C9          FCB   @11+PARCD    LABEL
00313 7E5B BF          FCB   @277
00314 7E5C C0          FCB   EQU15/2
```

```
7E5D CA           FCB   @12+PARCD    SFG
7E5E 40           FCB   @100
7E5F 53           FCB   EQU20/2
7E60 C4           FCB   @4+PARCD    FORMAT
7E61 BE           FCB   @276
7E62 BE           FCB   EQU5/2
7E63 8B           FCB   @13+PAREX    STEP
7E64 527A         FDB   $527A
7E66 8C           FCB   @14+PAREX    BACK STEP
7E67 52CE         FDB   $52CE
7E69 3D           FCB   TERMN7
7E6A 7E6E         FDB   RUN1       "OR" FOR RUN MODE
7E6C 7BCA         FDB   PRGM1      "OR" FOR PRGM MODE
7E6E 90     RUN1  FCB   @20+PAREX    A
7E6F 4AEF         FDB   UDFA
7E71 91           FCB   @21+PAREX    B
7E72 4AEE         FDB   UDFB
7E74 92           FCB   @22+PAREX    C
7E75 4AED         FDB   UDFC
7E77 93           FCB   @23+PAREX    D
7E78 4AEC         FDB   UDFD
7E7A 94           FCB   @24+PAREX    E
7E7B 4AEB         FDB   UDFE
7E7D 98           FCB   @30+PAREX    F
7E7E 4AEA         FDB   UDFF
7E80 99           FCB   @31+PAREX    G
7E81 4AE9         FDB   UDFG
7E83 9A           FCB   @32+PAREX    H
7E84 4AE8         FDB   UDFH
7E86 9B           FCB   @33+PAREX    I
7E87 4AE7         FDB   UDFI
7E89 9C           FCB   @34+PAREX    J
7E8A 4AE6         FDB   UDFJ
7E8C A0           FCB   @40+PAREX    K
7E8D 4AE5         FDB   UDFK
7E8F A1           FCB   @41+PAREX    L
7E90 4AE4         FDB   UDFL
7E92 A2           FCB   @42+PAREX    M
7E93 4AE3         FDB   UDFM
7E95 A3           FCB   @43+PAREX    N
7E96 4AE2         FDB   UDFN
7E98 A4           FCB   @44+PAREX    O
7E99 4AE1         FDB   UDFO
7E9B 84           FCB   @4+PAREX
7E9C 4AF0         FDB   FMT
7E9E 3D           FCB   TERMN7
7E9F 8C           FCB   12+$80    SYNTAX ERROR
                  ****************************************************
                  *****SECONDARY TABLES*******************************
                  ****************************************************
7EA0 A3     ST22  FCB   @43+PAREX    ERASE
7EA1 4B7F         FDB   ERASE
7EA3 3D           FCB   TERMN7
7EA4 7E00         FDB   MT
                  ****************************************************
7EA6 CA     ST20  FCB   @12+PARCD    CFG
7EA7 10           FCB   @20
     0146   EQU6  EQU   ST6-MT
7EA8 A3           FCB   EQU6/2
7EA9 3D           FCB   TERMN7
7EAA 7F46         FDB   ST6
                  ****************************************************
7EAC 66     ST14  FCB   @46+IMED    IF 0
7EAD 33           FCB   @63
7EAE 7F           FCB   @77+IMED    IF+
7EAF 31           FCB   @61
7EB0 6F           FCB   @57+IMED    IF-
7EB1 32           FCB   @62
7EB2 59           FCB   @31+IMED    IFX<Y
7EB3 35           FCB   @65
7EB4 5A           FCB   @32+IMED    IFX=Y
7EB5 34           FCB   @64
7EB6 5B           FCB   @33+IMED    IFX>=Y
7EB7 36           FCB   @66
7EB8 0A           FCB   @12+NTBL    IF SFG
7EB9 53           FCB   EQU20/2
```

```
7EBA 3D              FCB    TERMN7
7EBB 8C              FCB    12+$80   SYNTAX ERROR
                ****************************************************
7EBC D5         ST1  FCB    @25+PARCD   RCL RCL
7EBD 02              FCB    @2
7EBE C0              FCB    EQU15/2
7EBF 79              FCB    @71+IMED   RCL ACC+
7EC0 3B              FCB    @73
7EC1 3D              FCB    TERMN7
7EC2 7F80            FDB    TT1       (ALPHA TABLE)
                ****************************************************
7EC4 D5         ST2  FCB    @25+PARCD   STO RCL
7EC5 0E              FCB    @16
7EC6 C0              FCB    EQU15/2
7EC7 3D              FCB    TERMN7
7EC8 7F80            FDB    TT1
                ****************************************************
7ECA 30         ST3  FCB    @60+NTBL   F-1
7ECB 65              FCB    EQU3/2
7ECC 31              FCB    @61+NTBL   SHIFT
7ECD 71              FCB    EQU4/2
7ECE 6A              FCB    @52+IMED   ARCSIN
7ECF 1C              FCB    @34
7ED0 6B              FCB    @53+IMED   ARCCOS
7ED1 1D              FCB    @35
7ED2 7A              FCB    @72+IMED   ARCTAN
7ED3 1E              FCB    @36
7ED4 68              FCB    @50+IMED   E^X
7ED5 21              FCB    @41
7ED6 69              FCB    @51+IMED   10^X
7ED7 22              FCB    @42
7ED8 78              FCB    @70+IMED   SIGMA -
7ED9 28              FCB    @50
7EDA 7B              FCB    @73+IMED   R TO P
7EDB 29              FCB    @51
7EDC 79              FCB    @71+IMED   ACC-
7EDD 2C              FCB    @54
7EDE 3D              FCB    TERMN7
7EDF 7E00            FDB    MT
7EE1 00              FCB    @0
                ****************************************************
7EE2 30         ST4  FCB    @60+NTBL   F-1
7EE3 65              FCB    EQU3/2
7EE4 31              FCB    @61+NTBL   SHIFT
7EE5 71              FCB    EQU4/2
7EE6 40              FCB    @0+IMED   MARK TAPE
7EE7 B7              FCB    @267
     0140       EQU21 EQU   ST21-MT
7EE8 5E              FCB    @36+IMED   DEGREES
7EE9 2E              FCB    @56
7EEA 5F              FCB    @37+IMED   RADIANS
7EEB 3F              FCB    @77
7EEC 77              FCB    @67+IMED   GRADS
7EED 3E              FCB    @76
7EEE C6              FCB    @6+PARCD   FIX MODE
7EEF BB              FCB    @273
7EF0 A0              FCB    EQU21/2
7EF1 C7              FCB    @7+PARCD   SCIENTIFIC MODE
7EF2 BC              FCB    @274
7EF3 A0              FCB    EQU21/2
7EF4 F4              FCB    @64+PARCD   SCIENTIFIC 3 MODE
7EF5 BD              FCB    @275
7EF6 A0              FCB    EQU21/2
7EF7 84              FCB    @4+PAREX   TO ALPHA
7EF8 519C            FDB    $519C
7EFA 68              FCB    @50+IMED   ROUND
7EFB 3A              FCB    @72
7EFC 41              FCB    @1+IMED   VERIFY
7EFD A5              FCB    @245
7EFE 42              FCB    @2+IMED   RC DATA
7EFF A7              FCB    @247
7F00 43              FCB    @3+IMED   IDENTIFY
7F01 B8              FCB    @270
7F02 6A              FCB    @52+IMED   Y^X
7F03 23              FCB    @43
7F04 69              FCB    @51+IMED   SQRT X
```

```
7F05 25            FCB     @45
7F06 6B            FCB     @53+IMED    1/X
7F07 26            FCB     @46
7F08 7A            FCB     @72+IMED    INT
7F09 2D            FCB     @55
7F0A 78            FCB     @70+IMED    MEAN, STD DEV
7F0B 37            FCB     @67
7F0C 7B            FCB     @73+IMED    TO D.MS
7F0D 2F            FCB     @57
7F0E 79            FCB     @71+IMED    FROM D.MS
7F0F 30            FCB     @60
7F10 7E            FCB     @76+IMED    LST X
7F11 18            FCB     @30
7F12 67            FCB     @47+IMED    PI
7F13 17            FCB     @27
7F14 4D            FCB     @15+IMED    # OF R'S
7F15 38            FCB     @70
7F16 72            FCB     @62+IMED    LIST STACK
7F17 39            FCB     @71
7F18 3D            FCB     TERMN7
7F19 7E00          FDB     MT
7F1B 00            FCB     @0
              ***************************************************************
7F1C 9E      ST5   FCB     @36+PAREX    1
7F1D 4B57          FDB     D1
7F1F 9F            FCB     @37+PAREX    2
7F20 4B56          FDB     D2
7F22 B7            FCB     @67+PAREX    3
7F23 4B55          FDB     D3
7F25 96            FCB     @26+PAREX    4
7F26 4B54          FDB     D4
7F28 97            FCB     @27+PAREX    5
7F29 4B53          FDB     D5
7F2B B6            FCB     @66+PAREX    6
7F2C 4B52          FDB     D6
7F2E 8E            FCB     @16+PAREX    7
7F2F 4B51          FDB     D7
7F31 42            FCB     @2+IMED   RECORD SECURED
7F32 B6            FCB     @266
7F33 50            FCB     @20+IMED    LD BIN
7F34 A0            FCB     @240
7F35 51            FCB     @21+IMED    RUN BIN
7F36 A1            FCB     @241
7F37 52            FCB     @22+IMED    RC BIN
7F38 A2            FCB     @242
7F39 53            FCB     @23+IMED    RC BIN SEC
7F3A A3            FCB     @243
7F3B 54            FCB     @24+IMED    PTAPE
7F3C A4            FCB     @244
7F3D 3D            FCB     TERMN7
7F3E 7E6E          FDB     RUN1
              ***************************************************************
7F40 A6      ST21  FCB     @46+PAREX    0
7F41 4B6F          FDB     F0
7F43 B5            FCB     @65+PAREX    9
7F44 4B66          FDB     F9
7F46 9E      ST6   FCB     @36+PAREX    1
7F47 4B6E          FDB     F1
7F49 9F            FCB     @37+PAREX    2
7F4A 4B6D          FDB     F2
7F4C B7            FCB     @67+PAREX    3
7F4D 4B6C          FDB     F3
7F4F 96            FCB     @26+PAREX    4
7F50 4B6B          FDB     F4
7F52 97            FCB     @27+PAREX    5
7F53 4B6A          FDB     F5
7F55 B6            FCB     @66+PAREX    6
7F56 4B69          FDB     F6
7F58 8E            FCB     @16+PAREX    7
7F59 4B68          FDB     F7
7F5B 8F            FCB     @17+PAREX    8
7F5C 4B67          FDB     F8
7F5E 3D            FCB     TERMN7
7F5F 8C            FCB     12+$80   SYNTAX ERROR
```

```
                  ***************************************************
7F60 C9      ST7    FCB    @11+PARCD    GOTO LABEL
7F61 D1             FCB    @321
     01C2    EQU17  EQU    TT3-MT
7F62 E1             FCB    EQU17/2
7F63 6E             FCB    @56+IMED     GOTO X
7F64 62             FCB    @142
7F65 3D             FCB    TERMN7
7F66 7F80           FDB    TT1          (ALPHA TABLE)
                  ***************************************************
7F68 C9      ST11   FCB    @11+PARCD    GOSUB LABEL
7F69 F0             FCB    @340
     01C8    EQU18  EQU    TT4-MT
7F6A E4             FCB    EQU18/2
7F6B 6E             FCB    @56+IMED     GOSUB X
7F6C 63             FCB    @143
7F6D 3D             FCB    TERMN7
7F6E 7F80           FDB    TT1          (ALPHA TABLE)
                  ***************************************************
7F70 50      ST12   FCB    @20+IMED     FOR A
7F71 AC             FCB    @254
7F72 51             FCB    @21+IMED     FOR B
7F73 AA             FCB    @252
7F74 52             FCB    @22+IMED     FOR C
7F75 AB             FCB    @253
7F76 3D             FCB    TERMN7
7F77 8C             FCB    12+$80       SYNTAX ERROR
                  ***************************************************
7F78 50      ST13   FCB    @20+IMED     NEXT A
7F79 AD             FCB    @255
7F7A 51             FCB    @21+IMED     NEXT B
7F7B AE             FCB    @256
7F7C 52             FCB    @22+IMED     NEXT C
7F7D AF             FCB    @257
7F7E 3D             FCB    TERMN7
7F7F 8C             FCB    12+$80       SYNTAX ERROR
                  ***************************************************
                  ***** THIRD LEVEL TABLES **************************
                  ***************************************************
7F80 90      TT1    FCB    @20+PAREX    A
7F81 4AA7           FDB    UDFKA
7F83 91             FCB    @21+PAREX    B
7F84 4AA6           FDB    UDFKB
7F86 92             FCB    @22+PAREX    C
7F87 4AA5           FDB    UDFKC
7F89 93             FCB    @23+PAREX    D
7F8A 4AA4           FDB    UDFKD
7F8C 94             FCB    @24+PAREX    E
7F8D 4AA3           FDB    UDFKE
7F8F 98             FCB    @30+PAREX    F
7F90 4AA2           FDB    UDFKF
7F92 99             FCB    @31+PAREX    G
7F93 4AA1           FDB    UDFKG
7F95 9A             FCB    @32+PAREX    H
7F96 4AA0           FDB    UDFKH
7F98 9B             FCB    @33+PAREX    I
7F99 4A9F           FDB    UDFKI
7F9B 9C             FCB    @34+PAREX    J
7F9C 4A9E           FDB    UDFKJ
7F9E A0             FCB    @40+PAREX    K
7F9F 4A9D           FDB    UDFKK
7FA1 A1             FCB    @41+PAREX    L
7FA2 4A9C           FDB    UDFKL
7FA4 A2             FCB    @42+PAREX    M
7FA5 4A9B           FDB    UDFKM
7FA7 A3             FCB    @43+PAREX    N
7FA8 4A9A           FDB    UDFKN
7FAA A4             FCB    @44+PAREX    O
7FAB 4A99           FDB    UDFKO
7FAD 3D             FCB    TERMN7
7FAE 7FCE           FDB    TT5          (DIGIT TABLE)
                  ***************************************************
7FB0 FF      TT2    FCB    @77+PARCD    STO [+] RCL
7FB1 02             FCB    @2
7FB2 62             FCB    EQU2/2
7FB3 EF             FCB    @57+PARCD    STO [-] RCL
```

```
7FB4 04              FCB    @4
7FB5 62              FCB    EQU2/2
7FB6 EE              FCB    @56+PARCD    STO [*] RCL
7FB7 06              FCB    @6
7FB8 62              FCB    EQU2/2
7FB9 F3              FCB    @63+PARCD    STO [/] RCL
7FBA 08              FCB    @10
7FBB 62              FCB    EQU2/2
7FBC 45              FCB    @5+IMED   STO CLEAR (CLEAR ALPHA REGS)
7FBD 3C              FCB    @74
7FBE 3D              FCB    TERMN7
7FBF 7EC4            FDB    ST2
7FC1 00              FCB    @0
                 ************************************************************
7FC2 6E         TT3  FCB    @56+IMED    GOTO LBL X
7FC3 60              FCB    @140
7FC4 3D              FCB    TERMN7
7FC5 7F80            FDB    TT1         (ALPHA TABLE)
7FC7 00              FCB    @0
                 ************************************************************
7FC8 6E         TT4  FCB    @56+IMED    GOSUB LBL X
7FC9 61              FCB    @141
7FCA 3D              FCB    TERMN7
7FCB 7F80            FDB    TT1         (ALPHA TABLE)
7FCD 00              FCB    @0
                 ************************************************************
7FCE A6         TT5  FCB    @46+PAREX    0
7FCF 49F0            FDB    ZERO
7FD1 9E              FCB    @36+PAREX    1
7FD2 49EF            FDB    ONE
7FD4 9F              FCB    @37+PAREX    2
7FD5 49EE            FDB    TWO
7FD7 B7              FCB    @67+PAREX    3
7FD8 49ED            FDB    THREE
7FDA 96              FCB    @26+PAREX    4
7FDB 49EC            FDB    FOUR
7FDD 97              FCB    @27+PAREX    5
7FDE 49EB            FDB    FIVE
7FE0 B6              FCB    @66+PAREX    6
7FE1 49EA            FDB    SIX
7FE3 8E              FCB    @16+PAREX    7
7FE4 49E9            FDB    SEVEN
7FE6 8F              FCB    @17+PAREX    8
7FE7 49E8            FDB    EIGHT
7FE9 B5              FCB    @65+PAREX    9
7FEA 49E7            FDB    NINE
7FEC A7              FCB    @47+PAREX    .
7FED 4A22            FDB    DECPT
7FEF 3D              FCB    TERMN7
7FF0 80              FCB    $80       ERROR ZERO (SPECIAL CASE)
                     NAM    PLABR
                     OPT    LIST,MEM
49E7                 ORG    $49E7
                 *
                 *PROGRAM LANGUAGE ADDRESS BUILDING ROUTINE
                 *
49E7 4C         NINE    INC A          AFTER ENTERING AND
49E8 4C         EIGHT   INC A          FALLING THRU THIS LIST
49E9 4C         SEVEN   INC A          OF INCREMENT INSTS,
49EA 4C         SIX     INC A          ACCA WILL CONTAIN
49EB 4C         FIVE    INC A          THE PROPER BCD DIGIT
49EC 4C         FOUR    INC A          ENTERED BY THE USER
49ED 4C         THREE   INC A
49EE 4C         TWO     INC A
49EF 4C         ONE     INC A
49F0 7C 0013    ZERO    INC    DCNTR   ADD 1 TO DIGIT COUNTER
49F3 C6 04              LDA B  #4      SET ACCB FOR ROTATE
49F5 0C         LL      CLC            CLEAR CARRY
49F6 79 0011            ROL    W1      ROLL LEFT W1 (LSW)
49F9 79 0010            ROL    W2      ROLL W2 WITH CARRY
49FC 5A                 DEC B          DECREMENT COUNTER
49FD 26 F6              BNE    LL      CONTINUE IF NOT 0
49FF 9A 11              ORA A  W1      "OR" NEW BCD DIGIT
4A01 97 11              STA A  W1      RESTORE W1
4A03 96 13              LDA A  DCNTR   GET DIGIT COUNTER
4A05 D6 C6              LDA B  SOL7    GET THE INSTRUCTION
```

```
4A07 C1 DF          CMP B   #@337      FOUR DIGIT ADDRESS?
4A09 22 08          BHI     F4D        BRANCH IF YES
4A0B C1 C7          CMP B   #@307      THREE DIGIT ADDRESS?
4A0D 22 0D          BHI     T3D        BRANCH IF YES
4A0F 81 02          CMP A   #2         ELSE 2 DIGIT
4A11 27 0F          BEQ     DECPT      BRANCH IF 2 ENTERED
4A13 7E 78E3 BLK    JMP     NK7        ELSE GET NEXT KEY
4A16 81 04   F4D    CMP A   #4         FOUR DIGITS ENTERED?
4A18 27 08          BEQ     DECPT      BRANCH IF YES
4A1A 20 F7          BRA     BLK        ELSE GET NEXT KEY
4A1C 81 03   T3D    CMP A   #3         THREE DIGITS ENTERED?
4A1E 27 02          BEQ     DECPT      BRANCH IF YES
4A20 20 F1          BRA     BLK        ELSE GET NEXT KEY
             *
             *THIS HANDLES THE DEC PT TERMINATOR
             *
4A22 8D 02   DECPT  BSR     BCDBIN     BCD TO BINARY CONV.
4A24 20 42          BRA     TYPE       CHECK INST TYPE
             *
             *THE FOLLOWING ROUTINE DOES A BCD TO BINARY
             *CONVERSION ON W1 & W2.
             *
             *
             *BCD TO BINARY CONVERSION ON W1 AND W2 WITH
             *BINARY RESULT LEFT IN TP7 AND TP7S. RESULT IS
             *EQUAL TO L+64H+32H+4H WHERE L=BINARY VALUE
             *OF THE LOW 2 BCD DIGITS AND H=BINARY VALUE
             *OF THE HIGH 2 BCD DIGITS.
             *
4A26 D6 10   BCDBIN LDA B   W2         GET MS BCD DIGITS
4A28 8D 33          BSR     BCDB       CONVERT TO BINARY
4A2A 5F             CLR B              PRESET ACCB FOR MULTIPLIES
4A2B 48             ASL A              MULTIPLY RESULT BY 4
4A2C 59             ROL B
4A2D 48             ASL A
4A2E 59             ROL B
4A2F D7 20          STA B   TP7        SAVE 4*(HIGH BINARY)
4A31 97 21          STA A   TP7S
4A33 48             ASL A              MULTIPLY BY 32
4A34 59             ROL B
4A35 48             ASL A
4A36 59             ROL B
4A37 48             ASL A
4A38 59             ROL B
4A39 D7 1E          STA B   TP6        SAVE 32*(HIGH BINARY)
4A3B 97 1F          STA A   TP6S
4A3D 48             ASL A              MULTIPLY BY 64
4A3E 59             ROL B
4A3F 9B 1F          ADD A   TP6S       DO 64H +32H
4A41 97 1F          STA A   TP6S
4A43 D9 1E          ADC B   TP6
4A45 D7 1E          STA B   TP6
4A47 BD 484B        JSR     ADD7       DO 64H + 32H + 4H
4A4A D6 11          LDA B   W1         GET LOW 2 BCD DIGITS
4A4C 8D 0F          BSR     BCDB       CONVERT TO BINARY
4A4E 9B 21          ADD A   TP7S       DO L + 64H + 32H + 4H
4A50 97 21          STA A   TP7S
4A52 24 03          BCC     BCD1       BRANCH IF NO CARRY
4A54 7C 0020        INC     TP7        ELSE BUMP TP7 BY ONE
4A57 CE 0000 BCD1   LDX     #0         CLEAR THE INDEX
4A5A DF 10          STX     W2         CLEAR THE BCD LOCATIONS
4A5C 39             RTS                RETURN WITH BINARY IN TP7 AND TP7+1
             *
             *THIS ROUTINE DOES A BCD TO BINARY CONVERSION
             *ON ACCB WITH RETURNED BINARY IN ACCA.
             *
4A5D 17      BCDB   TBA                ACCA = THE BCD DIGITS
4A5E 84 0F          AND A   #$F        ACCA = THE LS DIGIT
4A60 C4 F0          AND B   #$F0       ACCB = THE MS DIGIT
4A62 54             LSR B              BINARY = MS DIGIT * 10 + LS DIGIT
4A63 1B             ABA
4A64 54             LSR B
4A65 54             LSR B
4A66 1B             ABA
4A67 39             RTS                ACCA = THE BINARY
             *
```

```
                *THIS ROUTINE CHECKS INST TYPE, CHECKS
                *FOR OVERFLOW FOR THAT TYPE, AND INSERTS
                *ADDRESS OR LABEL INFO IF VALID
                *
4A68 86 E0      TYPE    LDA A   #@340      >=340=JMP OR JSR
4A6A 91 C6              CMP A   SOL7       COMPARE TO INST
4A6C 23 0C              BLS     GRP1       BRANCH IF JMP OR JSR
4A6E 86 C8              LDA A   #@310      DATA STORAGE INST?
4A70 91 C6              CMP A   SOL7       COMPARE TO INST
4A72 23 1A              BLS     GRP2       BRANCH IF YES
4A74 96 21              LDA A   TP7+1      GET LS BINARY
4A76 97 C7              STA A   SOL7+1     OK: SAVE DATA
4A78 20 11              BRA     CCNT       CONTINUE IN SUPV
4A7A 96 20      GRP1    LDA A   TP7        GET MS BINARY
4A7C 85 F8              BIT A   #@370      >2047?
4A7E 26 12              BNE     AERR       ERROR IF YES
4A80 D6 21      FINE1   LDA B   TP7+1      GET LS BINARY
4A82 58                 ASL B              CARRY=B7
4A83 49                 ROL A              LSB OF MSW=B7
4A84 54                 LSR B              RESTORE LSW
4A85 D7 C7              STA B   SOL7+1     SAVE IN 2ND BYTE
4A87 9A C6              ORA A   SOL7       "OR" IN INST
4A89 97 C6              STA A   SOL7       RESTORE WITH ADRS
4A8B 7E 794C    CCNT    JMP     CONT       CONTINUE IN SUPV
4A8E 96 20      GRP2    LDA A   TP7        GET MS BINARY
4A90 27 EE              BEQ     FINE1      OK IF ZERO
4A92 86 18      AERR    LDA A   #24        LOAD ERROR
4A94 97 06              STA A   ERROR      SAVE IN ERROR WORD
4A96 7E 7B40            JMP     ERROR7     JMP TO ERROR OUTPUT
                *
                *ALPHA TABLE PARTIAL EXECUTE CODE
                *
4A99 4C         UDFKO   INC A
4A9A 4C         UDFKN   INC A
4A9B 4C         UDFKM   INC A
4A9C 4C         UDFKL   INC A
4A9D 4C         UDFKK   INC A
4A9E 4C         UDFKJ   INC A
4A9F 4C         UDFKI   INC A
4AA0 4C         UDFKH   INC A              ACCA=7 IF
4AA1 4C         UDFKG   INC A              "H" KEY AND
4AA2 4C         UDFKF   INC A              ACCA=0 IF
4AA3 4C         UDFKE   INC A              "A" KEY.
4AA4 4C         UDFKD   INC A
4AA5 4C         UDFKC   INC A
4AA6 4C         UDFKB   INC A
4AA7 D6 C6      UDFKA   LDA B   SOL7       GET THE INST
4AA9 C1 D2              CMP B   #@322      <=322?
4AAB 23 14              BLS     ONEBYT     YES; SINGLE BYTE
4AAD C1 DF              CMP B   #@337      JMP OR JSR ?
4AAF 22 24              BHI     HANK1      BRANCH IF YES
4AB1 81 09              CMP A   #9         ALPHA KEY TOO BIG ?
4AB3 2E DD              BGT     AERR       BRANCH IF YES
4AB5 54                 LSR B              INST=INST/2
4AB6 CB 58              ADD B   #@130      INST=INST+130
4AB8 D7 C6      HANK3   STA B   SOL7       RESTORE THE NEW INST.
4ABA 8B 64      HANK    ADD A   #100       ADD KEY "NUMBER" TO LABEL OFFSET
4ABC 97 C7              STA A   SOL7+1     SAVE IN 2ND BYTE
4ABE 7E 794C    DOUG    JMP     CONT       CONTINUE IN SUPV
4AC1 C1 C1      ONEBYT  CMP B   #@301      TWO BYTE INST?
4AC3 23 F5              BLS     HANK       BRANCH IF YES
4AC5 81 09              CMP A   #9         ALPHA KEY TOO BIG ?
4AC7 2E C9              BGT     AERR       BRANCH IF YES
4AC9 C0 B4              SUB B   #@264      NEW INST =
4ACB 37                 PSH B              OLD INST - 264
4ACC 58                 ASL B              MULT BY 5
4ACD 58                 ASL B              + ACCA
4ACE 1B                 ABA
4ACF 33                 PUL B
4AD0 1B                 ABA                PLUS "KEY #"
4AD1 97 C6              STA A   SOL7       RESTORE NEW INST
4AD3 20 E9              BRA     DOUG       CONT. IN SUPV
4AD5 C1 EF      HANK1   CMP B   #@357      JMP INST ?
4AD7 22 04              BHI     HANK2      BRANCH IF YES
4AD9 C6 C0              LDA B   #@300      LOAD JSR LBL
4ADB 20 DB              BRA     HANK3      GO SAVE IT
```

```
00847 4ADD C6 C1    HANK2  LDA B  #@301     LOAD JMP LBL
00848 4ADF 20 D7           BRA    HANK3     CONTINUE
00849      484B     ADD7   EQU    $484B
00850      7840     ERROR7 EQU    $7840
00851      78E3     NK7    EQU    $78E3
00852      794C     CONT   EQU    $794C
00853      797B     BWM    EQU    $797B
00856                      NAM    UDF
00857                      OPT    LISY,MEM
00858               *
00859               *THIS ROUTINE HANDLES EXECUTION OF THE USER DEFINABLE FUNCTI
00860               *
00861 4AE1 4C       UDFO   INC A
00862 4AE2 4C       UDFN   INC A
00863 4AE3 4C       UDFM   INC A
00864 4AE4 4C       UDFL   INC A
00865 4AE5 4C       UDFK   INC A
00866 4AE6 4C       UDFJ   INC A
00867 4AE7 4C       UDFI   INC A
00868 4AE8 4C       UDFH   INC A
00869 4AE9 4C       UDFG   INC A
00870 4AEA 4C       UDFF   INC A
00871 4AEB 4C       UDFE   INC A
00872 4AEC 4C       UDFD   INC A
00873 4AED 4C       UDFC   INC A
00874 4AEE 4C       UDFB   INC A
00875 4AEF 4C       UDFA   INC A
00876 4AF0 D6 C6    FMT    LDA B  SOL7      GET INST
00877 4AF2 26 47           BNE    FMT0      BRANCH IF "CALL" INSTRUCTION
00878 4AF4 97 2E           STA A  T1        SAVE ALPHA KEY
00879 4AF6 96 07           LDA A  TGL       GET SWITCH SETTING
00880 4AF8 85 20           BIT A  #$20      AUDIT TRAIL ?
00881 4AFA 27 07           BEQ    UDF0      BRANCH IF NOT
00882 4AFC BD 5C8C         JSR    AUDIT1    ELSE PRINT
00883 4AFF D6 06           LDA B  ERROR     PAPER OUT ERROR ?
00884 4B01 26 0D           BNE    UDF3      BRANCH IF YES
00885 4B03 96 2E    UDF0   LDA A  T1        RESTORE ALPHA KEY
00886 4B05 8B 63           ADD A  #99       ADD LABEL OFFSET
00887 4B07 BD 497D         JSR    LBLSCH    FIND THE LABEL
00888 4B0A 2A 07           BPL    UDF1      BRANCH IF FOUND
00889 4B0C 86 0B           LDA A  #11       LOAD ERROR
00890 4B0E 97 06           STA A  ERROR     SAVE IT
00891 4B10 7E 7B40  UDF3   JMP    ERROR7    OUTPUT IT
00892 4B13 DF CA    UDF1   STX    UIP       SAVE ROUTINE ADDRESS
00893 4B15 E1 01           CMP B  1,X       CHECK TO SEE IF
00894 4B17 26 04           BNE    UDF4      TWO IDENTICAL LABELS
00895 4B19 A1 02           CMP A  2,X       ARE CONSECUTIVE AND
00896 4B1B 27 12           BEQ    UDF5      IF SO, DON'T STACK THE RETURN
00897 4B1D 30       UDF4   TSX              GET THE STACK POINTER
00898 4B1E 8C 0044         CPX    #@104     SUBROUTINE OVERFLOW ?
00899 4B21 26 04           BNE    UDF2      BRANCH IF NOT
00900 4B23 86 09           LDA A  #9        LOAD ERROR
00901 4B25 20 E7           BRA    UDF3-2    OUTPUT IT
00902 4B27 96 C9    UDF2   LDA A  UPP+1     GET PRGM PNTR LO
00903 4B29 36              PSH A            SAVE IT
00904 4B2A 96 C8           LDA A  UPP       GET PRGM PNTR HI
00905 4B2C 8A C0           ORA A  #$C0      ADD UDF FLAG
00906 4B2E 36              PSH A            SAVE IT
00907 4B2F 86 FF    UDF5   LDA A  #$FF      ACCA=ALL ONES
00908 4B31 97 09           STA A  RSFLG     SET R/S FLAG
00909 4B33 4F              CLR A
00910 4B34 97 12           STA A  SFLG      CLEAR THE STEP FLAG
00911 4B36 97 B9           STA A  BKWRT+1    EMPTY THE KEY BUFFER
00912 4B38 7E 797B         JMP    BWM       CONTINUE
00913               *
00914               *"FORMAT STATEMENT" BUILDING
00915               *
00916 4B3B 16       FMT0   TAB              SAVE "ALPHA" NUMBER
00917 4B3C DA C7           ORA B  SOL7+1    ADD ALPHA KEY TO INST
00918 4B3E C4 7F           AND B  #$7F      INSURE MSB=0
00919 4B40 D7 C7           STA B  SOL7+1    RESTORE INSTRUCTION
00920 4B42 4D              TST A            ALPHA OUTPUT INSTRUCTION ?
00921 4B43 27 09           BEQ    ALP       BRANCH IF YES
00922 4B45 86 0C           LDA A  #12       LOAD SYNTAX ERROR
00923 4B47 C5 F0           BIT B  #$F0      MAINFRAME CALL INSTRUCTION ?
00924 4B49 27 C3           BEQ    UDF3-2    ERROR IF YES
```

```
4B4B 7E 794C COV1    JMP   CONT      CONTINUE IN SUPV
4B4E 7E 51A0 ALP     JMP   ALPHAK    GO TO KEYBOARD ALPHA
        51A0 ALPHAK  EQU   $51A0
        497D LBLSCH  EQU   $497D
        5C8C AUDIT1  EQU   $5C8C
                     NAM   DTBL
                     OPT   LIST,MEM
             *
             *DIGIT ACCEPTANCE TABLE FOR "FLAG" AND "CALL" INSTRUCTIONS.
             *
             *THE FOLLOWING TABLE ACCEPTS I/O DEVICE NUMBERS AND
             *PACKS THEM INTO THE INSTRUCTION BEING BUILT.
             *
4B51 4C      D7      INC A
4B52 4C      D6      INC A
4B53 4C      D5      INC A
4B54 4C      D4      INC A
4B55 4C      D3      INC A
4B56 4C      D2      INC A
4B57 4C      D1      INC A
4B58 48      D0      ASL A             MOVE THE DEVICE CALL NUMBER
4B59 48              ASL A             INTO THE MS FOUR BITS
4B5A 48              ASL A             OF ACCA
4B5B 48              ASL A
4B5C 97 C7           STA A SOL7+1      SAVE IT IN THE INSTRUCTION
4B5E CE 7E6E         LDX   #RUN1       GET NEW SYNTAX TABLE ADRS
4B61 DF D3           STX   IT7         SAVE IT FOR NEXT SEARCH
4B63 7E 78E3         JMP   NK7         GO GET THE NEXT KEY
             *
             *THE FOLLOWING TABLE ACCEPTS FLAG NUMBER INFORMATION
             *AND PACKS IT INTO THE FLAG INSTRUCTION BEING BUILT.
             *
4B66 4C      F9      INC A
4B67 4C      F8      INC A
4B68 4C      F7      INC A
4B69 4C      F6      INC A
4B6A 4C      F5      INC A
4B6B 4C      F4      INC A
4B6C 4C      F3      INC A
4B6D 4C      F2      INC A
4B6E 4C      F1      INC A
4B6F D6 C6   F0      LDA B SOL7        GET CURRENT INSTRUCTION
4B71 2B 08           BMI   RNDD        BRANCH IF NOT A FLAG INST
4B73 4A              DEC A             FLAG 1 = "FLAG 0"
4B74 9A C6           ORA A SOL7        GENERATE THE NEW INST.
4B76 97 C6           STA A SOL7        SAVE IT
4B78 7E 794C RNDD1   JMP   CONT        GO DO IT !
4B7B 97 C7   RNDD    STA A SOL7+1      SAVE THE ROUND SETTING
4B7D 20 F9           BRA   RNDD1       GO DO IT !
             *
             *ERASE PROGRAM MEMORY ROUTINE.
             *
4B7F CE 0100 ERASE   LDX   #256        INDEX=USER STATE ZERO
4B82 6F 00   ERA1    CLR   X           NOP TO CURRENT STATE
4B84 08              INX               BUMP POINTER
4B85 9C 08           CPX   EOPM        END OF PROGRAM MEMORY ?
4B87 26 F9           BNE   ERA1        BRANCH IF NOT
4B89 7E 482A         JMP   $482A       GO TO SPECIAL "END" STMT
                     END
```

SYMBOL TABLE

| | | | | | | | | | | | | | |
|---|---|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |

```
TPOS   00D6  FILE   00D7  AR     00D8  BR     00E0  CR     00E8  DR     00F0
EP     00F8  MT     7E00  TERMN7 003D  IMED   0040  PARCO  00C0  PAREX  0080
NTBL   0000  PRGM1  7BCA  EQU11  0168  EQU12  0170  EQU13  0178  EQU14  00AC
EQU22  00A0  EQU1   00BC  EQU2   00C4  EQU16  0180  EQU3   00CA  EQU4   00E2
EQU5   011C  EQU20  00A6  EQU7   0160  EQU15  0180  RUN1   7E6E  ST22   7EA0
ST20   7EA6  EQU6   0146  ST14   7EAC  ST1    7EBC  ST2    7EC4  ST3    7ECA
ST4    7EE2  EQU21  0140  ST5    7F1C  ST21   7F40  ST6    7F46  ST7    7F60
EQU17  01C2  ST11   7F68  EQU18  01C8  ST12   7F70  ST13   7F78  TT1    7F80
TT2    7FB0  TT3    7FC2  TT4    7FC8  TT5    7FCE  NINE   49E7  EIGHT  49E8
SEVEN  49E9  SIX    49EA  FIVE   49EB  FOUR   49EC  THREE  49ED  TWO    49EE
ONE    49EF  ZERO   49F0  LL     49F5  BLK    4A13  F4D    4A16  T3D    4A1C
DECPT  4A22  BCDBIN 4A26  BCD1   4A57  BCDB   4A5D  TYPE   4A68  GRP1   4A7A
FINE1  4A80  CCNT   4A8B  GRP2   4A8E  AERR   4A92  UDFKO  4A99  UDFKN  4A9A
UDFKM  4A9B  UDFKL  4A9C  UDFKK  4A9D  UDFKJ  4A9E  UDFKI  4A9F  UDFKH  4AA0
UDFKG  4AA1  UDFKF  4AA2  UDFKE  4AA3  UDFKD  4AA4  UDFKC  4AA5  UDFKB  4AA6
UDFKA  4AA7  HANK3  4AB8  HANK   4ABA  DOUG   4ABE  ONEBYT 4AC1  HANK1  4AD5
HANK2  4ADD  ADD7   4B4B  ERROR7 7B40  NK7    7BE3  CONT   794C  BWM    797B
UDFO   4AE1  UDFN   4AE2  UDFM   4AE3  UDFL   4AE4  UDFK   4AE5  UDFJ   4AE6
UDFI   4AE7  UDFH   4AE8  UDFG   4AE9  UDFF   4AEA  UDFE   4AEB  UDFD   4AEC
UDFC   4AED  UDFB   4AEE  UDFA   4AEF  FMT    4AF0  UDF0   4B03  UDF3   4B10
UDF1   4B13  UDF4   4B1D  UDF2   4B27  UDF5   4B2F  FMT0   4B38  COV1   4B48
ALP    4B4E  ALPHAK 51A0  LBLSCH 497D  AUDIT1 5CBC  D7     4B51  D6     4B52
D5     4B53  D4     4B54  D3     4B55  D2     4B56  D1     4B57  D0     4B58
F9     4B66  F8     4B67  F7     4B68  F6     4B69  F5     4B6A  F4     4B6B
F3     4B6C  F2     4B6D  F1     4B6E  F0     4B6F  RNDD1  4B78  RNDD   4B7B
ERASE  4B7F  ERA1   4B82

TOTAL ERRORS  22

****ERROR 201
 218   NAM FORMAT
****ERROR 201
 327   NAM JSRJMP
****ERROR 201
 528   NAM ENDEX
****ERROR 201
 550   NAM RTNEX

00215                        OPT    LIST,MEM
00218                        NAM    FORMAT
00219                        OPT    LIST,MEM
00220 4E09                   ORG    $4E09
00221                *
00222                *THIS IS THE DISPLAY FORMATTER FOR CJ.
00223                *IF IN RUN MODE, THE X REG IS DISPLAYED.
00224                *IF PRGM MODE IS SET, THE PRGM CNTR
00225                *AND DESTINATION ADDRESS ARE DISPLAYED.
00226                *
00227 4E09 96 07     FRMT1   LDA A  TGL       WHAT MODE ?
00228 4E0B 2B 11             BMI    PMODE     BRANCH IF PRGM MODE
00229 4E0D 96 CC             LDA A  ALPHA     ALPHA FLAG SET ?
00230 4E0F 27 05             BEQ    DONTT     BRANCH IF NOT
00231 4E11 BD 5D75           JSR    BLANK     ELSE BLANK BUFFER
00232 4E14 20 54             BRA    FC3       DISPLAY "ALPHA"
00233 4E16 7E 5CBC DONTT     JMP    FRMT+$14    ELSE USE RUN FORMATTER
00234 4E19 CE 0100 FC4       LDX    #256      INDEX = USER STATE 0
00235 4E1C DF C8             STX    UPP       UPDATE INCORRECT PRGM PNTR
00236 4E1E 96 09     PMODE   LDA A  RSFLG     RUNNING ?
00237 4E20 2B F4             BMI    DONTT     IF YES, DON'T FORMAT HERE
00238 4E22 BD 5D75           JSR    BLANK     ELSE BLANK BUFFER
00239 4E25 7A 00C8           DEC    UPP       REMOVE SYSTEM ADRS OFFSET
00240 4E28 DE C8             LDX    UPP       GET PRGM PNTR
00241 4E2A 7C 00C8           INC    UPP       RESTORE SYSTEM OFFSET
00242 4E2D BD 4BBC           JSR    BINBCD    CONVERT TO BCD
00243 4E30 CE 0058           LDX    #BUFF     GET BUFFER ADRS
00244 4E33 86 3A             LDA A  #$3A      GET THE "P"
00245 4E35 C6 03             LDA B  #3        SET CHAR. COUNT
00246 4E37 8D 38             BSR    LOAD      LOAD CHARS.
00247 4E39 86 10             LDA A  #16       SET DIGITS CNTR
00248 4E3B 8D 67             BSR    DGTS      GO LOAD THE DIGITS
00249 4E3D 96 52             LDA A  TA        INSERT MODE ?
00250 4E3F 27 06             BEQ    FC2       BRANCH IF NOT
00251 4E41 08                INX              PISITION BUFFER PNTR
00252 4E42 08                INX
```

```
4E43 86 4C              LDA A   #$4C       GET "INSERT" CHAR.
4E45 A7 00              STA A   X          SAVE IT
4E47 96 C6      FC2     LDA A   SOL7       GET CURRENT INST
4E49 81 BE              CMP A   #@276      LIGHT DISPLAY ?
4E4B 22 2C              BHI     FC1        BRANCH IF YES
4E4D 96 CC              LDA A   ALPHA
4E4F 26 19              BNE     FC3
4E51 DE 08              LDX     EOPM
4E53 DF 20              STX     TP7
4E55 DE C8              LDX     UPP
4E57 DF 1E              STX     TP6
4E59 BD 4840            JSR     SUB7
4E5C DE 20              LDX     TP7
4E5E 2F B9              BLE     FC4        BRANCH IF UPP IS IN DATA REGS
4E60 BD 48BC            JSR     BINBCD
4E63 CE 0064            LDX     #BUFF+12
4E66 86 10              LDA A   #16
4E68 20 3A              BRA     DGTS       LOAD DIGITS AND RETURN
4E6A CE 0063    FC3     LDX     #BUFF+11
4E6D 86 47              LDA A   #$47       GET "ALPHA" MESSAGE
4E6F C6 05              LDA B   #5         GET CHAR. COUNT
4E71 A7 00      LOAD    STA A   X          SAVE THE CHAR.
4E73 4C                 INC A              GET NEXT CHARACTER
4E74 08                 INX                POSITION THE BUFFER POINTER
4E75 5A                 DEC B              DEC. THE CHARACTER COUNT
4E76 26 F9              BNE     LOAD       CONTINUE IF NOT FINISHED YET
4E78 39         FC      RTS                ELSE RETURN
4E79 DE 10      FC1     LDX     W2         GET BCD ADDRESS
4E7B DF 2D              STX     T2         MOVE TO TEMPS FOR LOAD
4E7D CE 0064            LDX     #BUFF+12     SET BUFFER POINTER
4E80 86 10              LDA A   #16        SET DIGITS COUNTER
4E82 8D 20              BSR     DGTS       GO LOAD THE DIGITS
4E84 CE 0062            LDX     #BUFF+10     SET PNTR
4E87 96 C6              LDA A   SOL7       DECODE INST FOR MESSAGE TYPE
4E89 81 DF              CMP A   #@337
4E8B 22 0A              BHI     FD
4E8D 81 C1              CMP A   #@301
4E8F 22 0C              BHI     TD
4E91 86 3F              LDA A   #$3F       GET "LBL-" MESSAGE
4E93 C6 04              LDA B   #4         GET CHAR. COUNT
4E95 20 DA              BRA     LOAD       LOAD AND RETURN
4E97 86 3D      FD      LDA A   #$3D       GET THE "A-" MESSAGE
4E99 C6 02              LDA B   #2         GET CHAR. COUNT
4E9B 20 D4              BRA     LOAD       LOAD AND RETURN
4E9D 09         TD      DEX                BACK UP ONE
4E9E 86 43              LDA A   #$43       GET "REG-" MESSAGE
4EA0 C6 04              LDA B   #4         GET CHAR. COUNT
4EA2 20 CD              BRA     LOAD       LOAD AND RETURN
                *
                *DGTS TRANSFERS BCD DIGITS TO THE BUFFER
                *
4EA4 C6 10      DGTS    LDA B   #16        LOAD DIGIT/SHIFT CTR INTO ACCB
4EA6 6F 00      PFMT2   CLR     X          CLEAR BYTE IN BUFFER
4EA8 79 002E    PFMT1   ROL     T1         ROLL LSW LEFT
4EAB 79 002D            ROL     T2         ROLL MSW LEFT
4EAE 69 00              ROL     X          ROLL BIT INTO BUFFER WORD
4EB0 5A                 DEC B              DECR DIGIT/SHIFT CTR
4EB1 C5 03              BIT B   #3         4 SHIFTS YET?
4EB3 26 F3              BNE     PFMT1      NO, ROLL NEXT BIT
4EB5 D7 2C              STA B   T3         YES, SAVE DIGIT/SHIFT CTR
4EB7 E6 00              LDA B   X          LOAD ACCB WITH DIGIT JUST LOADED
4EB9 CA 30              ORA B   #$30       CONVERT IT TO ASCII
4EBB E7 00              STA B   X          RESTORE IT IN THE BUFFER
4EBD D6 2C              LDA B   T3         RELOAD DIGIT/SHIFT CTR
4EBF 26 01              BNE     INC        DONE?
4EC1 39                 RTS                YES, RETURN
4EC2 11         INC     CBA                NO, LEADING ZREO LOADED ?
4EC3 2F E3              BLE     PFMT1      YES, LOAD NEXT DIGIT OVER IT
4EC5 08                 INX                NO, INCR BUFFER PTR
4EC6 20 DE              BRA     PFMT2      LOAD NEXT DIGIT INTO NEXT BUFFER LOC
     48BC       BINBCD  EQU     $48BC
     4840       SUB7    EQU     $4840
                        NAM     JSRJMP
                        OPT     LIST,MEM
4900                    ORG     $4900
                *
```

```
                  *THIS ROUTINE IS THE EXECUTION CODE FOR ALL JSR
                  *STATEMENTS. IT CHECKS FOR LEVEL OVERFLOW (>5),
                  *SAVES THE RETURN ADRS ON THE STACK, AND
                  *TRANSFERS CONTROL TO THE PROPER JMP ROUTINE FOR
                  *THE TYPE OF TRANSFER DESIRED.
                  *
4900 4C           JSRS    INC A              SET THE JSR FLAG
4901 97 2E                STA A   T1         TO A ONE
4903 31                   INS                WIPE OUT OLD STACK
4904 31                   INS                RETURN VECTOR
4905 30                   TSX                STACK TO INDEX
4906 8C 0044              CPX     #@104      SUBROUTINE OVERFLOW?
4909 26 06                BNE     NOV        BRANCH IF NOT
490B C6 09                LDA B   #9         LOAD ERROR
490D D7 06                STA B   ERROR      STORE IN ERROR WORD
490F 20 69                BRA     MWB        RET. TO SUPV.
4911 DE CA        NOV     LDX     UIP        GET INST PNTR
4913 E6 00                LDA B   X          GET THE INST
4915 2A 01                BPL     SING       BRANCH IF SINGLE BYTE
4917 08                   INX                ELSE INC RTN PNTR
4918 DF 20        SING    STX     TP7        SAVE IT IN TEMPORARY
491A 96 21                LDA A   TP7+1      GET THE LS BYTE
491C 36                   PSH A              PUSH IT ONTO STACK
491D 96 20                LDA A   TP7        GET THE MS BYTE
491F 36                   PSH A              PUSH IT ONTO STACK
4920 5D                   TST B              WHAT TYPE OF JSR ?
4921 2B 07                BMI     NX         BRANCH IF ABS OR LBL
4923 C1 63                CMP B   #@143      JSR X ?
4925 27 71                BEQ     JSRLK2     BRANCH IF YES
4927 7E 49B7              JMP     JSRLK1     ELSE DO JSR LBL X
492A C1 C0        NX      CMP B   #@300      ABSOLUTE OR LABEL?
492C 27 3A                BEQ     JSRLK4     GO DO JSR LBL
492E 20 04                BRA     JSRLK3     GO DO JSR ABS
                  *
                  *THIS ROUTINE EXECUTES ABSOLUTE JUMPS
                  *AND ABSOLUTE JSR'S DEPENDING UPON THE
                  *ENTRY POINT.
                  *
4930 31           JMPABS INS                 WIPE OUT OLD STACK
4931 31                   INS                RETURN VECTOR
4932 97 2E                STA A   T1         CLEAR JSR FLAG
4934 DE CA        JSRLK3 LDX      UIP        INDEX=INST ADRS
4936 A6 00                LDA A   X          ACCA=FIRST BYTE
4938 84 0F                AND A   #@17       ACCA=MSB'S OF ADRS
493A E6 01                LDA B   1,X        ACCB=LSB'S OF ADRS
493C 58                   ASL B              B7=B6 OF THE ADRS
493D 44                   LSR A              CARRY=B7 OF ADRS
493E 56                   ROR B              B7 OF ACCB=B7 OF ADRS
493F 4C                   INC A              ADRS=ADRS+256
4940 D7 21                STA B   TP7S       SAVE LS BITS
4942 97 20        L2      STA A   TP7        SAVE MS BITS
4944 D0 0C                SUB B   EOPM+1     DO ADRS-EOPM
4946 92 0B                SBC A   EOPM
4948 2A 60                BPL     TOOBIG     ERROR IF ADRS >= EOPM
494A DE 20                LDX     TP7        GET THE ADDRESS
494C E6 00                LDA B   X          ACCB=INST THERE
494E 2B 0D                BMI     LINK       POSSIBLE 2ND BYTE?
4950 8C 0100              CPX     #256       STATE 0?
4953 27 08                BEQ     LINK       YES; CONTINUE
4955 09                   DEX                NO; CHECK FIRST BYTE
4956 E6 00                LDA B   X          GET "FIRST" BYTE
4958 C1 BA                CMP B   #SDBB      TWO BYTE INSTRUCTION ?
495A 22 01                BHI     LINK       BRANCH IF NOT
495C 08           DOIT    INX                INCREMENT ADRS
495D DF C8        LINK    STX     UPP        UPDATE THE PRGM PNTR
495F 09                   DEX                BACK UP
4960 DF CA                STX     UIP        UPDATE INST PNTR
4962 20 16                BRA     MWB        RETURN TO SUPV.
                  *
                  *THIS ROUTINE WILL SET THE USER INST PNTR
                  *AND THE USER PRGM PNTR TO THE ADDRESS
                  *OF THE LABEL IN QUESTION IF IT FINDS THAT LBL.
                  *IF THE LABEL IS NON-EXISTANT,AN ERROR
                  *WILL RESULT.
                  *
```

```
4964 31        JMPLBL INS              WIPE OUT OLD STACK
4965 31               INS              RETURN VECTOR
4966 97 2E            STA A   T1       CLEAR JSR FLAG
4968 DE CA     JSRLK4 LDX     UIP      GET INST ADRS
496A A6 01            LDA A   1,X      ACCA=THE LABEL
496C 8D 0F            BSR     LBLSCH   GO FIND THE LBL
496E 2A EC            BPL     DOIT     BRANCH IF LABEL FOUND
4970 C6 08     CANT   LDA B   #8       LOAD ERROR
4972 D7 06     CK     STA B   ERROR    SAVE IN ERROR WORD
4974 D6 2E            LDA B   T1       TEST JSR FLAG
4976 27 02            BEQ     MWB      BRANCH IF NOT JSR
4978 31               INS              ELSE WIPE OUT THE
4979 31               INS              STORED RETURN VECTOR
497A 7E 797B   MWB    JMP     BWM      RETURN TO SUPV

                      *
                      *THIS ROUTINE ACCEPTS A LABEL IN ACCA AND RETURNS
                      *WITH THE R/W ADRS OF THAT LABEL IN THE
                      *INDEX REGISTER. SEARCHING BEGINS AT STATE 0
                      *OF THE USER PRGM. IF NO LBL WAS FOUND,
                      *THE N BIT WILL BE SET.
                      *
497D CE 00FF   LBLSCH LDX     #255     INIT START ADRS
4980 C6 BF            LDA B   #@277    ACCB = LABEL INSTRUCTION
4982 08        SEARCH INX              INC ADRS
4983 9C 08            CPX     EOPM     END OF MEMORY?
4985 27 0A            BEQ     SORRY    BRANCH IF YES
4987 E1 00            CMP B   X        LABEL INST ?
4989 26 F7            BNE     SEARCH   BRANCH IF NOT
498B 08               INX              ELSE INC ADRS
498C A1 00            CMP A   X        IS IT THE RIGHT LABEL ?
498E 26 F2            BNE     SEARCH   IF NOT, SEARCH
4990 39               RTS              YES! RETURN
4991 86 FF     SORRY  LDA A   #$FF     SET N BIT (ERROR)
4993 39               RTS              RETURN
                      *
                      *THIS ROUTINE SETS THE USER INST PNTR AND
                      *THE USER PRGM PNTR TO THE ABSOLUTE VALUE OF
                      *THE INTEGER PART OF THE X REGISTER. IF THE
                      *RESULTANT ADRS IS OUT OF RANGE, AN ERROR
                      *WILL RESULT AND NO CHANGE IN
                      *POINTERS WILL OCCUR.
                      *
4994 31        JMPX   INS              WIPE OUT OLD STACK
4995 31               INS              RETURN VECTOR
4996 97 2E            STA A   T1       CLEAR JSR FLAG
4998 D6 90     JSRLK2 LDA B   XR       ACCB=X REG EXP
499A 2B 12            BMI     ADRS0    BRANCH IF NEG EXP
499C 5C               INC B            INCREMENT EXPONENT
499D C1 04            CMP B   #4       COMPARE TO +4
499F 2E 09            BGT     TOOBIG   BRANCH IF BIGGER
49A1 8D 28            BSR     TSFR1    CONVERT X-REG
49A3 96 20            LDA A   TP7      GET MSB'S OF RESULT
49A5 4C               INC A            INC PAGE ADRS
49A6 D6 21            LDA B   TP7+1    GET LS BITS
49A8 20 98            BRA     L2       CHECK FOR VALID ADDRESS
49AA C6 18     TOOBIG LDA B   #24      LOAD ERROR
49AC 20 C4            BRA     CK       GO CHECK FOR JSR
49AE CE 0100   ADRS0  LDX     #256     GET ADRS 0
49B1 20 AA            BRA     LINK     CONTINUE
                      *
                      *THIS ROUTINE SETS THE USER INST PNTR AND
                      *THE USER PRGM PNTR TO THE ADRS OF THE
                      *LABEL FOUND IN THE X REG. IF THAT
                      *LABEL IS NOT FOUND, NO CHANGE IN
                      *POINTERS WILL OCCUR.
                      *
49B3 31        JMPLBX INS              WIPE OUT OLD STACK
49B4 31               INS              RETURN VECTOR
49B5 97 2E            STA A   T1       CLEAR JSR FLAG
49B7 4F        JSRLK1 CLR A            PRESET ACCA FOR LABEL 0
49B8 D6 90            LDA B   XR       ACCB=X-REG EXPONENT
49BA 2B 09            BMI     ZOOP     IF NEG., FIND LABEL 0
49BC 5C               INC B            ACCB=# OF INT DIGITS
49BD C1 02            CMP B   #2       MORE THAN 2?
49BF 2E AF            BGT     CANT     ERROR IF YES
```

```
49C1 8D 08           BSR    TSFR1     CONVERT X-REG
49C3 96 21           LDA A  TP7+1     GET BINARY RESULT
49C5 8D B6    ZOOP   BSR    LBLSCH    GO SEARCH FOR LABEL
49C7 2A 93           BPL    DOIT      BRANCH IF FOUND
49C9 20 A5           BRA    CANT      ELSE ERROR
              *
              *THIS ROUTINE TRANSFERS THE INTEGER
              *PART OF THE X REG TO W1 & W2 FOR A
              *BCD TO BINARY CONVERSION. ON
              *ENTRY. ACCB=THE # OF INTEGER DIGITS
              *AND INDEX = REGISTER ADDRESS
              *
              *SPECIAL ENTRY FOR X-REG ONLY
              *
49CB CE 0090  TSFR1  LDX    #XR       PRESET THE INDEX
              *
49CE EE 02    TSFR   LDX    2,X       GET 4 MANTISSA DIGITS
49D0 DF 10           STX    W2        SAVE IN BCD CONV WORDS
49D2 C0 04           SUB B  #4        ACCB= -(DIGIT SHIFT COUNT)
49D4 27 0E           BEQ    TSFRC     NO SHIFT; RETURN
49D6 86 04    RB1    LDA A  #4        ELSE LOAD ROTATE COUNTER
49D8 74 0010  RB     LSR    W2        SHIFT MOST SIGNIFICANT WORD
49DB 76 0011         ROR    W1        ROTATE LSW
49DE 4A              DEC A            DEC ROTATE COUNTER
49DF 26 F7           BNE    RB        CONTINUE IF NOT 0
49E1 5C              INC B            INC DIGIT SHIFT COUNTER
49E2 26 F2           BNE    RB1       CONTINUE IF NOT 0
49E4 7E 4A26  TSFRC  JMP    BCDBIN    CONVERT TO BINARY
     7978     BWM    EQU    $7978
     4A26     BCDBIN EQU    $4A26
7CC0                 ORG    $7CC0
7CC0 49B3            FDB    JMPLBX
7CC2 4900            FDB    JSRS
7CC4 4994            FDB    JMPX
7CC6 4900            FDB    JSRS
7D80                 ORG    $7D80
7D80 4900            FDB    JSRS
7D82 4964            FDB    JMPLBL
7DC0                 ORG    $7DC0
7DC0 4900            FDB    JSRS,JSRS,JSRS,JSRS,JSRS,JSRS,JSRS,JSRS
7DD0 4900            FDB    JSRS,JSRS,JSRS,JSRS,JSRS,JSRS,JSRS,JSRS
7DE0 4930            FDB    JMPABS,JMPABS,JMPABS,JMPABS
7DE8 4930            FDB    JMPABS,JMPABS,JMPABS,JMPABS
7DF0 4930            FDB    JMPABS,JMPABS,JMPABS,JMPABS
7DF8 4930            FDB    JMPABS,JMPABS,JMPABS,JMPABS
                     NAM    ENDEX
                     OPT    LIST,MEM
482A                 ORG    $482A
              *
              *SPECIAL ENTRY FOR "ERASE" ROUTINE
              *
482A D6 D5           LDA B  FLAG      GET MEMORY SECURE INFO
482C C4 FE           AND B  #$FE      CLEAR SECURE BIT
482E D7 D5           STA B  FLAG      RESTORE FLAG
4830 97 52           STA A  TA        CLEAR INSERT MODE
              *
              *THIS ROUTINE EXECUTES THE END STATEMENT
              *
4832 8E 0051  ENDEX  LDS    #ISTACK   RESET STACK POINTER
4835 97 08           STA A  UFLG      CLEAR USER FLAGS
4837 97 09           STA A  RSFLG     CLEAR R/S FLAG
4839 CE 0100         LDX    #256      256=USER STATE 0
483C 7E 495D         JMP    LINK      PRESET UPP AND RETURN
7D62                 ORG    $7D62
7D62 4832            FDB    ENDEX
                     NAM    RTNEX
                     OPT    LIST,MEM
4859                 ORG    $4859
              *
              *THIS ROUTINE HANDLES THE RETURN FROM SUBROUTINE
              *INSTRUCTION. IT FIRST CHECKS TO SEE IF A JSR
              *HAS BEEN EXECUTED. IF NOT, AN ERROR WILL RESULT
              *
4859 31       RTNEX  INS              WIPE OUT OLD STACK
485A 31              INS              RETURN VECTOR
485B 30              TSX              STACK TO INDEX
```

```
4B5C 8C 0052          CPX     #ISTACK+1   WAS A GOSUB EXECUTED ?
485F 27 0C            BEQ     NOJSR       BRANCH IF NOT
4861 32               PUL A               ELSE GET MSW OF ADRS
4862 4D               TST A               UDF RETURN ?
4863 2B 0E            BMI     RTNEX1      BRANCH IF YES
4865 97 CA            STA A   UIP         SAVE IN INST PNTR
4867 32               PUL A               GET LSW OF ADRS
4868 97 CB            STA A   UIP+1       SAVE IN INST PNTR
486A 7E 797B  RETN    JMP     BWM         RETURN TO SUPV
486D 86 0A    NOJSR   LDA A   #10         LOAD ERROR
486F 97 06            STA A   ERROR       SAVE IN ERROR WORD
4871 20 F7            BRA     RETN        RETURN TO SUPV
4873 84 3F    RTNEX1  AND A   #$3F        REMOVE UDF FLAG
4875 97 C8            STA A   UPP         RESTORE PRGM PNTR HI
4877 32               PUL A               GET PRGM PNTR LO
4878 97 C9            STA A   UPP+1       RESTORE IT
487A 7F 0009          CLR     RSFLG       STOP RUNNING
487D 20 EB            BRA     RETN        RETURN TO KEYBOARD
7D66                  ORG     $7D66
7D66 4859             FDB     RTNEX
                      END
```

SYMBOL TABLE

| | | | | | | | | | | | |
|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 00BA | MT | 7E00 | TERMN7 | 003D | IMED | 0040 | PARCD | 00C0 |
| PAREX | 0080 | NTBL | 0000 | DOTS | 5EC0 | PRTDRV | 602D | FRMT | 5CA8 | BLANK | 5D75 |
| LDMSG | 578D | ROLLD | 55B2 | ROLLU | 57F1 | PSD | 550A | TXL | 55E9 | STKUP | 55EF |
| MAD | 749B | CMP | 74AA | NOR | 74D6 | TXW | 7424 | TXXR | 743B | EXXR | 7452 |
| ARSR | 753B | OVUNF | 75B6 | OVERF | 75DD | XR0 | 740A | XRNINE | 75C8 | UNDRF | 75F1 |
| IMULT | 76B9 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |
| RECIP | 73E6 | TXRX | 73F3 | CONST | 6800 | FPDBRC | 6898 | TAN | 6849 | ATN | 69C3 |
| DSZERO | 6A46 | NTLN | 6A58 | EXPN | 6AC9 | SIN | 6894 | COS | 689A | ASIN | 6BF2 |
| ACOS | 6BF7 | PH1 | 6C5D | PH2 | 6C8D | PH3 | 6D34 | PH4 | 6D00 | LSFT8 | 6E47 |
| SQRT | 6E65 | MAD8 | 6F2C | CMP8 | 53E4 | IOUPX | 6F52 | LOG10 | 6FA7 | YUPX | 6FE9 |
| RTOP | 7328 | PTOR | 7386 | FRMT1 | 4E09 | DONTT | 4E16 | FC4 | 4E19 | PMODE | 4E1E |
| FC2 | 4E47 | FC3 | 4E6A | LOAD | 4E71 | FC | 4E78 | FC1 | 4E79 | FD | 4E97 |
| TO | 4E9D | DGTS | 4EA4 | PFMT2 | 4EA6 | PFMT1 | 4EA8 | INC | 4EC2 | BINBCD | 4BBC |
| SUB7 | 4840 | JSRS | 4900 | NOV | 4911 | SING | 4918 | NX | 492A | JMPABS | 4930 |
| JSRLK3 | 4934 | L2 | 4942 | DOIT | 495C | LINK | 495D | JMPLBL | 4964 | JSRLK4 | 4968 |
| CANT | 4970 | CK | 4972 | MWB | 497A | LBLSCH | 497D | SEARCH | 4982 | SORRY | 4991 |
| JMPX | 4994 | JSRLK2 | 4998 | TOOBIG | 49AA | ADRS0 | 49AE | JMPLBX | 49B3 | JSRLK1 | 49B7 |
| ZOOP | 49C5 | TSFR1 | 49CB | TSFR | 49CE | RB1 | 49D6 | RB | 49D8 | TSFRC | 49E4 |
| BWM | 797B | BCDBIN | 4A26 | ENDEX | 4832 | RTNEX | 4859 | RETN | 486A | NOJSR | 486D |
| RTNEX1 | 4873 | | | | | | | | | | |

```
TOTAL ERRORS   4

****ERROR 201
 218   NAM RSEXR
****ERROR 201
 254   NAM SUBADD
****ERROR 201
 282   NAM BINBCD
****ERROR 201
 325   NAM CJUFLG
```

```
                       OPT    LIST,MEM
                       NAM    RSEXR
                       OPT    LIST,MEM
4800                   ORG    $4800
                *
                *THIS ROUTINE PROCESSES THE RUN-STOP KEY
                *
4800 0F         RSEX   SEI                  DISABLE INTERRUPTS
4801 96 09             LDA A  RSFLG         GET R/S FLAG
4803 48                ASL A                SHIFT B7 TO C
4804 25 1F             BCS    B7ON          BRANCH IF B7 WAS A 1
4806 2B 10             BMI    B6ON          BRANCH IF B6 IS 1
4808 44                LSR A                B7=B6=0
4809 43                COM A                B7=B6=1 (RUN!)
480A DE C8             LDX    UPP           GET PRGM PNTR
480C 09                DEX                  SUBTRACT 1
480D DF CA             STX    UIP           SAVE IN INST PNTR
480F 5F                CLR B
4810 D7 B9             STA B  BKWRT+1       CLEAR KEY BUFFER
4812 D7 12             STA B  SFLG          CLEAR STEP FLAG
4814 97 09      ZIP    STA A  RSFLG         RESTORE NEW FLAG
4816 0E         BACK   CLI                  ENABLE INTERRUPTS
4817 39                RTS                  RETURN
4818 4F         B6ON   CLR A                CLEAR R/S FLAG
4819 DE CA             LDX    UIP           GET INST PNTR
481B DF C8      ZIP1   STX    UPP           SAVE PRGM PNTR
481D C6 40             LDA B  #$40          PRESET ACCB
481F DA 08             ORA B  UFLG          SET THE ENTRY FLAG
4821 D7 08             STA B  UFLG          RESTORE FLAGS
4823 20 EF             BRA    ZIP           GO STORE FLAG
4825 2A EF      B7ON   BPL    BACK          RETURN IF B6=0
4827 44                LSR A                0 TO B7
4828 20 EA             BRA    ZIP           RETURN
7D60                   ORG    $7D60
7D60 4800              FDB    RSEX
                       NAM    SUBADD
                       OPT    LIST,MEM
4840                   ORG    $4840
                *
                *     SUBADD - 16 BIT 2'S COMP ADD/SUBTRACT
                *
                *     BRAD MILLER  3/4/74
                *
                *THIS SUBROUTINE PERFORMS EITHER TP7-TP6 OR TP7+TP6
                *DEPENDING UPON THE ENTRY POINT WHERE TP7 AND
                *TP6 ARE "16 BIT WORDS" STORED IN MEMORY. THE CONTENTS
                *OF THE INDEX ARE DESTROYED.
                *THE RESULT IS STORED IN TP7 AND TP7+1
                *
4840 73 001E    SUB7   COM    TP6           1'S COMP THE MSB'S
4843 73 001F           COM    TP6+1         1'S COMP LSB'S
4846 DE 1E             LDX    TP6           INDEX=THE NUMBER
4848 08                INX                  INC FOR 2'S COMP
4849 DF 1E             STX    TP6           RESTORE THE NUMBER
484B 96 21      ADD7   LDA A  TP7S          GET LS BITS
484D 9B 1F             ADD A  TP6S          ADD
484F 97 21             STA A  TP7S          RESTORE
4851 96 20             LDA A  TP7           GET MS BITS
4853 99 1E             ADC A  TP6           ADD
4855 97 20             STA A  TP7           RESTORE
4857 39                RTS                  RETURN
                       NAM    BINBCD
                       OPT    LIST,MEM
48BC                   ORG    $48BC
                *
                *THIS ROUTINE DOES A BINARY TO BCD CONV
                *ON THE INDEX REGISTER. THE MAX INPUT IS
                *DECIMAL 9999. THE BCD DIGITS ARE STORED
                *IN T2 AND T1 WITH MS DIGITS IN T2
                *
48BC DF 20      BINBCD STX    TP7           SAVE BINARY NUMBER
48BE 7F 002E           CLR    T1            CLEAR LS BCD ACC
48C1 7F 002D           CLR    T2            CLEAR MS BCD ACC
48C4 CE FC18           LDX    #-1000        PREPARE TO SUBT 1000
48C7 DF 1E      START1 STX    TP6           SAVE THE SUBT VALUE
48C9 BD 484B    MORE1  JSR    ADD7          DO TP7=TP7+TP6
```

```
48CC 2B 05             BMI     RESTOR   RESTORE IF NEGATIVE
48CE 7C 002E           INC     T1       ELSE INC LS BCD WORD
48D1 20 F6             BRA     MORE1    CONTINUE SUBTRACTING
48D3 BD 4840 RESTOR    JSR     SUB7     RESTORE BINARY #
48D6 20 11             BRA     STOBCD   STORE BCD DIGIT
48D8 CE FF9C BIN3      LDX     #-100    PREPARE TO SUBT 100
48DB 20 EA             BRA     START1   GO DO 100'S
48DD CE FFF6 BIN2      LDX     #-10     PREPARE TO SUBT 10
48E0 20 E5             BRA     START1   GO DO 10'S
48E2 96 21   BIN1      LDA A   TP7+1    GET LS BCD DIGIT
48E4 9A 2E             ORA A   T1       COMBINE WITH LS BCD WORD
48E6 97 2E             STA A   T1       RESTORE THE RESULT
48E8 39                RTS              CONVERSION COMPLETE
48E9 96 1F   STOBCD    LDA A   TP6+1    GET LSB'S OF SUBT WORD
48EB 44                LSR A            SHIFT RIGHT FOR TEST
48EC C6 04             LDA B   #4       ACCB=ROTATE COUNT
48EE 0C      ROLLIT    CLC              CLEAR C FOR ROTATE
48EF 79 002E           ROL     T1       ROT LEFT LSW,C=B7
48F2 79 002D           ROL     T2       ROT LEFT MSW,B0=C
48F5 5A                DEC B            DEC ROTATE CNTR
48F6 26 F6             BNE     ROLLIT   4 ROTATES YET?
48F8 44                LSR A            SHIFT LSB TO C
48F9 25 E7             BCS     BIN1     C=1 MEANS 10'S DONE
48FB 44                LSR A            SHIFT AGAIN
48FC 25 DF             BCS     BIN2     C=1 MEANS 100'S DONE
48FE 20 D8             BRA     BIN3     1000'S DONE BY DEFAULT
                       NAM     CJUFLG
                       OPT     LIST,MEM
4880                   ORG     $4880
             *
             *    BRAD MILLER  3/4/74
             *
             *    USER FLAG SUBROUTINES
             *
             ***SET USER FLAG***
             *
             *THIS ROUTINE HAS 8 ENTRY POINTS, 1 FOR EACH
             *USER FLAG. ON ENTRY, ACCA MUST BE ZERO AND
             *THE CARRY BIT MUST BE SET.
             *
4880 49      SF8       ROL A            THE C BIT IS SET
4881 49      SF7       ROL A            AND ROTATED THRU ACCA
4882 49      SF6       ROL A            STOPPING AT THE
4883 49      SF5       ROL A            CORRECT POSITION FOR
4884 49      SF4       ROL A            EACH FLAG. B7=FLG 8
4885 49      SF3       ROL A            WHILE B0= FLG 1
4886 49      SF2       ROL A
4887 49      SF1       ROL A
4888 9A 08             ORA A   UFLG     "OR" IN THE USER FLG WORD
488A 97 08             STA A   UFLG     RESTORE NEW STATUS
488C 39                RTS              RETURN
             *
             *    CLEAR USER FLAG SUBROUTINE
             *
             *THIS ROUTINE HAS 8 ENTRY POINTS, 1 FOR
             *EACH USER FLAG. ON ENTRY, ACCA MUST BE
             *ZERO AND THE CARRY BIT MUST BE SET.
             *
488D 49      CF8       ROL A            THE C BIT IS
488E 49      CF7       ROL A            SET AND ROTATED
488F 49      CF6       ROL A            THRU ACCA STOPPING
4890 49      CF5       ROL A            AT THE CORRECT
4891 49      CF4       ROL A            LOCATION FOR EACH
4892 49      CF3       ROL A            FLAG. B7= FLG 8
4893 49      CF2       ROL A            WHILE B0= FLG 1
4894 49      CF1       ROL A
4895 43                COM A            1'S COMP ACCA
4896 94 08             AND A   UFLG     CLEAR THE FLAG
4898 97 08             STA A   UFLG     RESTORE THE FLAG WORD
489A 39                RTS              RETURN
             *
             *    IF FLAG SET SUBROUTINE
             *
             *THIS ROUTINE HAS 8 ENTRY POINTS, 1 FOR
             *EACH USER FLAG. ON ENTRY, ACCA MUST
             *BE ZERO AND THE CARRY BIT MUST BE SET
```

```
                  *
489B 49           IFS8    ROL A              THE C BIT IS
489C 49           IFS7    ROL A              SET AND ROTATED
489D 49           IFS6    ROL A              THRU ACCA STOPPING
489E 49           IFS5    ROL A              AT THE CORRECT
489F 49           IFS4    ROL A              LOCATION FOR EACH
48A0 49           IFS3    ROL A              FLAG. B7= FLG 8
48A1 49           IFS2    ROL A              WHILE B0= FLG 1
48A2 49           IFS1    ROL A
48A3 94 08                AND A   UFLG       ACCA=FLAG STATUS
48A5 27 01                BEQ     NOTSET     ACCA=0 IMPLIES NOT SET
48A7 39                   RTS                FLAG SET; RETURN
48A8 7E 48A8      NOTSET  JMP     NMET       GO MODIFY PRGM PNTR AND RETURN
                  *
                  *    IF FLAG CLEAR SUBROUTINE
                  *
                  *THIS ROUTINE HAS 8 ENTRY POINTS, 1 FOR
                  *EACH USER FLAG. ON ENTRY, ACCA MUST BE
                  *ZERO AND THE CARRY BIT MUST BE SET.
                  *
48AB 49           IFC8    ROL A              THE C BIT IS
48AC 49           IFC7    ROL A              SET AND ROTATED
48AD 49           IFC6    ROL A              THRU ACCA STOPPING
48AE 49           IFC5    ROL A              AT THE CORRECT
48AF 49           IFC4    ROL A              LOCATION FOR EACH
48B0 49           IFC3    ROL A              FLAG. B7= FLG 8
48B1 49           IFC2    ROL A              WHILE B0= FLG 1
48B2 49           IFC1    ROL A
48B3 94 08                AND A   UFLG       ACCA = FLAG STATUS
48B5 26 F1                BNE     NOTSET     ACCA#0 IMPLIES FLG SET
48B7 39                   RTS                NOT SET; RETURN
     48A8         NMET    EQU     $48A8
7C80                      ORG     $7C80
7C80 4887                 FDB     SF1
7C82 4886                 FDB     SF2
7C84 4885                 FDB     SF3
7C86 4884                 FDB     SF4
7C88 4883                 FDB     SF5
7C8A 4882                 FDB     SF6
7C8C 4881                 FDB     SF7
7C8E 4880                 FDB     SF8
7C90 48A2                 FDB     IFS1
7C92 48A1                 FDB     IFS2
7C94 48A0                 FDB     IFS3
7C96 489F                 FDB     IFS4
7C98 489E                 FDB     IFS5
7C9A 489D                 FDB     IFS6
7C9C 489C                 FDB     IFS7
7C9E 489B                 FDB     IFS8
7CA0 4894                 FDB     CF1
7CA2 4893                 FDB     CF2
7CA4 4892                 FDB     CF3
7CA6 4891                 FDB     CF4
7CA8 4890                 FDB     CF5
7CAA 488F                 FDB     CF6
7CAC 488E                 FDB     CF7
7CAE 488D                 FDB     CF8
7CB0 48B2                 FDB     IFC1
7CB2 48B1                 FDB     IFC2
7CB4 48B0                 FDB     IFC3
7CB6 48AF                 FDB     IFC4
7CB8 48AE                 FDB     IFC5
7CBA 48AD                 FDB     IFC6
7CBC 48AC                 FDB     IFC7
7CBE 48AB                 FDB     IFC8
                          END
```

SYMBOL TABLE

| | | | | | | | | | | | | | |
|---|---|---|---|---|---|---|---|---|---|---|---|---|---|
| ADATA | 0000 | ACTL | 0001 | BDATA | 0002 | BCTL | 0003 | INPUT | 0004 | TOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |

| | | | | | | | | | | | |
|---|---|---|---|---|---|---|---|---|---|---|---|
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 00BA | MT | 7E00 | TERMN7 | 003D | IMED | 0040 | PARCD | 00C0 |
| PAREX | 0080 | NTBL | 0000 | DOTS | 5EC0 | PRTDRV | 602D | FRMT | 5CA8 | BLANK | 5D75 |
| LDMSG | 57BD | ROLLD | 55B2 | ROLLU | 57F1 | PSD | 550A | TXL | 55E9 | STKUP | 55EF |
| MAD | 749B | CMP | 74AA | NOR | 7406 | TXW | 7424 | TXXR | 743B | EXXR | 7452 |
| APSR | 753B | OVUNF | 75B6 | OVERF | 75DD | XR0 | 740A | XRNINE | 75C8 | UNDRF | 75F1 |
| IMULT | 7649 | ODG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZERO0 | 7416 | XZERO2 | 7417 |
| RECIP | 73E6 | TXRX | 73F3 | CONST | 6800 | FPDBRC | 6898 | TAN | 68A9 | ATN | 69C3 |
| DSZERO | 6A46 | NTLN | 6A58 | EXPN | 6AC9 | SIN | 6894 | COS | 689A | ASIN | 6BF2 |
| ACOS | 6BF7 | PH1 | 6C5D | PH2 | 6C8D | PH3 | 6D34 | PH4 | 6DD0 | LSFT8 | 6E47 |
| SQRT | 6E65 | MAD8 | 6F2C | CMP8 | 53E4 | IOUPX | 6F52 | LOG10 | 6FA7 | YUPX | 6FE9 |
| RTOP | 732B | PTOR | 73B6 | RSEX | 4800 | ZIP | 4814 | BACK | 4816 | B6ON | 4818 |
| ZIP1 | 481B | B7ON | 4825 | SUB7 | 4840 | ADD7 | 484B | BINBCD | 48BC | START1 | 48C7 |
| MORE1 | 48C9 | RESTOR | 48D3 | BIN3 | 48D8 | BIN2 | 48DD | BIN1 | 48E2 | STOBCD | 48E9 |
| ROLLIT | 48EE | SF8 | 4880 | SF7 | 4881 | SF6 | 4882 | SF5 | 4883 | SF4 | 4884 |
| SF3 | 4885 | SF2 | 4886 | SF1 | 4887 | CF8 | 488D | CF7 | 488E | CF6 | 488F |
| CF5 | 4890 | CF4 | 4891 | CF3 | 4892 | CF2 | 4893 | CF1 | 4894 | IFS8 | 489B |
| IFS7 | 489C | IFS6 | 489D | IFS5 | 489E | IFS4 | 489F | IFS3 | 48A0 | IFS2 | 48A1 |
| IFS1 | 48A2 | NOTSET | 48AB | IFC8 | 48AB | IFC7 | 48AC | IFC6 | 48AD | IFC5 | 48AE |
| IFC4 | 48AF | IFC3 | 48B0 | IFC2 | 48B1 | IFC1 | 48B2 | NMET | 48A8 | | |

```
TOTAL ERRORS    4


****ERROR 201
 218   NAM IFEX
****ERROR 201
 360   NAM REGEX

00215                           OPT     LIST,MEM
00218                           NAM     IFEX
00219                           OPT     LIST,MEM
00220 48A4                      ORG     $48A4
00221                   *
00222                   *THIS ROUTINE DOES IF-, IF+, AND IF0
00223                   *
00224 48A4 91 92        IF0     CMP A   XR+2        XREG = 0 ?
00225 48A6 27 0C                BEQ     MET         BRANCH IF YES
00226 48A8 DE CA        NMET    LDX     UIP         ELSE GET INST PNTR
00227 48AA 08                   INX                 SKIP ONE INST
00228 48AB A6 00                LDA A   X           GET CURRENT INST
00229 48AD 81 BA                CMP A   #SDBB       TWO BYTE INSTRUCTION ?
00230 48AF 23 01                BLS     MET-2       BRANCH IF NOT
00231 48B1 08                   INX                 ELSE MOVE FORWARD
00232 48B2 DF CA                STX     UIP         RESTORE POINTER
00233 48B4 39           MET     RTS                 RETURN
00234                   *
00235 48B5 96 91        IFPLS   LDA A   XR+1        GET MANTISSA SIGN
00236 48B7 2B EF                BMI     NMET        NOT MET IF NEG.
00237 48B9 39                   RTS
00238                   *
00239 48BA 96 91        IFMI    LDA A   XR+1        GET MANTISSA SIGN
00240 48BC 2A EA                BPL     NMET        NOT MET IF POS.
00241 48BE 39                   RTS
00242                   *
00243 48BF DE 90        IFXEY   LDX     XR          GET X
00244 48C1 9C 98                CPX     YR          = Y ?
00245 48C3 26 E3                BNE     NMET        BRANCH IF NOT
00246 48C5 DE 92                LDX     XR+2        ELSE CONTINUE TEST
00247 48C7 9C 9A                CPX     YR+2
00248 48C9 26 DD                BNE     NMET
00249 48CB DE 94                LDX     XR+4
00250 48CD 9C 9C                CPX     YR+4
00251 48CF 26 D7                BNE     NMET
00252 48D1 DE 96                LDX     XR+6
00253 48D3 9C 9E                CPX     YR+6
```

```
4B05 26 D1              BNE     NMET
4B07 39                 RTS             RETURN IF CONDITION MET
                *
4BD8 4C         IFXGEY  INC A           SET "REVERSE SENSE" FLAG
4BD9 97 2E      IFXLTY  STA A   T1      0 TO LESS THAN FLAG
4BDB CE 0078            LDX     #AT1    PRESET INDEX
4BDE BD 73F3            JSR     TXRX    TRANSFER X REG
4BE1 CE 0098            LDX     #YR     PRESET INDEX
4BE4 BD 75F6            JSR     FPS     SUBTRACT
4BE7 96 91              LDA A   XR+1    GET MANTISSA SIGN
4BE9 D6 92              LDA B   XR+2    GET MANTISSA DIGITS
4BEB CE 0078            LDX     #AT1    PRESET INDEX
4BEE BD 743B            JSR     TXXR    RESTORE X REG
4BF1 4D                 TST A           TEST SIGN OF RESULT
4BF2 2B 08              BMI     NMET1   BRANCH IF NEG.
4BF4 5D                 TST B           ELSE TEST FOR ZERO
4BF5 27 05              BEQ     NMET1   BRANCH IF ZERO RESULT
4BF7 96 2E      MET1    LDA A   T1      GET SKIP FLAG
4BF9 26 AD              BNE     NMET    REVERSE SENSE IF SET
4BFB 39                 RTS             ELSE RETAIN SENSE
4BFC 96 2E      NMET1   LDA A   T1      NOT MET IF X>Y
4BFE 27 A8              BEQ     NMET    RETAIN SKIP SENSE
4C00 39                 RTS             ELSE REVERSE SENSE
                *
                *
                *THIS ROUTINE HANDLES EXECUTION OF ALL "FOR" STATEMENTS
                *
                *
4C01 CE 00E8    NEXTC   LDX     #CR     GET C-REG ADRS
4C04 DF 27              STX     T8      SAVE IT
4C06 CE 00F0            LDX     #DR     GET LOOP INC. ADRS
4C09 86 AB              LDA A   #$AB    GET "FOR C" INST
4C0B 20 11              BRA     NEXTJ   SAVE THEM
4C0D CE 00E0    NEXTB   LDX     #BR     GET B-REG ADRS
4C10 86 AA              LDA A   #$AA    GET "FOR B" INST
4C12 20 05              BRA     NEXTI   SAVE THEM
4C14 CE 00D8    NEXTA   LDX     #AR     GET A-REG ADRS
4C17 86 AC              LDA A   #$AC    GET "FOR A" INST
4C19 DF 27      NEXTI   STX     T8      SAVE LOOP VARIABLE ADRS
4C1B CE 6838            LDX     #FP1    GET LOOP INCREMENT
4C1E DF 2D      NEXTJ   STX     T2      SAVE LOOP INC. ADRS
4C20 97 29              STA A   T6      SAVE "FOR" INST
4C22 CE 0078            LDX     #AT1    GET ARITH TEMP ADRS
4C25 BD 73F3            JSR     TXRX    TRANSFER X-REG
4C28 DE 2D              LDX     T2      GET LOOP INC. ADRS
4C2A BD 743B            JSR     TXXR    MOVE IT TO X-REG
4C2D DE 27              LDX     T8      GET LOOP VARIABLE ADRS
4C2F BD 75FC            JSR     FPA     ADD THE "1"
4C32 DE 27              LDX     T8      RESTORE LOOP VAR. ADRS
4C34 BD 73F3            JSR     TXRX    REPLACE WITH UPDATED NUMBER
4C37 D6 0A              LDA B   EOM     GET END OF MEMORY PNTR
4C39 5A                 DEC B           DEC PAGE ADRS
4C3A D7 1C              STA B   TP5     SAVE IT
4C3C DE CA              LDX     UIP     GET INST PNTR
4C3E E6 00              LDA B   X       GET THE "NEXT" INST
4C40 C0 AD              SUB B   #$AD    REMOVE OFFSET
4C42 58                 ASL B           MULTIPLY BY 2
4C43 58                 ASL B           MULTIPLY BY FOUR
4C44 58                 ASL B
4C45 CB D8              ADD B   #$D8    ADD ALPHA REG OFFSET
4C47 D7 1D              STA B   TP5S    SAVE IN LS BITS OF PNTR
4C49 DE 1C              LDX     TP5     GET ALPHA REG PNTR
4C4B BD 75F6            JSR     FPS     DO THE "END OF LOOP" CHECK
4C4E 96 91              LDA A   XR+1    GET SIGN OF RESULT
4C50 D6 92              LDA B   XR+2    GET MANTISSA DIGITS
4C52 CE 0078            LDX     #AT1    GET X-REG TEMP ADRS
4C55 BD 743B            JSR     TXXR    RESTORE X-REG
4C58 5D                 TST B           ZERO RESULT ?
4C59 27 07              BEQ     MOREL   CONTINUE IF YES
4C5B DE 2D              LDX     T2      GET LOOP INC. ADRS
4C5D A8 01              EOR A   1,X     SIGNS DIFFER ?
4C5F 2A 01              BPL     MOREL   CONTINUE IF NOT
4C61 39                 RTS             ELSE RETURN
```

```
4C62 DE CA    MOREL  LDX    UIP       GET CURRENT USER ADRS
4C64 D6 29           LDA B  T6        GET "FOR" INST FOR SEARCH
4C66 8C 0100  MOREL1 CPX    #256      USER STATE ZERO YET ?
4C69 27 08           BEQ    FEROR     ERROR IF YES
4C6B 09              DEX              ELSE DEC SEARCH PNTR
4C6C E1 00           CMP B  X         IS THIS THE "FOR" STMT ?
4C6E 26 F6           BNE    MOREL1    BRANCH IF NOT
4C70 DF CA           STX    UIP       ELSE SAVE NEW INST ADRS
4C72 39              RTS              RETURN
4C73 86 0D    FEROR  LDA A  #13       LOAD ERROR
4C75 97 06           STA A  ERROR     SAVE IT FOR OUTPUT
4C77 39       FORS   RTS              RETURN
              *
              *
     6838     FP1    EQU    $6838     FLOATING POINT "1"
              *
              *
7C62                 ORG    $7C62
7C62 4BB5            FDB    IFPLS
7C64 4BBA            FDB    IFMI
7C66 4BA4            FDB    IF0
7C68 4BBF            FDB    IFXEY
7C6A 4BD9            FDB    IFXLTY
7C6C 4BD8            FDB    IFXGEY
7D54                 ORG    $7D54
7D54 4C77            FDB    FORS
7D56 4C77            FDB    FORS
7D58 4C77            FDB    FORS
7D5A 4C14            FDB    NEXTA
7D5C 4C0D            FDB    NEXTB
7D5E 4C01            FDB    NEXTC
                     NAM    REGEX
                     OPT    LIST.MEM
4C78                 ORG    $4C78
              *
              *THIS ROUTINE HANDLES ALL 78 OF THE STORAGE
              *REGISTER INSTRUCTIONS. THIS INCLUDES REG. ARITHMETIC.
              *INDIRECTS, ETC. FOR ALL RECALL INSTRUCTIONS.
              *THE X REGISTER IS COPIED TO LAST X. TP7,T1,T2,
              *AND T3 ARE USED BY THIS ROUTINE. THE FLOATING
              *POINT ROUTINES ARE CALLED IF NECESSARY.
              *
4C78 4C       DVDENT INC A            ENTRY PT. FOR DIVISION
4C79 4C       MLTENT INC A            ENTRY PT. FOR MULTIPLICATION
4C7A 4C       SUBENT INC A            ENTRY PT. FOR SUBTRACTION
4C7B 4C       ADDENT INC A            ENTRY PT FOR ADDITION
4C7C 97 2E    STOENT STA A  T1        SAVE ARITHMETIC OPERATOR
4C7E 5F              CLR B
4C7F 20 09           BRA    RENT      CLEAR RECALL FLAG
4C81 91 0F    RCLENT CMP A  DIGFLG    DOING DIGIT ENTRY ?
4C83 27 05           BEQ    RENT      BRANCH IF NOT
4C85 97 0F           STA A  DIGFLG    ELSE TERM. IT
4C87 43              COM A            SET MSB
4C88 97 0D           STA A  STKFLG    ENABLE LIFT
4C8A D7 20    RENT   STA B  T2        SET UP RECALL FLAG
4C8C DE CA           LDX    UIP       GET INST ADDRESS
4C8E E6 00           LDA B  X         GET THE INSTRUCTION
4C90 17              TBA              SAVE IN ACCA
4C91 97 2C           STA A  T3        AND IN T3
4C93 C1 C7           CMP B  #@307     ALPHA REGISTER?
4C95 22 32           BHI    NUMRIC    BRANCH IF NOT
4C97 C1 C1           CMP B  #@301     ONE OR TWO BYTE ?
4C99 22 09           BHI    TWOBT     BRANCH IF TWO BYTE
4C9B 80 64           SUB A  #$64      REMOVE INST OFFSET
4C9D BD 5CA8         JSR    FRMT      CONVERT TO BCD
4CA0 84 0F           AND A  #$F       GET REG #
4CA2 20 04           BRA    IADRS     CONVERT TO R/W ADDRESS
4CA4 A6 01    TWOBT  LDA A  1,X       GET SECOND BYTE
4CA6 80 64           SUB A  #100      REMOVE OFFSET
4CA8 81 05    IADRS  CMP A  #5        REG IN USER MEMORY ?
4CAA 2C 07           BGE    USMEM     BRANCH IF YES
4CAC CE 00D8         LDX    #AR       ELSE GET BASE PAGE ADRS
4CAF DF 20           STX    TP7       SAVE FOR MODIFICATION
4CB1 20 08           BRA    GEN       GO GENERATE ADDRESS
4CB3 D6 0A    USMEM  LDA B  EOM       GET END OF MEM PAGE
4CB5 5A              DEC B            BACK UP ONE
```

```
00405 4CB6 D7 20             STA B  TP7        SAVE IN MS BITS OF ADRS
00406 4CB8 C6 D8             LDA B  #$D8       GET ADRS ON PAGE
00407 4CBA D7 21             STA B  TP7+1      SAVE IN LS BITS OF ADRS
00408 4CBC 80 05             SUB A  #5         REMOVE OFFSET
00409 4CBE 48         GEN    ASL A             MULTIPLY REG # BY 8
00410 4CBF 48                ASL A
00411 4CC0 48                ASL A
00412 4CC1 9B 21             ADD A  TP7+1      ADD TO ADDRESS
00413 4CC3 97 21             STA A  TP7+1      RESTORE
00414 4CC5 DE 20             LDX    TP7        INDEX=ADDRESS
00415 4CC7 20 0A             BRA    VALID      CONTINUE
00416 4CC9 A6 01      NUMRIC LDA A  1,X        GET SECOND BYTE
00417 4CCB 48                ASL A             SHIFT ADRS TO B7
00418 4CCC 57                ASR B             MSB TO CARRY
00419 4CCD 46                ROR A             CARRY TO B7
00420 4CCE BD 4D5B           JSR    SADRS      GO GENERATE SYSTEM ADDRESS
00421 4CD1 26 26             BNE    OVFLO      BRANCH IF ERROR
00422 4CD3 D6 2C      VALID  LDA B  T3         GET THE INST
00423 4CD5 C1 D3             CMP B  #@323      POSSIBLE INDIRECT?
00424 4CD7 22 08             BHI    INDR       BRANCH IF YES
00425 4CD9 C1 C7             CMP B  #@307      POSSIBLE INDIRECT?
00426 4CDB 22 21             BHI    INSTYP     BRANCH IF NOT
00427 4CDD C1 C1             CMP B  #@301      POSSIBLE INDIRECT?
00428 4CDF 23 1D             BLS    INSTYP     BRANCH IF NOT
00429 4CE1 4F         INDR   CLR A             PRESET FOR REG 0
00430 4CE2 E6 00             LDA B  X          GET REG EXPONENT
00431 4CE4 2B 0E             BMI    REG0       REG 0 IF NEG
00432 4CE6 5C                INC B             ACCB=# OF DIGITS
00433 4CE7 C1 03             CMP B  #3         GREATER THAN 3?
00434 4CE9 2E 0E             BGT    OVFLO      BRANCH IF YES
00435 4CEB BD 49CE           JSR    TSFR       GO GENERATE NEW ADRS
00436 4CEE 96 20             LDA A  TP7        GET MS BINARY
00437 4CF0 26 07             BNE    OVFLO      ERROR IF NON-ZERO
00438 4CF2 96 21             LDA A  TP7+1      GET LS BINARY
00439 4CF4 BD 4D5B REG0      JSR    SADRS      GENERATE SYSTEM ADRS
00440 4CF7 27 05             BEQ    INSTYP     BRANCH IF NO ERROR
00441 4CF9 86 18      OVFLO  LDA A  #24        LOAD ERROR
00442 4CFB 97 06             STA A  ERROR      SAVE IN ERROR WORD
00443 4CFD 39                RTS               RETURN
00444 4CFE 96 2D      INSTYP LDA A  T2         GET RECALL FLAG
00445 4D00 27 19             BEQ    STOINS     0 IMPLIES STORE INST.
00446 4D02 DF 1E             STX    TP6        SAVE REG ADDRESS
00447 4D04 BD 55E9           JSR    TXL        X TO LAST X
00448 4D07 BD 55EF           JSR    STKUP      STACK UP ?
00449 4D0A DE 1E             LDX    TP6        RESTORE REG ADDRESS
00450 4D0C BD 743B           JSR    TXXR       DO THE RECALL
00451 4D0F D6 2C      PCHEK  LDA B  T3         GET THE INSTRUCTION
00452 4D11 C1 BA             CMP B  #$DBB      TWO BYTE INSTRUCTION ?
00453 4D13 23 05             BLS    DDONE      BRANCH IF YES
00454 4D15 DE CA      LBLEX  LDX    UIP        GET INST PNTR
00455 4D17 08                INX               INC TO SKIP 2ND BYTE
00456 4D18 DF CA             STX    UIP        RESTORE IT
00457 4D1A 39         DDONE  RTS               RETURN
00458 4D1B 96 2E      STOINS LDA A  T1         GET ARITHMETIC FLAG
00459 4D1D 27 34             BEQ    NOARI      0 IMPLIES NO ARITHMETIC
00460 4D1F DF 20             STX    TP7        SAVE REG ADRS
00461 4D21 CE 0078           LDX    #AT1       GET ARITH. TEMP. ADRS
00462 4D24 BD 73F3           JSR    TXRX       TRANSFER X TO TEMP.
00463 4D27 DE 20             LDX    TP7        GET REG ADRS
00464 4D29 96 2E             LDA A  T1         GET OPERATION FLAG
00465 4D2B 4A                DEC A             =1?
00466 4D2C 27 15             BEQ    REGADD     YES; DO ADDITION
00467 4D2E 4A                DEC A             =2?
00468 4D2F 27 0D             BEQ    REGSUB     YES; DO SUBTRACTION
00469 4D31 4A                DEC A             =3?
00470 4D32 27 05             BEQ    REGMLT     YES; DO MULTIPLICATION
00471 4D34 BD 7793           JSR    FPD        DIVISION BY DEFAULT
00472 4D37 20 0D             BRA    MDONE      GO WRAP IT UP!
00473 4D39 BD 7735 REGMLT    JSR    FPM        MULTIPLY
00474 4D3C 20 08             BRA    MDONE      WRAP IT UP!
00475 4D3E BD 75F6 REGSUB    JSR    FPS        SUBTRACT
00476 4D41 20 03             BRA    MDONE      WRAP IT UP!
00477 4D43 BD 75FC REGADD    JSR    FPA        ADD
00478 4D46 DE 20      MDONE  LDX    TP7        GET REG ADRS
00479 4D48 BD 73F3           JSR    TXRX       STORE THE F.P. NUMBER
00480 4D4B CE 0078           LDX    #AT1       GET TEMP. ADRS
```

```
4D4E BD 743B          JSR    TXXR       RESTORE X REG.
4D51 20 BC            BRA    PCHEK      GO CHECK PRGM CNTR
4D53 BD 73F3 NOARI    JSR    TXRX       STORE THE NUMBER
4D56 20 B7            BRA    PCHEK      GO CHECK PRGM CNTR
                *
                *THIS SUBROUTINE CONVERTS A NUMERIC REGISTER ADDRESS
                *TO THE ACTUAL R/W ADDRESS OF THAT REGISTER. IT
                *THEN CHECKS FOR VALIDITY GENERATING ERROR 7 IF
                *INVALID AND CLEARING ACCA IF VALID. THE ADDRESS
                *IS RETURNED IN THE INDEX REGISTER.
                *ON ENTRY, ACCA=THE REGISTER ADDRESS
                *
4D58 5F          SADRS CLR B                ZERO TO ACCB
4D59 48                ASL A                MULTIPLY THE REGISTER
4D5A 59                ROL B                ADDRESS BY 8 BY
4D5B 48                ASL A                SHIFTING LEFT
4D5C 59                ROL B                3 TIMES.
4D5D 48                ASL A
4D5E 59                ROL B
4D5F 8B 08             ADD A  #8            ADD 8 TO THE RESULT
4D61 C9 00             ADC B  #0            ADD CARRY TO MSB'S
4D63 D7 1E             STA B  TP6           SAVE RESULT FOR SUBTRACT
4D65 97 1F             STA A  TP6S
4D67 DE 54             LDX    SPGM          GET REG START ADRS
4D69 DF 20             STX    TP7           SAVE FOR SUBTRACT
4D6B BD 4840           JSR    SUB7          DO EOM-REG ADRS
4D6E DE 20             LDX    TP7           GET RESULT
4D70 DF 1C             STX    TP5           SAVE FOR LATER
4D72 DE 0B             LDX    EOPM          GET END OF PRGM MEM
4D74 DF 1E             STX    TP6           PREPARE TO SUBTRACT
4D76 BD 4840           JSR    SUB7          DO REG ADRS-EOPM
4D79 2A 04             BPL    SAD1          BRANCH IF NO ERROR
4D7B 86 18             LDA A  #24           LOAD ERROR
4D7D 20 0F             BRA    ERR+2         SAVE THE ERROR AND RETURN
4D7F DE 1C       SAD1  LDX    TP5           INDEX=VALID ADDRESS
4D81 4F                CLR A                NO ERROR; CLR ACCA
4D82 39                RTS                  RETURN
                 *
4D83 D6 90       REGS  LDA B  XR            GET X-REG EXPONENT
4D85 2B 0A             BMI    REGZ          ZERO REGS IF NEG
4D87 5C                INC B                ACCB=# OF DIGITS
4D88 C1 03             CMP B  #3            TOO MANY ?
4D8A 2F 0B             BLE    OK            BRANCH IF NOT
4D8C 86 07       ERR   LDA A  #7            LOAD ERROR
4D8E 97 06             STA A  ERROR         SAVE IT
4D90 39                RTS                  RETURN
4D91 DE 54       REGZ  LDX    SPGM          GET REG START ADRS
4D93 DF 1C             STX    TP5           SAVE IT
4D95 20 2A             BRA    OLD           GO ERASE BETWEEN PNTRS
4D97 CE 0090 OK        LDX    #XR           GET X-REG ADDRESS
4D9A BD 49CE           JSR    TSFR          CONVERT X-REG
4D9D 96 20             LDA A  TP7           GET MS BITS OF RESULT
4D9F D6 21             LDA B  TP7+1         GET LS BITS
4DA1 58                ASL B                MULTIPLY RESULT BY 8
4DA2 49                ROL A
4DA3 58                ASL B
4DA4 49                ROL A
4DA5 58                ASL B
4DA6 49                ROL A
4DA7 97 1E             STA A  TP6           SAVE MS BITS
4DA9 D7 1F             STA B  TP6+1         SAVE LS BITS
4DAB DE 54             LDX    SPGM          GET REG START ADRS
4DAD DF 20             STX    TP7           SAVE FOR SUBTRACT
4DAF BD 4840           JSR    SUB7          SUBTRACT (EOM-REG ADRS)
4DB2 2F D8             BLE    ERR           ERROR IF PAGE IS 0 OR NEG
4DB4 DE 20             LDX    TP7           GET RESULT
4DB6 DF 1C             STX    TP5           SAVE IT
4DB8 DE 0B             LDX    EOPM          GET OLD PNTR
4DBA DF 1E             STX    TP6           SAVE FOR SUBTRACT
4DBC BD 4840           JSR    SUB7          DO NEW-OLD
4DBF 2B 0C             BMI    NEW           BRANCH IF NEG RESULT
4DC1 DE 0B       OLD   LDX    EOPM          GET OLD EOPM
4DC3 DF 1E             STX    TP6           SAVE IT
4DC5 DE 1C             LDX    TP5           GET NEW EOPM
4DC7 DF 0B             STX    EOPM          SAVE IT
```

```
00556 4DC9 DE 1E            LDX     TP6         GET OLD EOPM
00557 4DCB 20 25            BRA     LOOP        ERASE
00558 4DCD DE 1C     NEW    LDX     TP5         GET NEW EOPM
00559 4DCF 8C 0100          CPX     #$100       USER STATE 0 ?
00560 4DD2 27 B8            BEQ     ERR         ERROR IF YES
00561 4DD4 CE 00CA          LDX     #UIP        GET INST PNTR ADRS
00562 4DD7 D6 09            LDA B   RSFLG       GET R/S FLAG
00563 4DD9 58               ASL B               RUNNING ?
00564 4DDA 2B 02            BMI     RUNING      BRANCH IF YES
00565 4DDC 09               DEX                 ELSE GET PRGM PNTR ADRS
00566 4DDD 09               DEX
00567 4DDE A6 01     RUNING LDA A   1,X         DO PNTR-TP5
00568 4DE0 90 1D            SUB A   TP5S
00569 4DE2 A6 00            LDA A   X
00570 4DE4 92 1C            SBC A   TP5
00571 4DE6 2B 08            BMI     OK1         OK IF PNTR<TP5
00572 4DE8 5D               TST B               ELSE CHECK RUN/STOP
00573 4DE9 2B A1            BMI     ERR         ERROR IF RUNNING
00574 4DEB CE 0100          LDX     #256        ELSE SET UPP TO 0
00575 4DEE DF C8            STX     UPP
00576 4DF0 DE 1C     OK1    LDX     TP5         GET NEW EOPM
00577 4DF2 9C 0B     LOOP   CPX     EOPM        ALL ERASED ?
00578 4DF4 27 05            BEQ     OUT         BRANCH IF YES
00579 4DF6 6F 00            CLR     X           CLEAR MEMORY
00580 4DF8 08               INX                 INC PNTR
00581 4DF9 20 F7            BRA     LOOP        CONTINUE
00582 4DFB DE 1C     OUT    LDX     TP5         GET NEW EOPM
00583 4DFD DF 0B            STX     EOPM        SAVE IT
00584 4DFF 09               DEX                 BACK UP
00585 4E00 A6 00            LDA A   X           GET INST THERE
00586 4E02 81 BA            CMP A   #SDBB       TWO BYTE INSTRUCTION ?
00587 4E04 23 02            BLS     OUT2        BRANCH IF NOT
00588 4E06 6F 00            CLR     X           ELSE NOP TO LAST STATE
00589 4E08 39        OUT2   RTS                 RETURN
00590                *
00591      484B      ADD7   EQU     $484B
00592      4840      SUB7   EQU     $4840
00593 7C70                  ORG     $7C70
00594 7C70 4D93             FDB     REGS
00595      49CE      TSFR   EQU     $49CE
00596 7CC8                  ORG     $7CC8
00597 7CC8 4C7C             FDB     STOENT,STOENT,STOENT,STOENT,STOENT
00598 7CD2 4C7C             FDB     STOENT,STOENT,STOENT,STOENT,STOENT
00599 7CDC 4C7B             FDB     ADDENT,ADDENT,ADDENT,ADDENT,ADDENT
00600 7CE6 4C7B             FDB     ADDENT,ADDENT,ADDENT,ADDENT,ADDENT
00601 7CF0 4C7A             FDB     SUBENT,SUBENT,SUBENT,SUBENT,SUBENT
00602 7CFA 4C7A             FDB     SUBENT,SUBENT,SUBENT,SUBENT,SUBENT
00603 7D04 4C79             FDB     MLTENT,MLTENT,MLTENT,MLTENT,MLTENT
00604 7D0E 4C79             FDB     MLTENT,MLTENT,MLTENT,MLTENT,MLTENT
00605 7D18 4C78             FDB     DVDENT,DVDENT,DVDENT,DVDENT,DVDENT
00606 7D22 4C78             FDB     DVDENT,DVDENT,DVDENT,DVDENT,DVDENT
00607 7D2C 4C81             FDB     RCLENT,RCLENT,RCLENT,RCLENT,RCLENT
00608 7D36 4C81             FDB     RCLENT,RCLENT,RCLENT,RCLENT,RCLENT
00609 7D84                  ORG     $7D84
00610 7D84 4C81             FDB     RCLENT
00611 7D86 4C7C             FDB     STOENT
00612 7D88 4C7B             FDB     ADDENT
00613 7D8A 4C7A             FDB     SUBENT
00614 7D8C 4C79             FDB     MLTENT
00615 7D8E 4C78             FDB     DVDENT
00616 7D90 4C7C             FDB     STOENT,STOENT
00617 7D94 4C7B             FDB     ADDENT,ADDENT
00618 7D98 4C7A             FDB     SUBENT,SUBENT
00619 7D9C 4C79             FDB     MLTENT,MLTENT
00620 7DA0 4C78             FDB     DVDENT,DVDENT
00621 7DA4 4C81             FDB     RCLENT,RCLENT
00622 7DA8 4C81             FDB     RCLENT,RCLENT
00623 7DAC 4C7C             FDB     STOENT,STOENT
00624 7DB0 4C7B             FDB     ADDENT,ADDENT
00625 7DB4 4C7A             FDB     SUBENT,SUBENT
00626 7DB8 4C79             FDB     MLTENT,MLTENT
00627 7DBC 4C78             FDB     DVDENT,DVDENT
00628 7D7E                  ORG     $7D7E
00629 7D7E 4D15             FDB     LBLEX
00632                       END
```

SYMBOL TABLE

```
ADATA  0000 ACTL   0001 BDATA  0002 BCTL   0003 INPUT  0004 IOIN   0005
ERROR  0006 TGL    0007 UFLG   0008 RSFLG  0009 EOM    000A EOPM   000B
STKFLG 000D RND    000E DIGFLG 000F W2     0010 W1     0011 SFLG   0012
DCNTR  0013 TP1    0014 TP1S   0015 TP2    0016 TP2S   0017 TP3    0018
TP3S   0019 TP4    001A TP4S   001B TP5    001C TP5S   001D TP6    001E
TP6S   001F TP7    0020 TP7S   0021 T13    0022 T12    0023 T11    0024
T10    0025 T9     0026 T8     0027 T7     0028 T6     0029 T5     002A
T4     002B T3     002C T2     002D T1     002E ISTK   002F ISTACK 0051
TA     0052 SPGM   0054 EXTRA  0056 BUFF   0058 REAL   0068 IMAG   0070
AT1    0078 AT2    0080 W      0088 XR     0090 YR     0098 ZR     00A0
TR     00A8 LSTX   00B0 BKWRT  00B8 BKKC   00BA SOL7   00C6 UPP    00C8
UIP    00CA ALPHA  00CC IO1    00CD IO2    00D0 IT7    00D3 FLAG   00D5
TPOS   00D6 FILE   00D7 AR     00D8 BR     00E0 CR     00E8 DR     00F0
ER     00F8 SDBR   00BA MT     7E00 TERMN7 003D IMED   0040 PARCD  00C0
PAREX  0080 NTBL   0000 DOTS   5EC0 PRTDPV 602D FRMT   5CA8 BLANK  5D75
LDMSG  579D ROLLD  55B2 ROLLU  57F1 PSD    55DA TXL    55E9 STKUP  55EF
MAD    749B CMP    74AA NOR    7406 TXW    7424 TXXR   743B EXXR   7452
ARSR   753B OVUNF  75B6 OVERF  750D XR0    740A XRNINE 75C8 UNDRF  75F1
IMULT  76B9 ODG    7669 FPA    75FC FPS    75F6 FPM    7735 FPD    7793
FPAEX  763D FPMEX  7780 LSHIFT 7521 ZEROX  7489 XZEROQ 7416 XZERO2 7417
RECIP  73E6 TXRX   73F3 CONST  6800 FPDBRC 689B TAN    68A9 ATN    69C3
DSZERO 6A46 NTLN   6A58 EXPN   6AC9 SIN    6B94 COS    6B9A ASIN   6BF2
ACOS   6BF7 PH1    6C5D PH2    6C8D PH3    6D34 PH4    6DD0 LSFT8  6E47
SQRT   6E65 MAD8   6F2C CMP8   53E4 IOUPX  6F52 LOG10  6FA7 YUPX   6FE9
RTOP   732B PTOR   7386 IF0    4BA4 NMET   4BA8 MET    4BB4 IFPLS  4BB5
IFMI   4BBA IFXEY  4BBF IFXGEY 4BD8 IFXLTY 4BD9 MET1   4BF7 NMET1  4BFC
NEXTC  4C01 NEXTB  4C0D NEXTA  4C14 NEXTI  4C19 NEXTJ  4C1E MOREL  4C62
MOREL1 4C66 FEROR  4C73 FORS   4C77 FP1    6838 DVDENT 4C78 MLTENT 4C79
SUBENT 4C7A ADDENT 4C7B STOENT 4C7C RCLENT 4C81 RENT   4C84 TWOBT  4CA4
IADRS  4CA8 USMEM  4CB3 GEN    4CBE NUMRIC 4CC9 VALID  4CD3 INDR   4CE1
REG0   4CF4 OVFLO  4CF9 INSTYP 4CFE PCHEK  4D0F LBLEX  4D15 DDONE  4D1A
STOINS 4D1B REGMLT 4D39 REGSUB 4D3E REGADD 4D43 MDONE  4D46 NOARI  4D53
SADRS  4D58 SAD1   4D7F REGS   4D83 ERR    4D8C REGZ   4D91 OK     4D97
OLD    4DC1 NEW    4DCD RUNING 4DDE OK1    4DF0 LOOP   4DF2 OUT    4DFB
OUT2   4E08 ADD7   484B SUB7   4840 TSFR   49CE
```

TOTAL ERRORS 2

```
****ERROR 201
 218  NAM EDIT
****ERROR 201
 472  NAM STEP

00215                       OPT    LIST,MEM
00218                       NAM    EDIT
00219                       OPT    LIST,MEM
00220 4EC8                  ORG    $4EC8
00221                *
00222                *THIS ROUTINE CONTAINS ALL CODE FOR ALL EDITTING
00223                *FUNCTIONS ON CJ.
00224                *
00225      4840      SUB7   EQU    $4840
00226      484B      ADD7   EQU    $484B
00227      797B      BWM    EQU    $797B
00228      7B40      ERROR7 EQU    $7B40
00229      0080      TB     EQU    AT2
00230      0082      AFFECT EQU    AT2+2
00231      0084      FIELD  EQU    AT2+4
00232 4EC8 86 16     STCOD7 LDA A  #22         PRESET ACCA FOR POSSIBLE ERROR
00233 4ECA D6 D5            LDA B  FLAG        GET "MEMORY SECURE" INFO
00234 4ECC 54               LSR B              MOVE SECURE BIT TO CARRY
00235 4ECD 25 11            BCS    STC10       BRANCH IF MEMORY SECURED
00236 4ECF DE C8            LDX    UPP         ELSE LOAD PRGM PNTR
00237 4ED1 96 C7            LDA A  SOL7+1      GET INST TO BE STORED
00238 4ED3 16               TAB                SAVE IT IN ACCB
00239 4ED4 2B 0E            BMI    STC1        BRANCH IF ONE BYTE INST
00240 4ED6 08               INX                ELSE BUMP PRGM PNTR
00241 4ED7 9C 0B            CPX    EOPM        END OF MEMORY ?
00242 4ED9 26 08            BNE    STC0        BRANCH IF NOT
00243 4EDB 7F 00CC          CLR    ALPHA       RESET POSSIBLE ALPHA
00244 4EDE 86 07     STC7   LDA A  #7          LOAD MEM OVFLO ERROR
```

```
4EE0 97 06   STC10  STA A  ERROR    SAVE THE ERROR NUMBER
4EE2 39             RTS             RETURN
4EE3 09      STC0   DEX             BACK UP
4EE4 96 52   STC1   LDA A  TA       INSERT MODE SET ?
4EE6 27 2E          BEQ    STC2     BRANCH IF NOT
4EE8 5D             TST B           TWO BYTE INST ?
4EE9 2B 03          BMI    STC3     BRANCH IF NOT
4EEB BD 4FC7        JSR    INSRT    DROP MEMORY
4EEE BD 4FC7 STC3   JSR    INSRT    DROP MEMORY
4EF1 DE C8   STC9   LDX    UPP      GET INST PNTR
4EF3 96 C6          LDA A  SOL7     GET INST
4EF5 A7 00          STA A  X        SAVE FIRST BYTE
4EF7 96 C7          LDA A  SOL7+1   GET 2ND BYTE
4EF9 2B 02          BMI    STC4     BRANCH IF NO 2ND BYTE
4EFB A7 01          STA A  1,X      ELSE STORE 2ND BYTE
4EFD 4F      STC4   CLR A           CLEAR ACCA FOR KEYLOG
4EFE DE C8          LDX    UPP      GET PRGM PNTR
4F00 D6 07          LDA B  TGL      GET TOGGLES
4F02 C5 60          BIT B  #$60     KEYLOG MODE SET ?
4F04 27 03          BEQ    STC5     BRANCH IF NOT
4F06 7E 590A        JMP    KEYLOG   DO KEYLOG AND RETURN
4F09 D6 C7   STC5   LDA B  SOL7+1   CHECK THE CURRENT INST.
4F0B 2B 01          BMI    STC6     BRANCH IF ONE BYTE
4F0D 08             INX             ELSE BUMP PNTR
4F0E 08      STC6   INX             BUMP PNTR
4F0F 9C 08          CPX    EOPM     END OF MEMORY ?
4F11 27 C8          BEQ    STC7     BRANCH IF YES
4F13 DF C8          STX    UPP      ELSE SAVE NEW PRGM POINTER
4F15 39             RTS             RETURN
4F16 5D      STC2   TST B           2-BYTE INST ?
4F17 2A 12          BPL    STC8     BRANCH IF YES
4F19 A6 00          LDA A  X        ELSE CHECK INST IN MEMORY
4F1B 81 BA          CMP A  #SDBB    TWO BYTE INSTRUCTION ?
4F1D 23 D2          BLS    STC9     BRANCH IF YES
4F1F DF 82          STX    AFFECT   ELSE SAVE DELETE PNTR
4F21 BD 4FEC        JSR    DEL      RAISE MEMORY
4F24 CE FFFF        LDX    #-1      PRESET INDEX
4F27 8D 67          BSR    DMODO    MODIFY THE ADDRESSES
4F29 20 C6          BRA    STC9     CONTINUE
4F2B A6 00   STC8   LDA A  X        GET CURRENT INST IN MEMORY
4F2D 81 BA          CMP A  #SDBB    TWO BYTE INSTRUCTION ?
4F2F 22 C0          BHI    STC9     BRANCH IF YES
4F31 A6 01          LDA A  1,X      ELSE GET FOLLOWING INST
4F33 27 BC          BEQ    STC9     BRANCH IF IT IS A NOP
4F35 BD 4FC7        JSR    INSRT    ELSE DROP MEMORY
4F38 96 C6          LDA A  SOL7     GET INST TO BE STORED
4F3A A7 00          STA A  X        STORE IT
4F3C 96 C7          LDA A  SOL7+1   GET 2ND BYTE
4F3E A7 01          STA A  1,X      STORE IT
4F40 08             INX             PRESET INDEX
4F41 DF 52          STX    TA       SAVE "INSERT START"
4F43 08             INX             GET "INSERT END"
4F44 DF 80          STX    TB       SAVE IT ALSO
4F46 BD 500C        JSR    AMOD     MODIFY THE ADDRESSES
4F49 20 B2          BRA    STC4     CONTINUE
             *
             *
4F4B D6 05   INSERT LDA B  FLAG     PROTECTED MEMORY ?
4F4D 54             LSR B
4F4E 25 08          BCS    BACK     RETURN IF YES
4F50 96 52          LDA A  TA       INSERTING ?
4F52 26 07          BNE    TERM     TERMINATE IF SET
4F54 DE C8          LDX    UPP      GET CURRENT USER ADRS
4F56 DF 52          STX    TA       SAVE FOR INSERT START
4F58 7E 797B BACK   JMP    BWM      RETURN TO SUPV
4F5B BD 52F4 TERM   JSR    STEP1    TERMINATE THE INSERT
4F5E 20 F8          BRA    BACK     RETURN
             *
             *
4F60 D6 05   DELETE LDA B  FLAG     PROTECTED MEMORY ?
4F62 54             LSR B
4F63 25 F3          BCS    BACK     RETURN IF YES
4F65 96 52          LDA A  TA       INSERTING ?
4F67 26 EF          BNE    BACK     IGNORE IF YES
4F69 DE C8          LDX    UPP      GET PRGM PNTR
4F6B DF 82          STX    AFFECT   SAVE CURRENT ADRS
```

```
4F6D A6 00           LDA A   X         GET INST
4F6F 97 2E           STA A   T1        SAVE CURRENT INST
4F71 81 BA           CMP A   #$DBB     TWO BYTE INSTRUCTION ?
4F73 23 03           BLS     OBYTE     BRANCH IF NOT
4F75 BD 4FEC         JSR     DEL       RAISE MEMORY
4F78 BD 4FEC OBYTE   JSR     DEL       RAISE MEMORY
4F7B CE FFFF         LDX     #-1       INITIALIZE INDEX
4F7E 96 2E           LDA A   T1        GET INST DELETED
4F80 81 BA           CMP A   #$DBB     TWO BYTE INSTRUCTION ?
4F82 23 01           BLS     SBT       BRANCH IF NOT
4F84 09              DEX               2 STATES DELETED
4F85 8D 09   SBT     BSR     DMOD0     MODIFY THE ADDRESSES
4F87 BD 4EFD         JSR     STC4      GO CHECK FOR KEYLOG
4F8A DE 82           LDX     AFFECT    GET OLD ADRS (KEYLOG MOVED IT)
4F8C DF C8           STX     UPP       RESTORE IT
4F8E 20 C8   SBT1    BRA     BACK      RETURN
4F90 DF 1E   DMOD0   STX     TP6       SAVE INDEX FOR MODIFICATION
4F92 CE 00FE         LDX     #254      PRESET INDEX FOR SEARCH
4F95 08      DMOD4   INX               SKIP AHEAD ONE
4F96 08      DMOD1   INX               SKIP AHEAD ONE
4F97 9C 0B           CPX     EOPM      FINISHED YET ?
4F99 26 01           BNE     DMOD8     BRANCH IF NOT
4F9B 39              RTS               ELSE RETURN
4F9C A6 00   DMOD8   LDA A   X         GET NEXT INST
4F9E 81 DF           CMP A   #$DF      ELSE CHECK FOR JMP OR JSR
4FA0 23 F4           BLS     DMOD1     BRANCH IF NOT
4FA2 8D 57           BSR     UNPACK    UNPACK AND CHECK THE ADRS
4FA4 2B EF           BMI     DMOD4     BRANCH IF NO MOD. NECESSARY
4FA6 26 03           BNE     DMOD5     NON-ZERO: GO MODIFY
4FA8 5D              TST B             ELSE TEST LS BITS
4FA9 27 EA           BEQ     DMOD4     NO MOD. IF ZERO
4FAB BD 4848 DMOD5   JSR     ADD7      MODIFY THE OLD ADDRESS
4FAE 2B 13           BMI     DMOD6     BRANCH IF NEG RESULT
4FB0 C6 F0           LDA B   #$F0      GET INST MASK
4FB2 E4 00           AND B   X         REMOVE OLD INST ADRS
4FB4 E7 00           STA B   X         RESTORE OLD INST
4FB6 D6 21           LDA B   TP7S      ACCB=LS BITS OF NEW ADRS
4FB8 58      DMOD7   ASL B             PACK THE NEW ADRS
4FB9 49              ROL A
4FBA 54              LSR B
4FBB E7 01           STA B   1,X       RESTORE NEW LS BITS
4FBD AA 00           ORA A   X         "OR" IN NEW MS BITS
4FBF A7 00           STA A   X         RESTORE NEW MS BITS
4FC1 20 D2           BRA     DMOD4     CONTINUE
4FC3 4F      DMOD6   CLR A             ACCA=ACCB=MIN ADRS
4FC4 5F              CLR B
4FC5 20 F1           BRA     DMOD7     CONTINUE
             *
4FC7 DE C8   INSRT   LDX     UPP       GET PRGM PNTR
4FC9 A6 00           LDA A   X         GET THE INST
4FCB 08      ILOOP   INX               INC POINTER
4FCC 9C 0B           CPX     EOPM      END OF MEMORY ?
4FCE 27 07           BEQ     IDONE     BRANCH IF YES
4FD0 E6 00           LDA B   X         GET CURRENT INST
4FD2 A7 00           STA A   X         SAVE OLD INST
4FD4 17              TBA               TRANSFER NEW INST
4FD5 20 F4           BRA     ILOOP     CONTINUE
4FD7 09      IDONE   DEX               BACK UP ONE
4FD8 A6 00           LDA A   X         GET THE INST
4FDA 81 BA           CMP A   #$DBB     TWO BYTE INSTRUCTION ?
4FDC 23 04           BLS     RTN1      BRANCH IF NOT
4FDE 6F 00           CLR     X         ELSE WIPE IT OUT
4FE0 20 03           BRA     ID1       SET ERROR
4FE2 5D      RTN1    TST B             INSTRUCTION SHOVED OFF ?
4FE3 27 04           BEQ     RTN       BRANCH IF NOT
4FE5 86 07   ID1     LDA A   #7        LOAD ERROR
4FE7 97 06           STA A   ERROR     SAVE IT
4FE9 DE C8   RTN     LDX     UPP       RELOAD PRGM PNTR
4FEB 39              RTS               RETURN
             *
4FEC DE C8   DEL     LDX     UPP       GET PRGM PNTR
4FEE A6 01   DLOOP   LDA A   1,X       GET NEW INST
4FF0 A7 00           STA A   X         SAVE IT IN NEW LOCATION
4FF2 08              INX               INC MEMORY PNTR
4FF3 9C 0B           CPX     EOPM      END OF MEMORY ?
4FF5 26 F7           BNE     DLOOP     BRANCH IF NOT
```

```
4FF7 09              DEX                ELSE BACK UP ONE
4FF8 6F 00           CLR       X        NOP TO LAST STATE
4FFA 39              RTS                RETURN
              *
              *UNPACK AND CHECK THE GOTO/GOSUB ADDRESS
              *
4FFB E6 01    UNPACK LDA B     1,X      GET 2ND BYTE OF INST
4FFD 58              ASL B              EXTRACT THE ADDRESS
4FFE 46              ROR A              ACCA=MS BITS
4FFF 56              ROR B              ACCB=LS BITS
5000 84 07           AND A     #$7      MASK OFF THE INST. CODE
5002 97 20           STA A     TP7      SAVE MS BITS
5004 D7 21           STA B     TP7S     SAVE LS BITS
5006 4C              INC A              ADD BASE PAGE OFFSET
5007 D0 83           SUB B     AFFECT+1   ADRS MODIFICATION NECESSARY ?
5009 92 82           SBC A     AFFECT
500B 39              RTS
              *
              *
              *
500C DE 52    AMOD   LDX       TA       GET INSERT START
500E DF 82           STX       AFFECT   SAVE FOR "AFFECTED" TEST
5010 DF 84           STX       FIELD    SAVE FOR "FIELD" TEST
5012 DF 1E           STX       TP6      SAVE FOR "B-A"
5014 DE 80           LDX       TB       GET INSERT END
5016 DF 20           STX       TP7      SAVE FOR "B-A"
5018 BD 4840         JSR       SUB7     DO "B-A" TO TP7
501B DE 20           LDX       TP7      GET THE RESULT
501D 26 06           BNE       AMOD1    BRANCH IF NON-ZERO
501F 7F 0052  AMOD4  CLR       TA       RESET ALPHA FLAG/POINTER
5022 DE C8           LDX       UPP      RESTORE INDEX FOR STEP ROUTINE
5024 39              RTS                RETURN
5025 DF 1E    AMOD1  STX       TP6      SAVE RESULT FOR MODIFICATIONS
5027 CE 00FF         LDX       #255     GET STARTING ADRS-1
502A 08       AMOD0  INX                INC MEMORY PNTR
502B 9C 84           CPX       FIELD    FIELD BOUNDARY ?
502D 26 1C           BNE       AMOD2    BRANCH IF NOT
502F 9C 52           CPX       TA       "A" BOUNDARY ?
5031 26 0A           BNE       AMOD3    BRANCH IF NOT
5033 DE 80           LDX       TB       ELSE GET "B" POINTER
5035 DF 84           STX       FIELD    SAVE FOR NEXT FIELD TEST
5037 DF 82           STX       AFFECT   SAVE FOR "AFFECTED" TEST
5039 DE 52           LDX       TA       RESTORE USER ADRS
503B 20 0E           BRA       AMOD2    CONTINUE
503D 9C 08    AMOD3  CPX       EOPM     FINISHED ?
503F 27 DE           BEQ       AMOD4    BRANCH IF YES
5041 DE 08           LDX       EOPM     ELSE GET NEXT FIELD TEST
5043 DF 84           STX       FIELD    SAVE IT
5045 DE 52           LDX       TA       GET NEW "AFFECTED" VALUE
5047 DF 82           STX       AFFECT   SAVE IT
5049 DE 80           LDX       TB       RESTORE WORK ADRS
504B A6 00    AMOD2  LDA A     X        GET THE USER INST
504D 81 DF           CMP A     #$DF     ELSE CHECK FOR JMP OR JSR
504F 23 D9           BLS       AMOD0    BRANCH IF IT IS NOT
5051 8D A8           BSR       UNPACK   UNPACK AND CHECK THE ADRS
5053 2B D5           BMI       AMOD0    BRANCH IF NOT
5055 BD 484B         JSR       ADD7     ELSE MODIFY THE ADDRESS
5058 85 F8           BIT A     #$F8     NEW ADRS > 2047 ?
505A 26 13           BNE       AMOD8    BRANCH IF YES
505C C6 F0           LDA B     #$F0     ELSE GET INST MASK
505E E4 00           AND B     X        AND IT WITH THE INST
5060 E7 00           STA B     X        RESTORE THE INST
5062 D6 21           LDA B     TP7S     ACCB=LS BITS OF NEW ADRS
5064 58       AMOD10 ASL B              PACK THE NEW ADDRESS
5065 49              ROL A
5066 54              LSR B
5067 E7 01           STA B     1,X      SAVE NEW LS BITS
5069 AA 00           ORA A     X        "OR" IN NEW MS BITS
506B A7 00           STA A     X        RESTORE INST
506D 20 BB           BRA       AMOD0    CONTINUE
506F 86 07    AMOD8  LDA A     #$7      ACCA & ACCB= MAX ADRS
5071 C6 FF           LDA B     #$FF
5073 20 EF           BRA       AMOD10   CONTINUE
                     NAM       STEP
                     OPT       LIST,MEM
527A                 ORG       $527A
              *
```

```
                        *THIS ROUTINE HANDLES THE STEP AND BACK STEP
                        *FUNCTIONS IN BOTH RUN AND PROGRAM MODE.
                        *
                        *IN RUN MODE, STEP SIMPLY EXECUTES ONE USER INSTRUCTION.
                        *
                        *IN PROGRAM MODE, STEP WILL 1) STEP OVER THE CURRENT
                        *INSTRUCTION INDICATED BY UPP 2) LIST THAT INST
                        *IF TRACE MODE IS SET 3) ENTER THE ALPHA MODE IF
                        *THE INSTRUCTION WAS AN ALPHA INITIATOR.
                        *
                        *BACK STEP OPERATES ONLY IN PROGRAM MODE AND
                        *WILL 1) BACK STEP OVER THE PREVIOUS INSTRUCTION
                        *2) EXIT THE ALPHA MODE IF THAT INSTRUCTION
                        *WAS AN ALPHA INITIATOR.
                        *
                        *BOTH STEP AND BACK STEP WILL TERMINATE THE
                        *INSERT MODE IF IT IS SET WHEN THEY ARE CALLED
                        *
                        *WRITTEN BY BRAD MILLER
                        *
527A 96 D5      STEP    LDA A   FLAG        GET PROTECT FLAG
527C 44                 LSR A               GET PROTECT BIT
527D 25 2B              BCS     OUT1        RETURN IF PROTECTED
527F 8D 73              BSR     STEP1       CHECK FOR INSERT
5281 D6 07              LDA B   TGL         GET MODE
5283 2B 12              BMI     PGMD        BRANCH IF PROGRAM MODE
5285 DF CA              STX     UIP         SAVE IN INST PNTR
5287 86 C0              LDA A   #$C0        GET R/S FLAG INFO
5289 97 12              STA A   SFLG        SET THE STEP FLAG
528B E6 00              LDA B   X           GET CURRENT USER INST
528D C1 B0              CMP B   #$B0        STOP COMMAND ?
528F 27 01              BEQ     STP8        BRANCH IF YES
5291 44                 LSR A               ELSE RSFLG = $40
5292 97 09      STP8    STA A   RSFLG       SAVE THE FLAG
5294 7E 796B            JMP     EXEC7       GO DO IT !
5297 C5 60      PGMD    BIT B   #$60        KEYLOG MODE SET ?
5299 27 12              BEQ     NKEYLG      BRANCH IF NOT
529B 4F                 CLR A               PRESET ACCA FOR KEYLOG
529C BD 590A            JSR     KEYLOG      DO THE KEYLOG AND STEP
529F 96 06              LDA A   ERROR       ERROR ?
52A1 26 07              BNE     OUT1        RETURN IF YES
52A3 96 CC      STP6    LDA A   ALPHA       ALPHA MODE ?
52A5 27 03              BEQ     OUT1        BRANCH IF NOT
52A7 7E 519C            JMP     TOALP       ELSE DO "TO ALPHA"
52AA 7E 797B    OUT1    JMP     BWM         RETURN TO SUPV
52AD A6 00      NKEYLG  LDA A   X           GET CURRENT INSTRUCTION
52AF 81 BA              CMP A   #SDBB       TWO BYTE INSTRUCTION ?
52B1 23 0D              BLS     STP3        BRANCH IF NOT
52B3 81 BE              CMP A   #$BE        FORMAT INSTRUCTION ?
52B5 26 08              BNE     STP4        BRANCH IF NOT
52B7 E6 01              LDA B   1,X         ELSE GET 2ND BYTE
52B9 C5 0F              BIT B   #$F         ALPHA TYPE FORMAT INST ?
52BB 26 02              BNE     STP4        BRANCH IF NOT
52BD 97 CC              STA A   ALPHA       ELSE SET ALPHA FLAG
52BF 08         STP4    INX                 MOVE AHEAD ONE
52C0 08         STP3    INX                 MOVE AHEAD ONE
52C1 81 B4              CMP A   #$B4        ALPHA TERMINATOR ?
52C3 27 2A              BEQ     BSTP4       BRANCH IF YES AND RESET ALPHA
52C5 4F                 CLR A
52C6 9C 0B      STP7    CPX     EOPM        END OF PROGRAM MEMORY ?
52C8 27 10              BEQ     BSTP3       BRANCH IF YES
52CA DF C8      STP5    STX     UPP         ELSE SAVE NEW PRGM ADRS
52CC 20 D5              BRA     STP6        GO FINISH UP !
                        *
                        *BACK STEP BEGINS HERE
                        *
52CE 8D 24      BSTEP   BSR     STEP1       CHECK FOR INSERT
52D0 09                 DEX                 BACK UP ONE
52D1 09                 DEX                 BACK UP ONE
52D2 DF 14              STX     TP1         PRGM PNTR TO TEMP FOR CHECK
52D4 96 14              LDA A   TP1         BACKED BEHIND ADRS ZERO ?
52D6 26 06              BNE     BSTP1       BRANCH IF NOT
52D8 97 C9              STA A   UPP+1       ELSE SET UPP TO STATE ZERO
52DA 97 CC      BSTP3   STA A   ALPHA       CLEAR THE ALPHA MODE
52DC 20 C5              BRA     STP6        GET OUT !
```

```
52DE A6 00   BSTP1  LDA A  X       GET THE INSTRUCTION
52E0 81 BA          CMP A  #SDBB   TWO BYTE INSTRUCTION ?
52E2 22 01          BHI    BSTP2   BRANCH IF YES (UPP OK)
52E4 08             INX            ELSE MOVE AHEAD ONE
52E5 81 BE   BSTP2  CMP A  #$BE    FORMAT INSTRUCTION ?
52E7 26 E1          BNE    STP5    BRANCH IF NOT
52E9 E6 01          LDA B  1,X     ELSE GET 2ND BYTE
52EB C5 0F          BIT B  #$F     ALPHA INST ?
52ED 26 DB          BNE    STP5    BRANCH IF NOT
52EF 4F      BSTP4  CLR A
52F0 97 CC          STA A  ALPHA   CLEAR ALPHA MODE
52F2 20 D2          BRA    STP7    GET OUT !
             *
             *
             *
52F4 DE C8   STEP1  LDX    UPP     GET CURRENT PRGM PNTR
52F6 96 52          LDA A  TA      ARE WE IN THE INSERT MODE ?
52F8 26 01          BNE    STEP2   BRANCH IF YES
52FA 39             RTS            ELSE RETURN
52FB DF 80   STEP2  STX    TB      SAVE FOR "INSERT END"
52FD 7E 500C        JMP    AMOD    MOD. GOTO'S AND RET. UPP IN INDEX
             *
             *
     796B    EXEC7  EQU    $796B
     519C    TOALP  EQU    $519C
     59DA    KEYLOG EQU    $59DA
                    END
```

SYMBOL TABLE

```
ADATA  0000 ACTL   0001 BDATA  0002 BCTL   0003 INPUT  0004 IOIN   0005
ERROR  0006 TGL    0007 UFLG   0008 RSFLG  0009 FOM    000A EOPM   000B
STKFLG 000D RND    000E DIGFLG 000F W2     0010 W1     0011 SFLG   0012
DCNTR  0013 TP1    0014 TP1S   0015 TP2    0016 TP2S   0017 TP3    0018
TP3S   0019 TP4    001A TP4S   001B TP5    001C TP5S   001D TP6    001E
TP6S   001F TP7    0020 TP7S   0021 T13    0022 T12    0023 T11    0024
T10    0025 T9     0026 T8     0027 T7     0028 T6     0029 T5     002A
T4     002B T3     002C T2     002D T1     002E ISTK   002F ISTACK 0051
TA     0052 SPGM   0054 EXTRA  0056 BUFF   0058 REAL   0068 IMAG   0070
AT1    0078 AT2    0080 W      0088 XR     0090 YR     0098 ZR     00A0
TR     00A8 LSTX   00B0 BKWRT  00B8 BKKC   00BA SOL7   00C6 UPP    00C8
UIP    00CA ALPHA  00CC IO1    00CD IO2    00D0 IT7    00D3 FLAG   00D5
TPOS   00D6 FILE   00D7 AR     00D8 BR     00E0 CR     00E8 DR     00F0
ER     00F8 SDBB   008A MT     7E00 TERMN7 003D IMED   0040 PARCD  00C0
PAREX  0080 NTBL   0000 DOTS   5EC0 PRTDRV 602D FRMT   5CA8 BLANK  5D75
LDMSG  57BD ROLLD  55B2 ROLLU  57F1 PSD    55DA TXL    55E9 STKUP  55EF
MAD    749B CMP    74AA NOR    74D6 TXW    7424 TXXR   743B EXXR   7452
ARSR   753B OVUNF  75B6 OVERF  75DD XR0    740A XRNINE 75C8 UNDRF  75F1
IMULT  76B9 QDG    7669 FPA    75FC FPS    75F6 FPM    7735 FPD    7793
FPAEX  763D FPMEX  7780 LSHIFT 7521 ZEROX  7489 XZEROQ 7416 XZERO2 7417
RECIP  73E6 TXPX   73F3 CONST  6800 FPDBRC 6898 TAN    68A9 ATN    69C3
DSZERO 6A46 NTLN   6A58 EXPN   6AC9 SIN    6B94 COS    6B9A ASIN   6BF2
ACOS   6BF7 PH1    6C5D PH2    6C8D PH3    6D34 PH4    6DD0 LSFT8  6E47
SQRT   6E65 MAD8   6F2C CMP8   53E4 IOUPX  6F52 LOG10  6FA7 YUPX   6FE9
RTOP   7328 PTOR   7386 SUB7   4840 ADD7   484B BWM    797B ERROR7 7B40
TB     0080 AFFECT 0082 FIELD  0084 STCOD7 4EC8 STC7   4EDE STC10  4EE0
STC0   4EE3 STC1   4EE4 STC3   4EEE STC9   4EF1 STC4   4EFD STC5   4F09
STC6   4F0E STC2   4F16 STC8   4F2B INSERT 4F4B BACK   4F58 TERM   4F5B
DELETE 4F60 OBYTE  4F78 SBT    4F85 SBT1   4F8E DMOD0  4F90 DMOD4  4F95
DMOD1  4F96 DMOD8  4F9C DMOD5  4FAB DMOD7  4FB8 DMOD6  4FC3 INSRT  4FC7
ILOOP  4FCB IDONE  4FD7 RTN1   4FE2 ID1    4FE5 RTN    4FE9 DEL    4FEC
DLOOP  4FEE UNPACK 4FFB AMOD   500C AMOD4  501F AMOD1  5025 AMOD0  502A
AMOD3  503D AMOD2  504B AMOD10 5064 AMOD8  506F STEP   527A STP8   5292
PGMD   5297 STP6   52A3 OUT1   52AA NKEYLG 52AD STP4   52BF STP3   52C0
STP7   52C6 STP5   52CA BSTEP  52CE BSTP3  52DA BSTP1  52DE BSTP2  52E5
BSTP4  52EF STEP1  52F4 STEP2  52FB EXEC7  796B TOALP  519C KEYLOG 59DA
```

TOTAL ERRORS 2

****ERROR 201
218 NAM FMTFMT

```
                        OPT    LIST,MEM
                        NAM    FMTFMT
                        OPT    LIST,MEM
5075                    ORG    $5075
                 * THIS SUBROUTINE ACCEPTS IN ACCA EITHER AN ASCII
                 * CHARACTER OR ZERO. IF ACCA=0, CHARACTERS ARE ASSUMED TO BE
                 * IN USER MEMORY AND THE OUTPUT IS BUILT FROM THERE.
                 * IF ACCA IS A CHARACTER, THE ROUTINE WILL SIMPLY
                 * PUT THAT CHARACTER INTO THE CURRENT OUTPUT LINE
                 * BEING BUILT AND RETURN TO THE CALLER.
                 * ON THE INITIAL ENTRY, T13 MUST BE SET TO ZERO. (T13=FIELD
                 * THIS ROUTINE BUILDS THE LINE IN LOCATIONS REAL AND IMAG
                 *
5075 D6 09       AFMT    LDA B  RSFLG      GET CURRENT RUN/STOP FLAG
5077 D7 27               STA B  T8         SAVE IT FOR EXIT CHECK
5079 97 25               STA A  T10        SINGLE CHARACTER MODE ?
507B 26 14               BNE    SCHAR      BRANCH IF YES.
507D CA C0               ORA B  #$C0       SET IT FOR "STOP" COMMAND CHECK
507F D7 09               STA B  RSFLG      RESTORE THE UPDATE
5081 DE CA               LDX    UIP        ELSE GET PRGM PNTR
5083 08                  INX               BUMP IT TO FIRST CHAR
5084 08          AFMT0   INX               BUMP TO THE CHARACTER
5085 9C 0B               CPX    EOPM       END OF MEMORY ?
5087 27 13               BEQ    AFMT15     TERMINATE IF YES
5089 DF CA               STX    UIP        ELSE SAVE UPDATED POINTER
508B A6 00               LDA A  X          GET THE CHARACTER
508D 26 02               BNE    SCHAR      CONTINUE IF NON ZERO
508F 86 20               LDA A  #$20       ELSE LOAD A BLANK
5091 81 84       SCHAR   CMP A  #$84       ALPHA TERMINATOR ?
5093 27 07               BEQ    AFMT15     BRANCH IF YES
5095 81 81               CMP A  #$81       END STATEMENT ?
5097 26 06               BNE    AFMT1      BRANCH IF NOT
5099 09                  DEX               ELSE BACK UP ONE
509A DF CA               STX    UIP        RESTORE UIP
509C 7E 513E     AFMT15  JMP    ATERM      TERMINATE THE OUTPUT
509F 81 B2       AFMT1   CMP A  #$B2       IS IT A PRINT COMMAND ?
50A1 26 47               BNE    AFMT2      BRANCH IF NOT
50A3 D6 22               LDA B  T13        GET FIELD INDICATOR
50A5 26 3C               BNE    AFMT10     IGNORE PRINT IF ONE ALREADY DONE
50A7 5C                  INC B             ELSE SET PRINT FLAG
50A8 D7 22               STA B  T13        RESTORE FIELD INDICATOR
50AA 7F 000F     AFMT13  CLR    DIGFLG     TERM. DIGIT ENTRY
50AD BD 5CBC             JSR    FRMT+$14     FORMAT X-REG
50B0 96 67       AFMT4   LDA A  BUFF+15     GET RIGHT-MOST CHAR
50B2 81 20               CMP A  #$20       IS IT A BLANK ?
50B4 26 05               BNE    AFMT3      BRANCH IF NOT
50B6 BD 5184             JSR    SHBUFF     ELSE SHIFT THE BUFFER RIGHT
50B9 20 F5               BRA    AFMT4      CONTINUE REMOVING TRAILING BLANKS
50BB CE 0057     AFMT3   LDX    #BUFF-1     GET LEFT-END CHAR ADRS - 1
50BE 08          AFMT5   INX               GET CHAR ADRS
50BF A6 00               LDA A  X          GET THE CHARACTER
50C1 81 20               CMP A  #$20       IS IT A BLANK ?
50C3 27 F9               BEQ    AFMT5      BRANCH IF YES
50C5 A6 10               LDA A  16,X       ELSE GET CORRESPONDING STRING LOCATIO
50C7 27 03               BEQ    AFMT7      BRANCH IF IT'S EMPTY
50C9 7E 5173             JMP    LOVF1      ELSE TERMINATE THIS LINE
50CC DF 23       AFMT7   STX    T12        SAVE INDEX FOR FULL CHECK
50CE A6 00       AFMT14  LDA A  X          TRANSFER X-REG ASCII
50D0 A7 10               STA A  16,X       THE RIGHT MOST END OF THE
50D2 08                  INX               STRING BEING BUILT
50D3 8C 0068             CPX    #BUFF+16     DONE YET ?
50D6 26 F6               BNE    AFMT14     BRANCH IF NOT
50D8 DE 23               LDX    T12        GET INITIAL INDEX VALUE
50DA 8C 0058             CPX    #BUFF      POINTING TO LEFT MOST CHAR ?
50DD 27 39               BEQ    AFMT6      LINE OVERFLOW IF YES
50DF E6 0F               LDA B  15,X       GET STRING CHAR LEFT OF X-REG
50E1 26 35               BNE    AFMT6      LINE FULL IF NON-ZERO
50E3 DE CA       AFMT10  LDX    UIP        ELSE GET PRGM PNTR
50E5 96 25               LDA A  T10        SINGLE CHARACTER MODE ?
50E7 27 9B               BEQ    AFMT0      BRANCH IF NOT
50E9 39                  RTS               ELSE RETURN TO CALLER
50EA 81 02       AFMT2   CMP A  #2         "NEW LINE" COMMAND ?
50EC 27 2A               BEQ    AFMT6      BRANCH IF YES
50EE 81 03               CMP A  #3         "SHIFT" COMMAND ?
50F0 26 05               BNE    AFMT16     BRANCH IF NOT
50F2 73 0026             COM    T9         ELSE TOGGLE THE SHIFT FLAG
```

```
50F5 20 EC            BRA    AFMT10     CONTINUE
50F7 D6 26     AFMT16 LDA B  T9         GET THE SHIFT FLAG
50F9 27 0A            BEQ    AFMT17     BRANCH IF SHIFT NOT INVOKED
50FB 81 48            CMP A  #$48       ELSE CHECK CURRENT CHARACTER
50FD 22 06            BHI    AFMT17     BRANCH IF UNAFFECTED BY "SHIFT"
50FF 81 40            CMP A  #$40       ELSE CHECK LOWER LIMIT
5101 23 02            BLS    AFMT17     BRANCH IF UNAFFECTED
5103 8B 1F            ADD A  #$1F       GENERATE SHIFTED CHARACTER
5105 D6 22     AFMT17 LDA B  T13        GET THE FIELD INDICATOR
5107 26 11            BNE    AFMT8      BRANCH IF "PRINT" ALREADY RECEIVED
5109 CE 0067          LDX    #REAL-1     ELSE FIND FIRST AVAILABLE LOCATION
510C 08        AFMT9  INX               BUMP SEARCH ADRS
510D E6 00            LDA B  X          GET CURRENT CONTENTS
510F 26 FB            BNE    AFMT9      CONTINUE SEARCHING IF IT'S FULL
5111 A7 00            STA A  X          ELSE SAVE NEW CHARACTER
5113 8C 0077          CPX    #REAL+15    LAST AVAILABLE LOCATION
5116 26 CB            BNE    AFMT10     BRANCH IF NOT FULL YET
5118 20 56     AFMT6  BRA    LOVF       ELSE LINE OVERFLOW
511A CE 0078   AFMT8  LDX    #REAL+16    GET RIGHT MOST ADRS + 1
511D 09        AFMT12 DEX               BACK INTO THE LINE
511E E6 00            LDA B  X          GET CURRENT CHARACTER
5120 26 FB            BNE    AFMT12     BRANCH IF NOT EMPTY
5122 09               DEX               ELSE BACK UP AGAIN
5123 DF 23            STX    T12        SAVE BUFFER ADRS
5125 E6 02     AFMT11 LDA B  2,X        MOVE THE RIGHT END ASCII
5127 E7 01            STA B  1,X        LEFT ONE POSITION IN THE BUFFER
5129 08               INX
512A 8C 0076          CPX    #REAL+14    DONE SHIFTING YET ?
512D 26 F6            BNE    AFMT11     BRANCH IF NOT
512F A7 01            STA A  1,X        SAVE LATEST CHARACTER
5131 DE 23            LDX    T12        GET INITIAL BUFFER PNTR
5133 8C 0067          CPX    #REAL-1     LINE FULL NOW ?
5136 27 38            BEQ    LOVF       BRANCH IF YES
5138 E6 00            LDA B  X          ELSE GET CHAR LEFT OF X-REG
513A 26 34            BNE    LOVF       OVERFLOW IF NON-ZERO
513C 20 A5     AFMT18 BRA    AFMT10     GO SEE WHAT'S NEXT
513E D6 27     ATERM  LDA B  T8         GET SAVED R/S FLAG
5140 2B 02            BMI    ATERM0     BRANCH IF NO CHANGE NECESSARY
5142 D7 09            STA B  RSFLG      ELSE RESTORE OLD FLAG
5144 CE 0010   ATERM0 LDX    #16        SET CHARACTER COUNT
5147 E6 67     ATERM4 LDA B  REAL-1,X    GET RIGHT END CHAR.
5149 26 04            BNE    ATERM3     BRANCH IF NOT NULL AND PRINT
514B 09               DEX               ELSE CONT. CHECKING FOR NULL STRING
514C 26 F9            BNE    ATERM4     ALL CHAR. CHECKED ?
514E 39               RTS               YES; NULL LINE; NO PRINT; RETURN
514F CE 0057   ATERM3 LDX    #BUFF-1     PRESET INDEX TO MOVE THE LINE
5152 08        ATERM2 INX               THE TEMPORARY BUILDING BUFFER
5153 A6 10            LDA A  16,X       TO THE OUTPUT BUFFER PUTTING
5155 26 02            BNE    ATERM1     BLANKS IN THE OUTPUT BUFFER
5157 86 20            LDA A  #$20       IN THE CORRESPONDING LOCATIONS
5159 A7 00     ATERM1 STA A  X          WHERE ZERO'S WERE FOUND
515B 8C 0067          CPX    #BUFF+15    IN THE TEMPORARY BUFFER
515E 26 F2            BNE    ATERM2
5160 96 25            LDA A  T10        SINGLE CHARACTER MODE ?
5162 26 09            BNE    PRINT      PRINT IF YES
5164 96 09            LDA A  RSFLG      STOP KEY HIT ?
5166 2B 05            BMI    PRINT      PRINT IF NOT
5168 96 12            LDA A  SFLG       STEPPING ?
516A 26 01            BNE    PRINT      PRINT IF YES
516C 39               RTS               ELSE SKIP THE PRINT
516D 7E 5300   PRINT  JMP    DEVICE     CALL THE OUTPUT DEVICE
5170 7F 0022   LOVF   CLR    T13        RESET FIELD POINTER
5173 8D DA     LOVF1  BSR    ATERM3     OUTPUT THE CURRENT STRING
5175 CE 0010          LDX    #16        PRESET INDEX FOR CLEAR
5178 6F 67     LOVF2  CLR    REAL-1,X    CLEAR LINE BUFFER
517A 09               DEX
517B 26 FB            BNE    LOVF2
517D D6 22            LDA B  T13        GET FIELD POINTER
517F 27 BB            BEQ    AFMT18     CONTINUE IF IN ALPHA
5181 7E 50AA          JMP    AFMT13     ELSE RE-DO X-REG
5184 CE 0058   SHBUFF LDX    #BUFF      GET THE BUFFER STARTING ADRS
5187 A6 00            LDA A  X          GET LEFT MOST CHARACTER
5189 08               INX               INC THE BUFFER POINTER
518A 8C 0068   S      CPX    #BUFF+16    FINISHED YET ?
518D 27 08            BEQ    SSS        BRANCH IF YES
518F E6 00            LDA B  X          ELSE SAVE NEXT CHARACTER
```

```
5191 A7 00            STA A  X          REPLACE IT WITH THE OTHER
5193 17               TBA               TRANSFER NEW CHAR TO ACCB
5194 08               INX               ADJUST THE PNTR
5195 20 F3            BRA    S          CONTINUE SHIFTING RIGHT THE BUFFER
5197 86 20     SSS    LDA A  #$20       REPLACE THE LEFT MOST CHAR
5199 97 58            STA A  BUFF       WITH A BLANK AND
519B 39               RTS               RETURN.
519C D6 07     TOALP  LDA B  TGL        WHAT MODE ?
519E 2B 0E            BMI    NKLG1      BRANCH IF PROGPAM MODE
51A0 D6 07     ALPHAK LDA B  TGL        GET MODE
51A2 2A 3C            BPL    RMOD1      BRANCH IF RUN MODE
51A4 BD 4EC8          JSR    STCOD7     ELSE STORE INST
51A7 7F 00C6          CLR    SOL7       CLEAR THE INSTRUCTION REGISTER
51AA C6 80            LDA B  #$80       PREPARE THE SECOND BYTE
51AC D7 C7            STA B  SOL7+1
51AE D7 CC     NKLG1  STA B  ALPHA      SET THE ALPHA FLAG
51B0 96 06            LDA A  ERROR      ERROR GENERATED ?
51B2 26 29            BNE    AK3+3      BRANCH IF YES
51B4 BD 7A64   AK2    JSR    SDISP1     GET NEXT KEY
51B7 BD 522B          JSR    KTOA       CONVERT TO ASCII
51BA 81 04            CMP A  #4         STEP COMMAND ?
51BC 26 03            BNE    AK8        BRANCH IF NOT
51BE 7E 527A          JMP    STEP       ELSE DO "STEP"
51C1 81 05     AK8    CMP A  #5         BACK STEP COMMAND ?
51C3 26 03            BNE    AK9        BRANCH IF NOT
51C5 7E 52CE          JMP    BSTEP      ELSE DO "BACK STEP"
51C8 97 C6     AK9    STA A  SOL7       SAVE THE ASCII
51CA BD 4EC8          JSR    STCOD7     STORE IT IN MEMORY
51CD 96 06            LDA A  ERROR      ERROR ?
51CF 26 0C            BNE    AK3+3      BRANCH IF YES
51D1 96 C6            LDA A  SOL7       GET THE CHARACTER
51D3 7F 00C6          CLR    SOL7       RESET THE INST REGISTER
51D6 81 B4            CMP A  #$B4       ALPHA TERMINATOR ?
51D8 26 DA            BNE    AK2        BRANCH IF NOT
51DA 7F 00CC   AK3    CLR    ALPHA      ELSE RESET THE ALPHA FLAG
51DD 7E 797B          JMP    BWM        RETURN TO SUPV.
51E0 4F        RMOD1  CLR A             ZERO TO ACCA
51E1 97 22            STA A  T13        CLEAR THE FIELD POINTER
51E3 97 26            STA A  T9         RESET THE SHIFT FLAG
51E5 4C               INC A             SET ACCA
51E6 97 CC            STA A  ALPHA      SET ALPHA FLAG
51E8 CE 0010          LDX    #16        PRESET INDEX
51EB 6F 67     AK7    CLR    REAL-1,X     CLEAR LINE BUFFER
51ED 09               DEX
51EE 26 FB            BNE    AK7
51F0 BD 7A64   AK6    JSR    SDISP1     GO GET NEXT CHAR.
51F3 8D 36            BSR    KTOA       CONVERT ACCA TO ASCII
51F5 D6 C7            LDA B  SOL7+1     GET INST
51F7 C4 70            AND B  #$70       MASK OFF SELECT CODE
51F9 27 16            BEQ    PRT        BRANCH IF PRINTER
51FB 97 68            STA A  REAL       ELSE PUT CHAR IN REAL
51FD BD 532A          JSR    IOFMT      CALL THE DEVICE
5200 96 06            LDA A  ERROR      ERROR GENERATED ?
5202 26 D6            BNE    AK3        BRANCH IF YES
5204 96 68            LDA A  REAL       GET LAST CHAR OUTPUT
5206 81 B4            CMP A  #$B4       ALPHA TERMINATOR ?
5208 27 D0            BEQ    AK3        BRANCH IF YES
520A CE 00C6          LDX    #SOL7      ELSE RESET INST PNTR
520D DF CA            STX    UIP        SAVE IT
520F 20 DF            BRA    AK6        CONTINUE
5211 8D 15     PRT    BSR    AK5        OUTPUT TO BUFFER
5213 96 25            LDA A  T10        GET LAST CHAR OUTPUT
5215 81 B4            CMP A  #$B4       ALPHA TERMINATOR ?
5217 27 C1            BEQ    AK3        BRANCH IF YES
5219 20 D5            BRA    AK6        ELSE CONTINUE
521B 4F        RMPRT  CLR A
521C 97 22            STA A  T13        CLEAR FIELD POINTER
521E 97 26            STA A  T9         CLEAR SHIFT INDICATOR
5220 CE 0010          LDX    #16        PRESET INDEX
5223 6F 67     RMPRT1 CLR    REAL-1,X     CLEAR LINE BUFFER
5225 09               DEX
5226 26 FB            BNE    RMPRT1
5228 7E 5075   AK5    JMP    AFMT       OUTPUT THE ASCII
522B CE 5239   KTOA   LDX    #ASCII     GET ASCII TABLE ADDRESS
522E DF 14            STX    TP1        SAVE FOR MODIFICATION
5230 9B 15            ADD A  TP1S       ADD THE KEYCODE TO LSB'S
```

```
5232 97 15          STA A  TP1S      RESTORE RESULT
5234 DE 14          LDX    TP1       RESTORE NEW INDEX
5236 A6 00          LDA A  X         ACCA=ASCII CHARACTER
5238 39             RTS              RETURN
               *
     4EC8      STCOD7 EQU  $4EC8
     532A      IOFMT  EQU  $532A
     7A64      SDISP1 EQU  $7A64
     797B      BWM    EQU  $797B
     527A      STEP   EQU  $527A
     52CE      BSTEP  EQU  $52CE
               *
               *THIS FILE DEFINES THE ASCII SET FOR CJ.
               *ENTRIES ARE IN ORDER OF KEYCODES FROM
               *ZERO TO OCTAL 77.
               *
5239 50        ASCII  FCB  $50       P
523A 51               FCB  $51       Q
523B 52               FCB  $52       R
523C 53               FCB  $53       S
523D B4               FCB  $B4       TERMINATOR
523E 57               FCB  $57       W
523F 27               FCB  $27       '
5240 3E               FCB  $3E       >
5241 54               FCB  $54       T
5242 55               FCB  $55       U
5243 56               FCB  $56       V
5244 04               FCB  $4        STEP COMMAND
5245 05               FCB  $5        BACK STEP COMMAND
5246 58               FCB  $58       X
5247 37               FCB  $37       7
5248 38               FCB  $38       8
5249 41               FCB  $41       A
524A 42               FCB  $42       B
524B 43               FCB  $43       C
524C 44               FCB  $44       D
524D 45               FCB  $45       E
524E 59               FCB  $59       Y
524F 34               FCB  $34       4
5250 35               FCB  $35       5
5251 46               FCB  $46       F
5252 47               FCB  $47       G
5253 48               FCB  $48       H
5254 49               FCB  $49       I
5255 4A               FCB  $4A       J
5256 5A               FCB  $5A       Z
5257 31               FCB  $31       1
5258 32               FCB  $32       2
5259 4B               FCB  $4B       K
525A 4C               FCB  $4C       L
525B 4D               FCB  $4D       M
525C 4E               FCB  $4E       N
525D 4F               FCB  $4F       O
525E 20               FCB  $20       BLANK
525F 30               FCB  $30       0
5260 2E               FCB  $2E       .
5261 24               FCB  $24       $
5262 23               FCB  $23       #
5263 3F               FCB  $3F       ?
5264 25               FCB  $25       %
5265 5E               FCB  $5E       ^
5266 3A               FCB  $3A       :
5267 2A               FCB  $2A       *
5268 2D               FCB  $2D       -
5269 40               FCB  $40       @
526A 03               FCB  $3        SHIFT
526B B2               FCB  $B2       PRINT
526C 2F               FCB  $2F       /
526D 3C               FCB  $3C       <
526E 39               FCB  $39       9
526F 36               FCB  $36       6
5270 33               FCB  $33       3
5271 2C               FCB  $2C       ,
5272 29               FCB  $29       )
5273 3D               FCB  $3D       =
5274 28               FCB  $28       (
```

```
5275 01               FCB    $1         TAB
5276 20               FCB    $20        UNUSED KEYCODE (@75)
5277 02               FCB    $2         NEW LINE
5278 28               FCB    $28        +
                *
                *CODE TO SELECT THE PRINT DEVICE.  IF EOM
                *IS NEGATIVE, THE OUTPUT DEVICE IS SPECIFIED BY THE
                *CONTENTS OF T6 AND T5.  EOM MUST BE CONTROLLED
                *BY THE CALLER AND RESET TO THE CORRECT VALUE
                *WHEN FINISHED.
                *
5300                  ORG    $5300
5300 D6 0A     DEVICE LDA B  EOM        GET END OF MEMORY WORD
5302 28 03            BMI    NOPRT      NOT INTERNAL PRINTER IF NEGATIVE
5304 7E 6034          JMP    PRTDRV+7     ELSE CALL THE PRINTER
5307 DE 29     NOPRT  LDX    T6         GET THE DEVICE ADRS
5309 6E 00            JMP    X          CALL THE DEVICE
                      END
```

SYMBOL TABLE

| | | | | | | | | | | | |
|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000d |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 008A | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 00BA | MT | 7E00 | TERMN7 | 003D | IMED | 0040 | PARCD | 00C0 |
| PAREX | 0080 | NTBL | 0000 | DOTS | 5EC0 | PRTDRV | 602D | FRMT | 5CA8 | BLANK | 5D75 |
| LDMSG | 578D | ROLLD | 55B2 | ROLLU | 57F1 | PSD | 55DA | TXL | 55E9 | STKUP | 55EF |
| MAD | 749B | CMP | 74AA | NOR | 74D6 | TXW | 7424 | TXXR | 743B | EXXR | 7452 |
| ARSR | 753B | OVUNF | 75B6 | OVERF | 75DD | XR0 | 740A | XRNINE | 75C8 | UNDRF | 75F1 |
| IMULT | 76B9 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |
| RECIP | 73E6 | TXRX | 73F3 | CONST | 6800 | FPDBRC | 6898 | TAN | 68A9 | ATN | 69C3 |
| DSZERO | 6A46 | NTLN | 6A58 | EXPN | 6AC9 | SIN | 6B94 | COS | 6B9A | ASIN | 6BF2 |
| ACOS | 6BF7 | PH1 | 6C5D | PH2 | 6C8D | PH3 | 6D34 | PH4 | 6DD0 | LSFT8 | 6E47 |
| SQRT | 6E65 | MAD8 | 6F2C | CMP8 | 53E4 | IOUPX | 6F52 | LOG10 | 6FA7 | YUPX | 6FE9 |
| RTOP | 7328 | PTOR | 7386 | AFMT | 5075 | AFMT0 | 5084 | SCHAR | 5091 | AFMT15 | 509C |
| AFMT1 | 509F | AFMT13 | 50AA | AFMT4 | 50B0 | AFMT3 | 50BB | AFMT5 | 50BE | AFMT7 | 50CC |
| AFMT14 | 50CE | AFMT10 | 50E3 | AFMT2 | 50EA | AFMT16 | 50F7 | AFMT17 | 5105 | AFMT9 | 510C |
| AFMT6 | 5118 | AFMT8 | 511A | AFMT12 | 511D | AFMT11 | 5125 | AFMT18 | 513C | ATERM | 513E |
| ATERM0 | 5144 | ATERM4 | 5147 | ATERM3 | 514F | ATERM2 | 5152 | ATERM1 | 5159 | PRINT | 516D |
| LOVF | 5170 | LOVF1 | 5173 | LOVF2 | 5178 | SHBUFF | 5184 | S | 518A | SSS | 5197 |
| TOALP | 519C | ALPHAK | 51A0 | NKLG1 | 51AE | AK2 | 51B4 | AK8 | 51C1 | AK9 | 51C8 |
| AK3 | 51DA | RMOD1 | 51E0 | AK7 | 51EB | AK6 | 51F0 | PRT | 5211 | RMPRT | 5218 |
| RMPRT1 | 5223 | AK5 | 5228 | KTOA | 522B | STCOD7 | 4EC8 | IOFMT | 532A | SDISP1 | 7A64 |
| BWM | 797B | STEP | 527A | BSTEP | 52CE | ASCII | 5239 | DEVICE | 53D0 | NOPRT | 53D7 |

TOTAL ERRORS 1

```
                      OPT    LIST,MEM
                *
                *     THESE ROUTINES RETURN THE INTEGER AND
                *     FRACTIONAL PART OF THE ORIGINAL ARGUMENT
                *
                *     JOHN KEITH    MAY 28, 1974    REV A
                *
      0014     REGPTR EQU    TP1
5550                  ORG    $5550
5550 BD 55E9   INTFR1 JSR    TXL        SAVE X IN LAST X
5553 CE 0092          LDX    #XR+2      SET INDEX TO MANTISSA
5556 D6 90            LDA B  XR         (EXP+1)/2=WHOLE WORDS TO CLEAR
5558 2B 40            BMI    INTFR9     RET. IF NEG. (ALREADY FRACT.)
555A 5C               INC B
```

```
5558 57.              ASR B
555C 5A        INTFR2 DEC B               LOOP TO CLEAR WHOLE WORDS
555D 28 05            BMI     INTFR3      EXIT FROM LOOP
555F A7 00            STA A   X           CLEAR PAIR OF MANTISSA DIGITS
5561 08               INX                 MOVE POINTER
5562 20 F8            BRA     INTFR2      TEST IF DONE
5564 24 06     INTFR3 BCC     INTFR4      CLEAR HALF WORD ?
5566 A6 00            LDA A   X           YES, LOAD WORD
5568 84 0F            AND A   #$F         CLEAR UPPER HALF
556A A7 00            STA A   X           RESTORE RESULT
556C 7E 74D6   INTFR4 JMP     NOR         NOW NORMALIZE RESULT
556F BD 55E9   INTFR5 JSR     TXL         SAVE X IN LAST X
5572 96 90            LDA A   XR          EXAMINE EXPONENT
5574 2A 03            BPL     INTFR6      POSITIVE, CHECK SIZE OF EXPONENT
5576 7E 740A          JMP     XR0         NEGATIVE, NO INTEGER PART, CLEAR AND
5579 81 0B     INTFR6 CMP A   #11         IS EXP > 10 ?
557B 24 1D            BCC     INTFR9      YES, [X] IS INTEGER PART
557D 96 90            LDA A   XR          GET EXPONENT
557F 4C               INC A               ADD 1 SO EXP/2 POINTS TO PROPER WORD
5580 7F 0014          CLR     REGPTR      CLEAR FIRST BYTE OF POINTER
5583 44               LSR A               DIVIDE  EXP+1 BY 2
5584 97 15            STA A   REGPTR+1     SAVE WORD POINTER
5586 DE 14            LDX     REGPTR      LOAD WORD POINTER IN X
5588 24 07            BCC     INTFR7+1     WAS EXP+1 ODD ?
558A A6 92            LDA A   $92,X       YES, CLEAR SECOND HALF OF BYTE
558C 84 F0            AND A   #$F0        CLEAR SECOND HALF
558E A7 92            STA A   $92,X       RESTORE WORD IN X
5590 08        INTFR7 INX                 POINT TO NEXT WORD IN X-REG
5591 8C 0006          CPX     #6          IS CLEARING COMPLETE ?
5594 27 04            BEQ     INTFR9      YES, EXIT
5596 6F 92            CLR     $92,X       CLEAR NEXT WORD
5598 20 F6            BRA     INTFR7      CONTINUE OPERATION
559A 39        INTFR9 RTS                 RETURN
               *
               *     CLEAR X-REGISTER
               *
               *     JOHN KEITH    APRIL 2, 1974    REV A
               *
559B D7 2E     CLXR1  STA B   T1          SAVE RTS FLAG
559D BD 740A          JSR     XR0         CLEAR X-REG
55A0 4F        LDEX   CLR A               COMMON EXIT POINT FOR STACK LIFT DISA
55A1 97 0F            STA A   DIGFLG      CLEAR FLAG TO START NEW DATA ENTRY
55A3 7E 569C          JMP     DEXIT       RETURN TO SUPV
               *
               *     REGISTER TRANSFER ROUTINES
               *
               *     JOHN KEITH    APRIL 2, 1974    REV B
               *
               *     ENTER KEY
               *     Z->T,Y->Z,X->Y, X UNCHANGED
               *
55A6 D7 2E     ENTER1 STA B   T1          SAVE RTS FLAG
55A8 8D 4A            BSR     STKUP+5      LIFT STACK
55AA 20 F4            BRA     LDEX        RET TO SUPV
               *
               *     X EXCHANGE Y
               *
55AC CE 0098   XEY1   LDX     #YR         GET Y-REG ADRS
55AF 7E 7452          JMP     EXXR        EXCHANGE REGISTERS
               *
               *     ROLL DOWN
               *     T->TEMP,X->T,Y->X,Z->Y,TEMP->Z
               *
55B2 CE 0008   ROLLD1 LDX     #@10        LOAD COUNTER/POINTER
55B5 A6 8F     ROLLD5 LDA A   $8F,X       LOAD WORD FROM X
55B7 E6 A7            LDA B   $A7,X       LOAD WORD FROM T
55B9 A7 A7            STA A   $A7,X       STORE X IN T
55BB A6 9F            LDA A   $9F,X       LOAD WORD FROM Z
55BD E7 9F            STA B   $9F,X       STORE T IN X
55BF E6 97            LDA B   $97,X       LOAD WORD FROM Y
55C1 A7 97            STA A   $97,X       STORE Z IN Y
55C3 E7 8F            STA B   $8F,X       STORE Y IN X
55C5 09               DEX                 DECREMENT COUNTER/POINTER
55C6 26 ED            BNE     ROLLD5      CONTINUE
55C8 39               RTS                 RETURN TO CALLING ROUTINE
               *
```

```
                    *    RECALL LAST X TO X-REGISTER
                    *
                    *    JOHN KEITH    APRIL 3, 1974    REV A
                    *
55C9 91 0F   RLSTX1 CMP A   DIGFLG   DOING DIGIT ENTRY ?
55CB 27 05          BEQ     RLSTX2   BRANCH IF NOT
55CD 97 0F          STA A   DIGFLG   ELSE TERMINATE IT
55CF 43             COM A            SET MSB
55D0 97 0D          STA A   STKFLG   ENABLE LIFT
55D2 8D 18   RLSTX2 BSR     STKUP    DO STACK UP IF ENABLED
55D4 CE 0080        LDX     #LSTX    SET INDEX REGISTER TO LAST X
55D7 7E 743B        JMP     TXXR     TRANSFER X TO LAST X
                    *
                    *    PSD, PARTIAL STACK DOWN
                    *    PREFORMS OPERATION Z->Y,T->Z
                    *
                    *    JOHN KEITH    APRIL 3, 1974    REV A
                    *
55DA CE 0008 PSD1   LDX     #8       LOAD COUNTER/POINTER
55DD A6 A7   PSD5   LDA A   $A7,X    LOAD WORD FROM T
55DF E6 9F          LDA B   $9F,X    LOAD WORD FROM Z
55E1 A7 9F          STA A   #9F,X    STORE INTO Z
55E3 E7 97          STA B   $97,X    STORE INTO Y
55E5 09             DEX              DECR COUNTER
55E6 26 F5          BNE     PSD5     NOT COMPLETE
55E8 39             RTS              RETURN TO CALLING ROUTINE
                    *
                    *    TXL, TRANSFER X TO LAST X
                    *
                    *    JOHN KEITH    APRIL 3, 1974    REV A
                    *
55E9 CE 0080        LDX     #LSTX    GET LAST X ADRS
55EC 7E 73F3        JMP     TXRX     TRANSFER X-REG
                    *
                    *    STKUP PERFORMS THE FOLLOWING OPERTION:
                    *
                    *    Z->T,Y->Z,X->Y, T LOST
                    *    THIS OPERTION OCCURS ONLY IF THE AUTO
                    *    STACK UP FLAG IS SET.  IF THE ROUTINE
                    *    IS ENTERED AT STKUP2 THEN THE OPERATION
                    *    IS ALWAYS PERFORMED.
                    *
                    *    JOHN KEITH    MAR 24, 1974    REV B
                    *
     0020    STEMP  EQU     TP7
55EF 7D 000D STKUP1 TST     STKFLG   TEST CONDITION OF AUTO STACK FLG IN H
55F2 2A 1C          BPL     STKUP9   AUTO LIFT IS NOT ENABLED
55F4 0F      STKUP2 SEI              DISABLE INTERRUPTS WHILE LIFTING STAC
55F5 9F 20          STS     STEMP    SAVE STACK POINTER IN TEMPORARY
55F7 CE 0008        LDX     #8       LOAD LOOP COUNTER
55FA AE 9E   STKUP3 LDS     $9E,X    LOAD TWO WORDS FROM Z
55FC AF A6          STS     $A6,X    STORE WORDS IN T
55FE AE 96          LDS     $96,X    LOAD TWO WORDS FROM Y
5600 AF 9E          STS     $9E,X    STORE WORDS IN Z
5602 AE 8E          LDS     $8E,X    LOAD TWO WORDS FROM X
5604 AF 96          STS     $96,X    STORE WORDS IN Y
5606 09             DEX
5607 09             DEX              DECREMENT COUNTER, POINT TO NEXT LOCA
5608 26 F0          BNE     STKUP3   CONTINUE MOVING REGISTERS
560A 9E 20          LDS     STEMP    RELOAD ORIGINAL STACK POINTER
560C 0E             CLI              ENABLE INTERRUPTS
560D 7F 000D        CLR     STKFLG   CLEAR AUTO STACK FLAG
5610 39      STKUP9 RTS              RETURN TO CALLING POINT
                    *
                    *    CLEAR STACK ROUTINE
                    *
                    *    JOHN KEITH    JUNE 3, 1974    REV A
                    *
     0014    SAVE   EQU     TP1
5611 0F      CLR1   SEI              DISABLE INTERRUPTS
5612 9F 14          STS     SAVE     SAVE STACK POINTER
5614 8E 0000        LDS     #0       LOAD STACK POINTER WITH CLEAR VALUE
5617 CE 0020        LDX     #32      INITIALIZE LOOP CTR/POINTER
561A AF 8E   CLR3   STS     $8E,X    CLEAR TWO BYTES
561C 09             DEX              DECREMENT LOOP CTR/POINTER
```

```
561D 09                DEX
561E 26 FA             BNE    CLR3      CONTINUE CLEARING
5620 9E 14             LDS    SAVE      RESTORE STACK POINTER
5622 0E                CLI              ENABLE INTERRUPTS
5623 39                RTS              RETURN
                *
                *     PRINT KEY EXECUTION
                *
                *     JOHN KEITH    APRIL 19, 1974    REV A
                *
5624 97 0F      PRT1   STA A  DIGFLG    TERM. DIGIT ENT.
5626 8D 5CBC           JSR    FRMT+$14    FORMAT
5629 7E 6034           JMP    PRTDRV+7    PRINT AND RETURN
                *
                *     PRINT STACK
                *
                *     JOHN KEITH    JUNE 4, 1974    REV A
                *
     002E       TEMP   EQU    T1
562C 97 0F      PTSTK1 STA A  DIGFLG    TERM. DIGIT ENT.
562E 86 04             LDA A  #4        SET CNTR
5630 97 2E             STA A  TEMP,     SAVE CTR
5632 8D 57F1    PTSTK3 JSR    ROLLUP    POSITION DATA
5635 8D 5CBC           JSR    FRMT+$14    FORMAT CURRENT DATA IN X-REG
5638 8D 6034           JSR    PRTDRV+7    PRINT THE X-REG
563B 7A 002E           DEC    TEMP      DECREMENT LOOP CTR, DONE ?
563E 26 F2             BNE    PTSTK3    NO, CONTINUE
5640 39                RTS              RETURN
                *
                *     DIGIT ENTRY ROUTINES. KEYS SERVICED IN
                *     THIS PACKAGE INCLUDE DIGIT KEYS (0-9),
                *     DECIMAL POINT, CHANGE SIGN, AND ENTER EXPONENT
                *
                *
     0088       EXP    EQU    W
     0089       EXP1   EQU    W+1
     0014       DTEMP  EQU    TP1
     008A       EXP2   EQU    W+2
     7982       BWM2   EQU    $7982
                *
                *     CHANGE SIGN ROUTINE
                *     PART OF ENTER EXPONENT IS INCLUDED
                *
                *
                *     JOHN KEITH    MAY 8,1974    REV D
                *
5641 D7 2E      CHS    STA B  T1        SAVE RTS FLAG
5643 D6 0F             LDA B  DIGFLG    CHECK IF EEX FLAG IS SET
5645 C5 40             BIT B  #%01000000    TEST EEX FLAG, SET ?
5647 26 08             BNE    D1        YES, CHANGE SIGN OF EXPONENT MODIFIER
5649 96 91             LDA A  XR+1      NO, CHANGE MANTISSA SIGN
564B 88 80             EOR A  #$80      CHANGE SIGN
564D 97 91             STA A  XR+1      STORE UPDATED SIGN WORD
564F 20 4E             BRA    DEXIT1    DO NOT MODIFY STACK FLAG
5651 C8 10      D1     EOR B  #%00010000    TOGGLE NEGATIVE BIT (EXPONENT IND
5653 D7 0F             STA B  DIGFLG    SAVE UPDATED VALUE
5655 86 80             LDA A  #$80      LOAD CHANGE SIGN FLAG
5657 D6 90      D3     LDA B  XR        LOAD CURRENT VALUE OF EXPONENT
5659 D0 88             SUB B  EXP       SUBTRACT EXPONENT MODIFIER
565B D7 90             STA B  XR        RESTORE EXP
565D 4D                TST A            IS THIS CHS OR ENTER EXP DIGIT
565E 2A 11             BPL    D9        ENTER DIGIT
5660 70 0088    D5     NEG    EXP       COMPLEMENT EXPONENT MODIFIER (CHS)
5663 D6 88      D7     LDA B  EXP       PRESET B-REG
5665 DB 90             ADD B  XR        ADD MODIFIER TO EXPONENT
5667 8D 75B8           JSR    OVUNF+2    TEST FOR OVER/UNDERFLOW
566A 28 30             BVC    DEXIT     NONE, RETURN
566C 7F 000F    D8     CLR    DIGFLG    OVER/UNDERFLOW OCCURRED, SET NEW ENTR
566F 20 2B             BRA    DEXIT     RETURN
5671 D6 89      D9     LDA B  EXP1      LOAD LAST DIGIT USED IN EXP MODIFIER
5673 97 89             STA A  EXP1      STORE NEW DIGIT USED
5675 17                TBA              MULTIPLY OLD DIGIT BY 10 (BINARY)
5676 49                ROL A            PERFORM A *8 BY
5677 49                ROL A            SHIFTING THREE PLACES
5678 49                ROL A
5679 1B                ABA              COMPLETE *10 BY PERFORMING
```

```
00470 567A 1B            ABA              TWO ADDITIONS
00471 567B 9B 89         ADD A   EXP1     NOW ADD NEW DIGIT TO EXP MODIFIER
00472 567D 97 88         STA A   EXP      SAVE NEW EXP MODIFIER
00473 567F D6 0F         LDA B   DIGFLG   CHECK TO SEE WHAT SIGN EXP MOD SHOULD
00474 5681 C5 10         BIT B   #%00010000   IS NEGATIVE BIT SET ?
00475 5683 26 DB         BNE     D5       YES, CHANGE SIGN
00476 5685 20 DC         BRA     D7       NO
00478                  *
00479                  *    DECIMAL POINT ENTRY ROUTINE
00480                  *
00481                  *    JOHN KEITH    MAY 8, 1974    REV F
00482                  *
00483 5687 D7 2E       DECPNT STA B   T1       SAVE RTS FLAG
00484 5689 D6 0F         LDA B   DIGFLG   IS THIS A NEW DIGIT ENTRY ?
00485 568B 26 0B         BNE     D15      NO, SET FLAG
00486 568D BD 55EF D11   JSR     STKUP    DO A STACK UP IF ENABLED
00487 5690 BD 740A       JSR     XR0      CLEAR X-REG FOR NEW ENTRY
00488 5693 4F            CLR A
00489 5694 97 8A         STA A   EXP2     CLEAR EXP FOR 0.000.... CASE
00490 5696 97 88         STA A   EXP      CLEAR EXP FOR FRMT ROUTINE
00491 5698 CA 80       D15    ORA B   #%10000000   SET DECIMAL POINT FLAG
00492 569A D7 0F         STA B   DIGFLG   SAVE NEW FLAG VALUE
00493 569C 7F 000D DEXIT  CLR     STKFLG   DISABLE AUTO STACK LIFT
00494 569F D6 2E       DEXIT1 LDA B   T1       DO RTS ?
00495 56A1 26 01         BNE     FIX1     BRANCH IF NOT
00496 56A3 39            RTS              ELSE DO RETURN
00497 56A4 31          FIX1   INS              INCREMENT STACK POINTER
00498 56A5 31            INS              TO DELETE LAST RETURN VECTOR
00499 56A6 7E 7982       JMP     BWM2     RET. TO SUPERVISOR
00501                  *
00502                  *    ENTER EXPONENT ROUTINE
00503                  *    INCLUDES ROUTINE TO ENTER DIGITS IN MANTISSA
00504                  *
00505                  *    JOHN KEITH    APRIL 2, 1974    REV C
00506                  *
00507 56A9 D7 2E       EEX    STA B   T1       SAVE RTS FLAG
00508 56AB D6 0F         LDA B   DIGFLG   PREPARE TO SET EEX FLAG
00509 56AD C5 40         BIT B   #%01000000   IS EEX FLAG ALREADY SET ?
00510 56AF 26 EB         BNE     DEXIT    YES, EXIT FROM ROUTINE
00511 56B1 CA 40         ORA B   #%01000000   SET EEX FLAG
00512 56B3 D7 0F         STA B   DIGFLG   SAVE NEW FLAG VALUE
00513 56B5 97 88         STA A   EXP      CLEAR EXP MODIFIER LOCATION (A WAS CL
00514 56B7 97 89         STA A   EXP1     CLEAR LAST EXP DIGIT TEMP
00515 56B9 C4 0F         AND B   #%00001111   SAVE COUNTER PORTION OF DIGFLG
00516 56BB 26 DF         BNE     DEXIT    THIS IS NOT A NEW ENTRY, RETURN
00517 56BD BD 55EF       JSR     STKUP    NEW ENTRY, DO A STACK UP
00518 56C0 BD 740A       JSR     XR0    . CLEAR X-REG FOR NEW ENTRY
00519 56C3 4C            INC A            SET A TO 1 FOR NEW MANTISSA DIGIT
00520 56C4 D6 0F       D22    LDA B   DIGFLG   LOAD MANTISSA COUNTER
00521 56C6 C4 0F         AND B   #%00001111   SAVE COUNTER
00522 56C8 C1 0A         CMP B   #10      IS COUNTER=10 ?
00523 56CA 24 D0         BCC     DEXIT    YES, IGNORE ENTRY
00524 56CC 54          D23    LSR B            DIVIDE CTR BY 2, SAVE REMAINDER IN CA
00525 56CD 25 04         BCS     D25      CTR WAS ODD, SKIP DIGIT SHIFT
00526 56CF 48            ASL A            POSITION NEW DIGIT
00527 56D0 48            ASL A
00528 56D1 48            ASL A
00529 56D2 48            ASL A
00530 56D3 D7 15       D25    STA B   DTEMP+1   SAVE COUNTER
00531 56D5 7F 0014       CLR     DTEMP    CLEAR FIRST BYTE OF CTR
00532 56D8 DE 14         LDX     DTEMP    LOAD CTR INTO INDEX
00533 56DA AA 92         ORA A   XR+2,X   ADD NEW DIGIT TO MANTISSA
00534 56DC A7 92         STA A   XR+2,X   STORE RESULT
00535 56DE 7C 000F       INC     DIGFLG   INC COUNTER
00536 56E1 20 89       D27    BRA     DEXIT    RETURN TO SUPERVISOR
00538                  *
00539                  *    DIGIT ACCEPTANCE ROUTINE
00540                  *
00541                  *    JOHN KEITH    APRIL 2, 1974 $  REV D
00542                  *
00543 56E3 4C          DIGIT9 INC A            BUILD APPROPRIATE DIGIT
00544 56E4 4C          DIGIT8 INC A            IN A-REGISTER
00545 56E5 4C          DIGIT7 INC A
00546 56E6 4C          DIGIT6 INC A
00547 56E7 4C          DIGIT5 INC A
00548 56E8 4C          DIGIT4 INC A
```

```
56E9 4C      DIGIT3 INC A
56EA 4C      DIGIT2 INC A
56EB 4C      DIGIT1 INC A
56EC D7 2E   DIGIT0 STA B  T1        SAVE RTS FLAG
56EE D6 0F          LDA B  DIGFLG    CHECK CURRENT STATUS
56F0 26 0F          BNE    D35       IT IS NOT A NEW ENTRY
56F2 BD 55EF        JSR    STKUP     DO A STACK UP IF ENABLED
56F5 BD 740A        JSR    XR0       CLEAR X-REG FOR NEW ENTRY
56F8 D7 8B          STA B  EXP       CLEAR EXP FOR FRMT ROUTINE
56FA D7 8A          STA B  EXP2      CLEAR EXP2 FOR FRMT
56FC 4D             TST A            WAS DIGIT A ZERO ?
56FD 27 3F          BEQ    D28       YES: GO SET "LEADING ZERO" BIT
56FF 20 C3          BRA    D22       NO, ENTER DIGIT IN MANTISSA
5701 C1 20   D35    CMP B  #$20      ONLY "LEADING ZERO" BIT SET ?
5703 26 05          BNE    D36       BRANCH IF NOT THE CASE
5705 4D             TST A            ANOTHER LEADING ZERO ?
5706 27 D9          BEQ    D27       RETURN IF YES
5708 20 BA          BRA    D22       ENTER FIRST NON-ZERO DIGIT
570A C5 40   D36    BIT B  #$40      IS EEX FLAG SET ?
570C 27 03          BEQ    D39       NO. CHECK OTHER FLAG
570E 7E 5657        JMP    D3        YES, ENTER NEW DIGIT IN EXPONENT
5711 C4 80   D39    AND B  #%10000000  IS DECIMAL POINT FLAG SET ?
5713 26 0E          BNE    D43       YES
5715 5C             INC B            NO, SET B TO 1 FOR VALUE TO ADD TO EX
5716 DB 90          ADD B  XR        INC EXPONENT
5718 97 8B          STA A  W+3       SAVE DIGIT
571A BD 75B8        JSR    OVUNF+2    TEST FOR OVER/UNDERFLOW
571D 29 11          BVS    D45       OVERFLOW EXIT
571F 96 8B          LDA A  W+3       NO OVERFLOW, RELOAD DIGIT
5721 20 A1          BRA    D22       ENTER DIGIT INTO MANTISSA
5723 D6 92   D43    LDA B  XR+2      IS MANTISSA=0 ?
5725 26 9D          BNE    D22       NO. ENTER DIGIT INTO MANTISSA
5727 7A 008A        DEC    EXP2      YES. DECREMENT EXPONENT TEMPORARY
572A D6 8A          LDA B  EXP2      CHECK IF UNDERFLOW OCCURRED
572C C1 9D          CMP B  #@235     UNDERFLOW ?
572E 24 03          BCC    D47       NO. CONTINUE
5730 7E 566C D45    JMP    D8        SET NEW DIGIT ENTRY AND EXIT
5733 4D      D47    TST A            WAS DIGIT ENTERED A ZERO
5734 27 AB          BEQ    D27       YES, IGNORE
5736 7C 008A        INC    EXP2      RESTORE EXP2 FOR FORMATTER
5739 D7 90          STA B  XR        VALUE OF EXP INTO X-REG
573B 7E 56C4        JMP    D22       AND ENTER DIGIT INTO MNATISSA
573E C6 20   D28    LDA B  #$20      GET "LEADING ZERO" FLAG
5740 D7 0F          STA B  DIGFLG    SAVE IT IN D.E. FLAG
5742 20 90          BRA    D27       RETURN TO SUPV.
5744 0007           RMB    7
             *
             *    MATH FUNCTION ACCESS   +-*/
             *
             *    JOHN KEITH    APRIL 3, 1974    REV A
             *
5748 8D 0C   M1     BSR    SETUP     SAVE X, LOAD INDEX
574D BD 75FC        JSR    FPA       ADD
5750 20 13          BRA    M28       GO TO COMMON EXIT
5752 8D 05   M10    BSR    SETUP     SAVE X, LOAD INDEX
5754 BD 75F6        JSR    FPS       SUBTRACT
5757 20 0C          BRA    M28       GO TO COMMON EXIT
5759 BD 55E9 SETUP  JSR    TXL       TRANSFER X TO LST X
575C CE 0098        LDX    #YR       SET INDEX REG TO Y
575F 39             RTS              RETURN
5760 8D F7   M20    BSR    SETUP     SAVE X, LOAD INDEX
5762 BD 7735        JSR    FPM       MULTIPLY
5765 7E 55DA M28    JMP    PSD       DROP STACK
5768 8D EF   M30    BSR    SETUP     SAVE X, LOAD INDEX
576A BD 7793        JSR    FPD       DIVIDE
576D 20 F6          BRA    M28       GO TO COMMON EXIT
576F BD 55E9 M40    JSR    TXL       TRANSFER X TO LST X
5772 7E 68A9        JMP    TAN       DO TAN X
5775 BD 55E9 M50    JSR    TXL       TRANSFER X TO LST X
5778 7E 69C3        JMP    ATN       DO ATAN X
577B BD 55E9 M60    JSR    TXL       SAVE LAST X
577E 7E 6E65        JMP    SQRT      DO SQRT X
5781 BD 55E9 M70    JSR    TXL       SAVE LAST X
5784 7E 6AC9        JMP    EXPN      DO EXPN X
5787 BD 55E9 M80    JSR    TXL       SAVE LAST X
```

```
5788 7E 6A58          JMP     NTLN        DO LN X
578D BD 55E9 M100     JSR     TXL         SAVE X IN LAST X
5790 7E 73E6          JMP     RECIP       DO 1/X
5793 BD 55E9 M110     JSR     TXL         SAVE X IN LAST X
5796 7E 6B94          JMP     SIN         DO SIN X
5799 BD 55E9 M120     JSR     TXL         SAVE X IN LAST X
579C 7E 6BF2          JMP     ASIN        DO ASIN X
579F BD 55E9 M130     JSR     TXL         SAVE X LAST X.
57A2 7E 6B9A          JMP     COS         DO COS X
57A5 BD 55E9 M140     JSR     TXL         SAVE X IN LAST X
57A8 7E 6BF7          JMP     ACOS        DO ACOS X
57AB BD 55E9 M150     JSR     TXL         X TO LAST X
57AE 7E 6F52          JMP     IOUPX       DO 10**X
57B1 BD 55E9 M160     JSR     TXL         X TO LAST X
57B4 7E 6FE9          JMP     YUPX        DO Y**X
57B7 BD 55E9 M170     JSR     TXL         X TO LAST X
57BA 7E 6FA7          JMP     LOG10       DO LOG X
                 *
                 *    SUBROUTINE TO LOAD MESSAGES INTO BUFFER
                 *
                 *    JOHN KEITH    APRIL 23, 1974    REV A
                 *
     0016        BFPTR  EQU   TP2
     0018        MSGPTR EQU   TP3
57BD E6 00       LDMSG2 LDA B X           LOAD FIRST CHARACTER
57BF 08          MSGLP  INX               INCREMENT MESSAGE PTR
57C0 DF 18              STX   MSGPTR      STORE MESSAGE PTR
57C2 DE 16              LDX   BFPTR       LOAD INDEX WITH BUFFER PTR
57C4 C4 7F              AND B #$7F        ZERO MSB
57C6 4D                 TST A             LIST ROUTINE CALL?
57C7 26 02              BNE   NTLST       NO, ERROR MESSAGE
57C9 CB 20              ADD B #$20        ADD OFFSET BACK TO GET ASCII
57CB E7 00       NTLST  STA B X           STORE CHARACTER IN BUFFER
57CD 08                 INX               INCR BUFFER PTR
57CE DF 16              STX   BFPTR       SAVE IT
57D0 DE 18              LDX   MSGPTR      RELOAD MESSAGE PTR
57D2 E6 00              LDA B X           LOAD ANOTHER CHARACTER
57D4 2A E9              BPL   MSGLP       DONE LOADING MESSAGE?
57D6 39                 RTS               YES, RETURN
                 *
                 *    ENTER PI 3.14159265360
                 *
                 *    JOHN KEITH    APRIL 3, 1974    REV A
                 *
57D7 91 0F       ENTPI1 CMP A DIGFLG      DOING DIGIT ENTRY ?
57D9 27 05              BEQ   ENTPI2      BRANCH IF NOT
57DB 97 0F              STA A DIGFLG      ELSE TERMINATE IT
57DD 43                 COM A             SET MSB
57DE 97 0D              STA A STKFLG      ENABLE LIFT
57E0 BD 55EF     ENTPI2 JSR   STKUP       DO STACK UP IF ENABLED
57E3 CE 57E9            LDX   #PI         SET INDEX REGISTER TO PI
57E6 7E 743B            JMP   TXXR        TRANSFER PI
57E9 0000        PI     FDB   $0000       FORM PI IN ROM
57EB 3141               FDB   $3141
57ED 5926               FDB   $5926
57EF 5360               FDB   $5360
                 *
                 *ROLL UP ROUTINE
                 *
57F1 BD 55B2     ROLLUP JSR   ROLLD       DO 3 ROLL DOWNS AND RETURN
57F4 BD 55B2            JSR   ROLLD
57F7 7E 55B2            JMP   ROLLD
                 *
                 *LINE FEED ROUTINE
                 *
57FA BD 5D75     LF     JSR   BLANK       BLANK THE PRINT BUFFER
57FD 7E 6034            JMP   PRTDRV+7      PRINT BLANKS
7C2E                    ORG   $7C2E
7C2E 57D7               FDB   ENTPI1
7C5A                    ORG   $7C5A
7C5A 556F               FDB   INTFR5
7C26                    ORG   $7C26
7C26 559B               FDB   CLXR1
7C20                    ORG   $7C20
7C20 55A6               FDB   ENTER1
7C2A                    ORG   $7C2A
```

```
00707 7C2A 55AC        FDB    XEY1
00708 7C2C             ORG    $7C2C
00709 7C2C 55B2        FDB    ROLLD1
00710 7C30             ORG    $7C30
00711 7C30 55C9        FDB    RLSTX1
00712 7C28             ORG    $7C28
00713 7C28 5611        FDB    CLR1
00714 7D64             ORG    $7D64
00715 7D64 5624        FDB    PRT1
00716 7C72             ORG    $7C72
00717 7C72 562C        FDB    PTSTK1
00718 7C22             ORG    $7C22
00719 7C22 56A9        FDB    EEX
00720 7C24 5641        FDB    CHS
00721 7C02             ORG    $7C02
00722 7C02 56EC        FDB    DIGIT0
00723 7C04 56EB        FDB    DIGIT1
00724 7C06 56EA        FDB    DIGIT2
00725 7C08 56E9        FDB    DIGIT3
00726 7C0A 56E8        FDB    DIGIT4
00727 7C0C 56E7        FDB    DIGIT5
00728 7C0E 56E6        FDB    DIGIT6
00729 7C10 56E5        FDB    DIGIT7
00730 7C12 56E4        FDB    DIGIT8
00731 7C14 56E3        FDB    DIGIT9
00732 7C16 5687        FDB    DECPNT
00733 7C18             ORG    $7C18
00734 7C18 574B        FDB    M1
00735 7C1A 5752        FDB    M10
00736 7C1C 5760        FDB    M20
00737 7C1E 5760        FDB    M30
00738 7C32             ORG    $7C32
00739 7C32 5793        FDB    M110,M130,M40,M120,M140,M50
00740 7C3E 5787        FDB    M80
00741 7C40 57B7        FDB    M170
00742 7C4A             ORG    $7C4A
00743 7C4A 577B        FDB    M60
00744 7C4C 578D        FDB    M100
00745 7C42             ORG    $7C42
00746 7C42 5781        FDB    M70
00747 7C44 57AB        FDB    M150
00748 7C46 5781        FDB    M160
00749 7C48             ORG    $7C48
00750 7C48 57F1        FDB    ROLLUP
00751 7C7A             ORG    $7C7A
00752 7C7A 57FA        FDB    LF
00755                  END
```

SYMBOL TABLE

| | | | | | | | | | | | |
|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 00BA | MT | 7E00 | TERMN7 | 0030 | IMED | 0040 | PARCD | 00C0 |
| PAREX | 0080 | NTBL | 0000 | DOTS | 5EC0 | PRTDRV | 602D | FRMT | 5CA8 | BLÁNK | 5075 |
| LDMSG | 57B0 | ROLLD | 55B2 | ROLLU | 57F1 | PSD | 550A | TXL | 55E9 | STKUP | 55EF |
| MAD | 749B | CMP | 74AA | NOR | 74D6 | TXW | 7424 | TXXR | 7438 | EXXR | 7452 |
| ARSR | 753B | OVUNF | 75B6 | OVERF | 75DD | XR0 | 740A | XRNINE | 75C8 | UNDRF | 75F1 |
| IMULT | 7689 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |
| RECIP | 73E6 | TXRX | 73F3 | CONST | 6800 | FPDBRC | .6898 | TAN | 68A9 | ATN | 69C3 |
| DSZERO | 6A46 | NTLN | 6A58 | EXPN | 6AC9 | SIN | 6994 | COS | 699A | ASIN | 68F2 |
| ACOS | 68F7 | PH1 | 6C5D | PH2 | 6C8D | PH3 | 6D34 | PH4 | 6DD0 | LSFT8 | 6E47 |

| | | | | | | | | | | | |
|---|---|---|---|---|---|---|---|---|---|---|---|
| SQRT | 6E65 | MAD8 | 6F2C | CMPR | 53E4 | IOUPX | 6F52 | LOG10 | 6FA7 | YUPX | 6FE9 |
| RTOP | 7328 | PTOR | 7386 | REGPTR | 0014 | INTFR1 | 5550 | INTFR2 | 555C | INTFR3 | 5564 |
| INTFR4 | 556C | INTFR5 | 556F | INTFR6 | 5579 | INTFR7 | 5590 | INTFR9 | 559A | CLXP1 | 5598 |
| LDEX | 55A0 | ENTER1 | 55A6 | XEY1 | 55AC | ROLLD1 | 5592 | ROLLD5 | 5595 | RLSTX1 | 55C9 |
| RLSTX2 | 55D2 | PSD1 | 55DA | PSD5 | 55DD | STEMP | 0020 | STKUP1 | 55EF | STKUP2 | 55F4 |
| STKUP3 | 55FA | STKUP9 | 5610 | SAVE | 0014 | CLR1 | 5611 | CLR3 | 561A | PRT1 | 5624 |
| TEMP | 002E | PTSTK1 | 562C | PTSTK3 | 5632 | EXP | 0088 | EXP1 | 0089 | DTEMP | 0014 |
| EXP2 | 008A | BWM2 | 7982 | CHS | 5641 | D1 | 5651 | D3 | 5657 | D5 | 5660 |
| D7 | 5663 | D8 | 566C | D9 | 5671 | DECPNT | 5687 | D11 | 568D | D15 | 5698 |
| DEXIT | 569C | DEXIT1 | 569F | FIX1 | 56A4 | EEX | 56A9 | D22 | 56C4 | D23 | 56CC |
| D25 | 56D3 | D27 | 56E1 | DIGIT9 | 56E3 | DIGIT8 | 56E4 | DIGIT7 | 56E5 | DIGIT6 | 56E6 |
| DIGIT5 | 56E7 | DIGIT4 | 56E8 | DIGIT3 | 56E9 | DIGIT2 | 56EA | DIGIT1 | 56EB | DIGIT0 | 56EC |
| D35 | 5701 | D36 | 570A | D39 | 5711 | D43 | 5723 | D45 | 5730 | D47 | 5733 |
| D28 | 573E | M1 | 574B | M10 | 5752 | SETUP | 5759 | M20 | 5760 | M28 | 5765 |
| M30 | 5768 | M40 | 576F | M50 | 5775 | M60 | 5779 | M70 | 5781 | M80 | 5787 |
| M100 | 578D | M110 | 5793 | M120 | 5799 | M130 | 579F | M140 | 57A5 | M150 | 57AB |
| M160 | 57B1 | M170 | 57B7 | BFPTR | 0016 | MSGPTR | 0018 | LDMSG2 | 579D | MSGLP | 57BF |
| NTLST | 57C8 | ENTPI1 | 57D7 | ENTPI2 | 57E0 | PI | 57E9 | ROLLUP | 57F1 | LF | 57FA |

```
00215                    OPT   LIST,MEM
00218 5800               ORG   $5800
00219 5800 2E     TABLE  FCB   $2E      NOP
00220 5801 2F            FCB   $2F
00221 5802 30            FCB   $30
00222 5803 90            FCB   $90      ZERO
00223 5804 91            FCB   $91      ONE
00224 5805 92            FCB   $92      TWO
00225 5806 93            FCB   $93      THREE
00226 5807 94            FCB   $94      FOUR
00227 5808 95            FCB   $95      FIVE
00228 5809 96            FCB   $96      SIX
00229 580A 97            FCB   $97      SEVEN
00230 580B 98            FCB   $98      EIGHT
00231 580C 99            FCB   $99      NINE
00232 580D 8E            FCB   $8E      DECIMAL POINT
00233 580E 88            FCB   $88      PLUS SIGN
00234 580F 8D            FCB   $8D      MINUS SIGN
00235 5810 8A            FCB   $8A      ASTERISK (MULTIPLY)
00236 5811 8B            FCB   $8B      DIVIDE SIGN
00237 5812 A5            FCB   $A5      ENTER
00238 5813 2E            FCB   $2E
00239 5814 34            FCB   $34
00240 5815 25            FCB   $25
00241 5816 32            FCB   $32
00242 5817 3E            FCB   $3E
00243 5818 A5            FCB   $A5      ENTER EXPONENT
00244 5819 25            FCB   $25
00245 581A 38            FCB   $38
00246 581B 8B            FCB   $8B      CHANGE SIGN
00247 581C 01            FCB   $1
00248 581D 0D            FCB   $D
00249 581E A3            FCB   $A3      CLEAR X
00250 581F 2C            FCB   $2C
00251 5820 38            FCB   $38
00252 5821 A3            FCB   $A3      CLEAR
00253 5822 2C            FCB   $2C
00254 5823 25            FCB   $25
00255 5824 21            FCB   $21
00256 5825 32            FCB   $32
00257 5826 B8            FCB   $B8      X EXCHANGE Y
00258 5827 01            FCB   $1
00259 5828 39            FCB   $39
00260 5829 B2            FCB   $B2      ROLL DOWN
00261 582A 2F            FCB   $2F
00262 582B 2C            FCB   $2C
00263 582C 2C            FCB   $2C
00264 582D 3F            FCB   $3F
00265 582E 8D            FCB   $8D      PI
00266 582F AC            FCB   $AC      LAST X
00267 5830 33            FCB   $33
00268 5831 34            FCB   $34
00269 5832 38            FCB   $38
00270 5833 B3            FCB   $B3      SIN
00271 5834 29            FCB   $29
```

```
00272 5835 2E          FCB    $2E
00273 5836 A3          FCB    $A3    COS
00274 5837 2F          FCB    $2F
00275 5838 33          FCB    $33
00276 5839 B4          FCB    $B4    TAN
00277 583A 21          FCB    $21
00278 583B 2E          FCB    $2E
00279 583C A1          FCB    $A1    ASIN
00280 583D 33          FCB    $33
00281 583E 29          FCB    $29
00282 583F 2E          FCB    $2E
00283 5840 A1          FCB    $A1    ACOS
00284 5841 23          FCB    $23
00285 5842 2F          FCB    $2F
00286 5843 33          FCB    $33
00287 5844 A1          FCB    $A1    ATAN
00288 5845 34          FCB    $34
00289 5846 21          FCB    $21
00290 5847 2E          FCB    $2E
00291 5848 AC          FCB    $AC    LN
00292 5849 2E          FCB    $2E
00293 584A AC          FCB    $AC    LOG
00294 584B 2F          FCB    $2F
00295 584C 27          FCB    $27
00296 584D B2          FCB    $B2    E^X
00297 584E 3E          FCB    $3E
00298 584F 38          FCB    $38
00299 5850 91          FCB    $91    10^X
00300 5851 10          FCB    $10
00301 5852 3E          FCB    $3E
00302 5853 38          FCB    $38
00303 5854 B9          FCB    $B9    Y^X
00304 5855 3E          FCB    $3E
00305 5856 38          FCB    $38
00306 5857 B2          FCB    $B2    ROLL UP
00307 5858 2F          FCB    $2F
00308 5859 2C          FCB    $2C
00309 585A 2C          FCB    $2C
00310 585B 3E          FCB    $3E
00311 585C B3          FCB    $B3    SQUARE ROOT
00312 585D 31          FCB    $31
00313 585E 32          FCB    $32
00314 585F 34          FCB    $34
00315 5860 91          FCB    $91    1/X
00316 5861 0F          FCB    $F
00317 5862 38          FCB    $38
00318 5863 B3          FCB    $B3    SUM+
00319 5864 35          FCB    $35
00320 5865 2D          FCB    $2D
00321 5866 0B          FCB    $B
00322 5867 B3          FCB    $B3    SUM-
00323 5868 35          FCB    $35
00324 5869 2D          FCB    $2D
00325 586A 0D          FCB    $D
00326 586B B2          FCB    $B2    RECT TO POLAR
00327 586C 3C          FCB    $3C
00328 586D 30          FCB    $30
00329 586E B0          FCB    $B0    POLAR TO RECT
00330 586F 3C          FCB    $3C
00331 5870 32          FCB    $32
00332 5871 A1          FCB    $A1    ACC+
00333 5872 23          FCB    $23
00334 5873 23          FCB    $23
00335 5874 0B          FCB    $B
00336 5875 A1          FCB    $A1    ACC-
00337 5876 23          FCB    $23
00338 5877 23          FCB    $23
00339 5878 0D          FCB    $D
00340 5879 A9          FCB    $A9    INTEGER
00341 587A 2E          FCB    $2E
00342 587B 34          FCB    $34
00343 587C A4          FCB    $A4    DEG
00344 587D 25          FCB    $25
00345 587E 27          FCB    $27
00346 587F 33          FCB    $33
00347 5880 BC          FCB    $BC    TO D.MS
```

```
5881 24    FCB  $24
5882 0E    FCB  $E
5883 2D    FCB  $2D
5884 33    FCB  $33
5885 A4    FCB  $A4    FROM D.MS
5886 0E    FCB  $E
5887 2D    FCB  $2D
5888 33    FCB  $33
5889 3C    FCB  $3C
588A A9    FCB  $A9    IF +
588B 26    FCB  $26
588C 00    FCB  $0
588D 08    FCB  $8
588E A9    FCB  $A9    IF -
588F 26    FCB  $26
5890 00    FCB  $0
5891 0D    FCB  $D
5892 A9    FCB  $A9    IF 0
5893 26    FCB  $26
5894 00    FCB  $0
5895 10    FCB  $10
5896 A9    FCB  $A9    IF X=Y
5897 26    FCB  $26
5898 00    FCB  $0
5899 38    FCB  $38
589A 1D    FCB  $1D
589B 39    FCB  $39
589C A9    FCB  $A9    IF X<Y
589D 26    FCB  $26
589E 00    FCB  $0
589F 38    FCB  $38
58A0 1C    FCB  $1C
58A1 39    FCB  $39
58A2 A9    FCB  $A9    IF X>=Y
58A3 26    FCB  $26
58A4 00    FCB  $0
58A5 38    FCB  $38
58A6 1B    FCB  $1B
58A7 39    FCB  $39
58A8 AD    FCB  $AD    MEAN AND STANDARD DEVIATION
58A9 2E    FCB  $2E
58AA 06    FCB  $6
58AB 33    FCB  $33
58AC 24    FCB  $24
58AD 83    FCB  $83    NO. OF REGISTERS
58AE 32    FCB  $32
58AF 25    FCB  $25
58B0 27    FCB  $27
58B1 33    FCB  $33
58B2 80    FCB  $80    PRINT STACK
58B3 32    FCB  $32
58B4 34    FCB  $34
58B5 33    FCB  $33
58B6 34    FCB  $34
58B7 28    FCB  $28
58B8 82    FCB  $82    ROUND
58B9 2F    FCB  $2F
58BA 35    FCB  $35
58BB 2E    FCB  $2E
58BC 24    FCB  $24
58BD 82    FCB  $82    RCL ACC+
58BE 00    FCB  $0
58BF 21    FCB  $21
58C0 23    FCB  $23
58C1 23    FCB  $23
58C2 0B    FCB  $B
58C3 A3    FCB  $A3    CLEAR ALPHA REGISTERS
58C4 2C    FCB  $2C
58C5 32    FCB  $32
58C6 21    FCB  $21
58C7 3C    FCB  $3C
58C8 2A    FCB  $2A
58C9 83    FCB  $83    SPACE
58CA 30    FCB  $30
58CB 21    FCB  $21
```

```
58CC 23          FCB   $23
58CD 25          FCB   $25
58CE A7          FCB   $A7     GRADS
58CF 32          FCB   $32
58D0 21          FCB   $21
58D1 24          FCB   $24
58D2 33          FCB   $33
58D3 82          FCB   $82     RADS
58D4 21          FCB   $21
58D5 24          FCB   $24
58D6 33          FCB   $33
58D7 C8          FCB   $C8
58D8 33          FCB   $33     SFG
58D9 26          FCB   $26
58DA 27          FCB   $27
58DB C8          FCB   $C8
58DC 29          FCB   $29     IF SFG
58DD 26          FCB   $26
58DE 00          FCB   $0
58DF 33          FCB   $33
58E0 26          FCB   $26
58E1 27          FCB   $27
58E2 C8          FCB   $C8
58E3 23          FCB   $23     CFG
58E4 26          FCB   $26
58E5 27          FCB   $27
58E6 C8          FCB   $C8
58E7 29          FCB   $29     IF CFG
58E8 26          FCB   $26
58E9 00          FCB   $0
58EA 23          FCB   $23
58EB 26          FCB   $26
58EC 27          FCB   $27
58ED A7  TABLE1  FCB   $A7     GO TO
58EE 2F          FCB   $2F
58EF 34          FCB   $34
58F0 2F          FCB   $2F
58F1 A7          FCB   $A7     GOSUB
58F2 2F          FCB   $2F
58F3 33          FCB   $33
58F4 35          FCB   $35
58F5 22          FCB   $22
58F6 C1          FCB   $C1     GOTO
58F7 80          FCB   $80
58F8 C1          FCB   $C1     GOSUB
58F9 81          FCB   $81
58FA CA          FCB   $CA
58FB 33          FCB   $33     STORE
58FC 34          FCB   $34
58FD 2F          FCB   $2F
58FE CA          FCB   $CA
58FF 33          FCB   $33     STORE+
5900 34          FCB   $34
5901 2F          FCB   $2F
5902 0B          FCB   $B
5903 CA          FCB   $CA
5904 33          FCB   $33     STORE-
5905 34          FCB   $34
5906 2F          FCB   $2F
5907 0D          FCB   $D
5908 CA          FCB   $CA
5909 33          FCB   $33     STORE*
590A 34          FCB   $34
590B 2F          FCB   $2F
590C 0A          FCB   $A
590D CA          FCB   $CA
590E 33          FCB   $33     STORE/
590F 34          FCB   $34
5910 2F          FCB   $2F
5911 3B          FCB   $3B
5912 CA          FCB   $CA
5913 32          FCB   $32     RECALL
5914 23          FCB   $23
5915 2C          FCB   $2C
5916 C5          FCB   $C5
5917 23          FCB   $23     5 MAINFRAME CALLS
```

```
5918 21        FCB    $21
5919 2C        FCB    $2C
591A 2C        FCB    $2C
591B B6        FCB    $B6      VERIFY
591C 25        FCB    $25
591D 32        FCB    $32
591E 29        FCB    $29
591F 26        FCB    $26
5920 39        FCB    $39
5921 AC        FCB    $AC      LOAD & GO
5922 24        FCB    $24
5923 06        FCB    $6
5924 27        FCB    $27
5925 2F        FCB    $2F
5926 B2        FCB    $B2      RECORD DATA (RCDATA)
5927 23        FCB    $23
5928 24        FCB    $24
5929 21        FCB    $21
592A 34        FCB    $34
592B 21        FCB    $21
592C B2        FCB    $B2      REWIND
592D 25        FCB    $25
592E 37        FCB    $37
592F 29        FCB    $29
5930 2E        FCB    $2E
5931 24        FCB    $24
5932 B0        FCB    $B0      PAUSE
5933 21        FCB    $21
5934 35        FCB    $35
5935 33        FCB    $33
5936 25        FCB    $25
5937 C3        FCB    $C3
5938 26        FCB    $26      FOR
5939 2F        FCB    $2F
593A 32        FCB    $32
593B C3        FCB    $C3
593C 2E        FCB    $2E      NEXT
593D 25        FCB    $25
593E 38        FCB    $38
593F 34        FCB    $34
5940 B3        FCB    $B3      STOP
5941 34        FCB    $34
5942 2F        FCB    $2F
5943 30        FCB    $30
5944 A5        FCB    $A5      END
5945 2E        FCB    $2E
5946 24        FCB    $24
5947 B0        FCB    $B0      PRINT
5948 32        FCB    $32
5949 29        FCB    $29
594A 2E        FCB    $2E
594B 34        FCB    $34
594C B2        FCB    $B2      RETURN
594D 25        FCB    $25
594E 34        FCB    $34
594F 35        FCB    $35
5950 32        FCB    $32
5951 2E        FCB    $2E
5952 A5        FCB    $A5      END ALPHA
5953 2E        FCB    $2E
5954 24        FCB    $24
5955 48        FCB    $48
5956 B2        FCB    $B2      RECORD PROGRAM (RCPRGM)
5957 23        FCB    $23
5958 30        FCB    $30
5959 32        FCB    $32
595A 27        FCB    $27
595B 2D        FCB    $2D
595C B2        FCB    $B2      RECORD SECURED (RCSCRD)
595D 23        FCB    $23
595E 33        FCB    $33
595F 25        FCB    $25
5960 23        FCB    $23
5961 AD        FCB    $AD      MARK
5962 21        FCB    $21
5963 32        FCB    $32
```

```
00575 5964 2B          FCB   $2B
00576 5965 A9          FCB   $A9      IDENTIFY
00577 5966 24          FCB   $24
00578 5967 25          FCB   $25
00579 5968 2E          FCB   $2E
00580 5969 34          FCB   $34
00581 596A AC          FCB   $AC      LOAD
00582 596B 2F          FCB   $2F
00583 596C 21          FCB   $21
00584 596D 24          FCB   $24
00585 596E 80          FCB   $80      1 EMPTY SLOT
00586 596F A6          FCB   $A6      FIX
00587 5970 29          FCB   $29
00588 5971 38          FCB   $38
00589 5972 B3          FCB   $B3      SCI
00590 5973 23          FCB   $23
00591 5974 29          FCB   $29
00592 5975 B3          FCB   $B3      SCI3
00593 5976 23          FCB   $23
00594 5977 29          FCB   $29
00595 5978 13          FCB   $13
00596 5979 C1          FCB   $C1
00597 597A C0          FCB   $C0
00598 597B AC          FCB   $AC      LABEL
00599 597C 22          FCB   $22
00600 597D 2C          FCB   $2C
00601 597E C1          FCB   $C1      GOSUB LBL
00602 597F 81          FCB   $81
00603 5980 C1          FCB   $C1      GOTO LBL
00604 5981 80          FCB   $80
00605 5982 B2          FCB   $B2      RECALL INDIRECT
00606 5983 23          FCB   $23
00607 5984 2C          FCB   $2C
00608 5985 00          FCB   $0
00609 5986 29          FCB   $29
00610 5987 B3          FCB   $B3      STORE INDIRECT
00611 5988 34          FCB   $34
00612 5989 2F          FCB   $2F
00613 598A 00          FCB   $0
00614 598B 29          FCB   $29
00615 598C B3          FCB   $B3      STO+ INDIRECT
00616 598D 34          FCB   $34
00617 598E 2F          FCB   $2F
00618 598F 0B          FCB   $B
00619 5990 00          FCB   $0
00620 5991 29          FCB   $29
00621 5992 B3          FCB   $B3      STO- INDIRECT
00622 5993 34          FCB   $34
00623 5994 2F          FCB   $2F
00624 5995 0D          FCB   $D
00625 5996 00          FCB   $0
00626 5997 29          FCB   $29
00627 5998 B3          FCB   $B3      STO* INDIRECT
00628 5999 34          FCB   $34
00629 599A 2F          FCB   $2F
00630 599B 0A          FCB   $A
00631 599C 00          FCB   $0
00632 599D 29          FCB   $29
00633 599E B3          FCB   $B3      STO/ INDIRECT
00634 599F 34          FCB   $34
00635 59A0 2F          FCB   $2F
00636 59A1 3B          FCB   $3B
00637 59A2 00          FCB   $0
00638 59A3 29          FCB   $29
00639 59A4 C2          FCB   $C2      2 STORES
00640 59A5 B5          FCB   $B5
00641 59A6 C2          FCB   $C2      2 STO+
00642 59A7 BE          FCB   $BE
00643 59A8 C2          FCB   $C2      2 STO-
00644 59A9 98          FCB   $98
00645 59AA C2          FCB   $C2      2 STO*
00646 59AB A2          FCB   $A2
00647 59AC C2          FCB   $C2      2 STO/
00648 59AD AC          FCB   $AC
00649 59AE C2          FCB   $C2      2 RECALLS
00650 59AF B6          FCB   $B6
```

```
59B0 C2          FCB    $C2       2 RCL IND
59B1 E2          FCB    $E2
59B2 C2          FCB    $C2       2 STO IND
59B3 E3          FCB    $E3
59B4 C2          FCB    $C2       2 STO+ IND
59B5 E4          FCB    $E4
59B6 C2          FCB    $C2       2 STO- IND
59B7 E5          FCB    $E5
59B8 C2          FCB    $C2       2 STO* IND
59B9 E6          FCB    $E6
59BA C2          FCB    $C2       2 STO/ IND
59BB E7          FCB    $E7
59BC D0          FCB    $D0       16 GOSUBS
59BD 81          FCB    $81
59BE D0          FCB    $D0       16 GOTOS
59BF 80          FCB    $80
59C0 D0     FTBL FCB    $D0       PRINT ALPHA
59C1 52          FCB    $52
59C2 4E          FCB    $4E
59C3 54          FCB    $54
59C4 68          FCB    $68
59C5 D4     TSNL FCB    $D4       TAB
59C6 41          FCB    $41
59C7 42          FCB    $42
59C8 20          FCB    $20
59C9 20          FCB    $20
59CA CC          FCB    $CC       LINE
59CB 49          FCB    $49
59CC 4E          FCB    $4E
59CD 45          FCB    $45
59CE 20          FCB    $20
59CF D3          FCB    $D3       SHIFT
59D0 48          FCB    $48
59D1 49          FCB    $49
59D2 46          FCB    $46
59D3 54          FCB    $54
            *
            *
            * THIS ROUTINE PROVIDES A PROGRAM LISTING
            * FROM WHERE THE PROGRAM COUNTER IS
            * SETTING UNTIL AN "END" STATEMENT IS REACHED
            * OR UNTIL THE RUN/STOP KEY IS HIT.  IT ALSO
            * PROVIDES A KEYLOG IN THE PROGRAM MODE
            * WHEN THE PRINT ALL SWITHCH IS ON.
            *
            *
            * DAVE UHLRICH   OCTOBER 15,1974   LIST   REV I
            *
            *
     797B   BWM    EQU    $797B
     001C   SVINS  EQU    TP5
     001D   SAVE   EQU    TP5S
     0014   GIOFLG EQU    TP1
     0015   LSTFLG EQU    TP1S
     0018   MSGPTR EQU    TP3
     0016   BFPTR  EQU    TP2
     48BC   BINBCD EQU    $48BC
     4EA4   DGTS   EQU    $4EA4
     5300   ROMID  EQU    $5300
     57FA   LF     EQU    $57FA
     52F4   STEP1  EQU    $52F4
59D4 8D 19  LSTNTR BSR    LIST
59D6 7E 797B       JMP    BWM
59D9 4C     GIONTR INC A             GIO ENTRY
59DA 97 14  KEYLOG STA A  GIOFLG    STORE GIO FLAG
59DC 4F            CLR A
59DD 97 15         STA A  LSTFLG    SET LSTFLG=0
59DF DE C8         LDX    UPP       SET INDEX TO USER PSTN PTR
59E1 DF 8C         STX    W+4       SAVE UPP IN W+4
59E3 A6 00         LDA A  X         LOAD INSTRUCTION
59E5 97 1C         STA A  SVINS     SAVE IT IN SVINS
59E7 97 1D         STA A  SAVE
59E9 96 07         LDA A  TGL       AUDIT TRAIL?
59EB 2A 2A         BPL    OKAY      YES, DON'T WORRY ABOUT SECURED MEMORY
59ED 20 18         BRA    KYLG
```

```
59EF 97 14    LIST    STA A  GIOFLG   STORE GIO FLAG
59F1 BD 52F4          JSR    STEP1
59F4 C6 C0    LSTOK   LDA B  #$C0     LOAD ACCB WITH NEW RSFLG
59F6 D7 15            STA B  LSTFLG   SET LSTFLG .NE. 0
59F8 DE C8            LDX    UPP      SET INDEX TO USER PSTN PTR
59FA DF 8C            STX    W+4      SAVE UPP IN W+4
59FC A6 00            LDA A  X        LOAD INSTRUCTION
59FE 97 1C            STA A  SVINS    SAVE THE INSTRUCTION
5A00 97 1D            STA A  SAVE
5A02 81 B1            CMP A  #$B1     IS IT AN END INSTRUCTION?
5A04 26 02            BNE    NTEND    NO. SET RSFLG=$C0
5A06 C6 40            LDA B  #$40     YES, SET RSFLG=$40
5A08 D7 09    NTEND   STA B  RSFLG    STORE NEW RUN/STOP FLAG
5A0A 96 D5    KYLG    LDA A  FLAG
5A0C 44               LSR A
5A0D 24 08            BCC    OKAY     SECURED PROGRAM?
5A0F 86 16    SPERR   LDA A  #22
5A11 97 06            STA A  ERROR
5A13 4F               CLR A
5A14 97 09            STA A  RSFLG    RSFLG=0
5A16 39               RTS
5A17 BD 5D75  OKAY    JSR    BLANK    BLANK OUT BUFFER
5A1A 7A 00C8          DEC    UPP
5A1D DE C8            LDX    UPP      SET INDEX TO USER PSTN PTR
5A1F 7C 00C8          INC    UPP
5A22 BD 48BC          JSR    BINBCD   CONVERT PC TO BCD
5A25 CE 0058          LDX    #BUFF    SET INDEX TO BEG. OF BUFFER
5A28 86 10            LDA A  #16      SET ACCA=NO. OF DIGITS*4
5A2A BD 4EA4          JSR    DGTS     PUT PC INTO BUFFER
5A2D 96 1C            LDA A  SVINS    LOAD INSTRUCTION
5A2F 08               INX             INCR BUFFER PTR
5A30 08               INX             INCR BUFFER PTR AGAIN
5A31 DF 16            STX    BFPTR    STORE BUFFER PTR
5A33 7D 00CC          TST    ALPHA    ALPHA FLAG SET?
5A36 27 26            BEQ    NTASC    NO, NOT ALPHA STRING
5A38 4D               TST A           MSB SET?
5A39 2F 14            BLE    ENDASC   YES. END ALPHA UNLESS PRINT
5A3B 85 FC            BIT A  #$FC     TAB, SHIFT, OR LINE?
5A3D 27 03            BEQ    TLS
5A3F 7E 5AF1          JMP    STOOP    NO. STORE ASCII
5A42 CE 59C5  TLS     LDX    #TSNL    YES. LOAD TABLE ADDRESS
5A45 DF 18            STX    MSGPTR
5A47 16               TAB
5A48 5A               DEC B           SET TABLE OFFSET IN ACCB
5A49 BD 5B7E          JSR    PRTMSG   PRINT TAB, SHIFT, OR LINE
5A4C 7E 5BF2  END2    JMP    END
5A4F 81 B2    ENDASC  CMP A  #$B2     PRINT COMMAND?
5A51 27 0B            BEQ    NTASC    YES, LIST IT
5A53 81 B4            CMP A  #$B4     ALPHA TERMINATOR?
5A55 27 04            BEQ    NALPHA   YES. END ALPHA
5A57 81 B1            CMP A  #$B1     NO, IS IT AN "END"?
5A59 26 F1            BNE    END2     NO, TREAT IT AS A BLANK
5A5B 7F 00CC  NALPHA  CLR    ALPHA    YES. CLEAR ALPHA FLAG
5A5E CE 5800  NTASC   LDX    #TABLE   SET INDEX TO START OF TABLE
5A61 4F               CLR A           CLEAR INSTRUCTION CTR
5A62 91 1D    CMPCTR  CMP A  SAVE     CTR=INSTR.?
5A64 27 26            BEQ    FOUND    YES, FOUND ASCII
5A66 08       NOCNT   INX             NO, INCR TABLE ADDR
5A67 E6 00            LDA B  X        LOAD NEXT ASCII CHAR
5A69 2A FB            BPL    NOCNT    MSB SET?
5A6B C5 40            BIT B  #$40     BIT 6 SET?
5A6D 26 03            BNE    MRTHN1   YES. MORE THAN ONE OF SPECIFIC INSTR
5A6F 4C               INC A           INCR INSTR CTR
5A70 20 F0            BRA    CMPCTR
5A72 C4 3F    MRTHN1  AND B  #$3F     CLEAR TOP 2 BITS
5A74 08               INX             INX TABLE ADDRESS
5A75 4C       NOTYET  INC A           INCR INSTR CTR
5A76 91 1D            CMP A  SAVE     CTR=INSTR.?
5A78 27 05            BEQ    EQUAL    YES. ADDRESS FOUND
5A7A 5A               DEC B           DECR MULTIPLE INSTR CTR
5A7B 27 E9            BEQ    NOCNT    IF =0, NOT THIS MULTIPLY USED INSTR
5A7D 20 F6            BRA    NOTYET   CONTINUE COUNTING
5A7F E6 00    EQUAL   LDA B  X        LOAD BYTE AFTER BYTE WITH TOP 2 BITS
5A81 2A 09            BPL    FOUND    MSB SET? NO, ADDRESS FOUND
5A83 C4 7F            AND B  #$7F     YES. CLEAR THIS BIT
5A85 D7 1D            STA B  SAVE     STORE NEW INSTR TO BE COUNTED TO
```

```
00803 5A87 CE 58ED          LDX     #TABLE1   LOAD PARTIAL TABLE STARTING ADDRESS
00804 5A8A 20 D5            BRA     CMPCTR-1   START SEARCH OVER AGAIN
00805 5A8C 4F         FOUND CLR A
00806 5A8D BD 578D          JSR     LDMSG     LOAD MNEMONIC INTO BUFFER
00807 5A90 86 64            LDA A   #$64      SET BUFFER PTR TO OPERAND FIELD
00808 5A92 97 17            STA A   BFPTR+1    STORE IT
00809 5A94 DE 16            LDX     BFPTR     SET INDEX TO BUFFER PTR
00810 5A96 96 1C            LDA A   SVINS     LOAD INSTRUCTION
00811 5A98 81 3F            CMP A   #$3F      NO OPERAND INSTRUCTION?
00812 5A9A 23 57            BLS     DONE      YES. YOU ARE DONE
00813 5A9C 81 5F      TBL20 CMP A   #$5F      FLAG INSTRUCTION?
00814 5A9E 22 07            BHI     TBL21     NO. CHECK FURTHER
00815 5AA0 84 07            AND A   #$7       YES, MASK OFF BOTTOM 3 BITS
00816 5AA2 4C               INC A             ADD ONE TO THEM
00817 5AA3 8A 30            ORA A   #$30      CONVERT RESULT TO ASCII
00818 5AA5 20 4A            BRA     STOOP     STORE OPERAND INTO BUFFER
00819 5AA7 81 61      TBL21 CMP A   #$61      GOSUB/GOTO LBL X?
00820 5AA9 22 05            BHI     TBL22     NO. CHECK FURTHER
00821 5AAB C6 4C            LDA B   #$4C      YES, LOAD ASCII L
00822 5AAD E7 00            STA B   X         STORE IT IN BUFFER
00823 5AAF 08               INX               INCR BUFFER PTR
00824 5AB0 81 63      TBL22 CMP A   #$63      GOSUB/GOTO X?
00825 5AB2 22 04            BHI     TBL23     NO. CHECK FURTHER
00826 5AB4 86 58            LDA A   #$58      YES, LOAD ASCII X
00827 5AB6 20 39            BRA     STOOP     STORE OPERAND
00828 5AB8 81 A4      TBL23 CMP A   #$A4      STO+-*/ A-J OR RCL A-J OR CALL A-E
00829 5ABA 22 0A            BHI     TBL24     NO. CHECK FURTHER
00830 5ABC 80 19            SUB A   #$19      SUBTRACT OFFSET
00831 5ABE 80 0A      SUB10 SUB A   #10       SUBTRACT 10
00832 5AC0 81 4A            CMP A   #$4A      REACHED ASCII CODE FOR A THRU J?
00833 5AC2 22 FA            BHI     SUB10     NO, SUBTRACT 10 MORE
00834 5AC4 20 2B            BRA     STOOP     YES. STORE OPERAND
00835 5AC6 81 A9      TBL24 CMP A   #$A9      NO OPERAND INSTRUCTIONS?
00836 5AC8 23 29            BLS     DONE      YES, ALL DONE
00837 5ACA 81 AF      TBL25 CMP A   #$AF      FOR/NEXT?
00838 5ACC 22 28            BHI     TBL30     NO, CHECK FURTHER
00839 5ACE C6 41            LDA B   #$41      LOAD ASCII A INTO ACCB
00840 5AD0 85 02            BIT A   #2        FOR A/NEXT A?
00841 5AD2 27 06            BEQ     LDABC     YES. OPERAND=A
00842 5AD4 5C               INC B             NO, ASCII B IN ACCB
00843 5AD5 85 01            BIT A   #1        FOR B/NEXT B?
00844 5AD7 27 01            BEQ     LDABC     YES, OPERAND=B
00845 5AD9 5C               INC B             NO, OPERAND=C
00846 5ADA E7 00      LDABC STA B   X         STORE OPERAND
00847 5ADC 81 AC            CMP A   #$AC      FOR INSTRUCTION?
00848 5ADE 22 13            BHI     DONE      YES, YOU ARE DONE
00849 5AE0 08               INX
00850 5AE1 86 5C            LDA A   #$5C      LOAD RIGHT ARROW
00851 5AE3 A7 00            STA A   X         STORE IT IN THE BUFFER
00852 5AE5 08               INX
00853 5AE6 CB 05            ADD B   #5        ADD 5 TO GET SECOND LETTER
00854 5AE8 E7 00            STA B   X         STORE SECOND CHARACTER
00855 5AEA C1 48            CMP B   #$48      WAS IT AN "H"?
00856 5AEC 26 05            BNE     DONE      NO, DONE
00857 5AEE 08               INX               YES. INCR BUFFER PTR
00858 5AEF 86 44            LDA A   #$44      LOAD ASCII "D"
00859 5AF1 A7 00      STOOP STA A   X         STORE OPERAND IN BUFFER
00860 5AF3 7E 5BF2 DONE     JMP     END
00861 5AF6 81 BA      TBL30 CMP A   #$BA      NO OPERAND INSTRUCTION?
00862 5AF8 23 F9            BLS     DONE      YES. DONE
00863 5AFA 81 BF            CMP A   #$BF      IS INSTRUCTION A LABEL?
00864 5AFC 26 1C            BNE     NOLBL     NO, LOAD OPERAND
00865 5AFE 96 14            LDA A   GIOFLG
00866 5B00 26 52            BNE     ID25-1    GIO? YES, RETURN
00867 5B02 BD 6034          JSR     PRTDRV+7   PRINT LABEL WITHOUT OPERAND
00868 5B05 BD 5D75          JSR     BLANK     BLANK OUT BUFFER
00869 5B08 CE 005B          LDX     #BUFF     SET INDEX TO BEG OF BUFFER
00870 5B0B C6 2D            LDA B   #$2D      LOAD ACCB WITH ASCII MINUS SIGN
00871 5B0D E7 00      DASH  STA B   X         STORE DASHES
00872 5B0F 08               INX               INCR BUFFER PTR
00873 5B10 8C 005C          CPX     #$5C      4 DASHES?
00874 5B13 26 F8            BNE     DASH      NO. LOAD ANOTHER ONE INTO BUFFER
00875 5B15 08               INX               INCR BUFFER PTR
00876 5B16 DF 16            STX     BFPTR     STORE BUFFER PTR
00877 5B18 96 1C            LDA A   SVINS
00878 5B1A DE C8      NOLBL LDX     UPP       SET INDEX TO USER PSTN PTR
```

```
5B1C 08            INX              POINT TO SECOND BYTE
5B1D DF 8C         STX     W+4      SAVE 2ND BYTE PTR
5B1F E6 00         LDA B   X        LOAD 2ND BYTE INTO ACCB
5B21 81 BE         CMP A   #$BE     FORMAT INSTRUCTION?
5B23 26 6A         BNE     NTFMT    NO, CHECK FURTHER
5B25 CE 59C0 FORMAT LDX    #FTBL
5B28 DF 18         STX     MSGPTR
5B2A 37            PSH B
5B2B 5D            TST B
5B2C 27 2F         BEQ     MNEM     PRINT ALPHA?
5B2E C4 70         AND B   #$70     MASK OFF I/O DIGIT
5B30 17            TBA
5B31 BD 5300       JSR     ROMID    ROM EXIST?
5B34 27 1F         BEQ     ID25     YES, LOAD ASCII
5B36 33     PRTFMT PUL B            RELOAD SECOND BYTE
5B37 17            TBA              PUT IT IN ACCA ALSO
5B38 8D 0F         BSR     DIGIT    PUT ASCII DIGIT INTO BUFFER
5B3A 08            INX
5B3B C4 0F         AND B   #$F      MASK OFF LETTER
5B3D 27 04         BEQ     AMODE    CALL-DIGIT-CALL?
5B3F CB 40         ADD B   #$40     NO, CONVERT LETTER TO ASCII
5B41 20 61         BRA     STRB
5B43 86 68  AMODE  LDA A   #$68     LOAD ALPHA
5B45 97 CC         STA A   ALPHA    SET ALPHA FLAG
5B47 20 A8         BRA     STOOP    STORE ALPHA IN OPERAND
5B49 CE 0064 DIGIT LDX     #$64     POINT TO OPERAND FIELD
5B4C 44            LSR A
5B4D 44            LSR A
5B4E 44            LSR A
5B4F 44            LSR A
5B50 8A 30         ORA A   #$30     CONVERT DIGIT TO ASCII
5B52 A7 00         STA A   X        STORE IT IN THE BUFFER
5B54 39            RTS
5B55 DF 18  ID25   STX     MSGPTR   STORE I/O ROM ADDR
5B57 DF 8E         STX     W+6
5B59 86 25         LDA A   #$25     ADD $25 TO IT
5B5B 97 19         STA A   MSGPTR+1   ADD $25 TO GET ADDR OF ASCII MESSAG
5B5D 7F 00CC MNEM  CLR     ALPHA    CLEAR ALPHA FLAG
5B60 33            PUL B            RELOAD SECOND BYTE
5B61 C4 0F         AND B   #$F      MASK OFF LETTER
5B63 26 02         BNE     LEQ0     LETTER=0?
5B65 97 CC         STA A   ALPHA    YES, SET ALPHA FLAG
5B67 8D 15  LEQ0   BSR     PRTMSG
5B69 DE 8E         LDX     W+6      NO, CHECK IF ID'S THE SAME
5B6B A6 00         LDA A   X        LOAD ID#1
5B6D 08            INX
5B6E A1 00         CMP A   X        COMPARE WITH ID#2
5B70 27 34         BEQ     END1     NOT SAME, NO OPERAND
5B72 DE 8C         LDX     W+4      SET INDEX TO 2ND BYTE
5B74 A6 00         LDA A   X        RELOAD SECOND BYTE
5B76 84 70         AND A   #$70     MASK OFF I/O DIGIT
5B78 27 78         BEQ     END      DIGIT=0, YOU ARE DONE
5B7A 8D CD  GENIO  BSR     DIGIT    YES, PUT ASCII DIGIT INTO BUFFER
5B7C 20 74         BRA     END
5B7E 17     PRTMSG TBA
5B7F 58            ASL B
5B80 58            ASL B            MULTIPLY BY 4
5B81 1B            ABA              ADD TO MULTIPLY BY 5
5B82 9B 19         ADD A   MSGPTR+1   ADD RESULT TO BASE ADDR LOW
5B84 97 19         STA A   MSGPTR+1   RESTORE IT
5B86 86 5D         LDA A   #$5D     SET BFPTR TO MNEMONIC FIELD
5B88 97 17         STA A   BFPTR+1   RESTORE IT
5B8A DE 18         LDX     MSGPTR
5B8C 7E 57BD       JMP     LDMSG
5B8F D7 19  NTFMT  STA B   MSGPTR+1
5B91 16            TAB              PUT INSTR. INTO ACCB ALSO
5B92 81 C7         CMP A   #$C7     2-BYTE INSTR WITH 2-DIGIT OPERAND?
5B94 22 2F         BHI     REG      NO, CHECK FURTHER
5B96 5F            CLR B            OPERAND IN 2ND BYTE ONLY
5B97 8D 49         BSR     CNVRT    CONVERT OPERAND TO BCD
5B99 DE 16         LDX     BFPTR    SET INDEX BUFFER PTR
5B9B 7D 002D       TST     T2       OPERAND>=100? (A-0)
5B9E 27 08         BEQ     LE99     NO, OPERAND A NUMBER
5BA0 D6 19         LDA B   MSGPTR+1   YES, LOAD BOTTOM 2 BCD DIGITS
5BA2 C0 23         SUB B   #$23     CONVERT TO ASCII A THRU O
5BA4 E7 00  STRB   STA B   X        STORE OPERAND
```

```
00955 5BA6 20 4A    END1    BRA     END         DONE
00956 5BA8 96 1C    LE99    LDA A   SVINS       LOAD INSTRUCTION
00957 5BAA 81 BF            CMP A   #$BF        LABEL IN OPERAND FIELD?
00958 5BAC 23 09            BLS     NTLBL       NO
00959 5BAE 81 C1            CMP A   #$C1        LABEL IN OPERAND FIELD?
00960 5BB0 22 05            BHI     NTLBL       NO
00961 5BB2 C6 4C            LDA B   #$4C        YES, LOAD L INTO ACCB
00962 5BB4 E7 00            STA B   X           PUT IT INTO BUFFER
00963 5BB6 08               INX                 INCR BUFFER PTR
00964 5BB7 16       NTLBL   TAB
00965 5BB8 86 08            LDA A   #8          LOAD NO. OF DIGITS*4
00966 5BBA C1 BD            CMP B   #$BD        FIX, SCI, OR SCI3?
00967 5BBC 22 02            BHI     DIGITS      NO, DON'T SUPPRESS LEADING 0
00968 5BBE 86 04            LDA A   #4          YES, SUPPRESS LEADING 0 ON OPERAND
00969 5BC0 BD 4EA4  DIGITS  JSR     DGTS        PUT DIGITS INTO BUFFER
00970 5BC3 20 2D            BRA     END         DONE
00971 5BC5 81 DF    REG     CMP A   #$DF        2-BYTE INSTR WITH REG OPERAND?
00972 5BC7 22 0F            BHI     ADDR        NO, OPERAND IS ABSOLUTE ADDRESS
00973 5BC9 C4 01            AND B   #1          LSB 1ST BYTE IS PART OF OPERAND
00974 5BCB 8D 15            BSR     CNVRT       CONVERT OPERAND TO BCD
00975 5BCD DE 16            LDX     BFPTR       SET INDEX TO BUFFER PTR
00976 5BCF C6 52            LDA B   #$52        PUT R INTO BEG OF OPERAND
00977 5BD1 E7 00            STA B   X           STORE IT IN BUFFER
00978 5BD3 08               INX                 INCR BUFFER PTR
00979 5BD4 86 0C            LDA A   #12         LOAD NO. OF DIGITS*4
00980 5BD6 20 E8            BRA     DIGITS      PUT 3 DIGITS INTO BUFFER
00981 5BD8 C4 0F    ADDR    AND B   #$F         MASK OFF LOWER 4 BITS OF INSTR
00982 5BDA 8D 06            BSR     CNVRT       CONVERT 11-BIT OPERAND TO BCD
00983 5BDC DE 16            LDX     BFPTR       SET INDEX TO BUFFER PTR
00984 5BDE 86 10            LDA A   #16         LOAD NO. OF DIGITS*4
00985 5BE0 20 DE            BRA     DIGITS      PUT 4 DIGITS INTO BUFFER
00986 5BE2 D7 18    CNVRT   STA B   MSGPTR      STORE UPPER PART OF OPERAND
00987 5BE4 78 0019          ASL     MSGPTR+1      SHIFT 2ND BYTE LEFT 1 BIT
00988 5BE7 74 0018          LSR     MSGPTR      SHIFT LSB OF 1ST BYTE INTO CARRY
00989 5BEA 76 0019          ROR     MSGPTR+1      ROTOATE IT INTO 2ND BYTE
00990 5BED DE 18            LDX     MSGPTR      SET INDEX TO OPERAND
00991 5BEF 7E 48BC          JMP     BINBCD
00992 5BF2 96 14    END     LDA A   GIOFLG
00993 5BF4 26 3A            BNE     NTLIST      GIO? YES, RETURN
00994 5BF6 BD 6034          JSR     PRTDRV+7      NO, PRINT LINE
00995 5BF9 DE 8C            LDX     W+4
00996 5BFB 08               INX                 INCREMENT IT
00997 5BFC 9C 0B            CPX     EOPM        END OF USER PROGRAM MEMORY?
00998 5BFE 27 0D            BEQ     ABORT1      YES, MEMORY OVERFLOW ABORT
00999 5C00 DF C8            STX     UPP         RESTORE USER PSTN PTR
01000 5C02 96 06            LDA A   ERROR       OUT OF PAPER?
01001 5C04 26 20            BNE     NOEND       YES, STOP LIST OR KEYLOG
01002 5C06 96 09            LDA A   RSFLG       NO, CHECK RSFLG FLAG
01003 5C08 2A 07            BPL     ABORT       CONTINUE LISTING?
01004 5C0A 7E 59F4          JMP     LSTOK       YES, DO ANOTHER LINE
01005 5C0D 86 07    ABORT1  LDA A   #7          MEMORY OVERFLOW ERROR
01006 5C0F 97 06            STA A   ERROR
01007 5C11 96 1C    ABORT   LDA A   SVINS       LOAD INSTRUCTION
01008 5C13 81 B1            CMP A   #$B1        END INSTRUCTION?
01009 5C15 26 0F            BNE     NOEND       NO, DON'T SPACE
01010 5C17 BD 57FA          JSR     LF
01011 5C1A BD 57FA          JSR     LF
01012 5C1D BD 57FA          JSR     LF
01013 5C20 BD 57FA          JSR     LF
01014 5C23 BD 57FA          JSR     LF
01015 5C26 4F       NOEND   CLR A
01016 5C27 97 09            STA A   RSFLG       NO, CLEAR RUN/STOP FLAG
01017 5C29 96 15            LDA A   LSTFLG      LIST?
01018 5C2B 27 03            BEQ     NTLIST      NO, KEYLOG
01019 5C2D 7F 00CC          CLR     ALPHA       YES, CLEAR ALPHA FLAG
01020 5C30 39       NTLIST  RTS
01022               *
01023               *     AUDIT TRAIL
01024               *
01025 5C31 85 20    AUDIT   BIT A   #$20
01026 5C33 27 56            BEQ     AUD5
01027 5C35 96 0F            LDA A   DIGFLG
01028 5C37 C1 0B            CMP B   #$B
01029 5C39 23 50            BLS     AUD5         =DIGIT
01030 5C3B C1 11            CMP B   #$11
```

```
5C3D 27 4C          BEQ    AUD5      =EEX.
5C3F C1 BF          CMP B  #$BF
5C41 27 48          BEQ    AUD5      =LABEL
5C43 C1 12          CMP B  #$12
5C45 26 03          BNE    AUD1      #CHS
5C47 4D             TST A
5C48 26 41          BNE    AUD5      STILL DIGIT ENTRY
5C4A 8D 4F    AUD1  BSR    OUTXR
5C4C DE C8          LDX    UPP
5C4E DF 86          STX    AT2+6     SAVE UPP
5C50 CE 00C6        LDX    #SOL7
5C53 DF C8          STX    UPP       SET NEW INSTRUCTION POINTER
5C55 4F             CLR A
5C56 BD 59D9        JSR    GIONTR    GIONTR-INSTRUCTION ASCII
5C59 DE 86          LDX    AT2+6
5C5B DF C8          STX    UPP       RESTORE UPP
5C5D D6 C6          LDA B  SOL7
5C5F C1 B0          CMP B  #$B0
5C61 26 0A          BNE    AUD2      #RUN
5C63 CE 5255        LDX    #$5255
5C66 DF 5D          STX    BUFF+5    STUFF 'RUN '
5C68 CE 4E20        LDX    #$4E20
5C6B DF 5F          STX    BUFF+7
5C6D CE 0058  AUD2  LDX    #BUFF     ADDRESS
5C70 A6 05          LDA A  5,X
5C72 A7 00          STA A  0,X       SHIFT BUFFER LEFT
5C74 08             INX
5C75 8C 0063        CPX    #BUFF+11
5C78 26 F6          BNE    AUD2+3
5C7A 6F 00    AUD3  CLR    0,X
5C7C 08             INX
5C7D 8C 0068        CPX    #BUFF+16
5C80 26 F8          BNE    AUD3
5C82 BD 6034  AUD4  JSR    PRTDRV+7
5C85 96 22          LDA A  T13
5C87 97 0F          STA A  DIGFLG    RESTORE DIGIT ENTRY FLAG
5C89 D6 C6          LDA B  SOL7      RESTORE COMMAND
5C8B 39       AUD5  RTS
5C8C 96 0F  AUDIT1  LDA A  DIGFLG
5C8E 8D 0B          BSR    OUTXR
5C90 BD 5D75        JSR    BLANK
5C93 96 2E          LDA A  T1
5C95 8B 40          ADD A  #$40      ASCII LETTER
5C97 97 58          STA A  BUFF
5C99 20 E7          BRA    AUD4
5C9B 97 22   OUTXR  STA A  T13       SAVE DIGIT ENTRY FLAG
5C9D 27 EC          BEQ    AUD5      SKIP IT
5C9F 7F 000F        CLR    DIGFLG
5CA2 BD 5CBC        JSR    FRMT+$14   FORMAT XR
5CA5 7E 6034        JMP    PRTDRV+7   PRINT IT
                    END
```

SYMBOL TABLE

| | | | | | | | | | | | | | | | |
|---|---|---|---|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 008A | MT | 7E00 | TERMN7 | 003D | IMED | 0040 | PARCD | 00C0 |
| PAREX | 0080 | NTBL | 0000 | DOTS | 5EC0 | PRTDRV | 602D | FRMT | 5CA8 | BLANK | 5D75 |
| LDMSG | 578D | ROLLD | 5582 | ROLLU | 57F1 | PSD | 55DA | TXL | 55E9 | STKUP | 55EF |
| MAD | 749B | CMP | 74AA | NOR | 74D6 | TXW | 7424 | TXXR | 743B | EXXR | 7452 |
| ARSR | 753B | OVUNF | 75B6 | OVERF | 75DD | XR0 | 740A | XRNINE | 75C8 | UNDRF | 75F1 |
| IMULT | 76B9 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7439 | XZERO0 | 7416 | XZERO2 | 7417 |

```
RECIP  73E6  TXRX   73F3  CONST  6800  FPDBRC 6898  TAN    68A9  ATN    69C3
DSZERO 6A46  NTLN   6A58  EXPN   6AC9  SIN    6894  COS    689A  ASIN   69F2
ACOS   69F7  PH1    6C5D  PH2    6C8D  PH3    6D34  PH4    6DD0  LSFT8  6E47
SQRT   6E65  MADB   6F2C  CMPB   53E4  IOUPX  6F52  LOG10  6FA7  YUPX   6FE9
RTOP   7328  PTOR   7386  TABLE  5800  TABLE1 58ED  FTBL   59C0  TSNL   59C5
BWM    7978  SVINS  001C  SAVE   001D  GIOFLG 0014  LSTFLG 0015  MSGPTR 0018
BFPTR* 0016  BINBCD 48BC  DGTS   4EA4  ROMID  5300  LF     57FA  STEP1  52F4
LSTNTR 59D4  GIONTR 59D9  KEYLOG 59DA  LIST   59EF  LSTOK  59F4  NTEND  5A08
KYLG   5A0A  SPERR  5A0F  OKAY   5A17  TLS    5A42  END2   5A4C  ENDASC 5A4F
NALPHA 5A5B  NTASC  5A5E  CMPCTR 5A62  NOCNT  5A66  MRTHN1 5A72  NOTYET 5A75
EQUAL  5A7F  FOUND  5A8C  TBL20  5A9C  TBL21  5AA7  TBL22  5AB0  TBL23  5AB8
SUB10  5ABE  TBL24  5AC6  TBL25  5ACA  LDABC  5ADA  STOOP  5AF1  DONE   5AF3
TBL30  5AF6  DASH   5B0D  NOLBL  5B1A  FORMAT 5B25  PRTFMT 5B36  AMODE  5B43
DIGIT  5B49  ID25   5B55  MNEM   5B5D  LEQ0   5B67  GENIO  5B7A  PRTMSG 5B7E
NTFMT  5B8F  STRB   5BA4  END1   5BA6  LE99   5BA8  NTLBL  5BB7  DIGITS 5BC0
REG    5BC5  ADDR   5BD8  CNVRT  5BE2  END    5BF2  ABORT1 5C0D  ABORT  5C11
NOEND  5C26  NTLIST 5C30  AUDIT  5C31  AUD1   5C4A  AUD2   5C6D  AUD3   5C7A
AUD4   5C82  AUD5   5C8B  AUDIT1 5C8C  OUTXR  5C9B
```

```
                          OPT    LIST,MEM
            002D  LNGTH   EQU    T2
            002C  DECPT   EQU    T3
            002B  XPNT    EQU    T4
            002A  CARRY   EQU    T5
            0029  NUMOVF  EQU    T6
            0028  FLTFLG  EQU    T7
            0088  EXP     EQU    W
            008A  EXP2    EQU    W+2
      5CA8                ORG    FRMT
                  *
                  *
                  * DAVE UHLRICH   OCTOBER 15,1974   FORMATTER   REV N
                  *
                  *
                  * THIS ROUTINE CONVERTS THE EXPONENT, STORED
                  * IN TWO'S COMPLEMENT FORM, TO ITS BCD
                  * EQUIVALENT.  THE TWO'S COMPLEMENT OF THE
                  * EXPONENT MUST BE IN ACCA BEFORE
                  * ENTERING THIS ROUTINE.  THE ANSWER WILL
                  * BE STORED IN XPNT WHEN THE CONVERSION
                  * IS COMPLETED.
                  *
                  *
      5CA8 2A 01  EXPNT   BPL    EXPPL     IS SIGN OF EXPNT POSITIVE?
      5CAA 40             NEG A            NO, MAKE IT POSITIVE
      5CAB C6 FF  EXPPL   LDA B  #$FF      YES, LOAD CTR'S START VALUE
      5CAD 5C     XPINC   INC B            INCR TEN'S COLUMN
      5CAE 80 0A          SUB A  #10       SUBTRACT 10 FROM ABS(EXPNT)
      5CB0 2C FB          BGE    XPINC     IF>=0, EXPNT INCOMPLETE
      5CB2 8B 0A          ADD A  #10       IF<0, ADD 10 TO ONE'S COLUMN
      5CB4 58             ASL B            CTR VALUE IN ACCB
      5CB5 58             ASL B            EQUALS TEN'S COLUMN
      5CB6 58             ASL B            OF EXPNT, SO SHIFT
      5CB7 58             ASL B            IT LEFT 4 PLACES
      5CB8 1B             ABA              OBTAIN WHOLE EXPNT
      5CB9 97 2B          STA A  XPNT      STORE EXPNT IN XPNT
      5CBB 39             RTS
                  *
                  *
                  * THIS ROUTINE FORMATS THE DATA STORED IN
                  * THE X REGISTER.  THE FORMAT MODE INFORMA-
                  * TION IS FOUND IN TGL AND THE DIGIT ENTRY
                  * FLAG IS LOCATED IN DIGFLG.  THE
                  * FOLLOWING ARE THE 3 FORMAT MODES:
                  *      1) FXD N    BBBB-123.456BBBB
                  *      2) FLT N    BBBBBB-1.234BB02
                  *      3) PWR3 N   BBBB-123.456BB00
                  * THE FORMAT MODE USED IN DIGIT ENTRY WILL BE
                  * FIXED FORMAT.  FIXED FORMAT WILL OVERFLOW
                  * INTO FLOATING POINT WHEN IT BECOMES
                  * TOO BIG TO FIT IN THE DISPLAY.  IN THE
                  * PWR3 MODE, THE ANSWER IS DISPLAYED WITH AN
                  * EXPONENT WHICH IS THE POWER OF 3 JUST
                  * BELOW THE ACTUAL EXPONENT.  THIS MODE WILL
                  * ALSO OVERFLOW INTO ORDINARY FLOATING POINT
                  * WHEN THE MANTISSA IS TOO LARGE FOR THE
```

```
                      * DISPLAY.  THE LARGEST ALLOWABLE ROUND IN
                      * PWR3 MODE WILL BE 7; ANY LARGER ROUND
                      * FACTOR WILL DEFAULT TO 7.
                      *
                      *
5CBC 4F               FRMT1  CLR A
5CBD 97 2C                   STA A   DECPT     SET DEC PT PTR=0
5CBF 97 2D                   STA A   LNGTH     SET LNGTH PTR=0
5CC1 97 29                   STA A   NUMOVF    CLEAR NUMERIC OVERFLOW FLAG
5CC3 97 28                   STA A   FLTFLG    CLEAR FLT PT OVERFLOW FLAG
5CC5 96 90                   LDA A   XR        LOAD EXPNT
5CC7 8D DF                   BSR     EXPNT     CONVERT IT TO BCD
5CC9 D6 90                   LDA B   XR        LOAD EXPNT INTO ACCB
5CCB 96 0F                   LDA A   DIGFLG    LOAD DIGIT ENTRY FLAG
5CCD 81 20                   CMP A   #$20      LEADING ZEROES?
5CCF 27 7D                   BEQ     NTROS     YES
5CD1 84 DF                   AND A   #$DF      DIGIT ENTRY?
5CD3 26 61                   BNE     DIGNTR    YES
5CD5 96 07                   LDA A   TGL       NO, LOAD TOGGLE SWITCHES
5CD7 84 1C                   AND A   #@34      MASK FORMAT MODE BITS
5CD9 81 08                   CMP A   #@10
5CDB 2D 28                   BLT     FLT       IF<@10, FLOAT PT
5CDD 2E 4D                   BGT     FXD       IF>@10, FIXED PT
5CDF 96 0E                   LDA A   RND       LOAD ROUND FACTOR
5CE1 81 07                   CMP A   #7        ROUND=7?
5CE3 2F 04                   BLE     RND7      <=7, LEAVE RND ALONE
5CE5 86 07                   LDA A   #7        SET RND TO 7
5CE7 97 0E                   STA A   RND       STORE NEW RND=7
5CE9 17               RND7   TBA               PUT BINARY EXPNT INTO ACCA
5CEA 2A 01                   BPL     EXPL      POSITIVE?
5CEC 40                      NEG A             NO, MAKE IT POSITIVE
5CED 5F               EXPL   CLR B             CLEAR PWR3 CTR
5CEE CB 03            PWR3   ADD B   #3        BUILD PWR3 EXPNT BY 3'S
5CF0 11                      CBA               COMPARE REAL AND PWR3 EXPNTS
5CF1 27 12                   BEQ     FLT       ALREADY PWR3, USE FLT PT
5CF3 2E F9                   BGT     PWR3      REAL>PWR3, CONT BUILDING
5CF5 7D 0090                 TST     XR        TEST SIGN OF EXPNT
5CF8 2B 02                   BMI     NEG1      MINUS, PWR3 EXPNT BUILT
5CFA C0 03                   SUB B   #3        PLUS, SUB TO GET PWR3 EXPNT
5CFC 10               NEG1   SBA               FIND DIFF REAL & PWR3
5CFD 2A 01                   BPL     NEG2      POSITIVE?
5CFF 40                      NEG A             NO, MAKE IT POSITIVE
5D00 97 2C            NEG2   STA A   DECPT     STORE DIFF IN DEC PT PTR
5D02 17                      TBA               TRANSFER PWR3 EXPNT TO ACCA
5D03 8D A3                   BSR     EXPNT     CONVERT IT TO BCD
5D05 96 0E            FLT    LDA A   RND       RELOAD ROUND OFF FACTOR
5D07 9B 2C                   ADD A   DECPT     ADD DEC PT PTR TO RND
5D09 4C               FLOAT  INC A             RND+DECPT+1=POS CTR
5D0A 7C 0028          FLT1   INC     FLTFLG    SET FLOATING POINT OVERFLOW FLAG
5D0D 20 71                   BRA     LDMNT     LOAD THE MANTISSA
5D0F D6 0F            FLT2   LDA B   DIGFLG
5D11 C5 DF                   BIT B   #$DF
5D13 27 F4                   BEQ     FLOAT     NOT DIGIT ENTRY, FLT PT
5D15 86 0A                   LDA A   #10       DIGIT ENTRY, CHECK OVERFLOW
5D17 C4 0F                   AND B   #$F       MASK OFF DIGIT CTR
5D19 C1 0A                   CMP B   #10       MORE 10 DIGITS HIT?
5D1B 27 03                   BEQ     CHKOVF    YES, CHECK OVERFLOW
5D1D 17                      TBA               NO, POS CTR=DIGIT CTR
5D1E 20 EA                   BRA     FLT1
5D20 D6 90            CHKOVF LDA B   XR        LOAD EXPNT
5D22 D0 88                   SUB B   EXP       SUBTRACT EEX EXPNT
5D24 2D E4                   BLT     FLT1      EXPNT<0, FLT PT OVRFL
5D26 C1 0A                   CMP B   #10       MANT. EXPNT>=10?
5D28 2C E0                   BGE     FLT1      YES, FLT PT OVERFLOW
5D2A 20 1A                   BRA     FIXED     NO, FIXED PT
5D2C 17               FXD    TBA               SHIFT EXPNT TO ACCA
5D2D 9B 0E                   ADD A   RND       RND+EXPNT
5D2F 4C                      INC A             RND+EXPNT+1=POS CTR
5D30 81 0A                   CMP A   #10       FIXED POINT OVERFLOW?
5D32 2E D1                   BGT     FLT       YES, FLT PT
5D34 20 10                   BRA     FIXED     NO, FXD PT
5D36 D0 88            DIGNTR SUB B   EXP       XR-EXP=MNT EXPNT
5D38 81 80                   CMP A   #$80      DEC PT & 0'S ONLY?
5D3A 27 12                   BEQ     NTROS     YES, ENTER ZEROES
5D3C 84 0F                   AND A   #$F       GET DIGIT CTR
5D3E 90 8A                   SUB A   EXP2      ADD NO. LEADING 0'S TO DIG CTR
```

```
00351 5D40 81 0A            CMP A  #10       NO, MORE THAN 10 DIGITS HIT?
00352 5D42 2C CB            BGE    FLT2      YES, CHECK OVERFLOW
00353 5D44 9B 8A            ADD A  EXP2      NO. GET DIGIT CTR AGAIN
00354 5D46 D7 2C     FIXED  STA B  DECPT     STORE DEC PT PTR
00355 5D48 2C 36            BGE    LDMNT     EXPNT<0? NO, LOAD MANT
00356 5D4A D7 2D            STA B  LNGTH     YES, SET LNGTH PTR=EXPNT
00357 5D4C 20 32            BRA    LDMNT     LOAD THE MANTISSA
00358 5D4E 96 8A     NTROS  LDA A  EXP2      LOAD NO. 0'S AFTER DEC PT
00359 5D50 BD 5CAB          JSR    EXPNT     SET UP EXPNT DUE TO THEM
00360 5D53 96 8A            LDA A  EXP2      GET NUMBER
00361 5D55 40               NEG A            OF ZEROES TO DISPLAY
00362 5D56 4C               INC A
00363 5D57 81 0A            CMP A  #10       10 OF THEM?
00364 5D59 2F 25            BLE    LDMNT     NO, LOAD MANT WITH ZEROES
00365 5D5B 86 0A            LDA A  #10       YES, FILL DISPLAY WITH ZEROES
00366 5D5D 20 AB            BRA    FLT1      YES, FLT POINT OVRFL
00367 5D5F DF 16     LDDGT  STX    TP2       STORE BUFF PTR
00368 5D61 DE 18            LDX    TP3       LOAD X-REG PTR
00369 5D63 A6 00            LDA A  X         LOAD DIGIT INTO ACCA
00370 5D65 C5 01            BIT B  #1        POS CTR EVEN?
00371 5D67 26 05            BNE    STRDGT    NO, DIGIT IN LOWER HALF
00372 5D69 44               LSR A            YES, DIGIT IN
00373 5D6A 44               LSR A            UPPER HALF
00374 5D6B 44               LSR A            BYTE; SHIFT
00375 5D6C 44               LSR A            IT DOWN
00376 5D6D 09               DEX              DECR X-REG PTR
00377 5D6E 84 0F     STRDGT AND A  #$F       MASK LOWER HALF BYTE
00378 5D70 DF 18            STX    TP3       CHANGE INDEX REG FROM
00379 5D72 DE 16            LDX    TP2       X-REG PTR TO BUFF PTR
00380 5D74 39               RTS              DIGIT LOADED; RETURN
00381 5D75 CE 0010 BLANK1   LDX    #$10      SET BUFFER PTR
00382 5D78 C6 20            LDA B  #@40      LOAD BLANK CODE
00383 5D7A E7 57     MORE   STA B  $57,X     STORE BLANK IN BUFF
00384 5D7C 09               DEX              DECR BUFFER PTR
00385 5D7D 26 FB            BNE    MORE      LOAD ANOTHER BLANK
00386 5D7F 39               RTS              RETURN
00387 5D80 8D F3     LDMNT  BSR    BLANK1    LOAD BLANKS INTO DISPLAY BUFFER
00388 5D82 CE 0064          LDX    #@144     SET BUFF PTR AT END OF MANT AREA
00389 5D85 16               TAB              POS PTR IN ACCB ALSO
00390 5D86 44               LSR A            GET POS CTR/2
00391 5D87 8B 92            ADD A  #@222     BUFF PTR=222+POS CTR/2
00392 5D89 97 19            STA A  TP3S      2ND BYTE INDEX REG
00393 5D8B 4F               CLR A
00394 5D8C 97 18            STA A  TP3       1ST BYTE INDEX REG
00395 5D8E 97 2A            STA A  CARRY     CLEAR CARRY
00396 5D90 5D               TST B
00397 5D91 2B 48            BMI    ENDMNT
00398 5D93 8D CA            BSR    LDDGT     LOAD ROUNDING DIGIT
00399 5D95 81 05            CMP A  #5        COMPARE IT TO 5
00400 5D97 2D 03            BLT    CARRY1    IS IT <5?
00401 5D99 7C 002A          INC    CARRY     NO,SET CARRY
00402 5D9C 5D        CARRY1 TST B            TEST POS CTR AGAIN
00403 5D9D 2F 3C            BLE    ENDMNT    IS IT NEGATIVE?
00404 5D9F 09               DEX              NO. DECR BUFF PTR
00405 5DA0 5A               DEC B            DECR POS CTR
00406 5DA1 8D BC     XP99   BSR    LDDGT     LOAD DIGIT
00407 5DA3 D1 2C     LOAD0  CMP B  DECPT     CTR=DEC PT PTR?
00408 5DA5 26 21            BNE    NODPT     NO. NO DEC PT
00409 5DA7 0F               SEI              YES, DISABLE KEY INTERRUPT
00410 5DA8 36               PSH A            SAVE DIGIT ON STACK
00411 5DA9 96 0F            LDA A  DIGFLG
00412 5DAB 2B 14            BMI    DCPT      DEC PT HIT?
00413 5DAD 96 29            LDA A  NUMOVF    NUMERIX OVERFLOW?
00414 5DAF 26 10            BNE    DCPT      IF OVRFL, PUT IN DEC PT
00415 5DB1 96 0F            LDA A  DIGFLG
00416 5DB3 85 DF            BIT A  #$DF      DIGIT ENTRY?
00417 5DB5 27 06            BEQ    CHKRND    NO. CHECK ROUND MODE
00418 5DB7 96 28            LDA A  FLTFLG    YES, FLT PT OVERFLOW
00419 5DB9 27 0B            BEQ    NODPT1    NO, DEC PT SUPPRESSED
00420 5DBB 20 04            BRA    DCPT      YES, DEC PT
00421 5DBD 96 0E     CHKRND LDA A  RND
00422 5DBF 27 05            BEQ    NODPT1    RND=0, NO DEC PT
00423 5DC1 86 2E     DCPT   LDA A  #@56      LOAD DEC PT CODE
00424 5DC3 A7 00            STA A  X         STORE IT IN BUFF
00425 5DC5 09               DEX              DECR BUFF PTR
```

```
00426 5DC6 32        NODPT1 PUL A             RELOAD DIGIT INTO ACCA
00427 5DC7 0E               CLI               ENABLE KEY INTERRUPT
00428 5DC8 9B 2A     NODPT  ADD A  CARRY      ADD CARRY TO DIGIT
00429 5DCA 7F 002A          CLR    CARRY      CLEAR THE CARRY
00430 5DCD 81 0A            CMP A  #10        DIGIT+CARRY<10?
00431 5DCF 2D 04            BLT    CARRY2     YES, NO CARRY
00432 5DD1 7C 002A          INC    CARRY      NO. SET CARRY
00433 5DD4 4F               CLR A             PUT BCD 0 INTO ACCA
00434 5DD5 8A 30     CARRY2 ORA A  #@60       CONVERT BCD TO ASCII
00435 5DD7 A7 00            STA A  X          STORE DIGIT IN BUFF
00436 5DD9 20 C1            BRA    CARRY1
00437 5DDB D1 2D     ENDMNT CMP B  LNGTH      FINISHED MANTISSA?
00438 5DDD 2F 05            BLE    CHKCR,     YES, STILL A CARRY?
00439 5DDF 4F        LOAD1  CLR A             LOAD ACCA WITH BCD 0
00440 5DE0 5A               DEC B             DECR POS CTR
00441 5DE1 09               DEX               DECR BUFF PTR
00442 5DE2 20 8F            BRA    LOAD0      LOAD ZERO INTO BUFF
00443 5DE4 96 2A     CHKCR  LDA A  CARRY      LOAD CARRY
00444 5DE6 85 01            BIT A  #1         IS THERE A CARRY?
00445 5DE8 27 56            BEQ    SGNMT      NO, LOAD SIGN OF MANT
00446 5DEA 7F 002A          CLR    CARRY      CLEAR THE CARRY
00447 5DED 96 28            LDA A  XPNT       LOAD BCD EXPNT
00448 5DEF 81 99            CMP A  #$99       IS IT = 99?
00449 5DF1 26 0D            BNE    NOT99
00450 5DF3 86 96            LDA A  #@226      YES, SET XR PTR=@226
00451 5DF5 97 19            STA A  TP3S       STORE IT
00452 5DF7 C6 09            LDA B  #9         SET POS PTR=9
00453 5DF9 D7 29            STA B  NUMOVF     SET NUMERIC OVERFLOW BIT
00454 5DFB CE 0063          LDX    #@143      RESET BUFF PTR
00455 5DFE 20 A1            BRA    XP99       RELOAD MANTISSA WITHOUT ROUNDING
00456 5E00 96 91     NOT99  LDA A  XR+1       PWR3 OVRFL FLAG SET?
00457 5E02 85 01            BIT A  #1
00458 5E04 26 30            BNE    FLTOVF     YES, FLT PT OVERFLOW
00459 5E06 96 07            LDA A  TGL        LOAD TOGGLE SWITCH REG
00460 5E08 85 08            BIT A  #@10       PWR3?
00461 5E0A 26 22            BNE    POWER3     YES, CHECK PWR3 OVERFLOW
00462 5E0C 96 28            LDA A  FLTFLG     FLT PT OVERFLOW?
00463 5E0E 26 26            BNE    FLTOVF     YES, FLT PT OVERFLOW
00464 5E10 86 01     RGBUF  LDA A  #1         LOAD 1 DUE TO CARRY
00465 5E12 09               DEX               DECR BUFF PTR
00466 5E13 8C 0058          CPX    #@130      REACHED REG. MANT AREA IN BUFF?
00467 5E16 26 BD            BNE    CARRY2     NO, LOAD CARRY INTO BUFF
00468 5E18 96 90     OVRFL  LDA A  XR         LOAD EXPNT
00469 5E1A BD 5CA8          JSR    EXPNT      CONVERT IT TO BCD
00470 5E1D D6 07            LDA B  TGL
00471 5E1F C5 08            BIT B  #@10       PWR3 MODE?
00472 5E21 27 08            BEQ    FLT3       NO, FIXED POINT OVERFLOW
00473 5E23 7C 0091          INC    XR+1       YES, SET PWR3 OVRFL FLAG
00474 5E26 4F               CLR A
00475 5E27 97 28            STA A  FLTFLG     CLEAR FLT PT OVERFLOW FLAG
00476 5E29 97 2C            STA A  DECPT      SET DECPT=0
00477 5E2B 7E 5D05   FLT3   JMP    FLT
00478 5E2E 96 2C     POWER3 LDA A  DECPT      LOAD POWER3 MANT EXPNT
00479 5E30 81 02            CMP A  #2         MANTISSA OVERFLOW?
00480 5E32 26 DC            BNE    RGBUF      NONE, LOAD CARRY
00481 5E34 20 E2            BRA    OVRFL      YES, REDO IN FLT PT
00482 5E36 86 31     FLTOVF LDA A  #@61       STORE 1 IN BUFF LOC
00483 5E38 A7 00            STA A  X          NEXT TO DEC PT
00484 5E3A 96 90            LDA A  XR         LOAD EXPNT
00485 5E3C 4C               INC A             INCREMENT IT BY 1
00486 5E3D BD 5CA8          JSR    EXPNT      CONVERT IT TO BCD
00487 5E40 96 91     SGNMT  LDA A  XR+1       LOAD MANT SIGN
00488 5E42 84 80            AND A  #$80       CLEAR PWR3 OVRFL FLAG
00489 5E44 97 91            STA A  XR+1       RESTORE MANT SIGN
00490 5E46 2A 05            BPL    SGNPOS     POSITIVE?
00491 5E48 C6 2D            LDA B  #@55       NO. LOAD MINUS SIGN CODE
00492 5E4A 09               DEX               DECR BUFF PTR
00493 5E4B E7 00            STA B  X          STORE MINUS OR BLANK
00494 5E4D CE 0065   SGNPOS LDX    #@145      SET BUFF PTR AT REG EXPNT AREA
00495 5E50 96 0F     CHKEEX LDA A  DIGFLG
00496 5E52 84 40            AND A  #$40
00497 5E54 9A 28            ORA A  FLTFLG     FLT PT OR EEX?
00498 5E56 27 3D            BEQ    NOEXP      NEITHER, NO EXPMT
00499 5E58 85 01            BIT A  #1         FLT PT?
00500 5E5A 26 12            BNE    SGNXR      YES. EXPNT IN XR
00501 5E5C 96 88            LDA A  EXP        NO, SET EEX EXPNT UP
```

```
5E5E BD 5CA8           JSR    EXPNT
5E61 4D                TST A          EEX EXPNT ZERO?
5E62 26 06             BNE    EXPNO   .NE. 0, CHECK SIGN
5E64 96 0F             LDA A  DIGFLG
5E66 85 10             BIT A  #$10    CHGSGN FLAG SET?
5E68 26 14             BNE    NEGSGN  YES, SIGN EXPNT NEG
5E6A 96 88     EXPNO   LDA A  EXP     LOAD NON-ZERO EEX EXPNT
5E6C 20 0E             BRA    CHKSGN  CHECK ITS SIGN
5E6E 96 0F     SGNXR   LDA A  DIGFLG  RELOAD DIGIT ENTRY FLAG
5E70 84 DF             AND A  #$DF    CLEAR LEADING ZEROES BIT
5E72 81 80             CMP A  #$80    DEC PT & 0'S ONLY?
5E74 27 08             BEQ    NEGSGN  YES, NEGATIVE EXPNT
5E76 96 2B             LDA A  XPNT    LOAD BCD EXPNT
5E78 27 08             BEQ    SGNXP   IF ZERO, SIGN EXPNT PLUS
5E7A 96 90             LDA A  XR      LOAD EXPNT FROM XR
5E7C 2A 04     CHKSGN  BPL    SGNXP   SIGN EXPNT PLUS?
5E7E C6 2D     NEGSGN  LDA B  #@55    NO, LOAD MINUS SIGN CODE
5E80 E7 00             STA B  X       STORE EXPNT SIGN
5E82 08        SGNXP   INX            INCR BUFF PTR
5E83 96 2B             LDA A  XPNT    LOAD BCD EXPNT
5E85 16                TAB            PUT IT IN ACCB ALSO
5E86 44                LSR A          TEN'S COLUMN OF
5E87 44                LSR A          EXPNT IN UPPER
5E88 44                LSR A          HALF BYTE; SHIFT
5E89 44                LSR A          IT DOWN
5E8A 8A 30             ORA A  #@60    CONVERT BCD TO ASCII
5E8C A7 00             STA A  X       STORE TEN'S COLUMN
5E8E 08                INX            INCR BUFF PTR
5E8F C4 0F             AND B  #$F     GET ONE'S COLUMN
5E91 CA 30             ORA B  #@60    CONVERT BCD TO ASCII
5E93 E7 00             STA B  X       STORE ONE'S COLUMN OF EXPNT
5E95 86 20     NOEXP   LDA A  #$20    PUT BLANK CODE IN ACCA
5E97 C6 2E             LDA B  #$2E    PUT DEC PT CODE IN ACCB
5E99 CE 0057           LDX    #BUFF-1  SET INDEX TO BEG OF BUFF-1
5E9C 08        BEGNO   INX
5E9D A1 00             CMP A  X       CHARACTER A BLANK?
5E9F 27 FB             BEQ    BEGNO   YES, NOT BEG OF NO. YET
5EA1 08        DPBLK   INX
5EA2 A1 00             CMP A  X       BLANK?
5EA4 27 04             BEQ    LDCOM   YES, START TO LOAD COMMAS
5EA6 E1 00             CMP B  X       DEC PT?
5EA8 26 F7             BNE    DPBLK   NO, CONTINUE LOOKING
5EAA 09        LDCOM   DEX
5EAB 09        COMMA   DEX
5EAC 09                DEX
5EAD 09                DEX            FIND COMMA POSITION
5EAE A6 00             LDA A  X       LOAD CHARACTER
5EB0 81 2F             CMP A  #$2F    REACHED END OF NUMBER?
5EB2 23 06             BLS    COMEND  YES, DONE
5EB4 8A 80             ORA A  #$80    NO, PUT IN COMMA
5EB6 A7 00             STA A  X       RESTORE CHAR WITH COMMA
5EB8 20 F1             BRA    COMMA
5EBA 39        COMEND  RTS
               *
               *
               * THIS ROUTINE CONVERTS THE RECTANGULAR
               * COORDINATES IN THE X AND Y REGISTERS
               * TO POLAR FORM.  THE X-COORDINATE MUST BE
               * IN THE X REGISTER AND THE Y-COORDINATE,
               * IN THE Y REGISTER.  THE ANSWER IS
               * RETURNED WITH THE MAGNITUDE IN THE
               * X REGISTER AND THE ANGLE, IN THE Y
               * REGISTER.
               *
               *
               * DAVE UHLRICH   1/3/75   R TO P   REV C
               *
               *
          55AC XEY     EQU    $55AC
          57E3 LDPI    EQU    $57E3
7338                   ORG    $7338
7338 BD 55E9   TOPOL   JSR    TXL     SAVE X IN LAST X
733B 96 92             LDA A  XR+2
733D 9A 9A             ORA A  YR+2    BOTH X AND Y = 0?
733F 27 4B             BEQ    YONLY   YES, YOU ARE DONE
7341 CE 0098           LDX    #YR     POINT TO 2ND DIVIDE ARG
```

```
7344 BD 7793          JSR     FPD        DIVIDE Y BY X
7347 BD 69C3 NTDIVO   JSR     ATN        FIND ATAN Y/X
734A 96 B1            LDA A   LSTX+1     IS X NEGATIVE?
734C 2A 29            BPL     STOANS     NO, ANGLE IS CORRECT
734E BD 55AC          JSR     XEY        PUT ANGLE INTO Y
7351 BD 740A          JSR     XR0        ZERO OUT X
7354 86 02            LDA A   #2
7356 97 90            STA A   XR         SET XR EXPNT=2
7358 96 99            LDA A   YR+1       SIGN OF ANGLE NEGATIVE?
735A 88 80            EOR A   #$80       YES, CHANGE SIGN
735C 97 91            STA A   XR+1       PUT SIGN ON 180 DEG OFFSET
735E 86 20            LDA A   #$20       LOAD 200 GRADS
7360 D6 07            LDA B   TGL
7362 57               ASR B
7363 25 05            BCS     GRAD       GRADS?
7365 57               ASR B
7366 25 06            BCS     RAD        RADS?
7368 86 18            LDA A   #$18       LOAD 180 DEGREES
736A 97 92   GRAD     STA A   XR+2       STORE IN X
736C 20 03            BRA     ADDOFF
736E BD 57E3 RAD      JSR     LDPI       LOAD PI INTO X
7371 CE 0098 ADDOFF   LDX     #YR
7374 BD 75FC          JSR     FPA        ADD OFFSET TO ANGLE
7377 96 06   STOANS   LDA A   ERROR
7379 26 11            BNE     YONLY      ANGLE=90 DEGREES?
737B CE 0098          LDX     #YR
737E 8D 3B            BSR     TXRX1      NO, PUT ANGLE INTO Y ALSO
7380 BD 6B9A          JSR     COS
7383 BD 73E6          JSR     RECIP      1/COS ANGLE
7386 CE 0080          LDX     #LSTX
7389 7E 7735          JMP     FPM        X/COS ANGLE
738C 4F      YONLY    CLR A
738D 97 06            STA A   ERROR
738F 97 99            STA A   YR+1       MAKE MAGNITUDE POSITIVE
7391 7E 55AC          JMP     XEY
                      *
                      *
                      * THIS ROUTINE PERFORMS THE COMPLEMENT
                      * OPERATION TO THE RECTANGULAR-TO-
                      * POLAR ROUTINE, DESCRIBED ABOVE.
                      *
                      *
                      * DAVE UHLRICH    6/10/74    P TO R    REV B
                      *
                      *
7394 BD 55E9 TORCT    JSR     TXL        SAVE X IN LAST X
7397 8D 25            BSR     YTOX       TRANSFER ANGLE TO X
7399 BD 6B9A          JSR     COS        TAKE COS OF ANGLE
739C CE 0080          LDX     #LSTX      POINT TO 2ND MULT ARG
739F BD 7735          JSR     FPM        MAGNITUDE*SIN OF ANGLE
73A2 CE 0078          LDX     #AT1       POINT TO AT1
73A5 8D 14            BSR     TXRX1      SAVE X COORDINATE IN AT1
73A7 8D 15            BSR     YTOX       TRANSFER ANGLE TO X AGAIN
73A9 BD 6B94          JSR     SIN        TAKE SIN OF ANGLE
73AC CE 0080          LDX     #LSTX      POINT TO 2ND MULT ARG
73AF BD 7735          JSR     FPM        MAGNITUDE*COS OF ANGLE
73B2 BD 55AC          JSR     XEY        PUT Y COORDINATE INTO Y
73B5 CE 0078          LDX     #AT1       POINT TO AT1
73B8 7E 7433 TXXR1    JMP     TXXR
73BB 7E 73F3 TXRX1    JMP     TXRX
73BE CE 0098 YTOX     LDX     #YR
73C1 20 F5            BRA     TXXR1
7C52                  ORG     $7C52
7C52 7338             FDB     TOPOL
7C54 7394             FDB     TORCT
                      END
```

SYMBOL TABLE

| | | | | | | | | | | | | | |
|---|---|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |

```
TP6S   001F  TP7    0020  TP7S   0021  T13    0022  T12    0023  T11    0024
T10    0025  T9     0026  T8     0027  T7     0028  T6     0029  T5     002A
T4     002B  T3     002C  T2     002D  T1     002E  ISTK   002F  ISTACK 0051
TA     0052  SPGM   0054  EXTPA  0056  BUFF   0058  REAL   0068  IMAG   0070
AT1    0078  AT2    0080  W      0088  XR     0090  YR     0098  ZR     00A0
TR     00A8  LSTX   00B0  BKWRT  00B8  BKKC   00BA  SOL7   00C6  UPP    00C8
UIP    00CA  ALPHA  00CC  IO1    00CD  IO2    00D0  IT7    00D3  FLAG   00D5
TPOS   00D6  FILE   00D7  AR     00D8  BR     00E0  CR     00E8  DR.    00F0
ER     00F8  SDBB   00BA  MT     7E00  TERMN7 003D  IMED   0040  PARCD  00C0
PAREX  0080  NTBL   0000  DOTS   5EC0  PRTDRV 602D  FRMT   5CA8  BLANK  5D75
LDMSG  57BD  ROLLD  55B2  ROLLU  57F1  PSD    55DA  TXL    55E9  STKUP  55EF
MAD    749B  CMP    74AA  NOR    74D6  TXW    7424  TXXR   7438  EXXR   7452
ARSR   753B  OVUNF  75B6  OVERF  75DD  XR0    740A  XRNINE 75C8  UNDRF  75F1
IMULT  7699  DDG    7669  FPA    75FC  FPS    75F6  FPM    7735  FPD    7793
FPAEX  763D  FPMEX  7780  LSHIFT 7521  ZEROX  7489  XZEROO 7416  XZERO2 7417
RECIP  73E6  TXRX   73F3  CONST  6800  FPDBRC 6898  TAN    69A9  ATN    69C3
DSZERO 6A46  NTLN   6A58  EXPN   6AC9  SIN    6894  COS    689A  ASIN   6BF2
ACOS   6BF7  PH1    6C5D  PH2    6C8D  PH3    6D34  PH4    6DD0  LSFT8  6E47
SQRT   6E65  MADB   6F2C  CMPB   53E4  IOUPX  6F52  LOG10  6FAT  YUPX   6FE9
RTOP   7328  PTOR   7386  LNGTH  002D  DECPT  002C  XPNT   002B  CARRY  002A
NUMOVF 0029  FLTFLG 0028  EXP    0088  EXP2   008A  EXPNT  5CA8  EXPPL  5CAB
XPINC  5CAD  FRMT1  5CBC  RND7   5CE9  EXPL   5CED  PWR3   5CEE  NEG1   5CFC
NEG2   5D00  FLT    5D05  FLOAT  5D09  FLT1   5D0A  FLT2   5D0F  CHKOVF 5D20
FXD    5D2C  DIGNTR 5D36  FIXED  5D46  NTROS  5D4E  LDDGT  5D5F  STRDGT 5D6E
BLANK1 5D75  MORE   5D7A  LDMNT  5D80  CARRY1 5D9C  XP99   5DA1  LOAD0  5DA3
CHKRND 5DBD  DCPT   5DC1  NODPT1 5DC6  NODPT  5DC8  CARRY2 5DD5  ENDMNT 5DD8
LOAD1  5DDF  CHKCR  5DE4  NOT99  5E00  BGBUF  5E10  OVRFL  5E18  FLT3   5E2B
POWER3 5E2E  FLTOVF 5E36  SGNMT  5E40  SGNPOS 5E4D  CHKEEX 5E50  EXPNO  5E6A
SGNXR  5E6E  CHKSGN 5E7C  NEGSGN 5E7E  SGNXP  5E82  NOEXP  5E95  BEGNO  5E9C
DPBLK  5EA1  LDCOM  5EAA  COMMA  5EAB  COMEND 5EBA  XEY    55AC  LDPI   57E3
TOPOL  7338  NTDIV0 7347  GRAD   736A  RAD    736E  ADDOFF 7371  STOANS 7377
YONLY  738C  TORCT  7394  TXXR1  7388  TXRX1  738B  YTOX   738E
```

```
00215                      OPT    LIST,MEM
00218               *
00219               *
00220               * DOT MATRICES FOR PRINTER -- STORED:
00221               *      75 65 55 45 35 25 15
00222               *      74 64 54 44 34 24 14
00223               *      73 63 53 43 33 23 13
00224               *      72 62 52 42 32 22 12
00225               *      71 61 51 41 31 21 11
00226               *
00227               *
00228 5EC0                 ORG    DOTS
00229               * SPACE
00230 5EC0 00              FCB    $0
00231 5EC1 00              FCB    $0
00232 5EC2 00              FCB    $0
00233 5EC3 00              FCB    $0
00234 5EC4 00              FCB    $0
00235               * EXCHANGE SIGN
00236 5EC5 14              FCB    $14
00237 5EC6 16              FCB    $16
00238 5EC7 55              FCB    $55
00239 5EC8 34              FCB    $34
00240 5EC9 14              FCB    $14
00241               * LOWER CASE E
00242 5ECA 2C              FCB    $2C
00243 5ECB 4A              FCB    $4A
00244 5ECC 4A              FCB    $4A
00245 5ECD 4A              FCB    $4A
00246 5ECE 3C              FCB    $3C
00247               * POUND SIGN
00248 5ECF 14              FCB    $14
00249 5ED0 7F              FCB    $7F
00250 5ED1 14              FCB    $14
00251 5ED2 7F              FCB    $7F
00252 5ED3 14              FCB    $14
00253               * DOLLAR SIGN
00254 5ED4 12              FCB    $12
00255 5ED5 2A              FCB    $2A
00256 5ED6 7F              FCB    $7F
00257 5ED7 2A              FCB    $2A
00258 5ED8 24              FCB    $24
00259               * PERCENT SIGN
```

```
5E09 62         FCB    $62
5EDA 64         FCB    $64
5EDB 08         FCB    $8
5EDC 13         FCB    $13
5EDD 23         FCB    $23
              * AND (&) SIGN
5EDE 50         FCB    $50
5EDF 20         FCB    $20
5EE0 56         FCB    $56
5EE1 49         FCB    $49
5EE2 36         FCB    $36
              * APOSTROPHE
5EE3 00         FCB    $0
5EE4 00         FCB    $0
5EE5 07         FCB    $7
5EE6 00         FCB    $0
5EE7 00         FCB    $0
              * LEFT PARENTHESIS
5EE8 00         FCB    $0
5EE9 41         FCB    $41
5EEA 22         FCB    $22
5EEB 1C         FCB    $1C
5EEC 00         FCB    $0
              * RIGHT PARENTHESIS
5EED 00         FCB    $0
5EEE 1C         FCB    $1C
5EEF 22         FCB    $22
5EF0 41         FCB    $41
5EF1 00         FCB    $0
              * ASTERISK
5EF2 08         FCB    $8
5EF3 2A         FCB    $2A
5EF4 1C         FCB    $1C
5EF5 2A         FCB    $2A
5EF6 08         FCB    $8
              * PLUS SIGN
5EF7 08         FCB    $8
5EF8 08         FCB    $8
5EF9 3E         FCB    $3E
5EFA 08         FCB    $8
5EFB 08         FCB    $8
              * COMMA
5EFC 00         FCB    $0
5EFD 00         FCB    $0
5EFE 38         FCB    $38
5EFF 58         FCB    $58
5F00 00         FCB    $0
              * MINUS SIGN
5F01 08         FCB    $8
5F02 08         FCB    $8
5F03 08         FCB    $8
5F04 08         FCB    $8
5F05 08         FCB    $8
              * DECIMAL POINT
5F06 00         FCB    $0
5F07 00         FCB    $0
5F08 60         FCB    $60
5F09 60         FCB    $60
5F0A 00         FCB    $0
              * SLASH (/)
5F0B 02         FCB    $2
5F0C 04         FCB    $4
5F0D 08         FCB    $8
5F0E 10         FCB    $10
5F0F 20         FCB    $20
              * 0
5F10 3E         FCB    $3E
5F11 45         FCB    $45
5F12 49         FCB    $49
5F13 51         FCB    $51
5F14 3E         FCB    $3E
              * 1
5F15 00         FCB    $0
5F16 40         FCB    $40
5F17 7F         FCB    $7F
```

```
5F18 42              FCB    $42
5F19 00              FCB    $0
                * 2
5F1A 46              FCB    $46
5F1B 49              FCB    $49
5F1C 49              FCB    $49
5F1D 51              FCB    $51
5F1E 62              FCB    $62
                * 3
5F1F 36              FCB    $36
5F20 49              FCB    $49
5F21 49              FCB    $49
5F22 41              FCB    $41
5F23 22              FCB    $22
                * 4
5F24 10              FCB    $10
5F25 7F              FCB    $7F
5F26 12              FCB    $12
5F27 14              FCB    $14
5F28 18              FCB    $18
                * 5
5F29 39              FCB    $39
5F2A 45              FCB    $45
5F2B 45              FCB    $45
5F2C 45              FCB    $45
5F2D 27              FCB    $27
                * 6
5F2E 31              FCB    $31
5F2F 49              FCB    $49
5F30 49              FCB    $49
5F31 4A              FCB    $4A
5F32 3C              FCB    $3C
                * 7
5F33 03              FCB    $3
5F34 05              FCB    $5
5F35 09              FCB    $9
5F36 71              FCB    $71
5F37 01              FCB    $1
                * 8
5F38 36              FCB    $36
5F39 49              FCB    $49
5F3A 49              FCB    $49
5F3B 49              FCB    $49
5F3C 36              FCB    $36
                * 9
5F3D 1E              FCB    $1E
5F3E 29              FCB    $29
5F3F 49              FCB    $49
5F40 49              FCB    $49
5F41 06              FCB    $6
                * COLON
5F42 00              FCB    $0
5F43 00              FCB    $0
5F44 36              FCB    $36
5F45 36              FCB    $36
5F46 00              FCB    $0
                * GREATER THAN OR EQUAL TO SIGN
5F47 48              FCB    $48
5F48 54              FCB    $54
5F49 62              FCB    $62
5F4A 41              FCB    $41
5F4B 00              FCB    $0
                * LESS THAN SIGN
5F4C 00              FCB    $0
5F4D 41              FCB    $41
5F4E 22              FCB    $22
5F4F 14              FCB    $14
5F50 08              FCB    $8
                * EQUAL SIGN
5F51 14              FCB    $14
5F52 14              FCB    $14
5F53 14              FCB    $14
5F54 14              FCB    $14
5F55 14              FCB    $14
                * GREATER THAN SIGN
5F56 08              FCB    $8
```

```
00414 5F57 14        FCB   $14
00415 5F58 22        FCB   $22
00416 5F59 41        FCB   $41
00417 5F5A 00        FCB   $0
00418           * QUESTION MARK
00419 5F5B 06        FCB   $6
00420 5F5C 09        FCB   $9
00421 5F5D 51        FCB   $51
00422 5F5E 01        FCB   $1
00423 5F5F 06        FCB   $6
00424           * COMMERCIAL AT SIGN
00425 5F60 1E        FCB   $1E
00426 5F61 55        FCB   $55
00427 5F62 5D        FCB   $5D
00428 5F63 41        FCB   $41
00429 5F64 3E        FCB   $3E
00430           * A
00431 5F65 7E        FCB   $7E
00432 5F66 09        FCB   $9
00433 5F67 09        FCB   $9
00434 5F68 09        FCB   $9
00435 5F69 7E        FCB   $7E
00437           * B
00438 5F6A 36        FCB   $36
00439 5F6B 49        FCB   $49
00440 5F6C 49        FCB   $49
00441 5F6D 49        FCB   $49
00442 5F6E 7F        FCB   $7F
00443           * C
00444 5F6F 22        FCB   $22
00445 5F70 41        FCB   $41
00446 5F71 41        FCB   $41
00447 5F72 41        FCB   $41
00448 5F73 3E        FCB   $3E
00449           * D
00450 5F74 3E        FCB   $3E
00451 5F75 41        FCB   $41
00452 5F76 41        FCB   $41
00453 5F77 7F        FCB   $7F
00454 5F78 41        FCB   $41
00455           * E
00456 5F79 41        FCB   $41
00457 5F7A 49        FCB   $49
00458 5F7B 49        FCB   $49
00459 5F7C 49        FCB   $49
00460 5F7D 7F        FCB   $7F
00461           * F
00462 5F7E 01        FCB   $1
00463 5F7F 09        FCB   $9
00464 5F80 09        FCB   $9
00465 5F81 09        FCB   $9
00466 5F82 7F        FCB   $7F
00467           * G
00468 5F83 71        FCB   $71
00469 5F84 51        FCB   $51
00470 5F85 41        FCB   $41
00471 5F86 41        FCB   $41
00472 5F87 3E        FCB   $3E
00473           * H
00474 5F88 7F        FCB   $7F
00475 5F89 08        FCB   $8
00476 5F8A 08        FCB   $8
00477 5F8B 08        FCB   $8
00478 5F8C 7F        FCB   $7F
00479           * I
00480 5F8D 00        FCB   $0
00481 5F8E 41        FCB   $41
00482 5F8F 7F        FCB   $7F
00483 5F90 41        FCB   $41
00484 5F91 00        FCB   $0
00485           * J
00486 5F92 3F        FCB   $3F
00487 5F93 40        FCB   $40
00488 5F94 40        FCB   $40
00489 5F95 40        FCB   $40
00490 5F96 20        FCB   $20
```

```
00492                   * K
00493 5F97 41                  FCB     $41
00494 5F98 22                  FCB     $22
00495 5F99 14                  FCB     $14
00496 5F9A 08                  FCB     $8
00497 5F9B 7F                  FCB     $7F
00498                   * L
00499 5F9C 40                  FCB     $40
00500 5F9D 40                  FCB     $40
00501 5F9E 40                  FCB     $40
00502 5F9F 40                  FCB     $40
00503 5FA0 7F                  FCB     $7F
00504                   * M
00505 5FA1 7F                  FCB     $7F
00506 5FA2 02                  FCB     $2
00507 5FA3 0C                  FCB     $C
00508 5FA4 02                  FCB     $2
00509 5FA5 7F                  FCB     $7F
00510                   * N
00511 5FA6 7F                  FCB     $7F
00512 5FA7 10                  FCB     $10
00513 5FA8 08                  FCB     $8
00514 5FA9 04                  FCB     $4
00515 5FAA 7F                  FCB     $7F
00516                   * O
00517 5FAB 3E                  FCB     $3E
00518 5FAC 41                  FCB     $41
00519 5FAD 41                  FCB     $41
00520 5FAE 41                  FCB     $41
00521 5FAF 3E                  FCB     $3E
00522                   * P
00523 5FB0 06                  FCB     $6
00524 5FB1 09                  FCB     $9
00525 5FB2 09                  FCB     $9
00526 5FB3 09                  FCB     $9
00527 5FB4 7F                  FCB     $7F
00528                   * Q
00529 5FB5 5E                  FCB     $5E
00530 5FB6 21                  FCB     $21
00531 5FB7 51                  FCB     $51
00532 5FB8 41                  FCB     $41
00533 5FB9 3E                  FCB     $3E
00534                   * R
00535 5FBA 46                  FCB     $46
00536 5FBB 29                  FCB     $29
00537 5FBC 19                  FCB     $19
00538 5FBD 09                  FCB     $9
00539 5FBE 7F                  FCB     $7F
00540                   * S
00541 5FBF 32                  FCB     $32
00542 5FC0 49                  FCB     $49
00543 5FC1 49                  FCB     $49
00544 5FC2 49                  FCB     $49
00545 5FC3 26                  FCB     $26
00547                   * T
00548 5FC4 01                  FCB     $1
00549 5FC5 01                  FCB     $1
00550 5FC6 7F                  FCB     $7F
00551 5FC7 01                  FCB     $1
00552 5FC8 01                  FCB     $1
00553                   * U
00554 5FC9 3F                  FCB     $3F
00555 5FCA 40                  FCB     $40
00556 5FCB 40                  FCB     $40
00557 5FCC 40                  FCB     $40
00558 5FCD 3F                  FCB     $3F
00559                   * V
00560 5FCE 07                  FCB     $7
00561 5FCF 18                  FCB     $18
00562 5FD0 60                  FCB     $60
00563 5FD1 18                  FCB     $18
00564 5FD2 07                  FCB     $7
00565                   * W
00566 5FD3 7F                  FCB     $7F
00567 5FD4 20                  FCB     $20
00568 5FD5 18                  FCB     $18
```

```
00569 5FD6 20            FCB     $20
00570 5FD7 7F            FCB     $7F
00571              * X
00572 5FD8 63            FCB     $63
00573 5FD9 14            FCB     $14
00574 5FDA 08            FCB     $8
00575 5FDB 14            FCB     $14
00576 5FDC 63            FCB     $63
00577              * Y
00578 5FDD 03            FCB     $3
00579 5FDE 04            FCB     $4
00580 5FDF 78            FCB     $78
00581 5FE0 04            FCB     $4
00582 5FE1 03            FCB     $3
00583              * Z
00584 5FE2 43            FCB     $43
00585 5FE3 45            FCB     $45
00586 5FE4 49            FCB     $49
00587 5FE5 51            FCB     $51
00588 5FE6 61            FCB     $61
00589              * DIVIDE SIGN
00590 5FE7 08            FCB     $8
00591 5FE8 08            FCB     $8
00592 5FE9 2A            FCB     $2A
00593 5FEA 08            FCB     $8
00594 5FEB 08            FCB     $8
00595              * RIGHT ARROW
00596 5FEC 08            FCB     $8
00597 5FED 1C            FCB     $1C
00598 5FEE 2A            FCB     $2A
00599 5FEF 08            FCB     $8
00600 5FF0 08            FCB     $8
00602              * PI
00603 5FF1 02            FCB     $2
00604 5FF2 7C            FCB     $7C
00605 5FF3 04            FCB     $4
00606 5FF4 7C            FCB     $7C
00607 5FF5 08            FCB     $8
00608              * UP ARROW
00609 5FF6 04            FCB     $4
00610 5FF7 02            FCB     $2
00611 5FF8 7F            FCB     $7F
00612 5FF9 02            FCB     $2
00613 5FFA 04            FCB     $4
00614              * DOWN ARROW
00615 5FFB 10            FCB     $10
00616 5FFC 20            FCB     $20
00617 5FFD 7F            FCB     $7F
00618 5FFE 20            FCB     $20
00619 5FFF 10            FCB     $10
00620              * GMBH CHARRACTERS
00621 6000 3C            FCB     $3C          O(..)
00622 6001 43            FCB     $43
00623 6002 42            FCB     $42
00624 6003 43            FCB     $43
00625 6004 3C            FCB     $3C
00626 6005 3C            FCB     $3C          U(..)
00627 6006 41            FCB     $41
00628 6007 40            FCB     $40
00629 6008 41            FCB     $41
00630 6009 3C            FCB     $3C
00631 600A 7C            FCB     $7C          A(..)
00632 600B 13            FCB     $13
00633 600C 12            FCB     $12
00634 600D 13            FCB     $13
00635 600E 7C            FCB     $7C
00636 600F 7C            FCB     $7C          A(.)
00637 6010 12            FCB     $12
00638 6011 13            FCB     $13
00639 6012 12            FCB     $12
00640 6013 7C            FCB     $7C
00641 6014 49            FCB     $49          AE
00642 6015 49            FCB     $49
00643 6016 7F            FCB     $7F
00644 6017 09            FCB     $9
```

```
6018 7E             FCB    $7E
6019 42             FCB    $42        L
601A 41             FCB    $41
601B 49             FCB    $49
601C 7E             FCB    $7E
601D 48             FCB    $48
               * SPANISH CHARACTERS
601E 30             FCB    $30        UPSIDE DOWN ?
601F 40             FCB    $40
6020 45             FCB    $45
6021 48             FCB    $48
6022 30             FCB    $30
6023 7D             FCB    $7D        N BAR
6024 21             FCB    $21
6025 11             FCB    $11
6026 09             FCB    $9
6027 70             FCB    $7D
               * ALPHA
6028 26             FCB    $26
6029 18             FCB    $18
602A 24             FCB    $24
602B 24             FCB    $24
602C 18             FCB    $18
     0016      PSTN    EQU    TP2
     001A      STACK   EQU    TP4
     002D      ROW     EQU    T2
     002C      PASS    EQU    T3
     002B      DOT     EQU    T4
     002A      PULSE   EQU    T5
               *
               *
               * DAVE UHLRICH   AUGUST 14,1974   PRINTER   REV G
               *
               *
               * THIS ROUTINE TAKES THE ASCII DATA IN BUFF,
               * CONVERTS THEM TO THEIR DOT MATRIX
               * EQUIVALENTS, AND PRINTS THEM ON THE
               * PRINTER.  IT DOES THE CONVERSION AND
               * PRINTING ON A ROW-BY-ROW BASIS, USING
               * AN ADAPTIVE FOUR-PASS SYSTEM.  FOR
               * EXAMPLE, IT WILL PRINT ROW 1 OF
               * CHARACTERS 1,5,9,&13 ON THE FIRST
               * PASS, ROW 1 OF 2,6,10,&14 ON THE SECOND,
               * ETC. UNLESS THE NUMBER OF DOTS TO BE
               * PRINTED IN ANY ONE PASS EXCEEDS
               * TEN.  IN THAT CASE, IT WILL PRINT THE
               * ROW DATA TWO CHARACTERS AT A TIME
               * FOR THAT PARTICULAR PASS ONLY.
               *
               * PRINTER SELECT CODE=1101 IN LOWER 4 BITS OF ADATA.
               * PRINT SELECTS IN UPPER 4 BITS OF ADATA:
               *     1) #1=1110
               *     2) #2=1101
               *     3) #3=1011
               *     4) #4=0111
               * PRINTER LOAD CODE IS 101 IN BITS
               * 3,4,&5 OF ACTL.  THE PRINTER SHIFT
               * REGISTER IS CONNECTED TO BIT 0 OF BDATA.
               *
               *
602D 96 07     PRNTR   LDA A  TGL        LOAD TOGGLE SWITCH REG
602F 85 60             BIT A  #$60       PRINT ON OR AUDIT?
6031 26 01             BNE    PRNTR1     YES, PRINT
6033 39                RTS               NO, RETURN
6034 86 0C     PRNTR1  LDA A  #$C
6036 97 00             STA A  ADATA      SEND OUT TOGGLE SWITCH ENABLE
6038 D6 04             LDA B  INPUT      LOAD TOGGLE SWITCHES
603A 4F                CLR A
603B 97 00             STA A  ADATA      CLEAR SELECT CODE
603D C5 02             BIT B  #2         OUT OF PAPER?
603F 27 05             BEQ    PRNTR2     NO, PRINT
6041 86 17             LDA A  #23        YES, LOAD ERROR CODE
6043 97 06             STA A  ERROR
6045 39                RTS
6046 86 F0     PRNTR2  LDA A  #$F0
```

```
6048 BD 6128          JSR    PPRADV    PAPER ADVANCE
604B 4F               CLR A
604C 97 1A            STA A  STACK     SET SPH=0
604E 4C               INC A
604F 97 2D            STA A  ROW       SET ROW PTR=1
6051 86 08    NXTROW  LDA A  #8
6053 97 2C            STA A  PASS      SET PASS CTR
6055 4F               CLR A
6056 97 2B            STA A  DOT
6058 86 68            LDA A  #REAL
605A 97 1B            STA A  STACK+1    SET SPL=REAL
605C CE 0067          LDX    #$67      POINT PSTN PTR AT LAST CHAR
605F 0F               SEI              DISABLE KEY INTERRUPT
6060 A6 00    LDASC   LDA A  X         LOAD ASCII CODE
6062 84 7F            AND A  #$7F      LOP OFF TOP BIT
6064 81 68            CMP A  #$68      IS ASCII CODE > $68?
6066 22 04            BHI    GT68      YES, TREAT IT AS A BLANK
6068 80 20            SUB A  #$20      SUBTRACT OFF ASCII OFFSET
606A 2A 01            BPL    OK        IS ASCII CODE < $20?
606C 4F       GT68    CLR A            YES, TREAT IT AS A BLANK
606D C6 5E    OK      LDA B  #DOTS/$100   LOAD DOT VECTOR ADDR HIGH
606F 97 2A            STA A  PULSE
6071 48               ASL A
6072 48               ASL A            MULTIPLY BY 4
6073 C9 00            ADC B  #0        IF CARRY, INCR ADDR HIGH
6075 9B 2A            ADD A  PULSE     ADD TO MULTIPLY BY 5
6077 C9 00            ADC B  #0        IF CARRY, INCR ADDR HIGH
6079 8B C0            ADD A  #$C0      ADD TABLE ADDR LOW TO OFFSET
607B 97 19            STA A  TP3S      STORE IT IN ADDR LOW
607D C9 00            ADC B  #0        IF CARRY, INCR ADDR HIGH
607F D7 18            STA B  TP3       STORE ADDRESS HIGH
6081 DF 16            STX    PSTN      STORE POS PTR
6083 DE 18            LDX    TP3       LOAD DOT MATRIX ADDR
6085 C6 F8            LDA B  #$F8      LOAD COLUMN CTR
6087 58       LDDOT   ASL B            DECR COLUMN CTR
6088 A6 00            LDA A  X         LOAD DOT COLUMN
608A 94 2D            AND A  ROW       CHOOSE DOT OF ONE ROW
608C 27 04            BEQ    NODOT     IS IT A ZERO?
608E 5C               INC B            NO, LOAD ONE IN DOT ROW
608F 7C 002B          INC    DOT       INCR DOT CTR
6092 08       NODOT   INX              POINT TO NEXT COLUMN
6093 C5 E0            BIT B  #$E0      DONE BUILDING DOT VECTOR?
6095 26 F0            BNE    LDDOT     NO, LOAD NEXT DOT
6097 DE 1A            LDX    STACK     LOAD INDEX WITH STACK PTR
6099 E7 00            STA B  X         STORE DOT VECTOR ON STACK
609B 7C 001B          INC    STACK+1    INCREMENT STACK PTR
609E 96 17            LDA A  PSTN+1    LOAD LOWER HALF PSTN PTR
60A0 80 04            SUB A  #4        DECR IT BY 4
60A2 97 17            STA A  PSTN+1    STORE IT BACK
60A4 DE 16            LDX    PSTN      LOAD INDEX WITH POS PTR
60A6 81 58            CMP A  #$58      IS POS PTR<$58?
60A8 2C B6            BGE    LDASC     NO, CONVERT NEXT ASCII CHAR
60AA 96 2B            LDA A  DOT       LOAD DOT CTR
60AC 16               TAB              PUT IT IN ACCB ALSO
60AD 44               LSR A            SHIFT DOT FLAGS RIGHT ONE BIT
60AE C4 1F            AND B  #$1F      MASK OFF NO. OF DOTS
60B0 C1 0A            CMP B  #10       NO. OF DOTS >10?
60B2 2F 02            BLE    LT10      NO, DO NOT SET DOT FLAG
60B4 8B 80            ADD A  #$80      YES, SET DOT FLAG
60B6 84 F0    LT10    AND A  #$F0      SAVE DOT FLAGS AND
60B8 97 2B            STA A  DOT       CLEAR DOT CTR
60BA 96 17            LDA A  PSTN+1    LOAD POS PTR
60BC 81 54            CMP A  #$54      END OF COMPLETE ROW?
60BE 27 0B            BEQ    ENDROW    YES, PAPER ADVANCE
60C0 8B 0F            ADD A  #15       ADD 15 TO POS PTR
60C2 97 17            STA A  PSTN+1    STORE BEG OF NEXT PASS
60C4 DE 16            LDX    PSTN      LOAD POS PTR INTO INDEX
60C6 74 002C          LSR    PASS      SHIFT PASS CTR
60C9 20 95            BRA    LDASC
60CB CE FE7F  ENDROW  LDX    #-385     7.5-4.42=WAIT TO FINISH OFF TIME
60CE BD 613B          JSR    LOOP
60D1 86 FD            LDA A  #$FD      LOAD PRINTER SELECT CODE
60D3 97 00            STA A  ADATA     TURN PRINTER ON
60D5 C6 2C    OUTPT   LDA B  #$2C
60D7 D7 03            STA B  BCTL      ENABLE PRINTER SHIFT REG
60D9 8D 3D            BSR    LDCHAR    SEND DOTS OUT TO PRINTER
```

```
6OD8 8D 3B              BSR     LDCHAR    SEND DOTS OUT TO PRINTER
60DD 96 2B              LDA A   DOT
60DF 2A 0A              BPL     NOOVFL    MORE THAN 10 DOTS ON THIS PASS?
60E1 5F                 CLR B
60E2 86 F6              LDA A   #-10      YES, SET ZERO CTR=-10
60E4 D7 02      LD0     STA B   BDATA     SHIFT 0 INTO PRINTER REG
60E6 4C                 INC A             INCR ZERO CTR
60E7 26 FB              BNE     LD0       10 ZEROES LOADED?
60E9 8D 54              BSR     PRINT     YES, PRINT
60EB 8D 2B      NOOVFL  BSR     LDCHAR    SEND DOTS OUT TO PRINTER
60ED 8D 29              BSR     LDCHAR    SEND DOTS OUT TO PRINTER
60EF 8D 4E              BSR     PRINT     PRINT
60F1 86 3C              LDA A   #$3C
60F3 97 03              STA A   BCTL      TURN PRINTER SHIFT REG OFF
60F5 78 002B            ASL     DOT       POINT TO NEXT DOT FLAG
60F8 96 2C              LDA A   PASS
60FA 48                 ASL A
60FB 97 2C              STA A   PASS
60FD 81 10              CMP A   #16       PRINTED ALL FOUR PASSES?
60FF 26 D4              BNE     OUTPT     NO, PRINT NEXT PASS
6101 CE FF06            LDX     #-250     WAIT 2 MSEC AFTER BURN
6104 8D 35              BSR     LOOP
6106 0E                 CLI               ENABLE KEY INTERRUPT
6107 86 F0              LDA A   #$F0
6109 97 00              STA A   ADATA     TURN PRINTER OFF
610B 78 002D            ASL     ROW       SHIFT ROW PTR
610E 2B 03              BMI     DONE      MINUS, PRINT COMPLETE
6110 7E 6051            JMP     NXTROW
6113 8D 13      DONE    BSR     PPRADV    PAPER ADVANCE
6115 8D 11              BSR     PPRADV    PAPER ADVANCE
6117 39                 RTS
6118 7A 001B    LDCHAR  DEC     STACK+1    DECR STACK PTR
611B DE 1A              LDX     STACK     LOAD INDEX WITH STACK PTR
611D E6 00              LDA B   X         LOAD DOT VECTOR
611F D7 02      SNDOT   STA B   BDATA     SEND DOT OUT TO PRINTER
6121 0D                 SEC               SET CARRY
6122 56                 ROR B             ROTATE NEXT DOT INTO POSITION
6123 C1 F8              CMP B   #$F8      DONE WITH CHAR?
6125 26 F8              BNE     SNDOT     NO, SEND OUT ANOTHER DOT
6127 39                 RTS
6128 0F         PPRADV  SEI               DISABLE KEY INTERRUPT
6129 CE FC57            LDX     #-937     LOAD 7.5 MSEC OFF TIME
612C 8D 0D              BSR     LOOP
612E CE F38D            LDX     #-3187    LOAD 25.5 MSEC ON COUNT
6131 C6 FD              LDA B   #$FD
6133 D7 00              STA B   ADATA     TURN PRINTER ON
6135 8D 04              BSR     LOOP
6137 97 00              STA A   ADATA     TURN PRINTER OFF
6139 0E                 CLI               ENABLE KEY INTERRUPT
613A 39                 RTS
613B 08         LOOP    INX
613C 26 FD              BNE     LOOP
613E 39                 RTS
613F DF 16      PRINT   STX     PSTN      STORE PSTN PTR
6141 CE FF06            LDX     #-250     LOAD 2.0 MSEC BURN COUNT
6144 86 75              LDA A   #117
6146 97 2A              STA A   PULSE     SET PULSE CTR
6148 96 2C              LDA A   PASS      LOAD PASS CTR
614A 43                 COM A             COMPLEMENT IT
614B 48                 ASL A
614C 48                 ASL A
614D 48                 ASL A
614E 48                 ASL A
614F 8A 0D              ORA A   #$D       OR WITH PRINTER SELECT CODE
6151 97 00              STA A   ADATA     START PRINT
6153 8D E6              BSR     LOOP      HOLD PRINT FOR 2.0 MSEC
6155 C6 FD      DUTY    LDA B   #$FD
6157 D7 00              STA B   ADATA     TURN OFF PRINT PULSE
6159 7A 002A            DEC     PULSE     HOLD PRINT PULSE OFF 15 USEC
615C 26 03              BNE     MRPLS     PRINT COMPLETE?
615E DE 16              LDX     PSTN      YES, RELOAD PSTN PTR
6160 39                 RTS               RETURN
6161 97 00      MRPLS   STA A   ADATA     TURN PRINT PULSE BACK ON
6163 B7 07FF            STA A   $7FF      HOLD PRINT PULSE ON FOR 15 USEC
6166 20 ED              BRA     DUTY
                        END
```

SYMBOL TABLE

```
ADATA  0000  ACTL   0001  BDATA  0002  BCTL   0003  INPUT  0004  IOIN   0005
ERROR  0006  TGL    0007  UFLG   0008  RSFLG  0009  EOM    000A  EOPM   000B
STKFLG 000D  RND    000E  DIGFLG 000F  W2     0010  W1     0011  SFLG   0012
DCNTR  0013  TP1    0014  TP1S   0015  TP2    0016  TP2S   0017  TP3    0018
TP3S   0019  TP4    001A  TP4S   001B  TP5    001C  TP5S   001D  TP6    001E
TP6S   001F  TP7    0020  TP7S   0021  T13    0022  T12    0023  T11    0024
T10    0025  T9     0026  T8     0027  T7     0028  T6     0029  T5     002A
T4     002B  T3     002C  T2     002D  T1     002E  ISTK   002F  ISTACK 0051
TA     0052  SPGM   0054  EXTRA  0056  BUFF   0058  REAL   0068  IMAG   0070
AT1    0078  AT2    0080  W      0088  XR     0090  YR     0098  ZR     00A0
TR     00A8  LSTX   00B0  BKWRT  00B8  BKKC   00BA  SOL7   00C6  UPP    00C8
UIP    00CA  ALPHA  00CC  IO1    00CD  IO2    00D0  IT7    00D3  FLAG   00D5
TPOS   00D6  FILE   00D7  AR     00D8  BR     00E0  CR     00E8  DR     00F0
ER     00F8  SDBB   00BA  MT     7E00  TERMN7 003D  IMED   0040  PARCD  00C0
PAREX  0080  NTBL   0000  DOTS   5EC0  PRTDRV 602D  FRMT   5CA8  BLANK  5D75
LDMSG  578D  ROLLO  55B2  ROLLU  57F1  PSD    550A  TXL    55E9  STKUP  55EF
MAD    749B  CMP    74AA  NOR    74D6  TXW    7424  TXXR   743B  EXXR   7452
ARSR   753B  OVUNF  75B6  OVERF  75DD  XR0    740A  XRNINE 75C8  UNDRF  75F1
IMULT  76B9  QDG    7669  FPA    75FC  FPS    75F6  FPM    7735  FPD    7793
FPAEX  763D  FPMEX  7780  LSHIFT 7521  ZEROX  7489  XZEROQ 7416  XZERO2 7417
RECIP  73E6  TXRX   73F3  CONST  6800  FPDBRC 6898  TAN    68A9  ATN    69C3
DSZERO 6A46  NTLN   6A58  EXPN   6AC9  SIN    6B94  COS    6B9A  ASIN   6BF2
ACOS   6BF7  PH1    6C5D  PH2    6C8D  PH3    6D34  PH4    6DD0  LSFT8  6E47
SQRT   6E65  MAD8   6F2C  CMP8   53E4  IOUPX  6F52  LOG10  6FA7  YUPX   6FE9
RTOP   732B  PTOR   7386  PSTN   0016  STACK  001A  ROW    002D  PASS   002C
DOT    002B  PULSE  002A  PRNTR  602D  PRNTR1 6034  PRNTR2 6046  NXTROW 6051
LDASC  6060  GT68   606C  OK     606D  LDDOT  6087  NODOT  6092  LT10   60B6
ENDROW 60CB  OUTPT  60D5  LD0    60E4  NOOVFL 60EB  DONE   6113  LDCHAR 6118
SNDOT  611F  PPRADV 6128  LOOP   613B  PRINT  613F  DUTY   6155  MRPLS  6161
```

```
                          OPT     LIST,MEM
                 *
                 *
                 * EQUATE TABLE
                 *
                 *
           002E  SAVE    EQU    T1
           002D  FLCTR   EQU    T2
           002C  MASK    EQU    T3
           002B  REWFLG  EQU    T4
           002A  KNWALL  EQU    T5
           007A  MRKBOT  EQU    AT1+2
           007B  FNDCMD  EQU    AT1+3
           007C  STACK   EQU    AT1+4
           008A  SVINS   EQU    W+2
           008D  SAVSTK  EQU    W+5
           0028  SPADRS  EQU    T7
           0026  CFSZ    EQU    T9
           0024  AFSZ    EQU    T11
           0023  TYPE    EQU    T12
           0022  CHKSM   EQU    T13
           0016  BFPTR   EQU    TP2
           00D5  FLAG    EQU    $D5
           00D6  TPOS    EQU    $D6
           00D7  FILE    EQU    $D7
           4D58  SADRS   EQU    $4D58
           49CE  TSFR    EQU    $49CE
           484B  ADD7    EQU    $484B
           4840  SUB7    EQU    $4840
           5CA8  FRMT    EQU    $5CA8
           5D75  BLANK   EQU    $5D75
           578D  LDMSG   EQU    $578D
           48BC  BINBCD  EQU    $48BC
           55EF  STKUP   EQU    $55EF
           740A  XR0     EQU    $740A
           74D6  NOR     EQU    $74D6
           4EA4  DGTS    EQU    $4EA4
           602D  PRTDRV  EQU    $602D
           57F1  ROLLU   EQU    $57F1
     6168                ORG    $6168
                 *
                 *
```

```
                          * CASSETTE INITIALIZATION AND EXIT ROUTINES.
                          *
                          *
6168 0F          SETUP    SEI                    DISABLE KEY INTERRUPT
6169 DF 8A                STX      SVINS         SAVE INSTR. STARTING ADDRESS
616B 30                   TSX
616C 08                   INX
616D DF 8D                STX      SAVSTK        SAVE STACK POINTER
616F 96 03                LDA A    BCTL          CHECK IF CARTRIDGE HAS BEEN OUT
6171 2A 03                BPL      CRTIN
6173 4F                   CLR A
6174 97 D6                STA A    TPOS          TPOS=LOST
6176 BD 674D     CRTIN    JSR      COT           CHECK IF CARTRIDGE IS STILL OUT
6179 16                   TAB
617A BD 672C              JSR      LIGHT         TAPE SPOOLED OFF?
617D 96 02                LDA A    BDATA         RESET EOT & COT INTERRUPT BIT
617F 4F                   CLR A
6180 97 0F                STA A    DIGFLG        CLEAR DIGIT ENTRY FLAG
6182 97 2B                STA A    REWFLG
6184 97 2A                STA A    KNWALL
6186 97 7A                STA A    MPKBOT
6188 86 05                LDA A    #5
618A 97 20                STA A    FLCTR         SET FILE CTR=5
618C 97 7B                STA A    FNDCMD        SET FIND COMMAND FLAG
618E 86 3D                LDA A    #$3D
6190 97 03                STA A    BCTL          ENABLE EOT & COT INTERRUPT
6192 96 D5                LDA A    FLAG
6194 8A 02                ORA A    #2            SET CASSETTE OP FLAG
6196 97 D5                STA A    FLAG
6198 9E 8D                LDS      SAVSTK
619A 09                   DEX
619B EE 00                LDX      X             SET INDEX TO RETURN ADDRESS
619D AD 00                JSR      X             DO INSTRUCTION
619F 81 0E       ERRMSG   CMP A    #14           CHECKSUM ERROR?
61A1 26 16                BNE      STERR
61A3 DE 8A                LDX      SVINS         LOAD ADDRESS OF INSTR JUST EXECUTED
61A5 8C 6398              CPX      #VERIFY        CHECKSUM ERROR ON VERIFY?
61A8 27 0F                BEQ      STERR         YES, DON'T TRY AGAIN
61AA D6 D5                LDA B    FLAG
61AC CB 20                ADD B    #$20          INCREMENT TRY CTR
61AE D7 D5                STA B    FLAG
61B0 C4 60                AND B    #$60          MASK OFF TRY CTR
61B2 C1 60                CMP B    #$60          FAILED THREE TIMES?
61B4 27 03                BEQ      STERR         YES, PRINT ERROR
61B6 7E 6781              JMP      OVER          NO, TRY AGAIN
61B9 97 06       STERR    STA A    ERROR
61BB BD 66D3              JSR      STOP          MAKE SURE TAPE IS STOPPED
61BE 9E 8D       TRNOFF   LDS      SAVSTK        RESET STACK POINTER
61C0 86 3C                LDA A    #$3C
61C2 97 03                STA A    BCTL          DISABLE EOT & COT INTERRUPT
61C4 0E                   CLI                    ENABLE KEY INTERRUPT
61C5 D6 D5                LDA B    FLAG          LOAD CASSETTE OP FLAG
61C7 C4 9D                AND B    #$9D          CLEAR IT
61C9 D7 D5                STA B    FLAG          RESTORE IT
61CB 39                   RTS
61CC E6 00       TOBIN    LDA B    X             LOAD EXPNT
61CE 5C                   INC B                  INCR IT
61CF 2E 04                BGT      NOOK          IS IT > 0?
61D1 86 06       ERR6     LDA A    #6            ILLEGAL ARGUMENT
61D3 20 CA                BRA      ERRMSG
61D5 C1 05       NOOK     CMP B    #5            IS IT < 5?
61D7 2C F8                BGE      ERR6          NO, ERROR
61D9 7E 49CE              JMP      TSFR          YES, CONVERT NO. TO BINARY
                          *
                          *
                          * THIS ROUTINE MARKS THE NUMBER OF FILES
                          * CONTAINED IN THE Y-REGISTER.  THE SIZE
                          * OF EACH FILE IS FOUND IN THE Z-REGISTER.
                          * THE STARTING FILE NUMBER IS IN THE
                          * X-REGISTER.
                          *
                          *
61DC 8D 8A       MARK     BSR      SETUP
61DE 54                   LSR B                  RECORD INHIBITED?
61DF 25 03                BCS      MRKOK         NO, OKAY TO RECORD
61E1 86 15                LDA A    #21           RECORD INHIBIT
```

```
00247 61E3 39              RTS
00248 61E4 CE 0098 MRKOK   LDX     #YR       SET INDEX TO YR ADDRESS
00249 61E7 8D E3           BSR     TOBIN     CONVERT ITS CONTENTS TO BINARY
00250 61E9 96 20           LDA A   TP7
00251 61EB 26 E4           BNE     ERR6      NO. OF FILES TO BE MARKED>255?
00252 61ED 96 21           LDA A   TP7S
00253 61EF 27 E0           BEQ     ERR6      NO. OF FILES TO BE MARKED=0?
00254 61F1 97 8C           STA A   W+4       SAVE NO. OF FILES TO BE MARKED
00255 61F3 CE 00A0         LDX     #ZR       SET INDEX TO ZR ADDRESS
00256 61F6 8D D4           BSR     TOBIN     CONVERT ITS CONTENTS TO BINARY
00257 61F8 DE 20           LDX     TP7
00258 61FA 27 D5           BEQ     ERR6      FILE SIZE=0. ILLEGAL ARGUMENT
00259 61FC DF 1C           STX     TP5       SAVE FILE SIZE IN TP5
00260 61FE BD 6527         JSR     FILENO    STARTING FILE NO. TO BINARY
00261 6201 96 21           LDA A   TP7S      LOAD NEW FILE NUMBER
00262 6203 27 14           BEQ     BEGIN     IF =0, SET EVERYTHING UP FOR MARK
00263 6205 16              TAB
00264 6206 9B 8C           ADD A   W+4       NEW FILE+NO. OF FILES>255?
00265 6208 25 C7           BCS     ERR6      YES, ILLEGAL ARGUMENT
00266 620A D1 D7           CMP B   FILE      NEW FILE=OLD FILE?
00267 620C 26 05           BNE     FIND1     NO, FIND FILE
00268 620E 96 D6           LDA A   TPOS      YES. CHECK TAPE POSITION
00269 6210 44              LSR A             IN GAP?
00270 6211 25 06           BCS     BEGIN     YES, DON'T SEARCH; BEGIN MARKING
00271 6213 BD 6553 FIND1   JSR     FIND+2    FIND FILE
00272 6216 BD 65AA         JSR     CHECK     CHECK IF RIGHT FILE
00273 6219 4F      BEGIN   CLR A
00274 621A 97 7B           STA A   FNDCMD    CLEAR FIND CMMD FLAG
00275 621C 97 26           STA A   CFSZ
00276 621E 97 27           STA A   CFSZ+1    SET CURR FILE SIZE=0
00277 6220 DE 1C           LDX     TP5
00278 6222 DF 24           STX     AFSZ      SET ABS FILE SIZE
00279 6224 96 1C           LDA A   TP5
00280 6226 26 17           BNE     NOSLK     FILE SIZE>255, NO SLACK
00281 6228 D6 1D           LDA B   TP5S
00282 622A C1 50           CMP B   #80       ABS FILE SIZE<80?
00283 622C 22 05           BHI     ADDSLK    NO, ADD SLACK
00284 622E CE 0050         LDX     #80       YES, SET MARKED FILE SIZE TO 80
00285 6231 DF 1C           STX     TP5       SET NEW ABS FILE SIZE=80
00286 6233 C6 19   ADDSLK  LDA B   #25
00287 6235 DB 1D           ADD B   TP5S      ADD 25 BYTES SLACK
00288 6237 24 02           BCC     NOMORE    SIZE+SLACK>255?
00289 6239 4C              INC A
00290 623A 5F              CLR B             YES, ONLY ENOUGH SLACK TO =256
00291 623B D7 1D   NOMORE  STA B   TP5S
00292 623D 97 1C           STA A   TP5
00293 623F C6 05   NOSLK   LDA B   #5
00294 6241 D7 23           STA B   TYPE      SET FILE TYPE=EMPTY
00295 6243 96 21           LDA A   TP7S      LOAD NEW FILE NO.
00296 6245 26 05           BNE     START     IF NOT 0, BEGIN MARKING.
00297 6247 D7 7A           STA B   MRKBOT    IF=0,SET MARK BEG. OF TAPE FLAG
00298 6249 7E 6742         JMP     REWIND+5    REWIND TAPE TO LOAD POINT
00299 624C BD 6668 START   JSR     PART      MARK PART OF PREAMBLE
00300 624F 20 18           BRA     MRKPRE
00301 6251 86 67   FILE0   LDA A   #$67      FORWARD SLOW WRITE DATA=0
00302 6253 97 00           STA A   ADATA
00303 6255 96 00   NXTFL   LDA A   ADATA     RECORD GAP
00304 6257 0E              CLI
00305 6258 02              NOP
00306 6259 0F              SEI
00307 625A 97 00           STA A   ADATA     RESTART TAPE IF INTERRUPTED
00308 625C CE 927C         LDX     #37500    SET INDEX TO MARK 3" GAP
00309 625F BD 66DE         JSR     WAIT
00310 6262 88 80           EOR A   #$80
00311 6264 97 00           STA A   ADATA     YES, CAUSE TRANSITION
00312 6266 BD 6676         JSR     PREMBL    WRITE 1ST PREAMBLE
00313 6269 BD 667F MRKPRE  JSR     RCDHD     RECORD HEADING
00314 626C DE 24           LDX     AFSZ      MARKER FILE?
00315 626E 27 1D           BEQ     FIN1      YES. ALL DONE
00316 6270 DE 1C           LDX     TP5       NO, LOAD INDEX WITH NO. OF BYTES
00317 6272 86 FF           LDA A   #$FF      SET ACCA WITH ALL ONES
00318 6274 BD 663B MRKMR   JSR     RECORD    RECORD BYTE OF ALL ONES
00319 6277 09              DEX               DECR BYTE CTR
00320 6278 26 FA           BNE     MRKMR     DONE? NO, MARK ANOTHER BYTE
00321 627A 7C 00D7         INC     FILE      YES, INCR FILE NO.
00322 627D 7A 008C         DEC     W+4       DECR NO. OF FILES TO BE MARKED
```

```
6280 26 D3          BNE     NXTFL     DONE? NO, MARK NEXT FILE
6282 4F             CLR A
6283 97 24          STA A   AFSZ
6285 97 25          STA A   AFSZ+1    SET ABS FILE SIZE=0
6287 86 06          LDA A   #6
6289 97 23          STA A   TYPE      TYPE=MARKER FILE
628B 20 C8          BRA     NXTFL
628D 96 99    FIN1  LDA A   YR+1
628F 2B 05          BMI     FIN2      NO. OF FILES<0, ERASE TO END OF TAPE
6291 BD 66C9        JSR     RETGP
6294 4F             CLR A
6295 39             RTS
6296 86 80    FIN2  LDA A   #$80
6298 97 7A          STA A   MRKBOT    SET ERASE TO END OF TAPE FLAG
629A 96 00          LDA A   ADATA     LOAD PRESENT TAPE STATUS
629C 84 DF          AND A   #$DF      FORWARD FAST WRITE
629E 7E 6747        JMP     REWIND+10
              *
              *
              * THIS ROUTINE RECORDS INFORMATION IN THE CORE
              * OF THE CALCULATOR INTO THE FILE POINTED
              * TO BY THE NUMBER IN THE X-REGISTER.  THERE
              * ARE FOUR RECORD INSTRUCTIONS:
              *   1) FORMAT RECORD
              *   2) RECORD PROGRAM
              *   3) RECORD DATA
              *   4) STORE BINARY
              * THE RECORD PROGRAM INSTRUCTION STORES THE
              * PROGRAM BEGINNING AT THE PRESENT PROGRAM
              * POSITION INTO THE FILE ON THE TAPE.
              * THE FORMAT RECORD INSTRUCTION DOES THE SAME
              * EXCEPT THAT THE PROGRAM IS STORED AS
              * A SECURED PROGRAM.  THE RECORD DATA
              * INSTRUCTION USES THE STARTING REGISTER NUMBER IN
              * THE Y-REGISTER ANQ THE NUMBER OF REGISTERS IN THE
              * Z-REGISTER TO STORE DATA INTO A FILE ON THE
              * TAPE.  THE STORE BINARY INSTRUCTION STORES A
              * SPECIAL PROGRAM ONTO THE TAPE.
              *
              *
62A1 4C       FRCRD  INC A              FORMAT RECORD ENTRY
62A2 4C       RCPRGM INC A              RECORD PROGRAM ENTRY
62A3 D6 D5           LDA B   FLAG
62A5 54              LSR B              SECURED MEMORY?
62A6 24 05           BCC     STBIN      NO, DO THE RECORD
62A8 86 16           LDA A   #22        SECURED MEMORY ERROR
62AA 97 06           STA A   ERROR
62AC 39              RTS
62AD 4C       STBIN  INC A              STORE BINARY ENTRY POINT
62AE 97 88    RCDATA STA A   W
62B0 BD 6168         JSR     SETUP
62B3 54              LSR B              RECORD INHIBITED?
62B4 25 03           BCS     RCDOK      NO, OKAY TO RECORD
62B6 86 15           LDA A   #21        RECORD INHIBITED
62B8 39              RTS
62B9 96 88    RCDOK  LDA A   W
62BB 81 01           CMP A   #1         STORE BINARY?
62BD 26 1E           BNE     NTSBN      NO, CONTINUE
62BF DE 1A           LDX     TP4        SAVE ENDING ADDR IN TP4
62C1 DF 20           STX     TP7
62C3 DE 54           LDX     SPGM       LOAD START OF SPECIAL PRGM
62C5 DF 1E           STX     TP6
62C7 BD 4840         JSR     SUB7       TP7-TP6=CFSZ
62CA DE 20           LDX     TP7
62CC DF 1C           STX     TP5
62CE DE 54           LDX     SPGM
62D0 DF 20           STX     TP7        STARTING ADDRESS IN TP7
62D2 86 03           LDA A   #3         BINARY FILE TYPE
62D4 D6 D5           LDA B   FLAG
62D6 C5 04           BIT B   #4         RECORD SPEC PRGM SECURED?
62D8 27 71           BEQ     FINRCD     NO, TYPE=3
62DA 4C              INC A              YES, TYPE=4
62DB 20 6E           BRA     FINRCD
62DD CE 0000  NTSBN  LDX     #0
62E0 DF 1C           STX     TP5
```

```
62E2 CE 0098          LDX     #YR     SET INDEX TO YR ADDRESS
62E5 BD 61CC          JSR     TOBIN   CONVERT ITS CONTENTS TO BINARY
62E8 96 88            LDA A   W
62EA 27 2A            BEQ     RDATA   W=0, RECORD DATA
62EC 7C 0020          INC     TP7     GET SYSTEM ADDRESS
62EF DE 20            LDX     TP7     PUT ADDR IN INDEX
62F1 BD 6489          JSR     CHADRS  STARTING ADDR OUT OF RANGE?
62F4 2A 38            BPL     ILLARG  YES, ILLEGAL ARGUMENT
62F6 A6 00    CONT    LDA A   X       NO, LOAD CONTENTS OF MEMORY
62F8 08               INX             INCR ADDRESS
62F9 7C 001D          INC     TP5S    INCR CURR FILE SIZE
62FC 26 03            BNE     CHKEND  CARRY INTO HIGH 8? NO, CHECK FOR "END
62FE 7C 001C          INC     TP5     INCR CURR FILE SIZE HIGH
6301 81 B1    CHKEND  CMP A   #$B1    "END"?
6303 27 05            BEQ     ENDFND  YES, END FOUND
6305 BD 6489          JSR     CHADRS  END OF MEMORY?
6308 2B EC            BMI     CONT    NO, CONTINUE IN LOOP
630A DF 1A    ENDFND  STX     TP4     SAVE ENDING ADDR IN TP4
630C 4F               CLR A
630D D6 88            LDA B   W
630F C1 03            CMP B   #3      FORMAT RECORD?
6311 26 38            BNE     FINRCD
6313 4C               INC A           SET TO SECURED PROGRAM TYPE
6314 20 35            BRA     FINRCD
6316 96 20    RDATA   LDA A   TP7
6318 27 03            BEQ     RNOK    REG. NO. >255?
631A 86 18    RNERR   LDA A   #24     ILLEGAL ADDRESS
631C 39               RTS
631D BD 646E  RNOK    JSR     ENDADR  FIND ENDING ADDRESS
6320 CE 00A0          LDX     #ZR     Z-REG ADDR INTO INDEX
6323 BD 61CC          JSR     TOBIN   CONVERT ITS CONTENTS TO BINARY
6326 D6 20            LDA B   TP7
6328 26 F0            BNE     RNERR   #REGS>255? YES, ERROR
632A 96 21            LDA A   TP7S    LOAD NO. OF REGS
632C 26 03            BNE     RGNTO   NO. OF REGS=0?
632E 86 06    ILLARG  LDA A   #6      YES,ILLEGAL ARGUMENT
6330 39               RTS
6331 48       RGNTO   ASL A           MULTIPLY NO. OF REGS BY 8
6332 59               ROL B
6333 49               ROL A
6334 59               ROL B
6335 49               ROL A
6336 59               ROL B
6337 97 27            STA A   CFSZ+1  STORE NEW CURRENT
6339 D7 26            STA B   CFSZ    FILE SIZE
633B 97 1D            STA A   TP5S
633D D7 1C            STA B   TP5
633F DE 1A            LDX     TP4     RELOAD ENDING ADDRESS
6341 BD 6470          JSR     STADR   FIND STARTING ADDRESS
6344 BD 6489          JSR     CHADRS  REGISTER EXIST?
6347 2B 01            BMI     RNERR   REG NOT EXIST, ERROR
6349 86 02            LDA A   #2      SET TO DATA TYPE
634B 97 8C    FINRCD  STA A   W+4     STORE NEW FILE TYPE
634D DE 20            LDX     TP7
634F DF 14            STX     TP1     STARTING ADDRESS INTO TP1
6351 BD 6551          JSR     FIND    FIND FILE
6354 BD 65AA          JSR     CHECK   CHECK IF RIGHT ONE
6357 DE 24            LDX     AFSZ
6359 26 03            BNE     NTMRKR  MARKER FILE?
635B 86 11            LDA A   #17     YES, WRONG FILE TYPE
635D 39               RTS
635E DE 1C    NTMRKR  LDX     TP5
6360 DF 26            STX     CFSZ    SET NEW CURR FILE SIZE
6362 96 8C            LDA A   W+4
6364 97 23            STA A   TYPE    SET NEW FILE TYPE
6366 96 24            LDA A   AFSZ
6368 D6 25            LDA B   AFSZ+1
636A D0 27            SUB B   CFSZ+1
636C 92 26            SBC A   CFSZ    ABS FILE SIZE-CURR FILE SIZE
636E 2A 03            BPL     FLRGE   FILE LARGE ENOUGH?
6370 86 0F            LDA A   #15     FILE TOO SMALL
6372 39               RTS
6373 BD 6668  FLRGE   JSR     PART    WRITE PARTIAL PREAMBLE
6376 BD 667F          JSR     RCDHD   RECORD THE HEADING
6379 7F 0022          CLR     CHKSM   CLEAR CHECKSUM
```

```
637C DE 14          LDX     TP1       STARTING ADDRESS INTO INDEX
637E A6 00   RCOMR  LDA A   X         LOAD INFO OUT OF CORE
6380 9B 22          ADD A   CHKSM     ADD IT TO THE CHECKSUM
6382 97 22          STA A   CHKSM     RESTORE CHECKSUM
6384 A6 00          LDA A   X         RELOAD BYTE
6386 BD 663B        JSR     RECORD    RECORD BYTE
6389 08             INX
638A 9C 1A          CPX     TP4       DONE RECORDING BODY?
638C 26 F0          BNE     RCOMR     NO, RECORD MORE
638E 96 22          LDA A   CHKSM     LOAD CHECKSUM INTO ACCA
6390 BD 663B        JSR     RECORD    RECORD CHECKSUM
6393 4F             CLR A
6394 39             RTS
                    *
                    *
                    * THIS ROUTINE LOADS A FILE FROM THE TAPE
                    * AND EITHER LOADS IT INTO MEMORY OR COMPARES
                    * IT WITH WHAT IS IN MEMORY.  THERE ARE FOUR
                    * INSTRUCTIONS HANDLED BY THIS ROUTINE:
                    *    1) LOAD
                    *    2) VERIFY
                    *    3) FORMAT LOAD
                    *    4) LOAD BINARY
                    * ALL FOUR INSTRUCTIONS PERFORM THEIR OPERATION
                    * ON THE FILE POINTED TO BY THE NUMBER IN THE X-REGISTER.
                    * THE LOAD AND THE VERIFY INSTRUCTIONS REQUIRE
                    * A STARTING ADDRESS OR STARTING REGISTER NUMBER
                    * WHICH IS FOUND IN THE Y-REGISTER.  THE
                    * FILE TYPE, WHICH IS DETERMINED WHILE THE TAPE IS RUNNING,
                    * TELLS THE ROUTINE WHETHER IT IS A LOAD DATA
                    * OR A LOAD PROGRAM (VERIFY DATA OR VERIFY PROGRAM).
                    * THE FORMAT LOAD LOADS THE CONTENTS OF THE FILE INTO
                    * MEMORY BEGINNING AT THE ADDRESS IMMEDIATELY
                    * FOLLOWING THE FORMAT LOAD INSTRUCTION
                    * AND, ONCE THE LOAD IS COMPLETE, EXECUTION OF THE NEW
                    * CODE IS BEGUN.  THE LOAD BINARY INSTRUCTION LOADS
                    * A FILE OFF THE TAPE AND STORES IT IN MEMORY AS A
                    * SPECIAL PROGRAM.
                    *
                    *
6395 4C      FLOAD  INC A             LOAD AND RUN ENTRY POINT
6396 4C      LDBIN  INC A             LOAD BINARY ENTRY POINT
6397 4C      LOAD   INC A             LOAD ENTRY POINT
6398 97 88   VERIFY STA A   W         VERIFY ENTRY POINT
639A BD 6168        JSR     SETUP
639D BD 6551        JSR     FIND      FIND FILE
63A0 BD 660E CHKHD  JSR     RDHD      BEGIN READING THE FILE
63A3 BD 658E        JSR     RIGHT     CHECK IF IT IS RIGHT FILE
63A6 27 05          BEQ     FILEOK    YES, CONTINUE
63A8 BD 6566        JSR     RETRY     NO, FIND RIGHT FILE
63AB 20 F3          BRA     CHKHD     CHECK HEADING AGAIN
63AD DE 26   FILEOK LDX     CFSZ
63AF 27 59          BEQ     TYPERR    WRONG FILE TYPE
63B1 CE 0098        LDX     #YR       SET INDEX TO Y-REG ADDRESS
63B4 D6 88          LDA B   W
63B6 96 23          LDA A   TYPE
63B8 81 01          CMP A   #1
63BA 2E 47          BGT     DTFL      DATA FILE?
63BC C1 02          CMP B   #2        LOAD BINARY?
63BE 27 4A          BEQ     TYPERR    YES, WRONG FILE TYPE
63C0 4D             TST A             PRGM FILE?
63C1 27 07          BEQ     NTSCRD    YES, NOT SECURED
63C3 5D             TST B             VERIFY?
63C4 27 04          BEQ     NTSCRD    YES, DON'T SET SCRD PRGM BIT
63C6 9A D5          ORA A   FLAG
63C8 97 D5          STA A   FLAG      SET SECRD PRGM BIT
63CA BD 61CC NTSCRD JSR     TOBIN     CONVERT ITS STARTING ADDR TO BINARY
63CD 7C 0020        INC     TP7       ADJUST ADDRESS TO SYS ADDR
63D0 DE 20          LDX     TP7
63D2 DF 1E          STX     TP6       STARTING ADDR INTO TP6
63D4 8D 0A          BSR     ENDADD
63D6 BD 6489        JSR     CHADRS    CHECK ADDRESS
63D9 2B 14          BMI     ADROK     ADDRESS OUT OF RANGE?
63DB 27 0F          BEQ     CHK0
63DD 86 07   MEMOVF LDA A   #7        MEMORY OVERFLOW ERROR
63DF 39             RTS
```

```
63E0 DE 26   ENDADD LDX     CFSZ
63E2 DF 20          STX     TP7        NO. OF BYTES INTO TP7
63E4 BD 484B        JSR     ADD7       STARTING ADDR + NO. OF BYTES
63E7 DE 20          LDX     TP7
63E9 DF 1A          STX     TP4        STORE ENDING ADDR INTO TP4
63EB 39             RTS
63EC 5D      CHK0   TST B              EQUAL TO EOPM?
63ED 26 EE          BNE     MEMOVF     NO. GREATER THAN: ERROR
63EF DE 1E   ADROK  LDX     TP6        STARTING INTO INDEX
63F1 D6 88          LDA B   W
63F3 27 4E          BEQ     STRTLD     IF VERIFY, START VERIFYING
63F5 BD 4DFF        JSR     $4DFF      CLEAR 1ST BYTE IF LOAD AT 2ND BYTE
63F8 08             INX
63F9 C1 03          CMP B   #3         LOAD & RUN?
63FB 26 46          BNE     STRTLD     NO, START LOAD
63FD 09             DEX
63FE DF CA          STX     UIP        YES, SET UIP TO PRGM'S BEGINNING
6400 08             INX                STARTING ADDR INTO INDEX AGAIN
6401 20 40          BRA     STRTLD
6403 81 02   DTFL   CMP A   #2         DATA FILE?
6405 26 06          BNE     NTDTFL     NO, BINARY FILE
6407 11             CBA                LOAD BINARY & DATA FILE?
6408 2E 29          BGT     DTFL1      NO, OKAY
640A 86 11   TYPERR LDA A   #17        YES, WRONG FILE TYPE
640C 39             RTS
640D 5D      NTDTFL TST B              VERIFY BINARY?
640E 27 19          BEQ     SPEC       YES, SET UP STARTING AND ENDING ADDRS
6410 C1 02          CMP B   #2         LOAD BINARY?
6412 26 F6          BNE     TYPERR     NO, WRONG FILE TYPE
6414 DE 28          LDX     SPADRS     LOAD STARTING ADDR OF SPGM
6416 8D 71          BSR     CHADRS     SPEC PRGM TOO BIG?
6418 2B C3          BMI     MEMOVF     YES, ERROR
641A DF 54          STX     SPGM       RESET SPGM TO NEW ADDRESS
641C 96 D5          LDA A   FLAG
641E 84 FB          AND A   #$FB       CLEAR SECURED BINARY BIT
6420 D6 23          LDA B   TYPE
6422 C1 04          CMP B   #4         SECURED BINARY?
6424 26 01          BNE     NOTSEC     NO, LOAD
6426 1B             ABA                YES, SET SEC BIN BIT AGAIN
6427 97 D5   NOTSEC STA A   FLAG       STORE NEW FLAG
6429 DE 54   SPEC   LDX     SPGM
642B DF 1E          STX     TP6        STARTING ADDR OF SPGM INTO TP6
642D 8D B1          BSR     ENDADD     FIND ENDING ADDRESS
642F DE 54          LDX     SPGM       LOAD STARTING ADDRESS
6431 20 10          BRA     STRTLD
6433 BD 61CC DTFL1  JSR     TOBIN      CONVERT STARTING REG NO TO BINARY
6436 96 20          LDA A   TP7
6438 27 03          BEQ     LT256      REG. NO.<256?
643A 86 18   RNOERR LDA A   #24        ILLEGAL ADDRESS
643C 39             RTS
643D 8D 2F   LT256  BSR     ENDADR     FIND ENDING ADDRESS
643F 8D 48          BSR     CHADRS     REGISTER EXIST?
6441 2B F7          BMI     RNOERR     REG NOT EXIST, ERROR
6443 7F 0022 STRTLD CLR     CHKSM      CLEAR CHECKSUM
6446 BD 65F9        JSR     SRCH1      FIND END OF SECOND PREAMBLE
6449 BD 65D1 RDBYTE JSR     READ       READ BYTE
644C D6 88          LDA B   W
644E 26 07          BNE     LDBYTE     VERIFY?
6450 A1 00          CMP A   X          YES, COMPARE IT WITH BYTE IN CORE
6452 27 05          BEQ     CMPOK      EQUAL, NO ERROR
6454 86 10          LDA A   #16        VERIFY FAILED
6456 39             RTS
6457 A7 00   LDBYTE STA A   X          LOAD: STORE BYTE INTO CORE
6459 9B 22   CMPOK  ADD A   CHKSM      ADD BYTE TO CHECKSUM
645B 97 22          STA A   CHKSM      RESTORE CHECKSUM
645D 08             INX                INCR ADDRESS
645E 9C 1A          CPX     TP4
6460 26 E7          BNE     RDBYTE     NOT FINISHED, READ ANOTHER BYTE
6462 BD 65D1        JSR     READ       READ CHECKSUM
6465 91 22          CMP A   CHKSM      CHECKSUMS EQUAL?
6467 27 03          BEQ     LDCMPL     YES, LOAD OR VERIFY COMPLETE
6469 86 0E          LDA A   #14        CHECKSUM ERROR
646B 39             RTS
646C 4F      LDCMPL CLR A
646D 39             RTS
```

```
646E 96 21   ENDADR LDA A  TP7S      LOAD REG NO.
6470 BD 4058        JSR    SADRS     FIND ITS SYSTEM ADDRESS
6473 08             INX
6474 08             INX
6475 08             INX
6476 08             INX
6477 08             INX
6478 08             INX
6479 08             INX
647A 08             INX
647B DF 1A          STX    TP4       ENDING ADDRESS INTO TP4
647D DF 20   STADR  STX    TP7       ENDING ADDRESS INTO TP7
647F DE 26          LDX    CFSZ
6481 DF 1E          STX    TP6       CURR FILE SIZE INTO TP6
6483 BD 4840        JSR    SUB7      ENDING ADDR-CFSZ=STARTING ADDR
6486 DE 20          LDX    TP7       SET INDEX TO STARTING ADDRESS
6488 39             RTS
6489 DF 14   CHADRS STX    TP1
648B D6 15          LDA B  TP1S
648D D0 0C          SUB B  EOPM+1
648F 96 14          LDA A  TP1
6491 92 08          SBC A  EOPM
6493 39             RTS
             *
             *
             * THIS ROUTINE IDENTIFIES THE FILE POINTED
             * TO BY THE NUMBER IN THE X-REGISTER.
             * WHEN THIS ROUTINE IS FINISHED, THE STACK WILL
             * CONTAIN:
             *   FILE TYPE IN T
             *   CURRENT FILE SIZE IN Z
             *   ABSOLUTE FILE SIZE IN Y
             *   FILE NUMBER IN X
             * THIS INFORMATION WILL ALSO BE PRINTED
             * OUT ON THE PRINTER IF THE PRINT SWITCH IS ON.
             *
             *
6494 BD 6168 IDENT  JSR    SETUP
6497 BD 6551        JSR    FIND      FIND FILE
649A BD 65AA        JSR    CHECK     CHECK IF IT IS RIGHT FILE
649D 96 D5          LDA A  FLAG
649F 84 9D          AND A  #$9D
64A1 97 D5          STA A  FLAG      RESET CASSETTE OP FLAG
64A3 CE 6518        LDX    #IDTBL    LOAD STARTING ADDR OF ID TABLE
64A6 DF 88          STX    W         SAVE IT IN W
64A8 8D 2D          BSR    MSSG
64AA 96 D5          LDA A  FLAG
64AC 2A 04          BPL    TKA       TRACK B?
64AE 86 2D          LDA A  #$2D
64B0 97 5F          STA A  BUFF+7    YES, PUT MINUS SIGN ON FILE NO.
64B2 BD 48BE TKA    JSR    BINBCD+2
64B5 8D 47          BSR    EOL0      NO, PRINT FILE NO.
64B7 8D 1E          BSR    MSSG
64B9 7F 0022        CLR    CHKSM     CLEAR CHECKSUM WORD
64BC DE 22          LDX    CHKSM     LOAD FILE TYPE
64BE 8D 28          BSR    PRINFO    PRINT FILE TYPE
64C0 8D 15          BSR    MSSG
64C2 DE 26          LDX    CFSZ      LOAD CURRENT FILE SIZE
64C4 8D 22          BSR    PRINFO    PRINT CURRENT FILE SIZE
64C6 8D 0F          BSR    MSSG
64C8 DE 24          LDX    AFSZ      LOAD ABSOLUTE FILE SIZE
64CA 8D 1C          BSR    PRINFO    PRINT ABSOLUTE FILE SIZE
64CC BD 5D75        JSR    BLANK
64CF 8D 38          BSR    IDPPNT
64D1 BD 57F1        JSR    ROLLU     PUT FILE NUMBER IN X
64D4 7E 61BE        JMP    TRNOFF
64D7 BD 5D75 MSSG   JSR    BLANK     BLANK OUT BUFFER
64DA CE 0058        LDX    #$58
64DD DF 16          STX    BFPTR     SET BUFF PTR TO BEG OF BUFFER
64DF DE 88          LDX    W         LOAD MESSAGE PTR
64E1 4F             CLR A
64E2 BD 578D        JSR    LDMSG     LOAD MESSAGE
64E5 DF 88          STX    W         STORE MESSAGE PTR
64E7 39             RTS
64E8 BD 48BC PRINFO JSR    BINBCD    CONVERT BINARY TO BCD
64EB BD 55F4        JSR    STKUP+$5    STACK UP
```

```
6 4EE BD 740A          JSR     XR0        ZERO OUT X-REGISTER
64F1 DE 20             LDX     T2
64F3 27 09             BEQ     EQL0
64F5 DF 92             STX     XR+2       LOAD 4 BCD DIGITS INTO X
64F7 86 03             LDA A   #3
64F9 97 90             STA A   XR         SET EXPNT TO 3
64FB BD 7406           JSR     NOR        NORMALIZE THE NUMBER
64FE 96 90     EQL0    LDA A   XR         LOAD NEW EXPNT
6500 4C                INC A
6501 48                ASL A
6502 48                ASL A
6503 CE 0060           LDX     #BUFF+8
6506 BD 4EA4           JSR     DGTS       LOAD DIGITS INTO BUFFER
6509 96 09     IDPRNT  LDA A   RSFLG
650B 2B 0A             BMI     *+12       PROGRAM RUNNING?
650D 48                ASL A
650E 2A 04             BPL     *+6        PRINT IF RSFLG=00?
6510 96 12             LDA A   SFLG
6512 27 03             BEQ     *+5        NO PRINT IF RSFLG=01 AND SFLG=0
6514 7E 602D           JMP     PRTDRV
6517 39                RTS
6518 26        IDTBL   FCB     $26        FILE:
6519 29                FCB     $29
651A 2C                FCB     $2C
651B 25                FCB     $25
651C B4                FCB     $B4        TYPE:
651D 39                FCB     $39
651E 30                FCB     $30
651F 25                FCB     $25
6520 B5                FCB     $B5        USED
6521 33                FCB     $33
6522 25                FCB     $25
6523 24                FCB     $24
6524 AD                FCB     $AD        MAX:
6525 21                FCB     $21
6526 38                FCB     $38
               *
               *
               * THIS ROUTINE CONVERTS THE FILE NUMBER TO
               * BINARY AND CHANGES THE CASSETTE TO THE
               * PROPER TRACK.
               *    1) POSITIVE FILE NO.=TRACK A
               *    2) NEGATIVE FILE NO.=TRACK B
               *
               *
6527 CE 0090   FILENO  LDX     #XR        SET INDEX TO X-REG ADDRESS
652A BD 61CC           JSR     TOBIN      CONVERT ITS CONTENTS TO BINARY
652D 96 20             LDA A   TP7
652F 27 03             BEQ     FNOK       FILE NO. > 255?
6531 7E 61D1           JMP     ERR6       YES, ILLEGAL ARGUMENT
6534 D6 D5     FNOK    LDA B   FLAG
6536 17                TBA
6537 98 91             EOR A   XR+1       SAME TRACK?
6539 2A 03             BPL     SAME       YES, DON'T SET TPOS=LOST
653B 4F                CLR A
653C 97 D6             STA A   TPOS       YES, TPOS=LOST
653E 96 91     SAME    LDA A   XR+1       FILE NO. POSITIVE?
6540 2A 06             BPL     TRACKA     YES, TRACK A
6542 86 12             LDA A   #$12       NO, TRACK B SELECT
6544 CA 80             ORA B   #$80       SET TRACK B
6546 20 04             BRA     TRACK
6548 86 16     TRACKA  LDA A   #$16       TRACK A SELECT COED
654A C4 7F             AND B   #$7F       SET TRACK A
654C D7 D5     TRACK   STA B   FLAG       RESTORE FLAG
654E 97 00             STA A   ADATA      CHANGE TRACKS
6550 39                RTS
               *
               *
               * THIS SUBROUTINE PERFORMS A FAST FILE
               * SEARCH TO THE FILE POINTED TO BY
               * THE NUMBER IN THE X-REGISTER.
               *
               *
6551 8D D4     FIND    BSR     FILENO
6553 9F 7C             STS     STACK
6555 96 D6             LDA A   TPOS
```

```
6557 84 03           AND A  #3
6559 26 0E           BNE    NTLOST   NO. BEGIN FILE SEARCH
655B 86 17           LDA A  #$17     REVERSE FAST READ DATA=0
655D BD 66CD         JSR    RETGP+4   FIND FIRST GAP IN REV DIR
6560 BD 660E         JSR    RDHD     READ ITS HEADING
6563 7C 002A         INC    KNWALL   SET KNOW ALL FLAG
6566 BD 66D3 RETRY   JSR    STOP
6569 96 07   NTLOST  LDA A  FILE
656B 91 21           CMP A  TP7S     FILE=XFILE?
656D 26 10           BNE    FNEX     NO. CHECK DIRECTION TO GO
656F BD 66D3         JSR    STOP
6572 96 2A           LDA A  KNWALL
6574 27 03           BEQ    FAST     IF KNOW ALL ABOUT HEADING. RETURN SLO
6576 BD 66C9         JSR    RETGP    RETURN TO GAP SLOW
6579 96 D6   FAST    LDA A  TPOS
657B 44              LSR A           TPOS=GAP?
657C 24 0F           BCC    DCFN-3   NO. FAST REWIND TO THE GAP
657E 39              RTS
657F 7F 002A FNEX    CLR    KNWALL   CLEAR KNOW ALL FLAG
6582 9F 7C           STS    STACK
6584 91 21           CMP A  TP7S
6586 23 11           BLS    FLTX     FILE < XFILE?
6588 96 D6           LDA A  TPOS     NO. CHECK TAPE POSITION
658A 44              LSR A           TPOS=GAP?
658B 25 03           BCS    DCFN     YES. DON'T CHANGE FILE NO.
658D 7C 00D7         INC    FILE     YES. INCR FILE NO.
6590 86 17   DCFN    LDA A  #$17     REVERSE FAST READ DATA=0
6592 8D 0E           BSR    COUNT
6594 7A 00D7         DEC    FILE     DECR FILE NO.
6597 20 D0           BRA    NTLOST
6599 86 57   FLTX    LDA A  #$57     FORWARD FAST READ DATA=0
659B 8D 05           BSR    COUNT
659D 7C 00D7         INC    FILE     INCR FILE NO.
65A0 20 C7           BRA    NTLOST
65A2 97 00   COUNT   STA A  ADATA    START TAPE
65A4 BD 669B         JSR    DSRCH    DATA SEARCH
65A7 7E 66B1         JMP    GSRCH    GAP SEARCH
65AA 7D 002A CHECK   TST    KNWALL   KNOW ALL FLAG SET?
65AD 26 0E           BNE    FIN      YES. FINISHED
65AF BD 660E         JSR    RDHD     NO. READ HEADING
65B2 BD 66C9         JSR    RETGP    RETURN TO THE GAP
65B5 8D 07           BSR    RIGHT    RIGHT FILE?
65B7 27 04           BEQ    FIN      YES. RETURN
65B9 8D C4           BSR    FNEX     NO. LOOK FOR RIGHT ONE
65BB 20 ED           BRA    CHECK    CHECK NEW FILE
65BD 39      FIN     RTS
65BE 96 D7   RIGHT   LDA A  FILE     LOAD FILE NO.
65C0 91 21           CMP A  TP7S     IS IT THE RIGHT ONE?
65C2 26 04           BNE    NTRFL    NO. DECR FILE CHECK CTR
65C4 5F              CLR B           SET EXIT FLAG
65C5 D7 7B           STA B  FNDCMD   CLEAR FIND CMMD FLAG
65C7 39      AGAIN   RTS
65C8 7A 002D NTRFL   DEC    FLCTR    DECR FILE CHECK CTR
65CB 26 FA           BNE    AGAIN    FAILED CHECK 5 TIMES?
65CD 86 12           LDA A  #18      FILE NOT FOUND
65CF 20 62           BRA    ERR
                     *
                     *
                     * READ SERVICE ROUTINES
                     *
                     *
65D1 96 01   READ    LDA A  ACTL     LOOK FOR END OF 9TH BIT
65D3 2A FC           BPL    *-2      FOUND ITS END?
65D5 96 00           LDA A  ADATA    YES. RESET TRANSITION BIT
65D7 C6 FD           LDA B  #-3      YES. SET READ OFFSET
65D9 86 01           LDA A  #1
65DB 97 2C           STA A  MASK     SET MASK=1
65DD 4F              CLR A
65DE 36      TRANS   PSH A           SAVE BYTE BEING READ
65DF CB 18           ADD B  #24      ADD THRESHOLD TO OFFSET (T=216 USEC)
65E1 5A      TRANS1  DEC B           DECR TIMING CTR
65E2 96 01           LDA A  ACTL     TRANSITION OCCURRED?
65E4 2A FB           BPL    TRANS1   NO. CONTINUE IN LOOP
65E6 32              PUL A           RELOAD BYTE BEING READ
65E7 5D              TST B
```

```
65E8 2C 02          BGE    READ0     CTR>=0. BIT=0
65EA 9B 2C          ADD A  MASK      CTR<0. BIT=1
65EC D6 00   READ0  LDA B  ADATA     RESET TRANSITION BIT
65EE C6 FB          LDA B  #-5       SET READ OFFSET
65F0 78 002C        ASL    MASK      SHIFT MASK TO NEXT BIT PSTN
65F3 24 E9          BCC    TRANS     CARRY CLEAR. BYTE NOT FINISHED
65F5 39             RTS
65F6 BD 669B PAST   JSR    DSRCH     GET PAST SWITCH-TO-WRITE GLITCH
65F9 D6 00   SRCH1  LDA B  ADATA     RESET TRANSITION BIT
65FB D6 01          LDA B  ACTL      TRANSITION?
65FD 2A FC          BPL    SRCH1+2
65FF C6 16   NTONE  LDA B  #22       SET RED THRESHOLD
6601 96 00          LDA A  ADATA     RESET TRANSITION BIT
6603 5A      NOTRN  DEC B            DECP TIMING CTR
6604 96 01          LDA A  ACTL      TRANSITION?
6606 2A FB          BPL    NOTRN     NO. CONTINUE WAITING
6608 5D             TST B            BIT=0?
6609 2A F4          BPL    NTONE     YES. CONT LOOKING FOR 1ST ONE
660B 96 00          LDA A  ADATA     RESET TRANSITION BIT
660D 39             RTS
660E 86 77   RDHD   LDA A  #$77      FORWARD SLOW READ DATA=0
6610 97 00          STA A  ADATA     START TAPE
6612 CE FFF9        LDX    #-7       SET INDEX TO HEADING TEMP OFFSET
6615 BD 669B        JSR    DSRCH     DATA SEARCH
6618 8D DC          BSR    PAST      FIND END OF 1ST PREAMBLE
661A 8D B5          BSR    READ      READ FILE NO.
661C 97 89          STA A  W+1       SAVE IT UNTIL HEADING IS READ CORRECT
661E 97 22          STA A  CHKSM     INITIALIZE CHECKSUM
6620 8D AF   RDRST  BSR    READ      READ NEXT BYTE OF HEADING
6622 A7 2A          STA A  $2A,X     STORE IT IN TEMPS
6624 9B 22          ADD A  CHKSM     ADD IT TO CHECKSUM
6626 97 22          STA A  CHKSM     RESTORE CHECKSUM
6628 08             INX
6629 26 F5          BNE    RDRST     NO. READ ANOTHER BYTE
662B 8D A4          BSR    READ      YES. READ CHECKSUM
662D 91 22          CMP A  CHKSM     CHECKSUMS EQUAL?
662F 27 05          BEQ    HDRED     YES. HEADING READ
6631 86 0E          LDA A  #14       CHECKSUM ERROR
6633 7E 619F ERR    JMP    ERRMSG
6636 96 89   HDRED  LDA A  W+1
6638 97 D7          STA A  FILE      STORE NEW FILE NO. IN FILE
663A 39             RTS
             *
             *
             * RECORD SERVICE ROUTINES.
             *
             *
663B C6 E2   RECORD LDA B  #-30
663D 5C             INC B
663E 26 FD          BNE    *-1       WAIT 180 USEC FOR 9TH BIT
6640 D6 00          LDA B  ADATA
6642 C8 80          EOR B  #$80
6644 D7 00          STA B  ADATA     WRITR 9TH BIT
6646 C6 FA          LDA B  #-6       SET WRITE OFFSET
6648 7F 002C NO9TH  CLR    MASK
664B 7C 002C        INC    MASK      SET MASK=1
664E CB 12   BYTE   ADD B  #18       ADD ZERO COUNT (0=108 USEC)
6650 95 2C          BIT A  MASK      IS BIT A ONE OR A ZERO?
6652 27 02          BEQ    BIT
6654 CB 24          ADD B  #36       ADD 0-1 DIFFERENCE (1=324 USEC)
6656 5A      BIT    DEC B            DECR TIMING CTR
6657 26 FD          BNE    BIT       TIMING CTR=0?
6659 D6 00          LDA B  ADATA
665B C8 80          EOR B  #$80
665D D7 00          STA B  ADATA     YES. CHANGE DATA OUT BIT
665F 02             NOP
6660 C6 FA          LDA B  #-6       SET WRITE OFFSET
6662 78 002C        ASL    MASK      SHIFT MASK LEFT ONE
6665 24 E7          BCC    BYTE      DONE WITH BYTE?
6667 39             RTS              YES. RETURN
6668 DE 54   PART   LDX    SPGM
666A DF 28          STX    SPADRS    SAVE SPGM STARTING ADDRESS
666C 86 77          LDA A  #$77      FORWARD SLOW READ DATA=0
666E 97 00          STA A  ADATA     START TAPE
6670 8D 29          BSR    DSRCH     DATA SEARCH
6672 86 67          LDA A  #$67      FORWARD SLOW WRITE DATA=0
```

```
6674 97 00          STA A  ADATA
6676 4F      PREMBL CLR A              SET ACCA TO ALL ZEROES
6677 8D C2          BSR    RECORD      WRITE 8 ZEROES
6679 86 80          LDA A  #$80        LOAD 7 ZEROES AND A ONE
667B C6 F5          LDA B  #-11        SET TIMING CTR
667D 20 C9          BRA    NO9TH       RECORD RESET OF PREAMBLE
667F 96 D7   RCDHD  LDA A  FILE        LOAD FILE NO.
6681 97 22          STA A  CHKSM       INITIALIZE CHECKSUM
6683 8D B6          BSR    RECORD      RECORD FILE NO.
6685 CE FFF9        LDX    #-7         SET INDEX TO HEADING TEMP OFFSET
6688 A6 2A   MRHD   LDA A  $2A,X       LOAD OTHER BYTES IN HEADING
668A 9B 22          ADD A  CHKSM       ADD IT TO CHECKSUM
668C 97 22          STA A  CHKSM       RESTORE CHECKSUM
668E A6 2A          LDA A  $2A,X       RELOAD HEADING BYTE
6690 8D A9          BSR    RECORD      RECORD NEXT BYTE OF HEADING
6692 08             INX                INCR HEADING TEMP PTR
6693 26 F3          BNE    MRHD        NO, DO NEXT BYTE
6695 96 22          LDA A  CHKSM       YES, LOAD CHECKSUM
6697 8D A2          BSR    RECORD      RECORD CHECKSUM
6699 20 DB          BRA    PREMBL      RECORD 2ND PREAMBLE
                    *
                    *
                    * SEARCH AND TAPE MOVEMENT ROUTINES.
                    *
                    *
669B 86 06   DSRCH  LDA A  #6          SET NO. OF TRANSITIONS CTR
669D D6 00   BTOCC  LDA B  ADATA       RESET TRANSITION BIT
669F 0E      NOBIT  CLI
66A0 02             NOP
66A1 0F             SEI
66A2 D7 00          STA B  ADATA       RESTART TAPE IF INTERRUPTED
66A4 7D 0001        TST    ACTL        TRANSITION?
66A7 2A F6          BPL    NOBIT       NO,CHECK AGAIN
66A9 4A             DEC A              YES, DECR NO. OF TRANS CTR
66AA 26 F1          BNE    BTOCC       NO, LOOK FOR ANOTHER
66AC 86 02          LDA A  #2
66AE 97 D6          STA A  TPOS        TPOS =DATA
66B0 39             RTS
66B1 CE 0190 GSRCH  LDX    #400        LOAD .35" @ 60 IPS
66B4 96 00          LDA A  ADATA
66B6 85 20          BIT A  #$20        SEARCH SPEED?
66B8 27 03          BEQ    CNTLP       YES, GO TO LOOP
66BA CE 1388        LDX    #5000       LOAD .75" @ 10 IPS
66BD D6 01   CNTLP  LDA B  ACTL        TRANSITION?
66BF 2B F0          BMI    GSRCH       YES, START ALL OVER
66C1 09             DEX                NO, DECR CTR
66C2 26 F9          BNE    CNTLP       FOUND GAP? NO, CONTINUE LOOPING
66C4 86 01   ISGAP  LDA A  #1
66C6 97 D6          STA A  TPOS        TPOS=GAP
66C8 39             RTS
66C9 8D 08   RETGP  BSR    STOP
66CB 86 37          LDA A  #$37        REVERSE SLOW READ DATA=0
66CD 97 00          STA A  ADATA       START TAPE
66CF 8D CA          BSR    DSRCH       DATA SEARCH
66D1 8D DE          BSR    GSRCH       GAP SEARCH
66D3 96 00   STOP   LDA A  ADATA
66D5 84 F0          AND A  #$F0        STOP
66D7 8A 10          ORA A  #$10        READ
66D9 97 00          STA A  ADATA       STOP TAPE
66DB CE 30D4        LDX    #12500      WAIT FOR TAPE TO STOP
66DE 09      WAIT   DEX
66DF 26 FD          BNE    WAIT        WAIT DONE?
66E1 39             RTS
66E2 5F      LOOK   CLR B              FIRST PASS
66E3 8D 2B   NTINVT BSR    VALID       LOOK FOR 2 1/2 FT OR HOLE
66E5 27 23          BEQ    FNDVTP      2 1/2 FT, FOUND VALID TAPE
66E7 96 78          LDA A  AT1         HOLE, CHECK DISTANCE
66E9 81 03          CMP A  #3          <=1"?
66EB 23 0A          BLS    BEG         YES, BEGINNING OF TAPE
66ED 81 2F          CMP A  #$2F        <=1 1/2 FT?
66EF 22 03          BHI    PASS2       NO, 2 FT
66F1 5D      FOOT   TST B              FIRST PASS?
66F2 26 08          BNE    END         NO, AT END OF TAPE
66F4 5C      PASS2  INC B              YES, INCR PASS WORD TO 2ND PASS
66F5 20 EC          BRA    NTINVT
66F7 86 57   BEG    LDA A  #$57        FORWARD FAST READ DATA=0
```

```
01023 66F9 5F              CLR B              FIRST PASS
01024 66FA 20 02           BRA     KWE        KNOW WHICH END
01025 66FC 86 17     END   LDA A   #$17       REVERSE FAST READ DATA=0
01026 66FE 91 2E     KWE   CMP A   SAVE       SAME DIRECTION?
01027 6700 27 E1           BEQ     NTINVT     YES, CONT LOOKING FOR 2 1/2 FT
01028 6702 97 2E           STA A   SAVE       NO, SWITCH DIRECTIONS AND CONT LOOKIN
01029 6704 8D CD           BSR     STOP
01030 6706 8D 08           BSR     VALID      BACK TAPE ACROSS HOLE
01031 6708 26 D9           BNE     NTINVT     HOLE HIT, CONTINUE IN NOOP
01032 670A 86 04     FNDVTP LDA A  #4
01033 670C 97 D6           STA A   TPOS       LOST BUT IN VALID TAPE
01034 670E 20 C3           BRA     STOP
01036 6710 8D 3B     VALID BSR     COT        CHECK IF CARTRIDGE IS OUT
01037 6712 96 02           LDA A   BDATA      RESET EOT & COT INTERRUPT BIT
01038 6714 CE 0000         LDX     #0
01039 6717 96 2E           LDA A   SAVE       LOAD TAPE STATUS
01040 6719 97 00           STA A   ADATA      START TAPE
01041 671B 08        NOHOLE INX               INCREMENT DISTANCE CTR
01042 671C DF 78           STX     AT1
01043 671E 8C 4E20         CPX     #20000     2 1/2 FT?
01044 6721 27 19           BEQ     VLDTP      YES, CHECK IF IN VALID TAPE
01045 6723 96 03           LDA A   BCTL       NO, HOLE BEEN HIT?
01046 6725 2A F4           BPL     NOHOLE     NO, CONTINUE IN LOOP
01047 6727 CE 00C8         LDX     #200
01048 672A 8D B2           BSR     WAIT       WAIT UNTIL PAST .023" HOLE
01049 672C 37        LIGHT PSH B              SAVE B ACCUM
01050 672D 86 13           LDA A   #19        END OF TAPE ERROR
01051 672F C6 15           LDA B   #$15
01052 6731 D7 00           STA B   ADATA
01053 6733 D6 04           LDA B   INPUT
01054 6735 C5 04           BIT B   #4         TAPE SPOOLED OFF?
01055 6737 27 1F           BEQ     OFF        YES, GIVE ERROR
01056 6739 33              PUL B              NO, RELOAD ACCB
01057 673A 96 03           LDA A   BCTL       HOLE HIT?
01058 673C 39        VLDTP RTS
01060 673D BD 6168 REWIND JSR      SETUP
01061 6740 97 2B           STA A   REWFLG     SET REWIND FLAG
01062 6742 9F 7C           STS     STACK
01063 6744 86 17           LDA A   #$17       REVERSE FAST READ DATA=0
01064 6746 0E              CLI
01065 6747 97 00           STA A   ADATA
01066 6749 20 FC           BRA     *-2
01067 674B 20 86     STOP1 BRA     STOP
01069 674D 86 15     COT   LDA A   #$15
01070 674F 97 00           STA A   ADATA      ENABLE COT CHECK
01071 6751 96 04           LDA A   INPUT
01072 6753 44              LSR A              CARTRIDGE OUT?
01073 6754 24 E6           BCC     VLDTP      NO, IT IS IN
01074 6756 86 14           LDA A   #20        CARTRIDGE OUT ERROR
01075 6758 7E 619F OFF     JMP     ERRMSG
01077                *
01078                *
01079                * THIS ROUTINE IS THE COT AND EOT INTERRUPT
01080                * ROUTINE.  IT HANDLES THE SITUATIONS WHERE THE
01081                * CARTRIDGE IS REMOVED IN THE MIDDLE OF
01082                * A CASSETTE ROUTINE AND WHERE THE TAPE HITS EITHER
01083                * THE LOAD POINT OR EARLY WARNING HOLES
01084                * ON THE TAPE.
01085                *
01086                *
01087 675B 4F        HOLE  CLR A              SO SEI-SEI WORKS!!!
01088 675C 0F              SEI
01089 675D 96 00           LDA A   ADATA
01090 675F 8A 37           ORA A   #$37       READ SLOW
01091 6761 16              TAB
01092 6762 97 00           STA A   ADATA      START TAPE
01093 6764 CE 61A8         LDX     #25000
01094 6767 BD 66DE         JSR     WAIT       WAIT 2"
01095 676A 8D C0           BSR     LIGHT      TAPE SPOOLED OFF?
01096 676C C4 DF           AND B   #$DF       FAST
01097 676E C8 40           EOR B   #$40       OPPOSITE DIRECTION
01098 6770 D7 2E           STA B   SAVE       SAVE TAPE STATUS
01099 6772 8D D7           BSR     STOP1      STOP TAPE
01100 6774 86 3C           LDA A   #$3C
01101 6776 97 03           STA A   BCTL       DISABLE EOT & COT INTERRUPT
01102 6778 8D 96           BSR     VALID      BACK TAPE ACROSS HOLE
```

```
677A 26 0C          BNE    HIT      HIT HOLE?
677C 8D CD          BSR    STOP1
677E 4F             CLR A           NO, FALSE HOLE
677F 97 D6          STA A  TPOS     TPOS=LOST
6781 9E 8D   OVER   LDS    SAVSTK   RESET STACK PTR
6783 DE 8A          LDX    SVINS    LOAD STARTING ADDR OF INSTR
6785 4F             CLR A
6786 6E 00          JMP    X        DO INSTR OVER AGAIN
6788 9E 7C   HIT    LDS    STACK
678A 96 2E          LDA A  SAVE     RELOAD TAPE STATUS
678C 48             ASL A           FORWARD DIRECTION?
678D 2A 3C          BPL    EOT      NO, END OF TAPE
678F 96 D6          LDA A  TPOS
6791 26 05          BNE    KNOWN    POSITION KNOWN?
6793 BD 66E2        JSR    LOOK     WHICH HOLE?
6796 20 E9          BRA    OVER     DO REWIND AGAIN
6798 8D B1   KNOWN  BSR    STOP1
679A 4F             CLR A
679B 97 D7          STA A  FILE     FILE=0
679D 4C             INC A
679E 97 D6          STA A  TPOS     TPOS=GAP
67A0 96 02          LDA A  BDATA    RESET EOT & COT INTERRUPT BIT
67A2 86 3D          LDA A  #$3D
67A4 97 03          STA A  BCTL     ENABLE EOT & COT INTERRUPT
67A6 96 7A          LDA A  MRKBOT
67A8 26 1E          BNE    MARK1    MARK BEG OF TAPE?
67AA 86 77          LDA A  #$77     FORWARD SLOW READ DATA=0
67AC 97 00          STA A  ADATA
67AE BD 66DB        JSR    WAIT-3   MOVE TAPE 1"
67B1 8D 98          BSR    STOP1
67B3 96 2B          LDA A  REWFLG   CHECK REWIND FLAG
67B5 26 0E          BNE    ISRWND   REWIND, YOU ARE DONE
67B7 7E 6569        JMP    NTLOST   NOT REWIND, CONTINUE WITH INSTRUCTION
67BA 96 D7   ERASE  LDA A  FILE
67BC 97 21          STA A  TP7S
67BE 86 3D          LDA A  #$3D
67C0 97 03          STA A  BCTL
67C2 BD 6555        JSR    FIND+4   MOVE TAPE TO GAP OF MARKER FILE
67C5 7E 618E ISRWND JMP    TRNOFF
67C8 7E 6251 MARK1  JMP    FILE0
67CB BD 66E2 EOT    JSR    LOOK     DETERMINE IF REALLY EW HOLE
67CE 96 2E          LDA A  SAVE
67D0 48             ASL A           FORWARD DIRECTION?
67D1 2B AE          BMI    OVER     YES, BEG. OF TAPE; DO INSTR OVER
67D3 86 12          LDA A  #18      FILE NOT FOUND
67D5 D6 7B          LDA B  FNDCMD
67D7 26 05          BNE    FNDERR   FIND?
67D9 D6 7A          LDA B  MRKBOT   ERASE TO END OF TPAE?
67DB 2B DD          BMI    ERASE
67DD 4C             INC A           NO, END OF TAPE
67DE 7E 619F FNDERR JMP    ERRMSG
7FFA                ORG    $7FFA
7FFA 675B           FDB    HOLE
7FFC 675B           FDB    HOLE
7D4A                ORG    $7D4A
7D4A 6398           FDB    VERIFY
7D4C 6395           FDB    FLOAD
7D4E 62AE           FDB    RCDATA
7D50 673D           FDB    REWIND
7D6A                ORG    $7D6A
7D6A 62A2           FDB    PCPRGM
7D6C 62A1           FDB    FRCRD
7D6E 61DC           FDB    MARK
7D70 6494           FDB    IDENT
7D72 6397           FDB    LOAD
                    END
```

SYMBOL TABLE

| | | | | | | | | | | | | | |
|---|---|---|---|---|---|---|---|---|---|---|---|---|---|
| ADATA | 0000 | ACTL | 0001 | BDATA | 0002 | BCTL | 0003 | INPUT | 0004 | IOIN | 0005 | | |
| ERROR | 0006 | TGL | 0007 | UFLG | 0008 | RSFLG | 0009 | EOM | 000A | EOPM | 000B | | |
| STKFLG | 000D | RND | 000E | DIGFLG | 000F | W2 | 0010 | W1 | 0011 | SFLG | 0012 | | |
| DCNTR | 0013 | TP1 | 0014 | TP1S | 0015 | TP2 | 0016 | TP2S | 0017 | TP3 | 0018 | | |
| TP3S | 0019 | TP4 | 001A | TP4S | 001B | TP5 | 001C | TP5S | 001D | TP6 | 001E | | |

```
TP6S   001F  TP7    0020  TP7S   0021  T13    0022  T12    0023  T11    0024
T10    0025  T9     0026  T8     0027  T7     0028  T6     0029  T5     002A
T4     002B  T3     002C  T2     002D  T1     002E  ISTK   002F  ISTACK 0051
TA     0052  SPGM   0054  EXTRA  0056  BUFF   0058  REAL   0068  IMAG   0070
AT1    0078  AT2    0080  W      0088  XR     0090  YR     0098  ZR     00A0
TR     00A8  LSTX   00B0  BKWRT  00B8  BKKC   00BA  SOL7   00C6  UPP    00C8
UIP    00CA  SAVE   002E  FLCTR  002D  MASK   002C  REWFLG 002B  KNWALL 002A
MRKBOT 007A  ENDCMD 007B  STACK  007C  SVINS  008A  SAVSTK 008D  SPADRS 0028
CFSZ   0026  AFSZ   0024  TYPE   0023  CHKSM  0022  BFPTR  0016  FLAG   00D5
TPOS   00D6  FILE   00D7  SADRS  4D5B  TSFR   49CE  ADD7   484B  SUB7   4840
FRMT   5CA8  BLANK  5D75  LDMSG  57BD  BINBCD 48BC  STKUP  55EF  XR0    740A
NOR    7406  DGTS   4EA4  PRTDRV 602D  ROLLU  57F1  SETUP  6168  CRTIN  6176
ERRMSG 619F  STERR  6189  TRNOFF 61BE  TOBIN  61CC  ERR6   61D1  NOOK   61D5
MARK   61DC  MRKOK  61E4  FIND1  6213  BEGIN  6219  ADDSLK 6233  NOMORE 623B
NOSLK  623F  START  624C  FILE0  6251  NXTFL  6255  MRKPRE 6269  MRKMR  6274
FIN1   6280  FIN2   6296  FRCRD  62A1  RCPRGM 62A2  STBIN  62A0  RCDATA 62AE
RCDOK  62B9  NTSBN  62DD  CONT   62F6  CHKEND 6301  ENDFND 630A  RDATA  6316
RNERR  631A  RNOK   631D  ILLARG 632E  RGNT0  6331  FINRCD 634B  NTMRKR 635E
FLRGE  6373  RCDMR  637E  FLOAD  6395  LDBIN  6396  LOAD   6397  VERIFY 6398
CHKHD  63A0  FILEOK 63AD  NTSCRD 63CA  MEMOVF 63D0  ENDADD 63E0  CHK0   63EC
ADROK  63EF  DTFL   6403  TYPERR 640A  NTDTFL 640D  NOTSEC 6427  SPEC   6429
DTFL1  6433  RNOERR 643A  LT256  643D  STRTLD 6443  RDBYTE 6449  LDBYTE 6457
CMPOK  6459  LDCMPL 646C  ENDADR 646E  STADR  647D  CHADRS 6489  IDENT  6494
TKA    64B2  MSSG   64D7  PRINFO 64E8  EQL0   64FE  IDPRNT 6509  IDTBL  6518
FILENO 6527  FNOK   6534  SAME   653E  TRACKA 6548  TRACK  654C  FIND   6551
RETRY  6556  NTLOST 6569  FAST   6579  FNEX   657F  DCFN   6590  FLTX   6599
COUNT  65A2  CHECK  65AA  FIN    65BD  RIGHT  65BE  AGAIN  65C7  NTRFL  65C8
READ   65D1  TRANS  65DE  TRANS1 65E1  READ0  65EC  PAST   65F6  SRCH1  65F9
NTONE  65FF  NOTRN  6603  RDHD   660E  RDRST  6620  ERR    6633  HDRED  6636
RECORD 663B  NO9TH  6648  BYTE   664E  BIT    6655  PART   6668  PREMBL 6676
RCDHD  667F  MRHD   668B  DSRCH  669B  BTOCC  6690  NOBIT  669F  GSRCH  66B1
CNTLP  66BD  ISGAP  66C4  RETGP  66C9  STOP   66D3  WAIT   66DE  LOOK   66E2
NTINVT 66E3  FOOT   66F1  PASS2  66F4  BEG    66F7  END    66FC  KWE    66FE
FNDVTP 670A  VALID  6710  NOHOLE 671B  LIGHT  672C  VLDTP  673C  REWIND 673D
STOP1  6749  COT    674D  OFF    6758  HOLE   675B  OVER   6781  HIT    678B
KNOWN  6798  ERASE  67BA  ISPWND 67C5  MARK1  67C8  EOT    67CB  FNDERR 67DE
****ERROR 201
 216    NAM  EXIO
****ERROR 201
 392    NAM  SIGMA
****ERROR 201
 582   NAM LINK

                       NAM     CJBPG
                 *
                 *THIS FILE DEFINES THE BASE PAGE READ/WRITE
                 *ALLOCATION FOR CJ. ADDRESSES ARE HEX 0 THRU FF INCLUSIVE.
                 *
0000 0001        ADATA   RMB     1          PERIPHERAL ACCESS REGISTER
0001 0001        ACTL    RMB     1          PERIPHERAL CONTROL REGISTER
0002 0001        BDATA   RMB     1          PERIPHERAL ACCESS REGISTER
0003 0001        BCTL    RMB     1          PERIPHERAL CONTROL REGISTER
0004 0001        INPUT   RMB     1          MAINFRAME INPUT PORT
0005 0001        IOIN    RMB     1          I/O ROM INPUT PORT
                 *
                 *FOLLOWING IS THE STATUS AREA. IT IS PERMANENT
                 *READ/WRITE USED TO RETAIN THE STATUS OF THE MACHINE
                 *
0006 0001        ERROR   RMB     1          ERROR WORD (NON-ZERO IMPLIES ERROR)
0007 0001        TGL     RMB     1          TOGGLE SWITCHES ARE RETAINED HERE
0008 0001        UFLG    RMB     1          USER FLAGS ARE KEPT HERE
0009 0001        RSFLG   RMB     1          USER PRGM RUN/STOP FLAG
000A 0001        EOM     RMB     1          END OF USER R/W WORD (PAGE ADRS ONLY)
000B 0002        EOPM    RMB     2          END OF PROGRAM MEMORY (16 BIT PNTR)
000D 0001        STKFLG  RMB     1          AUTO-STACK FLAG (NEG IMPLIES LIFT ENA
000E 0001        RND     RMB     1          DISPLAY ROUND SETTING
000F 0001        DIGFLG  RMB     1          DIGIT ENTRY FLAG
0010 0001        W2      RMB     1          BCD ACC. FOR COMPILER
0011 0001        W1      RMB     1          BCD ACC. FOR COMPILER
0012 0001        SFLG    RMB     1          STEP FLAG FOR SINGLE STEP MODE
0013 0001        DCNTR   RMB     1          DIGIT COUNTER FOR COMPILER
                 *
                 *FOLLOWING IS THE 2-BYTE TEMPORARY AREA
                 *USED FOR TEMPORARY STORAGE OF POINTERS, ETC.
                 *
0014 0001        TP1     RMB     1
0015 0001        TP1S    RMB     1
```

```
0016 0001      TP2      RMB     1
0017 0001      TP2S     RMB     1
0018 0001      TP3      RMB     1
0019 0001      TP3S     RMB     1
001A 0001      TP4      RMB     1
001B 0001      TP4S     RMB     1
001C 0001      TP5      RMB     1
001D 0001      TP5S     RMB     1
001E 0001      TP6      RMB     1
001F 0001      TP6S     RMB     1
0020 0001      TP7      RMB     1
0021 0001      TP7S     RMB     1
               *
               *FOLLOWING IS THE 1-BYTE TEMPORARY AREA
               *USED FOR TEMPORARY STORAGE OF FLAGS, ETC.
               *
0022 0001      T13      RMB     1
0023 0001      T12      RMB     1
0024 0001      T11      RMB     1
0025 0001      T10      RMB     1
0026 0001      T9       RMB     1
0027 0001      T8       RMB     1
0028 0001      T7       RMB     1
0029 0001      T6       RMB     1
002A 0001      T5       RMB     1
002B 0001      T4       RMB     1
002C 0001      T3       RMB     1
002D 0001      T2       RMB     1
002E 0001      T1       RMB     1
               *
               *FOLLOWING IS THE INTERNAL SYSTEM STACK. THE STACK
               *ALLOWS FOR 7 USER SUBROUTINES, 7 SYSTEM
               *SUBROUTINES, AND ONE INTERRUPT.
               *
002F 0022      ISTK     RMB     34
0051 0001      ISTACK   RMB     1         (STARTS HERE; BUILDS DOWN)
               *
               *FOLLOWING ARE 3 PERMANENT POINTERS
               *
0052 0002      TA       RMB     2         INSERT START PNTR/FLAG
0054 0002      SPGM     RMB     2         SPECIAL PRGM POINTER
0056 0002      EXTRA    RMB     2         EXTRA POINTER FOR FUTURE ROMS
               *
               *FOLLOWING IS THE PRINTER/DISPLAY BUFFER.
               *(ALSO USED AS DIGIT STACK BY CORDIC)
               *
0058 0010      BUFF     RMB     16
               *
               *FOLLOWING ARE 4 ARITHMETIC TEMPORARYS
               *(ALSO USED BY PRINTER DRIVER FOR DOTS)
               *
0068 0008      REAL     RMB     8
0070 0008      IMAG     RMB     8
0078 0008      AT1      RMB     8
0080 0008      AT2      RMB     8
               *
               *FOLLOWING IS THE WORKING REGISTER FOR THE
               *FLOATING POINT MATH SUBROUTINES
               *
0088 0008      W        RMB     8
               *
               *FOLLOWING ARE THE USER STACK REGISTERS
               *
0090 0008      XR       RMB     8
0098 0008      YR       RMB     8
00A0 0008      ZR       RMB     8
00A8 0008      TR       RMB     8
               *
               *FOLLOWING IS THE LAST X REGISTER
               *
00B0 0008      LSTX     RMB     8
               *
               *FOLLOWING IS THE BUFFERED KEYBOARD KEYCODE
               *STORAGE AREA. IT WILL BUFFER 12 KEYS
               *LOCATION BKWRT MUST ALWAYS BE ZERO. IF BKWRT+1 IS
               *NON-ZERO, THE NEXT KEYCODE WILL ALWAYS
```

```
                    *BE IN LOCATION BKKC
                    *
0088 0002           BKWRT   RMB     2         BUFFERED KEYBOARD WRITE POINTER
008A 000C           BKKC    RMB     12        NEXT AVAILABLE KEYCODE
                    *
                    *FOLLOWING ARE SOME MORE PERMANENT STORAGE
                    *LOCATIONS AND POINTERS.
                    *
00C6 0002           SOL7    RMB     2         SINGLE OPERATION LOCATION
00C8 0002           UPP     RMB     2         USER PROGRAM POINTER
00CA 0002           UIP     RMB     2         USER INSTRUCTION POINTER
00CC 0001           ALPHA   RMB     1         MEMORY ALPHA FLAG
00CD 0003           IO1     RMB     3         I/O CHANNEL 1 POINTER/FLAG
00D0 0003           IO2     RMB     3         I/O CHANNEL 2 POINTER/FLAG
00D3 0002           IT7     RMB     2         SYNTAX TABLE POINTER
00D5 0001           FLAG    RMB     1         CASSETTE OPERATION FLAG
00D6 0001           TPOS    RMB     1         CASSETTE TAPE POSITION INDICATOR
00D7 0001           FILE    RMB     1         CASSETTE FILE INDICATOR
                    *
                    *FOLLOWING ARE 5 (A-E) OF THE 10 (A-J) USER
                    *ALPHA REGISTERS. THE OTHER 5 (F-J) ARE TAKEN
                    *OUT OF USER R/W ON POWER ON.
                    *
00D8 0008           AR      RMB     8
00E0 0008           BR      RMB     8
00E8 0008           CR      RMB     8
00F0 0008           DR      RMB     8
00F8 0008           ER      RMB     8
                    *
                    *THIS CONCLUDES BASE PAGE READ/WRITE
                    *USER PROGRAM MEMORY FOLLOWS IMMEDIATELY HEREAFTER
                    *
                    *FOLLOWING ARE SOME EQUATES DEFINING STARTING
                    *ADDRESSES OF COMMONLY USED SYSTEM SUBROUTINES
                    *
     00BA           SDBB    EQU     @272
     7E00           MT      EQU     @77000
     003D           TERMN7  EQU     @75
     0040           IMED    EQU     @100
     00C0           PARCD   EQU     @300
     0080           PAREX   EQU     @200
     0000           NTBL    EQU     @0
     5EC0           DOTS    EQU     $5EC0
     602D           PRTDRV  EQU     $602D
     5CA8           FRMT    EQU     $5CA8
     5D75           BLANK   EQU     $5D75
     578D           LDMSG   EQU     $578D
     5582           ROLLD   EQU     $5582
     57F1           ROLLU   EQU     $57F1
     55DA           PSD     EQU     $55DA
     55E9           TXL     EQU     $55E9
     55EF           STKUP   EQU     $55EF
     749B           MAD     EQU     $749B
     74AA           CMP     EQU     $74AA
     74D6           NOR     EQU     $74D6
     7424           TXW     EQU     $7424
     743B           TXXR    EQU     $743B
     7452           EXXR    EQU     $7452
     753B           ARSR    EQU     $753B
     75B6           OVUNF   EQU     $75B6
     75DD           OVERF   EQU     $75DD
     740A           XR0     EQU     $740A
     75C8           XRNINE  EQU     $75C8
     75F1           UNDRF   EQU     $75F1
     76B9           IMULT   EQU     $76B9
     7669           ODG     EQU     $7669
     75FC           FPA     EQU     $75FC
     75F6           FPS     EQU     $75F6
     7735           FPM     EQU     $7735
     7793           FPD     EQU     $7793
     763D           FPAEX   EQU     $763D
     7780           FPMEX   EQU     $7780
     7521           LSHIFT  EQU     $7521
     7489           ZEROX   EQU     $7489
     7416           XZEROO  EQU     $7416
```

```
          7417      XZERO2 EQU     $7417
          73E6      RECIP  EQU     $73E6
          73F3      TXRX   EQU     $73F3
          6800      CONST  EQU     $6800
          6898      FPDBRC EQU     $6898
          68A9      TAN    EQU     $68A9
          69C3      ATN    EQU     $69C3
          6A46      DSZERO EQU     $6A46
          6A58      NTLN   EQU     $6A58
          6AC9      EXPN   EQU     $6AC9
          6B94      SIN    EQU     $6B94
          6B9A      COS    EQU     $6B9A
          6BF2      ASIN   EQU     $6BF2
          6BF7      ACOS   EQU     $6BF7
          6C50      PH1    EQU     $6C50
          6C8D      PH2    EQU     $6C8D
          6D34      PH3    EQU     $6D34
          6DD0      PH4    EQU     $6DD0
          6E47      LSFT8  EQU     $6E47
          6E65      SQRT   EQU     $6E65
          6F2C      MAD8   EQU     $6F2C
          53F4      CMP8   EQU     $53E4
          6F52      IOUPX  EQU     $6F52
          6FA7      LOG10  EQU     $6FA7
          6FE9      YUPX   EQU     $6FE9
          7328      RTOP   EQU     $7328
          7386      PTOR   EQU     $7386
                           OPT     LIST,MEM
                           NAM     EXIO
 5300                      ORG     $5300
                    *
                    *      ROMID
                    *
                    *      I/O CODE IS PASSES IN ACCA.  ROUTINE RETURNS
                    *      ROM ADDRESS IN IX(ALSO IN T11) OR ERROR
                    *      CODE IN ACCB (5=NO I/O DEVICE).
                    *
 5300 CE 1000       ROMID  LDX     #$1000     FIRST ROM ADDRESS
 5303 DF 24                STX     T11        SET IT
 5305 A1 00         RM1    CMP A   0,X        CHECK PRIMARY CODE
 5307 27 20                BEQ     RM3        FOUND A MATCH
 5309 C6 08                LDA B   #8
 530B DB 24                ADD B   T11        BUMP ADDRESS TO NEXT ROM
 530D D7 24                STA B   T11
 530F DE 24                LDX     T11        LOAD NEXT ROM ADDRESS
 5311 8C 4800              CPX     #$4800     LAST ONE CHECKED?
 5314 26 EF                BNE     RM1        NOT YET
 5316 D6 24         RM2    LDA B   T11
 5318 C0 08                SUB B   #8         BACK UP TO PREVIOUS ROM
 531A D7 24                STA B   T11
 531C DE 24                LDX     T11        LOAD ROM POINTER
 531E A1 01                CMP A   1,X        CHECK SECONDARY CODE
 5320 27 07                BEQ     RM3        FOUND A MATCH
 5322 8C 1000              CPX     #$1000     BACK TO ROM ONE?
 5325 26 EF                BNE     RM2        NOT YET
 5327 C6 05                LDA B   #5         LOAD ERROR CODE
 5329 39            RM3    RTS                RETURN
                    *
                    *      IOFMT
                    *
                    *      MAINFRAME I/O CONTROL
                    *
 532A DE CA         IOFMT  LDX     UIP        LOAD INSTR POINTER
 532C E6 01                LDA B   1,X        SECOND BYTE OF INSTR
 532E C4 70                AND B   #$70       MASK CALL CODE NUMBER
 5330 17                   TBA
 5331 27 1E                BEQ     RNPRT      RUNNING PRINT
 5333 8D CB                BSR     ROMID      LOCATE ROM ADDRESS
 5335 26 46                BNE     SPS1       ROM NOT FOUND
 5337 DE CA         IOF1   LDX     UIP        INSTR POINTER
 5339 E6 01                LDA B   1,X        SECOND BYTE
 533B C4 0F                AND B   #$F        MASK LETTER CODE
 533D 58                   ASL B              TIMES TWO
 533E D7 25                STA B   T10        SET LOWER HALF OF POINTER
 5340 DE 24                LDX     T11        LOAD POINTER
```

```
5342 EE 05            LDX    5,X        LOAD ADDRESS OF ROUTINE
5344 4F               CLR A
5345 AD 00            JSR    0,X        MAKE I/O ROM CALL
5347 DE CA    IOF1A   LDX    UIP
5349 96 06            LDA A  ERROR      LOAD ERROR WORD
534B 26 01            BNE    IOF2       WAS AN ERROR
534D 08               INX               NO ERROR, BUMP INSTR POINTER
534E DF CA    IOF2    STX    UIP        SET INSTR POINTER
5350 39               RTS               RETURN
5351 7E 521B  RNPRT   JMP    $521B      CALL PRINT
     62AD     STBIN   EQU    $62AD
     6396     LDBIN   EQU    $6396
              *
              *     SPST - SPSTS
              *
              *     SPECIAL PROGRAM STORE TO TAPE CARTRIGE.
              *     SPSTS STORES IT AS A SECURED PROGARM
              *     USER PARAMETERS:
              *       XR - FILE #
              *
5354 86 04    SPSTS   LDA A  #4         SECURE BIT
5356 9A D5    SPST    ORA A  FLAG
5358 8D 26            BSR    LIMIT      FIND LOWER LIMIT
535A 9C 54            CPX    SPGM       NULL PROGRAM?
535C 27 1C            BEQ    SPS0A      YES
535E D6 D5            LDA B  FLAG
5360 C5 04            BIT B  #4         SECURED SPGM?
5362 26 17            BNE    SPS1-2     YES
5364 97 D5            STA A  FLAG       SET NEW FLAG
5366 09       SPS0    DEX
5367 A6 00            LDA A  0,X        FIND END OF SPGM
5369 27 FB            BEQ    SPS0
536B 08               INX
536C DF 1A            STX    TP4        SET END+1 FOR CASSETTE
536E 4F               CLR A
536F CE 62AD          LDX    #STBIN
5372 AD 00            JSR    0,X        CALL ATAPE
5374 96 D5            LDA A  FLAG
5376 84 FB            AND A  #$FB       CLEAR SECURE BIT
5378 97 D5            STA A  FLAG
537A 39       SPS0A   RTS
537B C6 16            LDA B  #22        SECURE MEMORY
537D D7 06    SPS1    STA B  ERROR      SET ERROR
537F 39               RTS
              *
              *     FINDS THE UPPER LIMIT OF MEMORY AND RETURNS
              *     THE VALUE IN IX.
              *
5380 DE 56    LIMIT   LDX    EXTRA      SPECIAL ROM THERE?
5382 26 0A            BNE    LIM1       YES
5384 DE CD            LDX    IO1        LOAD SLOT A
5386 D6 CE            LDA B  IO1+1      LOAD TEST PART
5388 D1 D1            CMP B  IO2+1      IO1<=IO2?
538A 23 02            BLS    LIM1       YES, KEEP IO1
538C DE D0            LDX    IO2        NO, LOAD IO2
538E 39       LIM1    RTS
              *
              *     ERASES PREVIOUS SPGM AND DATA REGISTERS.
              *
538F 8D EF    KILL    BSR    LIMIT      MEMORY LIMIT
5391 DF 54            STX    SPGM
5393 9C 0B    KIL1    CPX    EOPM       COLLAPSED ALL?
5395 27 F7            BEQ    LIM1       YES
5397 09               DEX
5398 6F 00            CLR    0,X
539A 20 F7            BRA    KIL1
              *
              *     SPLD
              *
              *     LOADS A SPECIAL PROGRAM FROM CARTRIDGE.
              *     USER PARAMETERS:
              *       XR - FILE #
              *
539C 8D F1    SPLD    BSR    KILL'      ERASE MEMORY
539E CE 6396          LDX    #LDBIN
```

```
5341 AD 00          JSR    0,X       CALL TAPE
53A3 96 06          LDA A  ERROR     CASSETT ERROR?
53A5 27 02          BEQ    SPL1      NO
53A7 8D E6          BSR    KILL
53A9 DE 54   SPL1   LDX    SPGM
53AB DF 08          STX    EOPM      SET #REGS TO ZERO
53AD 39             RTS
             *
             *   SPCAL
             *
             *   CALLS A SPECIAL PROGRAM
             *
53AE 8D 00   SPCAL  BSR    LIMIT     FIND LOWER LIMIT
53B0 C6 18          LDA B  #24
53B2 9C 54          CPX    SPGM      NULL PROGRAM?
53B4 27 C7          BEQ    SPS1      YES
53B6 DE 54          LDX    SPGM      LOAD STARTING ADDRESS
53B8 6E 00          JMP    0,X       MAKE CALL
             *
             *   SPTAP
             *
             *   LOADS A SPGM THROUGH GIO ROM FROM PAPER TAPE.
             *   TAPE FORMAT:  ADDRESS,SIZE,DATA,CHECKSUM,SIZE,DATA.....
             *
53BA 8D D3   SPTAP  BSR    KILL      ERASE DATA REGS
53BC C6 20          LDA B  #$20
53BE F0 3000        SUB B  $3000     GIO ROM PRESENT?
53C1 26 07          BNE    SPT1      NO
53C3 D7 21          STA B  TP7+1     ZERO CHECKSUM
53C5 BD 37FD        JSR    $37FD     GIO ROM JUMP
53C8 20 D9          BRA    SPL1-6    CHECK FOR ERROR
53CA C6 05   SPT1   LDA B  #5        SET ERROR
53CC D7 06          STA B  ERROR
53CE 20 D9          BRA    SPL1
7D40                ORG    $7D40
7D40 539C           FDB    SPLD
7D42 53AE           FDB    SPCAL
7D44 5356           FDB    SPST
7D46 5354           FDB    SPSTS
7D48 53BA           FDB    SPTAP
7D7C                ORG    $7D7C
7D7C 532A           FDB    IOFMT
                    NAM    SIGMA
7250                ORG    $7250
     4CB3    USMEM  EQU    $4CB3
     55AC    XEY    EQU    $55AC
             *
             *   ACCUMULATE ROUTINES
             *
             *   THIS ROUTINE IMPLEMENTS THE DOUBLE VARRIABLE
             *   SUMMATION OF 'X' AND 'Y' INTO REGS 'I' AND 'J'.
             *   USER PARAMETERS:
             *     XR - NUMBER
             *     YR - NUMBER
             *   RETURNED VALUES:
             *     I  - 'I+XR' OR 'I-XR'
             *     J  - 'J+XR' OR 'J-XR'
             *
7250 4C      ACCM   INC A
7251 4C      ACCP   INC A
7252 97 2E          STA A  T1        SET '+' OR '-' FLAG
7254 5F             CLR B
7255 D7 2D          STA B  T2
7257 D7 2C          STA B  T3        SET OTHER MACRO FLAGS
7259 86 08          LDA A  #8        'I' REG. INDICATOR
725B BD 4CB3        JSR    USMEM     STO +,- I
725E 8D 05          BSR    XEY1      EXCHANGE XR AND YR
7260 86 09          LDA A  #9        'J' REG. INDICATOR
7262 BD 4CB3        JSR    USMEM     STO +,- J
7265 7E 55AC XEY1   JMP    XEY
             *
             *   RCL-ACC
             *
             *   RETURNED VALUES:
             *     XR - VALUE OF IR
```

```
                *      YR - VALUE OF JR
                *
7268 BD 55EF RACC      JSR    STKUP     STACK OPERATION
726B 96 0A             LDA A  EOM
726D 4A                DEC A            LAST PAGE OF RAM
726E C6 F8             LDA B  #$F8      REG J
7270 D7 0D             STA B  STKFLG    SET FOR AUTO STACK
7272 97 22             STA A  T13
7274 D7 23             STA B  T12       POINTER
7276 DE 22             LDX    T13
7278 8D 61             BSR    TXX       LOAD JR INTO XR
727A BD 55EF           JSR    STKUP     STACK RESULT
727D 86 F0             LDA A  #$F0
727F 97 23             STA A  T12       POINTER TO IR
7281 DE 22             LDX    T13
7283 20 56             BRA    TXX       LOAD IR INTO XR
                *
                *      MEAN - STANDARD DEVIATION
                *
                *      THIS ROUTINE CALCULATES THE MEAN AND STANDARD
                *      DEVIATION GIVEN THE FOLLOWING ALPHA REGISTER
                *      VALUES:
                *        CR - SUM 'X'
                *        DR - SUM 'X^2'
                *        ER - N (#OF TERMS)
                *      RETURNED VALUES:
                *        XR - MEAN
                *        YR - STANDARD DEVIATION
                *      FORMULAS IMPLEMENTED:
                *        MEAN = (SUM 'X')/N
                *        S.D. = SQRT(((SUM 'X^2')-(SUM 'X')*(MEAN))/(N-1))
                *
7285 96 F9    MSDEV    LDA A  ER+1      (+) NUMBER?
7287 2A 05             BPL    *+7       YES
7289 86 06             LDA A  #6
728B 97 06             STA A  ERROR     NO, SET ERROR
728D 39                RTS
728E BD 55EF           JSR    STKUP     STACK OPERATION
7291 CE 00E8           LDX    #CR
7294 8D 45             BSR    TXX       LOAD SUM 'X'
7296 CE 0078           LDX    #AT1
7299 BD 73F3           JSR    TXRX      COPY XR INTO TEMP.
729C CE 00F8           LDX    #ER
729F 8D 3A             BSR    TXX       LOAD 'N' INTO XR
72A1 CE 0078           LDX    #AT1
72A4 BD 7793           JSR    FPD       DIVIDE 'N' INTO SUM'X'
72A7 CE 0078           LDX    #AT1
72AA 8D 32             BSR    TXR       SAVE THE MEAN
72AC CE 00E8           LDX    #CR
72AF BD 7735           JSR    FPM       MEAN*SUM'X'
72B2 CE 00F0           LDX    #DR
72B5 BD 75F6           JSR    FPS       SUM'X^2'-MEAN*SUM'X'
72B8 CE 0080           LDX    #AT2
72BB 8D 21             BSR    TXR       SAVE PARTIAL RESULT
72BD CE 6838           LDX    #$6838
72C0 8D 19             BSR    TXX       LOAD A FLOATING 1.0
72C2 CE 00F8           LDX    #ER
72C5 BD 75F6           JSR    FPS       'N'-1.0
72C8 CE 0080           LDX    #AT2
72CB BD 7793           JSR    FPD       S.D. SQUARED
72CE BD 6E65           JSR    SQRT      FINISH S.D.
72D1 86 80             LDA A  #$80
72D3 97 0D             STA A  STKFLG    SET AUTO STACK
72D5 BD 55EF           JSR    STKUP
72D8 CE 0078           LDX    #AT1
72DB 7E 743B  TXX      JMP    TXXR      LOAD MEAN INTO XR
72DE 7E 73F3  TXR      JMP    TXRX
                *
                *      SIGMA ROUTINES
                *
                *      THIS ROUTINE IMPLEMENTS THE SINGLE VARRIABLE
                *      SUMMATION OF 'X', 'X^2', AND 'N'.
                *      USER PARAMETERS:
                *        XR - NEW 'X' VALUE
                *        CR - CURRENT SUM 'X'
```

```
                    *        DR - CURRENT SUM 'XA2'
                    *        ER = CURRENT 'N'
                    *      RETURNED VALUES:
                    *        XR - NEW 'X'
                    *        CR - NEW SUM 'X'
                    *        DR - NEW SUM 'XA2'
                    *        ER - NEW 'N'
                    *
72E1 4C             SIGM     INC A
72E2 97 22          SIGP     STA A   T13       SET ENTRY FLAG
72E4 CE 0078                 LDX     #AT1
72E7 8D F5                   BSR     TXR       SAVE 'X'
72E9 CE 00E8                 LDX     #CR
72EC 8D 1F                   BSR     OPER      EXECUTE '+' OR '-'
72EE CE 0078                 LDX     #AT1
72F1 8D E8                   BSR     TXX       RELOAD 'X' INTO XR
72F3 CE 0078                 LDX     #AT1
72F6 BD 7735                 JSR     FPM       'X'A2
72F9 CE 00F0                 LDX     #DR
72FC 8D 0F                   BSR     OPER      EXECUTE '+' OR '-'
72FE CE 6838                 LDX     #$6838
7301 8D D8                   BSR     TXX       LOAD 1.0 INTO XR
7303 CE 00F8                 LDX     #ER
7306 8D 05                   BSR     OPER      EXECUTE '+' OP '-'
7308 CE 0078                 LDX     #AT1
730B 20 CE                   BRA     TXX       RESTORE 'X'
                    *
                    *      PERFORMS '+' OR '-' OPERATION DEPENDING
                    *      ON SPECIFIER FLAG T13 (0-ADD).
                    *
730D DF 23          OPER     STX     T12       SAVE REG POINTER
730F 96 22                   LDA A   T13
7311 27 05                   BEQ     OPER1     DO ADD
7313 BD 75F6                 JSR     FPS
7316 20 03                   BRA     OPER1+3
7318 BD 75FC        OPER1    JSR     FPA
731B DE 23                   LDX     T12       POINTER
731D 20 BF                   BRA     TXR       SAVE RESULT
                    *
                    *      CREG
                    *
                    *      CLEARS ALPHA REGISTERS A-J.
                    *
731F CE 00D8        CREG     LDX     #AR
7322 8D 0B                   BSR     CLG       CLEAR A-E
7324 D6 0A                   LDA B   EOM
7326 5A                      DEC B             LAST PAGE OF RAM
7327 D7 14                   STA B   TP1
7329 C6 D8                   LDA B   #$D8      BUILD ADDRESS
732B D7 15                   STA B   TP1+1
732D DE 14                   LDX     TP1       ADDRESS OF F-J
732F C6 28          CLG      LDA B   #40       TOTAL COUNT
7331 A7 00                   STA A   0,X       ZERO BYTE
7333 08                      INX               BUMP ADDRESS
7334 5A                      DEC B             DONW WITH FIVE REGS YET?
7335 26 FA                   BNE     CLG+2     NO
7337 39                      RTS
                    *
                    *      INSTRUCTION ADDRESS TABLE INSERTS
                    *
7C4E                         ORG     $7C4E
7C4E 72E2                    FDB     SIGP      SIGMA +
7C50 72E1                    FDB     SIGM      SIGMA -
7C56                         ORG     $7C56
7C56 7251                    FDB     ACCP      ACCUM +
7C58 7250                    FDB     ACCM      ACCUM -
7C6E                         ORG     $7C6E
7C6E 7285                    FDB     MSDEV     MEAN & S.D.
7C76                         ORG     $7C76
7C76 7268                    FDB     RACC
7C78 731F                    FDB     CREG
                             NAM     LINK
                             OPT     LIST,NOMEM
7BFF                         ORG     $7BFF
                    *
```

```
                   *THIS ROUTINE DEFINES THE LINKAGE
                   *TABLE FOR CJ.
                   *INST*2+$7C00=ROUTINE ADDRESS
                   *
7BFF 39            RRTN  RTS                 RETURN FOR DUMMYS
7C00 7BFF                FDB      RRTN       NOP
7C02 7BFF                FDB      RRTN       0
7C04 7BFF                FDB      RRTN       1
7C06 7BFF                FDB      RRTN       2
7C08 7BFF                FDB      RRTN       3
7C0A 7BFF                FDB      RRTN       4
7C0C 7BFF                FDB      RRTN       5
7C0E 7BFF                FDB      RRTN       6
7C10 7BFF                FDB      RRTN       7
7C12 7BFF                FDB      RRTN       8
7C14 7BFF                FDB      RRTN       9
7C16 7BFF                FDB      RRTN       .
7C18 7BFF                FDB      RRTN       +
7C1A 7BFF                FDB      RRTN       -
7C1C 7BFF                FDB      RRTN       *
7C1E 7BFF                FDB      RRTN       /
7C20 7BFF                FDB      RRTN       ENTER
7C22 7BFF                FDB      RRTN       EEX
7C24 7BFF                FDB      RRTN       CHS
7C26 7BFF                FDB      RRTN       CLX
7C28 7BFF                FDB      RRTN       CLEAR
7C2A 7BFF                FDB      RRTN       XEY
7C2C 7BFF                FDB      RRTN       ROLL DOWN
7C2E 7BFF                FDB      RRTN       PI
7C30 7BFF                FDB      RRTN       LAST X
7C32 7BFF                FDB      RRTN       SIN
7C34 7BFF                FDB      RRTN       COS
7C36 7BFF                FDB      RRTN       TAN
7C38 7BFF                FDB      RRTN       ARCSIN
7C3A 7BFF                FDB      RRTN       ARCCOS
7C3C 7BFF                FDB      RRTN       ARCTAN
7C3E 7BFF                FDB      RRTN       LN
7C40 7BFF                FDB      RRTN       LOG
7C42 7BFF                FDB      RRTN       E^X
7C44 7BFF                FDB      RRTN       10^X
7C46 7BFF                FDB      RRTN       Y^X
7C48 7BFF                FDB      RRTN       ROLL UP
7C4A 7BFF                FDB      RRTN       SQRT X
7C4C 7BFF                FDB      RRTN       1/X
7C4E 7BFF                FDB      RRTN       SIGMA +
7C50 7BFF                FDB      RRTN       SIGMA -
7C52 7BFF                FDB      RRTN       R TO P
7C54 7BFF                FDB      RRTN       P TO R
7C56 7BFF                FDB      RRTN       ACC+
7C58 7BFF                FDB      RRTN       ACC-
7C5A 7BFF                FDB      RRTN       INT
7C5C 7BFF                FDB      RRTN       DEGREES
7C5E 7BFF                FDB      RRTN       TO D.MS
7C60 7BFF                FDB      RRTN       FROM D.MS
7C62 7BFF                FDB      RRTN       IF+
7C64 7BFF                FDB      RRTN       IF-
7C66 7BFF                FDB      RRTN       IF0
7C68 7BFF                FDB      RRTN       IFX=Y
7C6A 7BFF                FDB      RRTN       IFX<Y
7C6C 7BFF                FDB      RRTN       IFX>=Y
7C6E 7BFF                FDB      RRTN       MEAN, STD DEV.
7C70 7BFF                FDB      RRTN       # OF R'S
7C72 7BFF                FDB      RRTN       LIST STACK
7C74 7BFF                FDB      RRTN       ROUND X
7C76 7BFF                FDB      RRTN       RCL ACC +
7C78 7BFF                FDB      RRTN       CLR A THRU J
7C7A 7BFF                FDB      RRTN       LINE FEED
7C7C 7BFF                FDB      RRTN       GRADS
7C7E 7BFF                FDB      RRTN       RADIANS
7C80 7BFF                FDB      RRTN       SFG 1
7C82 7BFF                FDB      RRTN       SFG 2
7C84 7BFF                FDB      RRTN       SFG 3
7C86 7BFF                FDB      RRTN       SFG 4
7C88 7BFF                FDB      RRTN       SFG 5
7C8A 7BFF                FDB      RRTN       SFG 6
```

```
7C8C 7BFF    FDB   RRTN   SFG 7
7C8E 7BFF    FDB   RRTN   SFG 8
7C90 7BFF    FDB   RRTN   IF SFG 1
7C92 7BFF    FDB   RRTN   IF SFG 2
7C94 7BFF    FDB   RRTN   IF SFG 3
7C96 7BFF    FDB   RRTN   IF SFG 4
7C98 7BFF    FDB   RRTN   IF SFG 5
7C9A 7BFF    FDB   RRTN   IF SFG 6
7C9C 7BFF    FDB   RRTN   IF SFG 7
7C9E 7BFF    FDB   RRTN   IF SFG 8
7CA0 7BFF    FDB   RRTN   CFG 1
7CA2 7BFF    FDB   RRTN   CFG 2
7CA4 7BFF    FDB   RRTN   CFG 3
7CA6 7BFF    FDB   RRTN   CFG 4
7CA8 7BFF    FDB   RRTN   CFG 5
7CAA 7BFF    FDB   RRTN   CFG 6
7CAC 7BFF    FDB   RRTN   CFG 7
7CAE 7BFF    FDB   RRTN   CFG 8
7CB0 7BFF    FDB   RRTN   IF CFG 1
7CB2 7BFF    FDB   RRTN   IF CFG 2
7CB4 7BFF    FDB   RRTN   IF CFG 3
7CB6 7BFF    FDB   RRTN   IF CFG 4
7CB8 7BFF    FDB   RRTN   IF CFG 5
7CBA 7BFF    FDB   RRTN   IF CFG 6
7CBC 7BFF    FDB   RRTN   IF CFG 7
7CBE 7BFF    FDB   RRTN   IF CFG 8
7CC0 7BFF    FDB   RRTN   GOTO LBL X
7CC2 7BFF    FDB   RRTN   GOSUB LBL X
7CC4 7BFF    FDB   RRTN   GOTO X
7CC6 7BFF    FDB   RRTN   GOSUB X
7CC8 7BFF    FDB   RRTN   STO A
7CCA 7BFF    FDB   RRTN   STO B
7CCC 7BFF    FDB   RRTN   STO C
7CCE 7BFF    FDB   RRTN   STO D
7CD0 7BFF    FDB   RRTN   STO E
7CD2 7BFF    FDB   RRTN   STO F
7CD4 7BFF    FDB   RRTN   STO G
7CD6 7BFF    FDB   RRTN   STO H
7CD8 7BFF    FDB   RRTN   STO I
7CDA 7BFF    FDB   RRTN   STO J
7CDC 7BFF    FDB   RRTN   STO+ A
7CDE 7BFF    FDB   RRTN   STO+ B
7CE0 7BFF    FDB   RRTN   CTO+ C
7CE2 7BFF    FDB   RRTN   STO+ D
7CE4 7BFF    FDB   RRTN   STO+ E
7CE6 7BFF    FDB   RRTN   STO+ F
7CE8 7BFF    FDB   RRTN   STO+ G
7CEA 7BFF    FDB   RRTN   STO+ H
7CEC 7BFF    FDB   RRTN   STO+ I
7CEE 7BFF    FDB   RRTN   STO+ J
7CF0 7BFF    FDB   RRTN   STO- A
7CF2 7BFF    FDB   RRTN   STO- B
7CF4 7BFF    FDB   RRTN   STO- C
7CF6 7BFF    FDB   RRTN   STO- D
7CF8 7BFF    FDB   RRTN   STO- E
7CFA 7BFF    FDB   RRTN   STO- F
7CFC 7BFF    FDB   RRTN   STO- G
7CFE 7BFF    FDB   RRTN   STO- H
7D00 7BFF    FDB   RRTN   STO- I
7D02 7BFF    FDB   RRTN   STO- J
7D04 7BFF    FDB   RRTN   STO* A
7D06 7BFF    FDB   RRTN   STO* B
7D08 7BFF    FDB   RRTN   STO* C
7D0A 7BFF    FDB   RRTN   STO* D
7D0C 7BFF    FDB   RRTN   STO* E
7D0E 7BFF    FDB   RRTN   STO* F
7D10 7BFF    FDB   RRTN   STO* G
7D12 7BFF    FDB   RRTN   STO* H
7D14 7BFF    FDB   RRTN   STO* I
7D16 7BFF    FDB   RRTN   STO* J
7D18 7BFF    FDB   RRTN   STO/ A
7D1A 7BFF    FDB   RRTN   STO/ B
7D1C 7BFF    FDB   RRTN   STO/ C
7D1E 7BFF    FDB   RRTN   STO/ D
7D20 7BFF    FDB   RRTN   STO/ E
```

```
00736 7D22 7BFF          FDB    RRTN    STO/ F
00737 7D24 7BFF          FDB    RRTN    STO/ G
00738 7D26 7BFF          FDB    RRTN    STO/ H
00739 7D28 7BFF          FDB    RRTN    STO/ I
00740 7D2A 7BFF          FDB    RRTN    STO/ J
00741 7D2C 7BFF          FDB    RRTN    RCL A
00742 7D2E 7BFF          FDB    RRTN    RCL B
00743 7D30 7BFF          FDB    RRTN    RCL C
00744 7D32 7BFF          FDB    RRTN    RCL D
00745 7D34 7BFF          FDB    RRTN    RCL E
00746 7D36 7BFF          FDB    RRTN    RCL F
00747 7D38 7BFF          FDB    RRTN    RCL G
00748 7D3A 7BFF          FDB    RRTN    RCL H
00749 7D3C 7BFF          FDB    RRTN    RCL I
00750 7D3E 7BFF          FDB    RRTN    RCL J
00751 7D40 7BFF          FDB    RRTN    CALL A (LDBIN)
00752 7D42 7BFF          FDB    RRTN    CALL B (RUNBIN)
00753 7D44 7BFF          FDB    RRTN    CALL C (RCBIN)
00754 7D46 7BFF          FDB    RRTN    CALL D (RCBINSC)
00755 7D48 7BFF          FDB    RRTN    CALL E (PTAPE)
00756 7D4A 7BFF          FDB    RRTN    VERIFY FILE
00757 7D4C 7BFF          FDB    RRTN    LOAD & RUN
00758 7D4E 7BFF          FDB    RRTN    RECORD DATA
00759 7D50 7BFF          FDB    RRTN    REWIND
00760 7D52 7BFF          FDB    RRTN    PAUSE
00761 7D54 7BFF          FDB    RRTN    FOR B TO G
00762 7D56 7BFF          FDB    RRTN    FOR C TO H
00763 7D58 7BFF          FDB    RRTN    FOR A TO F
00764 7D5A 7BFF          FDB    RRTN    NEXT A
00765 7D5C 7BFF          FDB    RRTN    NEXT B
00766 7D5E 7BFF          FDB    RRTN    NEXT C
00767 7D60 7BFF          FDB    RRTN    RUN/STOP
00768 7D62 7BFF          FDB    RRTN    END
00769 7D64 7BFF          FDB    RRTN    PRINT
00770 7D66 7BFF          FDB    RRTN    RETURN
00771 7D68 7BFF          FDB    RRTN    ALPHA TERMINATOR
00772 7D6A 7BFF          FDB    RRTN    RECORD PROGRAM
00773 7D6C 7BFF          FDB    RRTN    RECORD PROTECTED
00774 7D6E 7BFF          FDB    RRTN    MARK FILE
00775 7D70 7BFF          FDB    RRTN    IDENTIFY FILE
00776 7D72 7BFF          FDB    RRTN    LOAD FILE
00777 7D74 7BFF          FDB    RRTN    THIS BIT PATTERN IS UNUSED
00778           *******************************************************
00779 7D76 7BFF          FDB    RRTN    FIXED
00780 7D78 7BFF          FDB    RRTN    SCI
00781 7D7A 7BFF          FDB    RRTN    SCI 3
00782 7D7C 7BFF          FDB    RRTN    FORMAT
00783 7D7E 7BFF          FDB    RRTN    LABEL
00784 7D80 7BFF          FDB    RRTN    GOSUB LBL
00785 7D82 7BFF          FDB    RRTN    GOTO LBL
00786 7D84 7BFF          FDB    RRTN    RCL RCL ALPHA
00787 7D86 7BFF          FDB    RRTN    STO RCL ALPHA
00788 7D88 7BFF          FDB    RRTN    STO RCL + ALPHA
00789 7D8A 7BFF          FDB    RRTN    STO RCL - ALPHA
00790 7D8C 7BFF          FDB    RRTN    STO RCL * ALPHA
00791 7D8E 7BFF          FDB    RRTN    STO RCL / ALPHA
00792 7D90 7BFF          FDB    RRTN    STO 0
00793 7D92 7BFF          FDB    RRTN    STO 1
00794 7D94 7BFF          FDB    RRTN    STO+ 0
00795 7D96 7BFF          FDB    RRTN    STO+ 1
00796 7D98 7BFF          FDB    RRTN    STO- 0
00797 7D9A 7BFF          FDB    RRTN    STO- 1
00798 7D9C 7BFF          FDB    RRTN    STO* 0
00799 7D9E 7BFF          FDB    RRTN    STO* 1
00800 7DA0 7BFF          FDB    RRTN    STO/ 0
00801 7DA2 7BFF          FDB    RRTN    STO/ 1
00802 7DA4 7BFF          FDB    RRTN    RCL 0
00803 7DA6 7BFF          FDB    RRTN    RCL 1
00804 7DA8 7BFF          FDB    RRTN    RCL RCL 0
00805 7DAA 7BFF          FDB    RRTN    RCL RCL 1
00806 7DAC 7BFF          FDB    RRTN    STO RCL 0
00807 7DAE 7BFF          FDB    RRTN    STO RCL 1
00808 7DB0 7BFF          FDB    RRTN    STO RCL+ 0
00809 7DB2 7BFF          FDB    RRTN    STO RCL+ 1
00810 7DB4 7BFF          FDB    RRTN    STO RCL- 0
```

```
00811  7DB6  7BFF          FDB   RRTN    STO RCL- 1
00812  7DB8  7BFF          FDB   RRTN    STO RCL* 0
00813  7DBA  7BFF          FDB   RRTN    STO RCL* 1
00814  7DBC  7BFF          FDB   RRTN    STO RCL/ 0
00815  7DBE  7BFF          FDB   RRTN    STO RCL/ 1
00816  7DC0  7BFF          FDB   RRTN    GOSUB 0
00817  7DC2  7BFF          FDB   RRTN    GOSUB 1
00818  7DC4  7BFF          FDB   RRTN    GOSUB 2
00819  7DC6  7BFF          FDB   RRTN    GOSUB 3
00820  7DC8  7BFF          FDB   RRTN    GOSUB 4
00821  7DCA  7BFF          FDB   RRTN    GOSUB 5
00822  7DCC  7BFF          FDB   RRTN    GOSUB 6
00823  7DCE  7BFF          FDB   RRTN    GOSUB 7
00824  7DD0  7BFF          FDB   RRTN    GOSUB 8
00825  7DD2  7BFF          FDB   RRTN    GOSUB 9
00826  7DD4  7BFF          FDB   RRTN    GOSUB 10
00827  7DD6  7BFF          FDB   RRTN    GOSUB 11
00828  7DD8  7BFF          FDB   RRTN    GOSUB 12
00829  7DDA  7BFF          FDB   RRTN    GOSUB 13
00830  7DDC  7BFF          FDB   RRTN    GOSUB 14
00831  7DDE  7BFF          FDB   RRTN    GOSUB 15
00832  7DE0  7BFF          FDB   RRTN    GOTO 0
00833  7DE2  7BFF          FDB   RRTN    GOTO 1
00834  7DE4  7BFF          FDB   RRTN    GOTO 2
00835  7DE6  7BFF          FDB   RRTN    GOTO 3
00836  7DE8  7BFF          FDB   RRTN    GOTO 4
00837  7DEA  7BFF          FDB   RRTN    GOTO 5
00838  7DEC  7BFF          FDB   RRTN    GOTO 6
00839  7DEE  7BFF          FDB   RRTN    GOTO 7
00840  7DF0  7BFF          FDB   RRTN    GOTO 8
00841  7DF2  7BFF          FDB   RRTN    GOTO 9
00842  7DF4  7BFF          FDB   RRTN    GOTO 10
00843  7DF6  7BFF          FDB   RRTN    GOTO 11
00844  7DF8  7BFF          FDB   RRTN    GOTO 12
00845  7DFA  7BFF          FDB   RRTN    GOTO 13
00846  7DFC  7BFF          FDB   RRTN    GOTO 14
00847  7DFE  7BFF          FDB   RRTN    GOTO 15
```

SYMBOL TABLE

```
ADATA  0000  ACTL   0001  BDATA  0002  BCTL   0003  INPUT  0004  IOIN   0005
ERROR  0006  TGL    0007  UFLG   0008  RSFLG  0009  EOM    000A  EOPM   000B
STKFLG 000D  RND    000E  DIGFLG 000F  W2     0010  W1     0011  SFLG   0012
DCNTR  0013  TP1    0014  TP1S   0015  TP2    0016  TP2S   0017  TP3    0018
TP3S   0019  TP4    001A  TP4S   001B  TP5    001C  TP5S   001D  TP6    001E
TP6S   001F  TP7    0020  TP7S   0021  T13    0022  T12    0023  T11    0024
T10    0025  T9     0026  T8     0027  T7     0028  T6     0029  T5     002A
T4     002B  T3     002C  T2     002D  T1     002E  ISTK   002F  ISTACK 0051
TA     0052  SPGM   0054  EXTRA  0056  BUFF   0058  REAL   0068  IMAG   0070
AT1    0078  AT2    0080  W      0088  XR     0090  YR     0098  ZR     00A0
TR     00A8  LSTX   00B0  BKWRT  00B8  BKKC   00BA  SOL7   00C6  UPP    00C8
UIP    00CA  ALPHA  00CC  IO1    00CD  IO2    00D0  IT7    00D3  FLAG   00D5
TPOS   00D6  FILE   00D7  AR     00D8  BR     00E0  CR     00E8  DR     00F0
ER     00F8  SDBB   00BA  MT     7E00  TERMN7 0030  IMED   0040  PARCD  00C0
PAREX  0080  NTBL   0000  DOTS   5EC0  PRTDRV 602D  FRMT   5CAB  BLANK  5D75
LDMSG  57BD  ROLLD  55B2  ROLLU  57F1  PSD    55DA  TXL    55E9  STKUP  55EF
MAD    749B  CMP    74AA  NOR    74D6  TXW    7424  TXXR   7439  EXXR   7452
ABSR   753B  OVUNF  7586  OVERF  750D  XR0    740A  XRNINE 75C8  UNDRF  75F1
IMULT  7689  QDG    7669  FPA    75FC  FPS    75F6  FPM    7735  FPD    7793
FPAEX  763D  FPMEX  7780  LSHIFT 7521  ZEROX  7489  XZERO0 7416  XZERO2 7417
RECIP  73E6  TXRX   73F3  CONST  6800  FPDBRC 6898  TAN    6BA9  ATN    69C3
DSZERO 6A46  NTLN   6A58  EXPN   6AC9  SIN    6B94  COS    6B9A  ASIN   6BF2
ACOS   6BF7  PH1    6C5D  PH2    6C8D  PH3    6D34  PH4    6DD0  LSFT8  6E47
SQRT   6E65  MAD8   6F2C  CMP8   53E4  IOUPX  6F52  LOG10  6FA7  YUPX   6FE9
RTOP   7328  PTOR   7386  ROMID  5300  RM1    5305  RM2    5316  RM3    5329
IOFMT  532A  IOF1   5337  IOF1A  5347  IOF2   534E  RNPPT  5351  STBIN  62AD
LDBIN  6396  SPSTS  5354  SPST   5356  SPS0   5366  SPS0A  537A  SPS1   537D
LIMIT  5380  LIM1   538E  KILL   538F  KIL1   5393  SPLD   539C  SPL1   53A9
SPCAL  53AE  SPTAP  53BA  SPT1   53CA  USMEM  4CB3  XEY    55AC  ACCM   7250
ACCP   7251  XEY1   7265  RACC   7268  MSDEV  7285  TXX    72D9  TXR    720E
SIGM   72E1  SIGP   72E2  OPER   730D  OPER1  7318  CREG   731F  CLG    732F
RRTN   7BFF
```

```
TOTAL ERRORS    3

****ERROR 201
 218  NAM CONST
****ERROR 201
 303  NAM FPDBRC
****ERROR 201
 324  NAM TAN
****ERROR 206
 327 FLAG EQU BUFF+15
****ERROR 206
 333 ADDRST EQU TP7
****ERROR 206
 335 TS EQU REAL
****ERROR 201
 480  NAM ATN
****ERROR 206
 483 FLAG EQU BUFF+15
****ERROR 206
 484 EXP EQU BUFF+14
****ERROR 206
 487 ADDRST EQU TP7
****ERROR 206
 488 SHIFT1 EQU T1
****ERROR 206
 489 SHIFT2 EQU T2
****ERROR 206
 491 TEMP EQU T4
****ERROR 201
 567  NAM DSZERO
****ERROR 206
 570 DIGIT EQU BUFF
****ERROR 201
 589  NAM NTLN
****ERROR 206
 592 FLAG EQU BUFF+15
****ERROR 206
 593 EXP EQU BUFF+14
****ERROR 206
 594 SHIFT1 EQU T1
****ERROR 206
 595 SHIFT3 EQU T3
****ERROR 206
 596 TEMP EQU T4
****ERROR 206
 597 TS EQU REAL
****ERROR 201
 665  NAM EXPN
****ERROR 206
 668 FLAG EQU BUFF+15
****ERROR 206
 669 EXP EQU BUFF+14
****ERROR 206
 671 ADDRST EQU TP7
****ERROR 206
 672 SHIFT1 EQU T1
****ERROR 206
 673 ADDRS EQU TP6
****ERROR 206
 674 ZOFLAG EQU TP5
****ERROR 206
 675 DIGIT EQU BUFF
****ERROR 206
 676 TRIG EQU TRIG1-14
****ERROR 201
 788  NAM SIN
****ERROR 206
 791 FLAG EQU BUFF+15
****ERROR 206
 792 TS EQU REAL
****ERROR 206
 793 QAD EQU BUFF+13
****ERROR 206
 794 TEMP EQU T4
```

```
****ERROR 201
 851  NAM ASIN
****ERROR 206
 854 TS EQU REAL
****ERROR 206
 855 ADDRST EQU TP7
****ERROR 206
 856 FLAG EQU BUFF+15
****ERROR 206
 857 XTS EQU IMAG
****ERROR 201
 920  NAM PH1
****ERROR 206
 923 DIGIT EQU BUFF
****ERROR 206
 924 ADDRS EQU TP6
****ERROR 206
 925 ADDRST EQU TP7
****ERROR 206
 926 QDIGIT EQU TP3
****ERROR 206
 927 SHIFT1 EQU T1
****ERROR 206
 928 ZQFLAG EQU TP5
****ERROR 201
 965  NAM PH2
****ERROR 206
 968 SHIFT3 EQU T3
****ERROR 206
 969 FLAG EQU BUFF+15
****ERROR 206
 970 ADDRS EQU TP6
****ERROR 206
 971 SHIFT2 EQU T2
****ERROR 206
 972 TS EQU REAL
                         OPT    LIST,MEM
                         NAM    CONST
                         OPT    DB16,MEM
      6800               ORG    CONST
                   *
                   *THIS FILE CONTAINS THE CONVERSION CONSTANTS USED IN
                   *THE MATH SUBROUTINES. BOTH THE TRIG AND LN CONSTANTS
                   *USED BY THE MATH ALGORITHMS HAVE ONLY THE MANTISSA
                   *STORED. ALSO, FOR EACH SET, EACH SUCCESSIVE CONSTANT
                   *IS LEFT SHIFTED ONCE FROM THE PRECEEDING CONSTANT.
                   *PROPER VALUE ALIGNMENT IS PERFORMED DURING EXECUTION
                   *OF EACH ALGORITHM.
                   *ALL OTHER CONSTANTS ARE STORED AS FULL
                   *FLOATING POINT NUMBERS.
                   *
                   * R. FUHRMAN  2/28/75  REV B
                   *
                   *             GRADS/UNIT CIRCLE ( 400 )
                   *
      6800 02      FIRST  FCB    $02,$00,$40,$00,$00,$00,$00,$00
                   *             RADIANS/UNIT CIRCLE ( 2PI )
                   *
      6808 00      A2PI   FCB    $00,$00,$62,$83,$18,$53,$07,$18
                   *             DEGREES/UNIT CIRCLE ( 360 )
                   *
      6810 02             FCB    $02,$00,$36,$00,$00,$00,$00,$00
                   *             GRADS/QUADRANT ( 100 )
                   *
      6818 02             FCB    $02,$00,$10,$00,$00,$00,$00,$00
                   *             RADIANS/QUADRANT ( PI/2 )
                   *
      6820 00      PIO2   FCB    $00,$00,$15,$70,$79,$63,$26,$80
                   *             DEGREES/QUADRANT ( 90 )
                   *
      6828 01             FCB    $01,$00,$90,$00,$00,$00,$00,$00
                   *             GRADS/RADIAN ( 200/PI )
                   *
      6830 01      GRAD   FCB    $01,$00,$63,$66,$19,$77,$23,$68
                   *             RADIANS/RADIAN ( 1 )
```

```
                *
       6838 00  ONE     FCB     $00,$00,$10,$00,$00,$00,$00,$00
                *                DEGREES/RADIAN ( 180/PI )
                *
       6840 01  DEGREE  FCB     $01,$00,$57,$29,$57,$79,$51,$31
                *                ARCTAN( 1 )
                *
       6848 78  TRIG1   FCB     $78,$53,$98,$16,$33,$97
                *                ARCTAN( .1 )
                *
       684E 99          FCB     $99,$66,$86,$52,$49,$12
                *                ARCTAN( .01 )
                *
       6854 99          FCB     $99,$99,$66,$66,$86,$67
                *                ARCTAN( .001 )
                *
       685A 99          FCB     $99,$99,$99,$66,$66,$67
                *                ARCTAN( .0001 )
                *
       6860 99          FCB     $99,$99,$99,$99,$66,$67
                *                ARCTAN( .00001 )
                *
       6866 99          FCB     $99,$99,$99,$99,$99,$67
                *                LN( 2 )
                *
       686C 69          FCB     $69,$31,$47,$18,$05,$60
                *                LN( 1.1 )
                *
       6872 95          FCB     $95,$31,$01,$79,$80,$43
                *                LN( 1.01 )
                *
       6878 99          FCB     $99,$50,$33,$08,$53,$17
                *                LN( 1.001 )
                *
       687E 99          FCB     $99,$95,$00,$33,$30,$84
                *                LN( 1.0001 )
                *
       6884 99          FCB     $99,$99,$50,$00,$33,$33
                *                LN( 1.00001 )
                *
       688A 99          FCB     $99,$99,$95,$00,$00,$33
                *                LN( 10 )
                *
       6890 00  LN10    FCB     $00,$00,$23,$02,$58,$50,$92,$99
                        OPT     LIST
                        OPT     LIST,MEM
       3000             ORG     $3000
                        OPT     G
                *
                **
                ***     CJ GENERAL I/O ROM
                ***     REV 01
                ***     TIM HICKENLOOPER
                ***     JULY 1975
                **
                *


       3000 20          FCB     $20,$30     ROM ID #'S
       3001 30
       3002 7E 3084     JMP     PWRUP       POWER UP JUMP
       3005 30E2        FDB     NULL        WRITE
       3007 31FA        FDB     PPNTX
       3009 3359        FDB     READX
       300B 3266        FDB     PRINT
       300D 3172        FDB     FIELD
       300F 33E8        FDB     DELIM
       3011 31A8        FDB     WRYTE
       3013 31C0        FDB     RBYTE
       3015 30E2        FDB     NULL        AND
       3017 30E2        FDB     NULL        OR
       3019 30E2        FDB     NULL        ROT
       301B 30E2        FDB     NULL        LIST
       301D 30E2        FDB     NULL        LDPGM
       301F 30E2        FDB     NULL        DUPGM
```

```
3021 330D            FDB    FLG
3023 3328          · FDB    DATA
                 *
                 *    ASCII FOR LISTING
                 *

                     OPT    NG
3025 D7              FCB    $D7,$52,$54,$68,$20    WRT 'ALPHA'
302A D7              FCB    $D7,$52,$54,$58,$20    WRTX
302F D2              FCB    $D2,$45,$41,$44,$58    READX
3034 D7              FCB    $D7,$52,$49,$54,$45    WRITE
3039 C6              FCB    $C6,$49,$45,$4C,$44    FIELD
303E C4              FCB    $C4,$45,$4C,$49,$4D    DELIM
3043 D7              FCB    $D7,$42,$59,$54,$45    WBYTE
3048 D2              FCB    $D2,$42,$59,$54,$45    RBYTE
304D C1              FCB    $C1,$4E,$44,$20,$20    AND
3052 CF              FCB    $CF,$52,$20,$20,$20    OR
3057 D2              FCB    $D2,$4F,$54,$20,$20    ROT
305C CC              FCB    $CC,$49,$53,$54,$20    LIST
3061 CC              FCB    $CC,$44,$50,$47,$4D    LDPGM
3066 C4              FCB    $C4,$55,$50,$47,$4D    DUPGM
306B C6              FCB    $C6,$4C,$41,$47,$20    FLAG
3070 C4              FCB    $C4,$41,$54,$41,$20    DATA
                     OPT    G


                 *
                 *    ERROR MESSAGES
                 *

                     OPT    NG
                 *    SELECT CODE ERR
3075 D3              FCB    $D3,$45,$4C,$45,$43,$54,$20,$43,$4F,$44
307F 45              FCB    $45,$20,$45,$52,$52
                     OPT    G


     49CE        TSFR    EQU    $49CE
     3636        ELIN    EQU    $3636
                 *
                 *    PWRUP
                 *
                 *    POWER UP INITIALIZATION ROUTINE.
                 *    ALLOCATES ONE REGISTER FOR EACH CHANNEL TO BE
                 *    USED.  DISABLES ONE ROM IF THERE ARE TWO.
                 *
3084 C6 5B       PWRUP   LDA B  #$5B      CHANNEL 1, IO7
3086 8D 51               BSR    RDID      GIO THERE?
3088 26 05               BNE    PWR1      NO
308A CE 00CD             LDX    #IO1
308D 8D 54               BSR    SETUP     INITIALIZE CHANNEL ONE
308F C6 AB       PWR1    LDA B  #$AB      CHANNEL 2, IO7
3091 8D 46               BSR    RDID      GIO THERE?
3093 26 2B               BNE    PWR4      NO
3095 CE 00D0             LDX    #IO2
3098 8D 49               BSR    SETUP     INITIALIZE CHANNEL TWO
309A 96 CF               LDA A  IO1+2
309C 91 D2               CMP A  IO2+2     TWO SAME DEVICE?
309E 26 06               BNE    PWR2      NO
30A0 86 A1               LDA A  #$A1
30A2 97 06               STA A  ERROR     SET FATAL ERROR
30A4 20 0C               BRA    PWR3      DISABLE ONE ROM
30A6 84 07       PWR2    AND A  #7
30A8 97 2E               STA A  T1        SAVE ID
30AA 96 D2               LDA A  IO2+2
30AC 84 07               AND A  #7
30AE 91 2E               CMP A  T1        TWO GIO ROMS?
30B0 26 0E               BNE    PWR4      NO
30B2 86 2C       PWR3    LDA A  #@54
30B4 97 03               STA A  BCTL      SET CB2 FUNCTION
30B6 86 E0               LDA A  #$E0
30B8 97 00               STA A  ADATA     DISABLE ROM TWO
30BA 97 02               STA A  BDATA
```

```
30BC A7 00            STA A   0,X       SET IT UP
30BE 20 15            BRA     PWR5
30C0 86 0A    PWR4    LDA A   #$A       DEVICE THREE(GIO)
30C2 91 CF            CMP A   IO1+2     GIO THREE?
30C4 27 04            BEQ     *+6       YES
30C6 91 D2            CMP A   IO2+2     GIO THREE?
30C8 26 0B            BNE     PWR5      NO
30CA B6 2800          LDA A   $2800     MASH ADDRESS
30CD 81 30            CMP A   #$30      MASH IN MACHINE?
30CF 26 04            BNE     PWR5      NO
30D1 86 A1            LDA A   #$A1      YES,
30D3 97 06            STA A   ERROR     SET FATAL ERROR
30D5 0F       PWR5    SEI
30D6 7E 3189          JMP     EX1
30D9 D7 00    RDID    STA B   ADATA     CHANNEL SELECT
30DB 5A               DEC B
30DC D7 00            STA B   ADATA     RELEASE IO7, SET IO1
30DE 96 05            LDA A   IOIN      READ CODE
30E0 85 02            BIT A   #2        TEST GIO BIT
30E2 39       NULL    RTS


30E3 C6 02    SETUP   LDA B   #2        LOAD CODE 2
30E5 85 40            BIT A   #$40      CODE THREE?
30E7 26 02            BNE     *+4       NO
30E9 CA 08            ORA B   #8        SET BIT 3
30EB E7 02            STA B   2,X       SET SELECT CODE
30ED 96 0B            LDA A   EOPM
30EF A7 00            STA A   0,X       SET REG POINTER
30F1 96 0C            LDA A   EOPM+1
30F3 80 08            SUB A   #8        ALLOCATE ONE REGISTER
30F5 A7 01            STA A   1,X
30F7 97 0C            STA A   EOPM+1
30F9 EE 00            LDX     0,X       LOAD POINTER
30FB 86 F0            LDA A   #$F0
30FD A7 00            STA A   0,X
30FF 4C               INC A
3100 A7 01            STA A   1,X       (-) FLAG
3102 A7 02            STA A   2,X       (-) DATA
3104 86 10            LDA A   #16
3106 A7 03            STA A   3,X       FORMAT FIELD = 16
3108 39               RTS


              *
              *  INIT
              *
              *   CALLED BY ALL GIO ROUTINES TO INITIALIZE ALL
              *   POINTER AND FLAGS.
              *     T13 - REGISTER POINTER
              *     T11 - 'STOP' EXECUTED FLAG
              *     T10 - RSFLG SAVE LOC
              *
3109 DE CA    INIT    LDX     UIP
310B A6 01            LDA A   1,X       CALL INSTR NUMBER
310D 84 70            AND A   #$70      MASK IT
310F 81 20            CMP A   #$20      CALL 2?
3111 27 11            BEQ     IN2       YES
3113 86 0A            LDA A   #$A       SELECT THREE
3115 91 CF            CMP A   IO1+2     IN CHANNEL ONE?
3117 27 1B            BEQ     IN4       YES
3119 91 D2            CMP A   IO2+2     IN CHANNEL TWO?
311B 27 11            BEQ     IN3       YES
311D 86 05    IN1     LDA A   #5
311F 97 06            STA A   ERROR     SET IO ERROR
3121 31               INS
3122 31               INS               BUMP RETURN STACK
3123 39               RTS
3124 86 02    IN2     LDA A   #2        SELECT TWO
3126 91 CF            CMP A   IO1+2     IN CHANNEL ONE?
3128 27 0A            BEQ     IN4       YES
312A 91 D2            CMP A   IO2+2     IN CHANNEL TWO?
312C 26 EF            BNE     IN1       NO, ERROR
```

```
312E DE D0   IN3     LDX     IO2
3130 C6 EB           LDA B   #$EB      CHANNEL 2. IO7
3132 20 04           BRA     IN4+4
3134 DE CD   IN4     LDX     IO1
3136 C6 DB           LDA B   #$DB      CHANNEL 1. IO7
3138 DF 22           STX     T13       SET REGISTER POINTER
313A A6 01           LDA A   1,X       (+) FLAG?
313C 2B 02           BMI     *+4       NO
313E C4 3F           AND B   #$3F
3140 84 03           AND A   #3        MASK MODE
3142 97 80           STA A   AT2
3144 47              ASR A             PERIPHERIAL MODE?
3145 27 02           BEQ     IN4A      NO
3147 C8 C0           EOR B   #$C0      OPPOSITE EDGE OF FLAG
3149 0F      IN4A    SEI
314A D7 27           STA B   T8        SET SELECT CODE
314C D7 00           STA B   ADATA     SET CHANNEL. IO7
314E C4 F0           AND B   #$F0
3150 D7 00           STA B   ADATA     RELEASE IO7. LATCH IT
3152 86 2C           LDA A   #@54
3154 97 03           STA A   BCTL      SET CB2 FUNCTION
3156 86 3D           LDA A   #@75
3158 97 01           STA A   ACTL      SET CA1 FUNCTION
315A 4F              CLR A
315B 97 81           STA A   AT2+1     CLEAR STOP KEY FLAG
315D 91 0F           CMP A   DIGFLG    DIGIT ENTRY?
315F 27 05           BEQ     IN4B      NO
3161 97 0F           STA A   DIGFLG
3163 4A              DEC A             TERMINATE IT
3164 97 0D           STA A   STKFLG
3166 96 09   IN4B    LDA A   RSFLG     RUN/STOP FLAG
3168 84 C0           AND A   #$C0
316A 97 82   IN5     STA A   AT2+2     R/S FLAG
316C 86 C0           LDA A   #$C0
316E 97 09           STA A   RSFLG     SET TO RUN
3170 0E              CLI
3171 39              RTS
             *
             *    FIELD
             *
             *
             *    SETS FIELD WIDTH FOR OUTPUTTING NUMBERS.
             *    USER PARAMETERS:
             *      XR - FIELD WIDTH (1<=XR<256)
             *
3172 8D 95   FIELD   BSR     INIT      INITIALIZE
3174 CE 0090         LDX     #XR
3177 8D 1F           BSR     BINRY     CONVERT TO BINARY
3179 26 3A           BNE     WB1       ERROR
317B 4D              TST A             ZERO FIELD?
317C 2F 37           BLE     WB1
317E DE 22           LDX     T13
3180 A7 03           STA A   3,X


             *
             *    EXIT
             *
             *    RESETS RSFLG FOR EXIT. CLEARS CHANNEL SELECT
             *    AND RESETS THE PIA FUNCTION.
             *    ALL ROUTINES EXIT THROUGH HERE!!
             *
3182 0F      EXIT    SEI
3183 96 82           LDA A   AT2+2     ENTRY RSFLG
3185 2B 02           BMI     EX1       EXIT
3187 97 09           STA A   RSFLG     RESTORE IT
3189 C6 04   EX1     LDA B   #4
318B D7 00           STA B   ADATA     IO6. RESET PIA
318D 7F 0000         CLR     ADATA
3190 86 3C           LDA A   #@74
3192 97 01           STA A   ACTL      RESET PIA
3194 97 03           STA A   BCTL
3196 0E              CLI
3197 39              RTS
```

```
                *
                *    BINRY
                *
                *    CONVERTS THE INTEGER PART OF BCD NUMBER TO
                *    ITS 8-BIT BINARY.  IX - REG ADDRESS.
                *    SETS '7' BIT FOR A LEGAL NUMBER (0 TO 256).
                *
3198 A6 01      BINRY  LDA A  1,X      LOAD SIGN, POSITIVE?
319A 2B 0E             BMI    BIN2+2   NO
319C E6 00             LDA B  0,X      LOAD EXPONENT
319E C1 03             CMP B  #3       TEST IT
31A0 2E 08             BGT    BIN2+2   # TOO BIG
31A2 5C                INC B           DIGIT COUNT
31A3 BD 49CE           JSR    TSFR     CONVERT TO BINRY
31A6 96 21             LDA A  TP7S     LOAD 8-BIT CODE
31A8 D6 20      BIN2   LDA B  TP7      LOAD RANGE FLAG
31AA 39                RTS


                *
                *   W-BYTE
                *
                *    TAKES THE INTEGER PART OF THE DECIMAL
                *    NUMBER AND SENDS ITS EQUIVALENT 8-BIT
                *    BINARY BYTE TO THE DEVICE.
                *    USER PARAMETERS:
                *      XR - NUMBER (0<=XR<256)
                *
31AB BD 3109    WBYTE  JSR    INIT     INITIALIZE ALL
31AE CE 0090           LDX    #XR
31B1 8D E5             BSR    BINRY    CONVERT TO BINRY
31B3 27 06             BEQ    WB4      VALID #
31B5 86 06      WB1    LDA A  #6
31B7 97 06      EROR   STA A  ERROR    ERROR CONDITION
31B9 20 C7             BRA    EXIT
31BB BD 3270    WB4    JSR    OTBYT    OUT IT
31BE 20 C2      WB5    BRA    EXIT
                *
                *    RBYTE
                *
                *    READS AN 8-BIT BYTE FROM THE DEVICE AND RETURNS
                *    ITS DECIMAL EQUIVALENT IN THE XR.
                *    USER PARAMETERS:
                *      - NONE
                *
31C0 BD 3109    RBYTE  JSR    INIT
31C3 BD 32DA           JSR    INBYT    INPUT BYTE
31C6 2B BA             BMI    EXIT     STOP KEY, ABORT
31C8 16         BTDEC  TAB
31C9 4F                CLR A
31CA 4C         RB1    INC A
31CB C0 64             SUB B  #100     EXTRACT 100'S
31CD 24 FB             BCC    RB1
31CF D7 2D             STA B  T2       SAVE RESIDUE
31D1 8D 14             BSR    BUILD    DIGIT ENTRY
31D3 D6 2D             LDA B  T2
31D5 86 0B             LDA A  #11
31D7 4A         RB2    DEC A
31D8 CB 0A             ADD B  #10      EXTRACT 10'S
31DA 2B FB             BMI    RB2
31DC D7 2D             STA B  T2       SAVE 1'S
31DE 8D 07             BSR    BUILD    DIGIT
31E0 96 2D             LDA A  T2
31E2 4C                INC A           1'S KEY CODE
31E3 8D 02             BSR    BUILD    ENTER IT
31E5 20 D7             BRA    WB5


                *
                *    BUILD
                *
                *    KEY CODE OF NUMBER IS PASSED IN ACCA AND
                *    RUN THROUGH THE DIGIT ENTRY ROUTINE.
```

```
                 *
31E7 C6 7C      BUILD  LDA B  #$7C
31E9 D7 14             STA B  TP1        BUILD TABLE ADDRESS
31EB 48                ASL A
31EC 97 15             STA A  TP1+1      INDEX INTO TABLE
31EE DE 14             LDX    TP1
31F0 EE 00             LDX    0,X        ADDRESS OF ROUTINE
31F2 4F                CLR A
31F3 5F                CLR B
31F4 6E 00             JMP    0,X        ENTER DIGIT
                 *
                 *     PRNT-X
                 *
                 *     OUTPUTS THE XR ACCORDING TO FIELD AND MACHINE
                 *     FORMAT.  EXPONENT IS ALWAYS SENT SIGNED.
                 *     IF THE NUMBER IS TOO LARGE FOR THE
                 *     FIELD WIDTH, THEN '$'S ARE SENT FOR THE
                 *     ENTIRE FIELD.
                 *     USER PARAMETERS:
                 *       XR - NUMBER TO BE SENT
                 *
31F6 86 80      PRNT   LDA A  #$80
31F8 20 04             BRA    PR0
31FA BD 3109    PRNTX  JSR    INIT       INITIALIZE ALL
31FD 4F                CLR A
31FE 97 26      PR0    STA A  T9         SET ENTRY FLAG
3200 BD 5CBC           JSR    FRMT+$14     FORMAT XR
3203 C6 0D             LDA B  #13
3205 86 20             LDA A  #$20       BLANK
3207 CE 0057           LDX    #BUFF-1
320A 5A         PR1    DEC B             COUNT
320B 08                INX
320C A1 00             CMP A  0,X        MANTISSA COUNT
320E 27 FA             BEQ    PR1
3210 91 67             CMP A  BUFF+15
3212 27 0E             BEQ    PR2        NO EXPONENT
3214 91 65             CMP A  BUFF+13
3216 26 04             BNE    *+6        (-) EXPONENT
3218 86 2B             LDA A  #$2B
321A 97 65             STA A  BUFF+13     STUFF A (+)
321C 86 45             LDA A  #$45
321E 97 64             STA A  BUFF+12     STUFF AN 'E'
3220 CB 04             ADD B  #4         FIX TOTAL COUNT
3222 DF 20      PR2    STX    TP7        SET POINTER
3224 D7 2E             STA B  T1         SET CHARACTER COUNT
3226 DE 22             LDX    T13
3228 E0 03             SUB B  3,X        COUNT - FIELD
322A 2F 11             BLE    PR5        WITHIN RANGE
322C E6 03             LDA B  3,X
322E D7 2E             STA B  T1         FIELD TOO SMALL
3230 86 24      PR4    LDA A  #$24
3232 8D 3C             BSR    OTBYT      OUT '$'
3234 2B 28             BMI    PR9        STOP KEY
3236 7A 002E           DEC    T1
3239 26 F5             BNE    PR4
323B 20 21             BRA    PR9
323D D7 2D      PR5    STA B  T2
323F 27 0B             BEQ    PR7        NO BLANKS
3241 86 20      PR6    LDA A  #$20
3243 8D 2B             BSR    OTBYT      LEADING BLANKS
3245 2B 17             BMI    PR9        STOP KEY
3247 7C 002D           INC    T2
324A 2B F5             BMI    PR6
324C 7A 002E    PR7    DEC    T1
324F 2B 0D             BMI    PR9        DONE
3251 DE 20             LDX    TP7
3253 A6 00             LDA A  0,X        LOAD CHARACTER
3255 08                INX
3256 DF 20             STX    TP7
3258 84 7F             AND A  #$7F       MASK 7 BITS
325A 8D 14             BSR    OTBYT      OUT THE DIGIT
325C 2A EE             BPL    PR7        NEXT CHAR
325E 96 26      PR9    LDA A  T9
3260 2A 01             BPL    PR10       REGULAR ENTRY
```

```
3262 39                 RTS
3263 7E 3182 PR10       JMP    EXIT


                  *
                  *     PRINT
                  *
                  *     OUTPUTS THE XR IN OUTPUT FORMAT TO THE
                  *     DEVICE WITH A 'CR' AND 'LF'.
                  *     USER PARAMETERS:
                  *       XR - NUMBER TO BE OUTED
                  *
3266 BD 3109 PRINT      JSR    INIT
3269 8D 8B              BSR    PRNT
326B BD 3636            JSR    ELIN      CR-LF
326E 20 F3              BRA    PR10


                  *
                  *     OTBYT
                  *
                  *     OUTS ACCA TO PERIPHERIAL.  CHECKS FOR 'ECH'
                  *     AND SETS 'STP' LINE IF STOP KEY IS HIT.
                  *
3270 DE 22   OTBYT      LDX    T13
3272 E6 00              LDA B  0,X
3274 C4 70              AND B  #$70      CLEAR I/O BIT
3276 D7 00              STA B  ADATA
3278 6D 02              TST    2,X       (+) DATA?
327A 2A 01              BPL    OTB1      YES
327C 43                 COM A
327D 97 02   OTB1       STA A  BDATA     OUTPUT DATA
327F 8D 0E              BSR    CHECK     WAIT FOR DEVICE READY
3281 8D 44              BSR    HNDSK     HANDSHAKE
3283 D6 81              LDA B  AT2+1     LOAD STOP FLAG
3285 39                 RTS
                  *
                  *     FFLAG
                  *
3286 C6 0A   FFLAG      LDA B  #$A       IO1
3288 D7 00              STA B  ADATA     SET IT
328A D6 05              LDA B  IOIN      READ DEVICE STATUS
328C E8 01              EOR B  1,X       TEST FLAG SENCE
328E 39                 RTS

                  *
                  *     CHECK
                  *
                  *     EXITS IF STOP KEY SEQUENCE EXECUTED.
                  *     WAITS FOR FLAG HIGH IF 'ECH' NOT DISABLED.
                  *     WAITS FOR FLAG LOW FOR PERIPHERIAL MODE.
                  *
328F D6 80   CHECK      LDA B  AT2
3291 27 0B              BEQ    CH2-1     NORMAL, NO ECH
3293 57                 ASR B
3294 26 09              BNE    CH2       PERIPHERIAL MODE
3296 D6 09   CH1        LDA B  RSFLG
3298 2A 0E              BPL    STOP      STOP KEY
329A 8D EA              BSR    FFLAG
329C 2A F8              BPL    CH1       DEVICE BUSY
329E 39                 RTS
329F D6 09   CH2        LDA B  RSFLG
32A1 2A 05              BPL    STOP      STOP KEY
32A3 8D E1              BSR    FFLAG     TRANSFER BEGUN?
32A5 2B F8              BMI    CH2       NO
32A7 39                 RTS

                  *
                  *     STOP
                  *
                  *     EXECUTE A STOP KEY. DRIVE 'STP' LOW.
                  *     RELEASE 'STP' AFTER 100 US
                  *
```

```
32AB D6 81    STOP    LDA B   AT2+1
32AA 2B 1A            BMI     ST2        STOP EXECUTED
32AC 8D 50            BSR     LATCH      RELEASE CTL
32AE E6 00            LDA B   0,X
32B0 C4 BF            AND B   #$BF       STOP BIT CLEAR
32B2 D7 00            STA B   ADATA      SET IT
32B4 D7 02            STA B   BDATA      LATCH
32B6 D7 81            STA B   AT2+1      SET STOP FLAG
32B8 C6 0F            LDA B   #15
32BA 5A       ST1     DEC B              TIME LOOP
32BB 2A FD            BPL     ST1
32BD E6 00            LDA B   0,X
32BF D7 00            STA B   ADATA      STP HIGH
32C1 D7 02            STA B   BDATA      LATCH
32C3 31               INS
32C4 31               INS                ABORT
32C5 5D               TST B              SET CONDITION CODE
32C6 39       ST2     RTS
              *
              *    HNDSK
              *
              *    DRIVES CTL LINE LOW AND WAITS FOR
              *    THE ODVICE TO RESPOND.
              *
32C7 C6 03    HNDSK   LDA B   #3
32C9 D7 00            STA B   ADATA      SET IO5
32CB D6 00            LDA B   ADATA      CLEAR BIT 7 OF ACTL
32CD 7F 0000          CLR     ADATA      DRIVE CONTROL LINE
32D0 D6 01    HND1    LDA B   ACTL
32D2 2B CA            BMI     CH2-1      EDGE SEEN
32D4 D6 09            LDA B   RSFLG
32D6 2B F8            BMI     HND1       NO STOP KEY
32D8 20 CE            BRA     STOP

              *
              *    INBYT
              *
              *    INPUTS A BYTE FROM PERIPHERIAL.
              *    RETURNS IT IN ACCA.
              *
32DA DE 22    INBYT   LDX     T13
32DC A6 00            LDA A   0,X
32DE 97 00            STA A   ADATA      SET I/O BIT
32E0 97 02            STA A   BDATA
32E2 8D AB            BSR     CHECK      WAIT FOR DEVIDE
32E4 D6 80            LDA B   AT2
32E6 57               ASR B
32E7 26 0C            BNE     INB1       YES
32E9 8D DC            BSR     HNDSK      HANDSHAKE
32EB 96 05    INB0    LDA A   IOIN
32ED 6D 02            TST     2,X        (-) TRUE?
32EF 2B 01            BMI     *+3        YES
32F1 43               COM A
32F2 D6 81            LDA B   AT2+1      STOP FLAG
32F4 39               RTS
32F5 8D 07    INB1    BSR     LATCH      LATCH DATA BUSS
32F7 8D F2            BSR     INB0       INPUT BYTE
32F9 8D CC            BSR     HNDSK      NOW WITH HANDSHAKE
32FB D6 81            LDA B   AT2+1      STOP FLAG
32FD 39               RTS


32FE 96 27    LATCH   LDA A   TB
3300 88 C0            EOR A   #$C0
3302 8D 02            BSR     LAT1
3304 88 CB            EOR A   #$CB
3306 97 00    LAT1    STA A   ADATA
3308 84 F0            AND A   #$F0
330A 97 00            STA A   ADATA
330C 39               RTS
              *
              *    FLG
              *
              *    CHANGES FROM (+) OR (-) TRUE FLAG LEVEL AND
              *    SETS OR CLEARS 'ECH' MODE OF OPERATION.
```

```
                        *     USER PARAMETERS:
                        *       XR - '0' FOR ECH CLEAR
                        *            '1' FOR ECH SET
                        *            '2' FOR PERIPHERIAL MODE
                        *            '-' FOR NEGATIVE FLAG
                        *            '+' FOR POSITIVE FLAG
                        *
3300 BD 3109 FLG           JSR      INIT
3310 D6 90                 LDA B    XR          LOAD EXPONENT
3312 26 11                 BNE      EXXT+3
3314 96 92                 LDA A    XR+2        MSD OF MANTISSIA
3316 44                    LSR A
3317 44                    LSR A
3318 44                    LSR A               INTEGER PART ONLY
3319 44                    LSR A
331A 81 02                 CMP A    #2
331C 22 07                 BHI      EXXT+3      NOT VALID, TOO BIG
331E 9A 91                 ORA A    XR+1        ADD SIGN
3320 A7 01                 STA A    1,X         SET IT
3322 7E 3182 EXXT          JMP      EXIT        DONE
3325 7E 3185               JMP      WB1         SET ERROR, EXIT


                        *
                        *     DATA
                        *
                        *     CHANGES FROM (+) OR (-) TRUE DATA.
                        *     USER PARAMETERS:
                        *       XR - (+) FOR POS. DATA
                        *          - (-) FOR NEG. DATA
                        *
3328 BD 3109 DATA          JSR      INIT
332B 96 91                 LDA A    XR+1        LOAD SIGN
332D A7 02                 STA A    2,X
332F 20 F1                 BRA      EXXT        DONE
                        *
                        *     DIGIT
                        *
                        *     CHECKS FOR A DIGIT SENT IN ACCA.  RETURNS
                        *     KEYCODE FROM ASCII.  ALSO LOOKS FOR A DECIMAL
                        *     IF IT'S THE FIRST ONE.  SETS 'Z' BIT IF VALID.
                        *
3331 81 2E      DIGIT      CMP A    #$2E
3333 26 0A                 BNE      DIG2        NOT A DECIMAL
3335 D6 2B                 LDA B    T4
3337 26 05                 BNE      DIG1+1      SECOND DECIMAL
3339 86 0B                 LDA A    #$B
333B 97 2B                 STA A    T4          SET NON-ZERO
333D 5F         DIG1       CLR B
333E 39                    RTS
333F 81 39      DIG2       CMP A    #$39
3341 22 FB                 BHI      DIG1+1      EXCEEDS UPPER LIMIT
3343 80 2F                 SUB A    #$2F
3345 2E F6                 BGT      DIG1        VALID DIGIT
3347 8B 2F                 ADD A    #$2F
3349 39                    RTS


                        *
                        *     SIGN
                        *
                        *     CHECKS FOR A '+' OR '-', SETS 'Z' BIT.
                        *
334A 80 2B      SIGN       SUB A    #$2B        '+'?
334C 27 07                 BEQ      SIG1        YES
334E 81 02                 CMP A    #2          '-'?
3350 26 04                 BNE      SIG1+1      NO
3352 86 12                 LDA A    #$12        CHS CODE
3354 5F                    CLR B
3355 39         SIG1       RTS
3356 8B 2B                 ADD A    #$2B        RESTORE CHAR
3358 39                    RTS
```

```
                         *
                         *      READX
                         *
                         *      READS AN ASCII NUMBER FROM THE DEVICE INTO
                         *      THE XR.  STACK OPERATION DEPENDENT UPON
                         *      AUTO-STACK FLAG.  NUMBER MUST START WITH A
                         *      DIGIT, DECIMAL, OR SIGN.  TERMINATES WITH
                         *      LF, SECOND DECIMAL, TWO DIGIT EXPONENT OR
                         *      USER DEFINED DELIMETER.  UPON RECEIT OF
                         *      USER 'END' DELIMETER, FLAG #4 IS SET.
                         *      USER PARAMETERS:
                         *        - NONE
                         *
3359 BD 3109 READX  JSR    INIT
335C 4F             CLR A
335D 97 2D          STA A  T2       STATUS FLAG
335F 97 2B          STA A  T4       DECIMAL FLAG
3361 97 2C          STA A  T3       EXPONENT FLAG
3363 97 2A          STA A  T5       NO-LOAD FKAG
3365 4C             INC A
3366 BD 31E7        JSR    BUILD    ENTER A LEADING ZERO
3369 8D 6B   RD1    BSR    INBT     INPUT CHAR
336B 2B 18          BMI    RD3A     STOP KEY
336D 4D             TST A
336E 27 F9          BEQ    RD1      NULL CHARACTER
3370 8D 67          BSR    DELM     DELIMETER?
3372 27 55          BEQ    RD8      YES, ABORT NOW
3374 8D D4          BSR    SIGN
3376 27 04          BEQ    RD3      YES
3378 8D B7          BSR    DIGIT
337A 26 ED          BNE    RD1      NOT A DIGIT
337C D6 2A   RD3    LDA B  T5       NO-LOAD?
337E 26 03          BNE    *+5      YES, IGNOR IT
3380 BD 31E7        JSR    BUILD    ENTER DIGIT
3383 8D 51          BSR    INBT     NEXT CHAR
3385 2B 4C   RD3A   BMI    RD10     STOP KEY
3387 7C 002C        INC    T3       COUNT LAST CHAR
338A 27 37          BEQ    RD7      EXPONENT DONE
338C 8D 4B          BSR    DELM     DELIMETER?
338E 27 39          BEQ    RD8      YES
3390 8D 9F          BSR    DIGIT    VALID DIGIT?
3392 27 E8          BEQ    RD3      YES
3394 D6 2D          LDA B  T2       LOAD STAT FLAG
3396 2B 17          BMI    RD5      EXPONENT BEGUN
3398 81 45          CMP A  #$45     AN 'E'?
339A 26 27          BNE    RD7      NO
339C 96 92          LDA A  XR+2     MANTISSA=ZERO?
339E 26 03          BNE    RD4-2    NO
33A0 4C             INC A
33A1 97 2A          STA A  T5       SET NO-LOAD
33A3 CA 80          ORA B  #$80
33A5 86 11   RD4    LDA A  #$11     EEX CODE
33A7 D7 2D          STA B  T2
33A9 C6 FD          LDA B  #-3
33AB D7 2C          STA B  T3       COUNTER
33AD 20 CD          BRA    RD3
33AF D6 2C   RD5    LDA B  T3
33B1 C1 FE          CMP B  #-2      LEGAL POSITION
33B3 26 0E          BNE    RD7      NO
33B5 8D 93          BSR    SIGN     A SIGN?
33B7 26 0A          BNE    RD7      NO
33B9 D6 2D          LDA B  T2
33BB C5 20          BIT B  #$20     SECOND SIGN?
33BD 26 14          BNE    RD10     YES
33BF CA 20          ORA B  #$20
33C1 20 E4          BRA    RD4+2    CHS
33C3 81 0D   RD7    CMP A  #$D      A CR?
33C5 26 02          BNE    RD8      NO
33C7 8D 0D          BSR    INBT
33C9 A1 04   RD8    CMP A  4,X
33CB 26 06          BNE    RD10     NOT USER DEFINED 'END'
33CD 96 08   RD9    LDA A  UFLG
33CF 8A 08          ORA A  #$8      SET FLAG FOUR
33D1 97 08          STA A  UFLG
33D3 7E 3182 RD10   JMP    EXIT
```

```
3306 7E 32DA INBT   JMP    INBYT


                    *
                    *    DELM
                    *
                    *    LOOKS FOR A DELIMETER IN ACCA.
                    *
33D9 A1 04    DELM   CMP A  4,X
33DB 27 0A           BEQ    DEL1+2    'END'
33DD A1 05           CMP A  5,X
33DF 27 06           BEQ    DEL1+2    TYPE1
33E1 A1 06           CMP A  6,X
33E3 27 02           BEQ    DEL1+2    TYPE2
33E5 81 0A    DEL1   CMP A  #$A       TEST FOR 'LF'
33E7 39              RTS
                    *
                    *    DELIM
                    *
                    *    SETS UP USER SPECIFIED DELIMETERS FOR
                    *    INPUTING NUMBERS (READX).
                    *    USER PARAMETERS:
                    *      XR - FLAG SETTING DELIMETER
                    *      YR - NUMBER DELIMETER #1
                    *      ZR - NUMBER DELIMETER #2
                    *
33E8 BD 3109 DELIM   JSR    INIT
33EB CE 0090         LDX    #XR
33EE BD 3198         JSR    BINRY     CONVERT TO BINARY
33F1 26 1E           BNE    DELM1     RANGE ERROR
33F3 DE 22           LDX    T13
33F5 A7 04           STA A  4,X
33F7 CE 0098         LDX    #YR
33FA BD 3198         JSR    BINRY     CONVERT TO BINARY
33FD 26 12           BNE    DELM1     RANGE ERROR
33FF DE 22           LDX    T13
3401 A7 05           STA A  5,X
3403 CE 00A0         LDX    #ZR
3406 BD 3198         JSR    BINRY     CONVERT TO BINARY
3409 26 06           BNE    DELM1     RANGE ERROR
340B DE 22           LDX    T13
340D A7 06           STA A  6,X
340F 20 C2           BRA    RD10
3411 7E 31B5 DELM1   JMP    WR1       SET ERROR, EXIT
```

SYMBOL TABLE

| | | | | | | | | | | | | | |
|---|---|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 00BA | MT | 7E00 | TERMN7 | 003D | IMED | 0040 | PARCD | 00C0 |
| PAREX | 00B0 | NTBL | 0000 | DOTS | 5EC0 | PRTDRV | 602D | FRMT | 5CA8 | BLANK | 5D75 |
| LDMSG | 57BD | ROLLD | 55B2 | ROLLU | 57F1 | PSD | 55DA | TXL | 55E9 | STKUP | 55EF |
| MAD | 749B | CMP | 74AA | NOR | 74D6 | TXW | 7424 | TXXR | 7438 | EXXR | 7452 |
| ARSR | 753B | OVUNF | 75B6 | OVERF | 75DD | XR0 | 740A | XRNINE | 75C8 | UNDRF | 75F1 |
| IMULT | 76B9 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |
| RECIP | 73E6 | TXRX | 73F3 | CONST | 6800 | FPDBRC | 6898 | TAN | 68A9 | ATN | 69C3 |
| DSZERO | 6A46 | NTLN | 6A58 | EXPN | 6AC9 | SIN | 6B94 | COS | 6B9A | ASIN | 6BF2 |
| ACOS | 6BF7 | PH1 | 6C5D | PH2 | 6C8D | PH3 | 6D34 | PH4 | 6DD0 | LSFT8 | 6E47 |
| SQRT | 6E65 | MAD8 | 6F2C | CMPR | 53E4 | IOUPX | 6F52 | LOG10 | 6FA7 | YUPX | 6FE9 |
| RTOP | 7328 | PTOR | 7386 | TSFR | 49CE | ELIN | 3636 | PWRUP | 3084 | PWR1 | 308F |

```
PWR2   30A6  PWR3   30B2  PWR4   30C0  PWR5   30D5  RDID   30D9  NULL   30E2
SETUP  30E3  INIT   3109  IN1    311D  IN2    3124  IN3    312E  IN4    3134
IN4A   3149  IN4B   3166  IN5    316A  FIELD  3172  EXIT   3182  EX1    3189
BINRY  3198  BIN2   31A8  WBYTE  31AB  WB1    31B5  EROR   31B7  WB4    31BB
WB5    31BE  RBYTE  31C0  BTDEC  31C8  RB1    31CA  RB2    31D7  BUILD  31E7
PRNT   31F6  PRNTX  31FA  PR0    31FE  PR1    320A  PR2    3222  PR4    3230
PR5    323D  PR6    3241  PR7    324C  PR9    325E  PR10   3263  PRINT  3266
OTBYT  3270  OTB1   327D  FFLAG  3286  CHECK  328F  CH1    3296  CH2    329F
STOP   32A8  ST1    32BA  ST2    32C6  HNDSK  32C7  HND1   32D0  INBYT  32DA
INB0   32EB  INB1   32F5  LATCH  32FE  LAT1   3306  FLG    330D  EXXT   3322
DATA   3328  DIGIT  3331  DIG1   333D  DIG2   333F  SIGN   334A  SIG1   3355
READX  3359  RD1    3369  RD3    337C  RD3A   3385  RD4    33A5  RD5    33AF
RD7    33C3  RD8    33C9  RD9    33CD  RD10   33D3  INRT   33D6  DELM   33D9
DEL1   33E5  DELIM  33E8  DELM1  3411

TOTAL ERRORS    1

****ERROR 201
 4   NAM CJBPG

                      OPT    LIST,MEM
      3418            ORG    $3418

                *
                *     EQUATE TABLE
                *

           3109 INIT   EQU    $3109
           3134 IN4    EQU    $3134
           3182 EXIT   EQU    $3182
           3198 BINRY  EQU    $3198
           31B5 WB1    EQU    $31B5
           31C8 BTDEC  EQU    $31C8
           31F6 PRNT   EQU    $31F6
           3270 OTBYT  EQU    $3270
           32DA INBYT  EQU    $32DA
           6489 CHADRS EQU    $6489
           59D9 GIONTR EQU    $59D9
           538F KILL   EQU    $538F
                *
                *     BLIST
                *
                *     LISTS THE PROGRAM IN MACHINE CODE FROM STARTING
                *     ADDRESS (IN XR) TO AN END CODE TO EOPM.
                *     USER MEMORY.  CHECKS FOR PROTECTED MEMORY.
                *     TAPE:  START,FILE LENGTH,FILE,CHECKSUM.
                *     USER PARAMETERS:
                *       XR = STARTING ADDRESS
                *
3418 BD 3109 BLIST  JSR    INIT
341B 8D 55          BSR    LEGL       LEGAL CALL?
341D CE 0000        LDX    #0
3420 DF 18          STX    TP3
3422 DF 16          STX    TP2        ZERO
3424 8D 58          BSR    PADRS      STARTING ADDRESS
3426 86 B1          LDA A  #$B1
3428 7C 0019 BL1    INC    TP3S       COUNT RECORD LENGTH
342B 26 03          BNE    BL1+8
342D 7C 0018        INC    TP3
3430 A1 00          CMP A  0,X        CHECK THE ISNTR
3432 27 05          BEQ    BL2        END CODE
3434 08             INX
3435 9C 0B          CPX    EOPM
3437 26 EF          BNE    BL1        CONTINUE
3439 86 C3   BL2    LDA A  #$C3
343B 8D 32          BSR    OTBT1      OUT START CODE
343D 96 18          LDA A  TP3
343F 8D 2E          BSR    OTBT1      OUT RECORD LENGTH
3441 96 19          LDA A  TP3S
3443 8D 2A          BSR    OTBT1
3445 DE 20   BL3    LDX    TP7        LOAD ADDRESS
```

```
3447 A6 00          LDA A   0.X       NOW THE INSTRUCTION
3449 5F             CLR B
344A 9B 17          ADD A   TP2S      CHECKSUM
344C D9 16          ADC B   TP2
344E 97 17          STA A   TP2S
3450 D7 16          STA B   TP2
3452 A6 00          LDA A   0.X       BYTE AGAIN
3454 8D 19          BSR     OTBT1     OUT IT
3456 2B 14          BMI     EXT
3458 DE 20          LDX     TP7
345A 08             INX               BUMP POINTER
345B DF 20          STX     TP7
345D DE 18          LDX     TP3
345F 09             DEX               COUNT INSTRUCTIONS
3460 DF 18          STX     TP3
3462 26 E1          BNE     BL3       NOT DONE
3464 96 16    BL6   LDA A   TP2
3466 8D 07          BSR     OTBT1
3468 96 17          LDA A   TP2S
346A 8D 03          BSR     OTBT1
346C 7E 3182 EXT    JMP     EXIT
346F 7E 3270 OTBT1  JMP     OTBYT


              *
              *    LEGL
              *
3472 96 D5    LEGL  LDA A   FLAG
3474 46             ROR A
3475 24 1F          BCC     PAD1      NOT DECURED
3477 86 16    LEG1  LDA A   #22
3479 31             INS
347A 31             INS               BUMP STACK
347B 7E 31B7        JMP     WB1+2     SET ERROR. EXIT


              *
              *    PADRS
              *
347E CE 0090 PADRS  LDX     #XR
3481 BD 319C        JSR     BINRY+4    CONVERT TO BINARY
3484 D6 90          LDA B   XR        EXPONENT
3486 C1 03          CMP B   #3        WITHIN RANGE?
3488 2E 0D          BGT     PAD1+1    NO. ILLEGAL
348A D6 20          LDA B   TP7       MSP
348C 5C             INC B
348D D7 20          STA B   TP7
348F DE 20          LDX     TP7       LOAD ADDRESS
3491 BD 6489        JSR     CHADRS    CHECK AGAINST EOPM
3494 2A 01          BPL     PAD1+1    ILLEGAL
3496 39       PAD1  RTS
3497 86 18          LDA A   #24
3499 20 DE          BRA     LEG1+2    SET ERROR
              *
              *    ASCII
              *
              *    FORMATS INSTRUCTION IN OUTPUT BUFFER
              *    CHECKS FOR SPECIAL CASES AND FIXED ILLEGAL CHARS.
              *
349B DE C8    ASCII LDX     UPP
349D A6 00          LDA A   0.X       LOAD INSTR
349F 97 68          STA A   REAL
34A1 4F             CLR A
34A2 BD 59D9        JSR     GIONTR    BUILD ASCII
34A5 5F             CLR B
34A6 96 CC          LDA A   ALPHA     ASCII STRING?
34A8 26 1F          BNE     ASC1A     YES
34AA 96 68          LDA A   REAL
34AC CE 5049        LDX     #$5049
34AF 81 17          CMP A   #$17
34B1 26 02          BNE     ASC1      NOT PI
34B3 DF 5D          STX     BUFF+5
34B5 81 12    ASC1  CMP A   #$12
```

```
34B7 27 44           BEQ    INSRT+4    CHS
34B9 81 15           CMP A  #$15
34BB 27 3F           BEQ    INSRT+3    XEY
34BD 81 34           CMP A  #$34
34BF 27 3A           BEQ    INSRT+2    X=Y?
34C1 81 35           CMP A  #$35
34C3 27 35           BEQ    INSRT+1    X<Y?
34C5 81 36           CMP A  #$36
34C7 27 30           BEQ    INSRT      X>=Y?
34C9 CE 005D ASC1A   LDX    #BUFF+5
34CC 86 0A           LDA A  #10
34CE 97 14           STA A  TP1        COUNTER
34D0 A6 00   ASC2    LDA A  0,X
34D2 81 5B           CMP A  #$5B
34D4 27 1C           BEQ    ASC3+5     DIVIDE
34D6 81 5C           CMP A  #$5C
34D8 27 1A           BEQ    ASC3+7     RIGHT ARROW
34DA 81 5F           CMP A  #$5F
34DC 27 10           BEQ    ASC3+1     DOWN ARROW
34DE 81 68           CMP A  #$68
34E0 27 0E           BEQ    ASC3+3     'ALPHA'
34E2 81 22           CMP A  #$22
34E4 27 07           BEQ    ASC3       LOWER CASE 'E'
34E6 08              INX
34E7 7A 0014         DEC    TP1
34EA 26 E4           BNE    ASC2
34EC 39              RTS
34ED 5C      ASC3    INC B             STUFF 'E'
34EE CB 04           ADD B  #4         STUFF 'D'
34F0 CB 11           ADD B  #$11       STUFF '@'
34F2 CB 02           ADD B  #2         STUFF '/'
34F4 CB 2D           ADD B  #$2D       STUFF '-'
34F6 E7 00           STA B  0,X
34F8 39              RTS
                     *
                     *   INSRT
                     *
                     *   INSERTS EXCEPTION ASCII FOR LISTINGS
                     *
34F9 5C      INSRT   INC B
34FA 5C              INC B
34FB 5C              INC B
34FC 5C              INC B
34FD CE 37DF         LDX    #LTAB      TALE BASE ADDRESS
3500 DF 16           STX    TP2
3502 17              TBA
3503 48              ASL A
3504 1B              ABA
3505 48              ASL A
3506 9B 17           ADD A  TP2+1
3508 97 17           STA A  TP2+1      SET POINTER
350A CE 005D         LDX    #BUFF+5
350D DF 14           STX    TP1
350F C6 06           LDA B  #6
3511 DE 16   INS1    LDX    TP2
3513 A6 00           LDA A  0,X
3515 08              INX
3516 DF 16           STX    TP2
3518 DE 14           LDX    TP1
351A A7 00           STA A  0,X
351C 08              INX
351D DF 14           STX    TP1
351F 5A              DEC B
3520 26 EF           BNE    INS1
3522 39              RTS


                     *
                     *   LABL
                     *
                     *   FORMULATES THE SECOND HALF OF A LABEL
                     *   FOR LISTING ROUTINES.  DOES BOTH ALPHA
                     *   AND NUMBER LABELS.
                     *
```

```
3523 86 2D   LABL   LDA A  #$2D      DASH
3525 8D 1F          BSR    BLNK
3527 DE C8          LDX    UPP
3529 A6 00          LDA A  0,X       INSTRUCTION
352B 80 63          SUB A  #$63      SUBTRACT ASCII BIAS
352D 23 05          BLS    LAB2      A NUMBER LABEL
352F 8B 40          ADD A  #$40      RESTORE
3531 97 5D          STA A  BUFF+5
3533 39             RTS
3534 8B 63   LAB2   ADD A  #$63      RESTORE BIAS
3536 5F             CLR B
3537 5A             DEC B
3538 5C      LAB3   INC B
3539 80 0A          SUB A  #10       TENS
353B 2C FB          BGE    LAB3
353D 8B 3A          ADD A  #$3A
353F CB 30          ADD B  #$30
3541 D7 5D          STA B  BUFF+5
3543 97 5E          STA A  BUFF+6
3545 39             RTS


             *
             *   BLNK
             *
             *    STUFFS BLANKS IN THE OUTPUT BUFFER, EXCEPT
             *    THE FIRST FOUR CHARACTERS WHICH ARE
             *    SPECIFIED BY PASSING THE DESIRED CHARACTER
             *    IN ACCA.
             *
3546 BD 5D75 BLNK   JSR    BLANK     CLEAR BUFFER
3549 97 58          STA A  BUFF
354B 97 59          STA A  BUFF+1    SPECIAL CHAR
354D 97 5A          STA A  BUFF+2
354F 97 5B          STA A  BUFF+3
3551 39      BLN1   RTS


             *
             *   LIST
             *
             *   LISTS THE PROGRAM ON THE PERIPHERIAL IN FOUR
             *   COLUMNS, FIFTY LINES PER COLUMN.
             *   ROUTINE STOPS AFTER EACH PAGE.
             *   -NOTE:  PROGRAM POINTER MAY BE RETURNED
             *   ON AN ILLEGAL ADDRESS BOUNDRY.
             *   USER PARAMETERS:
             *     - NONE
             *
3552 BD 3109 LIST   JSR    INIT
3555 96 82          LDA A  AT2+2     RUNNING?
3557 27 03          BEQ    COL0-3    NO
3559 7E 3633        JMP    XIT       YES, ABORT
355C BD 3472        JSR    LEGL      SECURED?
355F 5F      COL0   CLR B
3560 DE C8          LDX    UPP
3562 A6 00   COL1   LDA A  0,X       INSTRUCTION
3564 5C             INC B
3565 81 B1          CMP A  #$B1
3567 27 0A          BEQ    COL2      END CODE
3569 C1 C8          CMP B  #200
356B 27 06          BEQ    COL2      200 STATES
356D 08             INX
356E 9C 0B          CPX    EOPM
3570 26 F0          BNE    COL1      NO OVERFLOW
3572 09             DEX              BACK UP
3573 D7 6F   COL2   STA B  REAL+7    TOTAL COUNT TO OUT
3575 DF 74          STX    IMAG+4    LAST INSTRUCTION ADDRESS
3577 DE C8          LDX    UPP
3579 09             DEX
357A DF 70          STX    IMAG      COLUMN ONE POINTER
357C 4F      COL6   CLR A
357D 97 6D          STA A  REAL+5    COLUMN FLAG
```

```
00488 357F DE 70            LDX     IMAG
00489 3581 08               INX
00490 3582 DF 70            STX     IMAG      BUMP COLUMN ONE
00491 3584 DF 72            STX     IMAG+2    CUPENT BACK TO ONE
00492 3586 DE 72    COL7    LDX     IMAG+2    GET CURRENT POINTER
00493 3588 DF C8            STX     UPP       SET INSTR POINTER
00494 358A 09               DEX
00495 358B A6 00            LDA A   0,X       PREVIOUS BYTE
00496 358D 81 BA            CMP A   #$BA
00497 358F 23 12            BLS     COL8      SINGLE BYTE INSTR.
00498 3591 97 6C    COL7A   STA A   REAL+4    SAVE
00499 3593 86 2A            LDA A   #$2A      '*'
00500 3595 BD 3546          JSR     BLNK
00501 3598 96 6C            LDA A   REAL+4
00502 359A 81 BF            CMP A   #$BF
00503 359C 26 2A            BNE     COL9      NOT A LABEL
00504 359E BD 3523          JSR     LABL      LABEL
00505 35A1 20 25            BRA     COL9
00506 35A3 7F 00CC  COL8    CLR     ALPHA     CLEAR ALPHA FLAG
00507 35A6 A6 01            LDA A   1,X
00508 35A8 81 BE            CMP A   #$BE
00509 35AA 27 19            BEQ     COL8B     FORMAT THIS ONE, OK
00510 35AC A6 01    COL8A   LDA A   1,X       LOAD INSTR
00511 35AE 8C 00FE          CPX     #$FE
00512 35B1 27 12            BEQ     COL8B     START OF PROGRAM, OK
00513 35B3 81 B4            CMP A   #$B4
00514 35B5 27 0E            BEQ     COL8B     ALPHA TERMINATOR, OK
00515 35B7 09               DEX               BACK UP TO PREVIOUS
00516 35B8 81 BE            CMP A   #$BE
00517 35BA 26 F0            BNE     COL8A     NOT A FORMAT, AGAIN
00518 35BC A6 03            LDA A   3,X       SECOND BYTE OF CALL INSTR
00519 35BE 85 0F            BIT A   #$F
00520 35C0 26 03            BNE     COL8B     NOT AN ALPHA STRING
00521 35C2 7C 00CC          INC     ALPHA     SET ALPHA FLAG
00522 35C5 BD 3498  COL8B   JSR     ASCII     INSTRUCTION ASCII
00523 35C8 8D 75    COL9    BSR     STNG      OUT ENTIRE BUFFER
00524 35CA 96 72            LDA A   IMAG+2
00525 35CC D6 73            LDA B   IMAG+3    CURRENT POINTER
00526 35CE CB 32            ADD B   #50       ADD COLUMN LENGTH
00527 35D0 89 00            ADC A   #0        CARRY IF NEEDED
00528 35D2 97 72            STA A   IMAG+2    NEW POINTER
00529 35D4 D7 73            STA B   IMAG+3
00530 35D6 7A 006F          DEC     REAL+7
00531 35D9 27 2B            BEQ     COL10A    DONE WITH PAGE
00532 35DB 7C 006D          INC     REAL+5
00533 35DE 96 6D            LDA A   REAL+5
00534 35E0 81 04            CMP A   #4
00535 35E2 27 1D            BEQ     COL10     DONE WITH LINE
00536 35E4 96 72            LDA A   IMAG+2
00537 35E6 91 74            CMP A   IMAG+4    UPPER HALF OF POINTER
00538 35E8 25 0A            BCS     COL9A     LIMIT OK
00539 35EA 26 15            BNE     COL10     TOO FAR, PARTIAL LINE
00540 35EC 96 73            LDA A   IMAG+3
00541 35EE 91 75            CMP A   IMAG+5    CHECK LOWER HALF
00542 35F0 27 02            BEQ     COL9A     WITHIN BOUNDS
00543 35F2 24 0D            BCC     COL10     PARTIAL LINE OUT
00544 35F4 86 20    COL9A   LDA A   #$20
00545 35F6 8D 44            BSR     OTBT2
00546 35F8 86 20            LDA A   #$20      TWO BLANKS
00547 35FA 8D 40            BSR     OTBT2
00548 35FC 2B 21            BMI     COL11     STOP KEY
00549 35FE 7E 3586          JMP     COL7      NEXT COLUMN
00550 3601 8D 33    COL10   BSR     ELIN      END OF LINE
00551 3603 7E 357C          JMP     COL6      NEXT LINE
00552 3606 8D 2E    COL10A  BSR     ELIN      EDN OF LINE
00553 3608 DE 74            LDX     IMAG+4
00554 360A A6 00            LDA A   0,X       LAST CODE
00555 360C 81 B1            CMP A   #$B1
00556 360E 27 0F            BEQ     COL11     END CODE, EXIT
00557 3610 08               INX
00558 3611 DF C8            STX     UPP       SET NEW LIST START
00559 3613 9C 08            CPX     EOPM      END OF MEMORY?
00560 3615 27 16            BEQ     COL13-1    YES
00561 3617 3E               WAI               WAIT FOR CONTINUE KEY
00562 3618 96 09            LDA A   RSFLG     STOP KEY?
```

```
361A 2A 03             BPL     COL11      YES
361C 7E 355F           JMP     COL0       NEXT PAGE
361F DE 74    COL11    LDX     IMAG+4
3621 A6 00             LDA A   0,X
3623 81 BA             CMP A   #$BA
3625 23 01             BLS     COL12      ONE BYTE INSTRUCTION
3627 08                INX
3628 08       COL12    INX
3629 9C 08             CPX     EOPM       END OF MEMORY
362B 26 01             BNE     COL13
362D 09                DEX                YES
362E DF C8    COL13    STX     UPP        SET PROGRAM POINTER
3630 7F 00CC           CLR     ALPHA
3633 7E 3182  XIT      JMP     EXIT       DONE



3636 86 0D    ELIN     LDA A   #$D        CR
3638 8D 02             BSR     OTBT2
363A 86 0A             LDA A   #$A        LF
363C 7E 3270  OTBT2    JMP     OTBYT
              *
              *   STNG
              *
              *   OUTPUTS THE ENTIRE BUFFER TO PERIPHERIAL.
              *
363F CE 0058  STNG     LDX     #BUFF
3642 DF 14             STX     TP1
3644 A6 00    STN1     LDA A   0,X
3646 08                INX
3647 DF 14             STX     TP1
3649 8D F1             BSR     OTBT2      OUT CHAR
364B DE 14             LDX     TP1
364D 8C 0068           CPX     #BUFF+16    DONE?
3650 26 F2             BNE     STN1       NO
3652 39                RTS



              *
              *   READB
              *
              *   READS BINARY TAPE OF PROGRAM INTO MACHINE.  FORMAT
              *   SAME OF BINARY LIST.
              *   USER PARAMETERS:
              *     - NONE
              *
3653 BD 3109  READB    JSR     INIT       INITIALIZE
3656 CE 0000           LDX     #0
3659 DF 18             STX     TP3
365B BD 347E           JSR     PADRS      STARTING ADDRESS
365E 8D 46    BRD2     BSR     INBT1
3660 2B 41             BMI     BRD6       STOP KEY
3662 81 C3             CMP A   #$C3
3664 26 F8             BNE     BRD2       LOOK FOR START CODE
3666 8D 3E             BSR     INBT1
3668 97 16             STA A   TP2        SET RECORD LENGTH
366A 8D 3A             BSR     INBT1
366C 97 17             STA A   TP2S
366E 8D 36    BRD3     BSR     INBT1
3670 2B 29             BMI     BRD4A-4     STOP KEY
3672 DE 20             LDX     TP7
3674 9C 08             CPX     EOPM
3676 27 27             BEQ     BRD4A
3678 A7 00             STA A   0,X        STUFF CODE
367A 08                INX                BUMP
367B DF 20             STX     TP7
367D 5F                CLR B
367E 9B 19             ADD A   TP3S
3680 D9 18             ADC B   TP3        CALCULATE CHECKSUM
3682 97 19             STA A   TP3S
3684 D7 18             STA B   TP3
3686 DE 16             LDX     TP2
3688 09                DEX                COUNT RECORD LENGTH
3689 DF 16             STX     TP2
368B 26 E1             BNE     BRD3       NOT DONE YET
```

```
3680 8D 17    BRD4   BSR    INBT1
368F 97 1A           STA A  TP4      GET DEVICE CHECKSUM
3691 8D 13           BSR    INBT1
3693 97 1B           STA A  TP4S
3695 DE 1A           LDX    TP4
3697 9C 18           CPX    TP3      COMPARE THEM
3699 27 08           BEQ    BRD6     NO ERROR
369B 86 0E           LDA A  #14
369D 20 02           BRA    BRD4A+2
369F 86 07    BRD4A  LDA A  #7
36A1 97 06           STA A  ERROR    MEMORY OVERFLOW
36A3 7E 3182 BRD6    JMP    EXIT     DONE


36A6 7E 32DA INBT1   JMP    INBYT


              *
              *    STRING
              *
              *    OUTPUTS AN ASCII STRING TO PERIPHERIAL.  MAY
              *    CONTAIN PRINT KEY CODES FOR OUTING THE XR.
              *    USER PARAMETERS:
              *      - NONE
              *
36A9 BD 3109 STRING JSR     INIT
36AC 96 68           LDA A  REAL     POSSIBLE CHARACTER
36AE D6 82           LDA B  AT2+2
36B0 26 06           BNE    STR0     PROGRAM EXECUTION
36B2 81 B4           CMP A  #$B4     TERMINATOR?
36B4 27 26           BEQ    STR5     YES
36B6 20 0A           BRA    STR1A    KEYBOARD ENTRY
36B8 DE CA    STR0   LDX    UIP
36BA 08              INX             STRING POINTER
36BB 08              INX
36BC DF 69           STX    REAL+1
36BE 8D 22    STR1   BSR    GETCR    GET A CHAR
36C0 27 16           BEQ    STR4     END OF STRING
36C2 81 B2    STR1A  CMP A  #$B2
36C4 26 05           BNE    STR2     NOT A PRINT
36C6 BD 31F6         JSR    PRNT     OUT XR
36C9 20 02           BRA    STR2A
36CB 8D 24    STR2   BSR    OUTCR    OUT IT
36CD 96 82    STR2A  LDA A  AT2+2
36CF 27 D2           BEQ    BRD6     KEYBOARD ENTRY
36D1 5D              TST B
36D2 27 EA           BEQ    STR1     CONTINUE
36D4 8D 0C    STR3   BSR    GETCR    END OF STRING?
36D6 26 FC           BNE    STR3     NOT AN END CODE
36D8 09       STR4   DEX
36D9 09              DEX             FIX POINTER
36DA DF CA           STX    UIP      SET INSTRUCTION POINTER
36DC DE 22    STR5   LDX    T13
36DE 6F 07           CLR    7.X      CLEAR SHIFT KEY
36E0 20 C1           BRA    BRD6     DONE

              *
              *    GETCR
              *
36E2 DE 69    GETCR  LDX    REAL+1
36E4 A6 00           LDA A  0.X
36E6 08              INX
36E7 DF 69           STX    REAL+1
36E9 81 B4           CMP A  #$B4
36EB 27 03           BEQ    GET1
36ED 09              DEX
36EE 9C 08           CPX    EOPM
36F0 39       GET1   RTS

              *
              *    OUTCR
              *
36F1 DE 22    OUTCR  LDX    T13
```

```
36F3 81 03            CMP A   #3         SHIFT KEY?
36F5 26 08            BNE     OUT1       NO
36F7 86 80            LDA A   #$80
36F9 A8 07            EOR A   7,X        TOGGLE SHIFT BIT
36FB A7 07            STA A   7,X
36FD 5F               CLR B
36FE 39               RTS
36FF 81 02    OUT1    CMP A   #2         LINE?
3701 26 03            BNE     OUT2       NO
3703 7E 3636          JMP     ELIN
3706 81 01    OUT2    CMP A   #1         TAB?
3708 26 02            BNE     OUT2A      NO
370A 8B 08            ADD A   #8
370C 6D 07    OUT2A   TST     7,X        SHIFTED KEYBORD?
370E 2A 1B            BPL     OUT6       NO
3710 81 40            CMP A   #@100      LETTER?
3712 23 04            BLS     OUT3       NO
3714 81 5A            CMP A   #@132      LETTER?
3716 23 11            BLS     OUT5+2     YES
3718 CE 37BF  OUT3    LDX     #TBL       TABLE ADDRESS
371B C6 10            LDA B   #16        TABLE SIZE
371D A1 00    OUT4    CMP A   0,X        FOUND MATCH?
371F 27 06            BEQ     OUT5       YES
3721 08               INX
3722 08               INX                NEXT ENTRY
3723 5A               DEC B              END OF TABLE?
3724 26 F7            BNE     OUT4       NO
3726 39               RTS
3727 A6 01    OUT5    LDA A   1,X        LOAD SHIFTED CHAR
3729 8B 20            ADD A   #@40       ADD BIAS
372B 7E 3270  OUT6    JMP     OTBYT      OUT CHARACTER
              *
              *     AND - OR
              *
              *     PREFORMS THE BINARY OPERATION ON THE X AND Y REG.
              *     CONVERTS TO BINARY, OPERATES, AND BACK TO DECIMAL.
              *     USER PARAMETERS:
              *       XR - NUMBER (0<=#<256)
              *       YR - NUMBER (0<=#<256)
              *
372E 4C       ANDXY   INC A
372F 97 2E    ORXY    STA A   T1         SET OPERATION FLAG
3731 BD 3109          JSR     INIT
3734 CE 0090          LDX     #XR
3737 BD 3198          JSR     BINRY      CONVERT XR TO BINARY
373A 26 21            BNE     AN3        ERROR
373C 97 2D            STA A   T2         SAVE
373E CE 0098          LDX     #YR
3741 BD 3198          JSR     BINRY      CONVERT YR TO BINARY
3744 26 17            BNE     AN3        ERROR
3746 97 2C            STA A   T3         SAVE
3748 BD 55DA          JSR     PSD        FIX STACK
374B 96 2D            LDA A   T2         ONE OPERAND
374D D6 2E            LDA B   T1         FLAG
374F 26 04            BNE     AN1        AND OPERATION
3751 9A 2C            ORA A   T3
3753 20 02            BRA     AN1+2
3755 94 2C    AN1     AND A   T3
3757 7F 000D          CLR     STKFLG
375A 7E 31C8          JMP     BTDEC      BACK TO DECIMAL
375D 7E 31B5  AN3     JMP     WB1        ERROR, EXIT
              *
              *     ROT
              *
              *     PEFORMS A RIGHT ROTATE ON THE BINARY EQUIVALENT
              *     OF THE NUMBER IN THE XR.
              *     USER PARAMETERS:
              *       XR - NUMBER (0<=#<256)
              *
3760 BD 3109  ROTX    JSR     INIT
3763 CE 0090          LDX     #XR
3766 BD 3198          JSR     BINRY      CONVERT XR TO BINARY
3769 26 F2            BNE     AN3        ERROR
376B 44               LSR A
376C 24 02            BCC     ROT1
```

```
3376E 8A 80           ORA A   #$80
3770 20 E5    ROT1    BRA     AN1+2

                *
                *     INTAP
                *
                *     ROUTINE CALED BY MAINFRAME FOR LOADING
                *     SPECIAL PROGRAMS FROM PAPER TAPE.
                *
3772 BD 3134  INTAP   JSR     IN4         CHANNEL A!!
3775 7F 0021          CLR     TP7+1       CLEAR CHECKSUM
3778 8D 2F    INT1    BSR     INCHR       READ CHAR
377A 97 1E            STA A   TP6         SET PAGE
377C 97 54            STA A   SPGM        NULL?
377E 27 F8            BEQ     INT1        YES, LEADER
3780 8D 27            BSR     INCHR
3782 97 1F            STA A   TP6+1       PROGRAM ADDRESS
3784 97 55            STA A   SPGM+1
3786 8D 21    INT2    BSR     INCHR
3788 97 20            STA A   TP7         BLOCK COUNT, ZERO?
378A 27 1A            BEQ     INT5        YES, END OF TAPE
378C 8D 18    INT3    BSR     INCHR       READ INSTR CODE
378E DE 1E            LDX     TP6
3790 A7 00            STA A   0,X         STUFF MPU INSTR
3792 08               INX
3793 DF 1E            STX     TP6
3795 7A 0020          DEC     TP7         DONE WITH BLOCK?
3798 26 F2            BNE     INT3        NO
379A 8D 0D            BSR     INCHR       READ CHECKSUM
379C 5D               TST B               ERROR?
379D 27 E7            BEQ     INT2        NO
379F BD 538F  INT4    JSR     KILL        ERASE MEMORY
37A2 86 0E            LDA A   #14
37A4 97 06            STA A   ERROR       SET ERROR CODE
37A6 7E 3182  INT5    JMP     EXIT        DONE
                *
                *     INCHR
                *
37A9 BD 32DA  INCHR   JSR     INBYT       INPUT A BYTE
37AC 2B 06            BMI     INC1        STOP KEY, ABORT
37AE 16               TAB
37AF DB 21            ADD B   TP7+1       UPDATE CHECKSUM
37B1 D7 21            STA B   TP7+1
37B3 39               RTS
37B4 31       INC1    INS                 BUMP RETURN STACK
37B5 31               INS
37B6 20 E7            BRA     INT4        OUT ERROR
37BF                  ORG     $37BF
                *
                *     SHIFTED CHARACTER TABLE
                *
                      OPT     NG
37BF 20       TBL     FCB     @40,@40-@40
37C1 23               FCB     @43,@137-@40
37C3 24               FCB     @44,@134-@40
37C5 25               FCB     @45,@174-@40
37C7 27               FCB     @47,@42-@40
37C9 28               FCB     @50,@133-@40
37CB 29               FCB     @51,@135-@40
37CD 2C               FCB     @54,@140-@40
37CF 2E               FCB     @56,@12-@40
37D1 30               FCB     @60,@15-@40
37D3 3A               FCB     @72,@73-@40
37D5 3C               FCB     @74,@173-@40
37D7 3D               FCB     @75,@176-@40
37D9 3E               FCB     @76,@175-@40
37DB 3F               FCB     @77,@41-@40
37DD 40               FCB     @100,@46-@40
                      OPT     G
                *
                *     LIST EXCEPTION TABLE
                *
                      OPT     NG
```

```
37DF 43           LTAB   FCB    $43,$48,$52,$20,$20,$20     CHS
37E5 58                  FCB    $58,$45,$59,$20,$20,$20     XEY
37EB 58                  FCB    $58,$3D,$59,$20,$3F,$20     X=Y ?
37F1 58                  FCB    $58,$3C,$59,$20,$3F,$20     X<Y ?
37F7 58                  FCB    $58,$3E,$3D,$59,$20,$3F     X>=Y ?
                         OPT    G


                  *
                  *      ENTRY FOR SPECIAL PROGRAM LOADING.
                  *
37FD                     ORG    $37FD
37FD 7E 3772             JMP    INTAP


                  *
                  *      ADDRESS TABLE
                  *
3005                     ORG    $3005
3005 36A9                FDB    STRING
3015                     ORG    $3015
3015 372E                FDB    ANDXY
3017 372F                FDB    ORXY
3019 3760                FDB    ROTX
301B 3552                FDB    LIST
301D 3653                FDB    READB
301F 3418                FDB    BLIST
```

SYMBOL TABLE

| | | | | | | | | | | | | | |
|---|---|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 00BA | MT | 7E00 | TERMN7 | 003D | IMED | 0040 | PARCD | 00C0 |
| PAREX | 0080 | NTBL | 0000 | DOTS | 5EC0 | PRTDRV | 602D | FRMT | 5CA8 | BLANK | 5D75 |
| LDMSG | 57BD | ROLLD | 55B2 | ROLLU | 57F1 | PSD | 55DA | TXL | 55E9 | STKUP | 55EF |
| MAD | 749B | CMP | 74AA | NOR | 74D6 | TXW | 7424 | TXXR | 743B | EXXR | 7452 |
| ARSR | 753B | OVUNF | 75B6 | OVERF | 75DD | XR0 | 740A | XRNINE | 75C8 | UNDRF | 75F1 |
| IMULT | 76B9 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |
| RECIP | 73E6 | TXRX | 73F3 | CONST | 6800 | FPDBRC | 6898 | TAN | 68A9 | ATN | 69C3 |
| DSZERO | 6A46 | NTLN | 6A58 | EXPN | 6AC9 | SIN | 6B94 | COS | 6B9A | ASIN | 6BF2 |
| ACOS | 6BF7 | PH1 | 6C5D | PH2 | 6C8D | PH3 | 6D34 | PH4 | 6DD0 | LSFT8 | 6E47 |
| SQRT | 6E65 | MAD8 | 6F2C | CMP8 | 53E4 | IOUPX | 6F52 | LOG10 | 6FA7 | YUPX | 6FE9 |
| RTOP | 7328 | PTOR | 7386 | INIT | 3109 | IN4 | 3134 | EXIT | 3182 | BINRY | 3198 |
| WB1 | 31B5 | BTDEC | 31C8 | PRNT | 31F6 | OTBYT | 3270 | INBYT | 32DA | CHADRS | 6489 |
| GIONTR | 59D9 | KILL | 538F | BLIST | 3418 | BL1 | 3428 | BL2 | 3439 | BL3 | 3445 |
| BL6 | 3464 | EXT | 346C | OTBT1 | 346F | LEGL | 3472 | LEG1 | 3477 | PADRS | 347E |
| PAD1 | 3496 | ASCII | 349B | ASC1 | 34B5 | ASC1A | 34C9 | ASC2 | 34D0 | ASC3 | 34ED |
| INSRT | 34F9 | INS1 | 3511 | LABL | 3523 | LAB2 | 3534 | LAB3 | 3538 | BLNK | 3546 |
| BLN1 | 3551 | LIST | 3552 | COL0 | 355F | COL1 | 3562 | COL2 | 3573 | COL6 | 357C |
| COL7 | 3586 | COL7A | 3591 | COL8 | 35A3 | COL8A | 35AC | COL8B | 35C5 | COL9 | 35C8 |
| COL9A | 35F4 | COL10 | 3601 | COL10A | 3606 | COL11 | 361F | COL12 | 3628 | COL13 | 362E |
| XIT | 3633 | ELIN | 3636 | OTBT2 | 363C | STNG | 363F | STN1 | 3644 | READB | 3653 |
| BRD2 | 365E | BRD3 | 366E | BRD4 | 368D | BRD4A | 369F | BRD6 | 36A3 | INBT1 | 36A6 |
| STRING | 36A9 | STR0 | 36B8 | STR1 | 36BE | STR1A | 36C2 | STR2 | 36CB | STR2A | 36CD |
| STR3 | 36D4 | STR4 | 36D8 | STR5 | 36DC | GETCR | 36E2 | GET1 | 36F0 | OUTCR | 36F1 |
| OUT1 | 36FF | OUT2 | 3706 | OUT2A | 370C | OUT3 | 3718 | OUT4 | 371D | OUT5 | 3727 |
| OUT6 | 372B | ANDXY | 372E | ORXY | 372F | AN1 | 3755 | AN3 | 375D | ROTX | 3760 |
| ROT1 | 3770 | INTAP | 3772 | INT1 | 3778 | INT2 | 3786 | INT3 | 378C | INT4 | 379F |
| INT5 | 37A6 | INCHR | 37A9 | INC1 | 37B4 | TBL | 37BF | LTAB | 37DF | | |

TOTAL ERRORS 1

```
                        OPT     LIST,MEM
                *
                **
                ***     CJ PLOTTER ROM
                ***     REV  01
                ***     TIM HICKENLOOPER
                ***     MARCH 1975
                **
                *

3800                    ORG     $3800


3800 10                 FCB     $10,$10   ROM ID #'S
3801 10
3802 7E 3B3C            JMP     PWRUP
3805 3923               FDB     NULL      WRITE
3807 38D4               FDB     PLOT
3809 3B83               FDB     PEN
380B 38E7               FDB     IPLOT
380D 38CA               FDB     MOVE
380F 3923               FDB     NULL      DGTZR - UP
3811 3875               FDB     SCALE
3813 39B4               FDB     XAXIS
3815 39BC               FDB     YAXIS
3817 3BA7               FDB     DRAW
3819 3923               FDB     NULL      DGTZR - DOWN
381B 3923               FDB     NULL      PRNTX
381D 3923               FDB     NULL      CSIZE
381F 3923               FDB     NULL      EXIT
3821 3923               FDB     NULL      DGTZR - LEFT
3823 3923               FDB     NULL      DGTZR - RIGHT


                *
                *     EQUATE TABLE
                *

     3FF4       C1      EQU     $3FF4
     3F4D       C2      EQU     $3F4D
                *
                *     LISTING ASCII
                *
                        OPT     NG
3825 D0                 FCB     $D0,$4C,$4F,$54,$68   PLOT "ALPHA"
382A D0                 FCB     $D0,$4C,$4F,$54,$20   PLOT
382F D0                 FCB     $D0,$45,$4E,$5E,$20   PEN^
3834 C9                 FCB     $C9,$50,$4C,$4F,$54   IPLOT
3839 CD                 FCB     $CD,$4F,$56,$45,$20   MOVE
383E C4                 FCB     $C4,$47,$54,$5A,$52   DGTZR
3843 D3                 FCB     $D3,$43,$41,$4C,$45   SCALE
3848 D8                 FCB     $D8,$41,$58,$49,$53   XAXIS
384D D9                 FCB     $D9,$41,$58,$49,$53   YAXIS
3852 C4                 FCB     $C4,$52,$41,$57,$2B   DRAW+
3857 C4                 FCB     $C4,$47,$54,$5A,$52   DGTZR
385C D0                 FCB     $D0,$52,$4E,$54,$58   PRNTX
3861 C3                 FCB     $C3,$53,$49,$5A,$45   CSIZE
3866 C5                 FCB     $C5,$58,$49,$54,$20   EXIT
386B C4                 FCB     $C4,$47,$54,$5A,$52   DGTZR
3870 C4                 FCB     $C4,$47,$54,$5A,$52   DGTZR
                        OPT     G
                *
                *     SCALE
                *
                *     ESTABLISHES FULL SCALE VALUES IN USER UNITS FOR THE
                *     PLOTTER.  THE PLOTTER LIMITS ARE ZERO TO 9999.
                *     SCALE FACTOR = (9999)/((USER MAX)-(USER MIN)).
                *     ORIGIN OFFSET = -(USER MIN)*(SCALE FACTOR).
                *     THESE ARE SAVED IN THE FIRST FOUR PLOTTER REGISTERS:
                *     X-SCALE FACTOR, Y-SCALE FACTOR, X-OFFSET, Y-OFFSET.
                *     USER PARAMETERS:
                *         XR - YMAX
                *         YR - YMIN
                *         ZR - XMAX
                *         TR - XMIN
```

```
                 *
3875 BD 3924 SCALE  JSR    INIT       INITIALIZE
3878 8D 49          BSR    ADJST
387A CE 0098 SC1    LDX    #YR
387D BD 75F6        JSR    FPS        MAX-MIN
3880 8D 3A          BSR    NEGXR
3882 96 92          LDA A  XR+2
3884 27 04          BEQ    SC2        ZERO RESULT
3886 96 91          LDA A  XR+1
3888 2A 06          BPL    SC3        POSITIVE NUMBER
388A 86 06    SC2   LDA A  #6
388C 97 06          STA A  ERROR      PARAMETER ERROR
388E 20 1A          BRA    SC4
3890 CE 3FF4 SC3    LDX    #C1
3893 BD 7735        JSR    FPM
3896 BD 73E6        JSR    RECIP      9999/(MAX-MIN)
3899 4F             CLR A
389A BD 39A1        JSR    SET
389D 8D 1D          BSR    NEGXR
389F CE 0098        LDX    #YR
38A2 BD 7735        JSR    FPM        MIN*SCALE
38A5 86 10          LDA A  #$10
38A7 BD 39A1        JSR    SET
38AA BD 396E SC4    JSR    RESXR
38AD BD 55B2        JSR    ROLLD      NEXT PARAMETERS
38B0 BD 55B2        JSR    ROLLD
38B3 BD 3969        JSR    SAVXR
38B6 8D 0B          BSR    ADJST
38B8 27 C0          BEQ    SC1
38BA 20 54    SC5   BRA    EXT1       FIX FSFLG, EXIT
                 *
                 *    NEGXR
                 *
38BC D6 91    NEGXR LDA B  XR+1
38BE C8 80          EOR B  #$80       COMPLEMENT SIGN
38C0 D7 91          STA B  XR+1
38C2 39             RTS


                 *
                 *    ADJST
                 *
                 *    TOGGLES T11 BETWEEN 0 AND 8.
                 *
38C3 86 08    ADJST LDA A  #8
38C5 90 24          SUB A  T11
38C7 97 24          STA A  T11
38C9 39             RTS


                 *
                 *    MOVE - PLOT
                 *
                 *    MOVES THE PEN TO THE POINT SPECIFIED BY THE USER
                 *    X AND Y VALUES.
                 *    'MOVE' LIFTS THE PEN BEFORE MOVING AND LEAVES IT
                 *    RASIED UPON EXITING.  'PLOT' WILL DRAW A LINE FROM
                 *    THE CURRENT POINT TO THE NEW POINT IF THE PEN WAS
                 *    ALREADY DOWN UPON CALL, ELSE IT WILL MOVE TO THE
                 *    POINT AND THEN LOWER THE PEN BEFORE EXITING.
                 *    PLOTTER COORDINATE = (USER VALUE)*(SCALE FACTOR)+
                 *      (ORIGIN OFFSET).
                 *    USER PARAMETERS:
                 *        XR - X COORDINATE
                 *        YR - Y COORDINATE
                 *
38CA 8D 58    MOVE  BSR    INIT       INITIALIZE
38CC 7A 0027        DEC    T8         SET FLAG, LEAVE PEN UP
38CF BD 388F        JSR    PENU       RAISE THE PEN
38D2 20 02          BRA    PLT2
38D4 8D 4E    PLOT  BSR    INIT       INITIALIZE
38D6 BD 398C PLT2   JSR    POS        GET PLOTTER COORDINATE
38D9 86 20          LDA A  #$20
```

```
38DB BD 39A1          JSR    SET       STORE IN PLOTTER POSITION REGISTER
38DE 8D E3            BSR    ADJUST
38E0 27 1E            BEQ    IPL2      DONE
38E2 BD 3986          JSR    LDYR
38E5 20 EF            BRA    PLT2      NOW DO Y-COORDINATE
                *
                *     IPLOT
                *
                *     INCREMENTAL PLOT MOVES THE PEN FROM IT'S CURRENT
                *     POSITION THE AMOUNT SPECIFIED BY THE USER INCREMENT
                *     X AND Y VALUES.  DRAWS A LINE IF THE PEN WAS ALREADY
                *     DOWN UPON CALL. ELSE IT MOVES TO THE NEW POINT AND
                *     THEN LOWERS THE PEN.
                *     PLOTTER COORDINATE = (USER VALUE)*(SCALE FACTOR)+
                *       (PRESENT PLOTTER COORDINATE).
                *     USER PARAMETERS:
                *         XR - DELTA X VALUE
                *         YR - DELTA Y VALUE
                *
38E7 8D 3B      IPLOT  BSR    INIT
38E9 BD 3980    IPL1   JSR    MULT      VALUE*SCALE FACTOR
38EC 86 20             LDA A  #$20
38EE BD 3973           JSR    INDX
38F1 BD 75FC           JSR    FPA       ADD DELTA TO COORDINATE
38F4 DE 69             LDX    REAL+1
38F6 BD 73F3           JSR    TXRX      SAVE NEW COORDINATE
38F9 BD 3986           JSR    LDYR
38FC 8D C5             BSR    ADJUST
38FE 26 E9             BNE    IPL1
3900 BD 3A94    IPL2   JSR    MOVO      MOVE TO POINT
3903 96 05             LDA A  IOIN      PEN DOWN?
3905 2B 07             BMI    EXIT      YES
3907 96 27             LDA A  T8        'MOVE' COMMAND?
3909 2B 03             BMI    EXIT      YES
390B BD 3B95           JSR    PEND


                *
                *     EXIT
                *
                *     RESTORES THE XR TO ORIGINAL STATUS. ADJUSTS THE
                *     RSFLG AND RESETS PIA AND CHANNEL SELECT.
                *
390E 8D 5E      EXIT   BSR    RESXR     RESTORE XR
3910 0F         EXT1   SEI
3911 D6 26             LDA B  T9        ENTRY RSFLG STATUS
3913 2B 02             BMI    EXT3      RUNNING AND STOP KEY. EXIT NOW
3915 D7 09      EXT2   STA B  RSFLG     RESTORE ORIGINAL RSFLG
3917 C6 04      EXT3   LDA B  #4        IO6
3919 D7 00             STA B  ADATA     RESET CHANNEL SELECT
391B 7F 0000           CLR    ADATA
391E C6 3C             LDA B  #@74
3920 D7 03             STA B  BCTL      CLEAR CB2 FUNSTION
3922 0E                CLI
3923 39         NULL   RTS
                *
                *     INIT
                *
                *     INITIALIZES POINTERS AND FLAGS FOR ALL PLOTTER
                *     ROUTINE.  SETS CHANNEL SELECT FOR PLOTTER.
                *
3924 86 5B      INIT   LDA A  #$5B      CHANNEL 1. IO7
3926 DE CD             LDX    IO1
3928 D6 CF             LDA B  IO1+2     LOAD SELECT CODE
392A C1 01             CMP B  #1        PLOTTER?
392C 27 04             BEQ    INT1      YES
392E DE D0             LDX    IO2
3930 86 AB             LDA A  #$AB      CHANNEL 2. IO7
3932 97 00      INT1   STA A  ADATA     SET CHANNEL
3934 84 F0             AND A  #$F0
3936 97 00             STA A  ADATA     LATCH IT
3938 86 2C             LDA A  #@54
393A 97 03             STA A  BCTL      SET UP CB2
393C C6 F3             LDA B  #$F3
```

```
393E D7 25           STA B   T10        SAVE IT
3940 DF 22           STX     T13        SAVE FOR FUTURE
3942 4F              CLR A
3943 97 24           STA A   T11        CLEAR XYFLG
3945 97 27           STA A   T8         'MOVE' FLAG
3947 91 0F           CMP A   DIGFLG
3949 27 05           BEQ     INT2       NOT DIGIT ENTRY
394B 97 0F           STA A   DIGFLG
394D 4A              DEC A              TERMINATE DIGIT ENTRY
394E 97 0D           STA A   STKFLG
3950 0F        INT2  SEI
3951 D6 09           LDA B   RSFLG
3953 C4 C0           AND B   #$C0
3955 D7 26           STA B   T9         SAVE RSFLG ENTRY STATUS
3957 C6 C0           LDA B   #$C0
3959 D7 09           STA B   RSFLG      SET TO PROGRAM EXECUTION
395B 0E              CLI
395C D6 05           LDA B   IOIN
395E 59              ROL B              PLOTTER ON?
395F 2B 08           BMI     SAVXR      YES
3961 86 05           LDA A   #5
3963 97 06           STA A   ERROR      SET PLOTTER ERROR
3965 31              INS
3966 31              INS                BUMP RETURN STACK
3967 20 A7           BRA     EXIT+2
               *
               *     SAVXR
               *
               *     SAVES THE XR IN A TEMPORARY LOCATION (IMAG).
               *
3969 CE 0070 SAVXR   LDX     #IMAG
396C 20 35           BRA     TXR

               *
               *     RESXR
               *
               *     RESTORES XR FROM TEMPORARY SAVE (IMAG).
               *
396E CE 0070 RESXR   LDX     #IMAG
3971 20 16           BRA     TXX

               *
               *     INDX
               *
               *     RETURNS SPECIFIED PLOTTER REGISTER ADDRESS IN IX.
               *     SPECIFICATION INDEX PASSED IN ACCA AND X OR Y
               *     DETERMINED BY XYFLG (T11).  ACCA=0 FOR
               *     SCALE FACTOR, ACCA=10(HEX) FOR ORIGEN OFFSET,
               *     ACCA=20(HEX) FOR CURRENT PLOTTER COORDINATES.
               *
3973 9B 24     INDX  ADD A   T11        ADD XYFLG
3975 9B 23     INDX1 ADD A   T12        ADD TO LOWER HALF OF POINTER
3977 97 6A           STA A   REAL+2     SAVE
3979 96 22           LDA A   T13        UPPER HALF
397B 97 69           STA A   REAL+1
397D DE 69           LDX     REAL+1     LOAD REG. POINTER
397F 39              RTS

               *
               *     MULT
               *
               *     MULTIPLIES XR BY SCALE FACTOR.
               *
3980 4F        MULT  CLR A
3981 8D F0           BSR     INDX
3983 7E 7735   MLT   JMP     FPM

               *
               *     LDYR
               *
               *     LOADS THE YR INTO THE XR.
               *
3986 CE 0098   LDYR  LDX     #YR
3989 7E 743B   TXX   JMP     TXXR
```

```
                    *
                    *     POS
                    *
                    *     CALCULATES THE PLOTTER COORDINATE FROM THE USER
                    *     VALUE IN XR.  XYFLAG MUST BE SET BEFORE ENTRY.
                    *     XR = (XR)*(SCALE FACTOR)+(ORIGIN OFFSET).
                    *
398C 8D F2          POS     BSR     MULT      XR*SCALE FACTOR
398E 86 10                  LDA A   #$10
3990 8D E1                  BSR     INDX
3992 BD 75FC                JSR     FPA

                    *
                    *     XRCHK
                    *
                    *     CHECKS FOR 0 <= XR < 10000. SETS 'Z' BIT
                    *     FOR VALID NUMBER (ALSO CLEARS ACCB).
                    *
3995 D6 91          XRCHK   LDA B   XR+1
3997 2B 07                  BMI     XR1
3999 D6 90                  LDA B   XR
399B C1 03                  CMP B   #3
399D 2E 01                  BGT     XR1
399F 5F                     CLR B
39A0 39             XR1     RTS

                    *
                    *     SET
                    *
                    *     SAVES THE XR IN SPECIFIED PLOTTER REGISTER.
                    *     XYFLAG MUST BE SET BEFORE CALL.
                    *
39A1 8D D0          SET     BSR     INDX
39A3 7E 73F3        TXR     JMP     TXRX

                    *
                    *   GET
                    *
                    *     LOADS SPECIFIED PLOTTER REGISTER INTO THE
                    *     XR.   XYFLAG MUST BE SET BEFORE CALL.
39A6 8D CB          GET     BSR     INDX
39A8 20 DF                  BRA     TXX

                    *
                    *     TEMP1 - TEMP2
                    *
                    *     SAVES THE XR IN TEMPORARY LOCATIONS.
                    *
39AA CE 0058        TEMP1   LDX     #BUFF
39AD 20 F4                  BRA     TXR
39AF CE 0060        TEMP2   LDX     #BUFF+8
39B2 20 EF                  BRA     TXR
                    *
                    *     XAXIS - YAXIS
                    *
                    *     DRAWS AN X OR Y AXIS FROM THE STARTING POINT TO
                    *     THE ENDING POINT, INTERCEPTING THE OTHER AXIS AT THE
                    *     SPECIFIED POINT, AND SPACING TIC MARKS AS INDICATED.
                    *     IF THE SIGN OF THE TIC INTERVAL IS THE SAME AS THE
                    *     SIGN OF (ENDING POINT - STARTING POINT), TICS WILL
                    *     BE SPACED ALONG THE ENTIRE LENGTH OF THE AXIS. ELSE
                    *     ONLY ONE TIC WILL BE DONE AT THE STARTING POINT.
                    *     (SEE OPERATION OF 9830 PLOTTER AXIS COMMANDS).
                    *     USER PARAMETERS:
                    *         XR - AXIS INTERCEPT
                    *         YR - TIC MARK INTERVAL
                    *         ZR - ENDING POINT
                    *         TR - STARTING POINT
                    *
39B4 BD 3924        XAXIS   JSR     INIT      INITIALIZE
39B7 BD 38C3                JSR     ADJUST
39BA 20 03                  BRA     AX1
39BC BD 3924        YAXIS   JSR     INIT
39BF 8D CB          AX1     BSR     POS       SCALE INTERCEPT
39C1 26 21                  BNE     AX2       RANGE ERROR
```

```
39C3 86 20             LDA A   #$20
39C5 8D DA             BSR     SET
39C7 BD 38C3           JSR     ADJST
39CA 8D BA             BSR     LDYR
39CC 8D B2             BSR     MULT      SCALE TIC
39CE 8D DA             BSR     TEMP1
39D0 CE 00A0           LDX     #ZR
39D3 8D B4             BSR     TXX
39D5 8D 85             BSR     POS
39D7 26 0B             BNE     AX2       RANGE ERROR
39D9 8D D4             BSR     TEMP2
39DB CE 00A8           LDX     #TR
39DE 8D A9             BSR     TXX
39E0 8D AA             BSR     POS
39E2 27 06             BEQ     AX3
39E4 86 06     AX2     LDA A   #6
39E6 97 06             STA A   ERROR     ERROR EXIT
39E8 20 64             BRA     AX7
39EA 86 20     AX3     LDA A   #$20
39EC BD 3973           JSR     INDX
39EF DF 28             STX     T7        REG POINTER
39F1 8D B0             BSR     TXR
39F3 CE 0060           LDX     #BUFF+8
39F6 BD 75F6           JSR     FPS       END-START
39F9 96 91             LDA A   XR+1
39FB 97 2A             STA A   T5        SET DIRECTION SIGN
39FD BD 3B8F           JSR     PENU
3A00 BD 3AB3           JSR     MOV       MOVE TO START
3A03 BD 3B95           JSR     PEND
3A06 96 58             LDA A   BUFF
3A08 2B 36             BMI     AX5       NEGITIVE EXPONENT
3A0A 96 5A             LDA A   BUFF+2
3A0C 27 32             BEQ     AX5       ZERO TIC
3A0E 96 09     AX4     LDA A   RSFLG
3A10 2A 39             BPL     AX6+2     STOP KEY
3A12 8D 40             BSR     TIC
3A14 96 59             LDA A   BUFF+1
3A16 91 2A             CMP A   T5
3A18 26 26             BNE     AX5       ONE TIC
3A1A CE 0058           LDX     #BUFF
3A1D 8D 72             BSR     TXX1
3A1F DE 28             LDX     T7
3A21 BD 75FC           JSR     FPA       TIC + POSITION
3A24 DE 28             LDX     T7
3A26 8D 29             BSR     TXR1
3A28 CE 0060           LDX     #BUFF+8
3A2B BD 75F6           JSR     FPS       END-POSITION
3A2E 96 91             LDA A   XR+1
3A30 91 2A             CMP A   T5
3A32 27 08             BEQ     AX4A      LEGAL
3A34 96 90             LDA A   XR
3A36 2B 04             BMI     AX4A      SLOP SMALL, DO TIC
3A38 96 92             LDA A   XR+2
3A3A 26 04             BNE     AX5       IF NOT ZERO, DONE
3A3C 8D 75     AX4A    BSR     MOV
3A3E 20 CE             BRA     AX4
3A40 CE 0060   AX5     LDX     #BUFF+8
3A43 8D 4C             BSR     TXX1
3A45 DE 28             LDX     T7
3A47 8D 08             BSR     TXR1      END POINT
3A49 8D 68     AX6     BSR     MOV
3A4B BD 3B8F           JSR     PENU
3A4E 7E 390E   AX7     JMP     EXIT      DONE

3A51 7E 73F3   TXR1    JMP     TXRX
               *
               *   TIC
               *
               *    THIS ROUTINE TAKES THE TOGGLE OF THE XYFLAG AND
               *    DRAWS A LINE FROM PLOTTER CURRENT POSITION TO
               *    +50,-50, AND THEN RETURNING TO ORIGINAL POINT
               *    BEFORE EXITING.
               *
3A54 86 08     TIC     LDA A   #8
```

```
3A56 90 24          SUB A   T11       TOGGLE XYFLG
3A58 C6 FF          LDA B   #$FF
3A5A D7 2C          STA B   T3        SET PASS FLAG
3A5C 8B 20          ADD A   #$20
3A5E BD 3975        JSR     INDX1
3A61 DF 1E          STX     TP6       REG ADDRESS
3A63 8D 2C          BSR     TXX1
3A65 CE 0078        LDX     #AT1
3A68 8D E7          BSR     TXR1      SAVE IN TEMPORARY
3A6A CE 3F4D TIC1   LDX     #C2
3A6D BD 75F6        JSR     FPS
3A70 BD 38BC        JSR     NEGXR
3A73 20 06          BRA     TIC3
3A75 CE 3F4D TIC2   LDX     #C2
3A78 BD 75FC        JSR     FPA       ADD 50. THIS TIME
3A7B DE 1E   TIC3   LDX     TP6
3A7D 8D D2          BSR     TXR1      SET TIC END
3A7F 8D 32          BSR     MOV
3A81 CE 0078        LDX     #AT1
3A84 8D 0B          BSR     TXX1
3A86 7C 002C        INC     T3
3A89 27 EA          BEQ     TIC2      NEXT HALF OF TIC
3A8B DE 1E   TIC4   LDX     TP6
3A8D 8D C2          BSR     TXR1      RESTORE
3A8F 20 22   TIC5   BRA     MOV


3A91 7E 743B TXX1   JMP     TXXR
             *
             *   MOVQ - MOV
             *
             *   'MOVQ' CHECKS FOR COORDINATE WITHIN RANGE OF
             *   PLOTTER. IF THEY ARE OUT OF RANGE, IT RAISES THE
             *   PEN AND MOVES LEAVING PEN RAISED.
             *   'MOV' WILL ALWAYS MOVE THE PEN.  IF THE COORDINATES
             *   ARE OUT OF RANGE, IT SUBSTITUTES THE CLOSEST LIMIT
             *   VALUE AND THEN MAKES THE MOVE.
             *
3A94 86 20   MOVQ   LDA A   #$20
3A96 BD 3975        JSR     INDX1
3A99 A6 01          LDA A   1,X
3A9B 2B 10          BMI     PNU
3A9D A6 09          LDA A   9,X
3A9F 2B 0C          BMI     PNU
3AA1 A6 00          LDA A   0,X
3AA3 81 03          CMP A   #3
3AA5 2E 06          BGT     PNU
3AA7 A6 08          LDA A   8,X
3AA9 81 03          CMP A   #3
3AAB 2F 06          BLE     MOV
3AAD BD 3B8F PNU    JSR     PENU      RAISE THE PEN
3AB0 7A 0027        DEC     T8        SET FLAG, LEAVE PEN UP
3AB3 86 7F   MOV    LDA A   #$7F
3AB5 94 25          AND A   T10       CLEAR SYC BIT
3AB7 97 25          STA A   T10
3AB9 4F             CLR A
3ABA 97 14          STA A   TP1
3ABC 8B 20   MOV1   ADD A   #$20
3ABE BD 3975        JSR     INDX1
3AC1 A6 01          LDA A   1,X
3AC3 2A 05          BPL     MOV3      POSITIVE
3AC5 CE 0000 MOV2   LDX     #0
3AC8 20 10          BRA     MOV5      ZERO DEFAULT
3ACA E6 00   MOV3   LDA B   0,X
3ACC 5C             INC B
3ACD 2F F6          BLE     MOV2      NEGITIVE EXPONENT
3ACF C1 05          CMP B   #5
3AD1 2D 05          BLT     MOV4      WITHIN LIMITS
3AD3 CE 9999        LDX     #$9999
3AD6 20 02          BRA     MOV5
3AD8 8D 13   MOV4   BSR     JUST      FORMAT DATA
3ADA DF 16   MOV5   STX     TP2
3ADC D6 16          LDA B   TP2
3ADE 8D 33          BSR     OUT
3AE0 D6 17          LDA B   TP2S      OUT COORDINATE
```

```
3AE2 8D 2F             BSR     OUT
3AE4 86 08             LDA A   #8
3AE6 90 14             SUB A   TP1
3AE8 97 14             STA A   TP1         FIX FLAG
3AEA 26 D0             BNE     MOV1
3AEC 39                RTS
                *
                *   JUST
                *
                *   THIS ROUTINE TAKES THE PLOTTER COORDINATE REGISTER
                *   SPECIFIED BY THE IX AND THE NUMBER OF DIGITS
                *   SPECIFIED IN ACCB AND FORMS THE RIGHT JUSTIFIED
                *   FOUR BCD DIGITS IN TP2 AND TP2S.
                *
3AED C0 05      JUST   SUB B   #5
3AEF D7 15             STA B   TP1S        SET COUNTER
3AF1 A6 02             LDA A   2,X
3AF3 E6 03             LDA B   3,X         LOAD FOUR BCD DIGITS
3AF5 7C 0015    JST1   INC     TP1S        NORMALIZED?
3AF8 27 0E             BEQ     JST2        YES
3AFA 0C                CLC
3AFB 46                ROR A
3AFC 56                ROR B
3AFD 0C                CLC
3AFE 46                ROR A
3AFF 56                ROR B               RIGHT SIHFT
3B00 0C                CLC
3B01 46                ROR A
3B02 56                ROR B
3B03 0C                CLC
3B04 46                ROR A
3B05 56                ROR B
3B06 20 ED             BRA     JST1
3B08 97 16      JST2   STA A   TP2
3B0A D7 17             STA B   TP2S        SET JUSTIFIED NUMBER
3B0C DE 16             LDX     TP2
3B0E 39                RTS
                *
                *   OUT
                *
                *   THIS ROUTINE OUTS TO THE PLOTTER ACCB.  THE 'SYC'
                *   'MVR'. AND 'PNC' BITS OF THE CAHNNEL CODE WORD
                *   MUST HAVE BEEN PREVIOUSLY SET.  THE 'SYC' BIT
                *   IS ALWAYS RESET BY THE ROUTINE.
                *
3B0F 96 09      OUT0   LDA A   RSFLG       STOP KEY?
3B11 2A 25             BPL     OUT3        YES
3B13 86 0A      OUT    LDA A   #$A
3B15 97 00             STA A   ADATA       IO1
3B17 96 05             LDA A   IOIN        FLAG STATUS, BUSY?
3B19 2A F4             BPL     OUT0        YES
3B1B 0F         OUT1   SEI
3B1C 96 25             LDA A   T10         LOAD STATUS BITS
3B1E 97 00             STA A   ADATA       CONTROL BITS SET
3B20 53                COM B
3B21 D7 02             STA B   BDATA       WRITE DATA WORD
3B23 84 F0             AND A   #$F0        RELEASE IO5
3B25 97 00             STA A   ADATA       DRIVE CTL
3B27 8A C3             ORA A   #$C3        RESET SYC,MVR,IO5
3B29 97 25             STA A   T10         SAVE
3B2B 0E                CLI
3B2C 86 0A      OUT2   LDA A   #$A         IO1
3B2E 97 00             STA A   ADATA
3B30 96 05             LDA A   IOIN        READ FLG STATUS
3B32 2A 04             BPL     OUT3        RESPONDED
3B34 96 09             LDA A   RSFLG
3B36 2B F4             BMI     OUT2        NO STOP KEY
3B38 4F         OUT3   CLR A
3B39 97 00             STA A   ADATA       RELEASE IO1
3B3B 39                RTS
                *
                *   POWER UP
                *
                *   CALLED BY SUPERVISOR DURING POWER ON.  NINE
                *   REGISTERS AND ALLOCATED AND INITIALIZED.
```

```
                   *      1 - X-SCALE FACTOR
                   *      2 - Y-SCALE FACTOR
                   *      3 - X-OFFSET
                   *      4 - Y-OFFSET
                   *      5 - X-POSITION
                   *      6 - Y-POSITION
                   *      7 - 1/ASPECT RATIO
                   *      8 - CHARACTER SIZE, ANGLE INFO (SEE CSIZE).
                   *      9 - PAPER SIZE RATIO
                   *
3B3C C6 5B         PWRUP  LDA B  #$5B       CHANNEL 1
3B3E D7 00                STA B  ADATA      SET CHANNEL, IO7
3B40 5A                   DEC B
3B41 D7 00                STA B  ADATA      RELEASE IO7, SET IO1
3B43 96 05                LDA A  IOIN       READ DEVICE ID
3B45 CE 00CD              LDX    #IO1       SLOT 1 INFO
3B48 85 01                BIT A  #1         PLOTTER THERE?
3B4A 27 03                BEQ    PIN1       YES
3B4C CE 00D0              LDX    #IO2       SLOT 2 INFO
3B4F 86 01         PIN1   LDA A  #1
3B51 A7 02                STA A  2,X        SET PLOTTER ID
3B53 96 0B                LDA A  EOPM
3B55 A7 00                STA A  0,X        SET PAGE
3B57 96 0C                LDA A  EOPM+1
3B59 80 48                SUB A  #$48       ALLOCATE 9 REGISTERS
3B5B A7 01                STA A  1,X
3B5D 97 0C                STA A  EOPM+1
3B5F EE 00                LDX    0,X        LOAD REG. POINTER
3B61 86 10                LDA A  #$10
3B63 A7 02                STA A  2,X        SCALE FACTOR
3B65 A7 0A                STA A  $A,X
3B67 A7 42                STA A  $42,X      PAPER RATIO=1
3B69 6A 30                DEC    $30,X
3B6B 86 60                LDA A  #$60       1/ASPECT=.6
3B6D A7 32                STA A  $32,X
3B6F 86 02                LDA A  #2
3B71 A7 38                STA A  $38,X
3B73 86 20                LDA A  #$20       SIZE 2%
3B75 A7 3A                STA A  $3A,X
3B77 86 08                LDA A  #8
3B79 A7 3E                STA A  $3E,X
3B7B 86 04                LDA A  #4         IO6
3B7D 97 00                STA A  ADATA      RESET CHANNEL SELECT
3B7F 7F 0000              CLR    ADATA
3B82 39            PIN2   RTS
                   *
                   *    PEN
                   *
                   *    THESE ROUTINES RAISE AND LOWER THE PEN.  'PEN' IS
                   *    THE MAINFRAME CALL TO RAISE THE PEN.  'PENU' AND
                   *    'PEND' ARE UTILITY ROUTINES CALLED FROM OTHER
                   *    PLOTTER ROUTINES.
                   *
3B83 BD 3924       PEN    JSR    INIT
3B86 96 05                LDA A  IOIN       PEN RAISED?
3B88 2A 02                BPL    PEN1       YES
3B8A 8D 03                BSR    PENU       LIFT IT NOW
3B8C 7E 390F       PEN1   JMP    EXIT
                   *
                   *
3B8F D6 25         PENU   LDA B  T10
3B91 CA 20                ORA B  #$20       SET PEN UP BIT
3B93 20 04                BRA    PN1
3B95 D6 25         PEND   LDA B  T10
3B97 C4 DF                AND B  #$DF       CLEAR PEN UP
3B99 C4 3F         PN1    AND B  #$3F       CLEAR SYS, MVR BITS
3B9B D7 25                STA B  T10
3B9D 5F                   CLR B
3B9E 7E 3B13              JMP    OUT


                   *
                   *    ZERXR
                   *
```

```
                      *      ZEROS THE XR.
                      *
3BA1 CE 0090 ZERXR   LDX     #XR
3BA4 7E 7489 ZERO    JMP     ZEROX


                      *
                      *      DRAW+
                      *
                      *      OUTS A '+' OVER CURRENT PEN POSITION.
                      *      LOWERS THE PEN AND LEAVES IT LOWERED.
                      *
3BA7 BD 3924 DRAW    JSR     INIT
3BAA BD 3AB3         JSR     MOV
3BAD 8D E6           BSR     PEND
3BAF BD 3A54         JSR     TIC
3BB2 BD 38C3         JSR     ADJST
3BB5 BD 3A54         JSR     TIC
3BB8 20 D2           BRA     PEN1         EXIT
```

SYMBOL TABLE

| | | | | | | | | | | | |
|---|---|---|---|---|---|---|---|---|---|---|---|
| ADATA | 0000 | ACTL | 0001 | BDATA | 0002 | BCTL | 0003 | INPUT | 0004 | IOIN | 0005 |
| ERROR | 0006 | TGL | 0007 | UFLG | 0008 | RSFLG | 0009 | EOM | 000A | EOPM | 000B |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDBB | 00BA | MT | 7E00 | TERMN7 | 003D | IMED | 0040 | PARCD | 00C0 |
| PAREX | 0080 | NTBL | 0000 | DOTS | 5EC0 | PRTDRV | 602D | FRMT | 5CA8 | BLANK | 5D75 |
| LDMSG | 57BD | ROLLD | 55B2 | ROLLU | 57F1 | PSD | 55DA | TXL | 55E9 | STKUP | 55EF |
| MAD | 749B | CMP | 74AA | NOR | 74D6 | TXW | 7424 | TXXR | 7438 | EXXR | 7452 |
| ARSR | 753B | OVUNF | 75B6 | OVERF | 75DD | XR0 | 740A | XRNINE | 75C8 | UNDRF | 75F1 |
| IMULT | 7689 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |
| RECIP | 73E6 | TXRX | 73F3 | CONST | 6800 | FPDBRC | 6898 | TAN | 68A9 | ATN | 69C3 |
| DSZERO | 6A46 | NTLN | 6A58 | EXPN | 6AC9 | SIN | 6B94 | COS | 6B9A | ASIN | 6BF2 |
| ACOS | 6BF7 | PH1 | 6C5D | PH2 | 6C8D | PH3 | 6D34 | PH4 | 6DD0 | LSFT8 | 6E47 |
| SQRT | 6E65 | MAD8 | 6F2C | CMP8 | 53E4 | IOUPX | 6F52 | LOG10 | 6FA7 | YUPX | 6FE9 |
| RTOP | 7328 | PTOR | 7386 | C1 | 3FF4 | C2 | 3F4D | SCALE | 3875 | SC1 | 387A |
| SC2 | 388A | SC3 | 3890 | SC4 | 38AA | SC5 | 38BA | NEGXR | 38BC | ADJST | 38C3 |
| MOVE | 38CA | PLOT | 38D4 | PLT2 | 38D6 | IPLOT | 38E7 | IPL1 | 38E9 | IPL2 | 3900 |
| EXIT | 390E | EXT1 | 3910 | EXT2 | 3915 | EXT3 | 3917 | NULL | 3923 | INIT | 3924 |
| INT1 | 3932 | INT2 | 3950 | SAVXR | 3969 | RESXR | 396E | INDX | 3973 | INDX1 | 3975 |
| MULT | 3980 | MLT | 3983 | LDYR | 3986 | TXX | 3989 | POS | 398C | XRCHK | 3995 |
| XR1 | 39A0 | SET | 39A1 | TXR | 39A3 | GET | 39A6 | TEMP1 | 39AA | TEMP2 | 39AF |
| XAXIS | 39B4 | YAXIS | 39BC | AX1 | 39BF | AX2 | 39E4 | AX3 | 39EA | AX4 | 3A0E |
| AX4A | 3A3C | AX5 | 3A40 | AX6 | 3A49 | AX7 | 3A4E | TXR1 | 3A51 | TIC | 3A54 |
| TIC1 | 3A6A | TIC2 | 3A75 | TIC3 | 3A7B | TIC4 | 3A8B | TIC5 | 3A8F | TXX1 | 3A91 |
| MOVQ | 3A94 | PNU | 3AAD | MOV | 3AB3 | MOV1 | 3ABC | MOV2 | 3AC5 | MOV3 | 3ACA |
| MOV4 | 3AD8 | MOV5 | 3ADA | JUST | 3AED | JST1 | 3AF5 | JST2 | 3B08 | OUT0 | 3B0F |
| OUT | 3B13 | OUT1 | 3B1B | OUT2 | 3B2C | OUT3 | 3B38 | PWRUP | 3B3C | PIN1 | 3B4F |
| PIN2 | 3B82 | PEN | 3B83 | PEN1 | 3B8C | PENU | 3B8F | PEND | 3B95 | PN1 | 3B99 |
| ZERXR | 3BA1 | ZERO | 3BA4 | DRAW | 3BA7 | | | | | | |

TOTAL ERRORS 1

```
****ERROR 201
 4   NAM CJBPG
```

```
                       OPT    LIST,MEM
                       OPT    G
                 *
                 *    EQUATE TABLE
                 *

      38C3       ADJST  EQU    $38C3
      390E       EXIT   EQU    $390E
      3924       INIT   EQU    $3924
      396E       RESXR  EQU    $396E
      3973       INDX   EQU    $3973
      3975       INDX1  EQU    $3975
      39A1       SET    EQU    $39A1
      39A6       GET    EQU    $39A6
      39AA       TEMP1  EQU    $39AA
      3A94       MOVQ   EQU    $3A94
      3AB3       MOV    EQU    $3AB3
      3B8F       PENU   EQU    $3B8F
      3B95       PEND   EQU    $3B95
      3BA1       ZERXR  EQU    $3BA1
3BD0                    ORG    $3BD0
                 *
                 *    DGTZR
                 *
                 *    THIS ENABLES THE USER TO POSITION THE PEN BY
                 *    PRESSING DIRECTION STEP KEYS.  BY HOLDING THE
                 *    KEY DOWN THE STEP IS REPETED.  STEPS ARE 0.1%
                 *    OF FULL SCALE FOR 25 STEPS(REPETED), AND THEN
                 *    INCREASED TO 1.0% INCREMENTS.  UPON EXITING
                 *    THE USER COORDINATES ARE RETURNED IN THE X AND
                 *    Y REGISTERS.
                 *
3BD0 86 80       DGTZ5  LDA A  #@200     EXIT
3BD2 4C          DGTZ2  INC A            RIGHT
3BD3 8B 07       DGTZ1  ADD A  #@7       LEFT
3BD5 8B 08       DGTZ3  ADD A  #@10      DOWN
3BD7 8B 14       DGTZ4  ADD A  #@24      UP
3BD9 97 2E              STA A  T1        SAVE KEY CODE
3BDB BD 3924            JSR    INIT
3BDE 96 2E              LDA A  T1        EXIT COMMAN?
3BE0 2A 03              BPL    DT0       NO
3BE2 7E 3C54            JMP    DT7
3BE5 8D A8       DT0    BSR    PENU      LIFT THE PEN
3BE7 BD 55EF            JSR    STKUP
3BEA 4F                 CLR A
3BEB 97 09              STA A  RSFLG
3BED 97 B9              STA A  BKWRT+1    RESET FLAGS
3BEF 97 0D              STA A  STKFLG
3BF1 BD 3CA0            JSR    SETUP     INITIALIZE ALL
3BF4 96 B9       DT1    LDA A  BKWRT+1    NEW KEY?
3BF6 26 3C              BNE    DT4A      YES
3BF8 86 0F              LDA A  #$F       KEYBOARD SELECT
3BFA 97 00              STA A  ADATA
3BFC 96 04              LDA A  INPUT     READ KEY BOARD SCAN
3BFE 7F 0000            CLR    ADATA     RESET SELECT CODE
3C01 43                 COM A
3C02 44                 LSR A            FIX KEY CODE
3C03 44                 LSR A
3C04 91 2E              CMP A  T1
3C06 26 28              BNE    DT4       KEY RELEASED
3C08 DE 2B              LDX    T4        LOAD TIME COUNT
3C0A 09                 DEX
3C0B DF 2B              STX    T4
3C0D 26 E5              BNE    DT1       TIME NOT UP
3C0F CE 03E8            LDX    #1000
3C12 DF 2B              STX    T4        SET FAST REPETE TIME
3C14 7A 002D            DEC    T2
3C17 26 03              BNE    DT3       SAME STEP
3C19 7C 0078            INC    AT1       1.0 % STEP
3C1C CE 0078     DT3    LDX    #AT1
3C1F BD 75FC            JSR    FPA       ADD DELTA
3C22 BD 3CDD            JSR    RANGE     ADJUST
3C25 7A 0009            DEC    RSFLG
3C28 BD 3AB3            JSR    MOV       MAKE STEP MOVE
3C2B 7F 0009            CLR    RSFLG
```

```
00294 3C2E 20 C4              BRA    DT1        ANOTHER STEP
00295 3C30 7F 0089 DT4        CLR    BKWRT+1     CLEAR KEY BUFFER
00296 3C33 3E                 WAI               WAIT FOR KEY
00297 3C34 96 BA    DT4A      LDA A  BKKC
00298 3C36 97 2E              STA A  T1         SAVE COMMAND
00299 3C38 81 22              CMP A  #@42       EXIT?
00300 3C3A 27 18              BEQ    DT7        YES
00301 3C3C 81 25              CMP A  #@45       STOP KEY?
00302 3C3E 27 14              BEQ    DT7        YES
00303 3C40 81 14    DT5       CMP A  #@24       UP?
00304 3C42 27 0C              BEQ    DT6
00305 3C44 81 1C              CMP A  #@34       DOWN?
00306 3C46 27 08              BEQ    DT6
00307 3C48 81 23              CMP A  #@43       LEFT?
00308 3C4A 27 04              BEQ    DT6
00309 3C4C 81 24              CMP A  #@44       RIGHT?
00310 3C4E 26 E0              BNE    DT4
00311 3C50 8D 4E    DT6       BSR    SETUP      INITIALIZE
00312 3C52 20 C8              BRA    DT3
00313 3C54 86 08    DT7       LDA A  #8
00314 3C56 97 24              STA A  T11        XYFLG=Y
00315 3C58 BD 55EF DT8        JSR    STKUP      PUSH UP STACK
00316 3C5B C6 80              LDA B  #$80
00317 3C5D D7 0D              STA B  STKFLG     SET AUTO STACK
00318 3C5F 86 10              LDA A  #$10
00319 3C61 BD 39A6            JSR    GET        LOAD OFFSET
00320 3C64 86 20              LDA A  #$20
00321 3C66 BD 3973            JSR    INDX
00322 3C69 BD 75F6            JSR    FPS        MINUS POSITION
00323 3C6C BD 39AA            JSR    TEMP1
00324 3C6F 4F                 CLR A
00325 3C70 BD 39A6            JSR    GET        LOAD SCALE
00326 3C73 CE 0058            LDX    #BUFF
00327 3C76 BD 7793            JSR    FPD        (POSITION-OFFSET)/SCALE
00328 3C79 CE 0000            LDX    #0
00329 3C7C DF 94              STX    XR+4
00330 3C7E DF 96              STX    XR+6       ZERO NON-SIGNIFICANT DIGITS
00331 3C80 BD 38C3            JSR    ADJST
00332 3C83 27 D3              BEQ    DT8
00333 3C85 D6 26    DT9       LDA B  T9
00334 3C87 D7 09              STA B  PSFLG      RESTORE PSFLG
00335 3C89 96 2E              LDA A  T1         KEY CODE
00336 3C8B 81 22              CMP A  #@42
00337 3C8D 27 06              BEQ    DT10       EXIT KEY
00338 3C8F 5D                 TST B
00339 3C90 2A 03              BPL    DT10       NOT PROGRAM EXECUTION
00340 3C92 BD 4800            JSR    $4800      RETURN TO KEYBOARD MODE
00341 3C95 7F 0089 DT10       CLR    BKWRT+1     CLEAR KEY BUFFER
00342 3C98 86 04              LDA A  #4         I06
00343 3C9A 97 00              STA A  ADATA      RESET CHANNEL
00344 3C9C 7F 0000            CLR    ADATA
00345 3C9F 39                 RTS
00347                   *
00348                   *    SETUP
00349                   *
00350 3CA0 CE 0078 SETUP      LDX    #AT1
00351 3CA3 BD 7489            JSR    ZEROX      CLEAR STEP BUFFER
00352 3CA6 CE 1388            LDX    #5000
00353 3CA9 DF 2B              STX    T4         SET TIME LOOP
00354 3CAB 86 19              LDA A  #25
00355 3CAD 97 2D              STA A  T2         STEP COUNTER
00356 3CAF 7C 0078            INC    AT1
00357 3CB2 86 10              LDA A  #$10
00358 3CB4 97 7A              STA A  AT1+2      STEP=.1%
00359 3CB6 4F                 CLR A
00360 3CB7 97 24              STA A  T11        XYFLG=X
00361 3CB9 97 B9              STA A  BKWRT+1     ZERO KEY BUFFER
00362 3CBB 96 2E              LDA A  T1
00363 3CBD C6 08              LDA B  #8
00364 3CBF 81 1C              CMP A  #@34       VERTICAL COMMAND?
00365 3CC1 22 08              BHI    ST1
00366 3CC3 D7 24              STA B  T11        XYFLG=Y
00367 3CC5 81 14              CMP A  #@24       UP?
00368 3CC7 26 06              BNE    SET2       NO
00369 3CC9 20 08              BRA    SET3
```

```
3CCB 81 23    ST1     CMP A   #@43      LEFT?
3CCD 26 04            BNE     SET3      NO
3CCF 86 80    SET2    LDA A   #$80
3CD1 97 79            STA A   AT1+1     NEGATIVE STEP
3CD3 86 20    SET3    LDA A   #$20
3CD5 BD 3973          JSR     INDX      POINTER TO POINT
3CD8 DF 20            STX     TP7       SET IT
3CDA 7E 743B          JMP     TXXR      LOAD INTO XR

                      *
                      *   RANGE
                      *
3CDD 96 91    RANGE   LDA A   XR+1      NEG NUMBER?
3CDF 27 03            BEQ     PAN1      NO
3CE1 BD 3BA1          JSR     ZERXR
3CE4 96 90    PAN1    LDA A   XR
3CE6 81 03            CMP A   #3        EXPONENT>3?
3CE8 2F 09            BLE     RAN2      NO
3CEA 86 03            LDA A   #3
3CEC 97 90            STA A   XR        SET EXP TO 3
3CEE CE 9999          LDX     #$9999
3CF1 DF 92            STX     XR+2      SET TO MAX
3CF3 DE 20    RAN2    LDX     TP7       POINTER
3CF5 7E 73F3          JMP     TXRX      SAVE CORD.
                      *
                      *   WRITE
                      *
                      *   THIS ROUTINE DRAWS ASCII CHARACTERS ON THE PLOTTER,
                      *   ACCORDING TO PARAMETERS PREVIOUSLY SET UP BY THE
                      *   CSCALE COMMAND.  THE STRING MAY CONTAIN A PRINT
                      *   CODE IN WHICH CASE THE XR WILL BE OUTED, AFTER
                      *   WHICH THE STRING WILL CONTINUE.  UNDER KEYBOARD
                      *   MODE A SINGLE CHARACTER IS PASSED AT EACH CALL.
                      *   IF THE STOP KEY IS HIT DURING PROGRAM EXECUTION,
                      *   THE UIP IS ADVANCED TO THE NEXT INSTRUCTION.
                      *   USER PARAMETERS:
                      *     XR - POSSIBLE NUMBER
                      *
3CF8 BD 3924  WRITE   JSR     INIT
3CFB BD 3D9A          JSR     SAVE
3CFE 96 68            LDA A   REAL
3D00 D6 26            LDA B   T9
3D02 26 06            BNE     LET1      PROGRAM EXECUTION
3D04 81 84            CMP A   #$B4
3D06 27 2D            BEQ     LET8      TERMINATOR
3D08 20 0A            BRA     LET3
3D0A DE CA    LET1    LDX     UIP
3D0C 08               INX
3D0D 08               INX
3D0E DF 6B            STX     REAL+3
3D10 8D 26    LET2    BSR     GETC
3D12 27 1D            BEQ     LET7      TERMINATOR
3D14 81 B2    LET3    CMP A   #$B2
3D16 26 0A            BNE     LET4
3D18 DF 6E            STX     REAL+6    PRINT KEY, SAVE POINTER
3D1A 8D 30            BSR     NMBR
3D1C DE 6E            LDX     REAL+6    RESTORE
3D1E DF 6B            STX     REAL+3
3D20 20 03            BRA     LET5
3D22 BD 3DB2  LET4    JSR     OUTC      OUT THE CHARACTER
3D25 96 26    LET5    LDA A   T9
3D27 27 0C            BEQ     LET8      KEYBOARD
3D29 96 09            LDA A   RSFLG
3D2B 2B E3            BMI     LET2      NO STOP KEY
3D2D 8D 09    LET6    BSR     GETC
3D2F 26 FC            BNE     LET6
3D31 09       LET7    DEX
3D32 09               DEX               FIX INSTR POINTER
3D33 DF CA            STX     UIP
3D35 7E 390E  LET8    JMP     EXIT      DONE
```

```
                        *
                        *     GETC
                        *
                        *     LOADS THE CHARACTER POINTED TO BY THE CHARACTER
                        *     POINTER (T13) INTO ACCA AND THEN BUMPS THE POINTER.
                        *     SETS THE 'Z' BIT IF A TERMINATOR WAS LOADED.
                        *     SETS THE 'Z' BIT ON MEMORY OVERFLOW.
                        *
3D38 DE 6B        GETC    LDX     REAL+3
3D3A A6 00                LDA A   0,X         CHARACTER
3D3C 08                   INX                 BUMP
3D3D DF 6B                STX     REAL+3
3D3F 81 B4                CMP A   #$B4        STRING END
3D41 27 02                BEQ     GET1        YES
3D43 9C 0B                CPX     EOPM
3D45 39           GET1    RTS


                        *
                        *     PRNTX
                        *
                        *     OUTPUTS THE CURRENT VALUE OF THE XR, IN MACHINE
                        *     FORMAT TO THE PLOTTER.  'NMBR' IS ENTRY POINT
                        *     USED BY 'LETTER'.
                        *     USER PARAMETERS:
                        *       XR - NUMBER TO OUT
                        *
3D46 BD 3924      PRNTX   JSR     INIT
3D49 8D 4F                BSR     SAVE
3D4B 4F                   CLR A
3D4C 97 68        NMBR    STA A   REAL        ENTRY POINT FLAG
3D4E BD 396E              JSR     RESXR
3D51 BD 5CBC              JSR     FRMT+$14
3D54 CE 0058              LDX     #BUFF
3D57 DF 6B                STX     REAL+3
3D59 86 20                LDA A   #$20        LOAD BLANK FOR TESTS
3D5B C6 11        NUM1    LDA B   #17
3D5D 91 66                CMP A   BUFF+14      EXPONENT NULL?
3D5F 26 02                BNE     NUM2        NO
3D61 C0 04                SUB B   #4          YES, FIX COUNT
3D63 8D D3        NUM2    BSR     GETC
3D65 5A                   DEC B
3D66 81 20                CMP A   #$20        LEADING BLANKS
3D68 27 F9                BEQ     NUM2
3D6A 81 2D                CMP A   #$2D        LEADING '-'?
3D6C 27 06                BEQ     NUM2A       YES
3D6E 5C                   INC B
3D6F 09                   DEX
3D70 DF 6B                STX     REAL+3
3D72 86 20                LDA A   #$20        LEADING BLANK
3D74 D7 1F        NUM2A   STA B   TP6S        LENGTH
3D76 8D 3A        NUM3    BSR     OUTC
3D78 7A 001F              DEC     TP6S
3D7B 27 18                BEQ     NUM4        DONE
3D7D 96 09                LDA A   RSFLG
3D7F 2A 14                BPL     NUM4        STOP KEY, ABORT
3D81 BD 396E              JSR     RESXR
3D84 BD 5CBC              JSR     FRMT+$14
3D87 86 20                LDA A   #$20
3D89 91 65                CMP A   BUFF+13      POSITIVE EXPONENT?
3D8B 26 04                BNE     NUM4-4      NO
3D8D 86 2B                LDA A   #$2B
3D8F 97 65                STA A   BUFF+13      STUFF A '+'
3D91 8D A5                BSR     GETC
3D93 20 E1                BRA     NUM3
3D95 96 68        NUM4    LDA A   REAL        ENTRY FLAG
3D97 2A 9C                BPL     LET8        SINGLE CALL
3D99 39           NUM5    RTS


                        *
                        *     SAVE
                        *
```

```
3D9A 7F 0024 SAVE    CLR      T11
3D9D 86 20           LDA A    #$20
3D9F BD 39A6         JSR      GET
3DA2 CE 0078         LDX      #AT1
3DA5 8D 08           BSR      TXR
3DA7 86 28           LDA A    #$28
3DA9 BD 39A6         JSR      GET
3DAC CE 0080         LDX      #AT2
3DAF 7E 73F3 TXR     JMP      TXRX

                     *
                     *     OUTC
                     *
                     *     THIS ROUTINE OUTS THE ASCII CHARACTER SENT IN ACCA.
                     *     THE ASCII BIAS IS STRIPPED OFF AND THE RESULT
                     *     MULTIPLIED BY THREE TO FORM AN INDEX INTO CTBL.
                     *     (SEE CTBL HEADING FOR TABLE LAYOUT).
                     *
3DB2 84 7F   OUTC    AND A    #$7F
3DB4 81 03           CMP A    #3         TAB.LINE.SHIFT?
3DB6 2F E1           BLE      NUM5       YES, IGNOR IT
3DB8 CE 3F55         LDX      #CTBL
3DBB 80 24           SUB A    #$24       DOLLAR SIGN?
3DBD 27 07           BEQ      OUT0       YES
3DBF 80 02           SUB A    #2
3DC1 2F 53           BLE      OUT6       OUT OF RANGE
3DC3 16              TAB
3DC4 48              ASL A               TIMES THREE
3DC5 1B              ABA
3DC6 DF 2A   OUT0    STX      T5         BASE POINTER
3DC8 9B 2B           ADD A    T4         SET TABLE POINTER
3DCA 97 2B           STA A    T4
3DCC 86 06           LDA A    #6
3DCE 97 2C           STA A    T3         STEP COUNT
3DD0 97 60           STA A    BUFF+8
3DD2 DE 2A   OUT1    LDX      T5         TABLE POINTER
3DD4 A6 00           LDA A    0.X
3DD6 08              INX
3DD7 D6 60           LDA B    BUFF+8
3DD9 27 07           BEQ      OUT2       RIGHT HALF
3DDB 09              DEX
3DDC 46              ROR A
3DDD 46              ROR A
3DDE 46              ROR A               LEFT HALF
3DDF 46              ROR A
3DE0 C6 FF           LDA B    #$FF
3DE2 5C      OUT2    INC B
3DE3 D7 60           STA B    BUFF+8
3DE5 DF 2A           STX      T5
3DE7 84 0F   OUT3    AND A    #$F        MASK COMMAND
3DE9 27 2B           BEQ      OUT6       END OF CHARACTER
3DEB 5F              CLR B
3DEC 4A              DEC A
3DED 27 20           BEQ      OUT4
3DEF 4A              DEC A
3DF0 27 3D           BEQ      DELB
3DF2 4A              DEC A
3DF3 27 39           BEQ      DELC
3DF5 4A              DEC A
3DF6 27 35           BEQ      DELD
3DF8 4A              DEC A               TRANSLATE AND EXECUTE
3DF9 27 31           BEQ      DELE
3DFB 4A              DEC A
3DFC 27 34           BEQ      DELF
3DFE 4A              DEC A
3DFF 27 32           BEQ      DELG
3E01 4A              DEC A
3E02 27 33           BEQ      DELH
3E04 4A              DEC A
3E05 27 2F           BEQ      DELI
3E07 4A              DEC A
3E08 27 30           BEQ      LIFT
3E0A 4A              DEC A
```

```
3E0B 27 32          BEQ    SEQ1      SPECIAL SEQUNCE 'ACE'
3E0D 20 3B          BRA    SEQ2      SPECIAL SEQUENCE 'GH'
3E0F 8D 13   OUT4   BSR    POINT
3E11 7A 002C OUT4A  DEC    T3
3E14 26 BC          BNE    OUT1      MORE
3E16 86 03   OUT6   LDA A  #3
3E18 5F             CLR B
3E19 8D 38          BSR    VECTR     CHARACTER SPACE
3E1B BD 3B8F        JSR    PENU
3E1E BD 3A94        JSR    MOVQ      NEXT CHAR START POINT
3E21 7E 3D9A        JMP    SAVE
                    *
                    *    POINT
                    *
                    *    SETS UP NEXT POINT ON CHARACTER AND MAKES MOVE TO IT.
                    *    IF THE POINT IS OUT OF RANGE, THE PEN IS LIFTED AND
                    *    THE CHARACTER IS ABORTED.  ACCA AND ACCB MUST BE SET
                    *    UP BEFORE CALL.
                    *
3E24 8D 2D   POINT  BSR    VECTR
3E26 BD 3A94        JSR    MOVQ
3E29 7E 3B95        JMP    PEND


                    *
                    *    VECTOR SET UP ROUTINES
                    *
                    *    SETS UP ACCA AND ACCB FOR DESIRED VECTOR TO
                    *    NEXT POINT OF CHARACTER.
                    *
3E2C 4C      DELE   INC A
3E2D 4C      DELD   INC A
3E2E 5C      DELC   INC B
3E2F 5C      DELB   INC B
3E30 20 DD          BRA    OUT4
3E32 5C      DELF   INC B
3E33 4C      DELG   INC A
3E34 20 01          BRA    DELH
3E36 5C      DELI   INC B
3E37 4C      DELH   INC A
3E38 20 D5          BRA    OUT4
3E3A BD 3B8F LIFT   JSR    PENU
3E3D 20 D2          BRA    OUT4A
3E3F 8D E3   SEQ1   BSR    POINT
3E41 4F             CLR A
3E42 C6 02          LDA B  #2
3E44 8D DE          BSR    POINT
3E46 4F             CLR A
3E47 5F             CLR B
3E48 20 E2          BRA    DELE
3E4A 86 02   SEQ2   LDA A  #2
3E4C 5C             INC B
3E4D 8D D5          BSR    POINT
3E4F 5F             CLR B
3E50 4F             CLR A
3E51 20 E0          BRA    DELG
                    *
                    *    VECTR
                    *
                    *    CALCULATES THE ACTUAL VECTOR LENGTHS AND ADDS THEM
                    *    TO THE CHARACTER BASE COORDINATES.
                    *    VECTOR LENGTH = (NUMBER OF .5 DELTA INCREMENTS)*
                    *      (0.5)*(HEIGHT)*(DIRECTION SIGN).
                    *    COORDINATE = (BASE COORDINATE)+(VECTOR LENGTH)*
                    *      (1/ASPECT: WIDTH ONLY)*(PAPER RATIO: X ONLY).
                    *
3E53 97 2E   VECTR  STA A  T1        WIDTH
3E55 D7 2D          STA B  T2        HEIGHT
3E57 86 3C          LDA A  #$3C
3E59 8D 67          BSR    INX2
3E5B DF 20          STX    TP7
3E5D 86 FF          LDA A  #$FF
3E5F 4C      VEC1   INC A
3E60 97 6D          STA A  REAL+5    PASS ID FLG
```

```
3E62 BD 3BA1          JSR    ZERXR
3E65 DE 20            LDX    TP7
3E67 A6 00            LDA A  0,X
3E69 97 24            STA A  T11       DIRECTION
3E6B A6 01            LDA A  1,X
3E6D 97 91            STA A  XR+1      SET SIGN
3E6F 08               INX
3E70 08               INX
3E71 DF 20            STX    TP7       UPDATED
3E73 96 2E            LDA A  T1
3E75 D6 6D            LDA B  REAL+5
3E77 27 02            BEQ    VEC2
3E79 96 2D            LDA A  T2
3E7B 4D         VEC2  TST A
3E7C 27 12            BEQ    VEC4      ZERO
3E7E C6 10            LDA B  #$10
3E80 44               LSR A
3E81 24 0B            BCC    VEC3      1.0 DELTA
3E83 C6 15            LDA B  #$15
3E85 4D               TST A
3E86 26 06            BNE    VEC3      1.5 DELTA
3E88 C6 FF            LDA B  #$FF
3E8A D7 90            STA B  XR
3E8C C6 50            LDA B  #$50      0.5 DELTA
3E8E D7 92      VEC3  STA B  XR+2
3E90 8D 05      VEC4  BSR    HEIGHT
3E92 96 6D            LDA A  REAL+5
3E94 27 C9            BEQ    VEC1      AGAIN
3E96 39               RTS
                *
                *     HEIGHT
                *
                *     MULTIPLIES THE DELTA INCREMENT IN XR BY THE HEIGHT
                *     AND ASPECT RATIO IF IT IS A WIDTH CALCULATION.
                *     TIMES THE PAPER SIZE RATIO FOR X-VECTORS.
                *     THEN ADDS VECTOR TO THE CHARACTER BASE COORDINATE
                *     AND SETS THE PLOTTER COORDINATE REGISTER.
                *
3E97 86 38      HEIGHT LDA A #$38
3E99 8D 27            BSR    INX2
3E9B BD 7735          JSR    FPM       TIMES SIZE
3E9E 96 6D            LDA A  REAL+5    WIDTH?
3EA0 26 07            BNE    HEI1      NO
3EA2 86 30            LDA A  #$30
3EA4 8D 1C            BSR    INX2      ASPECT
3EA6 BD 7735          JSR    FPM
3EA9 CE 0080    HEI1  LDX    #AT2
3EAC 96 24            LDA A  T11       X-VECTOR?
3EAE 26 0A            BNE    HEI2      NO
3EB0 86 40            LDA A  #$40
3EB2 8D 0E            BSR    INX2      PAPER SIZE RATIO
3EB4 BD 7735          JSR    FPM
3EB7 CE 0078          LDX    #AT1
3EBA BD 75FC    HEI2  JSR    FPA
3EBD 86 20            LDA A  #$20
3EBF 7E 39A1    SET1  JMP    SET


3EC2 7E 3975    INX2  JMP    INDX1
                *
                *
                *     CSIZE
                *
                *     SETS UP CHARACTER PLOTTING PARAMETERS.
                *
                *     USER PAZAMETERS:
                *         XR - ANGLE (0,1,2,3)
                *         YR - HEIGHT (%)
                *         ZR - ASPECT RATIO (HEIGHT/WIDTH)
                *         TR - PAPER SIZE RATIO (HEIGHT/WIDTH)
                *
                *     THE ANGLE SPECIFICATION IS 0=ZERO DEGREES.
                *     1=90 DEGREES. 2=180 DEGREES. AND 3=270 DEGREES.
                *     THE DIRECTION TABLE IS SET UP AS FOLLOWS:
                *     WIDTH DIRECTION. WIDTH SIGN. HEIGHT DIRECTION.
```

```
                              *    AND HEIGHT SIGN.
                              *    0 - 00,00,08,00 (HEX)
                              *    1 - 08,00,00,80 (HEX)
                              *    2 - 00,80,08,80 (HEX)
                              *    3 - 08,80,00,00 (HEX)
                              *    THE HEIGHT IS STRICTLY A PERCENTAGE OF PLOTTING
                              *    AREA.  THE EXPONENT OF VALUE IS INCREMENTED BY TWO
                              *    AND STORED AS THE ABSOLUTE VALUE.
                              *    THE ASPECT RATIO IS STORED AS A RECIPROCAL OF THE
                              *    PASSED VALUE FOR CONVIENCE.
                              *    ONE, TWO, THREE, OR FOUR PARAMETERS MAY BE CHANGED
                              *    BY CLEARING THE NEXT HIGHER STACK REGISTER.
                              *
                              *
3EC5 BD 3924 CSIZE   JSR     INIT
3EC8 96 90           LDA A   XR
3ECA 27 06           BEQ     CSC2
3ECC 86 06   CSC1    LDA A   #6
3ECE 97 06           STA A   ERROR     ERROR EXIT
3ED0 20 67           BRA     CSC6
3ED2 D6 92   CSC2    LDA B   XR+2
3ED4 54              LSR B
3ED5 54              LSR B
3ED6 54              LSR B
3ED7 54              LSR B
3ED8 C1 03           CMP B   #3
3EDA 2E F0           BGT     CSC1      TOO BIG
3EDC 86 3C           LDA A   #$3C
3EDE 8D E2           BSR     INX2
3EE0 4F              CLR A
3EE1 A7 00           STA A   0,X
3EE3 A7 01           STA A   1,X
3EE5 A7 02           STA A   2,X
3EE7 A7 03           STA A   3,X
3EE9 86 08           LDA A   #8
3EEB 54              LSR B
3EEC 24 0B           BCC     CSC3      0 OR 2
3EEE A7 00           STA A   0,X
3EF0 86 80           LDA A   #$80
3EF2 5D              TST B
3EF3 27 0D           BEQ     CSC4      1
3EF5 A7 01           STA A   1,X       3
3EF7 20 0B           BRA     CSC5
3EF9 A7 02   CSC3    STA A   2,X
3EFB 86 80           LDA A   #$80
3EFD 5D              TST B
3EFE 27 04           BEQ     CSC5      0
3F00 A7 01           STA A   1,X       2
3F02 A7 03   CSC4    STA A   3,X
3F04 96 9A   CSC5    LDA A   YR+2
3F06 27 31           BEQ     CSC6      EXIT
3F08 86 38           LDA A   #$38
3F0A 8D B6           BSR     INX2
3F0C 96 98           LDA A   YR
3F0E 4C              INC A
3F0F 4C              INC A
3F10 A7 00           STA A   0,X
3F12 96 9A           LDA A   YR+2
3F14 A7 02           STA A   2,X       SET HEIGHT (SIZE)
3F16 96 9B           LDA A   YR+3
3F18 A7 03           STA A   3,X
3F1A 96 A2           LDA A   ZR+2
3F1C 27 1B           BEQ     CSC6      EXIT
3F1E CE 00A0         LDX     #ZR
3F21 BD 743B         JSR     TXXR
3F24 BD 73E6         JSR     RECIP     1/ASPECT
3F27 86 30           LDA A   #$30
3F29 8D 94           BSR     SET1
3F2B 96 AA           LDA A   TR+2
3F2D 27 0A           BEQ     CSC6      NULL PARAMETER
3F2F CE 00A8         LDX     #TR
3F32 BD 743B         JSR     TXXR      LOAD PAPER RATIO
3F35 86 40           LDA A   #$40
```

```
3F37 8D 86            BSR     SET1      SAVE
3F39 7E 390E CSC6     JMP     EXIT      DONE



3F4D                  ORG     $3F4D
                 *    FLOATING POINT CONSTANT  C2=50.
                      OPT     NG
3F4D 01               FCB     1,0,$50,0,0,0,0,0
                      OPT     G
                 *
                 *    CTBL
                 *
                 *    TABLE ORGANIZED THREE BYTES PER CHARACTER,
                 *    TWO COMMANDS PER BYTE.
                 *
                 *    COMMANDS:
                 *      0 - END OF CHARACTER
                 *      1 - MOVE TO 'A'
                 *      2 - MOVE TO 'B'
                 *      3 - MOVE TO 'C'
                 *      4 - MOVE TO 'D'
                 *      5 - MOVE TO 'E'
                 *      6 - MOVE TO 'F'
                 *      7 - MOVE TO 'G'
                 *      8 - MOVE TO 'H'
                 *      9 - MOVE TO 'I'
                 *      A - LIFT PEN
                 *      B - MOVE IN SEQUENCE 'A','C','E'
                 *      C - MOVE IN SEQUENCE 'F','G'
                 *
                 *      C  D  E
                 *
                 *      B  I  F
                 *
                 *      A  H  G
                 *



                      OPT     NG
                 *    DOLLAR SIGN
3F55 17          CTBL FCB     $17,$35,$48
                 *    QUOTE
3F58 49               FCB     $49,0,0
                 *    LEFT PAREN
3F5B 43               FCB     $43,$18,0
                 *    RIGHT PAREN
3F5E 45               FCB     $45,$78,0
                 *    MULTIPLY
3F61 15               FCB     $15,$43,$70
                 *    ADD-PLUS
3F64 84               FCB     $84,$A2,$60
                 *    COMMA
3F67 98               FCB     $98,0,0
                 *    MINUS
3F6A 26               FCB     $26,0,0
                 *    PERIOD
3F6D 80               FCB     $80,0,0
                 *    SLASH
3F70 15               FCB     $15,0,0
                 *    ZERO
3F73 87               FCB     $87,$15,0
                 *    ONE
3F76 84               FCB     $84,0,0
                 *    TWO
3F79 35               FCB     $35,$69,$17
                 *    THREE
3F7C 35               FCB     $35,$69,$C1
                 *    FOUR
3F7F 32               FCB     $32,$65,$70
                 *    FIVE
3F82 17               FCB     $17,$92,$35
```

```
00881                   *    SIX
00882 3F85 2C                 FCB    $2C,$80,0
00883                   *    SEVEN
00884 3F88 35                 FCB    $35,$80,0
00885                   *    EIGHT
00886 3F8B 7B                 FCB    $7B,$62,$C0
00887                   *    NINE
00888 3F8E 62                 FCB    $62,$35,$71
00889                   *    COLON
00890 3F91 9A                 FCB    $9A,$80,0
00891                   *    SEMI-COLON
00892 3F94 4A                 FCB    $4A,$98,0
00893                   *    LESS THAN
00894 3F97 42                 FCB    $42,$80,0
00895                   *    EQUAL
00896 3F9A 17                 FCB    $17,$A2,$60
00897                   *    GREATER THAN
00898 3F9D 46                 FCB    $46,$80,0
00899                   *    QUESTION MARK
00900 3FA0 35                 FCB    $35,$9A,$80
00901                   *    '@'
00902 3FA3 87                 FCB    $87,$89,$60
00903                   *    A
00904 3FA6 86                 FCB    $86,$2C,0
00905                   *    B
00906 3FA9 89                 FCB    $89,$2C,$10
00907                   *    C
00908 3FAC 54                 FCB    $54,$28,$70
00909                   *    D
00910 3FAF 13                 FCB    $13,$46,$81
00911                   *    E
00912 3FB2 78                 FCB    $78,$A2,$90
00913                   *    F
00914 3FB5 8A                 FCB    $8A,$29,0
00915                   *    G
00916 3FB8 9C                 FCB    $9C,$80,0
00917                   *    H
00918 3FBB 13                 FCB    $13,$26,$57
00919                   *    I
00920 3FBE 48                 FCB    $48,0,0
00921                   *    J
00922 3FC1 21                 FCB    $21,$75,0
00923                   *    K
00924 3FC4 13                 FCB    $13,$A5,$27
00925                   *    L
00926 3FC7 31                 FCB    $31,$70,0
00927                   *    M
00928 3FCA 13                 FCB    $13,$95,$70
00929                   *    N
00930 3FCD 13                 FCB    $13,$75,0
00931                   *    O
00932 3FD0 87                 FCB    $87,$10,0
00933                   *    P
00934 3FD3 86                 FCB    $86,$20,0
00935                   *    Q
00936 3FD6 7B                 FCB    $7B,$79,0
00937                   *    R
00938 3FD9 86                 FCB    $86,$29,$70
00939                   *    S
00940 3FDC 17                 FCB    $17,$62,$35
00941                   *    T
00942 3FDF 35                 FCB    $35,$48,0
00943                   *    U
00944 3FE2 31                 FCB    $31,$75,0
00945                   *    V
00946 3FE5 38                 FCB    $38,$50,0
00947                   *    W
00948 3FE8 31                 FCB    $31,$97,$50
00949                   *    X
00950 3FEB 15                 FCB    $15,$A3,$70
00951                   *    Y
00952 3FEE 39                 FCB    $39,$59,$80
```

```
                 *      Z
3FF1 35                 FCB     $35,$17,0
                 *      FLOATING POINT CONSTANT  C1=1/9999.
3FF4 FC                 FCB     $FC,0,$10,0,$10,0,$10,0,$10
                 *      UP ARROW
3FFD 24                 FCB     $24,$64,$80
                        OPT     G
```

```
                 *
                 *      ADDRESS JUMP TABLE
                 *
3805                    ORG     $3805
3805 3CF8               FDB     WRITE
380F                    ORG     $380F
380F 3907               FDB     DGTZ4
3819                    ORG     $3819
3819 3805               FDB     DGTZ3
3818 3D46               FDB     PRNTX
381D 3EC5               FDB     CSIZE
381F 3800               FDB     DGTZ5
3821 3803               FDB     DGTZ1
3823 3802               FDB     DGTZ2
                        END
```

SYMBOL TABLE

| | | | | | | | | | | | |
|---|---|---|---|---|---|---|---|---|---|---|---|
| ADATA | 0000 | ACTL | 0001 | BDATA | 0002 | 3CTL | 0003 | INPUT | 0004 | IOIN | 0005 |
| ERROR | 0006 | TGL | 0007 | UFLG | 0008 | RSFLG | 0009 | EOM | 000A | EOPM | 0003 |
| STKFLG | 000D | RND | 000E | DIGFLG | 000F | W2 | 0010 | W1 | 0011 | SFLG | 0012 |
| DCNTR | 0013 | TP1 | 0014 | TP1S | 0015 | TP2 | 0016 | TP2S | 0017 | TP3 | 0018 |
| TP3S | 0019 | TP4 | 001A | TP4S | 001B | TP5 | 001C | TP5S | 001D | TP6 | 001E |
| TP6S | 001F | TP7 | 0020 | TP7S | 0021 | T13 | 0022 | T12 | 0023 | T11 | 0024 |
| T10 | 0025 | T9 | 0026 | T8 | 0027 | T7 | 0028 | T6 | 0029 | T5 | 002A |
| T4 | 002B | T3 | 002C | T2 | 002D | T1 | 002E | ISTK | 002F | ISTACK | 0051 |
| TA | 0052 | SPGM | 0054 | EXTRA | 0056 | BUFF | 0058 | REAL | 0068 | IMAG | 0070 |
| AT1 | 0078 | AT2 | 0080 | W | 0088 | XR | 0090 | YR | 0098 | ZR | 00A0 |
| TR | 00A8 | LSTX | 00B0 | BKWRT | 00B8 | BKKC | 00BA | SOL7 | 00C6 | UPP | 00C8 |
| UIP | 00CA | ALPHA | 00CC | IO1 | 00CD | IO2 | 00D0 | IT7 | 00D3 | FLAG | 00D5 |
| TPOS | 00D6 | FILE | 00D7 | AR | 00D8 | BR | 00E0 | CR | 00E8 | DR | 00F0 |
| ER | 00F8 | SDB9 | 00BA | MT | 7E00 | TERMN7 | 003D | IMED | 0040 | PARCD | 00C0 |
| PAREX | 0080 | NTBL | 0000 | DOTS | 5EC0 | PRTDPV | 602D | FRMT | 5CA8 | BLANK | 5D75 |
| LDMSG | 579D | ROLLD | 55B2 | ROLLU | 57F1 | PSD | 550A | TXL | 55E9 | STKUP | 55EF |
| MAD | 749B | CMP | 74AA | NOR | 74D6 | TXW | 7424 | TXXR | 743B | EXXR | 7452 |
| ARSR | 753B | OVUNF | 75B6 | OVERF | 75DD | XR0 | 740A | XRNINE | 75C8 | UNDRF | 75F1 |
| IMULT | 7689 | QDG | 7669 | FPA | 75FC | FPS | 75F6 | FPM | 7735 | FPD | 7793 |
| FPAEX | 763D | FPMEX | 7780 | LSHIFT | 7521 | ZEROX | 7489 | XZEROQ | 7416 | XZERO2 | 7417 |
| RECIP | 73E6 | TXPX | 73F3 | CONST | 6800 | FPDBRC | 6898 | TAN | 68A9 | ATN | 69C3 |
| DSZERO | 6A46 | NTLN | 6A58 | EXPN | 6AC9 | SIN | 6B94 | COS | 6B9A | ASIN | 6BF2 |
| ACOS | 6BF7 | PH1 | 6C5D | PH2 | 6C8D | PH3 | 6D34 | PH4 | 6DD0 | LSFT8 | 6E47 |
| SQRT | 6E65 | MADA | 6F2C | CMPR | 53E4 | IOUPX | 6F52 | LOG10 | 6FA7 | YUPX | 6FE9 |

| | | | | | | | | | | | | | |
|---|---|---|---|---|---|---|---|---|---|---|---|---|---|
| RTOP | 7328 | PTOR | 7386 | ADJST | 38C3 | EXIT | 390E | INIT | 3924 | RESXR | 396E |
| INOX | 3973 | INDX1 | 3975 | SET | 39A1 | GET | 39A6 | TEMP1 | 39AA | MOVQ | 3A94 |
| MOV | 3A83 | PENU | 3B8F | PEND | 3B95 | ZERXR | 3BA1 | DGTZ5 | 3BD0 | DGTZ2 | 3BD2 |
| DGTZ1 | 3BD3 | DGTZ3 | 3BD5 | DGTZ4 | 3BD7 | DT0 | 3BE5 | DT1 | 3BF4 | DT3 | 3C1C |
| DT4 | 3C30 | DT4A | 3C34 | DT5 | 3C40 | DT6 | 3C50 | DT7 | 3C54 | DT8 | 3C58 |
| DT9 | 3C85 | DT10 | 3C95 | SETUP | 3CA0 | ST1 | 3CCB | SET2 | 3CCF | SET3 | 3CD3 |
| RANGE | 3CDD | RAN1 | 3CE4 | RAN2 | 3CF3 | WRITE | 3CF8 | LET1 | 3D0A | LET2 | 3D10 |
| LET3 | 3D14 | LET4 | 3D22 | LET5 | 3D25 | LET6 | 3D2D | LET7 | 3D31 | LET8 | 3D35 |
| GETC | 3D38 | GET1 | 3D45 | PRNTX | 3D46 | NMBR | 3D4C | NUM1 | 3D5B | NUM2 | 3D63 |
| NUM2A | 3D74 | NUM3 | 3D76 | NUM4 | 3D95 | NUM5 | 3D99 | SAVE | 3D9A | TXR | 3DAF |
| OUTC | 3DB2 | OUT0 | 3DC6 | OUT1 | 3DD2 | OUT2 | 3DE2 | OUT3 | 3DE7 | OUT4 | 3E0F |
| OUT4A | 3E11 | OUT6 | 3E16 | POINT | 3F24 | DELE | 3E2C | DELD | 3E2D | DELC | 3E2E |
| DELB | 3E2F | DELF | 3E32 | DELG | 3E33 | DELI | 3E36 | DELH | 3E37 | LIFT | 3E3A |
| SEQ1 | 3E3F | SEQ2 | 3E4A | VECTR | 3E53 | VEC1 | 3E5F | VEC2 | 3E7B | VEC3 | 3E8E |
| VEC4 | 3E90 | HEIGHT | 3E97 | HEI1 | 3EA9 | HEI2 | 3EBA | SET1 | 3EBF | INX2 | 3EC2 |
| CSIZE | 3EC5 | CSC1 | 3ECC | CSC2 | 3ED2 | CSC3 | 3EF9 | CSC4 | 3F02 | CSC5 | 3F04 |
| CSC6 | 3F39 | CTBL | 3F55 | | | | | | | | |

TOTAL ERRORS 1

CALCULATOR OPERATION

GENERAL DESCRIPTION

Figure 3:
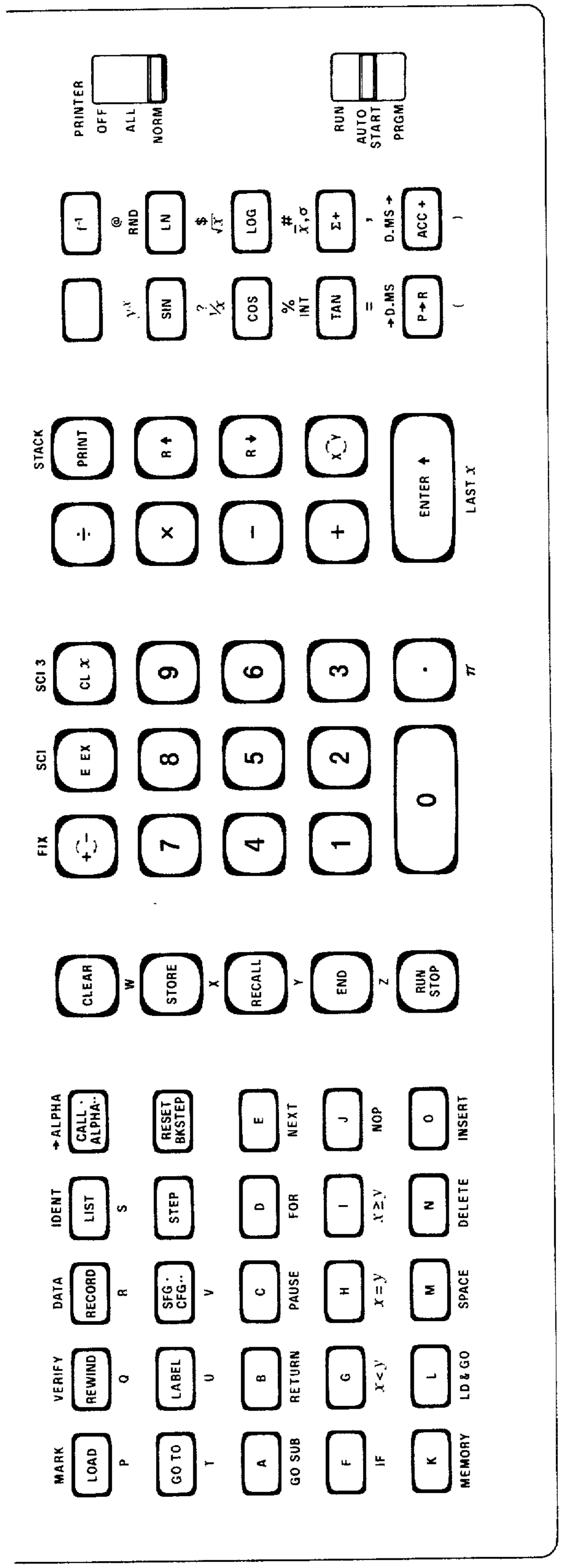
FIG. 3 is a plan view of the keyboard input unit employed in the programmable calculator of FIG. 1.

All operations performed by the calculator may be controlled or initiated by the keyboard input unit and/or by keycodes entered into the calculator from the keyboard input unit, the magnetic tape cassette unit, or peripheral I/O units and stored, in modified form, as program steps in the program storage section of the read-write memory. An operational description of the calculator is therefore now set forth with specific reference to the perspective view of the calculator as shown in FIG. 1 and the plan view of the keyboard as shown in FIG. 3, except as otherwise indicated.

The calculator employs reverse polish notation (RPN) language that involves the use of an operational stack of four registers referred to herein as the X, Y, Z and T registers. Simple arithmetic operations are performed by placing data in the X and Y registers and then actuating one of the arithmetic operator keys. The calculated result is placed in the X register.

The 16-character display 14 shows each number entered from the keyboard 10 and each calculated result. The 16-column thermal printer 16 can be called upon to print the data currently displayed. In addition, the display 14 and printer 16 are valuable programming aids.

The dynamic range of the calculator is from $-9.999999999 \times 10^{99}$ through $9.999999999 \times 10^{99}$. When a calculated result lies outside this range, the message OVERFLOW is printed. All calculations are to twelve places, but the accuracy depends upon the function performed. Ordinary arithmetic functions are accurate to one count in the 12th digit.

In addition to the four working registers X, Y, Z, and T comprising the operational stack, the basic calculator includes ten permanent data storage registers and a 472-step program memory. The program memory may be expanded to 2008 program steps by adding read-write memory to the calculator, as discussed hereinabove. Additional data storage registers may be assigned by the user when needed.

The calculator may be operated by means of a program stored on an external magnetic tape cartridge placed into the magnetic tape cassette reading and recording unit 12. External magnetic tape cartridges can store either pre-recorded factory programs or programs written by the user.

By inserting optional plug-in I/O ROMs into one or both of the slots provided therefor on the rear panel of the calculator, the calculator may be interfaced to one or more peripheral I/O units. These include, for example, the Hewlett-Packard 9862A X-Y Plotter the Hewlett-Packard 9863A Paper Tape Reader, the Hewlett-Packard 9884A Paper Tape Punch, the Hewlett-Packard 9864A Digitizer, and the Hewlett-Packard 9866A Page Printer. In addition, the calculator may be interfaced to most BCD-compatible instrumentation and, through the use of a universal interface bus manufactured by Hewlett-Packard Company, to nearly all bus-compatible instrumentation.

KEYBOARD OPERATIONS

FIG. 3 illustrates the layout of the calculator keyboard and includes the mnemonic designation or designations associated with each of the keys. Many of the keys have both a primary function designated by the mnemonic inside the key outline and a secondary function designed by the mnemonic above the key outline, with the exception of an ENTER ↑ key, a DECIMAL POINT key, and a group of keys A–O located in the lower left-hand corner of the keyboard, all of whose alternate functions are designated by mnemonics below the key outline. With the exception of keys A–O, these alternate functions may be entered by prefacing actuation of the desired key by actuation of a blank key located in the upper right-hand portion of the keyboard (hereinafter referred to as the BLANK key). The alternate functions indicated below keys A–O all represent programming functions that are entered by merely actuating their associated keys whenever the calculator is in a program mode of operation. No preceding actuation of the BLANK key is required in connection with this group of functions.

Some of these and other keys of the keyboard are associated with characters located below the key outline. These characters may be printed and are automatically entered into the calculator by actuation of their associated keys when the calculator is in an ALPHA mode of operation, described in detail hereinafter.

The two switches on the far right-hand side of the keyboard are used to select the various printer and calculator operating modes. The printer switch is set to the ALL position to automatically print each keyboard operation. To conserve paper, the printer switch may be placed in the OFF position. The printer switch may be placed in the NORMAL position to enable printing during program entry but to suppress printing during execution of functions. The NORMAL position is useful to avoid manually switching the printer off to suppress oftentimes undesired printing during function execution. The calculator will print various messages regardless of the setting of the printer switch. These include messages indicative of peripheral I/O unit status and error messages indicative of incorrect operations. A list of printed error messages is included hereinafter. The operating mode switch is placed in the RUN position when executing functions from the keyboard of when running a program stored in read-write memory.

The 16-character display indicates a calculator busy condition during lengthy keyboard or program executions by displaying a hyphen at each character position of the display. A displayed number may be printed at any time by simply actuating the PRINT key.

The number entry keys of the keyboard are arranged as on an adding machine. Numbers are entered into the calculator one digit at a time from left to right and may include a decimal point. Before entering a second number into the calculator, the first one is saved by actuating the enter ↑ key. To enter a negative number into the calculator, the +⇄− key is actuated after keying in the number. The +⇄− key may simply be actuated to change the sign of a calculated result. Large numbers may be entered in scientific notation by actuating the E EX key operationsl entry of the mantissa and the exponent.

The X register may be cleared anytime during number entry by actuating the CLX key. All four registers of the operaational stack may be cleared by actuating the CLEAR key. The RESET key may be used to clear a key sequence that has not been completed.

Calculations involving two numbers and one arithmetic operator are performed by keying in the first number, saving it in the Y register by actuating the ENTER ↑ key, keying in the second number, and finally actuating the selected arithmetic operator key. The result, appearing in the X register, is displayed.

Calculations involving more than one arithmetic operation are performed by keying in the first number and saving it and then keying in subsequent numbers each followed by the appropriate arithmetic operator. Only the first number keyed in need be saved by actuating the ENTER ↑ key. Each subsequent number keyed in after actuation of an arithmetic operator key is automatically saved.

The last number entered into the calculator before actuation of an operator key is automatically stored in a location called LAST X. That number may be recalled into the X register and used after actuation of that operator key by actuating the BLANK key followed by the LAST X key. Such a recall also causes an automatic ENTER ↑ just like keying in a number after actuation of an arithmetic operator key. The LAST X location is not cleared by actuation of either the CLEAR or CLX keys.

Simple arithmetic operations like those discussed above require the use of only the X and Y registers of the operational stack. More complicated functions require the use of either or both of the Z and T registers of the operational stack. The four registers of the operational stack may be thought of as being arranged vertically, the X, Y, Z, and T registers being stacked from bottom to top, respectively. Numbers entered from the keyboard are automatically placed in the X register. A subsequent, actuation of the ENTER ↑ key duplicates that number in the Y register while moving the number previously stored in the Y register to the T register. The number previously stored in the T register is lost. Actuation of the ENTER ↑ key thus moves the contents of the stack registers up. Similarly, when an arithmetic operator key is actuated, the result of the operation is placed in the X register and the previous contents of the Z and T registers are moved down to the Y and Z registers, respectively.

The contents of the stack registers may be manipulated by some control keys of the keyboard. The X⇄Y key exchanges the contents of the X and Y registers without disturbing the Z and T registers. The R ↓ key rolls the contents of each stack register down to the next register, the contents of the X register being placed in the T register. A similar operation is performed in the up direction by the R ↑ key. Actuation of the BLANK key followed by the STACK key prints the contents of each of the stack registers in sequence from T to X.

Printed and displayed numbers normally appear in a fixed format with two digits to the right of the decimal point. To select another fixed format, the BLANK key is actuated and is followed by actuation of the FIX key and one of the numeric keys 0 through 9. The numeric key indicates the number of digits to the right of the decimal point. When a calculated result of a number entered from the keyboard is too large for the present fixed format, a scientific format is automatically selected by the calculator. The user may select either a standard scientific format or a special scientific format for displayed and printed numbers. The standard scientific format is selected by actuating the BLANK key followed by the SCI key followed by one of the numeric keys. As in the case of a fixed format, the numeric key indicates the number of digits to the right of the decimal point. The special scientific format is selected by actuating the BLANK key followed by the SCI3 key followed by a numeric key. When this format has been selected, printed and displayed numbers appear with exponents that are always even multiples of three.

Ten fixed data storage registers are automatically provided the user for storing numbers representing, for example, intermediate results of calculations. Each of these registers can store one number and is accessed for storage and recall by actuating the STO and RCL keys followed by one of the keys A through J that designate each of the registers. Additional data storage registers may be assigned by the user as needed.

All data storage registers are automatically cleared when the calculator is turned on. To clear fixed data storage registers A through J, without disturbing other registers, the STO key is actuated and is followed by actuation of the CLEAR key. Additional data storage registers assigned by the user are cleared by storing zero in them or by using a clear routine set forth hereinafter.

Arithmetic operations may be performed directly on the contents of the X register and a data storage register without first recalling the stored number. The result is placed in the data storage register without disturbing the contents of the X register. These operations are performed by actuating the STO key followed by the desired arithmetic operator key followed by the key or keys designating the desired storage register.

Indirect store and recall operations may be performed by specifying a register designation that contains the designation of the register in which the desired data is stored. These operations are performed just like direct store and recall operations, except that the RCL key is actuated before the key designating the intermediate register is actuated. Only the absolute integer value of the contents of the intermediate register is used as the indirect register number. The sign and any fractional part are ignored.

The above-described register arithmetic and indirect storage operations may be combined to perform indirect register arithmetic. The general key sequence is the STO key followed by the desired arithmetic operator key followed by the RCL key followed by the storage register designation key. In each case, the chosen arithmetic operation is performed on the contents of the X register and the contents of the register designated by the contents of the register designated in the key sequence. The result is placed in the register designated in the key sequence and the X register remains unchanged.

Additional data storage registers may be assigned by the user as required. These data storage registers are formed from the portion of user read-write memory not already filled with program instructions. The additional data storage registers are assigned by actuating the numeric keys representing the desired number of additional data storage registers followed by the BLANK key followed by the STO key. If the unfilled portion of user read-write memory is not large enough to accept a particular data storage assignment, an error message MEMORY OVERFLOW will be printed, and the attempted assignment will be ignored. Additional data storage registers remain assigned until the assignment is either changed or the calculator is turned off. The contents of previously assigned data storage registers are not altered by a subsequent assignment so long as they lie within the subsequent assignment. If there is not enough program memory available to accept a specified register assignment, an error message MEMORY OVERFLOW will be printed, and the assignment will be ignored. The user may assign up to 250 additional data storage registers when the calculator is configured with the optional read-write memory 103 shown in FIG. 4. These registers are labelled from 000 through 249. The portion of user read-write memory not assigned as data storage registers is available for storing program steps. This arrangement results in more efficient use of the read-write memory than is possible in those calculators and computers having separate fixed areas for program and data storage. The above key sequence for assigning additional data storage registers may be executed either manually or from program control, thus giving the user flexibility in reconfiguring the user read-write memory to accommodate his specific requirements at any point in time. This eliminates the often encountered problem in prior art calculators and computers of having too much program storage and not enough data storage or vice versa. In addition to providing this memory definition flexibility for the user, the calculator provides complete protection for each storage area. That is, the calculator prevents the user from storing data into a storage register that has not been previously assigned as a data storage register and similarly prevents him from storing program steps into the assigned data storage registers. If the user attempts to store data into a data storage register that has not previously been assigned, an error message ILLEGAL ADDRESS will be printed.

A block of assigned data storage registers may be cleared by first deleting the block and by then reassigning it. For example, if data storage registers 000 through 024 have been assigned and it is desired to clear registers 010 through 024, this may be accomplished by first assigning registers 000 through 009 and by then assigning registers 000 through 024. The result is that assigned data storage registers 010 through 024 are cleared while registers 000 through 009 remain unaltered.

In addition to the four simple arithmetic functions previously discussed, there are twenty-four scientific functions represented by keys on the keyboard. These keys are grouped in a block and are located near the right-hand side of the keyboard just to the left of the printer and control switches. Each of these scientific function keys has primary, alternate, and inverse functions associated with it. A primary function is designated by merely actuating the desired key. The alternate function associated with a particular key, indicated by nomenclature above the key, is selected as discussed above by first actuating the BLANK key. The inverse function is designated by first actuating the $f^{-1}$ key.

Functions involving angles, such as trigonometric functions and angular conversions, may be performed in either decimal degrees, radians or metric grads. The calculator is automatically set to accept angle values in degrees when it is turned on. Thus, the user may specify any of the three units to angular measurement by actuating the BLANK key followed by the numeric keys, 1, 2, and 3 for degrees, radians, and grads, respectively.

A conversion from decimal angular units to degrees, minutes, and seconds is available from the keyboard by actuating the BLANK key followed by the → D.MS key. A conversion from degrees, minutes, and seconds to the equivalent decimal form of the angular units currently selected is available by actuating the BLANK key followed by the D.MS → key. When performing the conversion from decimal degrees, radians or grads to degrees, minutes, and seconds, the result returned to the X register includes the decimal portion of seconds.

PRINTER CONTROL

An ALPHA mode of operation may be selected by actuating the CALL ALPHA key twice. This key is also used, by actuating it just once, to access control of peripheral I/O units connected to the calculator. After actuating this key twice, the message ALPHA appears in the display to indicate that the ALPHA mode has been selected. The user may then selectively actuate the various alphanumeric keys of the keyboard to form a desired message. After the last alphanumeric character of the message has been keyed in, the ALPHA mode may be terminated and the message printed by actuating the CALL ALPHA key once more. In the event the desired message is sixteen or more characters in length, printing will automatically occur as every sixteenth character is keyed in.

A number of keys of the keyboard take on control functions in the ALPHA mode of operation. For example, the ENTER ↑ key becomes a NEW LINE control key. Actuation of this key causes the calculator to print all alphanumeric characters that have been keyed in and to then advance the printer paper to the next line. Successive actuations of the NEW LINE key cause the calculator to advance the printer paper one line at a time. The X⇄Y key becomes a SPACE control key during the ALPHA mode of operation and is used to insert spaces into an alphanumeric character message. Actuation of the PRINT key at a selected position within an alphanumeric message causes the calculator to print the number currently stored in the X register at that position within the alphanumeric message. The number appears right justified on the line unless alphanumeric characters follow the number. It is also printed in the particular fixed or scientific number format currently selected. This feature is useful for printing labels and calculated results on the same line. The printed number always appears on the same line as the alphanumeric message, provided there is sufficient space for it within the 16-column print field. If the space available is too small, the entire number is printed on the next succeeding line of print. In the event the user makes an error while keying in an alphanumeric message, the ALPHA mode may be cancelled without printing the message by placing the control switch in the lower right-hand corner of the keyboard in the PRGM position and then back to the RUN position. This switch movement has no effect on the numbers stored in the four registers of the operational stack or on the calculator memory.

PROGRAMMING

Figure 29:
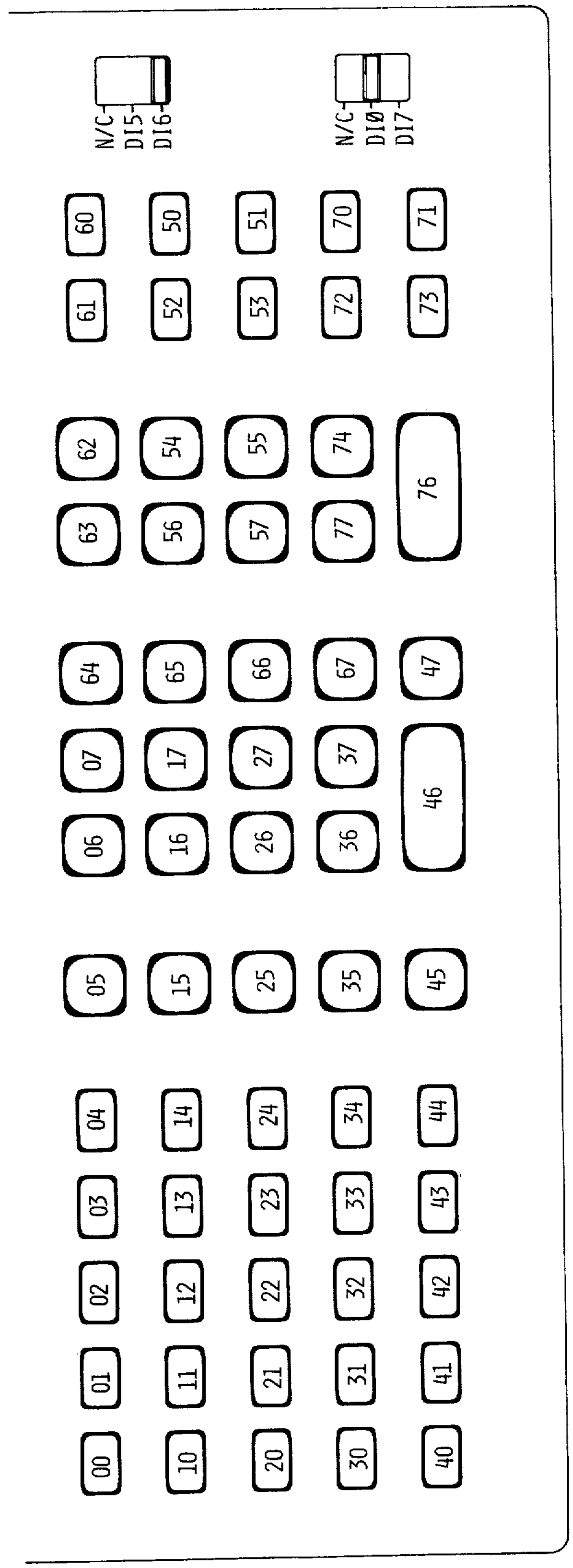
FIG. 29 is a diagram showing the unique keycode associated with each one of the keys of the keyboard of FIG. 3.

In addition to manual execution of commands entered from the calculator keybard, the calculator may also be operated automatically by a program stored in the user read-write memory. The program is stored in the form of a modified version of the keycodes associated with each of the keys, as shown in FIG. 29. Unlike some calculators in which only a portion of the keys are programmable, the present calculator permits the user to include within a program every key sequence associated with manual operation of the calculator. In addition, the calculator keyboard includes a block of keys representing program control functions. These include subroutine branching and labelling keys, qualifier keys, and looping keys for repeating program segments automatically. These program control keys are located in the left-hand third of the keyboard area. They include the alternate functions shown below keys A through O. The basic read-write memory has capacity for storing 472 program steps at locations 0000 through 0471. By adding an optional read-write memory, program storage can be increased to 2008 program steps. Each step comprises one program instruction that may be either a single key actuation such as the + key or the PRINT key or a combined key sequence such as the STO key followed by the A key or the BLANK key followed by the SIN key. Appropriate key sequences are combined automatically as a program is entered, and a single instruction code representing the entire sequence is stored in user read-write memory. This instruction code is built internally by a series of firmware syntax tables. These tables define a number of key sequences that are valid at any given time along with their corresponding instruction codes. This arrangement is unlike prior art calculators in which each key actuation occupies a separate storage location in memory. The arrangement in the present calculator is advantageous in that a larger program may be stored in the same amount of memory. It is also advantageous in that program execution is more efficient because less syntax checking is required at that time. This results from the fact that a partial syntax check has, in effect, been performed at the time the program was entered to recognize those key sequences resulting in a single internal instruction code.

The program storage portion of the user read-write memory of the calculator may be cleared before entering each new program without altering the contents of any of the data storage registers or the operational stack registers. This is accomplished by placing the control switch in the PRGM position and sequentially actuating the K and N keys. The calculator may be turned off to clear the entire read-write memory.

The calculator includes an internal program counter for determining which program step is displayed, printed or executed. Many programming keys and instructions control the operation of the program counter, allowing the user to enter, edit, run, and record programs. The program counter may be set to any desired step when the calculator is in the PRGM mode by actuating the GO TO key followed by numeric keys representing the program step location in memory. Just as in specifying assigned data storage registers, only the significant digits representative of the memory location need by keyed in if those key actuations are immediately followed by actuation of a non-numeric key or the DECIMAL POINT key. For example, to set the program counter to location 0025, the calculator is placed in the RUN mode and the key sequence GO TO 25. is entered, or the key sequence GO TO 0025 is entered. The calculator is then placed in the PRGM mode, and the current step location 0025 together with the number of step locations between the current step location and the end of the program storage portion of the user read-write memory are displayed. The program counter may be manually incremented or decremented while entering a program by actuating the STEP and BKSTEP keys. The program counter is automatically incremented as each program step is entered. It is automatically set to step location 0000 whenever the END key is actuated while the calculator is in the RUN mode, whenever the calculator is turned on, and whenever the program storage portion of user read-write memory is erased.

A program is entered by setting the program counter to the desired beginning step location and by then placing the calculator in the PRGM mode and keying in the program. As each program step is entered the printer lists the step instruction and prints the next step location. The last step instruction of each program must be END.

The printer automatically lists each step location and step instruction during program entry if the printer switch is in the NORM position. When the calculator is in the PRGM mode, the printer also lists each step location as the program counter is manually incremented or decremented. Any portion of a stored program may be listed by setting the program counter to the desired beginning step location and actuating the LIST key. The listing may be stopped by actuating the RUN STOP key. Listing automatically stops when an END step instruction is encountered.

After the program has been entered, it may be executed by placing the calculator in the RUN mode, setting the program counter to the beginning of the program, and actuating the RUN STOP key. Program execution continues until either a STOP or END instruction is encountered. The user may halt program execution at any time by actuating the RUN STOP key.

Labels may be used as a program aid to name a location in a program. The label instruction is located immediately before the program area to which it refers. The program counter may then be set to the label location by an appropriate branching instruction such as GO TO. Labelling provides a method of addressing program segments independent of step location in memory. A time-saving technique often used when entering and debugging programs is to use labels whenever possible for branching. Then, as program steps are inserted or deleted the branching instructions do not need to be altered. Once the program is operating satisfactorily is the labels originally used in connection with the branching instructions may be replaced with absolute step locations in memory.

A label may be entered by actuating the LABEL key followed by one or more alphanumeric keys to designate the label. For example, if it is desired to establish a label 01 located at step location 0050, the program counter is first set to that step location and the key sequence LABEL 01 is entered. A labelled program segment may be executed under program control manually from the keyboard. To execute a program segment labelled 06 from the keyboard, it is only necessary to enter the key sequence GO TO LABEL 6 RUN.

Execution of a branching instruction sets the program counter to a designated step location in memory. Program execution then automatically continues from that step location. Both absolute and computed branching instructions are available to the user. An absolute branching instruction causes the program counter to be set to a fixed step location that may be specified as a label. Actuation of the GO TO key followed by a numeric step location or actuation of the GO TO key followed by the LABEL key followed by alphanumeric keys representative of a label are exemplary of absolute branching instructions.

A computed branch instruction results in the program counter being set to a step location indicated by the current contents of the X register. Depending upon the branching instruction, the absolute integer portion of the contents of the X register indicates either a step location or a numeric label. The general sequence for entering computed branching instructions is GO TO X or GO TO LABEL X. This arrangement for computed branching statements represents an advantage over prior art arrangements wherein the user was required to predefine a limited set of destination addresses for each computed branching instruction used and then compute the one address of the set to be used at a given point in time. In the present calculator, the user merely places the destination step location in the X register in advance of execution of the branching instruction. In addition, the user is given added flexibility in that the branch may be to either a computed fixed step location or to a computed label.

IF instructions cause the calculator to make logical comparisons between the contents of the X and Y registers or the current state of some program flags described hereinafter. If the comparison is true, the next program step instruction is executed. However, if the comparison is false, the next program step instruction is skipped. The program step instruction next following an IF instruction usually, but not necessarily, is a branching instruction. Eight IF instructions and their corresponding key sequences are shown in Table 3 below.

Table 3

| | |
|---|---|
| X < Y ? | IF X < Y |
| X = Y ? | IF X = Y |
| X ≧ Y ? | IF X ≧ Y |
| X < 0 ? | IF − |
| X > 0 ? | IF + |
| X = 0 ? | IF 0 |
| IS FLAG N SET? | IF SFG N |
| IS FLAG N CLEAR? | IF CFG N |

A subroutine is a sequence of program instructions that may be used repeatedly, perhaps in several different programs, yet need be stored only once in the memory. A program can branch to, or call, a subroutine at any time through use of a GO SUB instruction. Then, after the subroutine has been executed, a RETURN instuction located at the end of the subroutine causes execution to resume at the step instruction next following the GO SUB instruction. The GO SUB instruction calls a subroutine by specifying either a step location or a label, or it can be in computed branch form similar to the computed GO TO instruction. Subroutines may be nested to a depth of seven. Returns are made on a last in, first out basis, so the returning order is always opposite of the calling order.

FOR-NEXT instructions permit the repetition of any instruction sequence. The FOR and NEXT instructions form a loop with the instruction sequence to be repeated located between them. Each FOR-NEXT instruction is associated with a pair of data storage registers. Data register pairs A & F, B & G, and C & H are available for this purpose. The first register of each pair is specified in the FOR instruction and is the loop counter. The second register of each pair holds the final value. When register pairs A & F an B & G are used, the loop counter is incremented by unity each time the loop is executed. When register pair C & H is used, however, the loop counter is incremented as specified by the contents of register D. FOR-NEXT instructions may be nested but, since there are only three register pairs available, they may be nested only three deep.

Flags may be employed as programmable indicators to allow the calculator to make decisions or to advise the user of certain program conditions. Each of the flags is either set or cleared, and each may be set or cleared either manually from the keyboard or under program control. In addition, all flags are cleared by actuating the END key, by executing an END instruction within a program or by turning the calculator on. Eight flags are available in the calculator. Flags 1 through 4 are for general program use, while flags 5 through 8 have dedicated functions. As generally used, a flag is set by some program sequence or event. Then, later in the program, the state of the flag can be checked to determine a subsequent activity. Flags 1-4 may be set by actuating the SFG CFG key once followed by a numeric key to designate the flag. Those flags may be cleared by actuating the SFG CFG key twice followed by the appropriate numeric designation. Flags 5 and 6 are used to intercept certain error messages. When flag 6 is set, the suppressable error messages such as OVERFLOW will not be printed. Instead, flag 5 is automatically set whenever a suppressable error occurs. Flag 7 is automatically set whenever a STOP instruction is executed. If data is entered before program execution is continued, flag 7 is cleared. However, if no data is entered before program execution is continued, flag 7 remains set. Flag 8 may be toggled from the set to clear states by successive actuations of the SFG CFG key during program execution.

Several of the keys on the calculator keyboard are useful in performing editing functions on a program stored in the user read-write memory. When a program does not run as expected, the first step usually taken by the user is to examine a listing of the program. To list an entire program, the program counter is set to the first step location of the program, and the LIST key is actuated. A portion of a program may be listed by setting the program counter to the desired step location and then actuating the LIST key. The RUN STOP key may be actuated to halt the listing.

One method often used to check a defective program is to execute it, one instruction at a time. This may be done, while the calculator is in the RUN mode, by setting the program counter to the first step location of the program and then successively actuating the STEP key. Each time the STEP key is actuated, the current instruction is executed, the program counter is advanced to the next step instruction to be executed, and the executed result is displayed.

To change a program step instruction, the program counter is set to the desired step location, the PRGM mode is selected, the new instruction is entered from the keyboard, and the calculator is returned to the RUN mode. If the new instruction requires two program steps, while the old instruction required only one step, the calculator will automatically shift the remainder of the program by one step to accommodate the new instruction and will automatically renumber any affected branching instructions. Similarly, if the new instruction requires only one step, while the old instruction required two steps, the calculator will shift the remainder of the program by one step and renumber any affected branching instructions.

Program instructions may be deleted by setting the program counter to the step location of the unwanted instruction, placing the calculator in the PRGM mode, and then actuating the DELETE key. The calculator automatically moves the remainder of the program to fill the empty step and renumbers any affected branching instructions. An entire block of instructions may be deleted by setting the program counter to the first unwanted step, placing the calculator in the PRGM mode, and then actuating the DELETE key once for each instruction in the sequence. Each time an instruction is deleted the new instruction moved by the calculator to that step location will be printed unless the printer is turned off.

One or more instructions may be inserted into a program by first setting the program counter to the step location at which the first new instruction is to be placed. The calculator is then placed in the PRGM mode, the INSERT key is actuated, and the desired new instruction is keyed in. The insertion operation is terminated by placing the calculator in the RUN mode or actuating any one of the editing keys except MEMORY or DELETE. The calculator automatically renumbers any branching instructions affected during the insertion operation.

The program storage portion of user read-write memory may be cleared by placing the calculator in the PRGM mode and sequentially actuating the MEMORY and DELETE keys. This operation fills the program area with NOP instructions, which designate no operation. An NOP key is available on the keyboard for allowing the user to enter NOP instructions in his program. This arrangement is desirable, for example, in cases wherein the user wishes to presently reserve a step location for possible subsequent entry of an executable instruction.

Instructions forming an alphanumeric message to be printed may also be edited using the various keys just described. The only difference is that the calculator must first be placed in the ALPHA mode of operation, as described in the section above entitled PRINTER CONTROL. One exception is that the calculator must not be in the ALPHA mode when the user is attempting to delete alphanumeric instructions. Otherwise, actuation of the DELETE key will enter the alpha character O.

TAPE OPERATIONS

The magnetic tape cassette unit 12 built into the calculator allows the user to make permanent records on an external magnetic tape cartridge of his programs and data blocks. Each such program or data block may be subsequently read back into the calculator memory as often as desired. Five keys, all programmable, for controlling the operation of magnetic tape cassette unit 12 are provided on the left-hand portion of keyboard 10. Their primary functions are labelled LOAD, REWIND, RECORD, LIST, and L. Each external tape cartridge has capacity for about 96,000 program steps or the contents of about 12,000 data storage registers. A RECORD slide located on each tape cartridge may be positioned to prevent accidental erasure of information stored on a cartridge by inhibiting execution of a RECORD instruction.

The magnetic tape cassette unit routinely checks to insure that all the information being loaded into the calculator memory from an external tape cartridge corresponds exactly to the information originally recorded. If an error is detected during a data loading or program loading operation, an attempted reloading is made. If the information cannot be successfully loaded after three such automatic attempts, the loading operation is halted and an error message CHECKSUM ERROR is printed. Typical causes for such an error are badly worn or partially erased tapes or a dirty tape head.

Before programs or data can be recorded onto a blank tape cartridge, the cartridge must be initialized by performing one or more MARK TAPE instructions. Each MARK TAPE instruction records a block of empty files onto one track of the tape. Two tracks are available on each tape cartridge, and each track may be initialized and used for information storage and retrieval independent of the other. A primary track may be used by specifying a positive file number in each tape instruction. A secondary track may similarly be used by specifying a negative file number. A blank area is associated with the beginning of each file to serve as a file separator. A file identifier includes information relating to a particular file such as a file number, a file type, an absolute file size, a current file size, etc. A portion of each tape file called the file body is used for actual program or data storage. The absolute file size specified in the MARK TAPE instruction determines the size of this file body.

Each MARK TAPE instruction, entered by sequentially actuating the BLANK key and the MARK key, initializes one track of a tape cartridge by storing a block of empty files together with appropriate file identifiers. The integer portion of numbers stored in the Z, Y, and X registers specifies, respectively, the size of each file, the number of files in the block, and the number designator for the first file. The size of each file is expressed in program steps. To determine the file size in program steps needed to hold a desired number of data storage registers, the number of data storage registers is merely multiplied by eight.

After the specified number of files has been marked, an extra file is automatically marked, and the tape is positioned in front of the extra file. The extra file is marked to facilitate marking additional files at a later time and hence has no file body. Programs or data may now be stored in each file marked, or more files may be marked beginning with the extra file. Files are marked and designated in numerical order, beginning with file 0 for files marked on the primary track or file −0 for files marked on the secondary track.

The MARK TAPE instruction has the same format for both new and used tape cartridges. However, when marking files on a used tape, it is important to mark over, or erase, all old files. This will prevent unexpected results. Old files may be erased by simply marking new files in sufficient quantity or sufficient size to extend beyond the old files. Or, they may be erased by specifying a negative number of files in any MARK TAPE instruction. For example, if −1 is stored in the Y register at the time a MARK TAPE instruction is executed, a single file will be marked and the remainder of the specified track will automatically be erased.

An IDENTIFY instruction, entered by sequentially actuating the BLANK key and the Indent key, transfers the file identifier information associated with a designated file into the registers of the operational stack. The number of the desired file is stored in the X register prior to execution of the instruction. Following execution of the instruction, a number corresponding to the file type is stored in the T register, the number of steps in use is stored in the Z register, the originally marked file size is stored in the Y register, and, of course, the file number remains stored in the X register. The various file types and their corresponding number designators are shown in Table 4 below.

Table 4

| | |
|---|---|
| 0 | PROGRAM FILE |
| 1 | SECURED PROGRAM |
| 2 | DATA FILE |
| 3 | PRE-RECORDED FACTORY PROGRAM |
| 4 | SECURED PRE-RECORDED FACTORY PROGRAM |
| 5 | EMPTY FILE |
| 6 | EXTRA FILE |

For the user's convenience, the contents of the four registers of the operational stack together with the alpha labels FILE, TYPE, USED, and MAX are automatically printed when an IDENTIFY instruction is executed from the keyboard.

Execution of a RECORD instruction, entered by actuating the RECORD key, records the contents of the program storage portion of user read-write memory, from a current step location through an END instruction, on a designated tape file. If no END instruction is encountered, the remainder of the program storage portion of user read-write memory is recorded. Before execution of the instruction, the desired beginning step location should be stored in the Y register, and the number of the desired file should be stored in the X register. If the designated file is too small or the tape is protected, the RECORD instruction is cancelled, and an error message is printed.

Execution of a LOAD instruction, entered by actuating the LOAD key, loads programs or data from a desired tape file into the user read-write memory. The file type determines whether programs or data will be loaded. Before execution of a LOAD instruction, the desired beginning step location in memory should be stored in the Y register, and the number of the desired tape file should be stored in the X register. If the file is of the wrong type or there is not enough read-write memory available, the LOAD instruction is cancelled, and an error message is printed.

A LOAD & GO instruction, entered by actuating the LD & GO key, provides a programmable method for automatically loading and executing a specified program. Before execution of the instruction, the beginning step location in memory should be stored in the Y register, and the number of the desired file should be stored in the X register. An extremely long program may be separated into segments, each segment being recorded into a separate tape file. A LOAD & GO instruction may be added to the end of each program segment to automatically call and execute the program segments in succession.

Execution of a RECORD DATA instruction, entered by sequentially actuating the BLANK and RECORD keys, records the content of a block of numbered data storage registers into a specified tape file. Before execution of the instruction, the number of data storage registers to be recorded should be stored in the Z register, the first register number should be stored in the Y register, and the file number should be stored in the X register. If the specified registers have not previously been assigned, if the file is too small or of the wrong type, or if the tape is protected, the RECORD DATA instruction is cancelled, and an error message is printed.

As stated above, the LOAD instruction is used for loading both data and programs into the calculator. The file type determines whether programs or data will be loaded. Before loading data, the starting data storage register number should be stored in the Y register, and the file number should be stored in the X register. The data is loaded, register-by-register, beginning with the starting register. If the file is of the wrong type or if an insufficient number of data storage registers has been assigned, the instruction is cancelled, and an error message is printed.

Execution of a VERIFY instruction, entered by sequential actuation of the BLANK and VERIFY keys, compares the information recorded on a tape file with the program or data presently stored in the calculator memory. To verify a program file, the starting step location should be stored in the Y register and the file number be stored in the X register. To verify a data file, the number of the data storage register should be stored in the Y register and the file number should be stored in the X register. The VERIFY instruction is most easily executed directly after a loading or recording operation, since the proper numbers are already stored in the X and Y registers. If the information in the file is not identical to that stored in the user read-write memory, one of the error messages VERIFY FAILED or CHECKSUM ERROR is printed. Neither of these two errors will cause program execution to halt when flag 6 is set. In that case, program flag 5 is automatically set by either error.

A RECORD SECURED instruction, entered by sequentially actuating the CALL and RECORD keys, provides a method for recording private programming on tape. Execution of the instruction records a program into a specified file, like the RECORD PROGRAM instruction, except that the file type is designated as type 1. Before execution of the instruction, the starting step location should be stored in the Y register, and the number of the desired file should be stored in the X register. Execution of the RECORD SECURED instruction does not affect the contents of memory. A secured program can be loaded back into the calculator just as any other program and then executed in the normal manner. However, once a secured program has been loaded into the calculator, any attempt to list, record, or edit the program will result in the error message SECURED MEMORY being printed. When a secured program has been loaded into the calculator memory, all other programs stored in the memory are automatically secured. Data storage registers, however, are not affected. The secured memory may be cleared by erasing the memory or by turning the calculator off.

An AUTOSTART mode of calculator operation is provided to automatically load a program stored in tape file 0 into the calculator memory and initiate execution of that program, all in response to placing the calculator power switch 22 in the ON position. The AUTOSTART mode of operation is selected by positioning the calculator mode switch located in the lower right-hand corner of the keyboard in the AUTOSTART position. This switch is interrogated by the calculator firmware. If the switch is found to be in the AUTOSTART position, the tape is searched for file 0 and the file type is interrogated. If file 0 is of type 0 or 1, the file is automatically loaded into the calculator memory and execution is initiated at step location 0000. If any errors occur during loading of this file, the AUTOSTART mode is cancelled, an error message is printed, and the calculator is returned to the RUN mode. The AUTOSTART mode is advantageous in that it provides automatic memory definition without intervention on the part of a possibly unskilled user. In addition, it provides automatic resumption of execution of a program after restoration of operating power following, for example, a power blackout.

The group of keys A through O comprises a group of special function keys that may be defined to call and execute functions defined by the user. Each such defined function is, in effect, a subroutine beginning with a label and ending with a RETURN instruction. Blank overlays are provided for this group of keys to allow the user to identify each identified function. Each defined function may be executed from the keyboard by merely actuating the desired key, or it may be called during program execution through use of a GO SUB instruction.

Each special function key is defined by entering the instructions comprising the defined function into the calculator memory. Each defined function includes a label and a RETURN instruction, just as in the case of subroutines as discussed hereinabove. Each defined function may be stored, beginning at any chosen step location, in the user read-write memory. Special functions may be nested to a depth of seven. Before nested functions are called, the END key should be actuated to reset the nesting counter.

Improper data entries, improper key or program instruction syntax, and improper calculations are all indicated to the user through printed error messages. Unlike prior art calculators that employed numeric error notes and required the use of a look-up table to convert a numeric error note to a meaningful description of the error, the error messages printed by the present calculator are in themselves descriptive of the error that is indicated, thus eliminating the need for a user look-up table. ASCII characters corresponding to each possible error message are stored in the calculator memory. Upon detection of an error and selection of a corresponding error number by the ROM execution routines, an error output routine transmits the ASCII characters forming the error message associated with the selected error number to the printer. A list of the possible error notes that may result from various improper calculator operations together with the corresponding sources of error is provided in Table 5 below. An asterisk to the left of an error message indicates that it may be suppressed through use of the calculator flags described hereinabove.

ERROR MESSAGES

*OVERFLOW — Number or result exceeds calculating range.
*SQRT OF NEG #
*DIVISION BY ZERO
*LOG OF #—$\phi$
*NO I/O DEVICE — Peripheral I/O unit not connected.
ILLEGAL ADDRESS — Improper step location or storage register specified.
ILLEGAL ARGUMENT — Mathematically incorrect function argument specified.
MEMORY OVERFLOW — Program instruction, data storage register assignment, or program or data loaded from tape exceeds available memory.
LABEL NOT FOUND
GO SUB OVERFLOW — More than seven subroutines or special functions nested.
MISSING GO SUB
KEY NOT DEFINED — Special function just called is not defined.
IMPROPER SYNTAX
MISSING FOR STMT
*CHECKSUM ERROR — Unrecognizable information being read from tape.
FILE TOO SMALL
*VERIFY FAILED — Program or data in tape file is not identical to that stored in memory.
*WRONG FILE TYPE
FILE NOT FOUND
END OF TAPE — End of tape or tape break has been detected during execution of a MARK FILE instruction.
CARTRIDGE OUT — The magnetic tape cassette unit contains no tape cartridge.
PROTECTED TAPE — The cartridge RECORD slide is positioned to prevent MARK and RECORD operations.
SECURED MEMORY — An attempt has been made to list, edit or record a secured program.
PAPER OUT —≦0 printer paper supply is exhausted.

Table 5

PLOTTER PLUG-IN I/O ROM

By means of a plotter I/O ROM that may be plugged into one of the two peripheral I/O receptacles 18 on the rear panel of the calculator, an X-Y plotter, such as the Hewlett-Packard 9862A, may be interfaced to the calculator. The combination of the calculator and an X-Y plotter provides a system capable of producing hard copy graphic solutions to sophisticated problems. The functions of the plotter are controlled by the calculator through the use of instructions that may be executed from the keyboard or under the program control. The plotter may be used in conventional ways to plot curves representing mathematical functions, to draw histograms or charts, and to draw alphanumeric and special characters. In addition, the plotter/calculator combination may be used as a digitizer to perform functions not previously available in calculator/plotter systems. In the digitizer mode of operation, the calculator/plotter system may be used to digitize lines and figures into scaled coordinate values.

In the digitizer mode of operation, the user may position the plotter pen over various points on the plotter bed by way of calculator keyboard instructions. Once the plotter pen is precisely positioned over the desired point, the plotter transmits the coordinates of that point to the calculator. This information may then be used by the calculator to compute line length, closed area, or other parameters requiring scaled point data.

The plot area, as set by the graph-limit controls on the plotter and a SCALE instruction, is divided into 1000 scaled units in each coordinate direction. For example, a 10-inch square scaled plot has a digitizing resolution of 0.01 inches. The coordinate values resulting from digitizing a point are stored in the registers of the calculator operational stack and are referred to the origin chosen in the SCALE instruction.

The SCALE instruction establishs the full-scale values, in user units, for a given plot area. $X_{min}$, $X_{max}$, $Y_{min}$, and $Y_{max}$ correspond exactly to the respective horizontal and vertical limits of the plotting area established through adjustment of the graph-limit controls on the plotter. This instruction also establishes the point, on or off the plot area, where the origin of the coordinate system is located.

In preparation for executing the SCALE instruction, the chosen values of $X_{min}$, $X_{max}$, $Y_{min}$, and $Y_{max}$ should be stored in the T, Z, Y, and X registers, respectively. The SCALE instruction may then be executed by sequentially actuating the CALL, 1, and F keys. The scale values selected by the user will remain in effect until either a new SCALE instruction is executed or the calculator is turned off. It is important to be certain that the values $X_{min}$, $X_{max}$, $Y_{min}$, and $Y_{max}$ are entered into the proper stack registers. If they are not, the error message ILLEGAL ARGUMENT will be printed. When the calculator is turned on, an automatic value assignment is made so that $X_{min} = Y_{min} = 0$ and $X_{max} = Y_{max} = 9999$. These automatic limit values may, of course, be altered by subsequent execution of a SCALE instruction.

The digitizing mode of operation may be selected by executing any one of four pen direction key sequences that include CALL 1 E, CALL 1 J, CALL 1 N, and CALL 1 O. Once the digitizing mode has been selected, it is only necessary to actuate any one of the direction keys E, J, N or O to move the plotter pen up, down, left or right, respectively. Each time one of these direction keys is actuated, the plotter pen moves an incremental distance equal to one user unit in the direction specified. By not releasing a direction key the pen may be moved in multiple increments at an increasing speed to more efficiently position the plotter pen over the desired point.

The digitizing mode of operation may be cancelled by actuating either the M key or the RUN STOP key. At this time the coordinate values of the current pen position are entered by the calculator/plotter system into the X and Y registers. In the event the digitizing mode was selected under program control, actuation of the M key restarts the program. Actuation of the RUN STOP key halts execution of the program.

An EXIT instruction, entered by sequentially actuating the CALL, 1, and M keys, enters the coordinate values of the current pen position into the X and Y registers. This instruction is independent of the digitizing mode of operation but is useful whenever the current X and Y coordinates of the pen position are needed for reference.

Figure 74A:
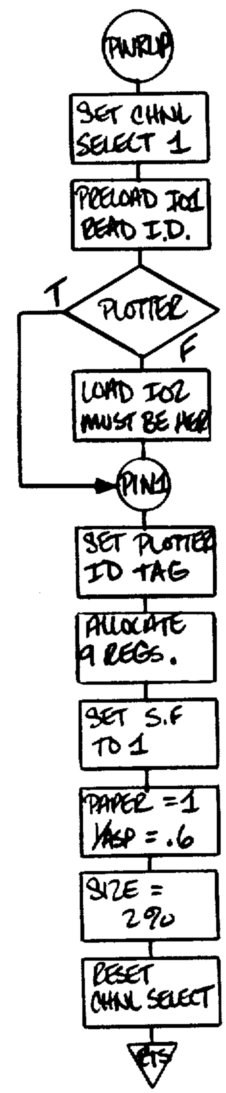
FIGS. 74A–X are a flow chart of X-Y plotter routines that may be stored in one of the I/O ROMs of FIG. 5.
Figure 74B:
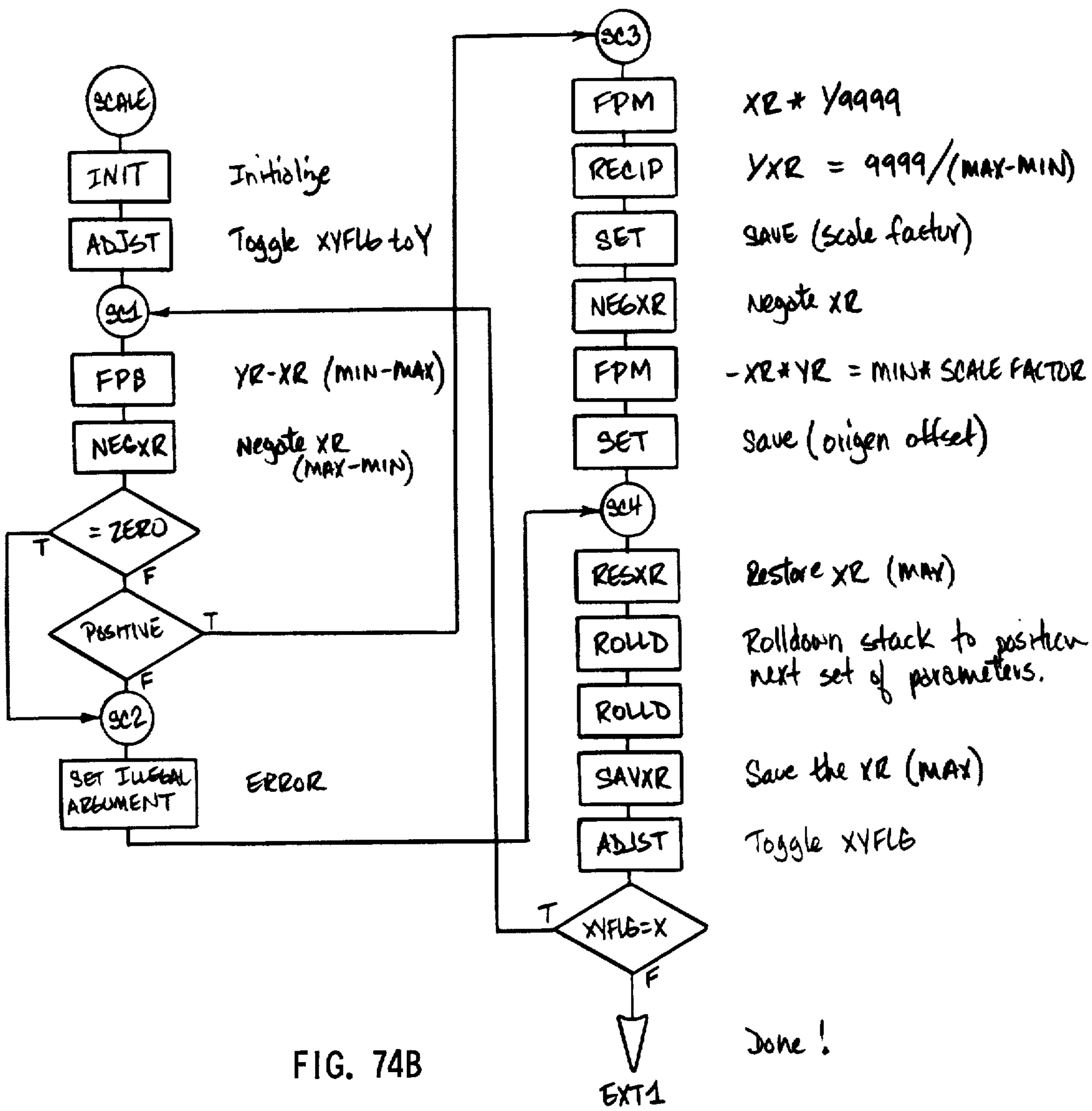
Figure 74C:
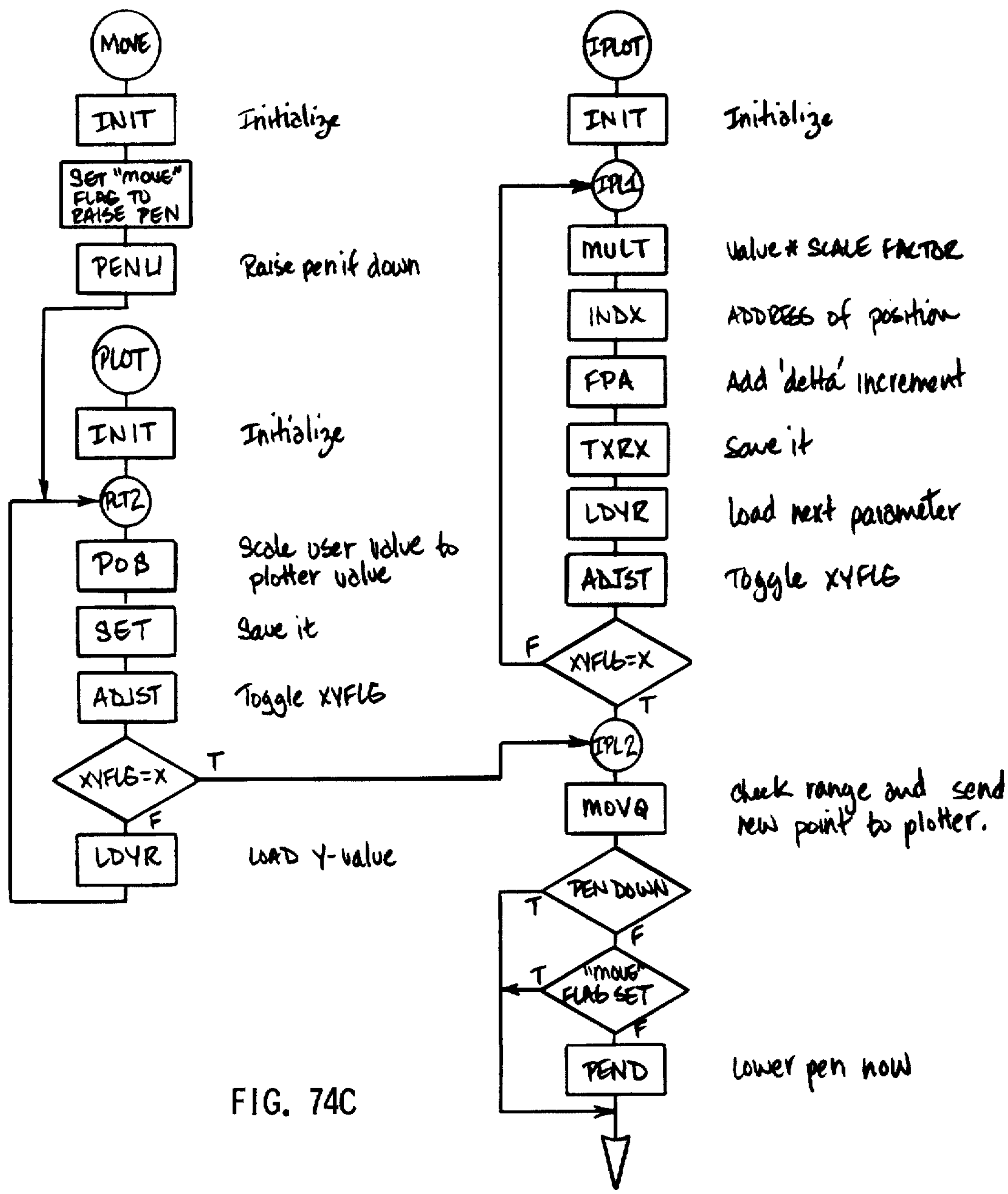
Figure 74D:
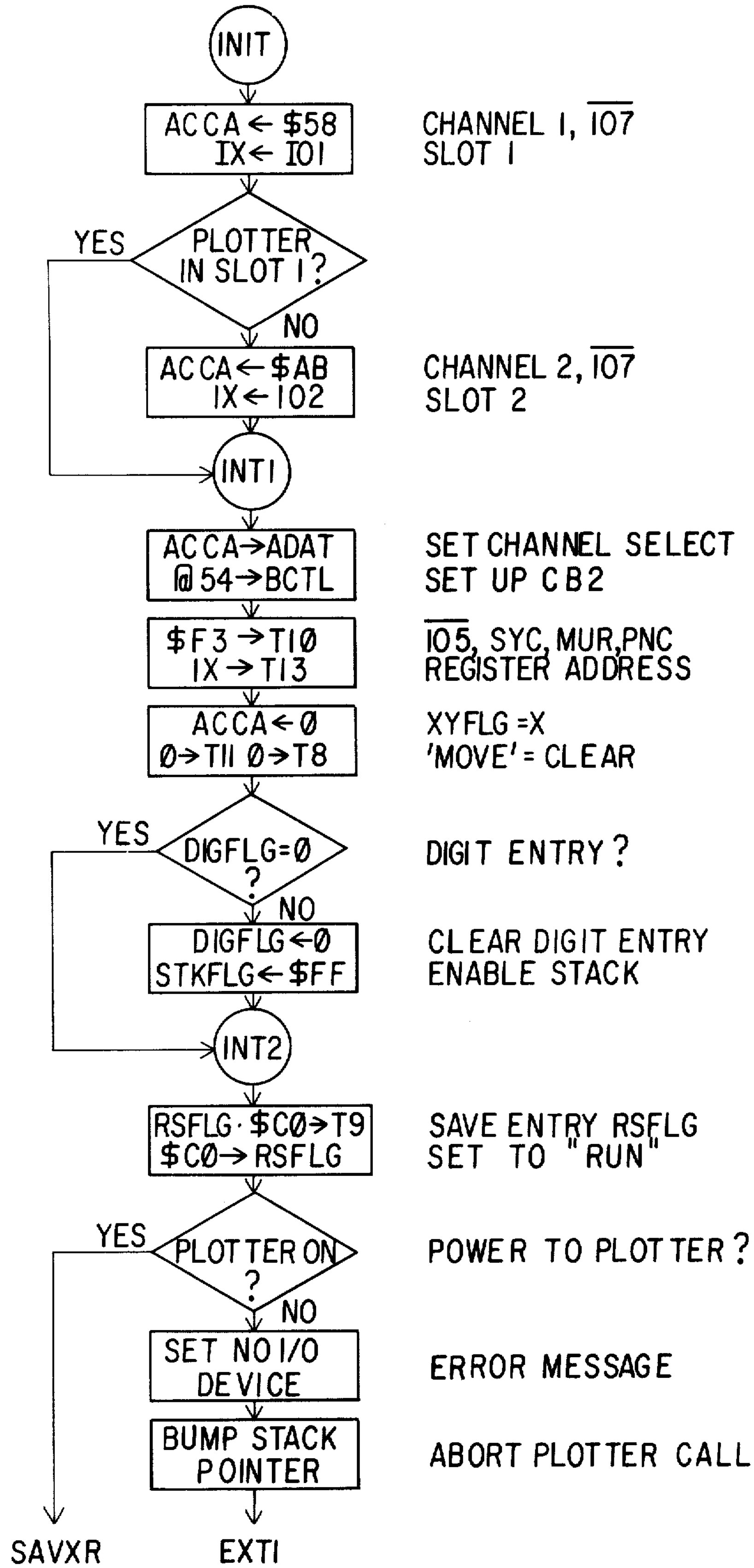
Figure 74E:
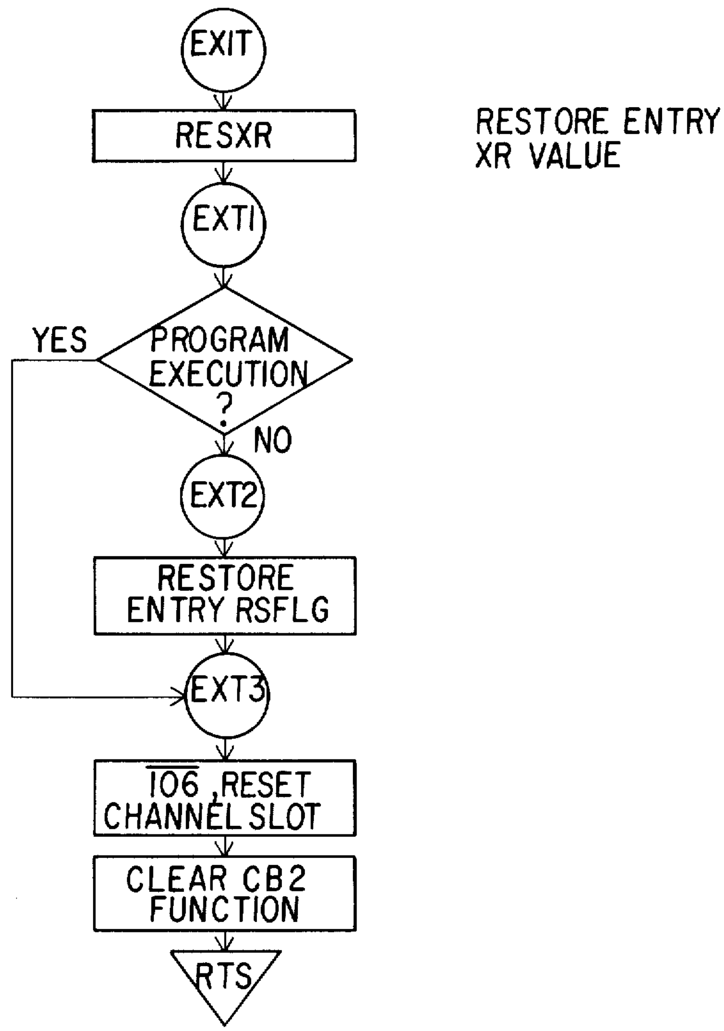
Figure 74F:
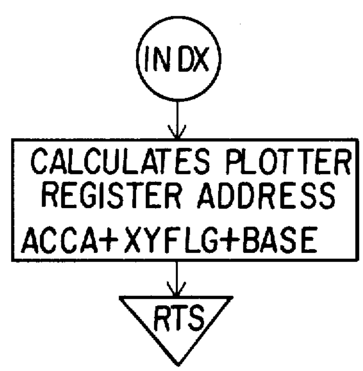
Figure 74G:
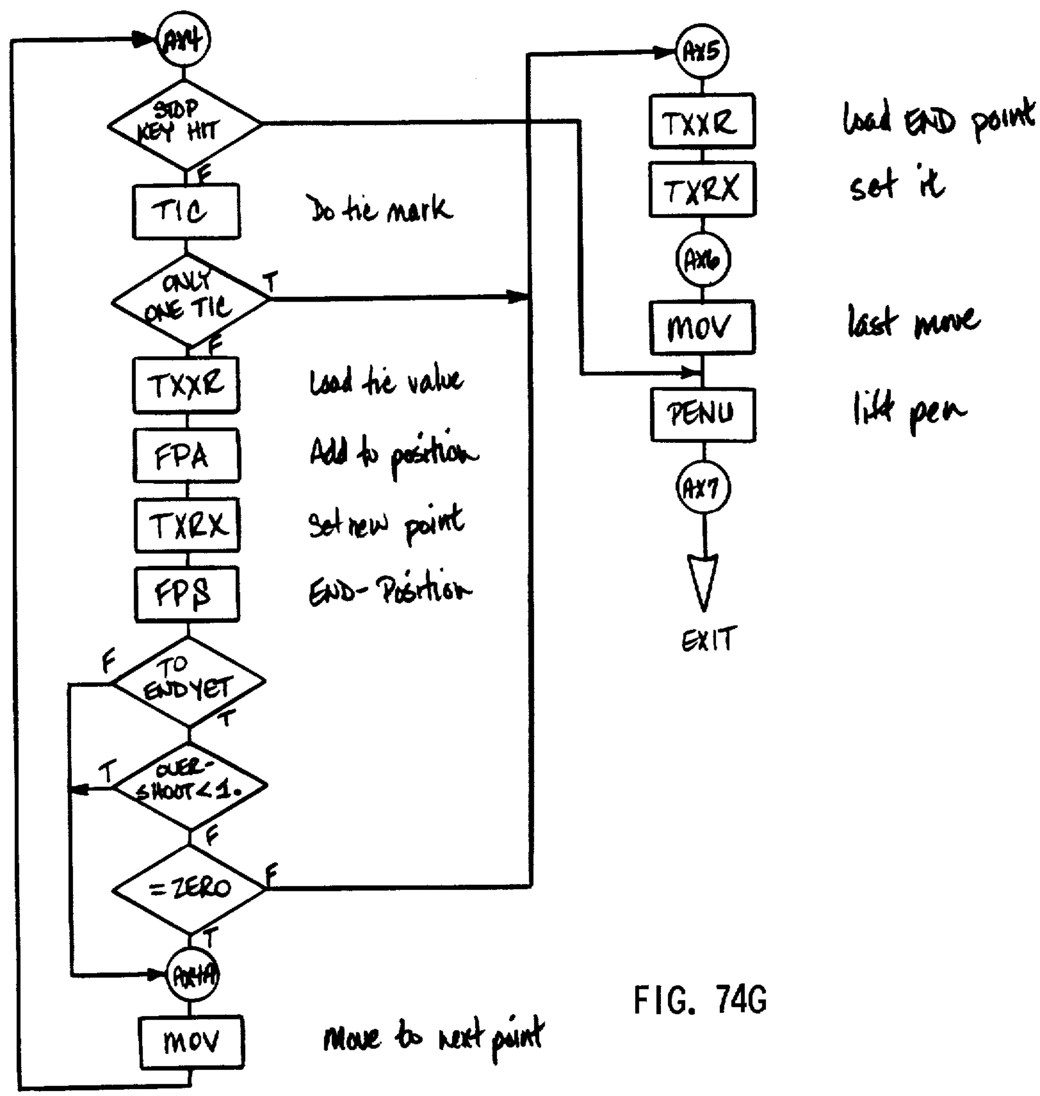
Figure 74H:
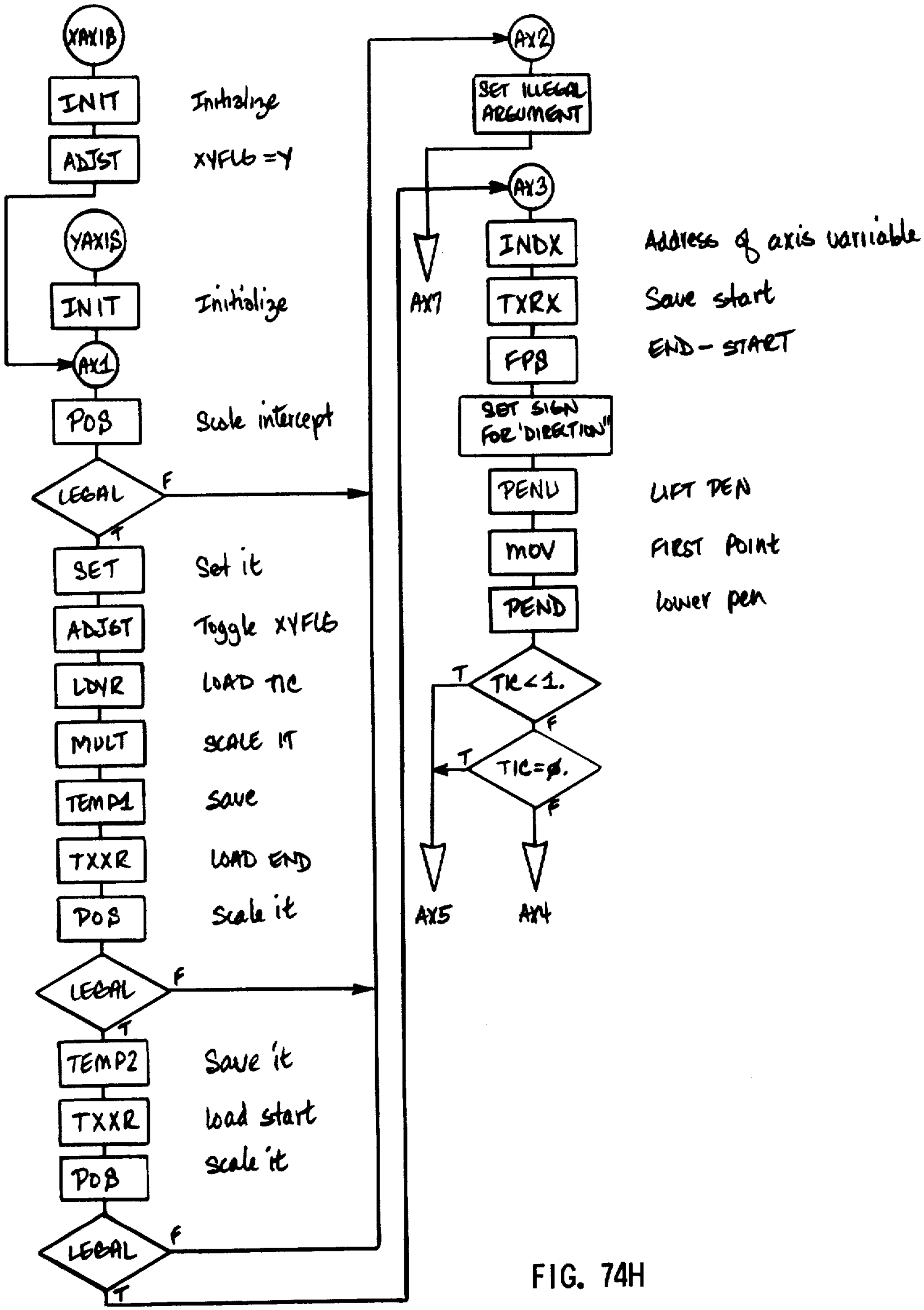
Figure 74J:
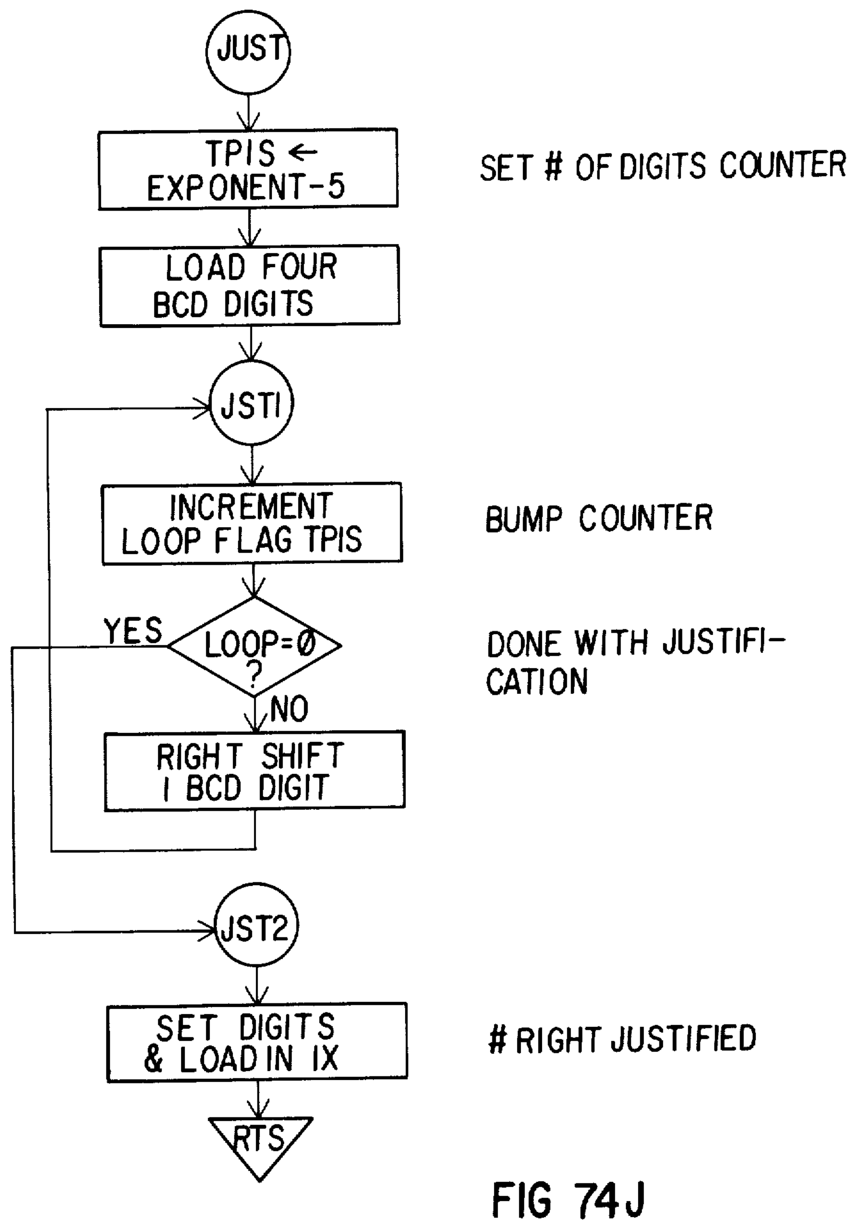
Figure 74K:
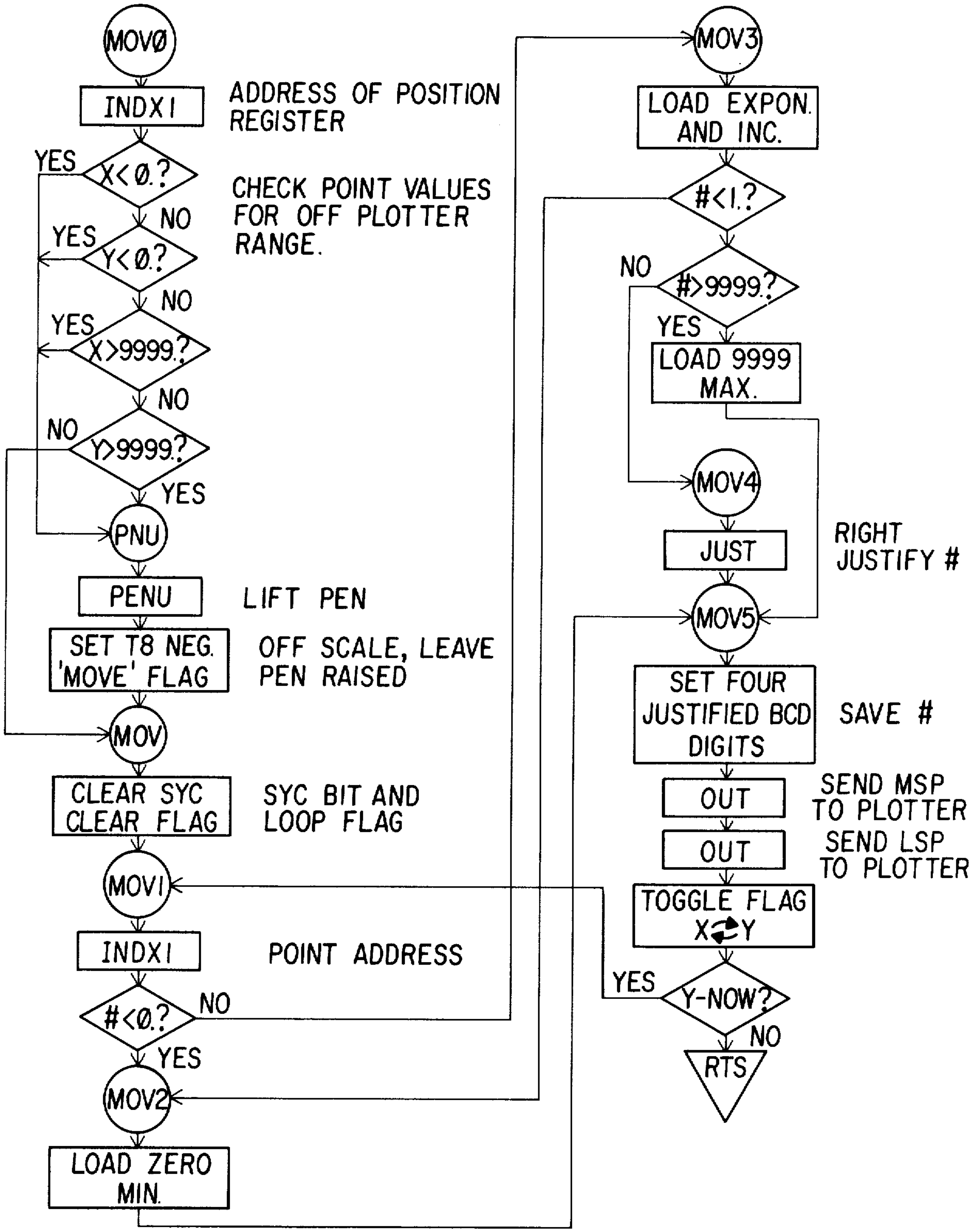
Figure 74L:
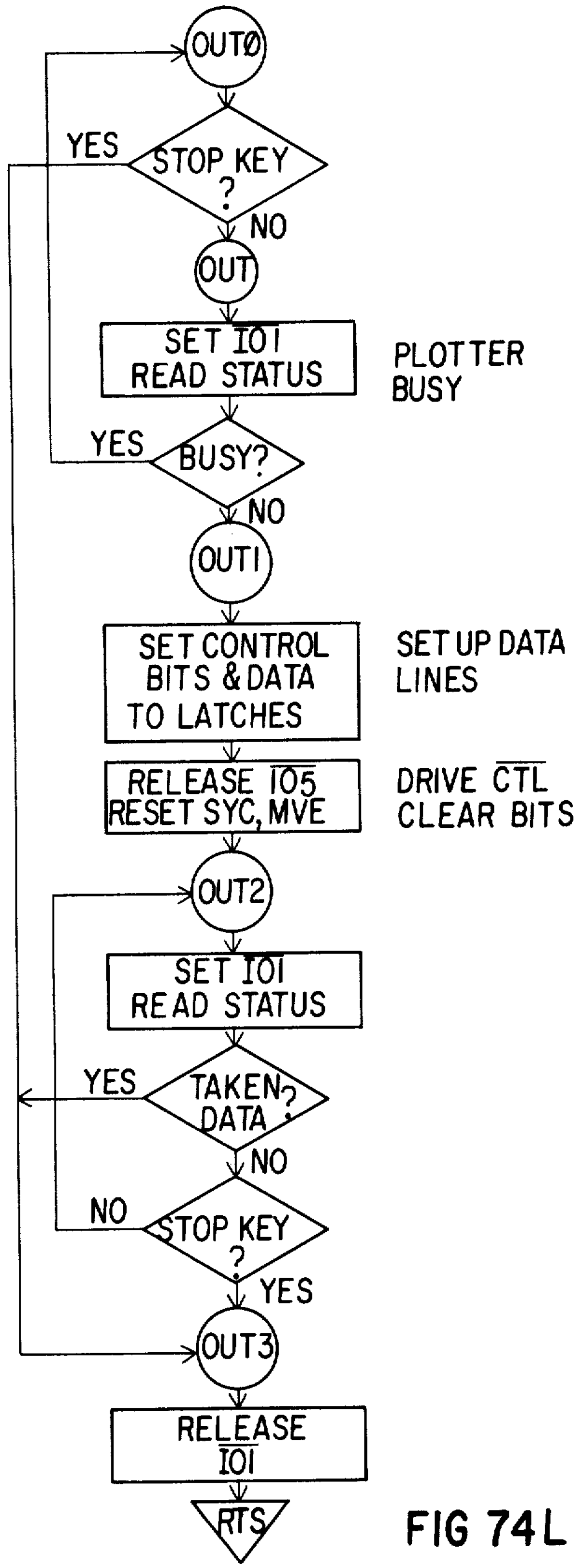
Figure 74M:
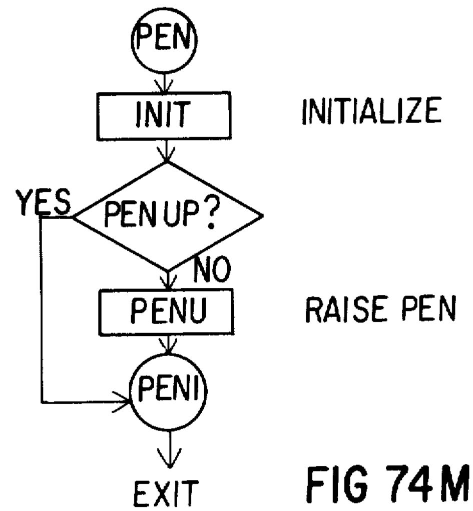
Figure 74N:
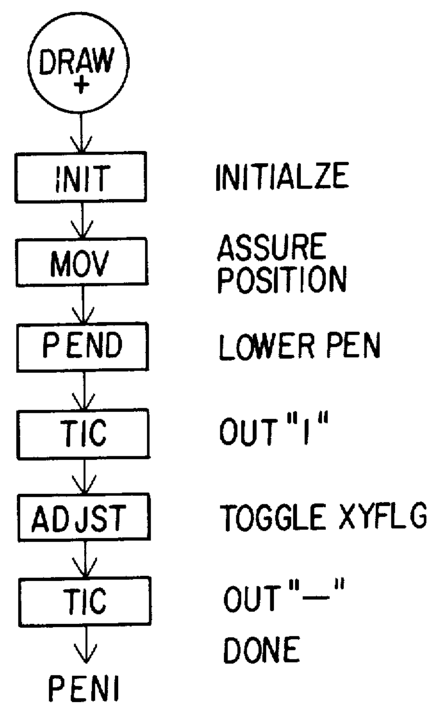
Figure 74P:
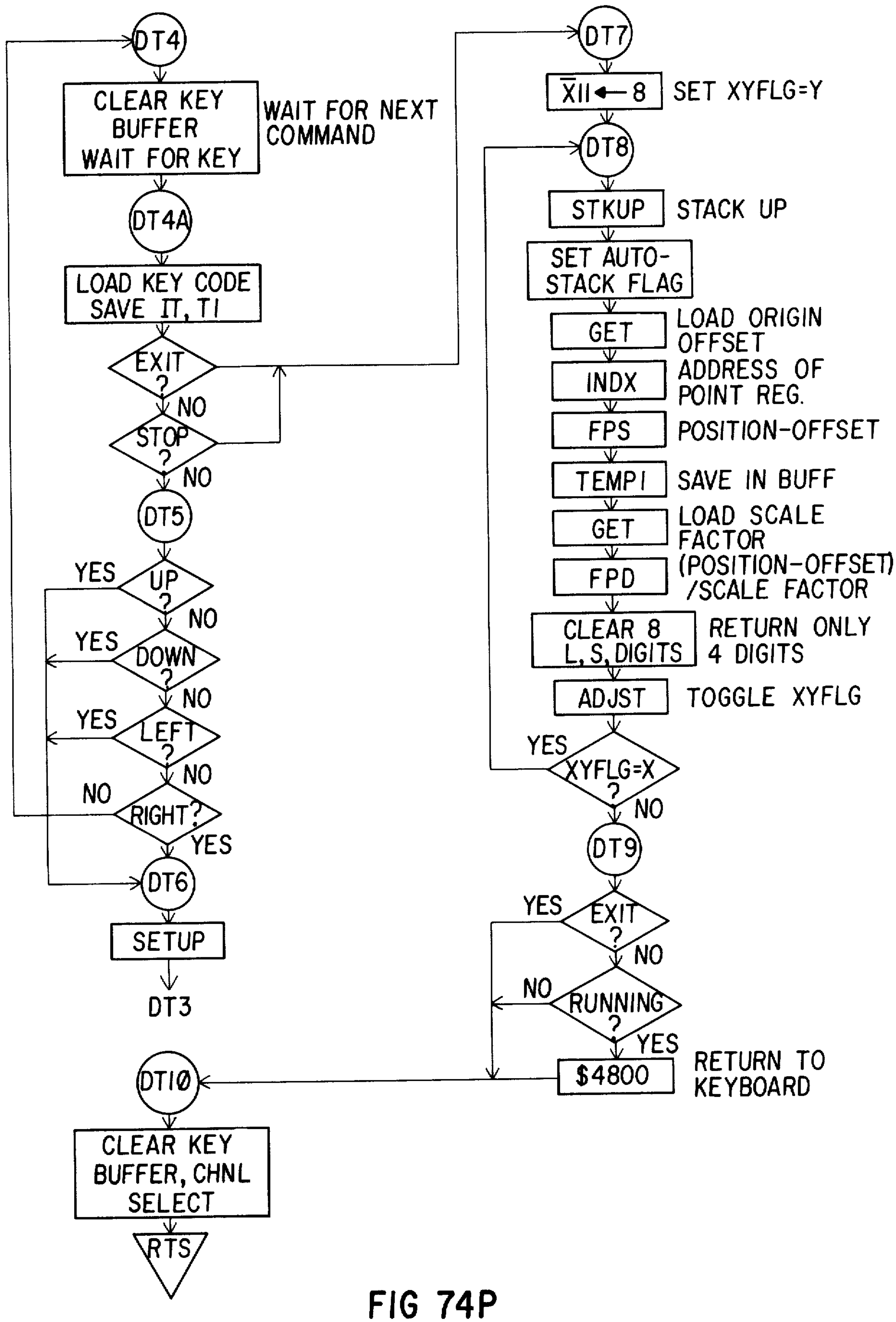
Figure 74Q:
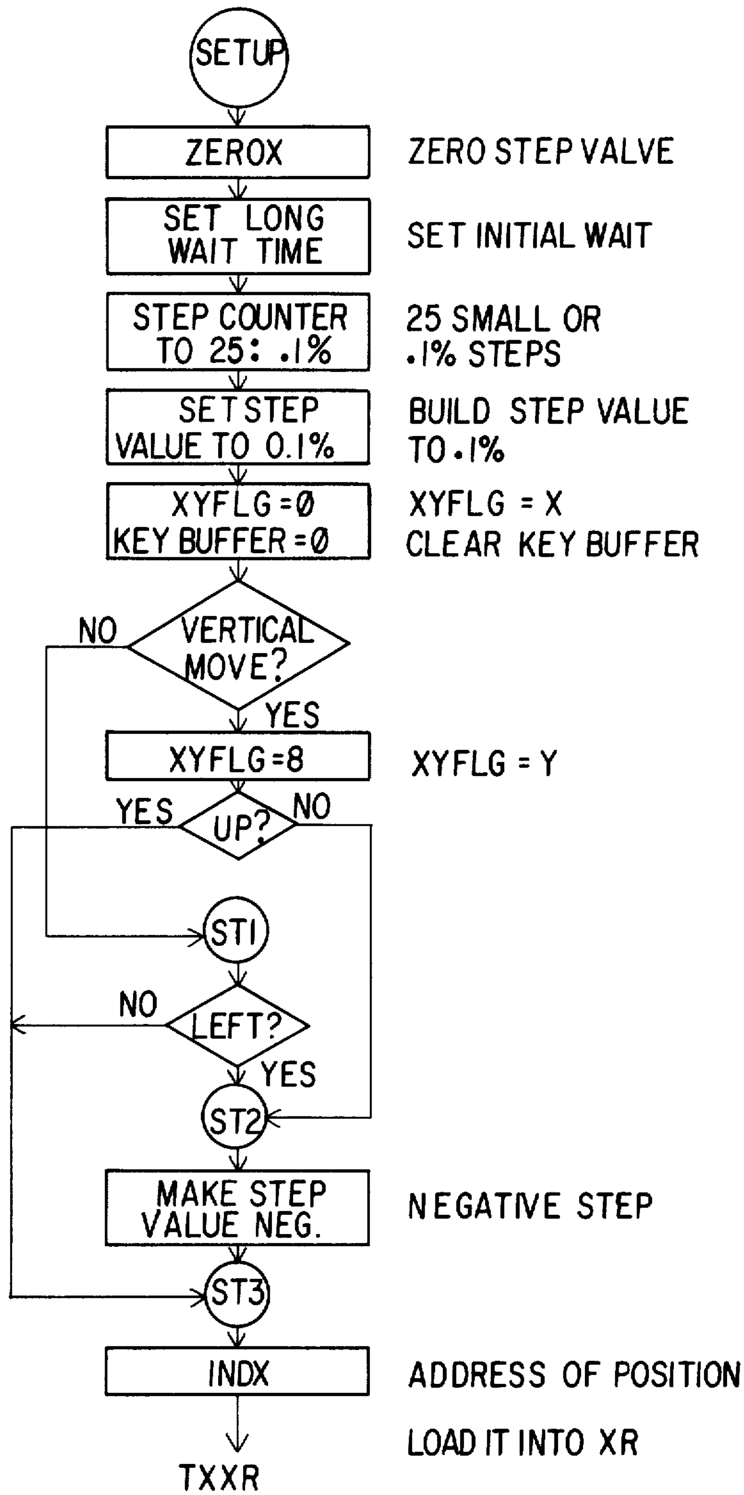
Figure 74V:
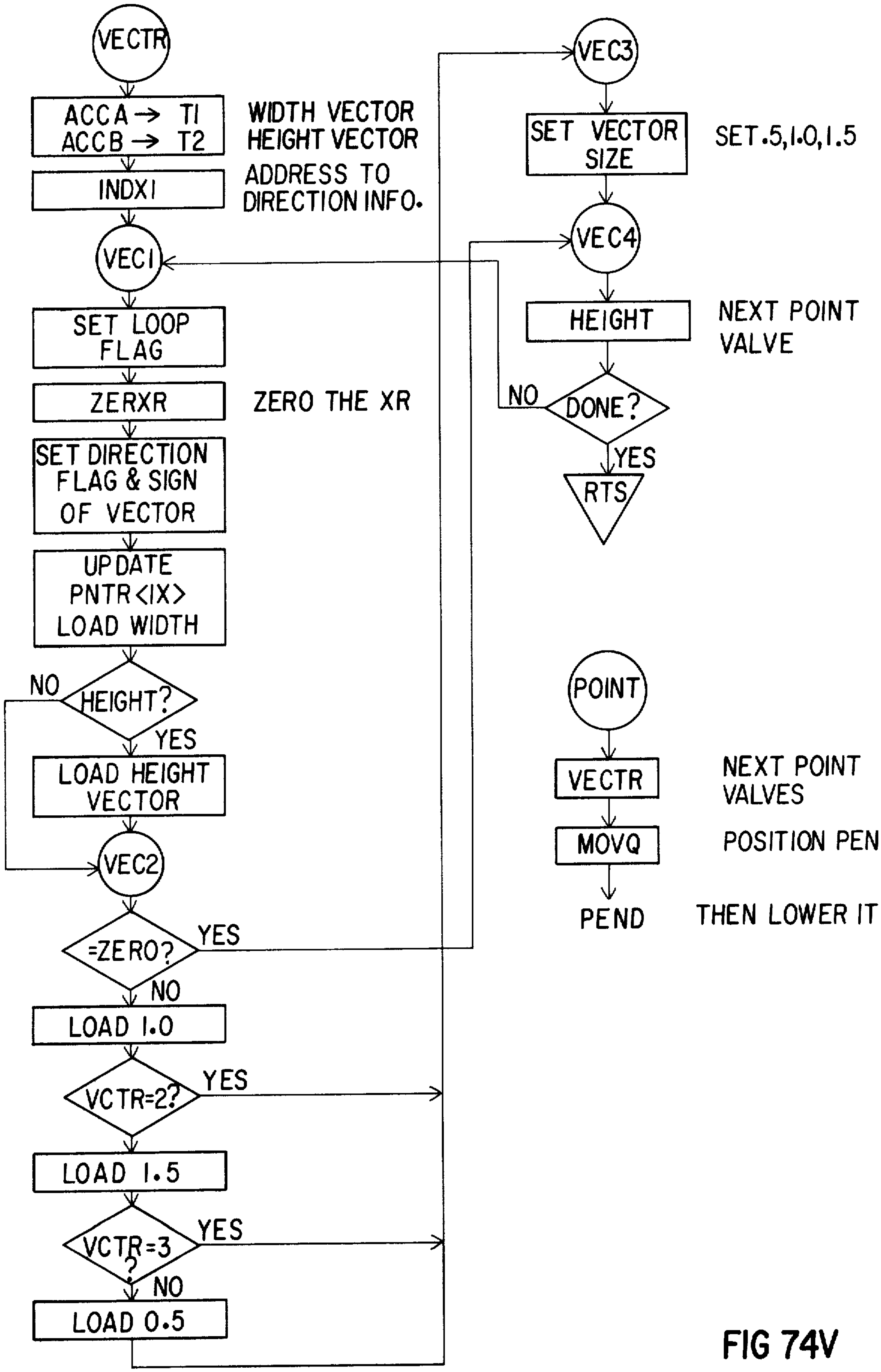
Figure 74W:
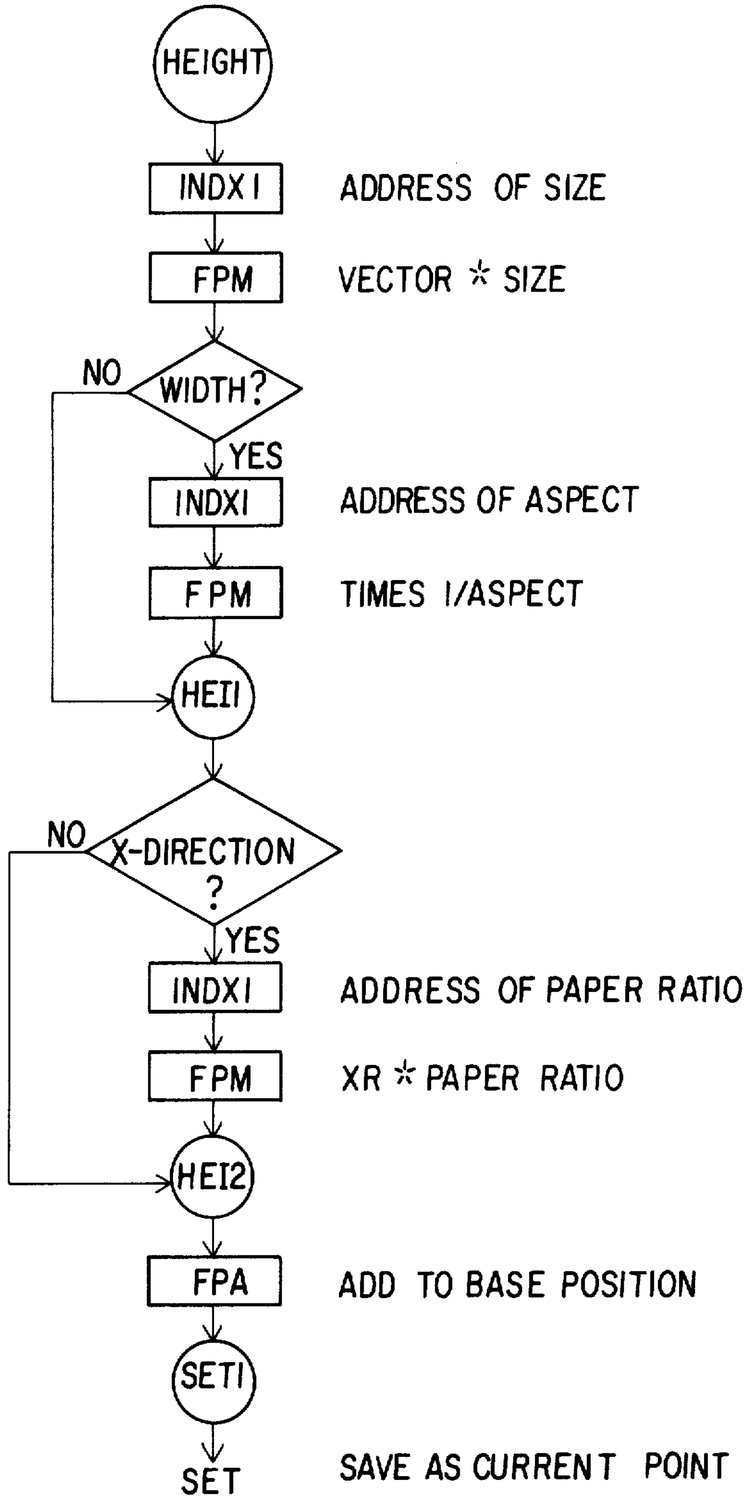

The digitizer mode of operation may be understood in detail with reference to the flow charts of FIGS. 74O–Q and the corresponding portions of the firmware listing. The main routine of FIG. 74O has five entry points, called by keys E, J, M, N, and O. These entry points build the equivalent key code for future reference and serve to initialize various pointers. In the event the routine is entered by the M key (EXIT instruction), the routine immediately calculates the X and Y coordinates of the current pen position from information in the plotter registers and returns control of the calculator without altering the status of a flag RSFLG. If entry was via one of the keys E, J, N or O, the plotter pen is lifted, and the operational stack is moved up so that calculations can be done internally in the X register. A routine SETUP is called to set the pen stepping increment to ten plotter absolute units, the initial wait time to about 0.5 seconds, the direction of the step as determined from the key code, and various flags internal to the routine. The SETUP routine then checks for either release of the entry key or a new key actuation. If the key is held down long enough to overcome the 0.5 seconds of wait time then the step increment is added to the current pen position, the wait time is increased to approximately one second, and a count of the number of steps in the chosen direction is started. After 25 steps in the same direction, the step increment is increased to 100 units or 1 percent of the plot area, the pen is moved to a new position, and the loop is continued for as long as the key is held down. If a given step will result in the pen moving out of the plot area, an appropriate boundary coordinate is substituted. When the key is released, the input buffer is cleared, and the routine waits for another direction key actuation. If the next key actuation is the RUN STOP key, the current pen coordinates are calculated and stored in the X and Y registers.

PLUG-IN GENERAL I/O ROM

A general I/O ROM may be plugged into one of the receptacles 18 on the rear panel of the calculator to provide an 8-bit parallel, character serial interface for connecting a wide variety of peripheral I/O units to the calculator. This ROM transfers data in a half-duplex fashion and provides buffer storage for each character or byte of data. Although the calculator itself handles only ASCII-coded information, the general I/O ROM can transfer data in any 8-bit binary code. These codes are then converted to ASCII code by means of a conversion program.

Several instructions that may be executed either from the calculator keyboard or under program control are associated with the general I/O ROM. These instructions comprise routines and subroutines stored within the general I/O ROM itself and may be understood in detail with reference to pages 187–220 of the calculator firmware listing. The reader may also wish to refer to FIGS. 4, 20–23, and 50–53 together with their associated detailed descriptions hereinabove as an aid to understanding the cooperative relationship between the instructions associated with the general I/O ROM and the remainder of the calculator hardware. Each optional plug-in I/O ROM that may be plugged into the rear panel of the calculator is associated with a separate numeric select code that must be specified in each I/O instruction relating to that I/O ROM. The select code associated with the general I/O ROM is 2. This select code may be altered by those persons skilled in the art.

A DATA instruction, entered into the calculator by sequential actuation of the CALL, 2 and O keys, is employed for selecting either positive true or negative true logic for the I/O data lines. This selection is made by appropriately setting the sign of a number stored in the X register prior to execution of the DATA instruction. Negative true logic is automatically selected when the calculator is turned on.

A FLAG instruction, entered, into the calculator by sequential actuation of the CALL, 2, and N keys, is employed for setting the logic level and handshake mode for the calculator FLG line. A handshake control line $\overline{ECH}$ may be disabled by entering zero in the X register and executing the FLAG instruction. Similarly, the $\overline{ECH}$ line may be enabled by placing the number one in the X register and executing the FLAG instruction. Line $\overline{ECH}$ is automatically disabled when the calculator is turned on. The logic level of the FLG line is set by the sign of the number entered into the X register prior to execution of the FLAG instruction. Negative true logic is automatically selected when the calculator is turned on.

A WRITE instruction, entered into the calculator by sequential actuation of the CALL, 2, and C keys, is employed for transmitting the sign, digits, and decimal point of the number currently stored in the X register to the peripheral I/O unit. The number appears right justified in a field set by the current number format of the calculator. Carriage return and line feed characters are automatically transmitted following the number.

A WRITE X, entered into the calculator by sequential actuation of the CALL, 2, and A keys, performs the same function as the WRITE instruction except that transmission of the carriage return and line feed characters is suppressed.

The carriage return and line feed characters together with a space are employed as delimiters in connection with WRITE instructions. The space characters are used to fill the data field, and the carriage return and line feed characters are used to terminate the data field.

A FIELD instruction, entered into the calculator by sequential actuation of the CALL, and D keys, is employed to set the data field width in effect for WRITE and WRITE X instructions. This data field width is automatically set to sixteen characters when the calculator is turned on. A field width of 1 through 127 characters may be selected by entering the field width into the X register and executing the FIELD instruction. If the number transmitted by a WRITE or WRITE X instruction is too large to be accommodated within the designated field, a field of $ characters is transmitted.

A WRITE ALPHA instruction, entered into the calculator by actuating the CALL key followed by the 2 key followed by the CALL key followed by desired character keys followed by the CALL key, is employed to select an I/O ALPHA mode similar to the ALPHA mode that may be selected when the calculator is operating alone. The ASCII equivalents of the characters specified in the WRITE ALPHA instruction are transmiteed to the peripheral I/O unit.

A READ X instruction, entered into the calculator by sequential actuation of the CALL, 2, and B keys, is employed to input a number from the peripheral I/O unit to the X register. The number can appear in a free field format or with delimiters specified in a DELIM instruction.

A DELIM instruction entered into the calculator by sequential actuation of the CALL, 2, and E keys, allows the user to specify any three ASCII characters as delimiters associated with data input to the calculator via the READ X instruction. The specified delimiters, labelled 1 through 3, must be placed in the X, Y, and Z registers, respectively. When less than three delimiters are specified, the unused stack registers must be filled with zeros. Delimiter 1 performs the additional function of setting program flag 4. Prior art calculators have had very limited data input capabilities because of the restriction of fixed delimiters. By allowing the user to specify delimiters, considerably more flexibility and control over numeric data input is obtained. Since recognition by the calculator of delimiter 1 sets program flag 4, the user may input blocks of data of unknown length by simply separating the blocks with that delimiter. This avoids, for instance, delays in calculation while waiting for data that is not available.

A WBYTE instruction, entered into the calculator by sequential actuation of the CALL, 2, and F keys, is employed to output the 8-bit binary equivalent of an integer number stored in the X register. The integer number must lie between 0 and 255.

An RBYTE instruction, entered into the calculator by sequential actuation of the CALL, 2, and F keys, is employed to input one 8-bit binary character from a peripheral I/O unit and place its decimal equivalent in the X register.

An AND instruction, entered into the calculator by sequential actuation of the CALL, 2, and H keys, is employed to combine the 8-bit binary equivalent of the numbers in the X and Y registers by performing a logical AND operation. The result is converted to decimal form and is placed in the X register.

An OR instruction, entered into the calculator by sequential actuation of the CALL, 2, and I keys, is employed to combine the 8-bit binary equivalent of the numbers in the X and Y registers by performing a logical OR operation. The result is converted to decimal form and is placed in the X register.

A ROTATE instruction, entered into the calculator by sequential actuation of the CALL, 2, and J keys, is employed to rotate the bits of the 8-bit binary equivalent of the number stored in the X register one place to the right. The result is placed in the X register in decimal form.

A DUMP PROGRAM instruction, entered into the calculator by sequential actuation of the CALL, 2, and M keys, outputs program instructions stored in the program portion of the user read-write memory, starting at the step location indicated by the number stored in the X register and ending when an END instruction is encountered.

A LOAD PROGRAM instruction, entered into the calculator by sequential actuation of the CALL, 2 and L keys, is employed to input program instructions from a peripheral I/O unit to the calculator memory, starting at the step location indicated by the number stored in the X register and continuing until an END instruction is encountered. When the LOAD PROGRAM instruction is executed under program control, the calculator automatically continues execution of that program at the next instruction following the LOAD PROGRAM instruction after the new program has been loaded from the peripheral I/O unit.

A LIST instruction, entered into the calculator by sequential actuation of the CALL, 2, and K keys, is employed to output a program listing starting at the step location indicated by the current location of the program counter and ending when an END instruction is encountered. The listing is formatted into four 50-step columns for use with a page-width line printer. This listing halts every 200 steps to allow the operator to insert more printer paper. The listing may then be continued by actuating the K key. The LIST instruction may only be executed from the keyboard and is not programmable.

A REMOTE mode of operation may be selected by entering ±2 into the X register followed by sequential actuation of the CALL, 2, and N keys. This mode is useful because it causes the calculator to wait at each I/O instruction for the peripheral I/O unit to begin the instructed operation. Normally, the calculator issues an I/O instruction and then waits for the peripheral I/O unit to signal completion of the operation. Completion of the operation is indicated by the peripheral I/O unit pulling the FLG line low. This means that the peripheral I/O unit is always waiting for instructions from the calculator. The REMOTE mode is useful in a system involving the use of the one calculator for gathering data and another calculator for performing calculations involving the data. The calculators may be connected via general I/O ROMs and the data gathering calculator would be set to the REMOTE mode each time it is ready to transfer data to the other calculator. This "two-processor" arrangement, with one calculator controlling the I/O operations between them, offers an extremely fast and flexible system for gathering and reducing data.

We claim:

1. An electronic calculator comprising:

memory means for storing instructions and data, said memory means including a program storage area for storing program instructions and a data storage area for storing data;

keyboard input means for entering information including data and instructions into the memory means;

processing means, coupled to said keyboard input means and memory means, for processing data and instructions entered into the memory means to perform selected functions;

output means, coupled to said processing means, for providing an output indication of selected functions performed by the calculator; and logic means, coupled to said memory means and processing means, for defining a movable boundary between said program storage area and said data storage area of said memory means.

2. An electronic calculator as in claim 1 wherein said logic means is operative for initiating output of an error indication on said output means in response to an attempt by the user to enter program instructions into the data storage area of said memory means and in response to an attempt by the user to enter data into the program storage area of said memory means.

3. An electronic calculator as in claim 1 wherein said logic means includes a pointer word stored in said memory means and said logic means is operative for repositioning said pointer word to define the movable boundary between said program storage area and said data storage area in response to processing by said processing means of a selected instruction stored in said memory means.

4. An electronic calculator as in claim 3 wherein:

said data storage area of said memory means comprises one or more data storage registers; and 5. An electronic calculator comprising:

memory means for storing instructions and data, said memory means including a program storage area for storing program instructions and a data storage area for storing data;

keyboard input means for entering information including data and instructions into said memory means;

processing means, coupled to said keyboard input means and memory means, for processing data and instructions entered into said memory means to perform selected functions, said keyboard input means including control means for initiating processing by said processing means of a program of instructions stored in said program storage area of said memory means;

output means; coupled to said processing means, for providing an output indication of selected functions performed by the calculator; and logic means, coupled to said memory means and processing means for defining a movable boundary between said program storage area and said data storage area of said memory means, said logic means including a pointer word stored in said memory means and being operative for repositioning said pointer word to define a movable boundary between said program storage area and said data storage area of said memory means when a selected instruction is encountered during processing by said processing means of a program of instructions stored in said program storage area of said memory means.

6. An electronic calculator as in claim 5 wherein said logic means includes means for initiating output of an error indication on said output means in response to an attempt by the user to enter program instructions into the data storage area of said memory means and in response to an attempt by the user to enter data into the program storage area of said memory means.

* * * * *

UNITED STATES PATENT AND TRADEMARK OFFICE
CERTIFICATE OF CORRECTION

PATENT NO. : 4,089,059

DATED : May 9, 1978

INVENTOR(S) : Bradley W. Miller et al

It is certified that error appears in the above-identified patent and that said Letters Patent is hereby corrected as shown below:

In the Drawings

Figure 67U:
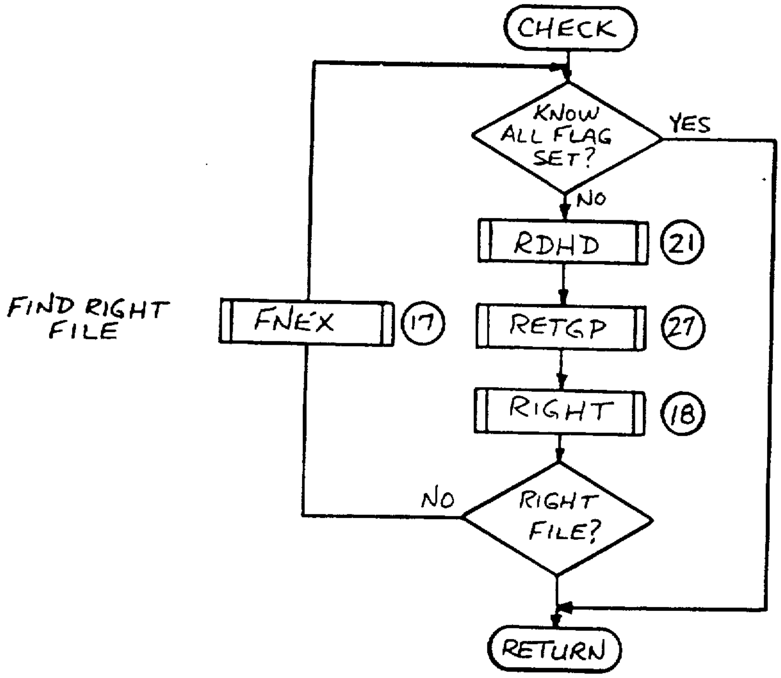
Figure 67V:
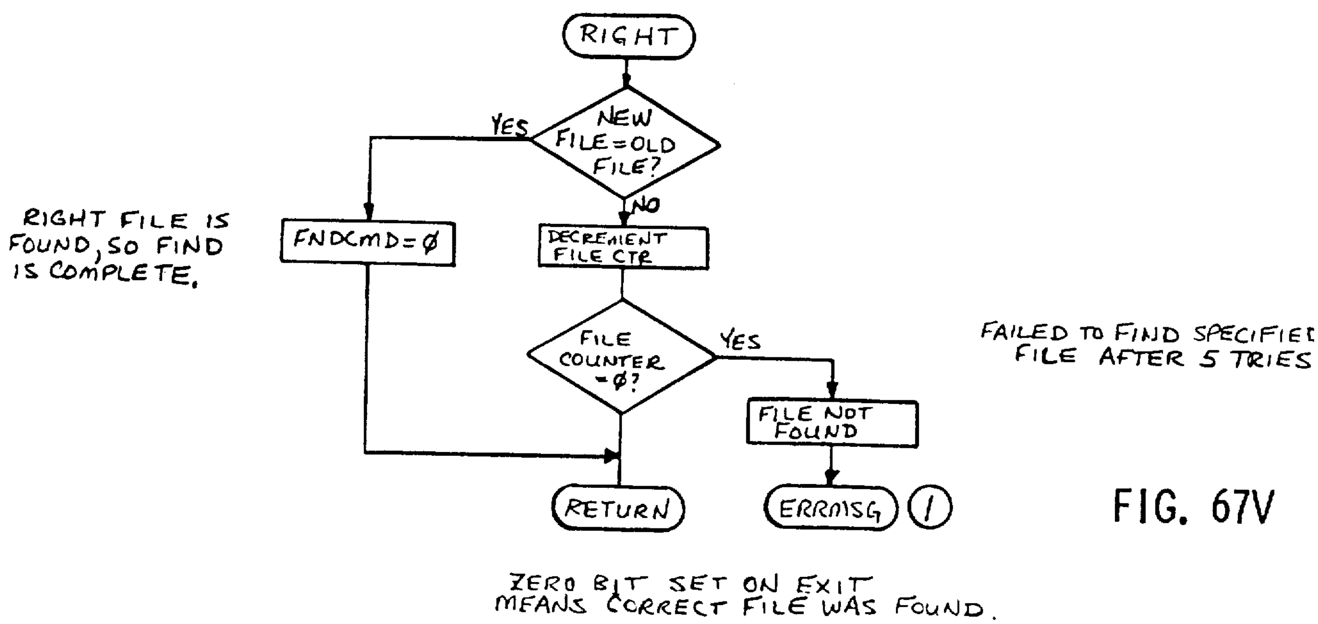
Figure 67W:
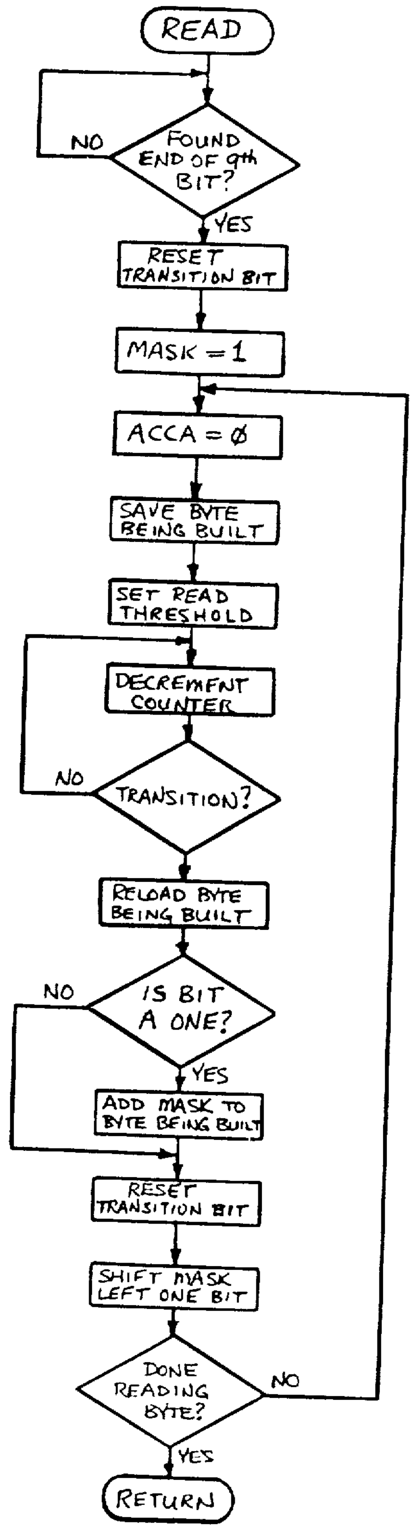

The sheets of drawings consisting of Figure 67U, Figure 67V and Figure 67W should be added as per the attached sheets.

Figure 69K:
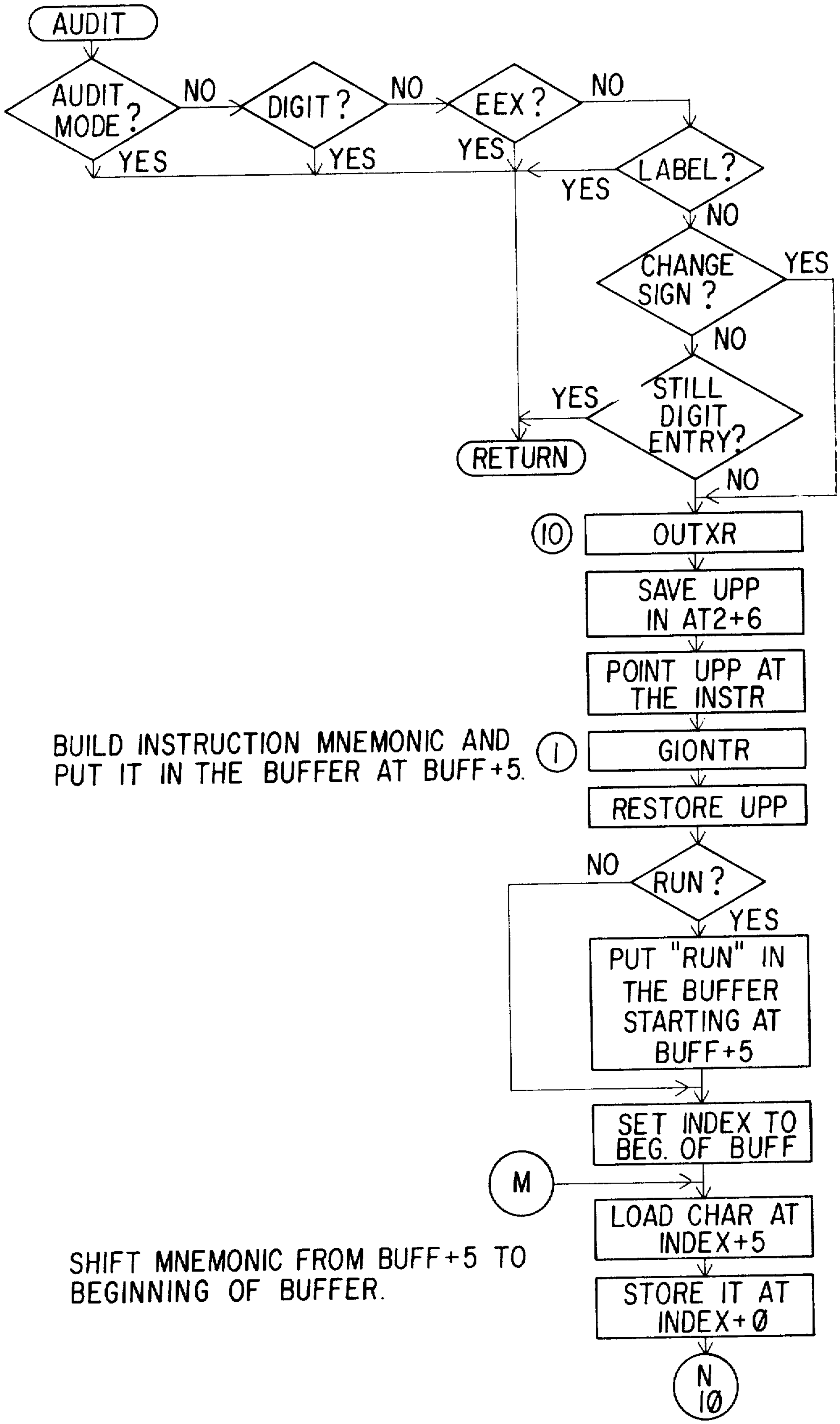
FIGS. 69A–M are a flow chart of the program list routine stored in ROM 4 of FIG. 6.
Figure 69A:
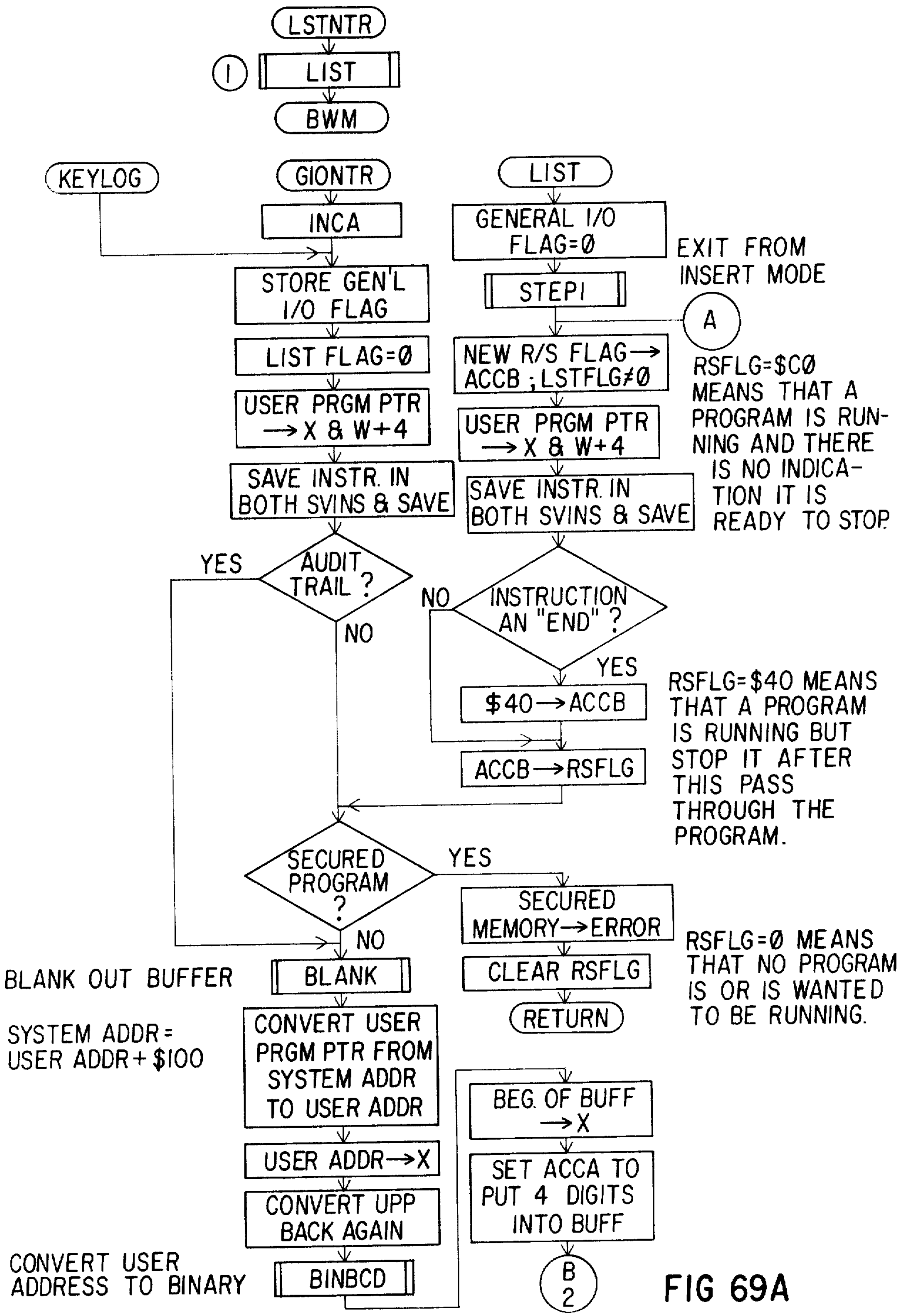
Figure 69B:
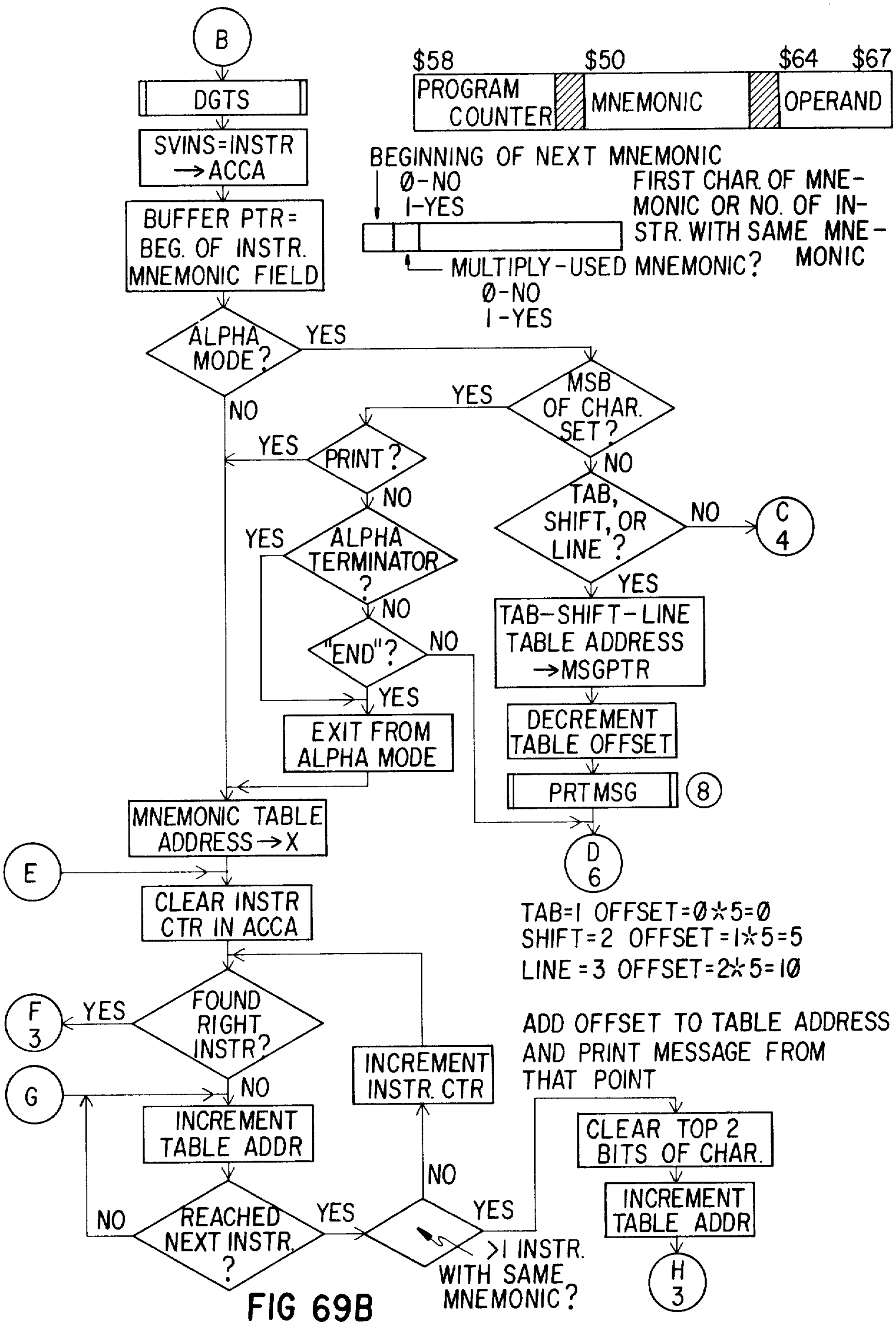
Figure 69C:
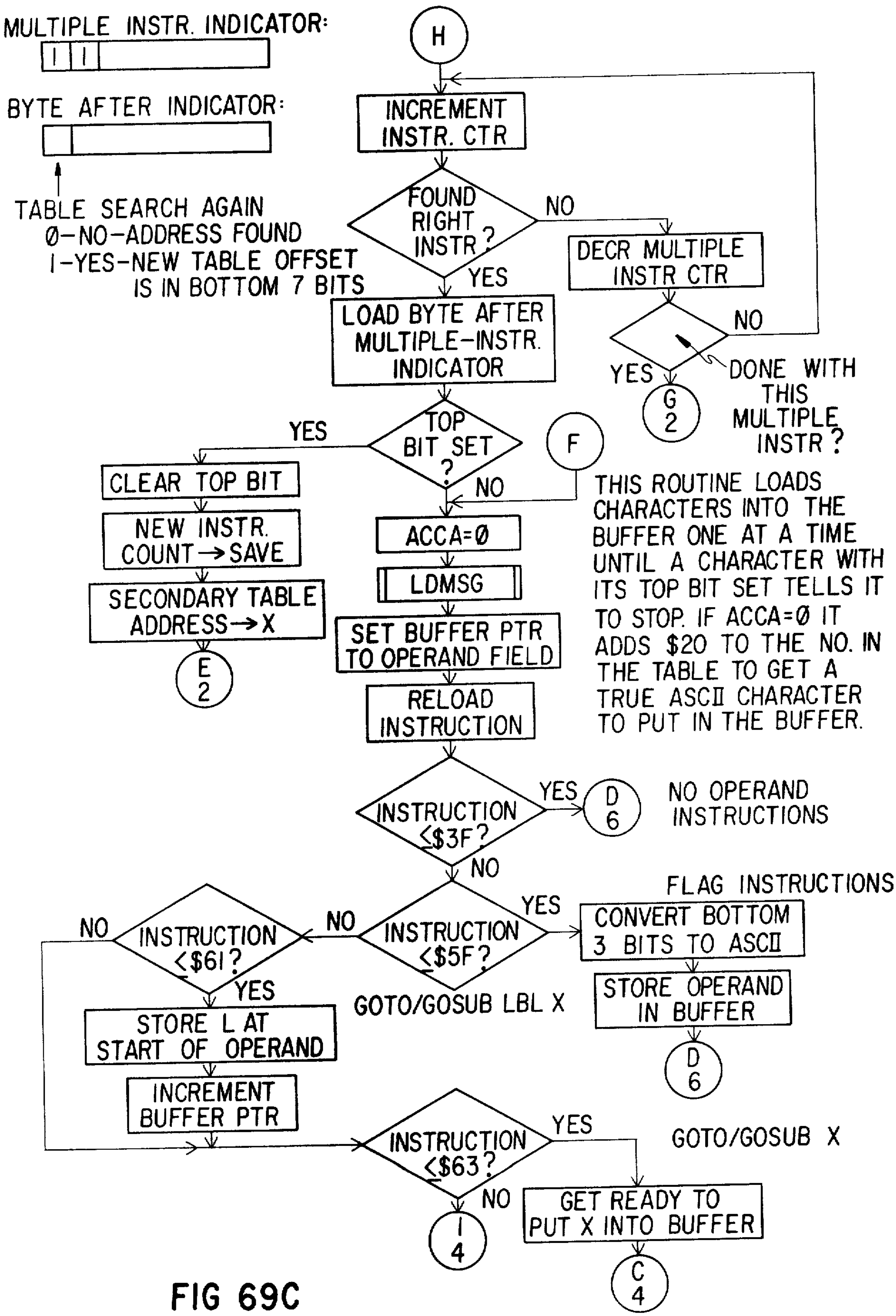
Figure 69D:
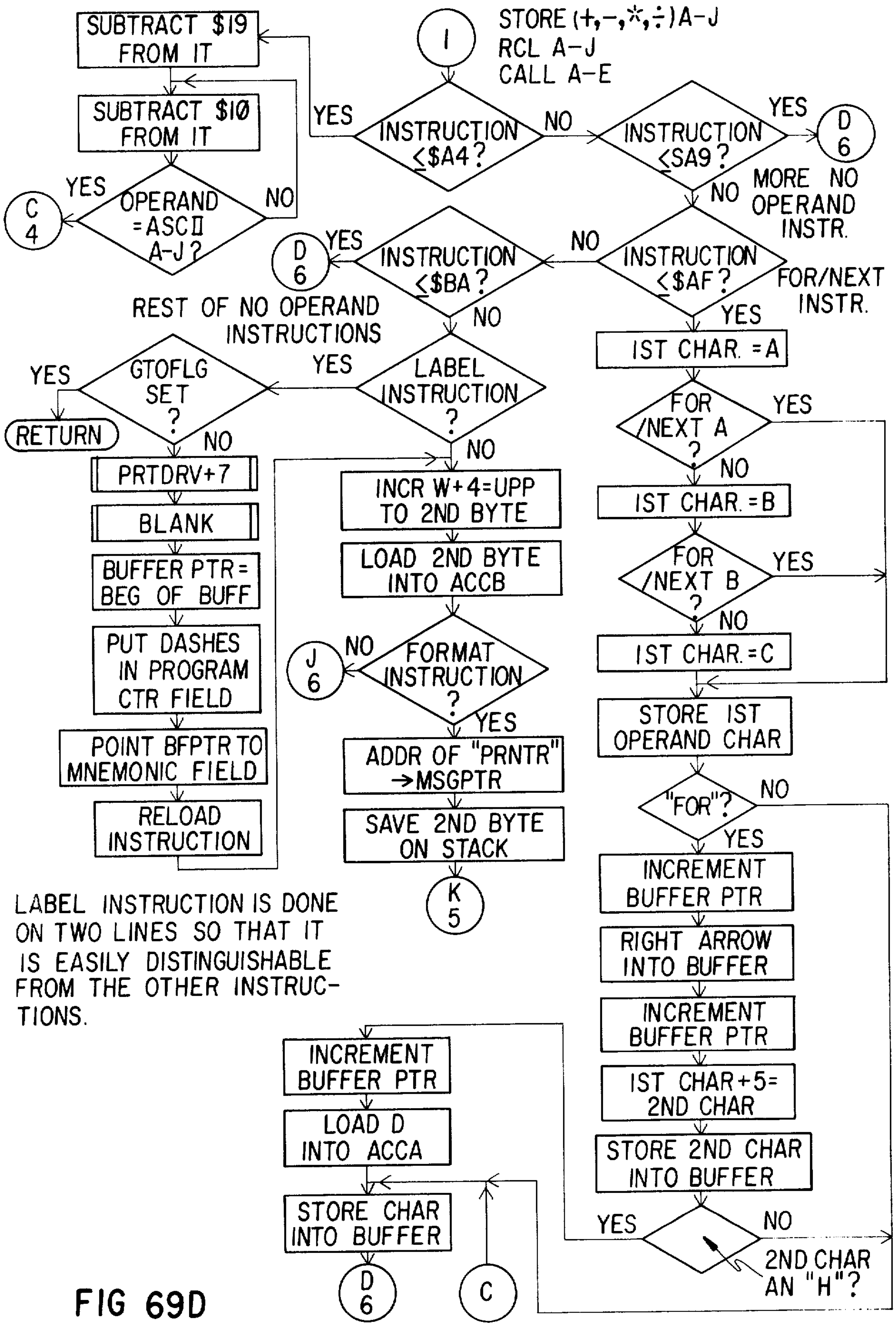
Figure 69E:
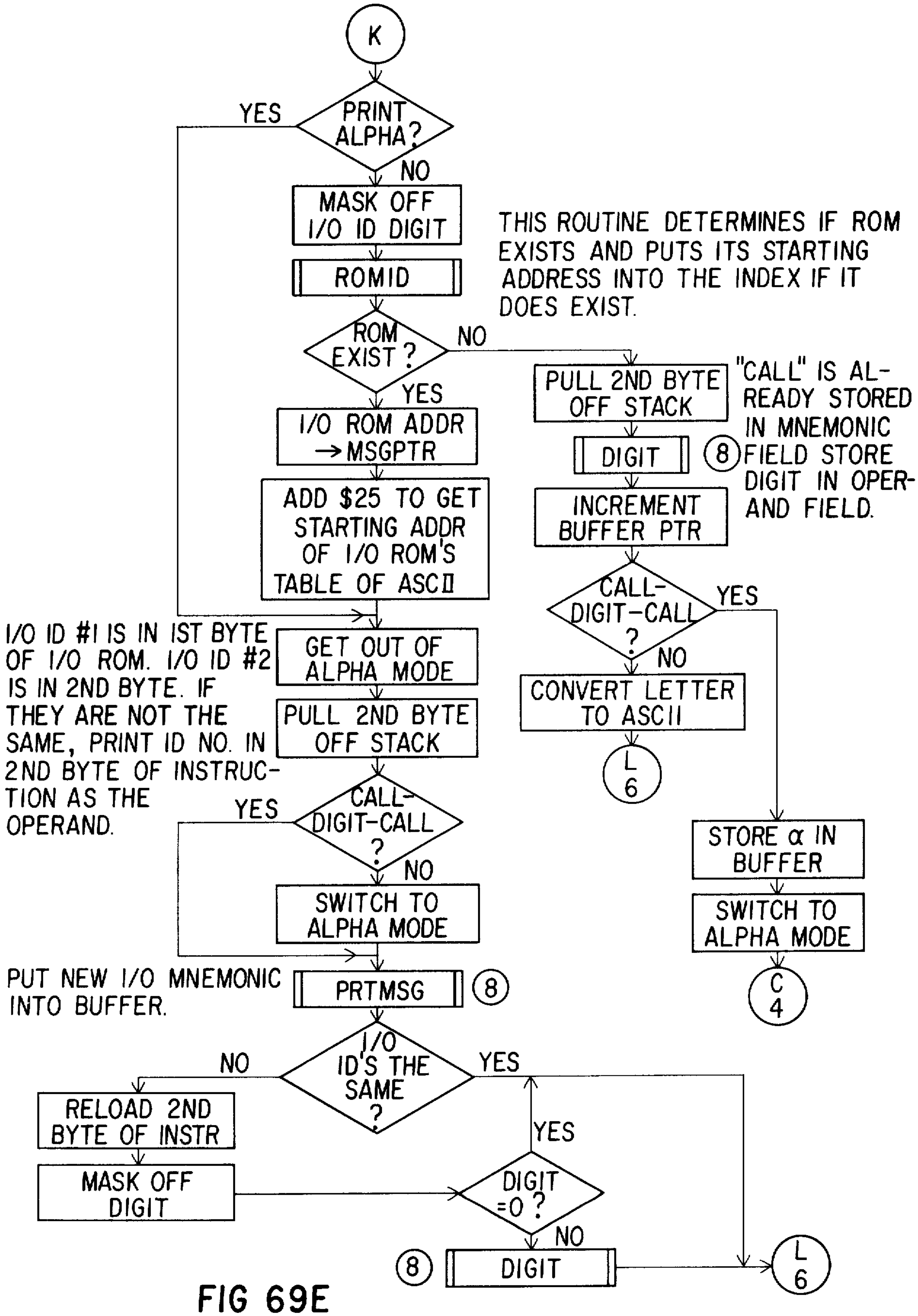
Figure 69F:
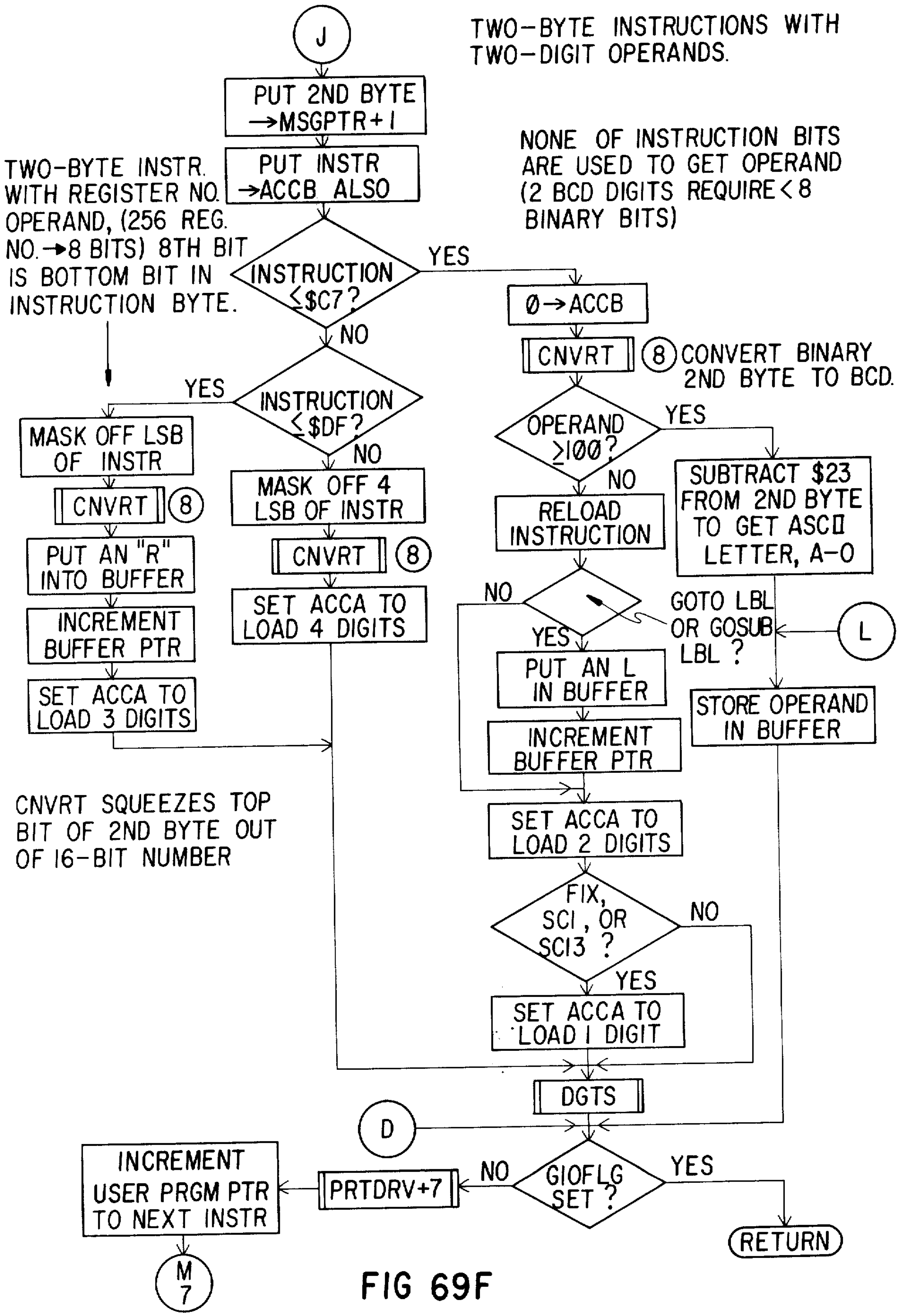
Figure 69G:
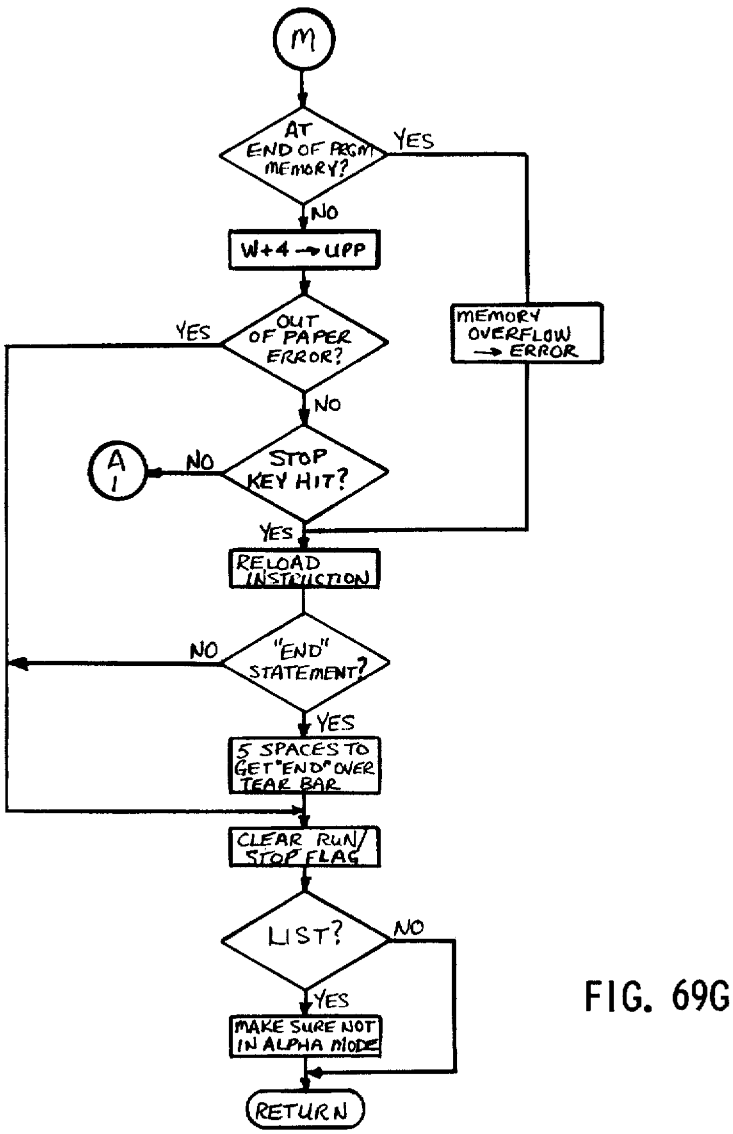
Figure 69H:
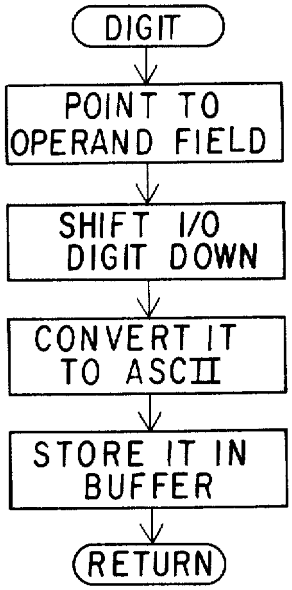
Figure 69I:
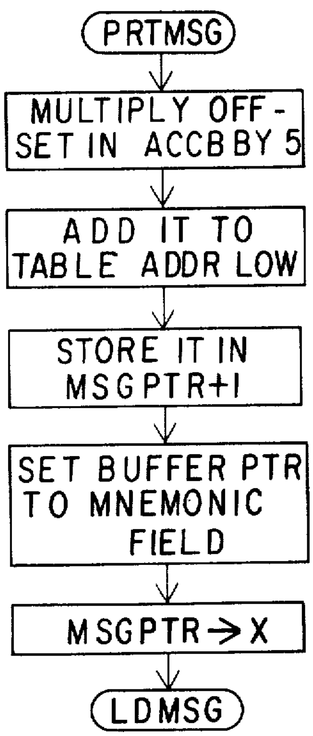
Figure 69J:
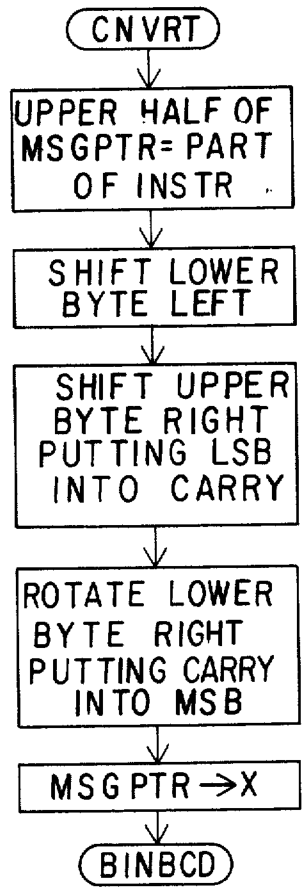
Figure 69L:
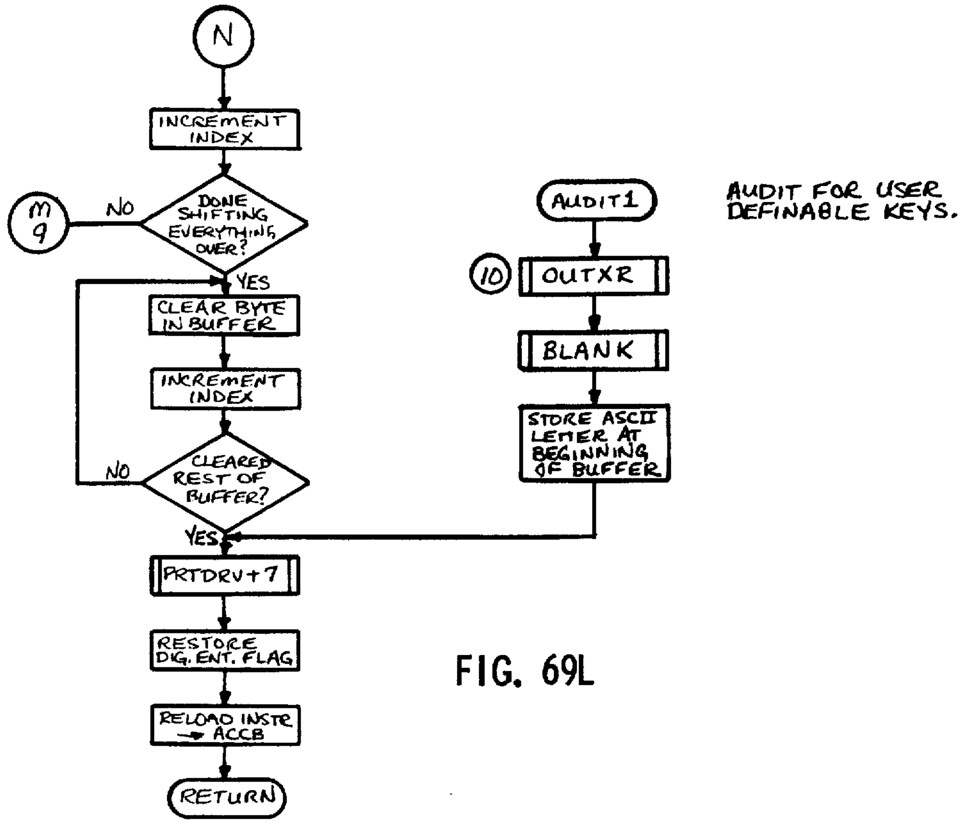
Figure 69M:
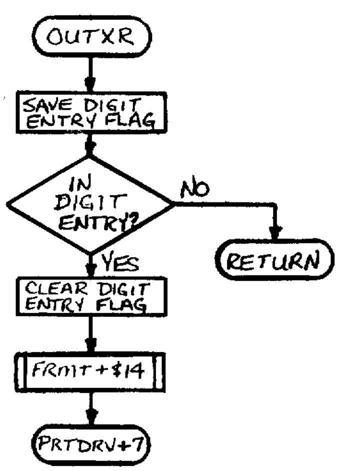
Figure 70A:
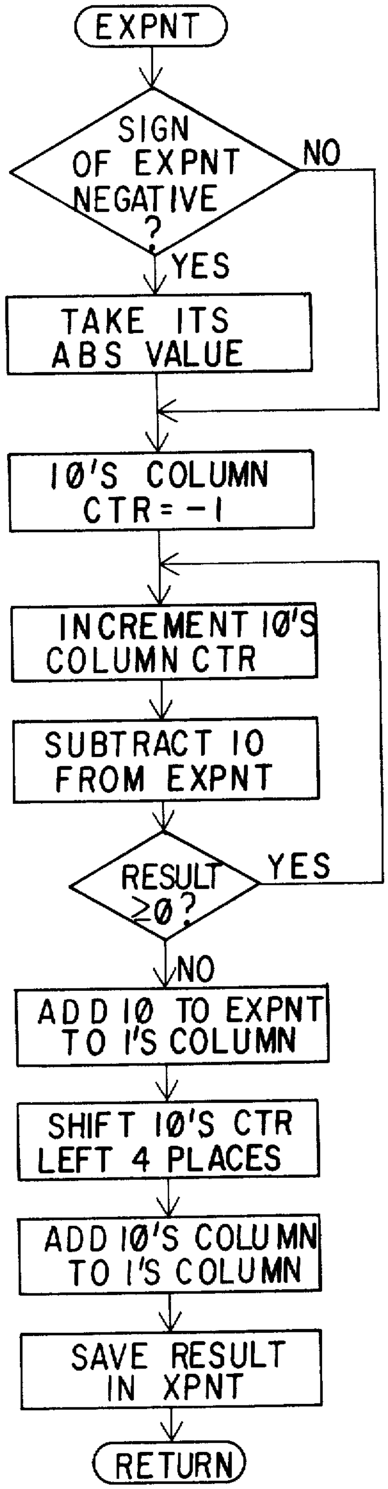
FIGS. 70A–G are a flow chart of the numeric formatting routine stored in ROM 4 of FIG. 6.
Figure 70B:
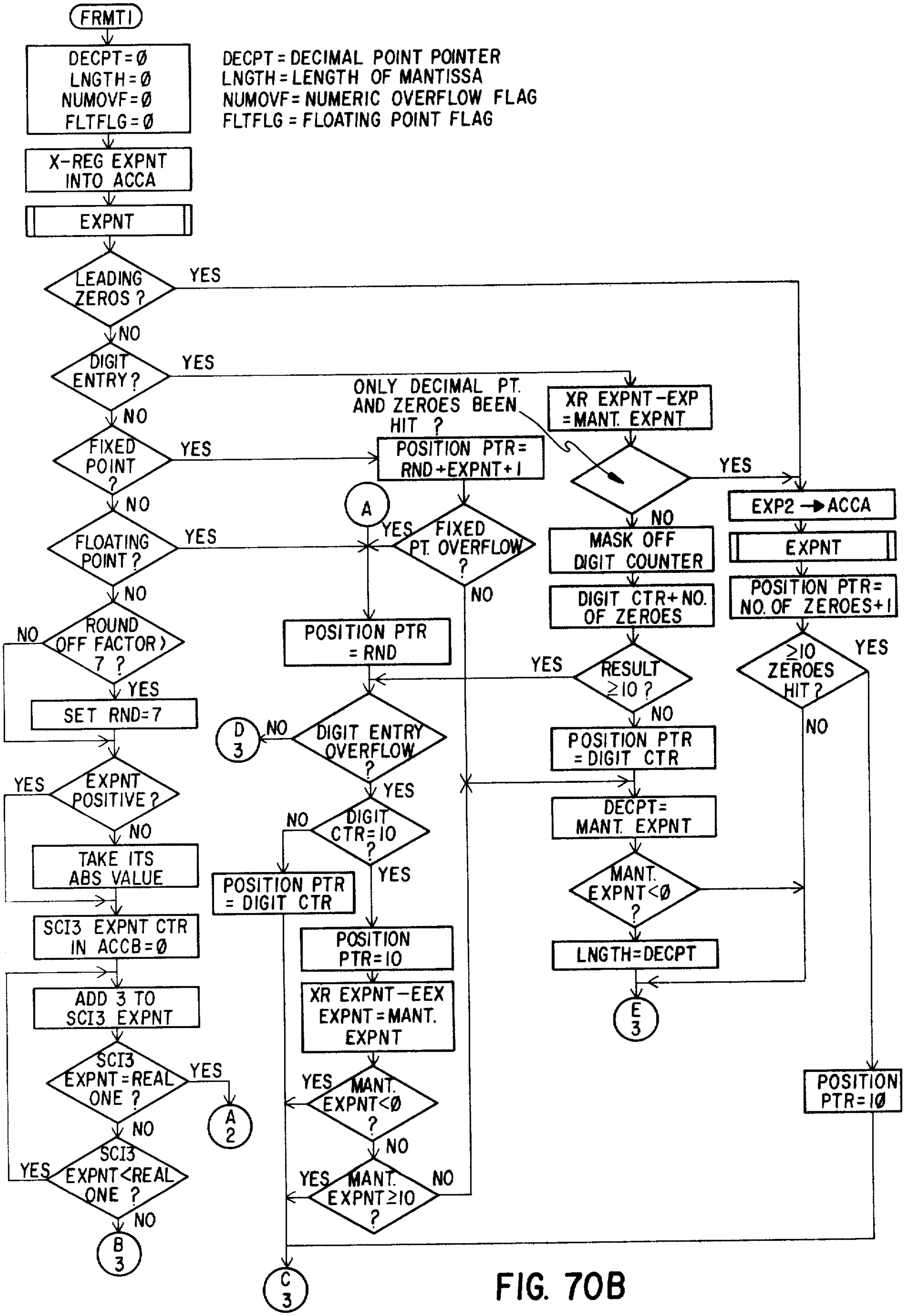
Figure 70C:
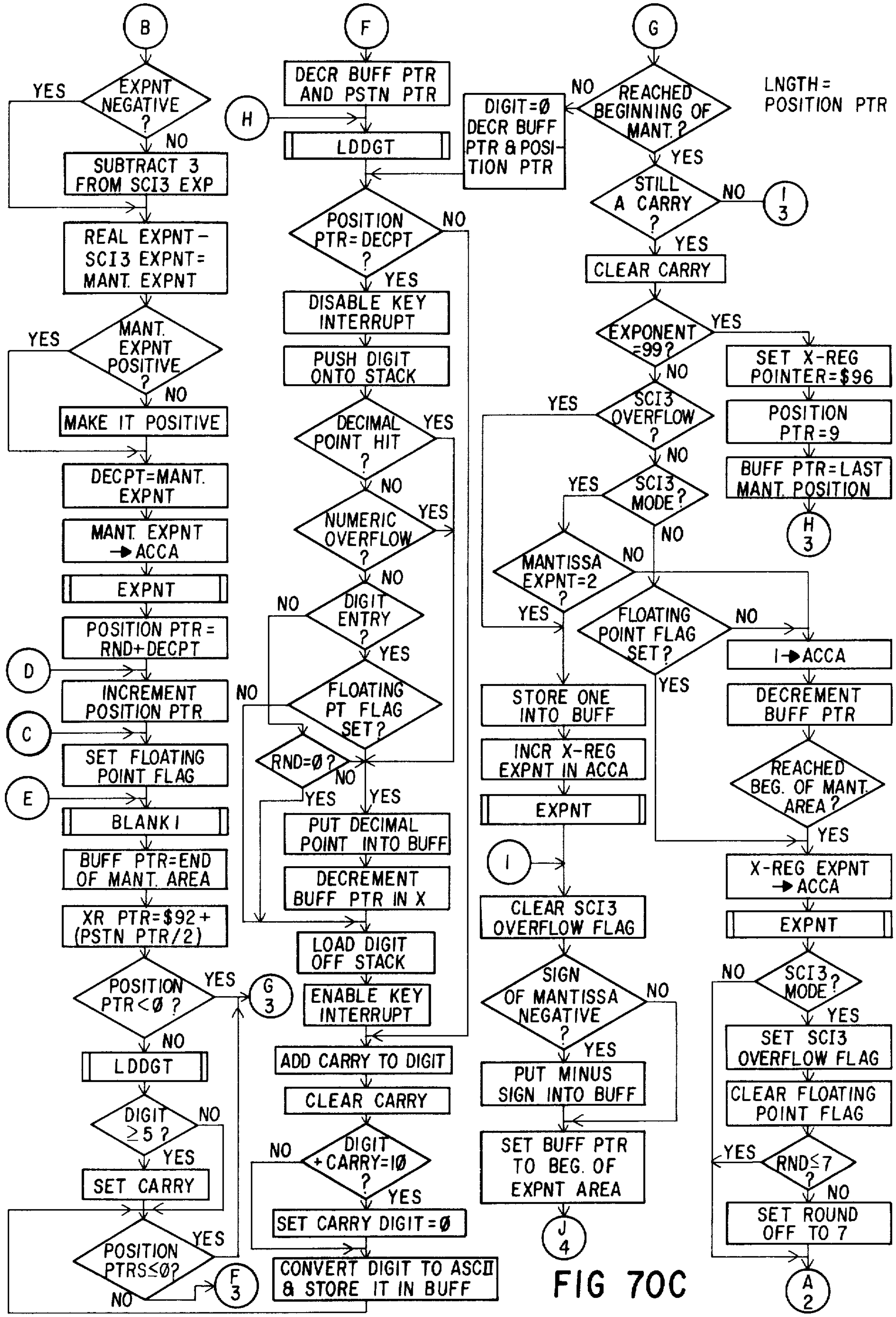
Figure 70D:
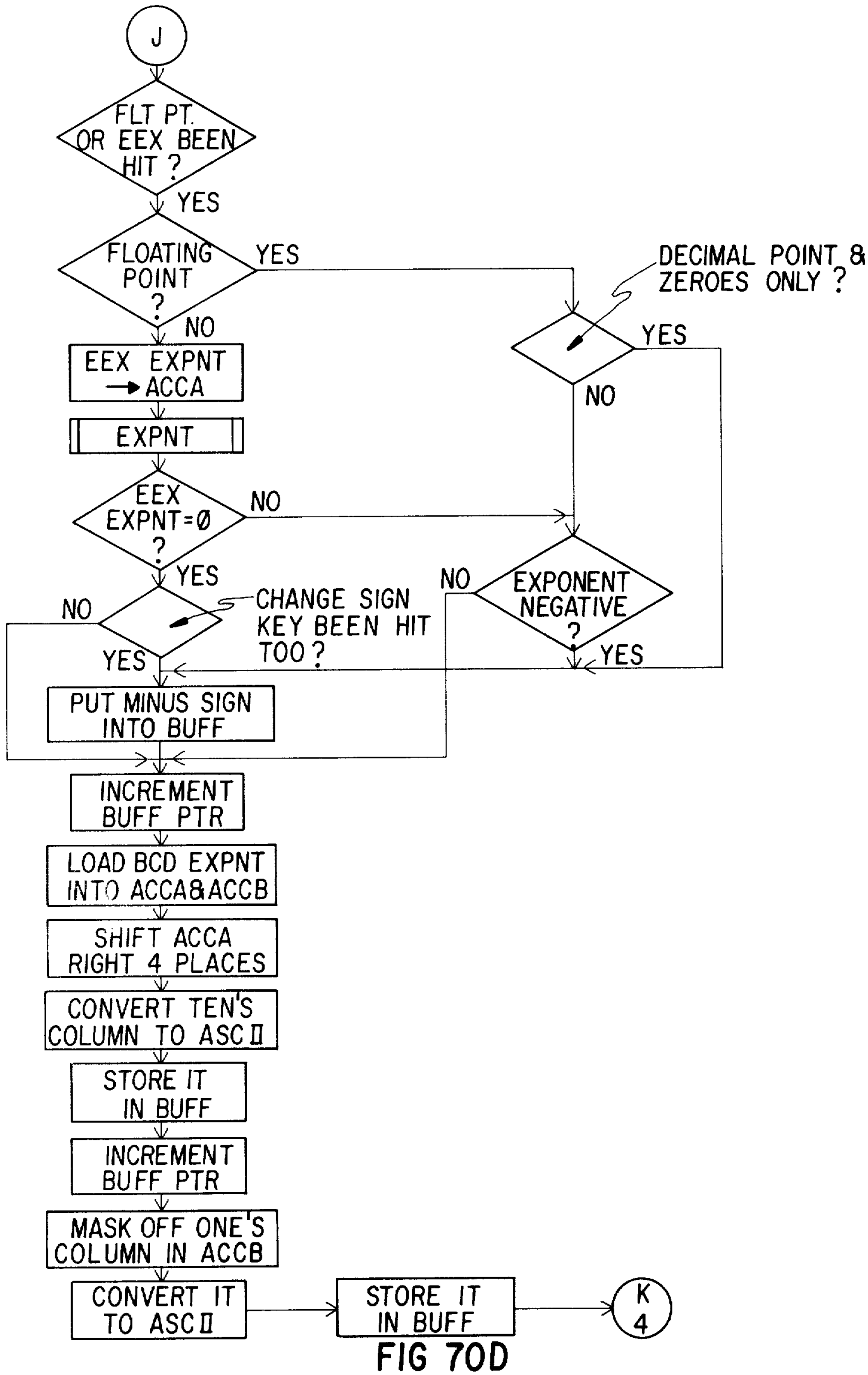
Figure 70E:
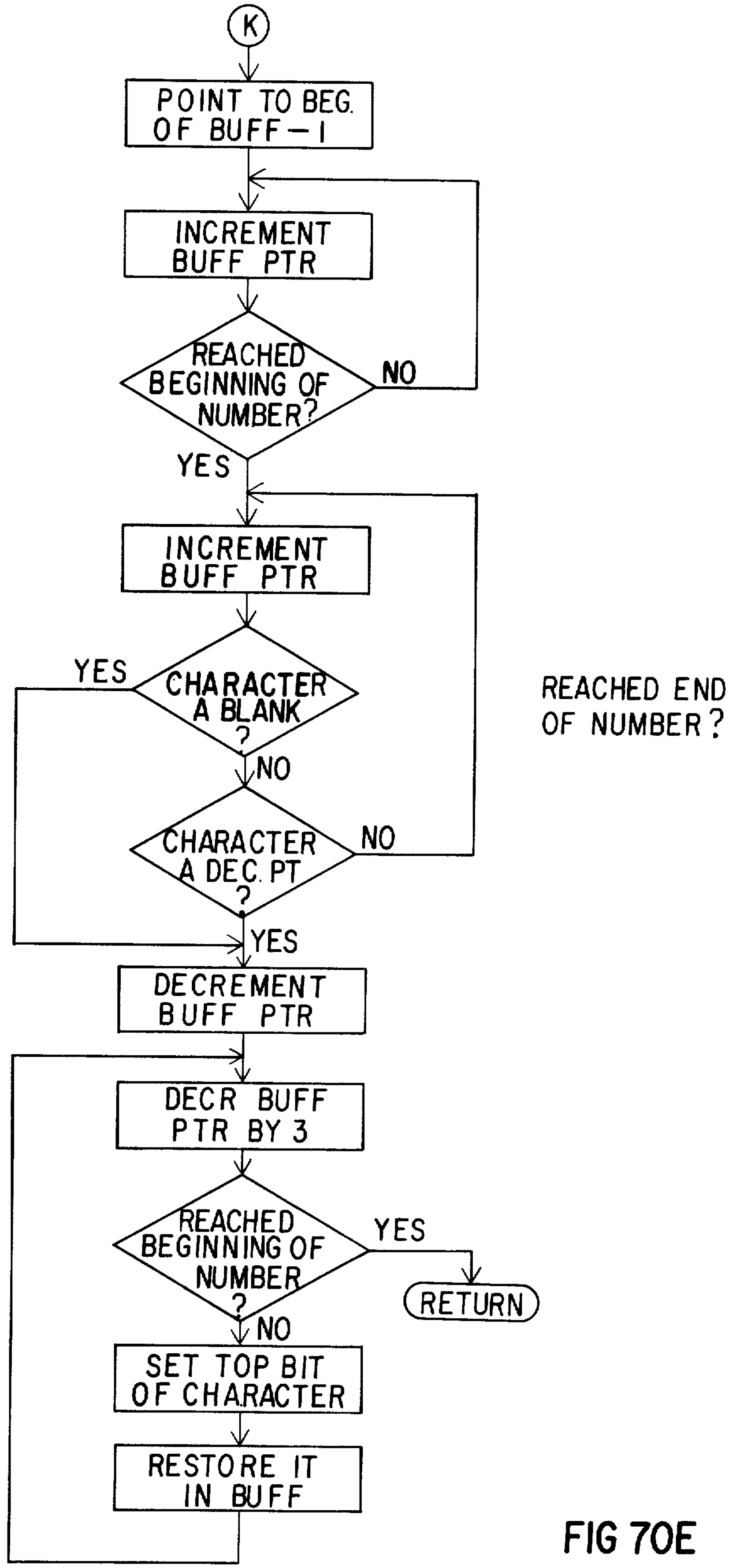
Figure 70F:
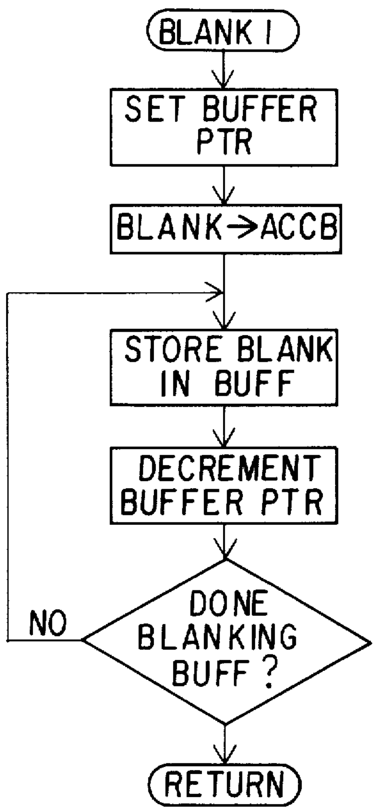
Figure 70G:
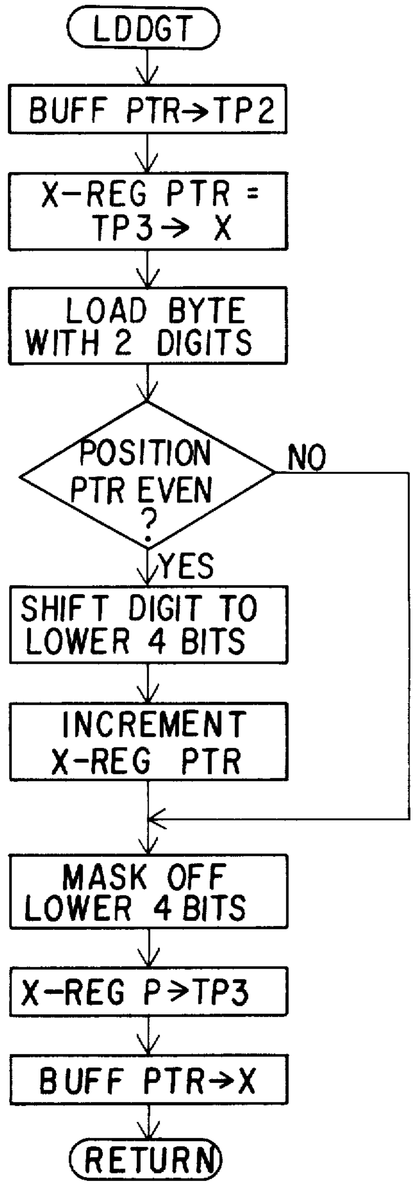
Figure 71A:
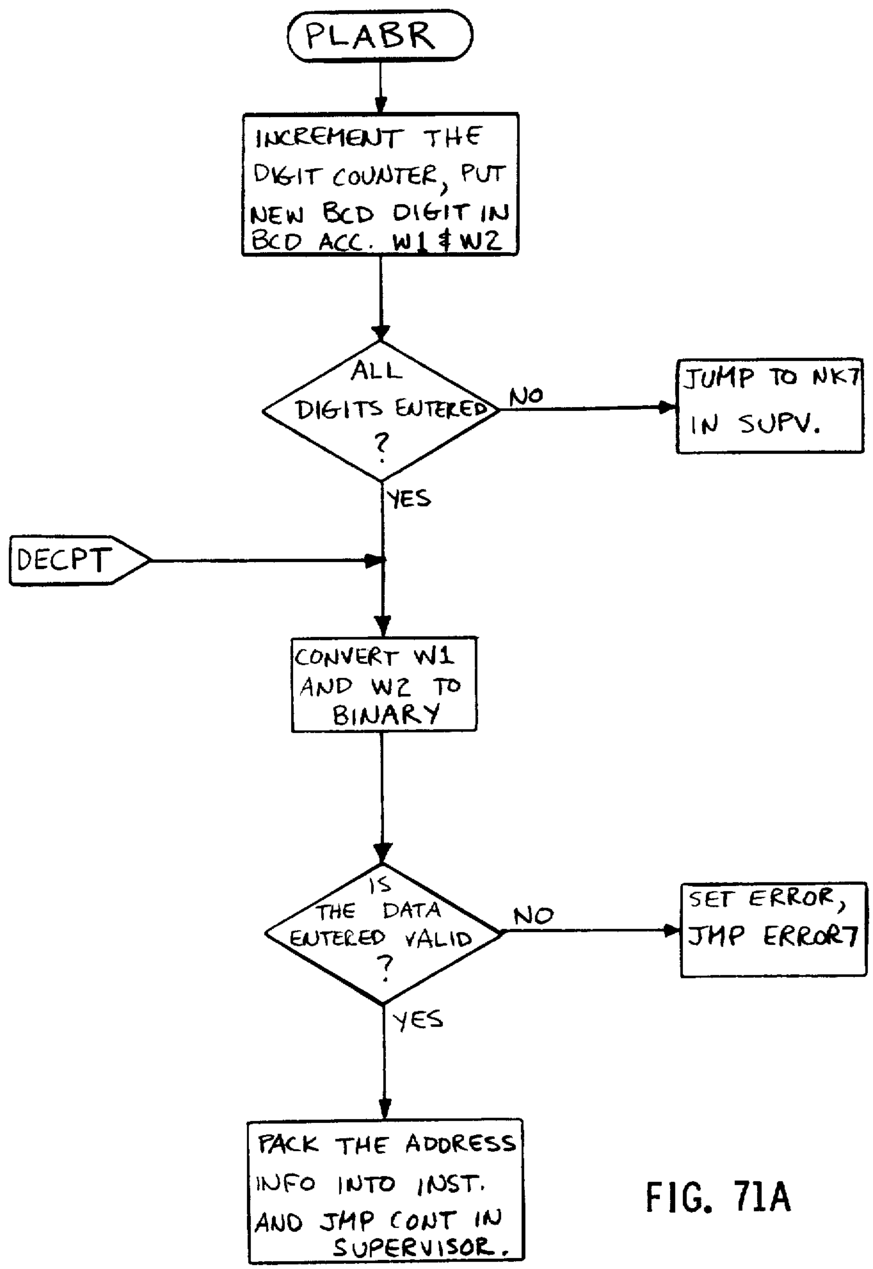
FIGS. 71A–X are a flow chart of the program list routine stored in ROM 4 of FIG. 6.
Figure 71B:
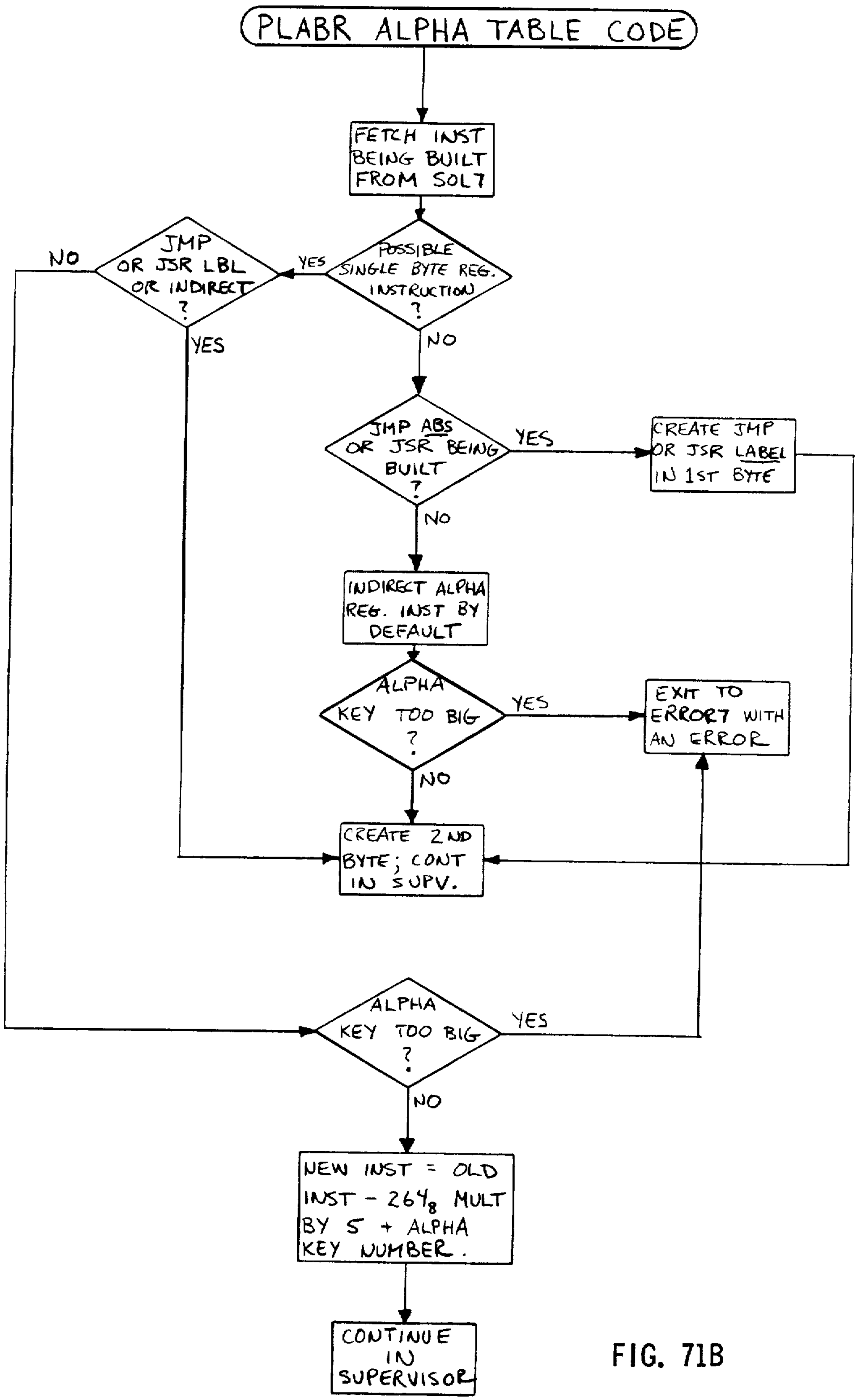
Figure 71C:
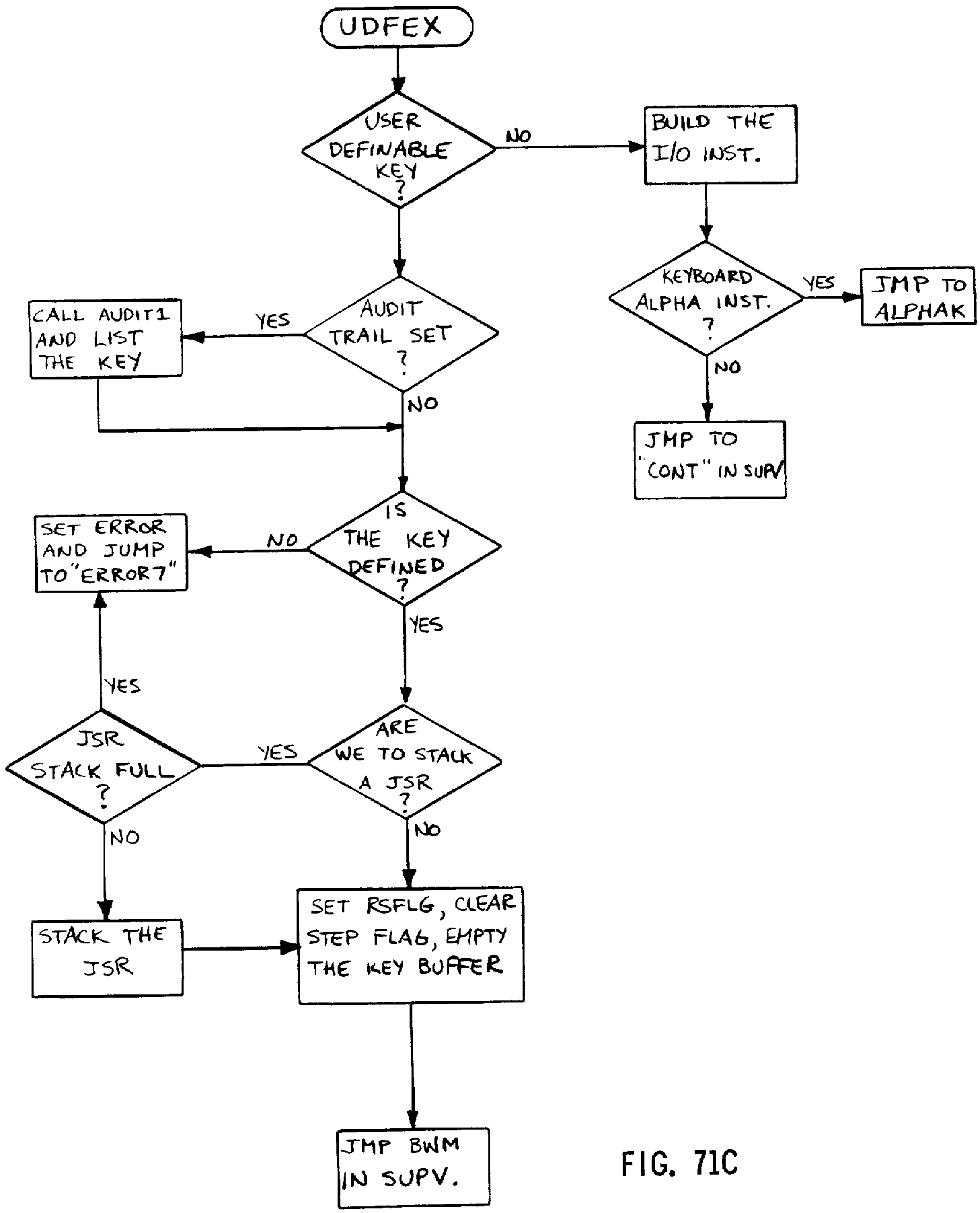
Figure 71D:
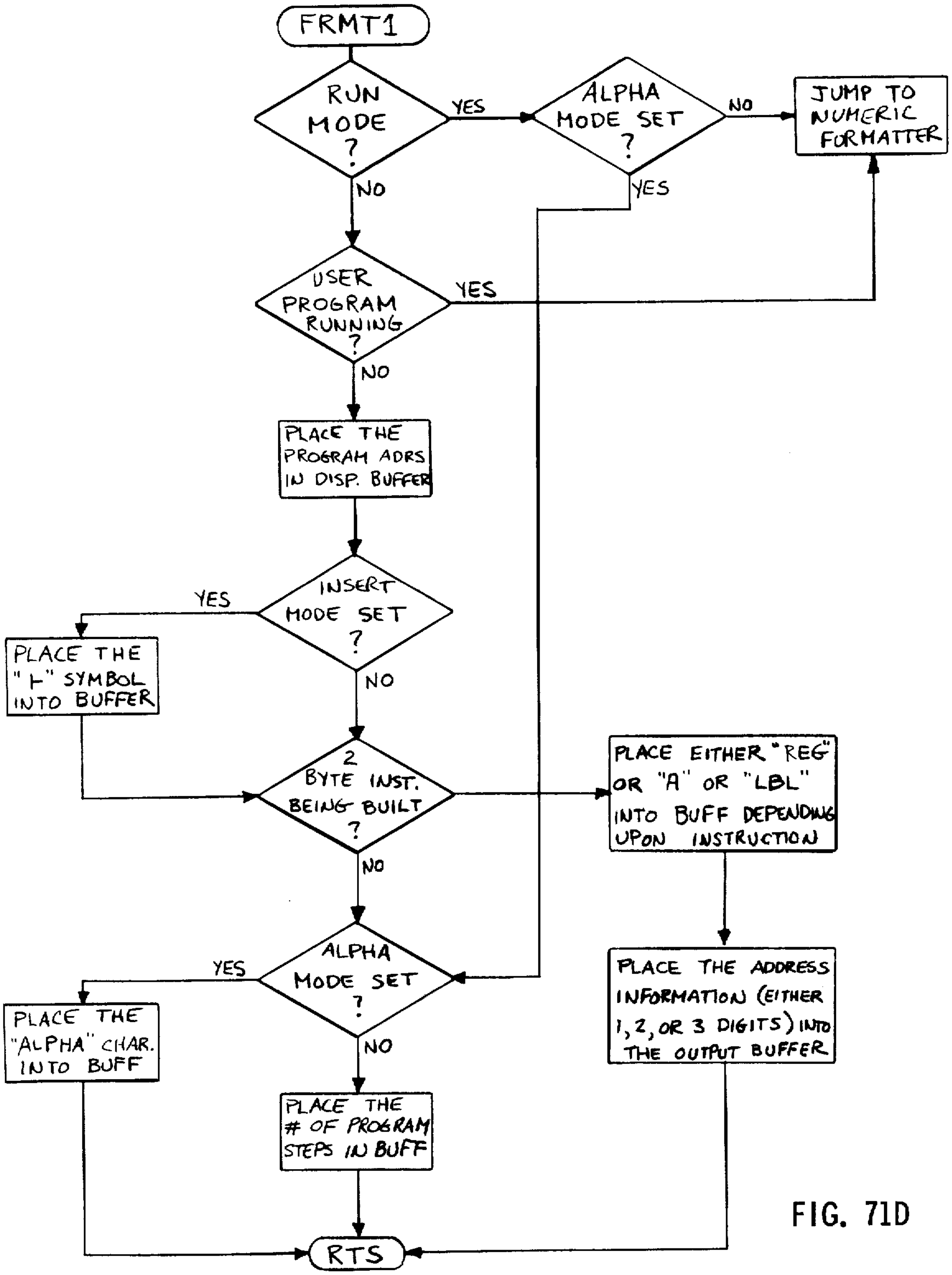
Figure 71E:
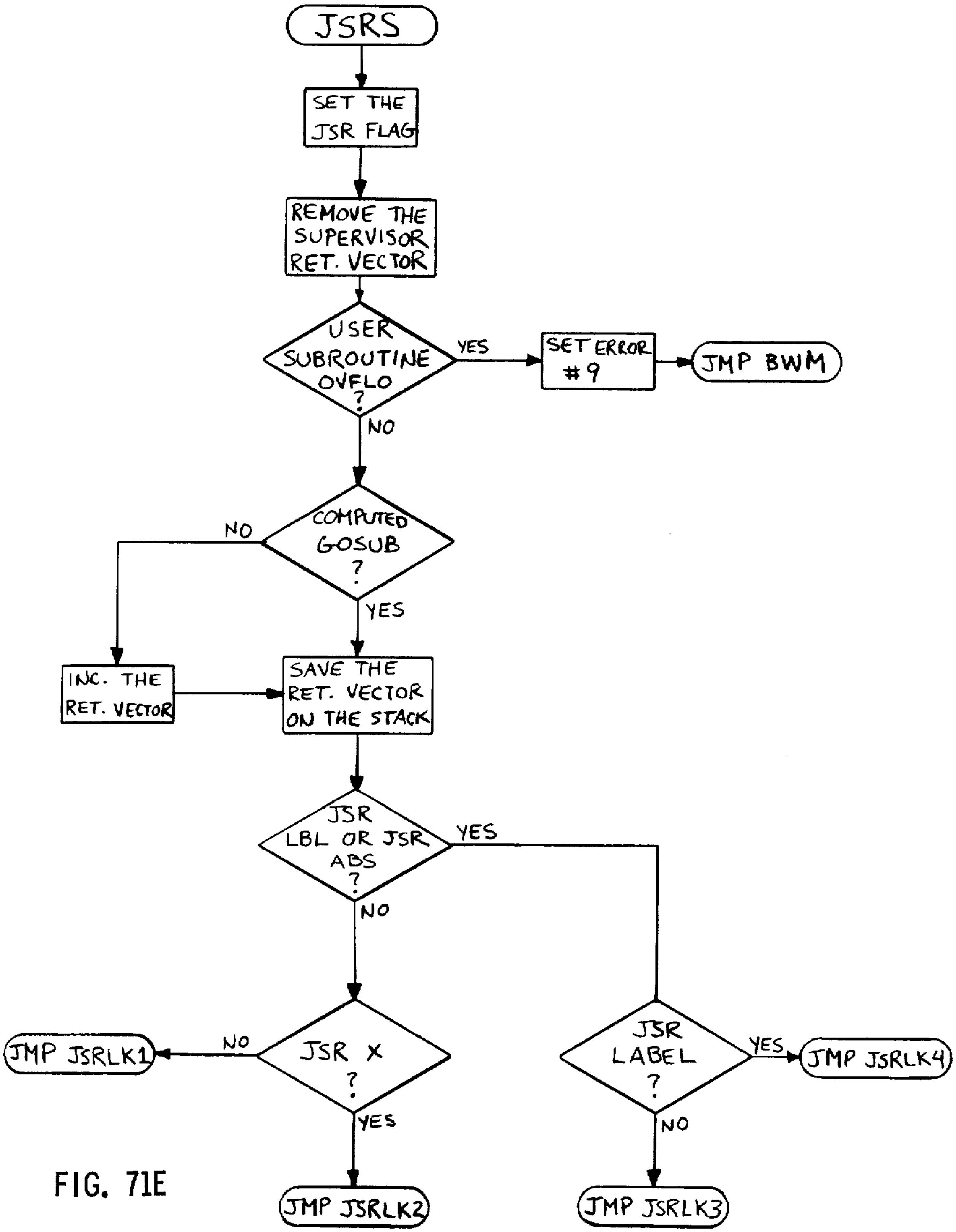
Figure 71F:
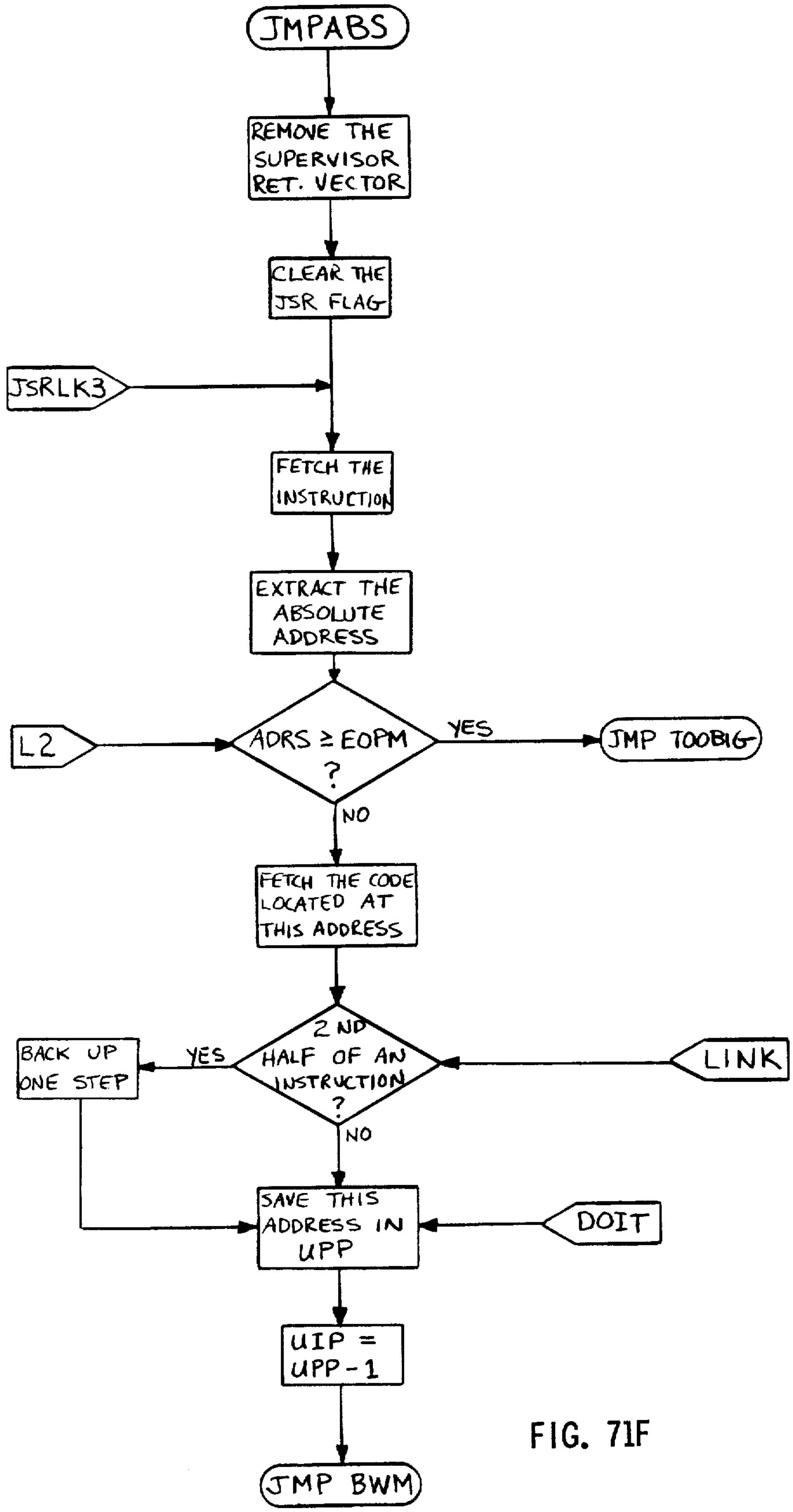
Figure 71G:
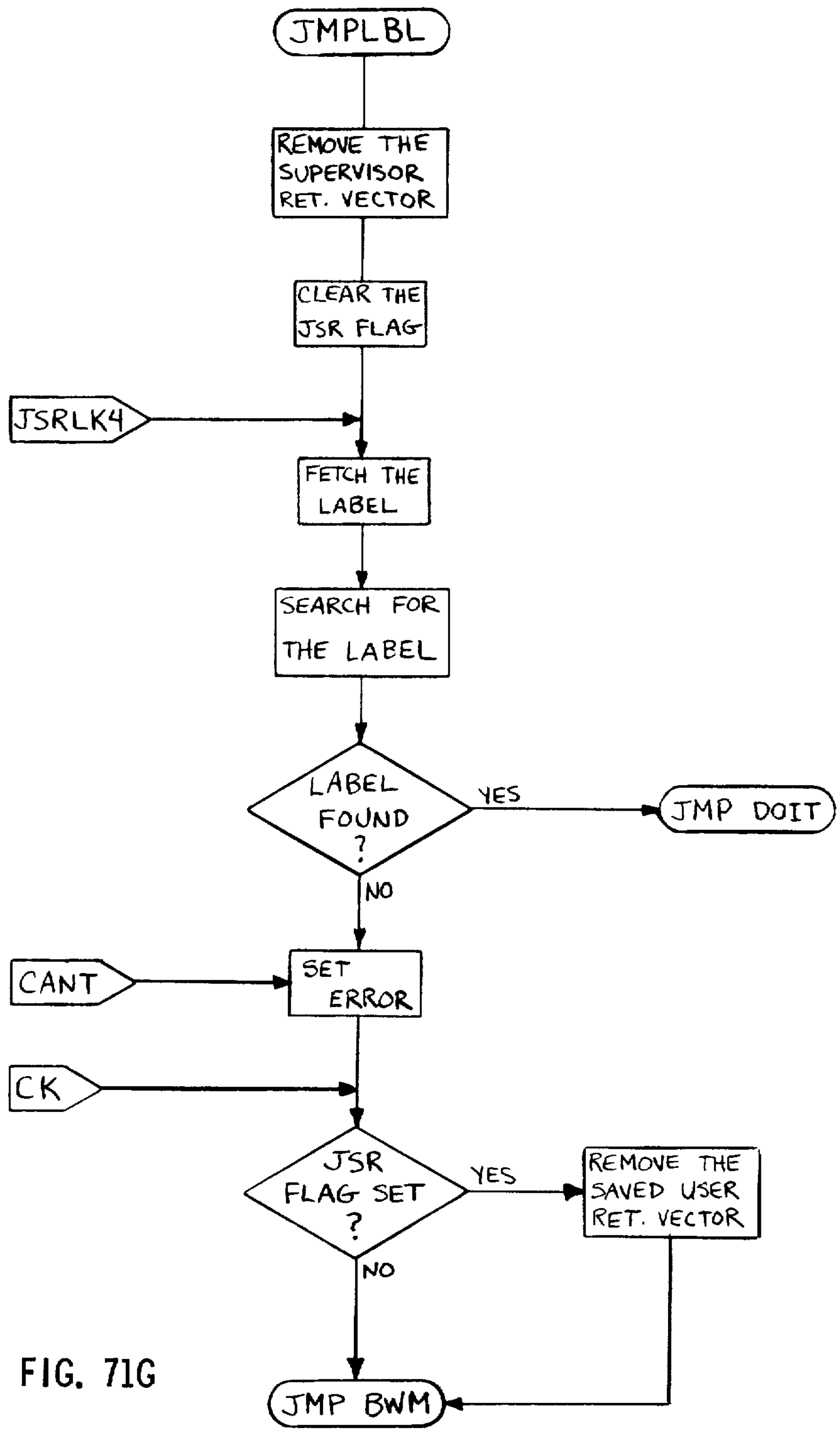
Figure 71H:
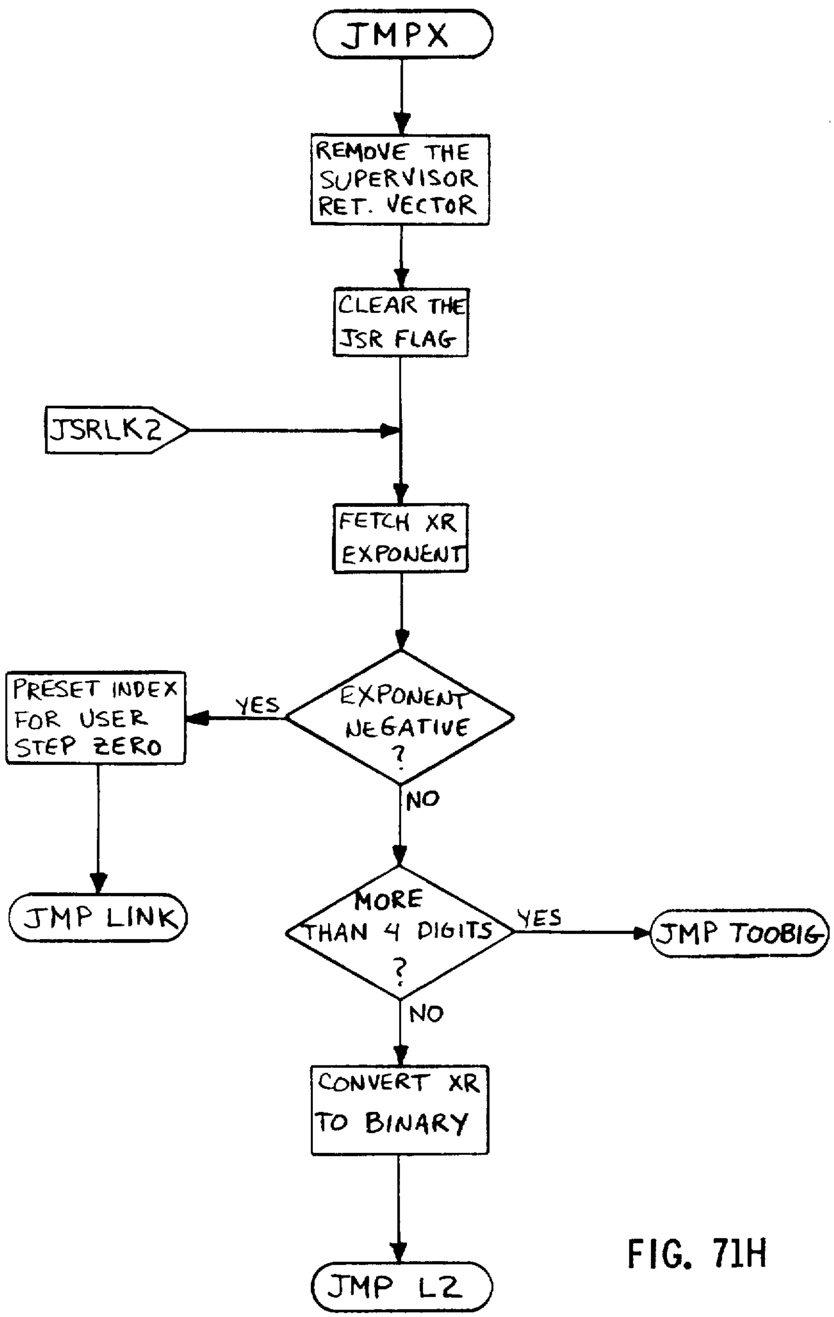
Figure 71:
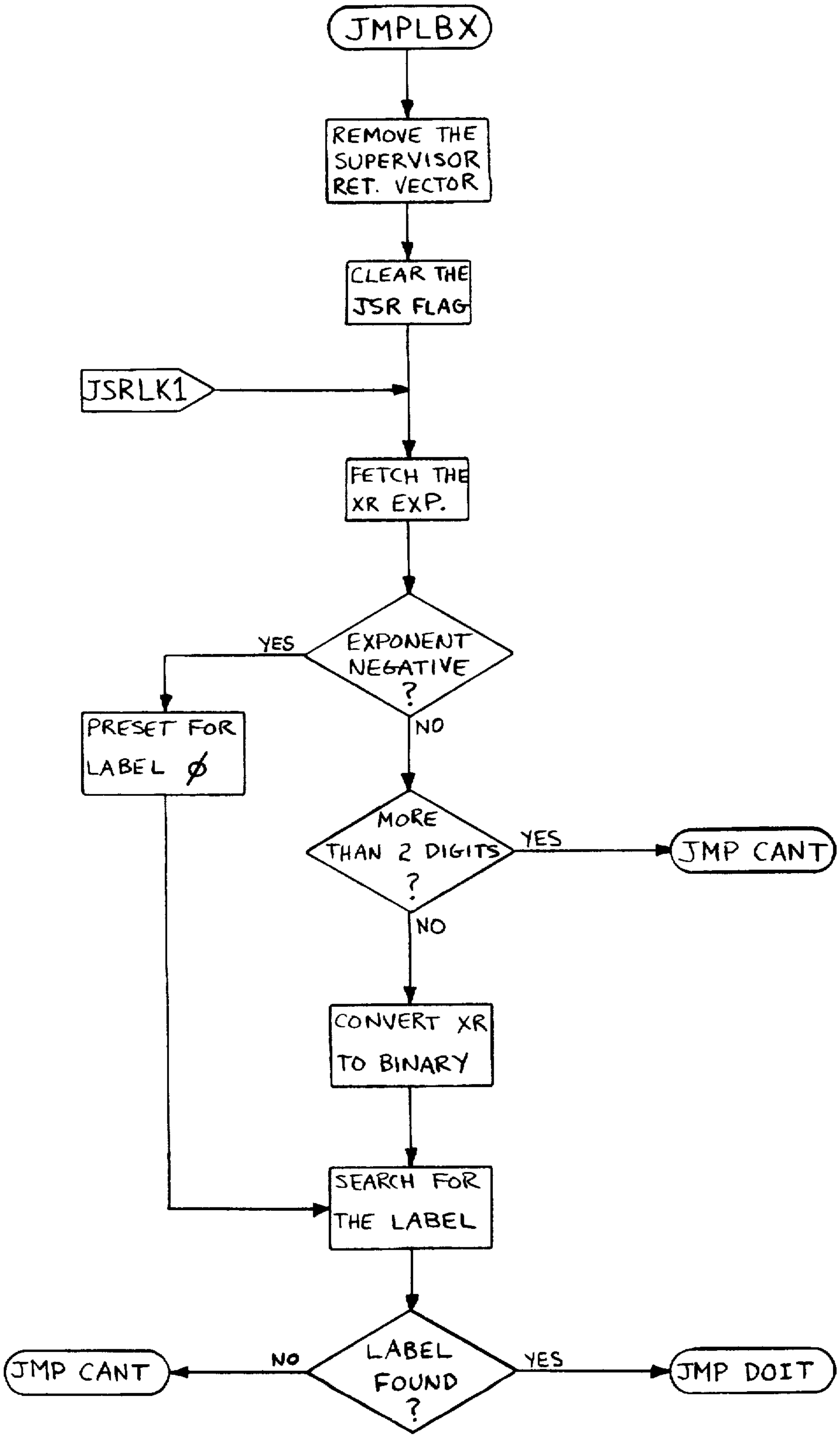
Figure 71J:
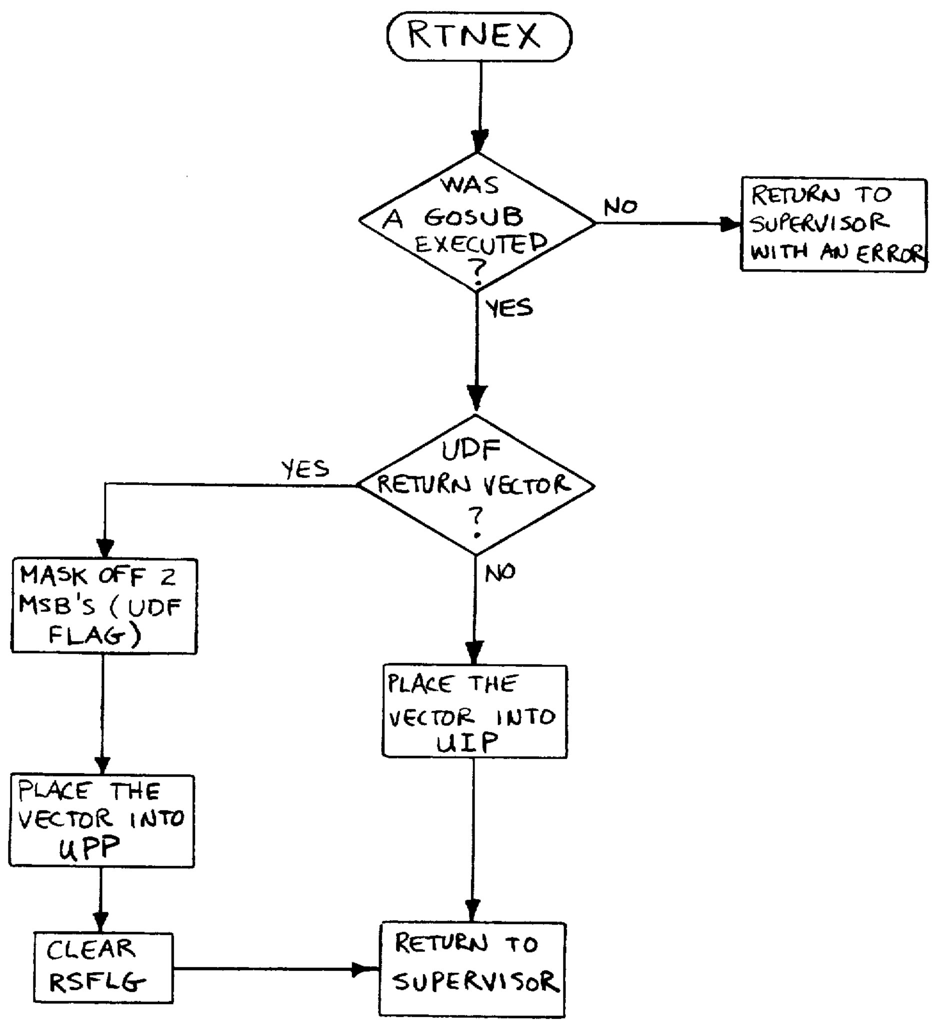
Figure 71K:
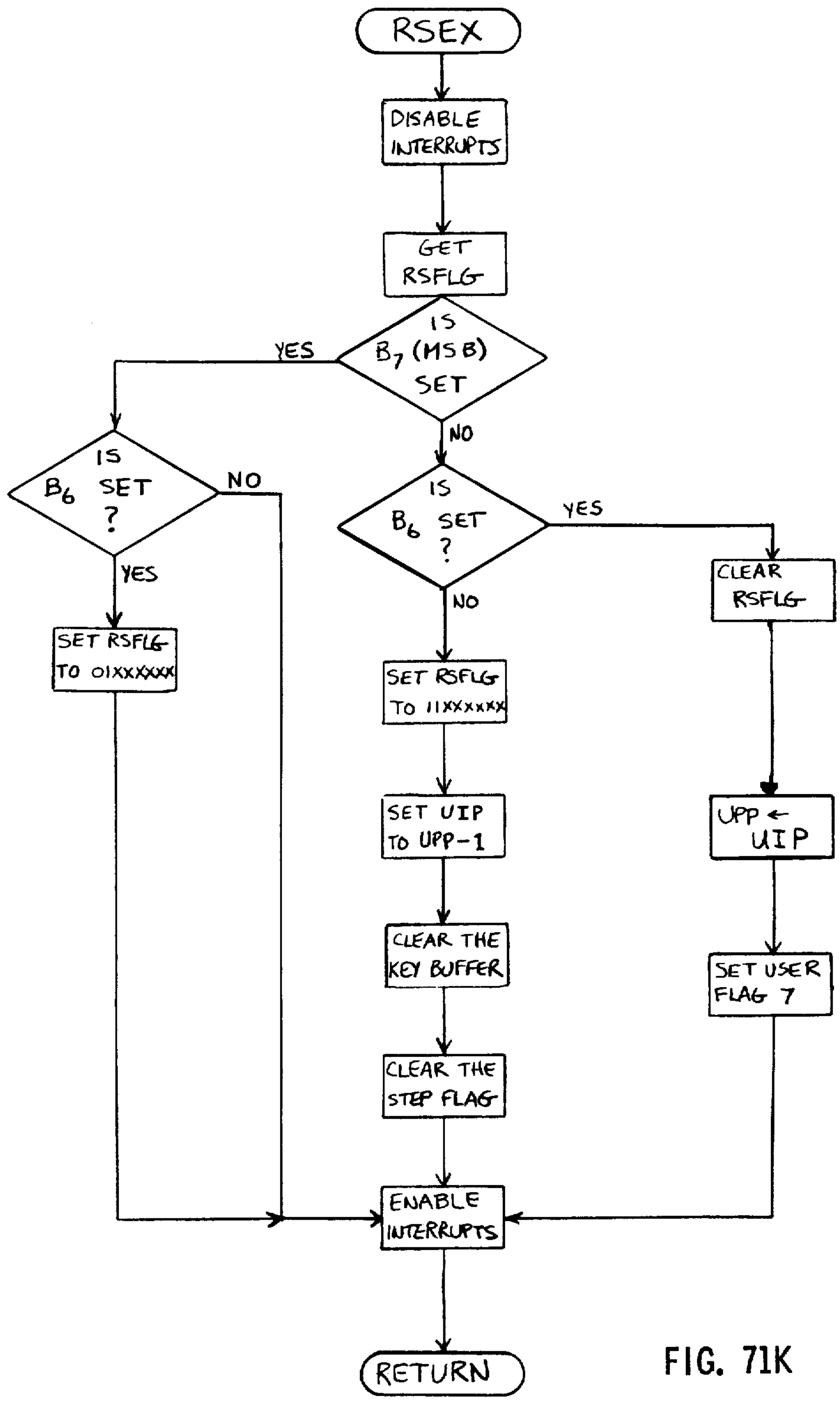
Figure 71:
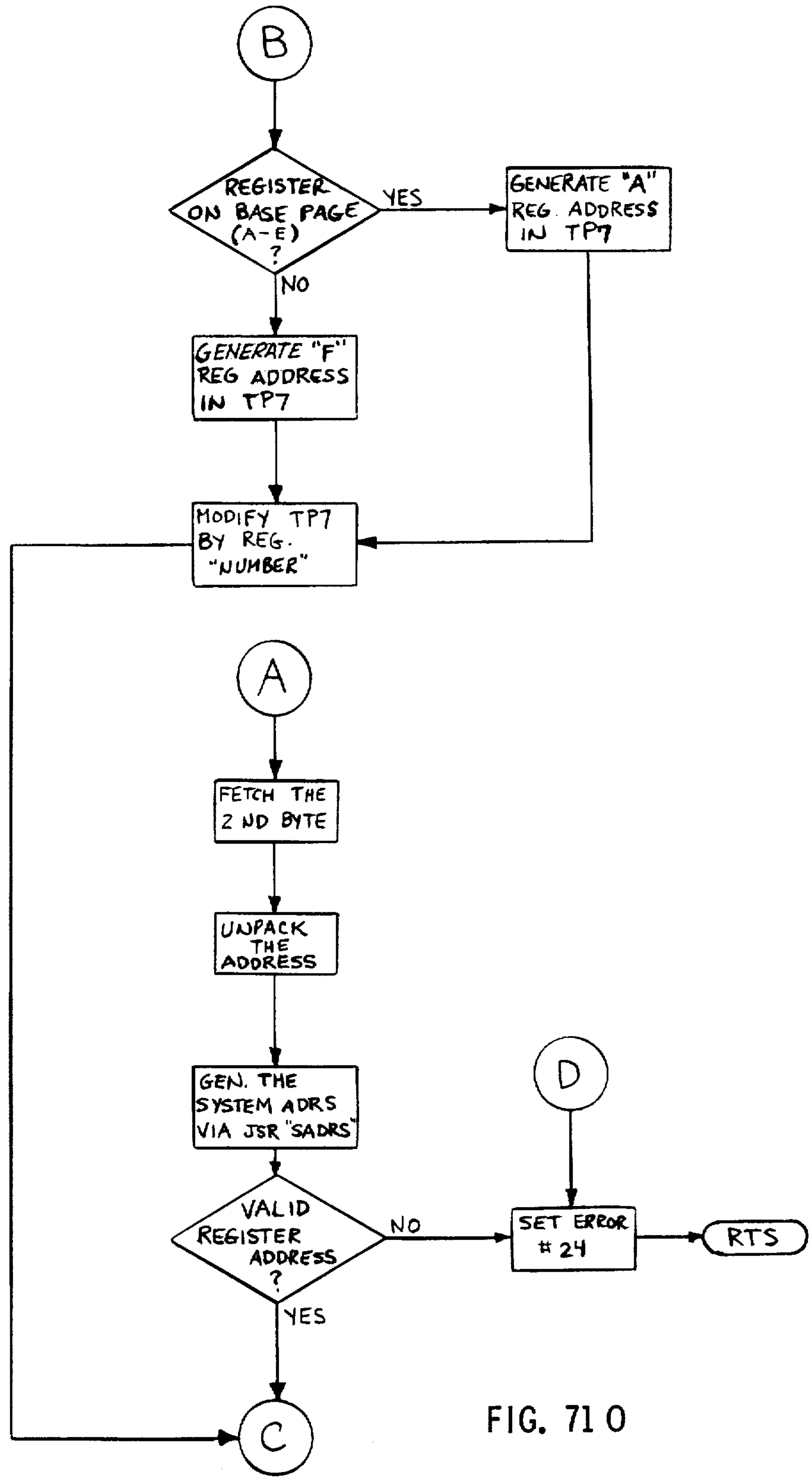
Figure 71P:
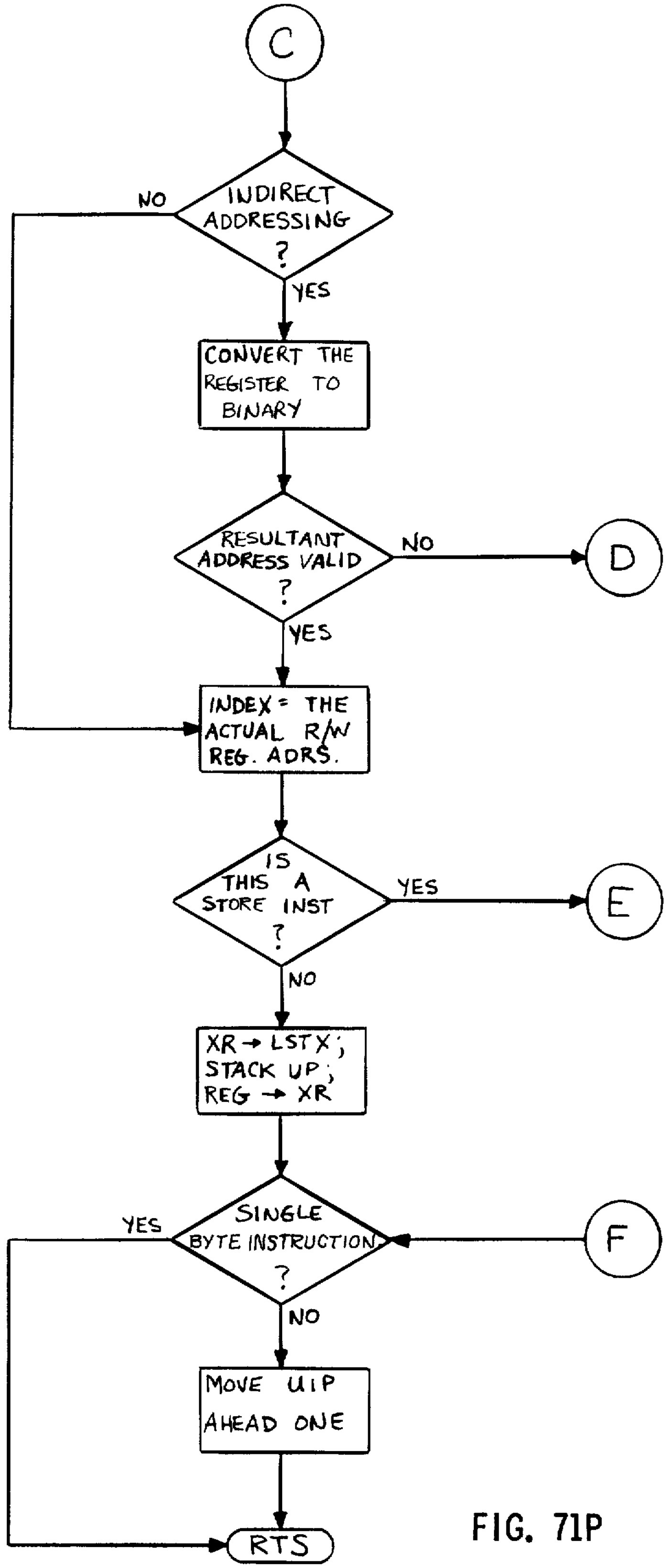
Figure 71X:
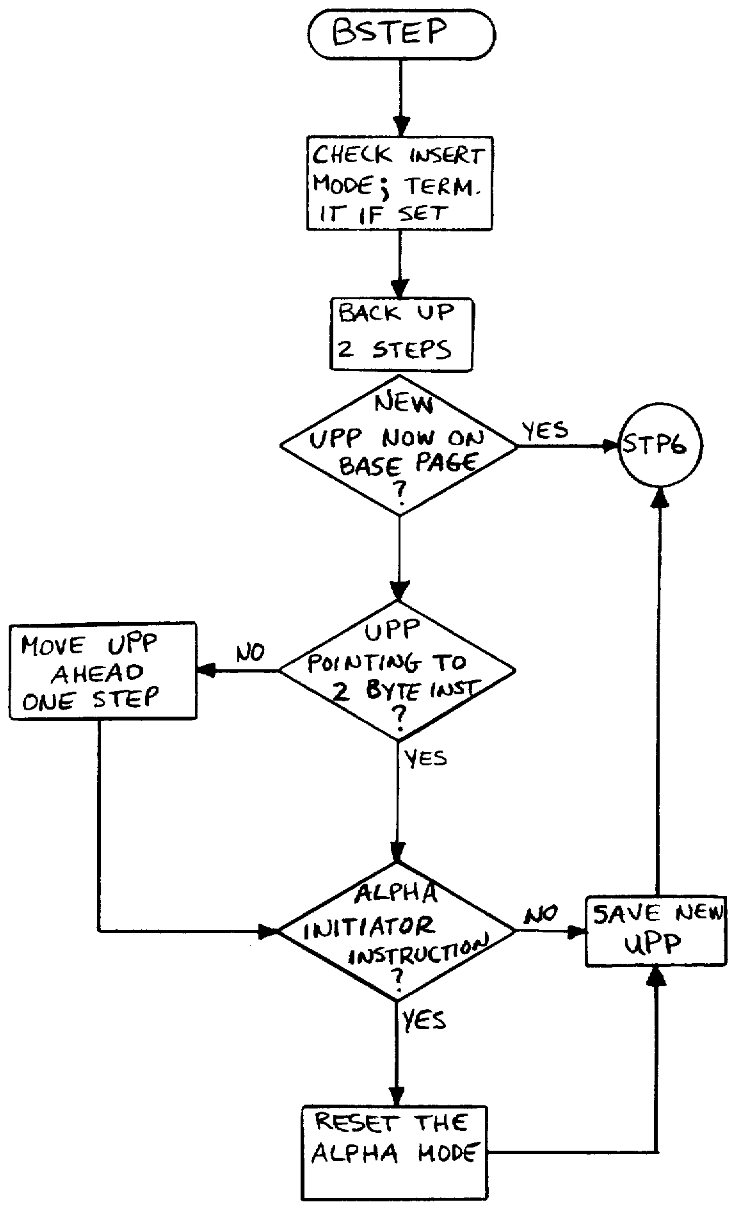
Figure 72A:
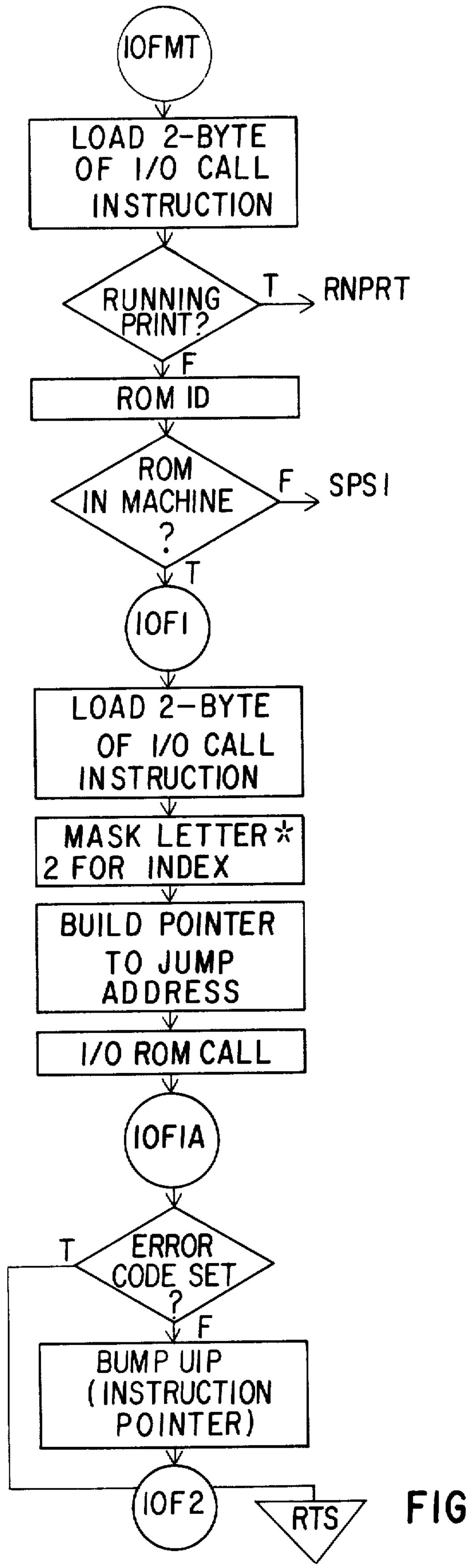
FIGS. 72A–B are a flow chart of the I/O calling routines stored in ROM 5 of FIG. 6.
Figure 72B:
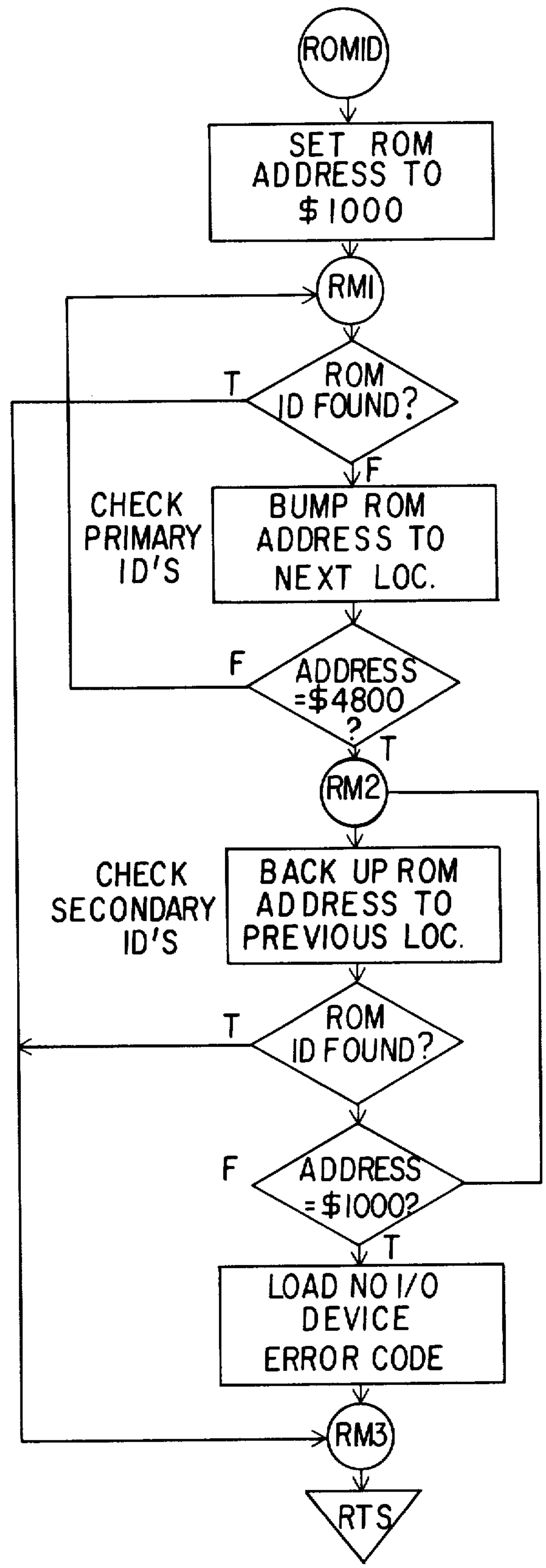
Figure 73:
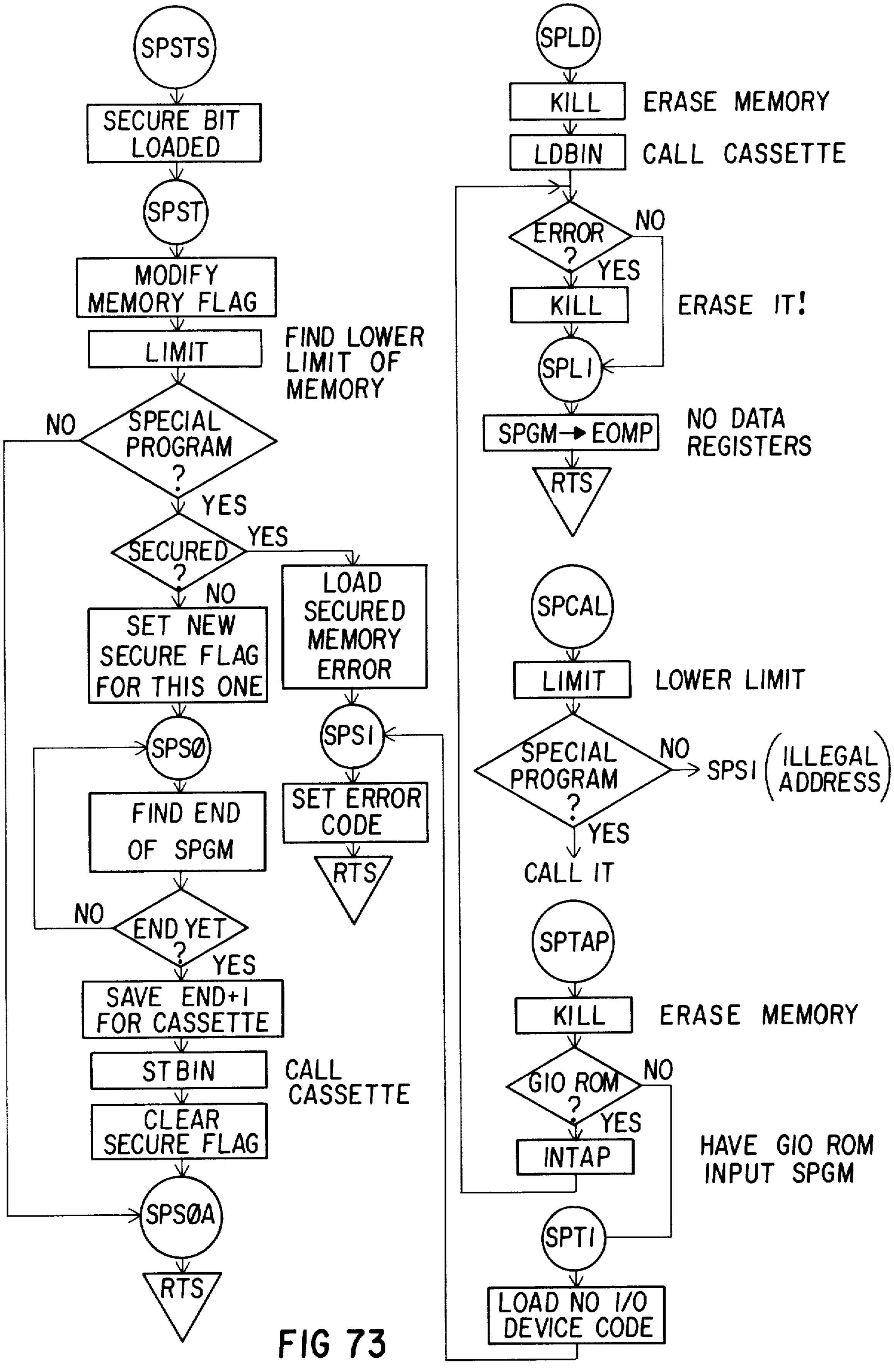
FIG. 73 is a flow chart of the binary program routines stored in ROM 5 of FIG. 6.
Figure 71L:
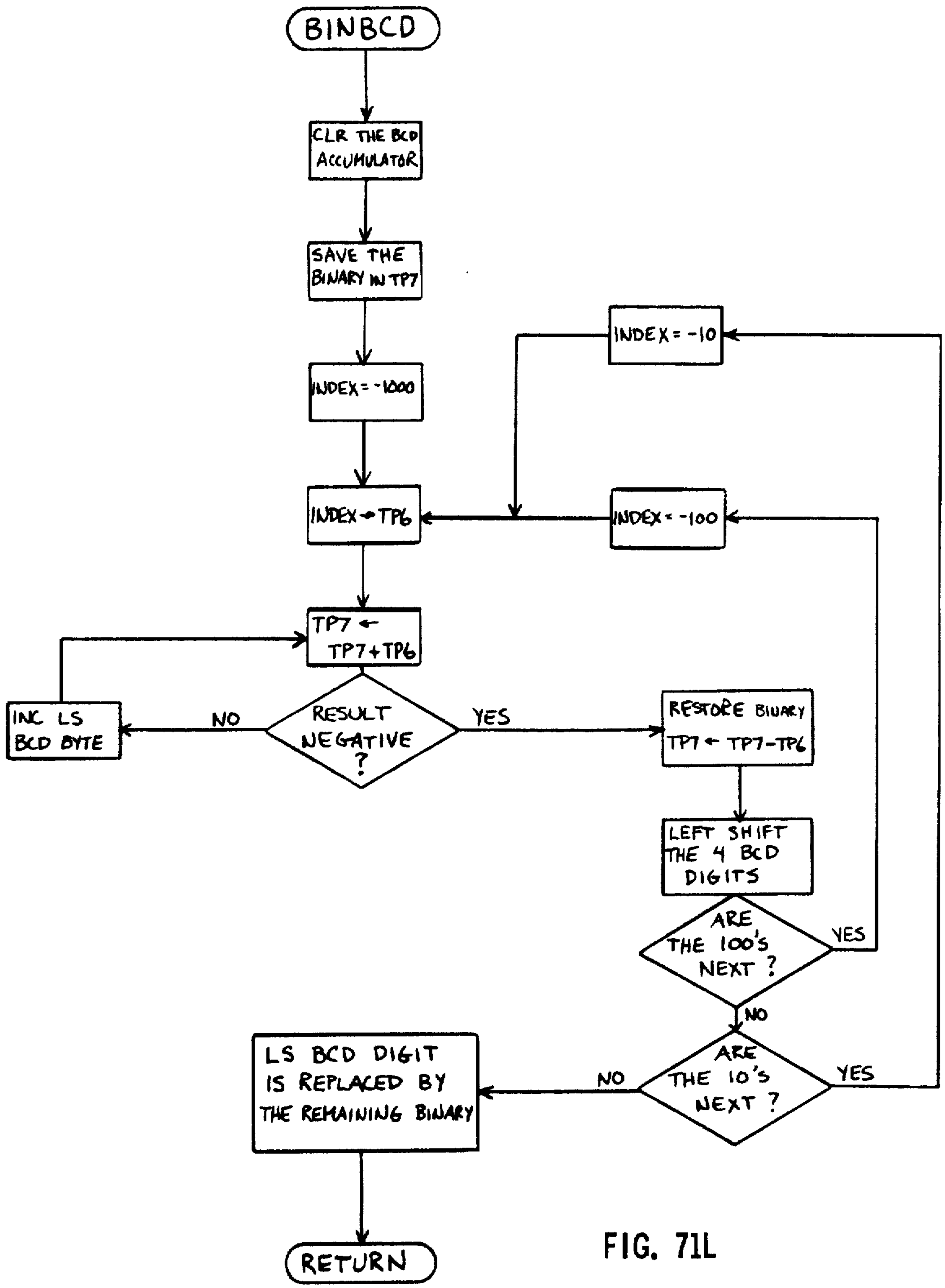
Figure 71M:
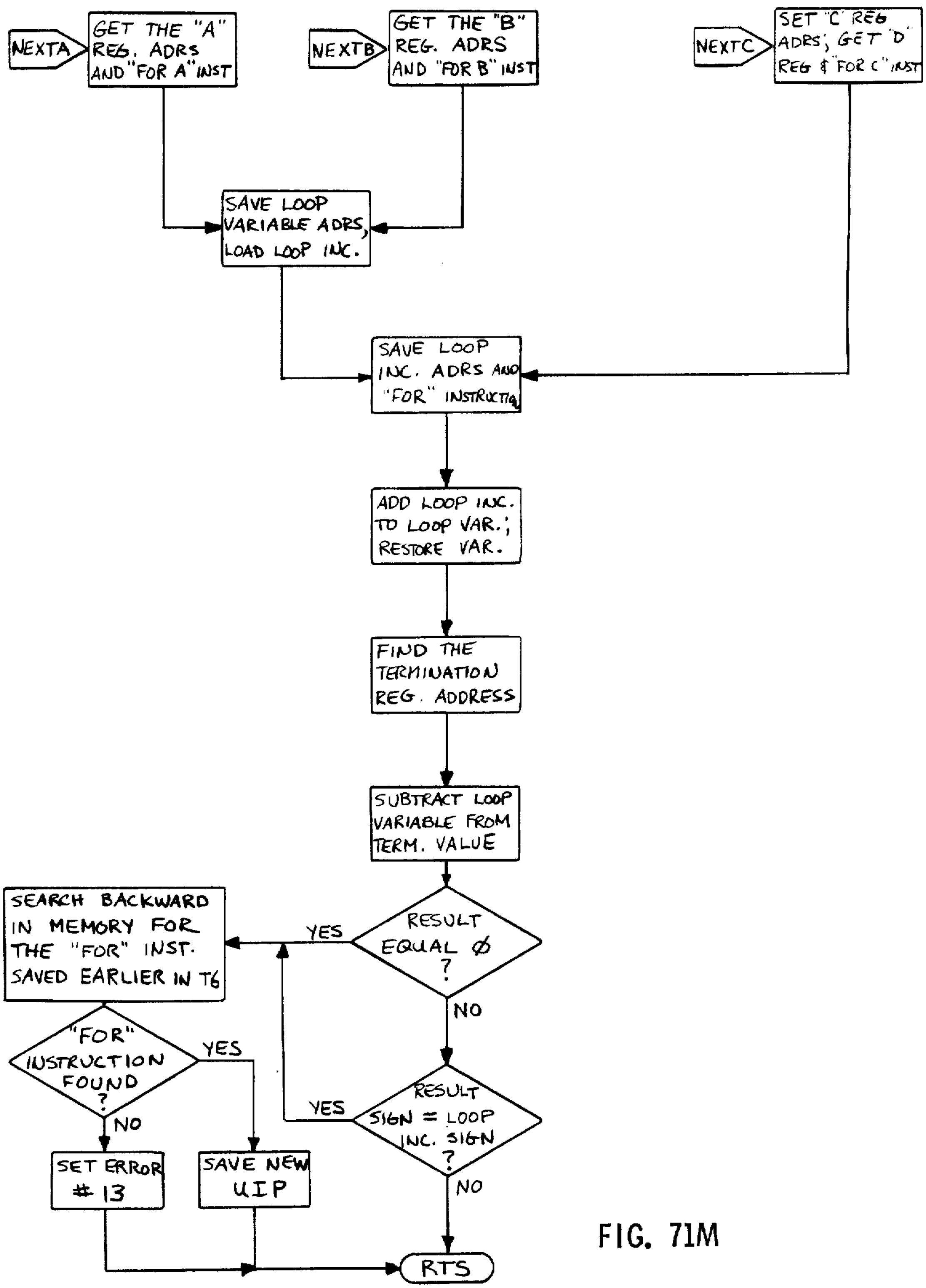
Figure 71N:
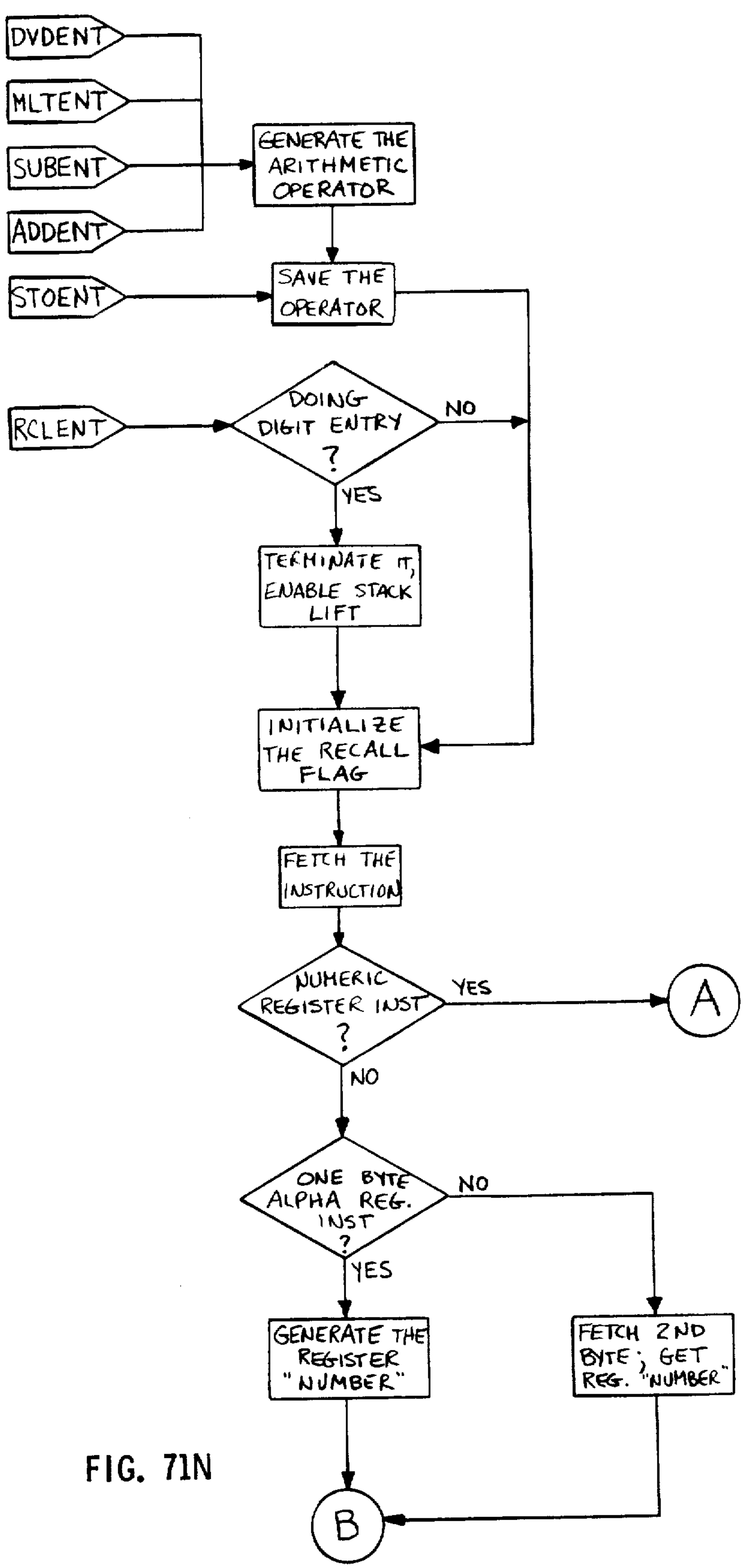
Figure 71Q:
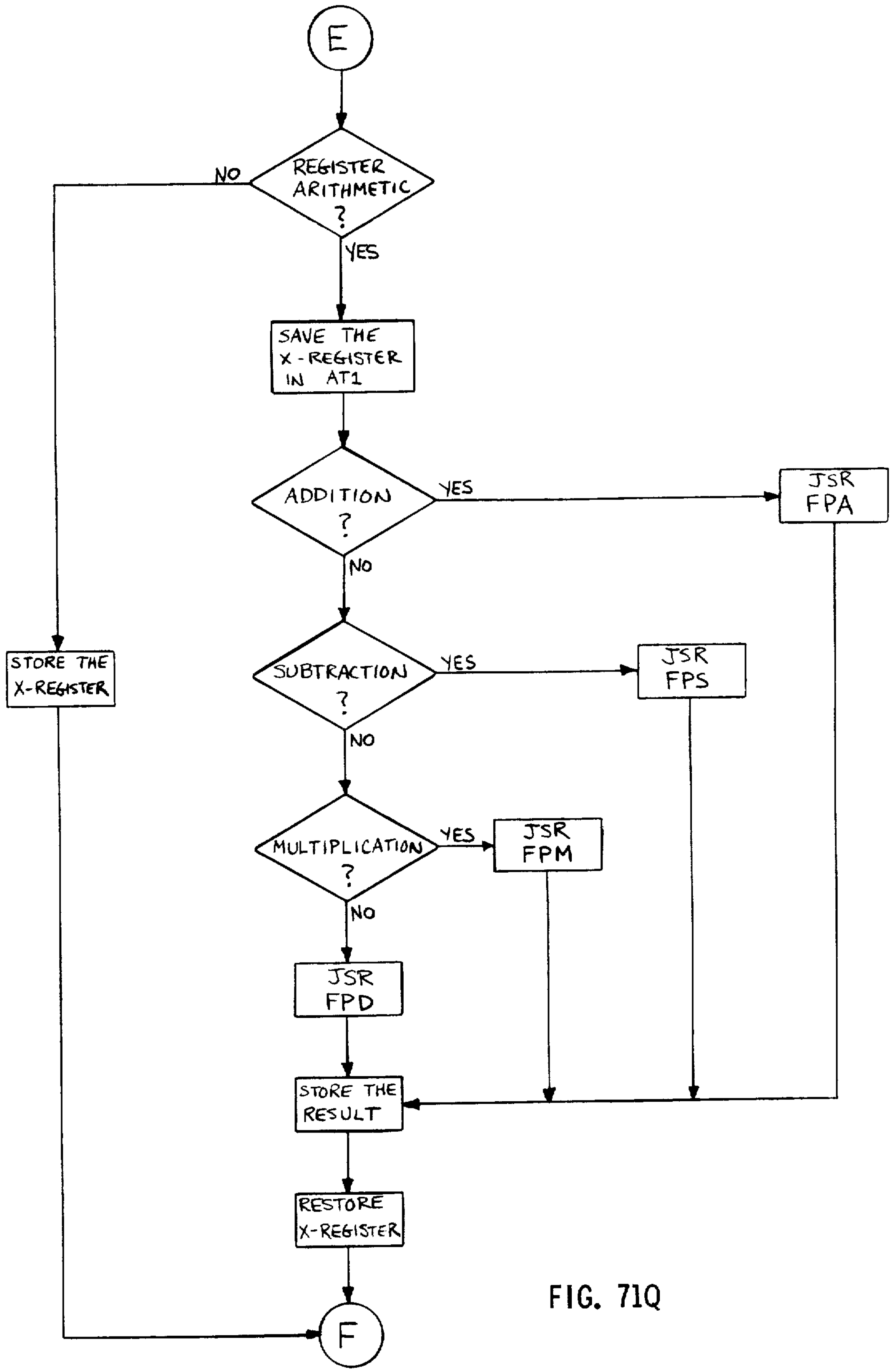
Figure 71R:
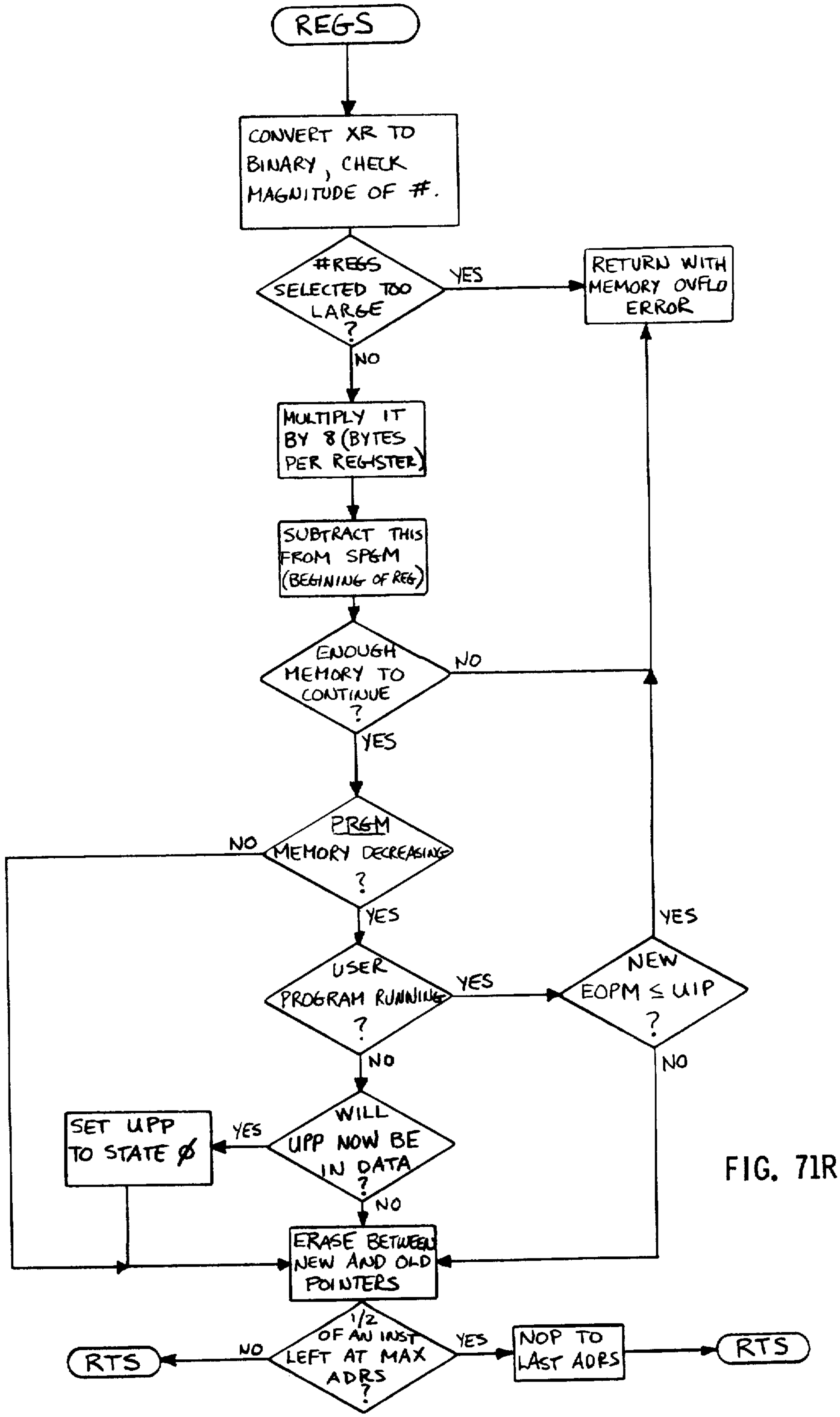
Figure 71S:
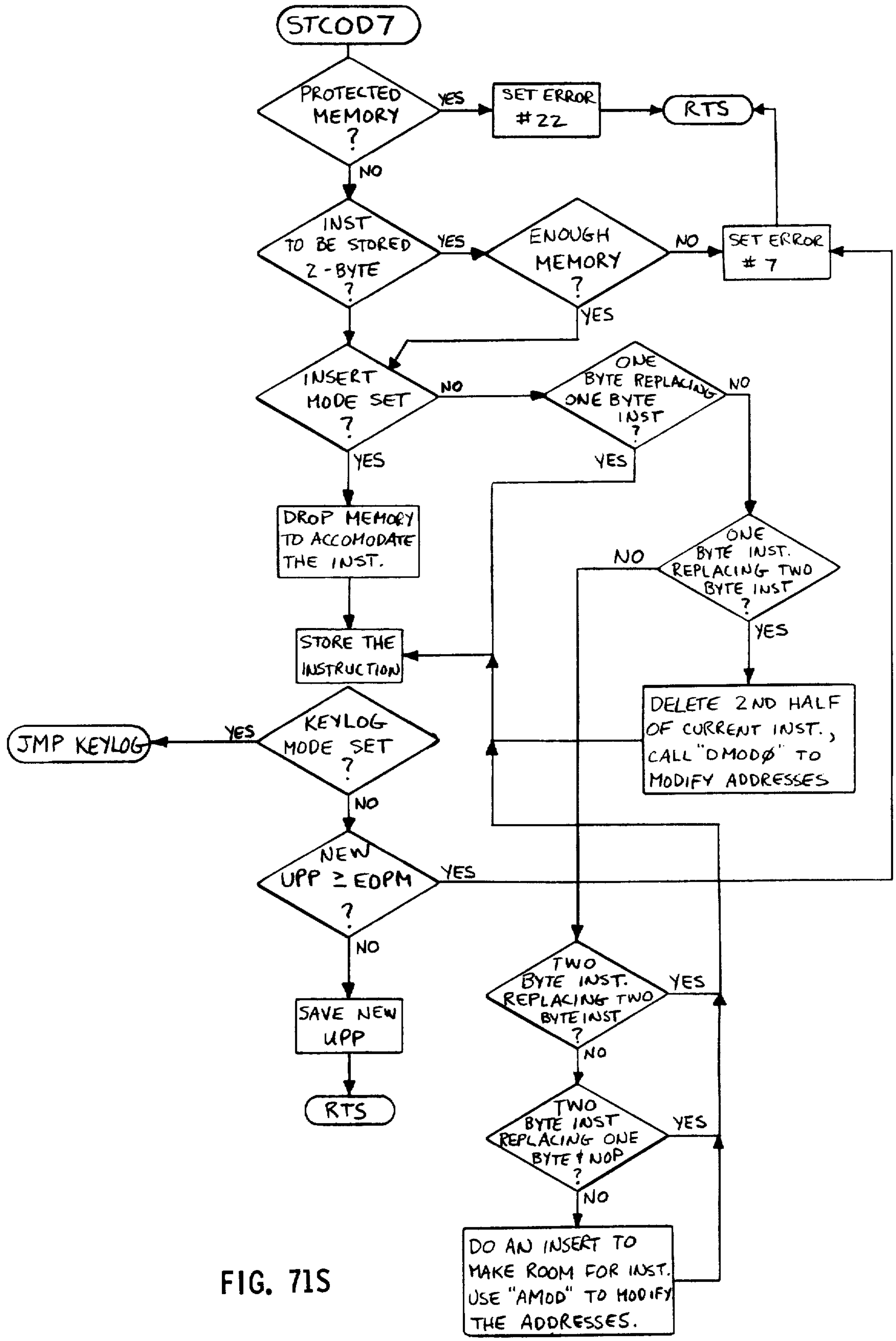
Figure 71T:
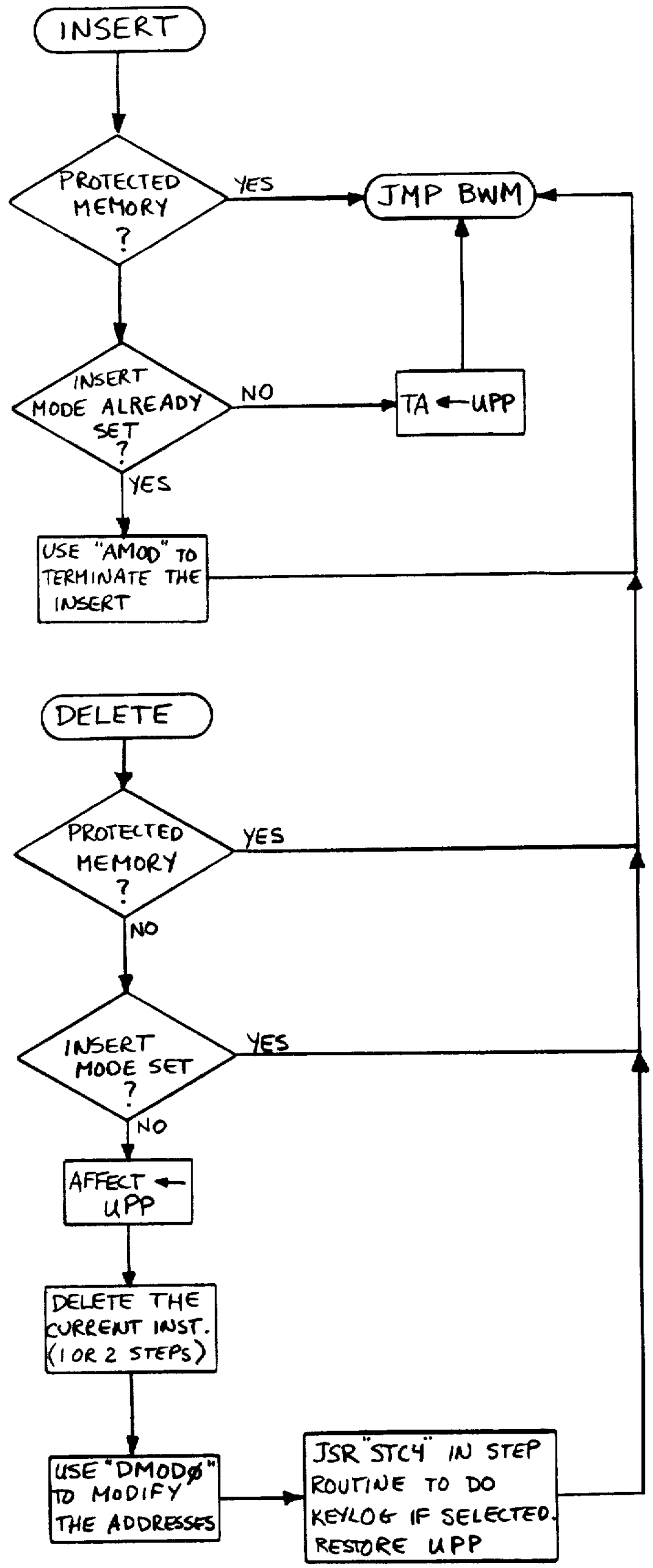
Figure 71U:
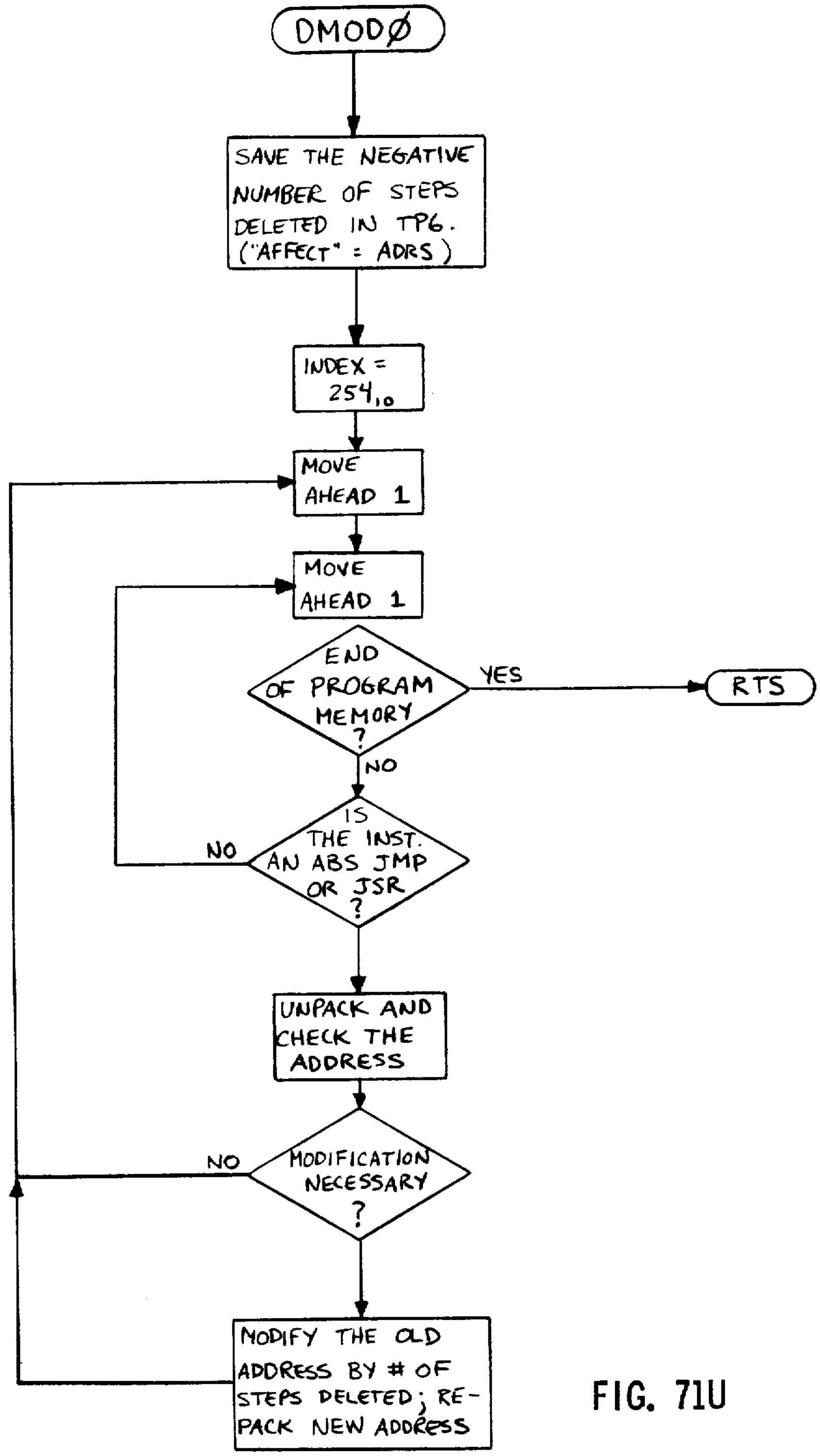
Figure 71V:
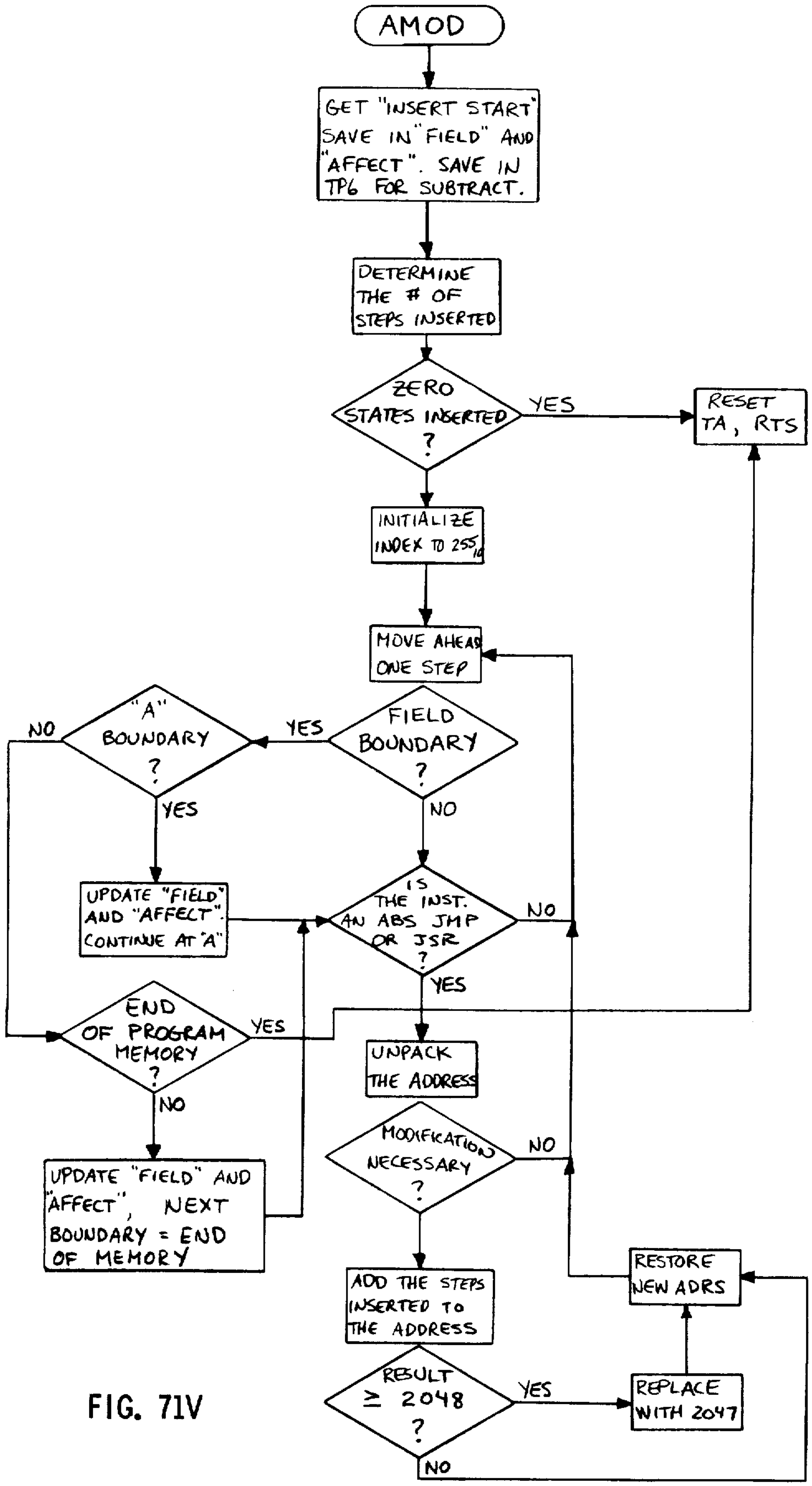
Figure 71W:
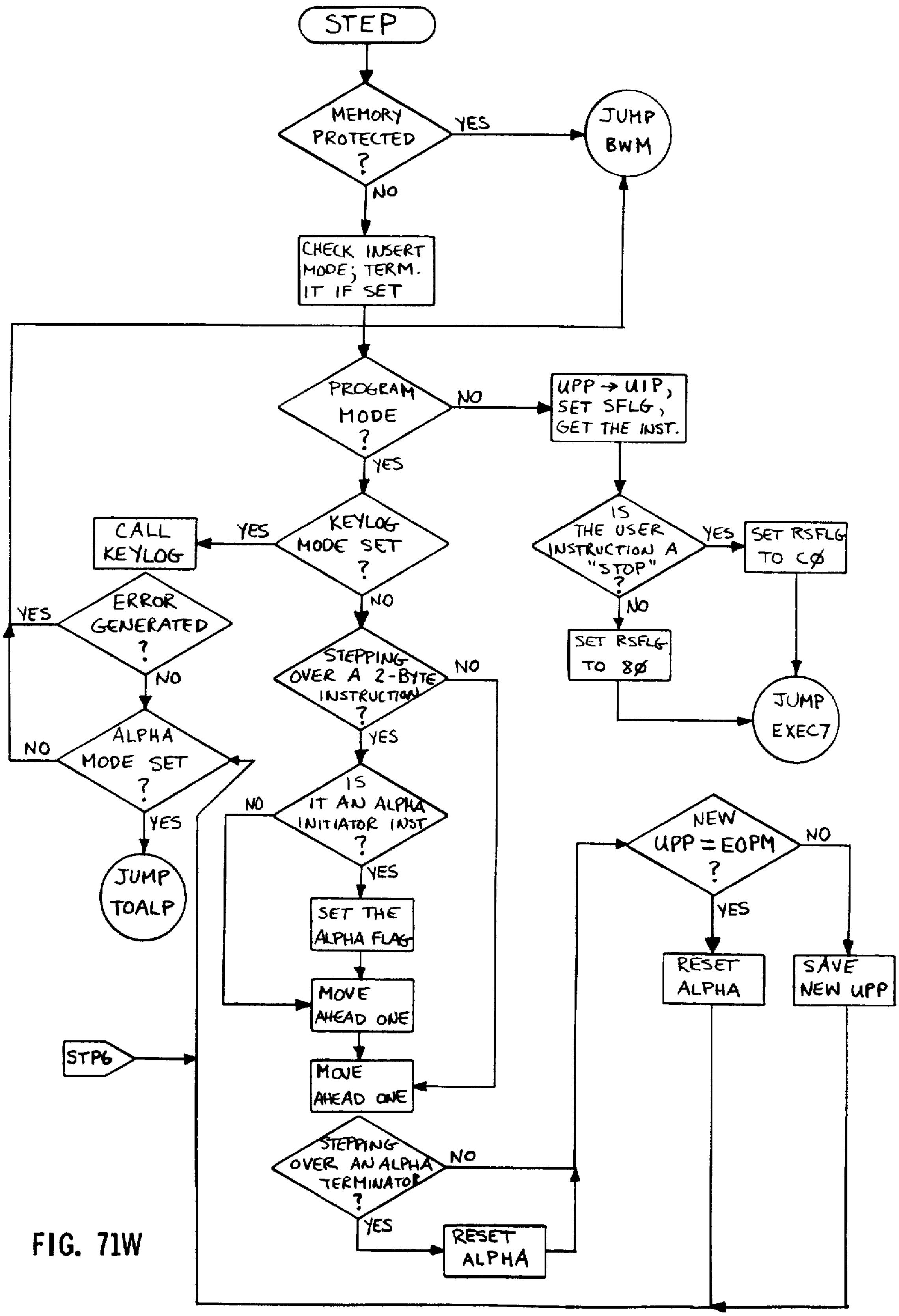
Figure 741:
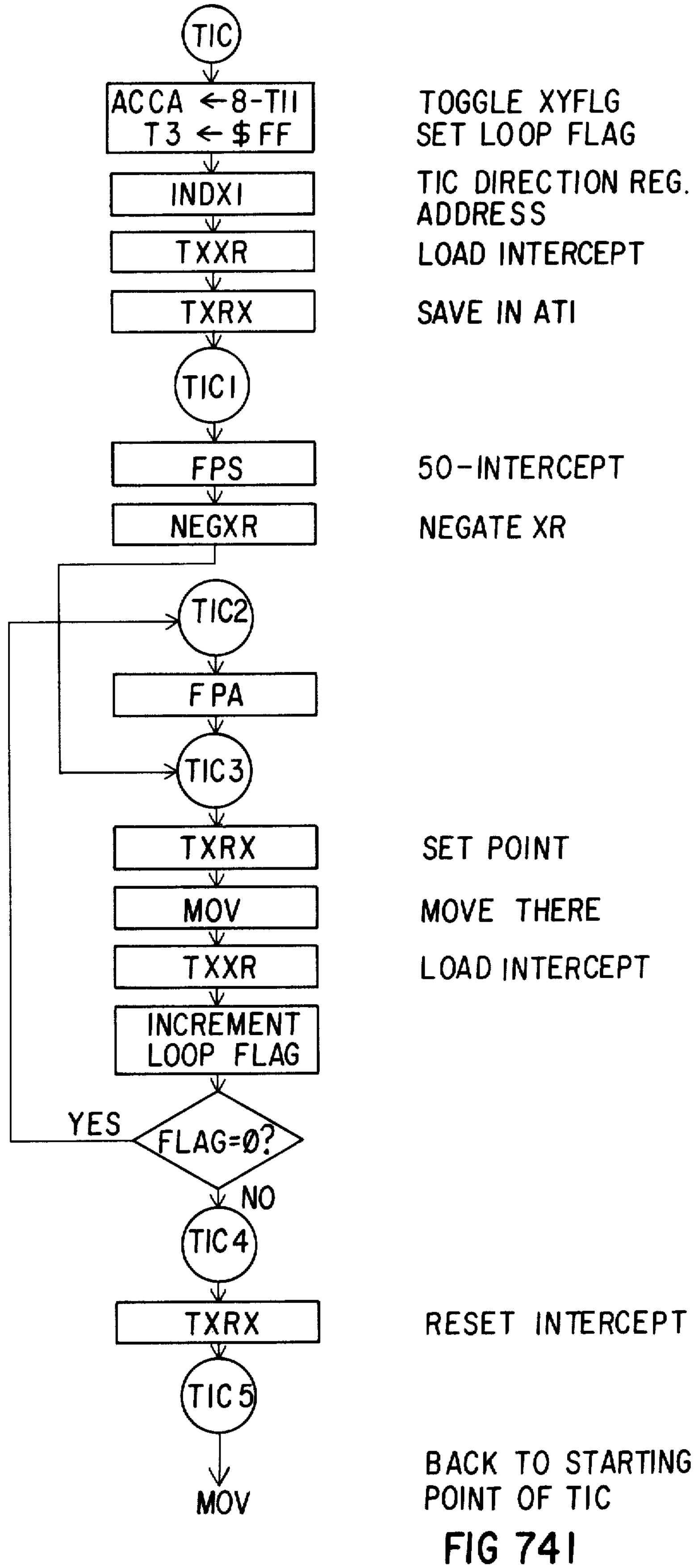
Figure 740:
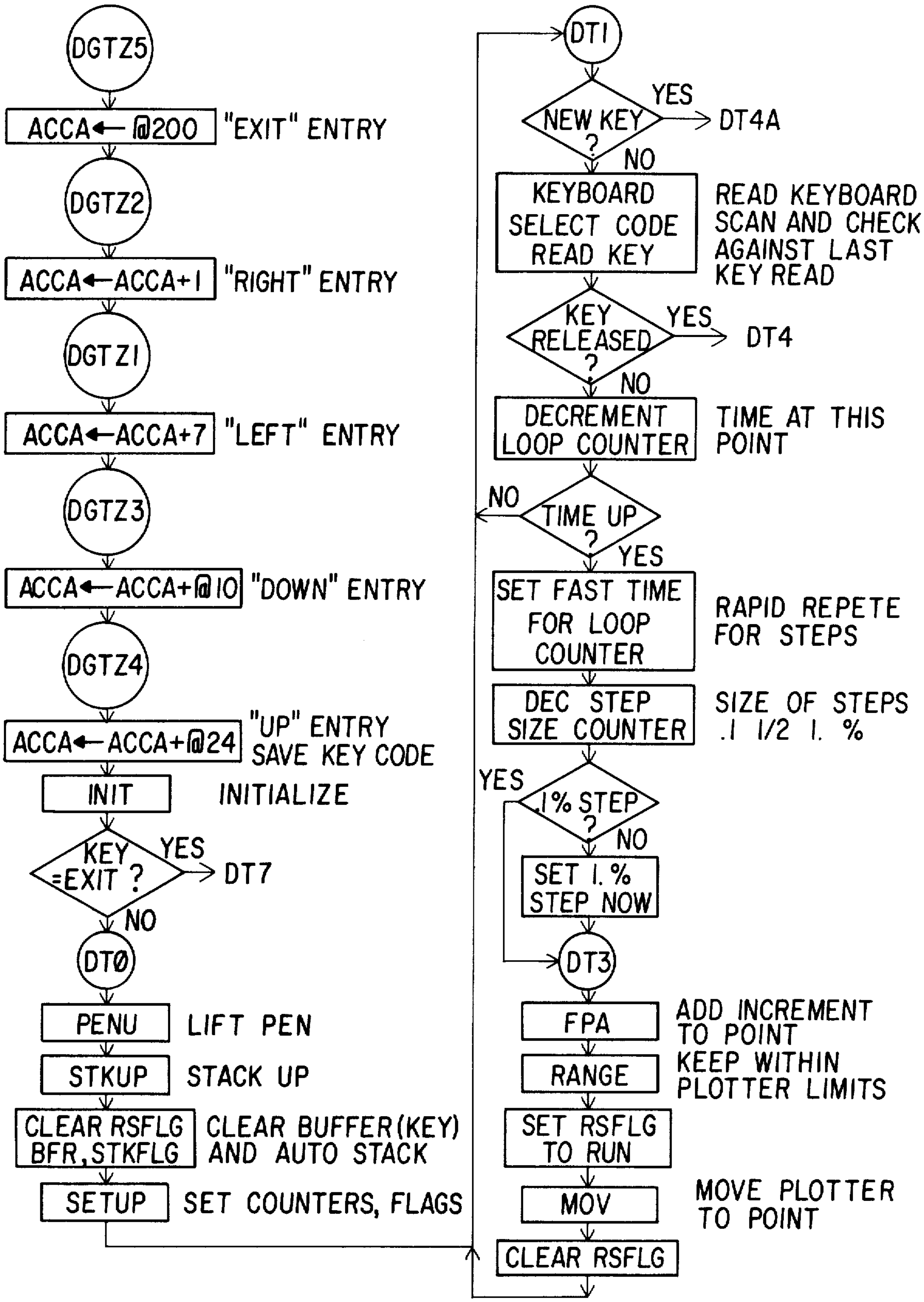
Figure 74R:
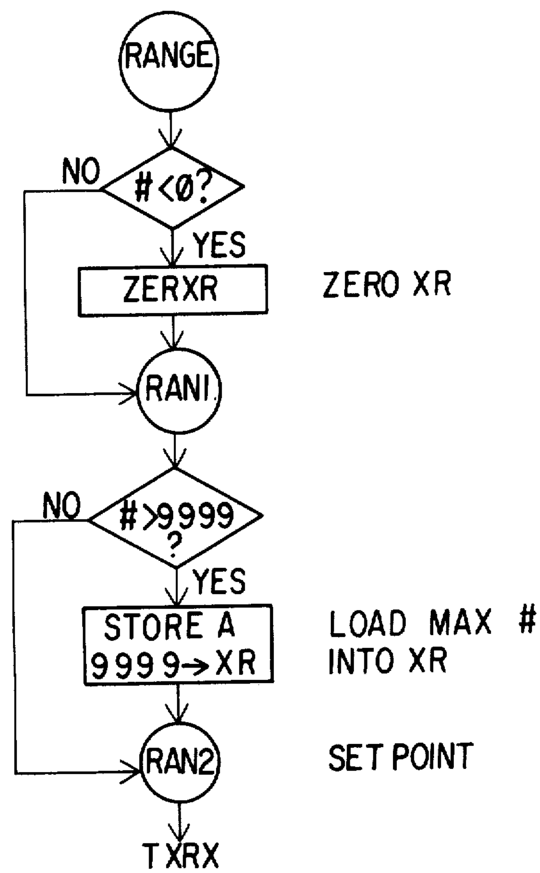
Figure 74S:
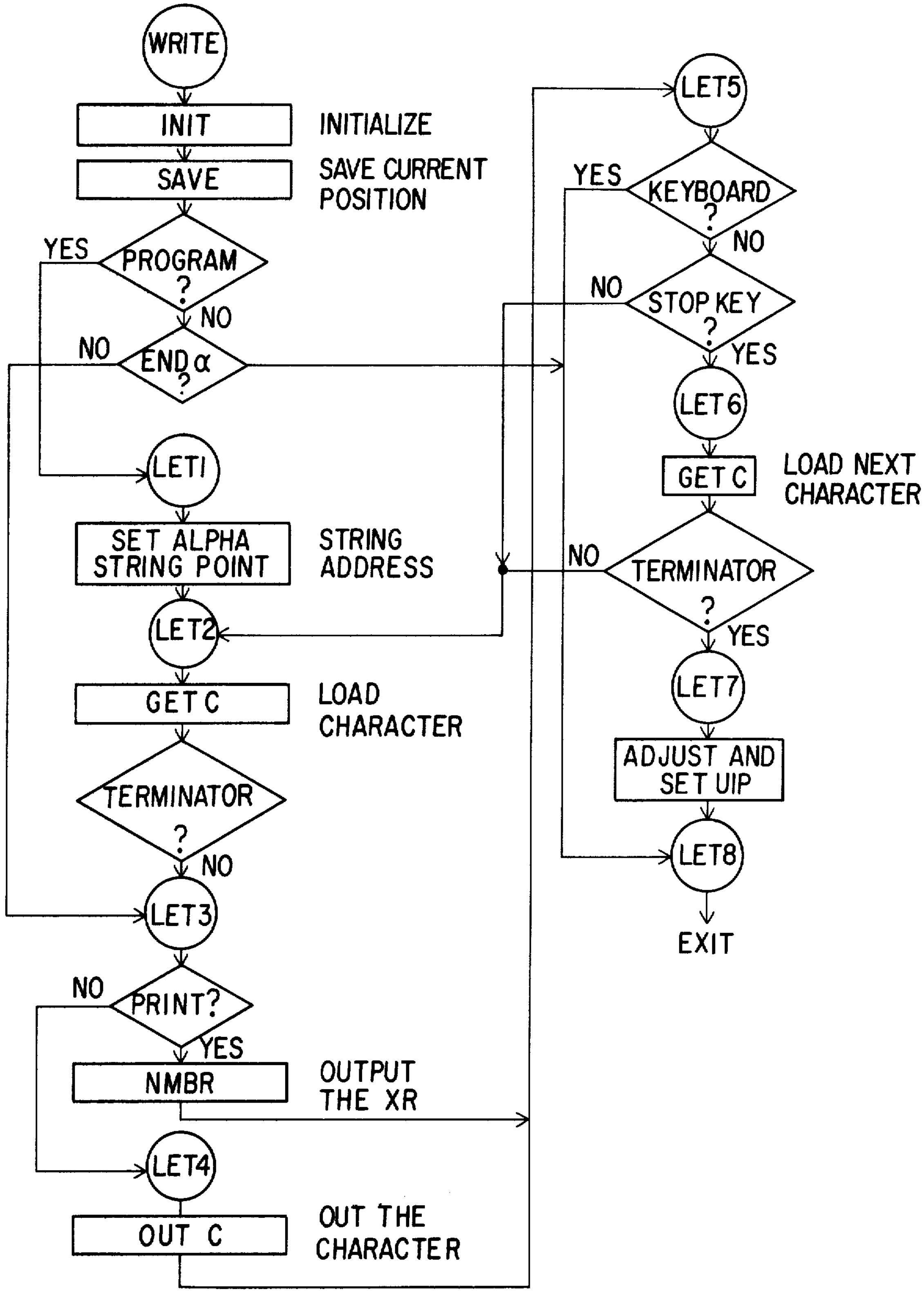
Figure 74T:
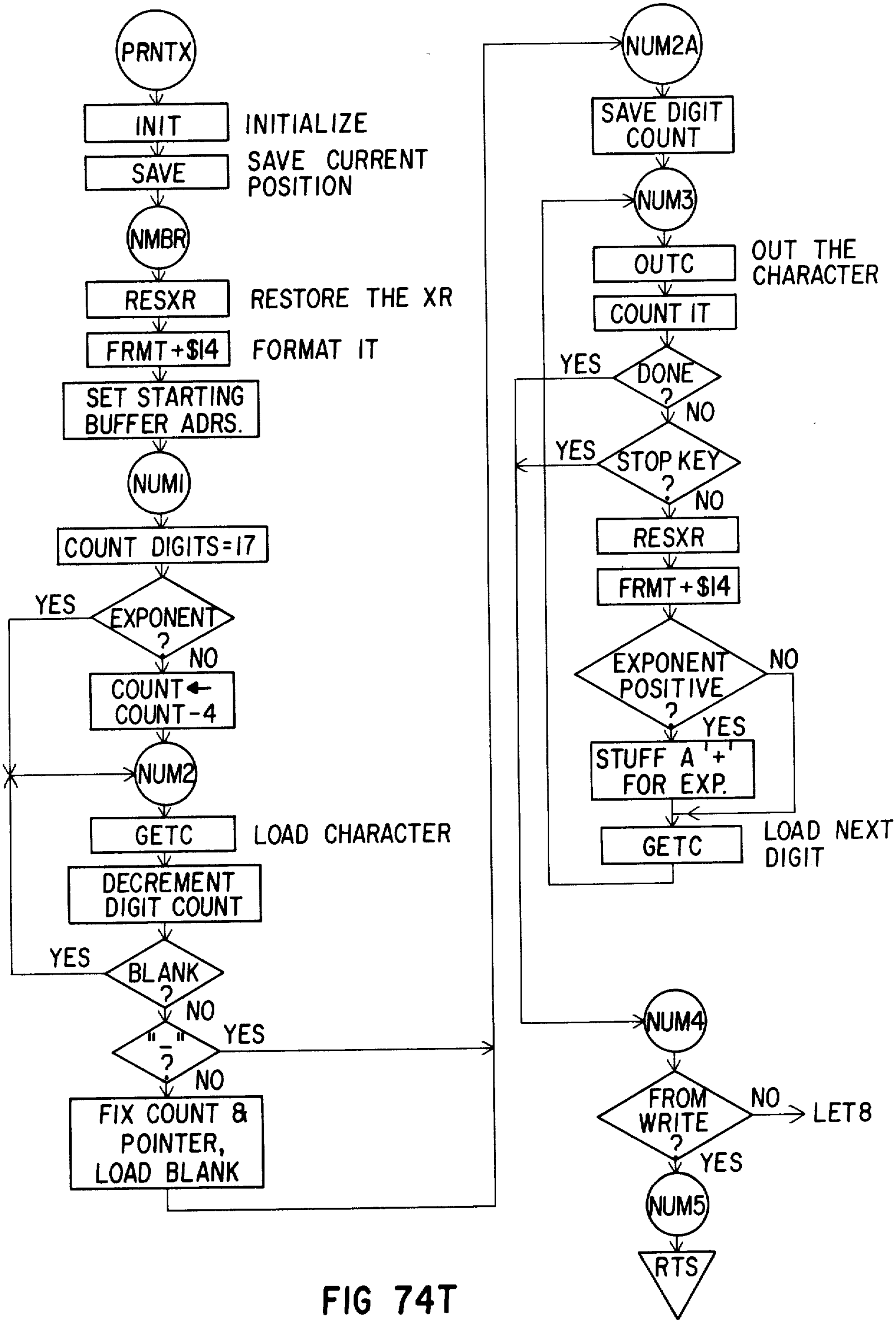
Figure 74U:
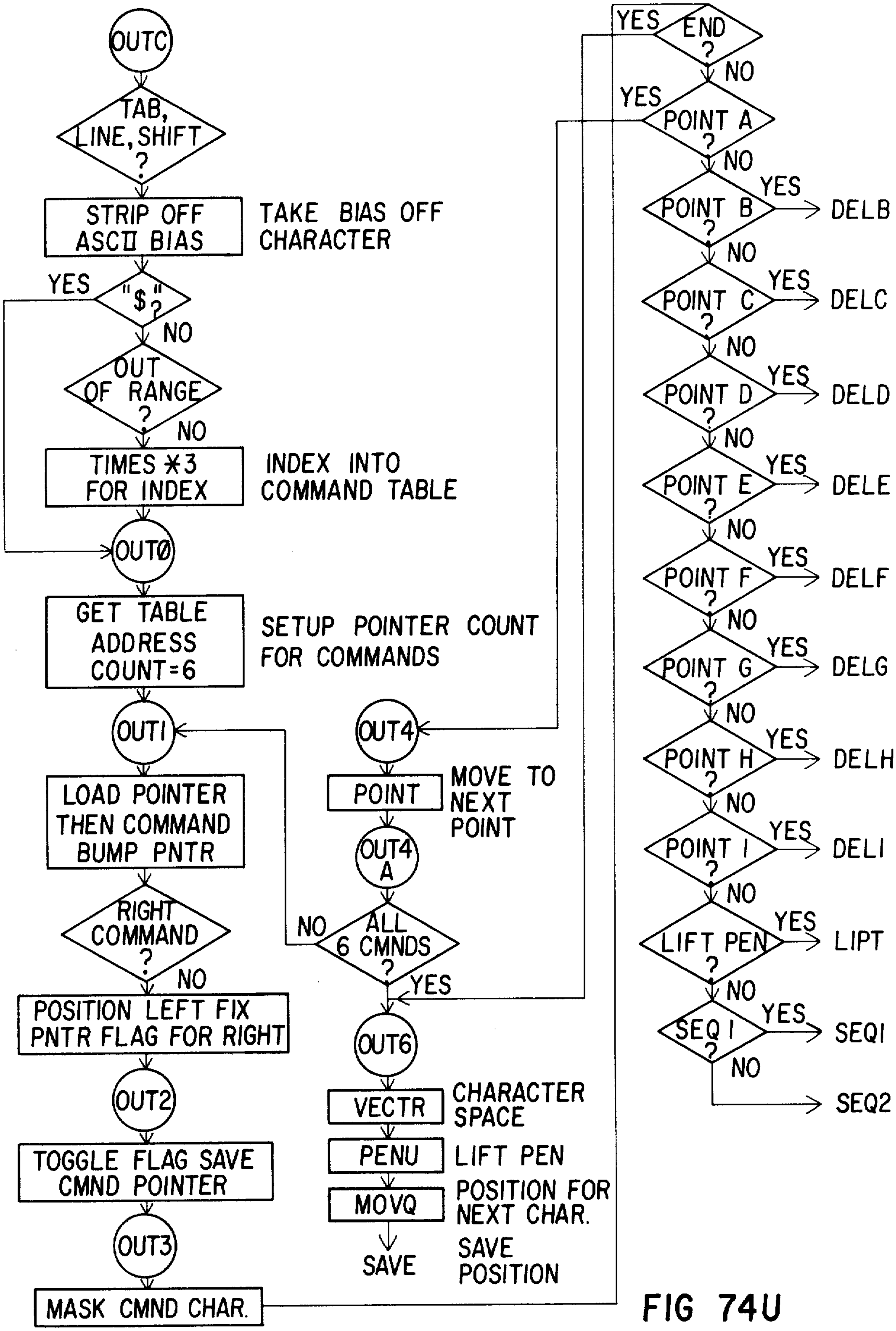
Figure 74X:
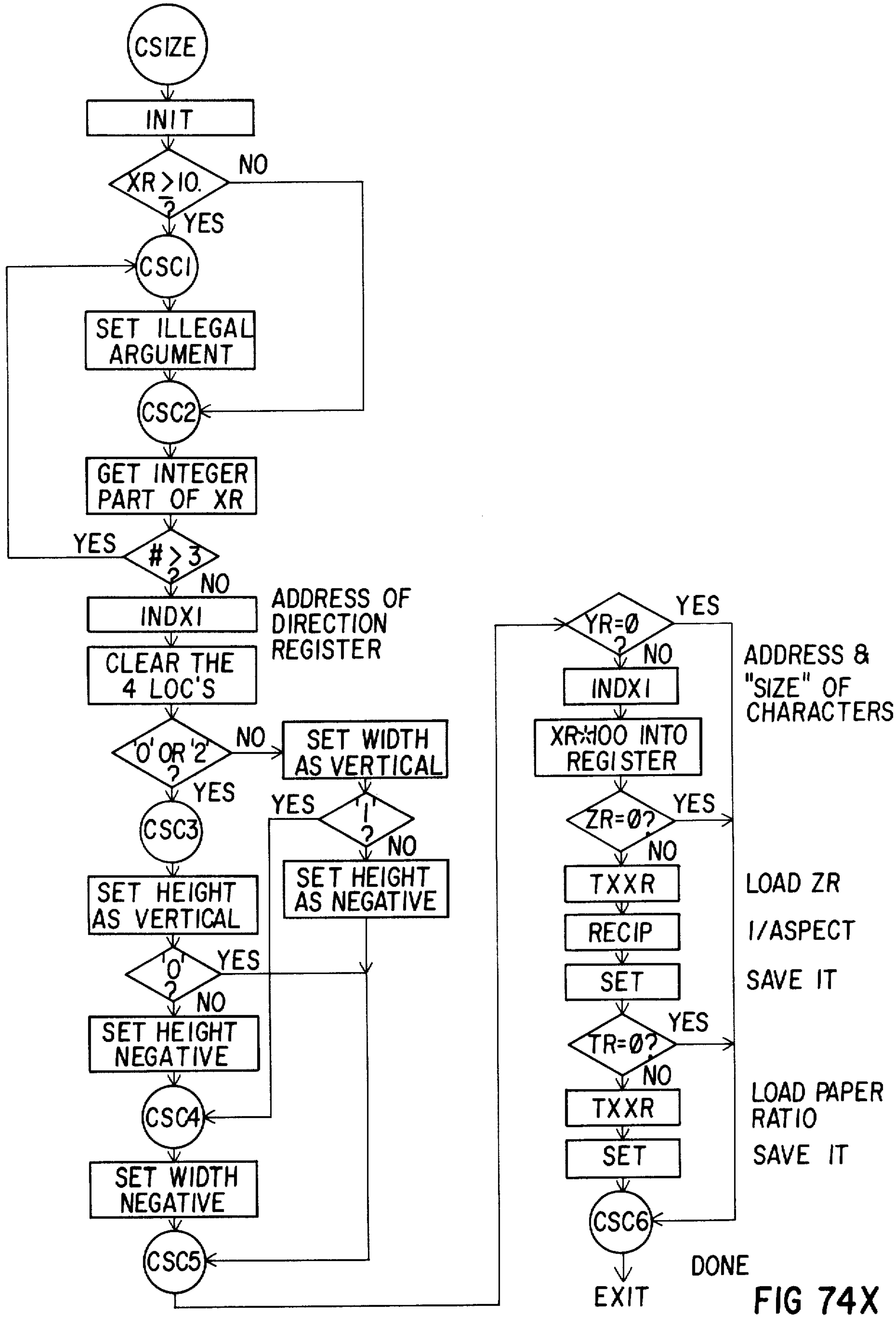
Figure 75:
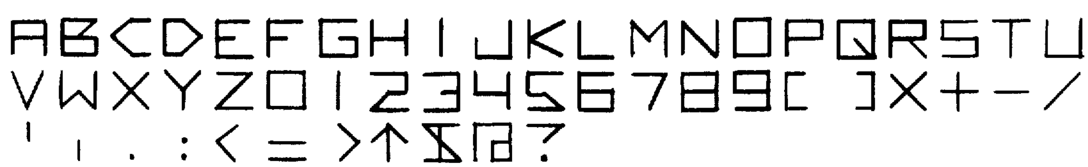
FIG. 75 is a diagram showing the character set that may be generated when an X-Y plotter is employed with the calculator of FIG. 1.
Figure 76A:
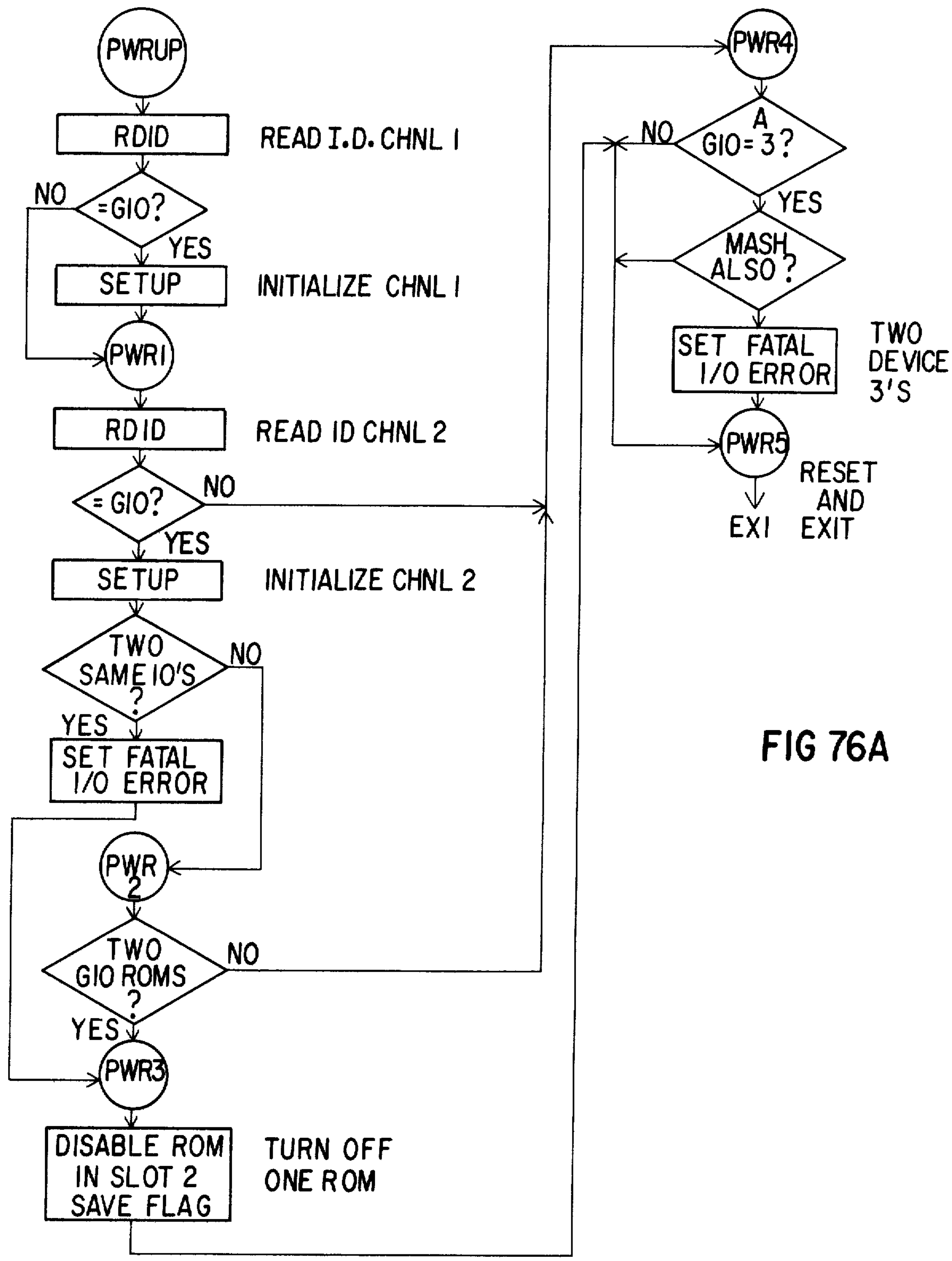
FIGS. 76A–Z are a flow chart of a portion of some general I/O routines that may be stored in one of the I/O ROMs of FIG. 5.
Figure 76B:
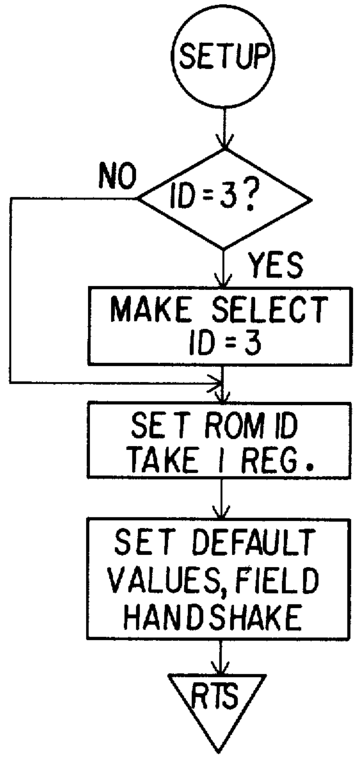
Figure 76C:
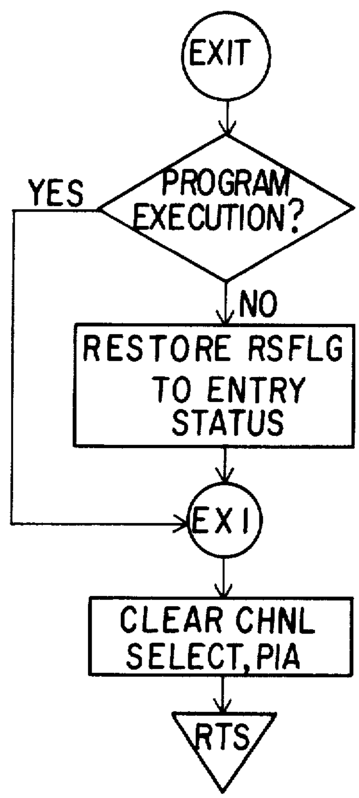
Figure 76D:
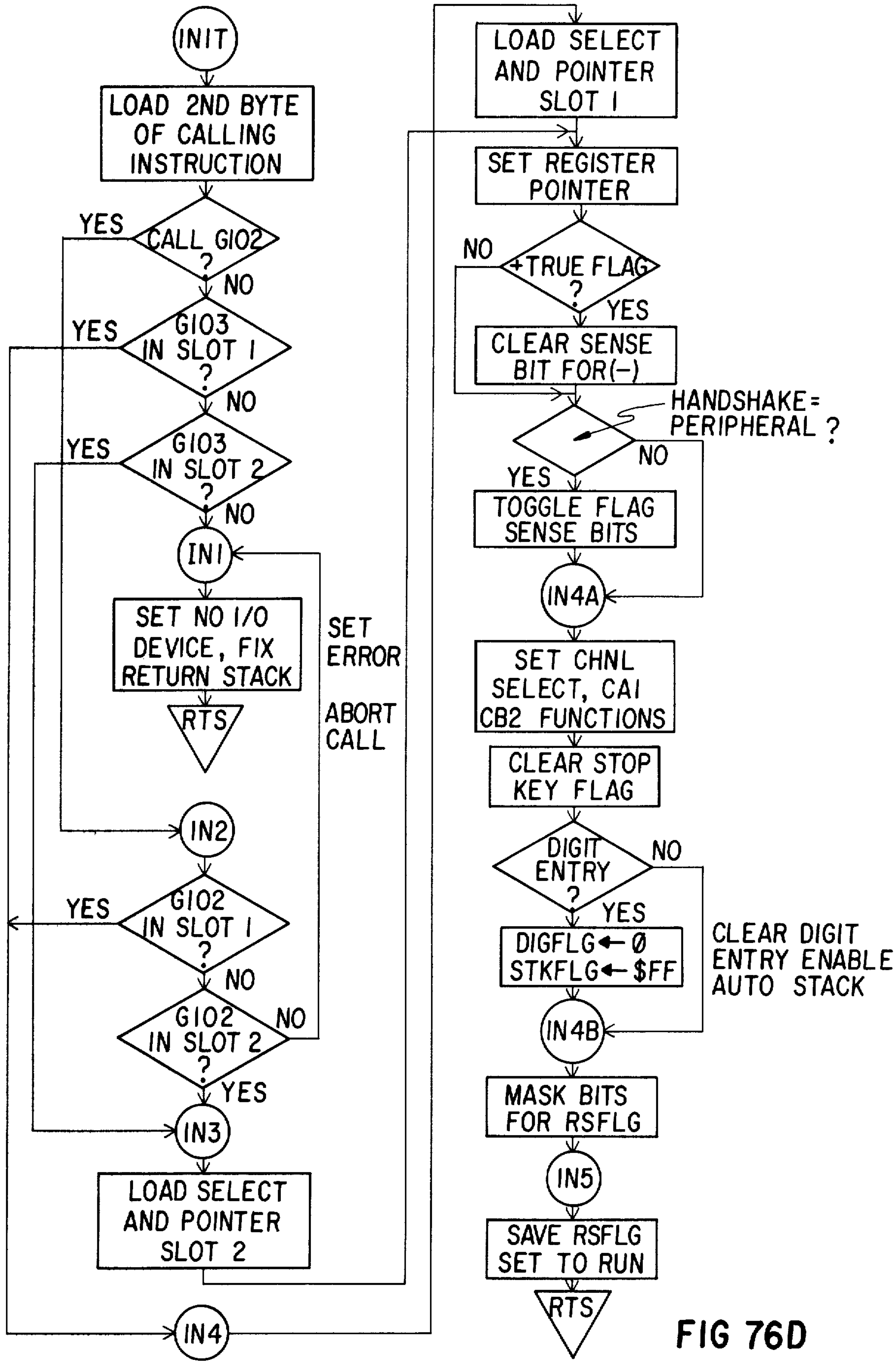
Figure 76E:
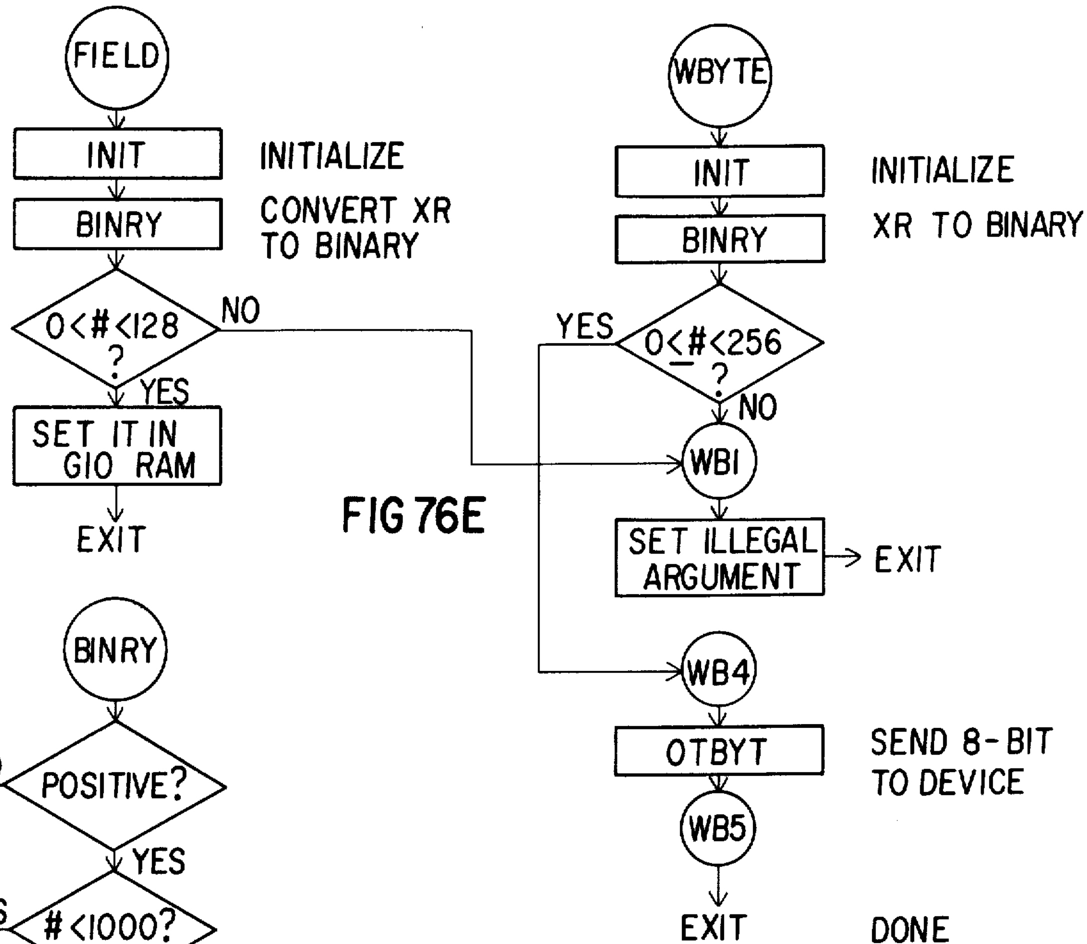
Figure 76F:
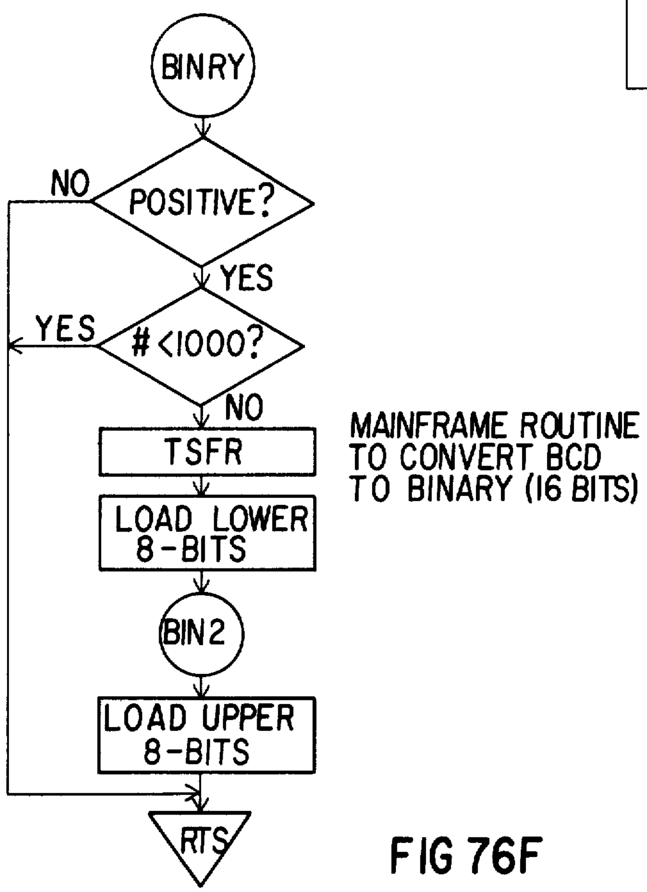
Figure 76G:
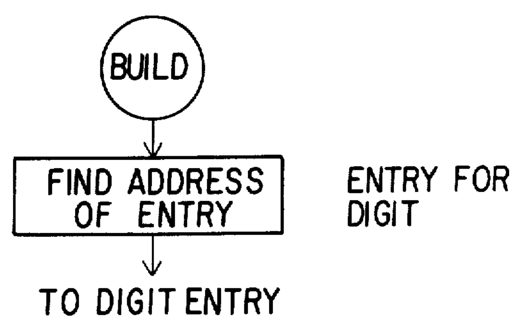
Figure 76H:
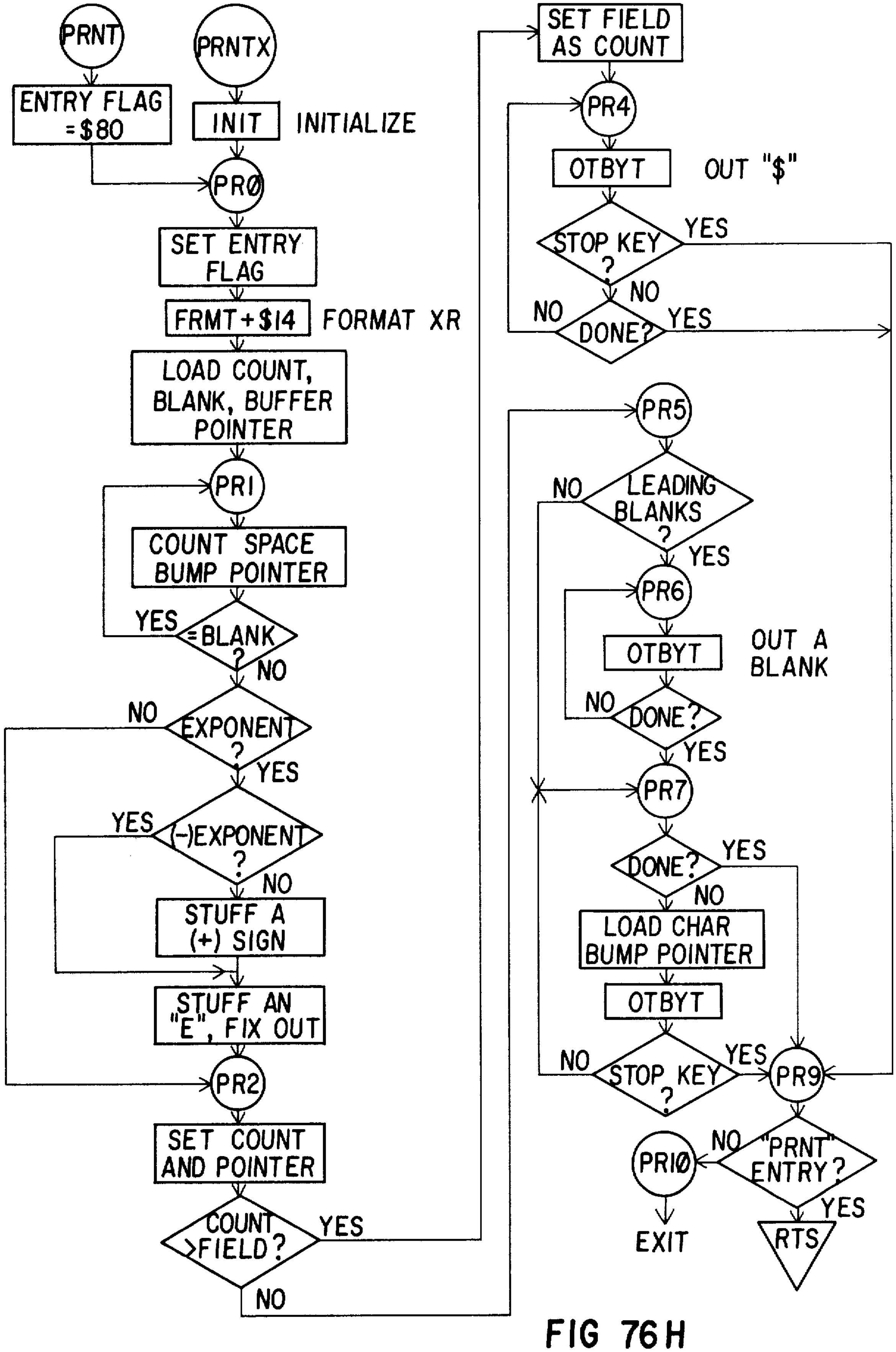
Figure 76I:
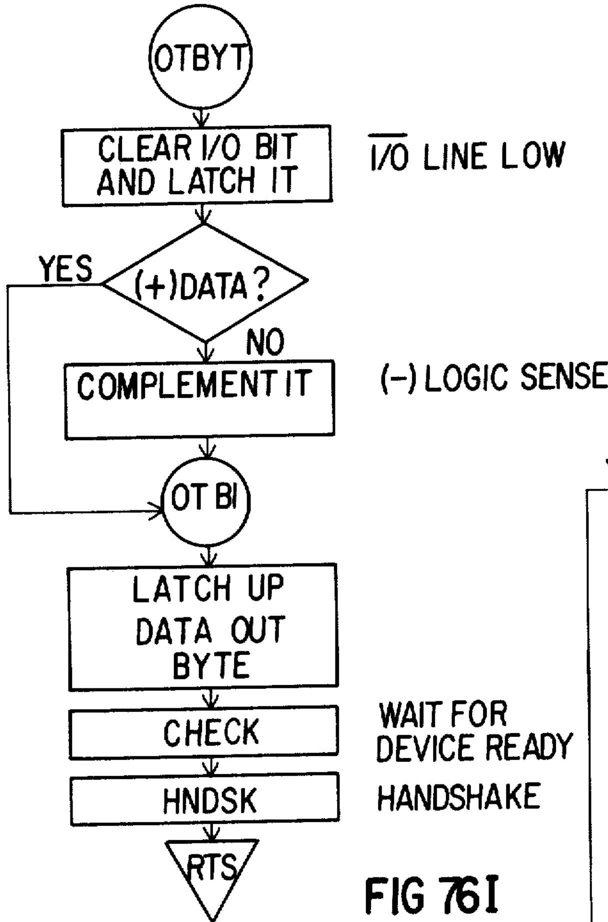
Figure 76J:
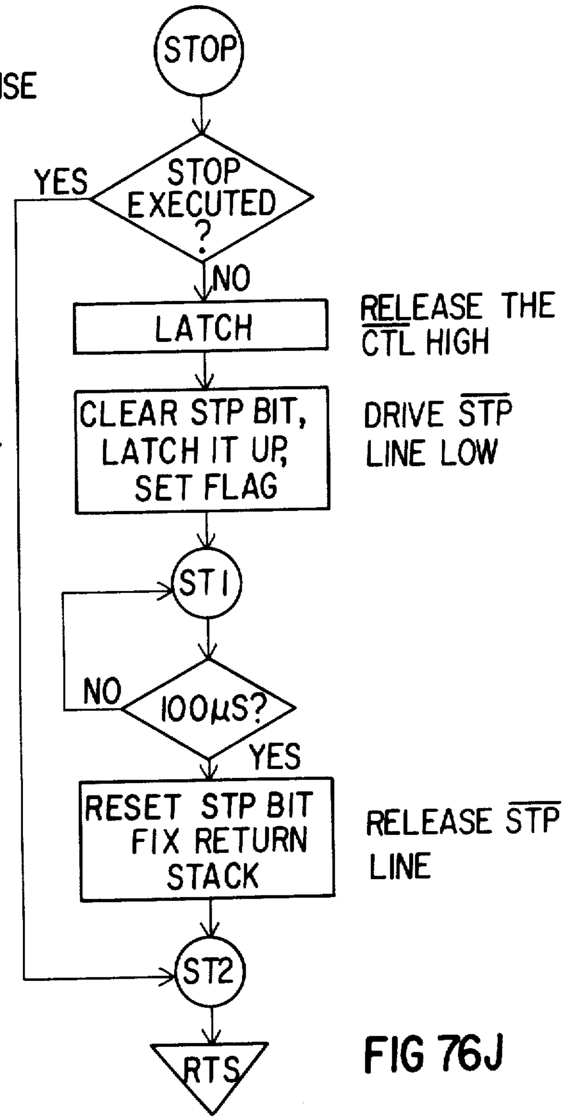
Figure 76K:
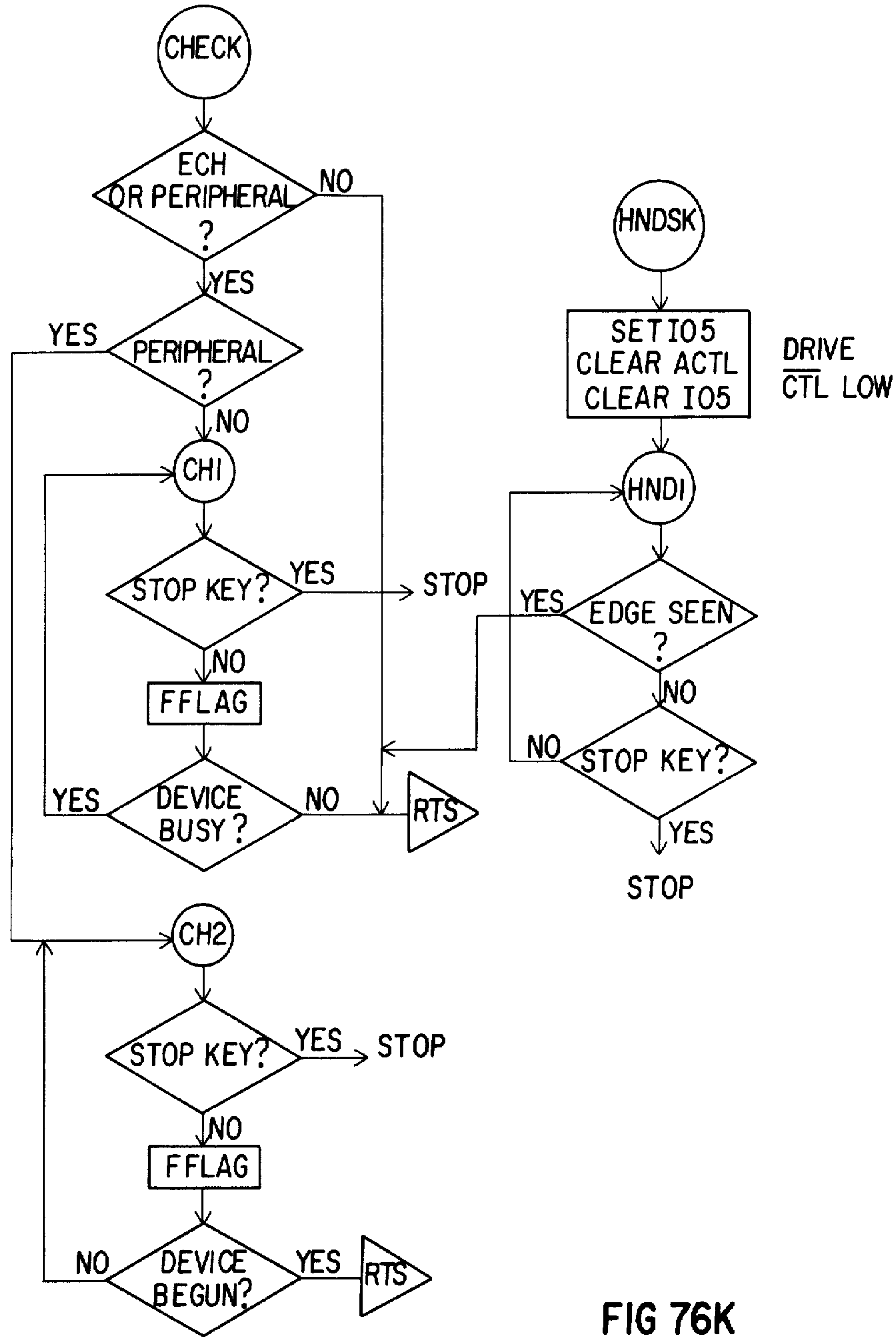
Figure 76L:
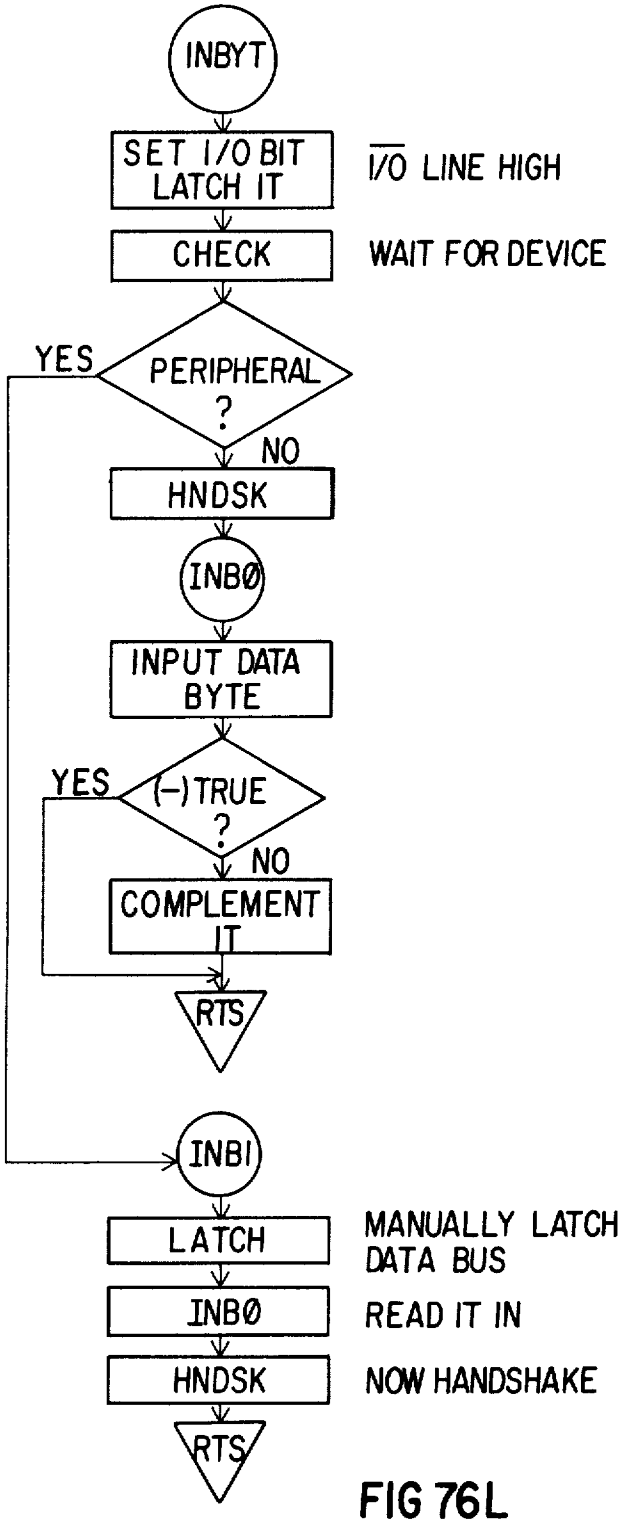
Figure 76M:
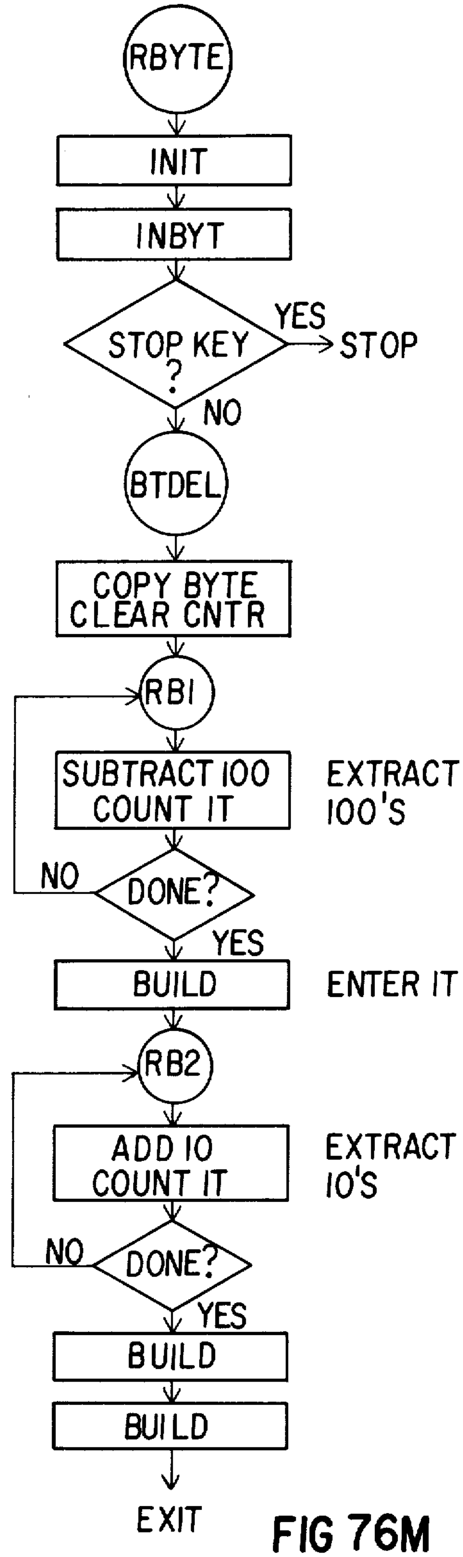
Figure 76N:
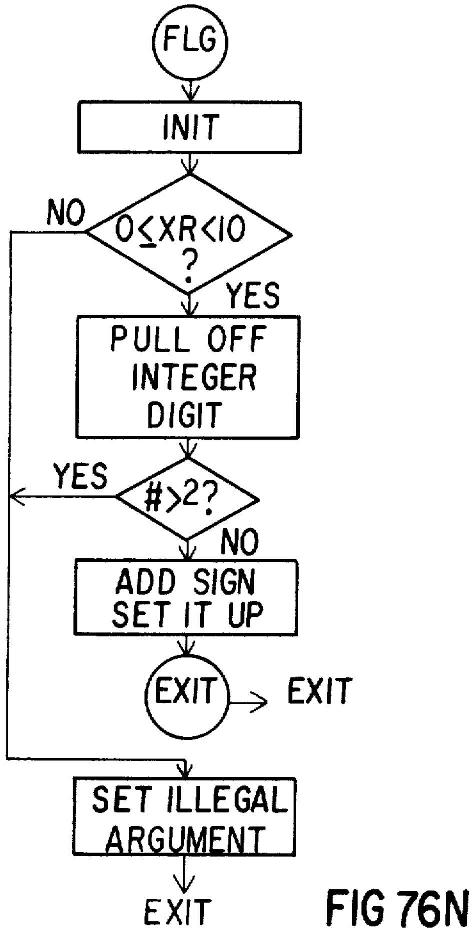
Figure 76O:
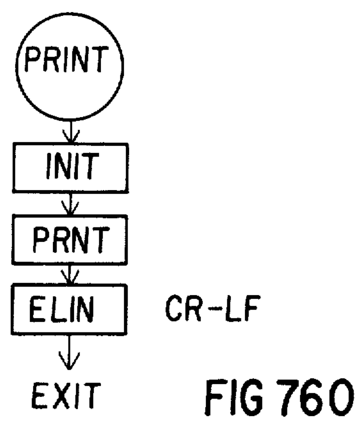
Figure 76P:
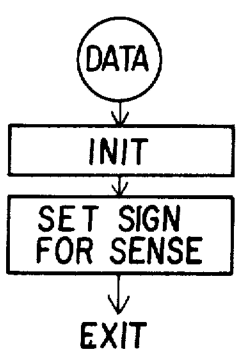
Figure 76Q:
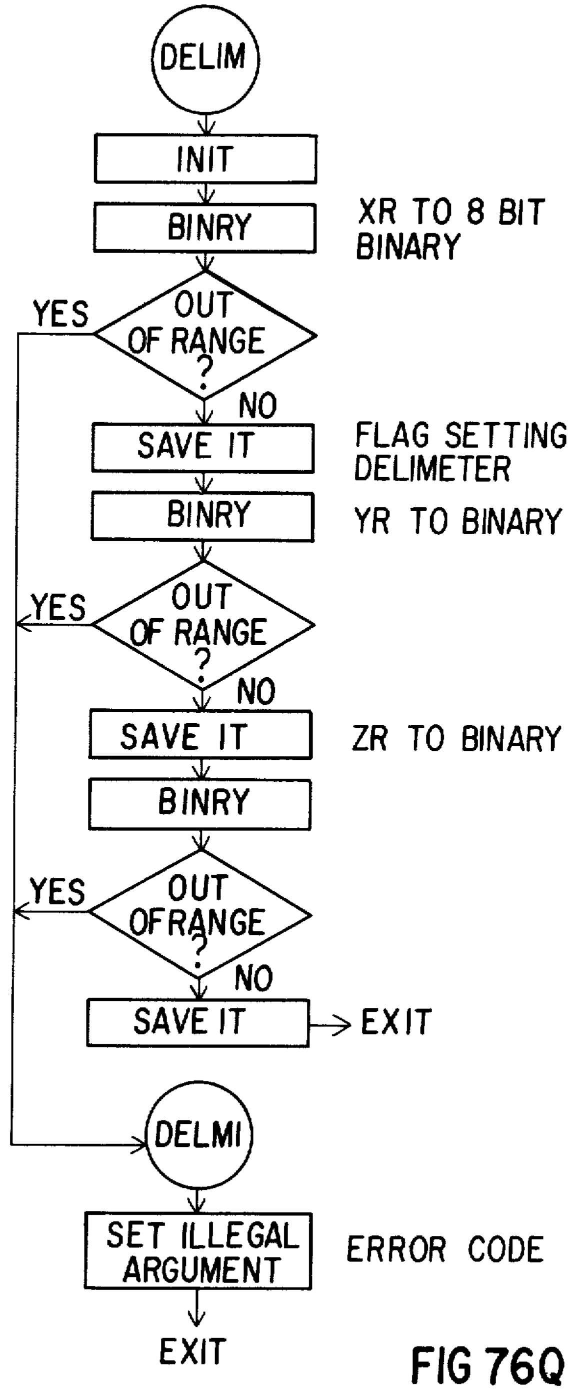
Figure 76R:
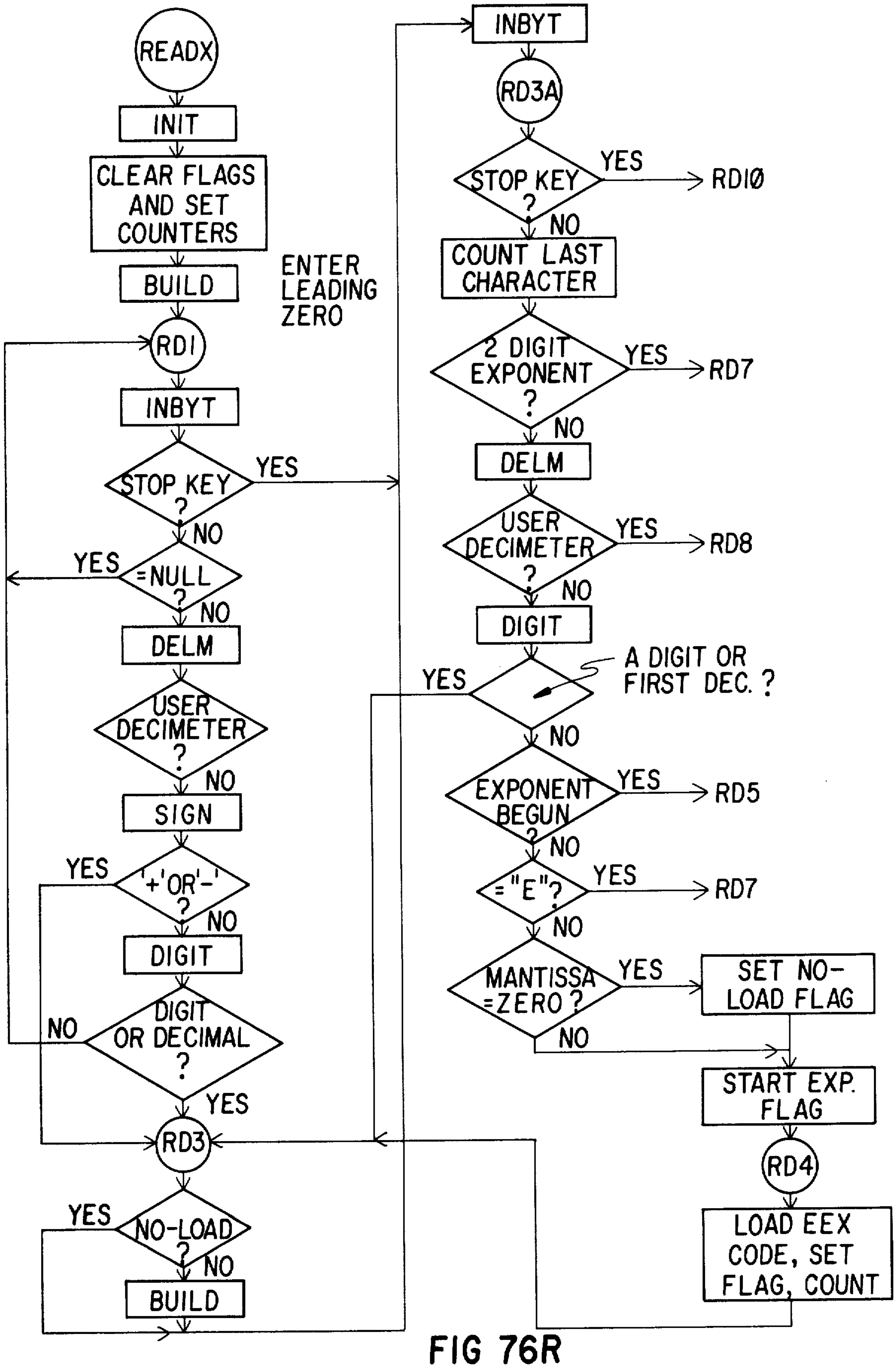
Figure 76S:
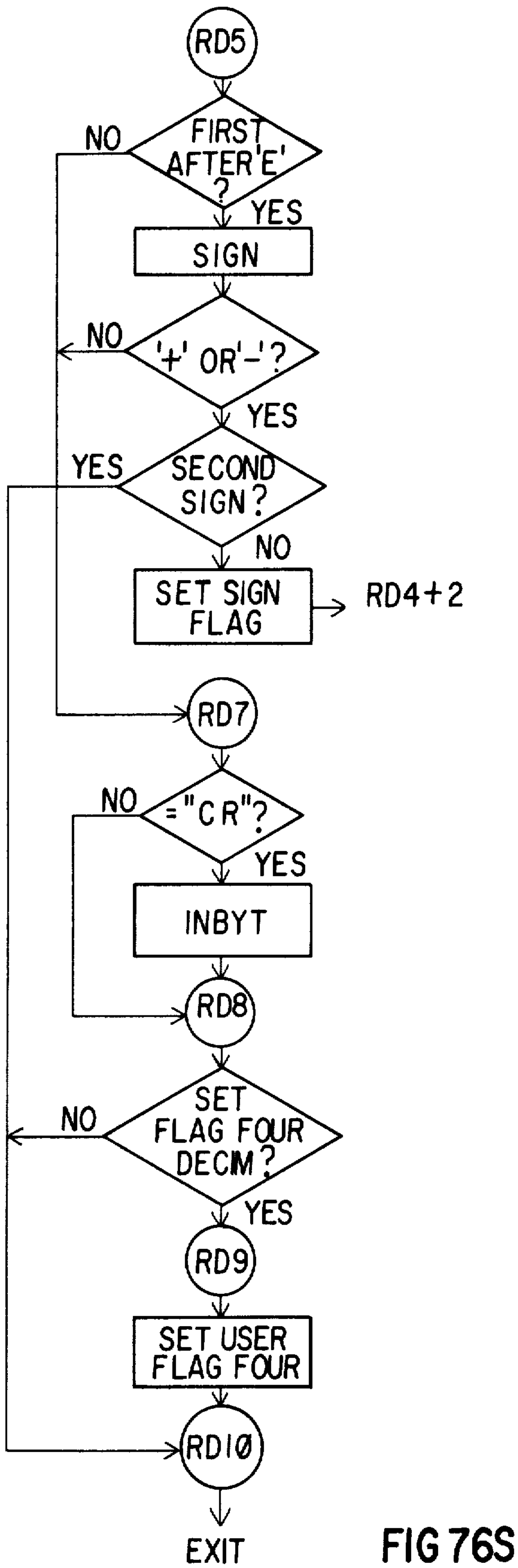
Figure 76T:
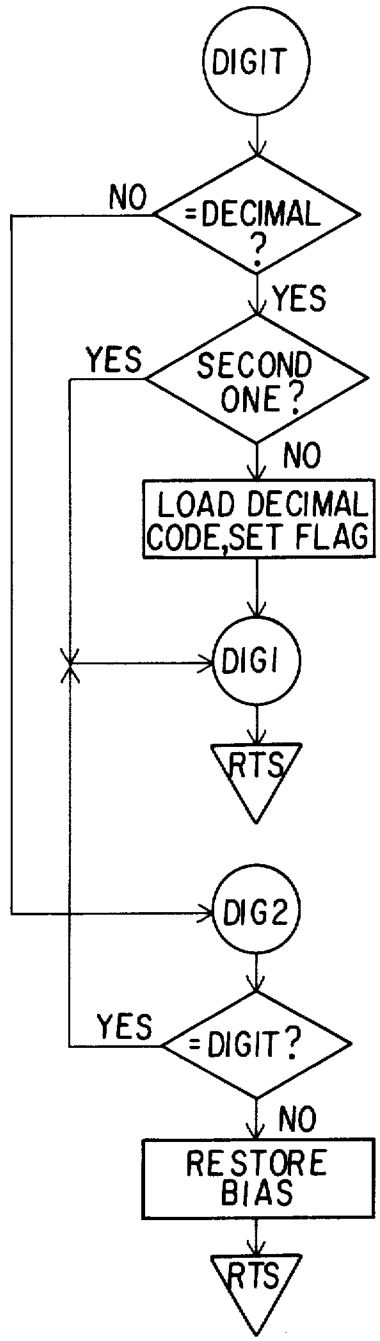
Figure 76U:
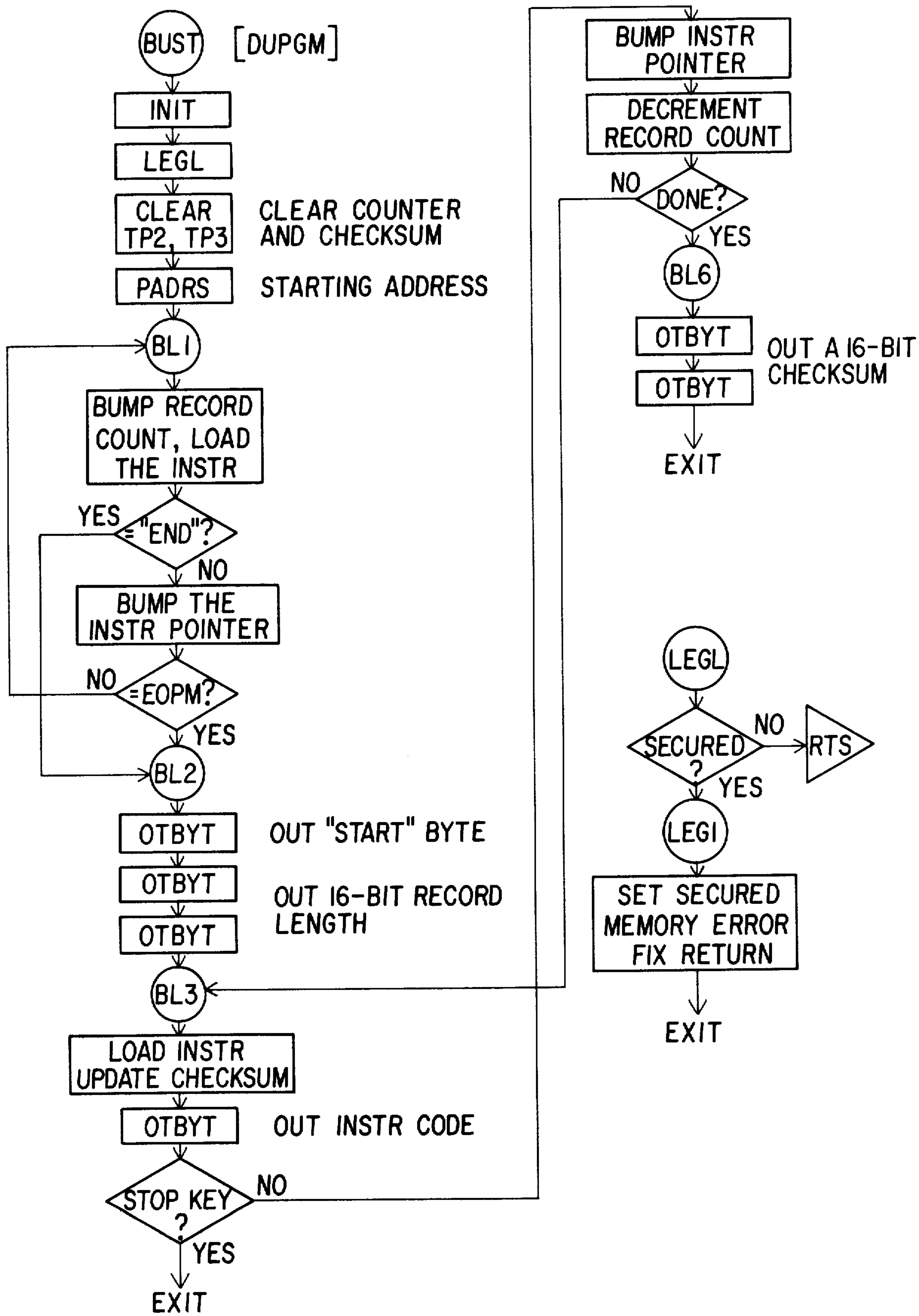
Figure 76V:
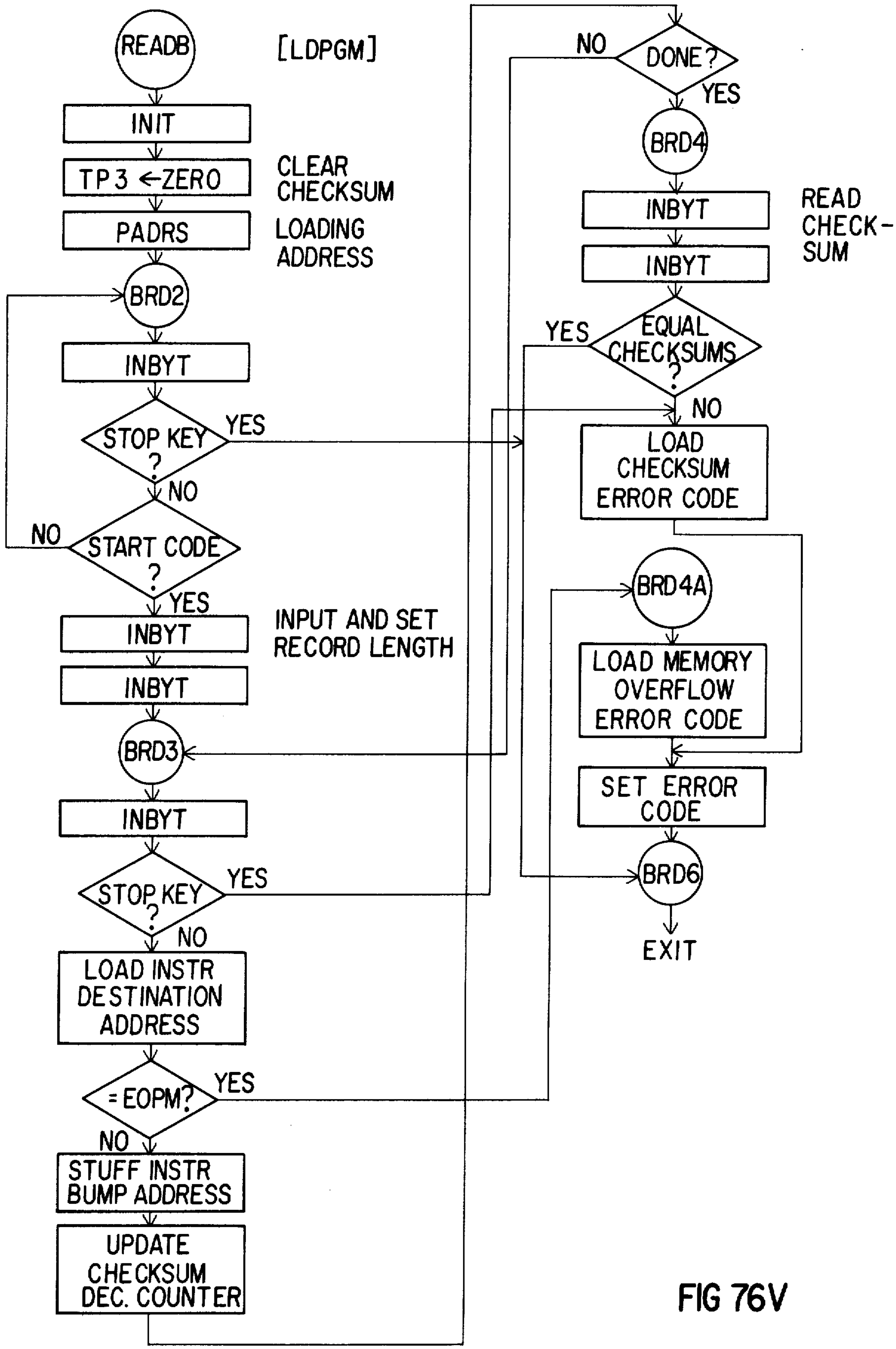
Figure 76W:
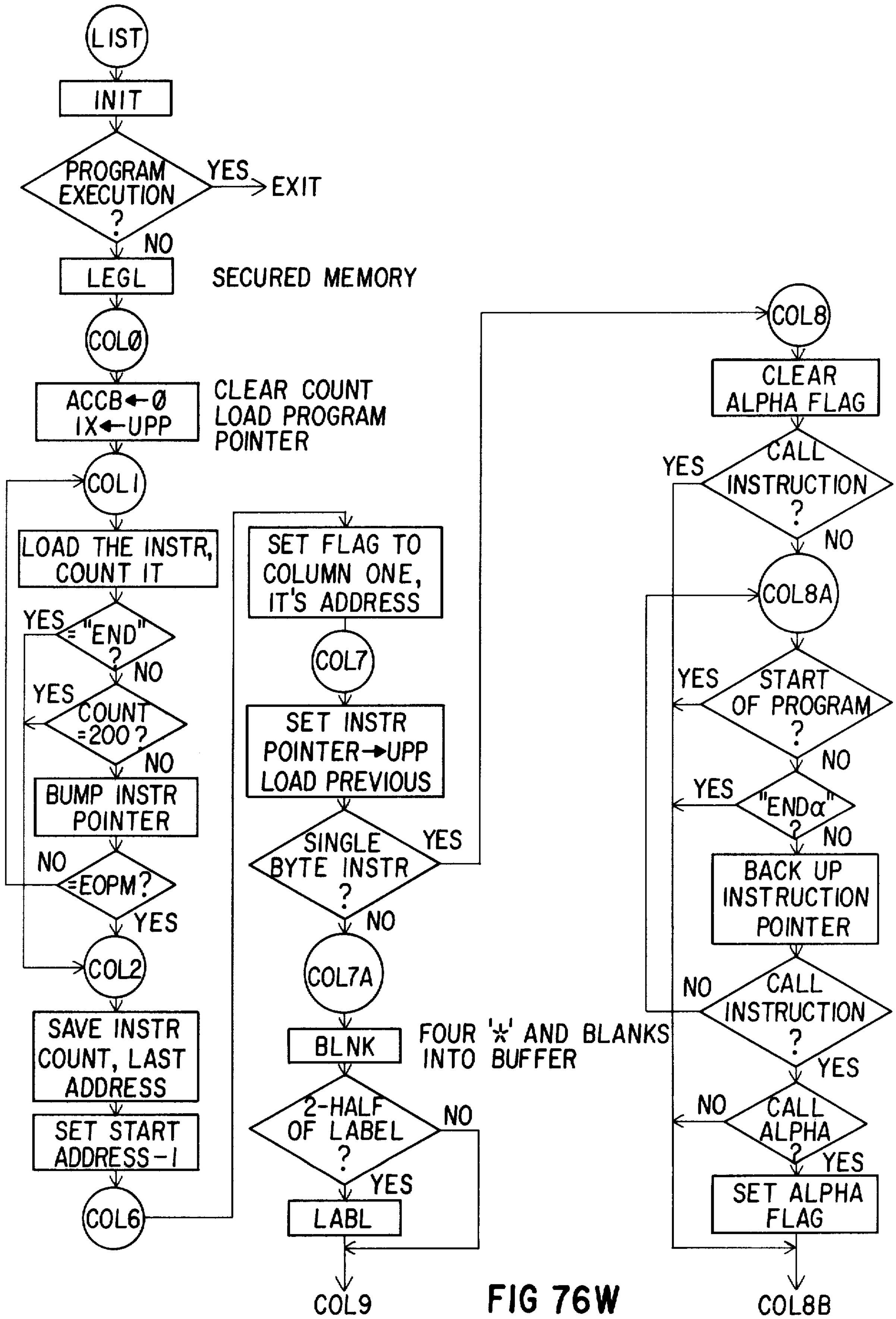
Figure 77A:
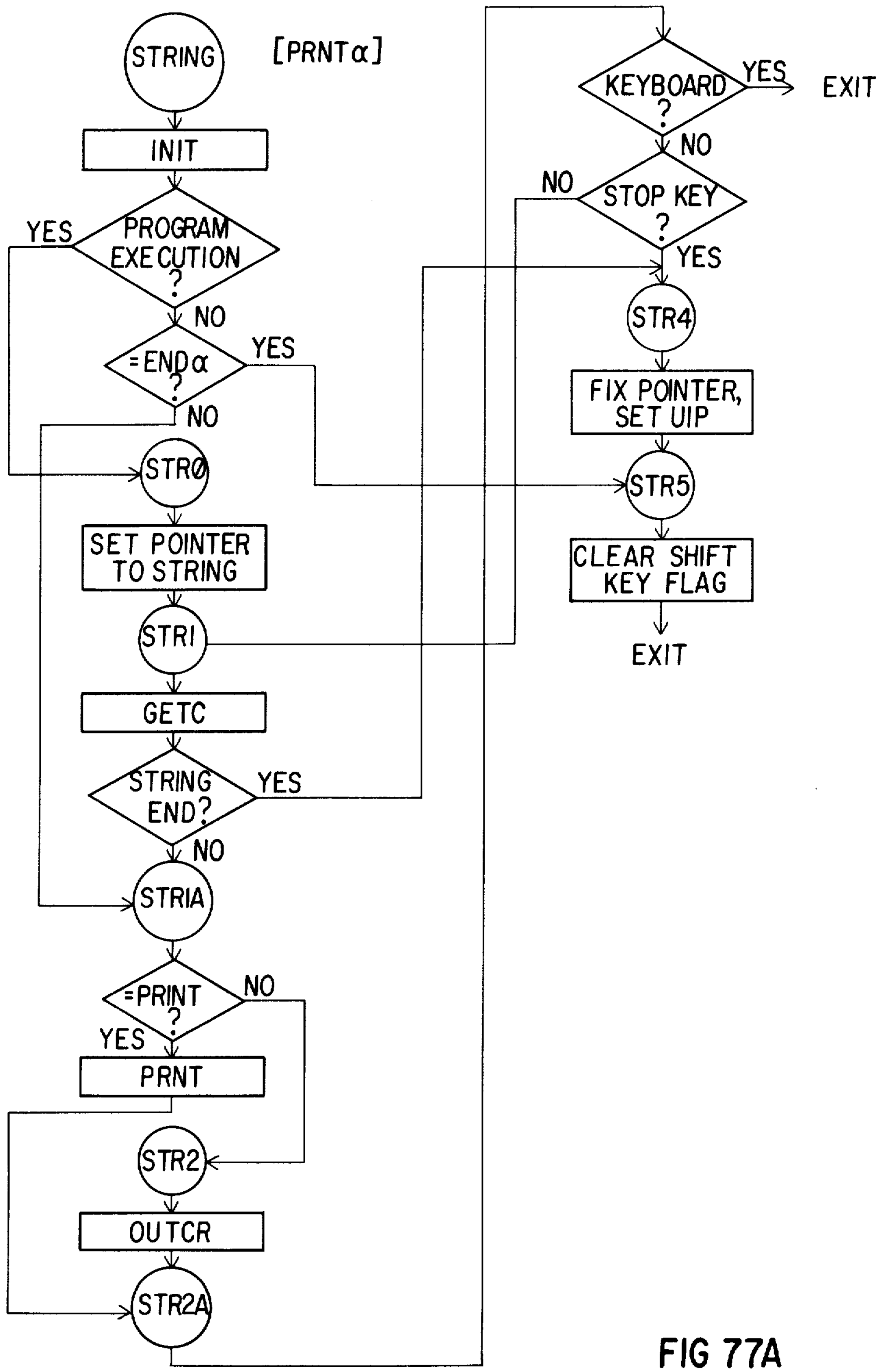
FIGS. 77A–F are a flow chart of another portion of some general I/O routines that may be stored in one of the I/O ROMs of FIG. 5.
Figure 77B:
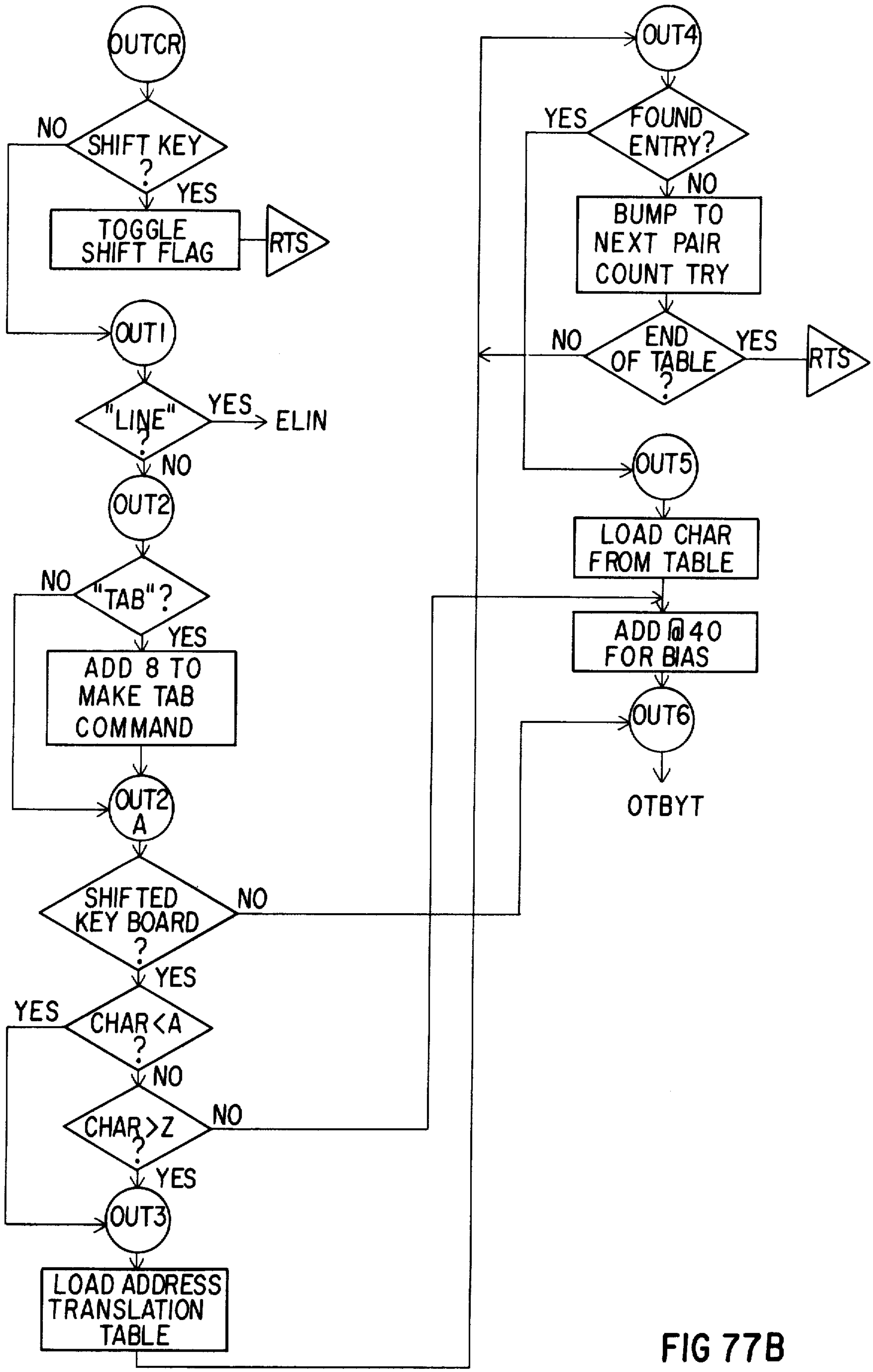
Figure 77C:
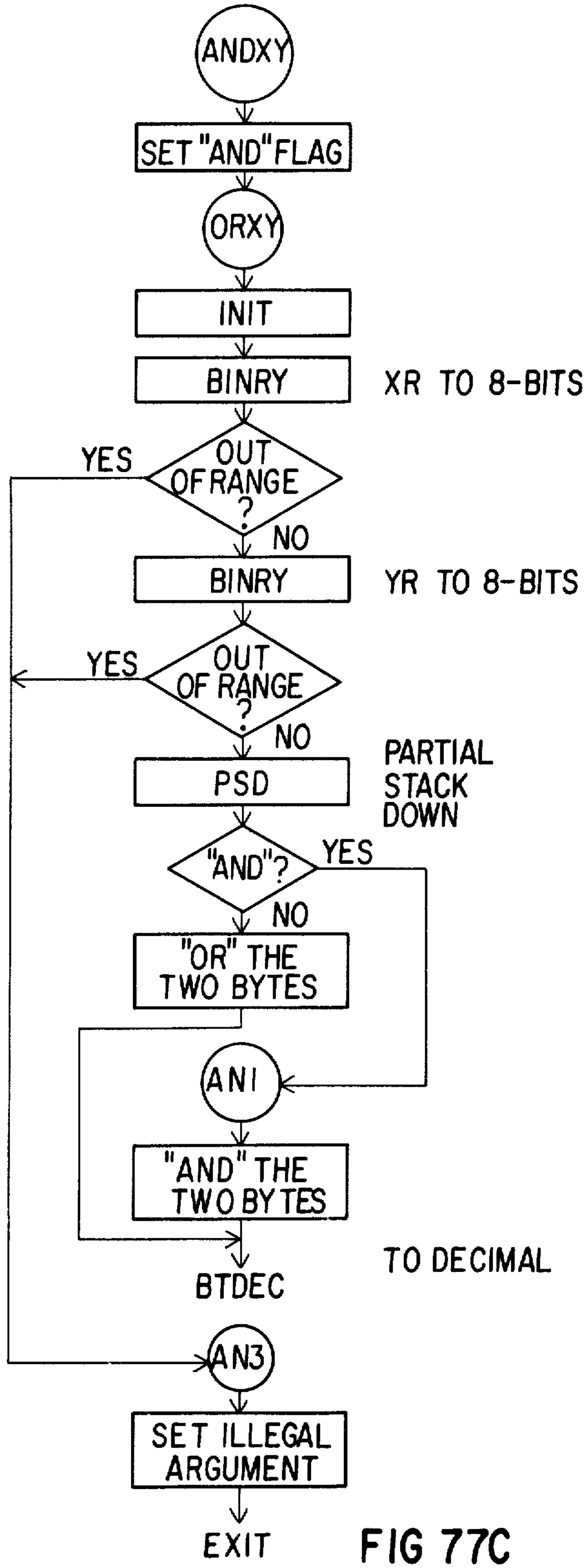
Figure 77D:
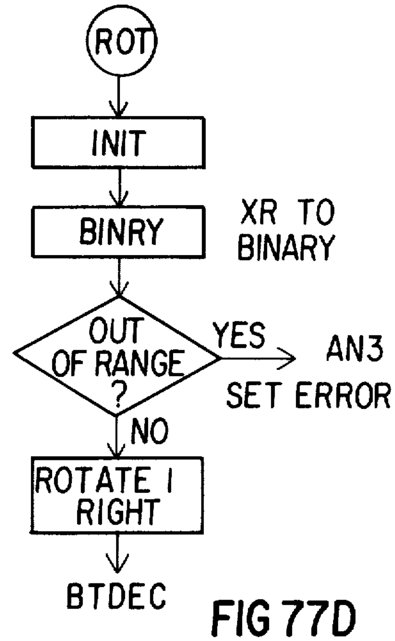
Figures 77E, 77F:
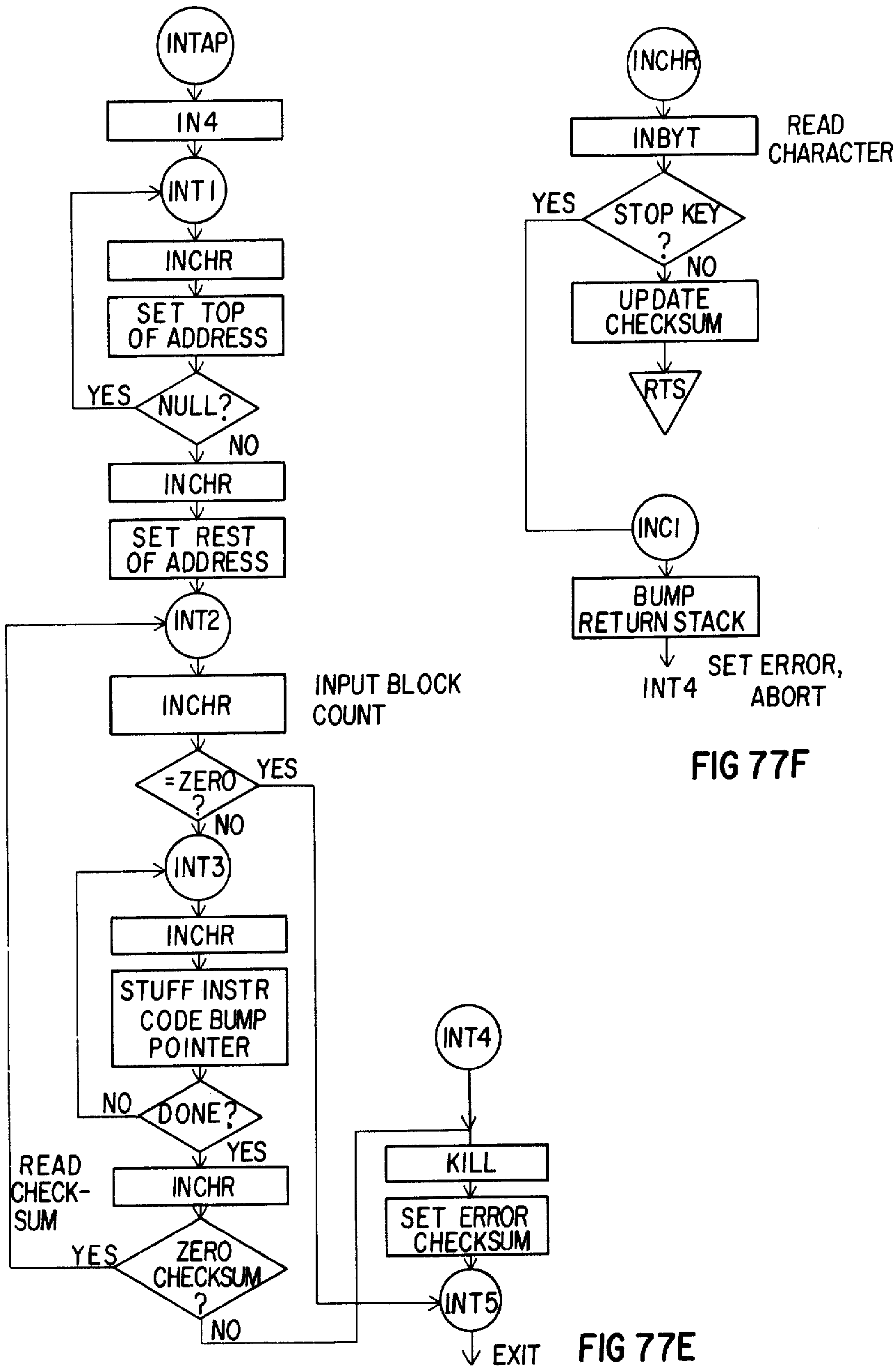

Figure 69K should follow sheet 124 rather than sheet 115;
Figure 71L should follow sheet 142 rather than sheet 154;
Figures 71M, 71N, 71Q, 71R, 71S, 71T, 71U, 71V and 71W should follow in sequence.
Figure 74I should follow sheet 154 rather than sheet 164;
Figure 74R should follow sheet 171 rather than sheet 173;
Figures 74S, 74T and 74U should follow in sequence.

UNITED STATES PATENT AND TRADEMARK OFFICE

CERTIFICATE OF CORRECTION

PATENT NO. : 4,089,059

DATED : May 9, 1978

INVENTOR(S) : Bradley W. Miller et al.

It is certified that error appears in the above-identified patent and that said Letters Patent is hereby corrected as shown below:

Column 6, line 50, "i" should be --is--;

Column 6, line 64, "U/O" should be --I/O

Column 7, line 65, after "detailed" insert --schematic--;

Column 8, lines 9 & 10, "antimation" should be --antimotion--;

Column 8, line 56, after "schematic" insert --diagram--;

Column 11, in the Table, at line 13, after "RRAM" delete ".";

Column 13, line 22, "bgy" should be --by--;

Column 16, line 50, "D11" should be --DI1--;

Column 17, line 25, "I06" should be --$\overline{I06}$--;

Column 17, line 26, "I07" should be --$\overline{I07}$--;

Column 17, line 52, "FIG. 53" should be --FIG. 52--;

Column 18, line 28, "<" should be -->--;

Column 18, line 31, ">" should be --<--;

Column 19, line 21, "is" should be --to--;

Column 21, line 7, "D011" should be --$\overline{D011}$--;

Column 21, line 31, after "to" insert --the--;

UNITED STATES PATENT AND TRADEMARK OFFICE
CERTIFICATE OF CORRECTION

PATENT NO. : 4,089,059

DATED : May 9, 1978

INVENTOR(S) : Bradley W. Miller et al.

It is certified that error appears in the above-identified patent and that said Letters Patent is hereby corrected as shown below:

Column 21, line 53, "Integraror" should be --Integrator--;

Column 21, line 67, "and" (second occurrence) should be --by--;

Column 21, line 67, "CD" should be --DC--;

Column 22, line 48, "-RAW" should be --+RAW--;

Column 23, line 34, "MPWO" should be --$\overline{MPWO}$--;

Column 331, line 45, "operationsl" should be --between--;

Column 332, line 28, "of" should be --on--;

Column 332, line 43, "of" should be --or--;

Column 333, line 12, after "desired" insert --data--;

Column 337, line 21, after "satisfactorily" delete "is";

Column 337, line 31, after "control" insert --or--;

Column 338, line 42, "an" should be --and--;

Column 342, line 62, after "number" insert --should--;

UNITED STATES PATENT AND TRADEMARK OFFICE
CERTIFICATE OF CORRECTION

PATENT NO. : 4,089,059

DATED : May 9, 1978

INVENTOR(S) : Bradley W. Miller et al.

It is certified that error appears in the above-identified patent and that said Letters Patent is hereby corrected as shown below:

Column 343, line 58, "identified" should be --defined--;

Column 344, line 33, "*LOG OF #--Ø" should be --*LOG OF # $\leq$ Ø--;

Column 344, line 68, delete "—$\leq$0" and insert --The--;

Column 347, line 63, after "CALL," insert --2,--;

Column 349, line 45, "the" (first occurrence) should be --that--.

Signed and Sealed this

*Twelfth* Day of *June 1984*

[SEAL]

*Attest:*

GERALD J. MOSSINGHOFF

*Attesting Officer* *Commissioner of Patents and Trademarks*